US012277003B2

(12) United States Patent
Sepulveda et al.

(10) Patent No.: US 12,277,003 B2

(45) Date of Patent: Apr. 15, 2025

(54) SYSTEMS AND METHODS FOR PROMPTING A LOG-IN TO AN ELECTRONIC DEVICE BASED ON BIOMETRIC INFORMATION RECEIVED FROM A USER

(71) Applicant: Apple Inc., Cupertino, CA (US)

(72) Inventors: Raymond S. Sepulveda, Portland, OR (US); Chun Kin Minor Wong, Portland, OR (US); Patrick L. Coffman, San Francisco, CA (US); Dylan R. Edwards, San Jose, CA (US); Eric Lance Wilson, San Jose, CA (US); Gregg S. Suzuki, Daly City, CA (US); Christopher I. Wilson, San Francisco, CA (US); Lawrence Y. Yang, Bellevue, WA (US); Andre Souza Dos Santos, San Jose, CA (US); Jeffrey T. Bernstein, San Francisco, CA (US); Duncan R. Kerr, San Francisco, CA (US); John B. Morrell, Los Gatos, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 18/408,528

(22) Filed: Jan. 9, 2024

(65) Prior Publication Data

US 2024/0143024 A1 May 2, 2024

Related U.S. Application Data

(63) Continuation of application No. 17/863,189, filed on Jul. 12, 2022, now Pat. No. 11,914,419, which is a (Continued)

(51) Int. Cl.

*G06F 3/041* (2006.01)

*G06F 1/16* (2006.01)

(Continued)

(52) U.S. Cl.

CPC .......... *G06F 1/1615* (2013.01); *G06F 1/1647* (2013.01); *G06F 3/016* (2013.01);

(Continued)

(58) Field of Classification Search

CPC ...... G06F 1/1615; G06F 1/1647; G06F 3/016; G06F 3/0412; G06F 3/04817;

(Continued)

(56) References Cited

U.S. PATENT DOCUMENTS

| | | |
|---|---|---|
| 3,956,745 A | 5/1976 | Ellis |
| 6,111,527 A | 8/2000 | Susel |

(Continued)

FOREIGN PATENT DOCUMENTS

| | | |
|---|---|---|
| CN | 101197046 A | 6/2008 |
| CN | 101232678 A | 7/2008 |

(Continued)

OTHER PUBLICATIONS

Office Action, dated Jan. 18, 2024, received in Chinese Patent Application No. 202010307026.6, which corresponds with U.S. Appl. No. 15/113,779, 2 pages.

(Continued)

*Primary Examiner* — Stephen G Sherman

(74) *Attorney, Agent, or Firm* — Morgan, Lewis & Bockius LLP

(57) ABSTRACT

An example method is performed at a device with a display and a biometric sensor. While the device is in a locked state, the method includes displaying a log-in user interface that is associated with logging in to a first and second user account. While displaying the log-in user interface, the method (Continued)

includes, receiving biometric information, and in response to receiving the biometric information: when the biometric information is consistent with biometric information for the first user account and the first user account does not have an active session, displaying a prompt to input a log-in credential for the first user account; and when the biometric information is consistent with biometric information for the second user account and the second user account does not have an active session on the device, displaying a prompt to input a log-in credential for the second user account.

33 Claims, 252 Drawing Sheets
(149 of 252 Drawing Sheet(s) Filed in Color)

Related U.S. Application Data continuation of application No. 16/862,427, filed on Apr. 29, 2020, now Pat. No. 11,429,145, which is a continuation of application No. 16/361,122, filed on Mar. 21, 2019, now Pat. No. 10,642,416, which is a continuation of application No. 15/655,707, filed on Jul. 20, 2017, now Pat. No. 10,303,289, said application No. 16/361,122 is a continuation-in-part of application No. 15/275,298, filed on Sep. 23, 2016, now Pat. No. 10,754,603, which is a continuation-in-part of application No. 15/113,779, filed as application No. PCT/US2015/012694 on Jan. 23, 2015, now Pat. No. 10,606,539.

(60) Provisional application No. 62/412,792, filed on Oct. 25, 2016, provisional application No. 62/368,988, filed on Jul. 29, 2016, provisional application No. 62/104,023, filed on Jan. 15, 2015, provisional application No. 61/930,663, filed on Jan. 23, 2014.

(51) Int. Cl.

| | |
|---|---|
| ***G06F 3/01*** | (2006.01) |
| ***G06F 3/0481*** | (2022.01) |
| ***G06F 3/04817*** | (2022.01) |
| ***G06F 3/0482*** | (2013.01) |
| ***G06F 3/04883*** | (2022.01) |
| *G06F 3/042* | (2006.01) |

(52) U.S. Cl.
CPC ........ *G06F 3/0412* (2013.01); *G06F 3/04817* (2013.01); *G06F 3/0482* (2013.01); *G06F 3/04883* (2013.01); *G06F 3/042* (2013.01); *G06F 2203/04805* (2013.01)

(58) Field of Classification Search
CPC .... G06F 3/0482; G06F 3/04883; G06F 3/042; G06F 2203/04805; G06V 40/12–1394
See application file for complete search history.

(56) References Cited

U.S. PATENT DOCUMENTS

| | | | |
|---|---|---|---|
| 6,396,483 | B1 | 5/2002 | Hiller |
| 7,239,728 | B1 | 7/2007 | Choi et al. |
| 9,256,719 | B2 | 2/2016 | Berini et al. |
| 9,369,635 | B1 | 6/2016 | Hilla |
| 9,521,375 | B2 | 12/2016 | Beaumier et al. |
| 2001/0017934 | A1 | 8/2001 | Paloniemi et al. |
| 2002/0018585 | A1 | 2/2002 | Kim |
| 2002/0191029 | A1 | 12/2002 | Gillespie et al. |
| 2004/0004604 | A1 | 1/2004 | Numano |
| 2004/0108968 | A1 | 6/2004 | Finke-Anlauff |
| 2004/0239615 | A1 | 12/2004 | Firebaugh et al. |
| 2006/0036964 | A1 | 2/2006 | Satterfield et al. |
| 2006/0052885 | A1 | 3/2006 | Kong |
| 2007/0162574 | A1 | 7/2007 | Williamson et al. |
| 2008/0178117 | A1 | 7/2008 | Gelman et al. |
| 2008/0207273 | A1 | 8/2008 | Huo |
| 2008/0242343 | A1 | 10/2008 | Koh et al. |
| 2008/0252414 | A1 | 10/2008 | Crigger et al. |
| 2008/0320410 | A1 | 12/2008 | Whytock et al. |
| 2009/0100384 | A1 | 4/2009 | Louch |
| 2009/0183008 | A1 | 7/2009 | Jobmann |
| 2009/0199282 | A1 | 8/2009 | Tsitkova et al. |
| 2009/0201254 | A1 | 8/2009 | Rais |
| 2009/0265628 | A1 | 10/2009 | Bamford et al. |
| 2009/0271723 | A1 | 10/2009 | Matsushima et al. |
| 2009/0315867 | A1 | 12/2009 | Sakamoto et al. |
| 2010/0037064 | A1 | 2/2010 | Ku |
| 2010/0077346 | A1 | 3/2010 | Kawashima et al. |
| 2010/0088653 | A1 | 4/2010 | Yach et al. |
| 2010/0149101 | A1 | 6/2010 | Guo et al. |
| 2010/0153269 | A1 | 6/2010 | McCabe |
| 2010/0156595 | A1 | 6/2010 | Wong et al. |
| 2010/0182265 | A1 | 7/2010 | Kim et al. |
| 2010/0207727 | A1 | 8/2010 | Kanekiyo et al. |
| 2010/0265182 | A1 | 10/2010 | Ball et al. |
| 2010/0275163 | A1 | 10/2010 | Gillespie et al. |
| 2010/0295802 | A1 | 11/2010 | Lee et al. |
| 2011/0154342 | A1* | 6/2011 | Logan ................. G06Q 10/109 718/101 |
| 2011/0187646 | A1 | 8/2011 | Mahmoud |
| 2011/0304644 | A1 | 12/2011 | Wada et al. |
| 2011/0314405 | A1 | 12/2011 | Turner et al. |
| 2011/0317886 | A1 | 12/2011 | Matsuoka |
| 2012/0068933 | A1 | 3/2012 | Larsen |
| 2012/0110515 | A1 | 5/2012 | Abramoff et al. |
| 2012/0235912 | A1 | 9/2012 | Laubach |
| 2013/0050135 | A1 | 2/2013 | Stewart et al. |
| 2013/0067545 | A1 | 3/2013 | Hanes |
| 2013/0080942 | A1 | 3/2013 | Reeves et al. |
| 2013/0086513 | A1 | 4/2013 | Rasmussen et al. |
| 2013/0132876 | A1 | 5/2013 | Kobayashi et al. |
| 2013/0160141 | A1 | 6/2013 | Tseng et al. |
| 2013/0167212 | A1 | 6/2013 | Azar et al. |
| 2013/0173925 | A1 | 7/2013 | Yen et al. |
| 2013/0207994 | A1* | 8/2013 | Rodeski ................ G06F 16/957 345/593 |
| 2013/0311931 | A1 | 11/2013 | Kocubo |
| 2013/0321340 | A1 | 12/2013 | Seo et al. |
| 2013/0322705 | A1 | 12/2013 | Wong |
| 2013/0332836 | A1 | 12/2013 | Cho |
| 2014/0068456 | A1 | 3/2014 | Chan et al. |
| 2014/0075373 | A1 | 3/2014 | Jitkoff et al. |
| 2014/0082548 | A1 | 3/2014 | Wu et al. |
| 2014/0092424 | A1 | 4/2014 | Grosz |
| 2014/0108929 | A1* | 4/2014 | Garmark ................ G06F 3/165 715/716 |
| 2014/0157209 | A1 | 6/2014 | Dalal et al. |
| 2014/0164997 | A1 | 6/2014 | Lee et al. |
| 2014/0184471 | A1 | 7/2014 | Martynov et al. |
| 2014/0232671 | A1 | 8/2014 | Chaudhri |
| 2014/0380239 | A1 | 12/2014 | Kang |
| 2015/0015512 | A1 | 1/2015 | Kwak et al. |
| 2015/0339031 | A1 | 11/2015 | Zeinstra et al. |
| 2015/0378546 | A1 | 12/2015 | Osborne et al. |
| 2017/0010771 | A1 | 1/2017 | Bernstein et al. |
| 2017/0010846 | A1 | 1/2017 | Bernstein et al. |
| 2017/0010847 | A1 | 1/2017 | Bernstein et al. |
| 2017/0315704 | A1 | 11/2017 | Shaw et al. |
| 2018/0032203 | A1 | 2/2018 | Sepulveda et al. |
| 2019/0220134 | A1 | 7/2019 | Sepulveda et al. |
| 2019/0220135 | A1 | 7/2019 | Sepulveda et al. |
| 2020/0225902 | A1 | 7/2020 | Bernstein et al. |
| 2020/0257403 | A1 | 8/2020 | Sepulveda et al. |
| 2021/0048967 | A1 | 2/2021 | Bernstein et al. |

(56) References Cited

U.S. PATENT DOCUMENTS

| | | | |
|---|---|---|---|
| 2022/0244900 | A1 | 8/2022 | Bernstein et al. |
| 2022/0342443 | A1 | 10/2022 | Sepulveda et al. |

FOREIGN PATENT DOCUMENTS

| | | | |
|---|---|---|---|
| CN | 101324821 | A | 12/2008 |
| CN | 101354791 | A | 1/2009 |
| CN | 101356493 | A | 1/2009 |
| CN | 101520720 | A | 2/2009 |
| CN | 101382842 | A | 3/2009 |
| CN | 101506867 | A | 8/2009 |
| CN | 101529368 | A | 9/2009 |
| CN | 101571785 | A | 11/2009 |
| CN | 101727287 | A | 6/2010 |
| CN | 101876879 | A | 11/2010 |
| CN | 101893914 | A | 11/2010 |
| CN | 102096546 | A | 6/2011 |
| CN | 102279698 | A | 12/2011 |
| CN | 102385477 | A | 3/2012 |
| CN | 102405453 | A | 4/2012 |
| CN | 102414755 | A | 4/2012 |
| CN | 202562233 | U | 11/2012 |
| CN | 102934052 | A | 2/2013 |
| CN | 102968204 | A | 3/2013 |
| CN | 103124996 | A | 5/2013 |
| CN | 103155534 | A | 6/2013 |
| CN | 103164152 | A | 6/2013 |
| CN | 103282851 | A | 9/2013 |
| CN | 103324423 | A | 9/2013 |
| CN | 103380461 | A | 10/2013 |
| CN | 103425914 | A | 12/2013 |
| CN | 103477304 | A | 12/2013 |
| CN | 103502920 | A | 1/2014 |
| CN | 103729159 | A | 4/2014 |
| CN | 103729160 | A | 4/2014 |
| CN | 103778388 | A | 5/2014 |
| CN | 104008350 | A | 8/2014 |
| CN | 104715178 | A | 6/2015 |
| CN | 105138254 | A | 12/2015 |
| CN | 105260125 | A | 1/2016 |
| CN | 105574378 | A | 5/2016 |
| CN | 106445184 | A | 2/2017 |
| EP | 2 129 085 | A1 | 2/2009 |
| EP | 2 500 807 | A1 | 9/2012 |
| EP | 2 645 287 | A1 | 10/2013 |
| EP | 2 660 692 | A1 | 11/2013 |
| GB | 201204842 | | 5/2012 |
| JP | H 10124217 | A | 5/1998 |
| JP | 2000-122792 | A | 4/2000 |
| JP | 2001-344092 | A | 12/2001 |
| JP | 2006-155455 | A | 6/2006 |
| JP | 2007-289457 | | 11/2007 |
| JP | 2009-169735 | A | 7/2009 |
| JP | 2009-258667 | A | 11/2009 |
| JP | 2010-009534 | A | 1/2010 |
| JP | 2010-066918 | A | 3/2010 |
| JP | 2010-108088 | A | 5/2010 |
| JP | 2010-129051 | A | 6/2010 |
| JP | 2011-018085 | A | 1/2011 |
| JP | 2011-141607 | A | 7/2011 |
| JP | 2012-003508 | A | 1/2012 |
| JP | 2013-532334 | A | 8/2013 |
| JP | 2015-201131 | A | 11/2015 |
| JP | 2017-504128 | A | 2/2017 |
| JP | 2001-103573 | A | 4/2021 |
| KR | 2009-0011323 | A | 2/2009 |
| KR | 2015/0050732 | A | 5/2015 |
| KR | 2015/0140302 | A | 12/2015 |
| WO | WO 2015/112868 | A1 | 7/2015 |
| WO | WO 2016/104867 | A1 | 6/2016 |

OTHER PUBLICATIONS

Patent, dated Mar. 8, 2024, received in Chinese Patent Application No. 202010307026.6, which corresponds with U.S. Appl. No. 15/113,779, 6 pages.

Office Action, dated Jan. 4, 2024, received in Chinese Patent Application No. 202110182280.2, which corresponds with U.S. Appl. No. 15/655,707, 5 pages.

Intent to Grant, dated Mar. 19, 2024, received in European Patent Application No. 20168044.4, which corresponds with U.S. Appl. No. 15/655,707, 10 pages.

Office Action, dated Jan. 9, 2024, received in Chinese Patent Application No. 202110181990.3, which corresponds with U.S. Appl. No. 16/361,109, 5 pages.

Office Action, dated Jan. 18, 2024, received in Chinese Patent Application No. 202110181406.4, which corresponds with U.S. Appl. No. 16/361,122, 5 pages.

Certificate of Grant, dated Feb. 22, 2024, received in U.S. Appl. No. 17/863,189, 4 pages.

IOS 11 Updates, "Demo of iOS 9 Apps: Search, Siri, Photies App", https://youtube.be.EBnXMM1X6xA, Jun. 12, 2015, 2 pages.

MSAppliedsciences, "DisplayCover", https:/youtube/OSFIvmI0Sso, Aug. 20, 2015, 2 pages.

MSAppliedsciences, "UIST Student Innovation Contest 2010 Concept", https:/youtube/ojusRO38Tdc, Aug. 9, 2010, 3 pages.

Response to Pending Examination Report for PA 201670555, "Systems, Devices, and Methods for Dynamically Providing User Interface Controls at a Touch-Sensitive Secondary Display", https://onlineweb.dkpto.dk/Dokumenter2017/227/09194227.pdf, Nov. 7, 2017, 161 pages.

Wagner et al., U.S. application filed on Apr. 15, 2014, titled "Device, Method, and Graphical User Interface for Navigating and Displaying Content in Context", 140 pages.

Office Action, dated Aug. 13, 2018, received in U.S. Appl. No. 15/113,779, 23 pages.

Final Office Action, dated Jan. 22, 2019, received in U.S. Appl. No. 15/113,779, 25 pages.

Office Action, dated May 14, 2019, received in U.S. Appl. No. 15/113,779, 22 pages.

Notice of Allowance, dated Oct. 9, 2019, received in U.S. Appl. No. 15/113,779, 20 pages.

Notice of Allowance, dated Jan. 15, 2020, received in U.S. Appl. No. 15/113,779, 8 pages.

Office Action, dated Dec. 5, 2018, received in Chinese Patent Application No. 201580005665.4, which corresponds with U.S. Appl. No. 15/113,779, 6 pages.

Office Action, dated Jul. 9, 2019, received in Chinese Patent Application No. 201580005665.4, which corresponds with U.S. Appl. No. 15/113,779, 4 pages.

Office Action, dated Sep. 30, 2019, received in Chinese Patent Application No. 201580005665.4, which corresponds with U.S. Appl. No. 15/113,779, 3 pages.

Notice of Allowance, dated Feb. 3, 2020, received in Chinese Patent Application No. 201580005665.4, which corresponds with U.S. Appl. No. 15/113,779, 3 pages.

Patent, dated Mar. 31, 2020, received in Chinese Patent Application No. 201580005665.4, which corresponds with U.S. Appl. No. 15/113,779, 6 pages.

Office Action, dated Jun. 15, 2018 received in Chinese Patent Application No. 201610840116.5, which corresponds with U.S. Appl. No. 15/113,779, 5 pages.

Notice of Allowance, dated Apr. 2, 2019, received in Chinese Patent Application No. 201610840116.5, which corresponds with U.S. Appl. No. 15/113,779, 3 pages.

Patent, dated May 17, 2019, received in Chinese Patent Application No. 201610840116.5, which corresponds with U.S. Appl. No. 15/113,779, 6 pages.

Office Action, dated Feb. 13, 2023, received in Chinese Patent Application No. 202010307026.6, which corresponds with U.S. Appl. No. 15/113,779, 10 pages.

Office Action, dated Sep. 20, 2023, received in Chinese Patent Application No. 202010307026.6, which corresponds with U.S. Appl. No. 15/113,779, 2 pages.

(56) References Cited

OTHER PUBLICATIONS

Office Action, dated Dec. 30, 2022, received in Chinese Patent Application No. 202010307686.4, which corresponds with U.S. Appl. No. 15/113,779, 5 pages.
Notice of Allowance, dated Oct. 27, 2023, received in Chinese Patent Application No. 202010307686.4, which corresponds with U.S. Appl. No. 15/113,779, 3 pages.
Patent, dated Nov. 28, 2023, received in Chinese Patent Application No. 202010307686.4, which corresponds with U.S. Appl. No. 15/113,779, 6 pages.
Notice of Allowance, dated Jan. 11, 2023, received in Chinese Patent Application No. 202010305200.3, which corresponds with U.S. Appl. No. 15/113,779, 3 pages.
Patent, dated Mar. 24, 2023, received in Chinese Patent Application No. 202010305200.3, which corresponds with U.S. Appl. No. 15/113,779, 6 pages.
Office Action, dated Oct. 26, 2016, received in Danish Patent Application No. 201670555, which corresponds with U.S. Appl. No. 15/113,779, 10 pages.
Office Action, dated May 8, 2017, received in Danish Patent Application No. 201670555, which corresponds with U.S. Appl. No. 15/113,779, 3 pages.
Office Action, dated Nov. 16, 2017, received in Danish Patent Application No. 201670555, which corresponds with U.S. Appl. No. 15/113,779, 2 pages.
Notice of Allowance, dated Feb. 12, 2018, received in Danish Patent Application No. 201670555, which corresponds with U.S. Appl. No. 15/113,779, 2 pages.
Patent, dated Oct. 11, 2018, received in Danish Patent Application No. 201670555, which corresponds with U.S. Appl. No. 15/113,779, 3 pages.
Notice of Allowance, dated Feb. 12, 2018, received in Danish Patent Application No. 201670559, which corresponds with U.S. Appl. No. 15/113,779, 2 pages.
Office Action, dated Oct. 18, 2016, received in Danish Patent Application No. 201670559, which corresponds with U.S. Appl. No. 15/113,779, 9 pages.
Office Action, dated May 8, 2017, received in Danish Patent Application No. 201670559, which corresponds with U.S. Appl. No. 15/113,779, 4 pages.
Patent, dated Apr. 23, 2018, received in Danish Patent Application No. 201670559, which corresponds with U.S. Appl. No. 15/113,779, 3 pages.
Office Action, dated Nov. 16, 2017, received in Danish Patent Application No. 201670559, which corresponds with U.S. Appl. No. 15/113,779, 2 pages.
Office Action, dated May 29, 2017, received in European Patent Application No. 15702935.6, which corresponds with U.S. Appl. No. 14/113,779, 9 pages.
Summons to Attend Oral Proceedings, dated Jan. 8, 2018, received in European Patent Application No. 15702935.6, which corresponds with U.S. Appl. No. 14/113,779, 18 pages.
Intention to Grant, dated Jun. 18, 2021, received in European Patent Application No. 15702935.6, which corresponds with U.S. Appl. No. 14/113,779, 7 pages.
Patent, dated Sep. 29, 2021, received in European Patent Application No. 15702935.6, which corresponds with U.S. Appl. No. 14/113,779, 3 pages.
Office Action, dated Jan. 29, 2018, received in European Patent Application No. 16181866.1, which corresponds with U.S. Appl. No. 15/113,779, 11 pages.
Intention to Grant, dated Aug. 16, 2018, received in European Patent Application No. 16181866.1, which corresponds with U.S. Appl. No. 15/113,779, 5 pages.
Patent, dated Jan. 23, 2019, received in European Patent Application No. 16181866.1, which corresponds with U.S. Appl. No. 15/113,779, 3 pages.
Notice of Allowance, dated Nov. 13, 2017, received in Japanese Patent Application No. 2016-548096, which corresponds with U.S. Appl. No. 14/113,779, 5 pages.
Patent, dated Dec. 8, 2017, received in Japanese Patent Application No. 2016- 548096, which corresponds with U.S. Appl. No. 14/113,779, 3 pages.
Office Action, dated Jun. 2, 2017, received in Japanese Patent Application No. 2016-158867, which corresponds with U.S. Appl. No. 15/113,779, 6 pages.
Office Action, dated Feb. 5, 2018, received in Japanese Patent Application No. 2016-158867, which corresponds with U.S. Appl. No. 15/113,779, 5 pages.
Patent, dated Jun. 29, 2018, received in Japanese Patent Application No. 2016-158867, which corresponds with U.S. Appl. No. 15/113,779, 3 pages.
Office Action, dated Apr. 9, 2019, received in Japanese Patent Application No. 2018-116341, which corresponds with U.S. Appl. No. 15/113,779, 7 pages.
Office Action, dated Dec. 13, 2019, received in Japanese Patent Application No. 2018-116341, which corresponds with U.S. Appl. No. 15/113,779, 5 pages.
Notice of Allowance, dated Jun. 5, 2020, received in Japanese Patent Application No. 2018-116341, which corresponds with U.S. Appl. No. 15/113,779, 5 pages.
Patent, dated Jul. 3, 2020, received in Japanese Patent Application No. 2018- 116341, which corresponds with U.S. Appl. No. 15/113,779, 4 pages.
Notice of Allowance, dated Jun. 7, 2021, received in Japanese Patent Application No. 2020-071844, which corresponds with U.S. Appl. No. 15/113,779, 2 pages.
Patent, dated Jul. 5, 2021, received in Japanese Patent Application No. 2020- 071844, which corresponds with U.S. Appl. No. 15/113,779, 4 pages.
Office Action, dated Jul. 4, 2022, received in Japanese Patent Application No. 2021- 110169, which corresponds with U.S. Appl. No. 15/113,779, 2 pages.
Final Office Action, dated Feb. 14, 2023, received in Japanese Patent Application No. 2021-110169, which corresponds with U.S. Appl. No. 15/113,779, 4 pages.
Office Action, dated Aug. 10, 2018, received in U.S. Appl. No. 15/655,707, 15 pages.
Innovation Patent, dated Sep. 19, 2017, received in Australia Patent Application No. 2017100879, which corresponds with U.S. Appl. No. 15/655,707, 1 page.
Office Action, dated Feb. 1, 2019, received in Australia Patent Application No. 2017302420, which corresponds with U.S. Appl. No. 15/655,707, 6 pages.
Notice of Acceptance, dated Jul. 15, 2019, received in Australia Patent Application No. 2017302420, which corresponds with U.S. Appl. No. 15/655,707, 3 pages.
Certificate of Grant, dated Nov. 14, 2019, received in Australia Patent Application No. 2017302420, which corresponds with U.S. Appl. No. 15/655,707, 4 pages.
Office Action, dated Aug. 18, 2020, received in Australia Patent Application No. 2019219760, which corresponds with U.S. Appl. No. 15/655,707, 6 pages.
Notice of Acceptance, dated Jul. 12, 2021, received in Australia Patent Application No. 2019219760, which corresponds with U.S. Appl. No. 15/655,707, 3 pages.
Certificate of Grant, dated Nov. 18, 2021, received in Australia Patent Application No. 2019219760, which corresponds with U.S. Appl. No. 15/655,707, 4 pages.
Office Action, dated Aug. 25, 2017, received in Chinese Patent Application No. 201710632979.8, which corresponds with U.S. Appl. No. 15/655,707, 3 pages.
Office Action, dated Jun. 3, 2020, received in Chinese Patent Application No. 201710632979.8, which corresponds with U.S. Appl. No. 15/655,707, 8 pages.
Notice of Allowance, dated Nov. 30, 2020, received in Chinese Patent Application No. 201710632979.8, which corresponds with U.S. Appl. No. 15/655,707, 5 pages.
Patent, dated Feb. 23, 2021, received in Chinese Patent Application No. 201710632979.8, which corresponds with U.S. Appl. No. 15/655,707, 7 pages.

(56) References Cited

OTHER PUBLICATIONS

Office Action, dated Oct. 10, 2017, received in Danish Patent Application No. 2017-70561, which corresponds with U.S. Appl. No. 15/655,707, 9 pages.
Office Action, dated Mar. 14, 2018, received in Danish Patent Application No. 2017-70561, which corresponds with U.S. Appl. No. 15/655,707, 3 pages.
Office Action, dated Oct. 31, 2018, received in Danish Patent Application No. 2017-70561, which corresponds with U.S. Appl. No. 15/655,707, 5 pages.
Intention to Grant, dated Jan. 2, 2019, received in Danish Patent Application No. 2017-70561, which corresponds with U.S. Appl. No. 15/655,707, 2 pages.
Notice of Allowance, dated Feb. 7, 2019, received in Danish Patent Application No. 2017-70561, which corresponds with U.S. Appl. No. 15/655,707, 2 pages.
Patent, dated Apr. 3, 2019, received in Danish Patent Application No. 2017-70561, which corresponds with U.S. Appl. No. 15/655,707, 5 pages.
Office Action, dated Jun. 27, 2019, received in European Patent Application No. 17745225.7, which corresponds with U.S. Appl. No. 15/655,707, 6 pages.
Intention to Grant, dated Jan. 16, 2020, reeived in European Patent Application No. 17745225.7, which corresponds with U.S. Appl. No. 15/655,707, 8 pages.
Decision to Grant, dated Jul. 23, 2020, received in European Patent Application No. 17745225.7, which corresponds with U.S. Appl. No. 15/655,707, 2 pages.
Patent, dated Aug. 19, 2020, received in European Patent Application No. 17745225.7, which corresponds with U.S. Appl. No. 15/655,707, 3 pages.
Office Action, dated Jan. 13, 2023, received in European Patent Application No. 20168044.4, which corresponds with U.S. Appl. No. 15/655,707, 6 pages.
Intent to Grant, dated Nov. 10, 2023, received in European Patent Application No. 20168044.4, which corresponds with U.S. Appl. No. 15/655,707, 12 pages.
Office Action, dated Sep. 2, 2019, received in Japanese Patent Application No. 2019-503292, which corresponds with U.S. Appl. No. 15/655,707, 7 pages.
Notice of Allowance, dated Apr. 6, 2020, received in Japanese Patent Application No. 2019-503292, which corresponds with U.S. Appl. No. 15/655,707, 5 pages.
Patent, dated May 7, 2020, received in Japanese Patent Application No. 2019- 503292, which corresponds with U.S. Appl. No. 15/655,707, 5 pages.
Office Action, dated Aug. 2, 2021, received in Japanese Patent Application No. 2020-060636, which corresponds with U.S. Appl. No. 15/655,707, 2 pages.
Notice of Allowance, dated Oct. 14, 2022, received in Japanese Patent Application No. 2020-060636, which corresponds with U.S. Appl. No. 15/655,707, 2 pages.
Patent, dated Nov. 9, 2022, received in Japanese Patent Application No. 2020- 060636, which corresponds with U.S. Appl. No. 15/655,707, 3 pages.
Office Action, dated Jun. 6, 2019, received in Korean Patent Application No. 2019-7004584, which corresponds with U.S. Appl. No. 15/655,707, 6 pages.
Notice of Allowance, dated Oct. 24, 2019, received in Korean Patent Application No. 2019-7004584, which corresponds with U.S. Appl. No. 15/655,707, 5 pages.
Patent, dated Jan. 7, 2020, received in Korean Patent Application No. 2019-7004584, which corresponds with U.S. Appl. No. 15/655,707, 4 pages.
Office Action, dated Jan. 6, 2021, received in Korean Patent Application No. 2020-7028796, which corresponds with U.S. Appl. No. 15/655,707, 5 pages.
Notice of Allowance, dated Sep. 28, 2021, received in Korean Patent Application No. 2020-7028796, which corresponds with U.S. Appl. No. 15/655,707, 2 pages.
Patent, dated Dec. 28, 2021, received in Korean Patent Application No. 2020-7028796, which corresponds with U.S. Appl. No. 15/655,707, 6 pages.
Office Action, dated Mar. 23, 2022, received in Korean Patent Application No. 2021-7042875, which corresponds with U.S. Appl. No. 15/655,707, 8 pages.
Notice of Allowance, dated Nov. 1, 2022, received in Korean Patent Application No. 2021-7042875, which corresponds with U.S. Appl. No. 15/655,707, 2 pages.
Office Action, dated Jun. 18, 2018, received in U.S. Appl. No. 15/273,627, 20 pages.
Office Action, dated Jan. 17, 2019, received in U.S. Appl. No. 15/273,627, 24 pages.
Notice of Allowance, dated Nov. 21, 2019, received in U.S. Appl. No. 15/273,627, 5 pages.
Notice of Allowance, dated Jan. 27, 2020, received in U.S. Appl. No. 15/273,627, 7 pages.
Office Action, dated Feb. 8, 2019, received in U.S. Appl. No. 15/275,298, 16 pages.
Final Office Action, dated Jul. 3, 2019, received in U.S. Appl. No. 15/275,298, 16 pages.
Notice of Allowance, dated Apr. 17, 2020, received in U.S. Appl. No. 15/275,298, 5 pages.
Notice of Allowance, dated Jun. 18, 2020, received in U.S. Appl. No. 15/275,298, 5 pages.
Office Action, dated Jul. 31, 2019, received in U.S. Appl. No. 16/361,109, 13 pages.
Notice of Allowance, dated Dec. 18, 2019, received in U.S. Appl. No. 16/361,109, 5 pages.
Notice of Allowance, dated Apr. 21, 2020, received in U.S. Appl. No. 16/361,109, 5 pages.
Office Action, dated Sep. 9, 2022, received in Australian Patent Application No. 2021254570, which corresponds with U.S. Appl. No. 16/361,109, 2 pages.
Notice of Allowance, dated Dec. 14, 2022, received in Australian Patent Application No. 2021254570, which corresponds with U.S. Appl. No. 16/361,109, 3 pages.
Patent, dated Apr. 27, 2023, received in Australian Patent Application No. 2021254570, which corresponds with U.S. Appl. No. 16/361,109, 4 pages.
Patent, dated May 20, 2020, received in Korean Patent Application No. 2115714, which corresponds with U.S. Appl. No. 16/361,109, 4 pages.
Notice of Allowance, dated Aug. 4, 2020, received in Korean Patent Application No. 2020-7014317, which corresponds with U.S. Appl. No. 16/361,109, 5 pages.
Patent, dated Oct. 8, 2020, received in Korean Patent Application No. 2020-7014317, which corresponds with U.S. Appl. No. 16/361,109, 7 pages.
Office Action, dated Aug. 13, 2019, received in U.S. Appl. No. 16/361,122, 13 pages.
Notice of Allowance, dated Dec. 5, 2019, received in U.S. Appl. No. 16/361,122, 9 pages.
Office Action, dated Sep. 8, 2023, received in Korean Patent Application No. 2023-7001774, which corresponds with U.S. Appl. No. 16/361,122, 8 pages.
Office Action, dated Oct. 1, 2021, received in U.S. Appl. No. 16/862,427, 14 pages.
Notice of Allowance, dated Apr. 26, 2022, received in U.S. Appl. No. 16/862,427, 9 pages.
Notice of Allowance, dated Oct. 6, 2023, received in Japanese Patent Application No. 2022-121971, 1 page.
Patent, dated Oct. 31, 2023, received in Japanese Patent Application No. 2022-121971, 3 pages.
Notice of Allowance, dated Oct. 1, 2021, received in U.S. Appl. No. 16/835,096, 9 pages.
Notice of Allowance, dated Dec. 27, 2021, received in U.S. Appl. No. 17/086,248, 9 pages.
Office Action, dated Oct. 31, 2022, received in U.S. Appl. No. 17/705,186, 14 pages.
Final Office Action, dated Jan. 31, 2023, received in U.S. Appl. No. 17/705,186, 15 pages.

(56) References Cited

OTHER PUBLICATIONS

Office Action, dated Aug. 9, 2023, received in U.S. Appl. No. 17/705,186, 14 pages.
Office Action, dated Feb. 17, 2023, received in U.S. Appl. No. 17/863,189, 6 pages.
Notice of Allowance, dated Jun. 28, 2023, received in U.S. Appl. No. 17/863,189, 5 pages.
Notice of Allowance, dated Jan. 4, 2024, received in U.S. Appl. No. 17/863,189, 5 pages.
Notice of Allowance, dated Oct. 25, 2023, received in U.S. Appl. No. 17/863,189, 3 pages.
Extended European Search Report, dated Jul. 9, 2021, received in European Patent Application No. 21164867.0, which corresponds with U.S. Appl. No. 15/113,779, 26 pages.
International Search Report and Written Opinion, dated Apr. 8, 2015, received in International Patent Application No. PCT/US2015/012694, which corresponds with U.S. Appl. No. 15/113,779, 14 pages.
International Preliminary Report on Patentability, dated Jul. 26, 2016, received in International Patent Application No. PCT/US2015/012694, which corresponds with U.S. Appl. No. 15/113,779, 9 pages.
Extended European Search Report, dated Dec. 7, 2016, received in European U.S. Appl. No. 15/113,779, which corresponds with U.S. Appl. No. 15/113,779, 10 pages.
Extended European Search Report, dated Jul. 24, 2020, received in European U.S. Appl. No. 15/655,707, which corresponds with U.S. Appl. No. 15/655,707, 9 pages.
International Search Report and Written Opinion, dated Jan. 2, 2018, received in International Patent Application No. PCT/US2017/041959, which corresponds with U.S. Appl. No. 15/655,707, 15 pages.
International Preliminary Report on Patentability, dated Jan. 29, 2019, received in International Application No. PCT/US2017/041959, which corresponds with U.S. Appl. No. 15/655,707, 9 pages.
Sato, "Farewell on Google Android's Menu Button", Itmedia News, https://www.itmedia.co.jp/news/articles/1201/27/news 059.html, Jan. 27, 2012, 4 pages.
Office Action, dated Apr. 7, 2024, received in Japanese Patent Application No. 2021-110169, which corresponds with U.S. Appl. No. 15/113,779, 3 pages.
Final Office Action, dated Apr. 1, 2024, received in U.S. Appl. No. 17/705,186, 17 pages.
Office Action, dated Jun. 17, 2024, received in Japanese Patent Application No. 2023-095728, which corresponds with U.S. Appl. No. 15/113,779, 6 pages.
Office Action, dated Apr. 5, 2024, received in European Patent Application No. 21164867.0, which corresponds with U.S. Appl. No. 15/113,779, 5 pages.
Office Action, dated May 16, 2024, received in Chinese Patent Application No. 202110182280.2, which corresponds with U.S. Appl. No. 15/655,707, 3 pages.
Grant Decision, dated Jul. 18, 2024, received in European Patent Application No. 20168044.4, which corresponds with U.S. Appl. No. 15/655,707, 3 pages.
Office Action, dated May 31, 2024, received in Chinese Patent Application No. 202110181990.3, which corresponds with U.S. Appl. No. 16/361,109, 1 page.
Office Action, dated Jun. 14, 2024, received in Australian Patent Application No. 2023251543, which corresponds with U.S. Appl. No. 16/361,122, 2 pages.
Office Action, dated Jul. 8, 2024, received in Chinese Patent Application No. 202110181406.4, which corresponds with U.S. Appl. No. 16/361,122, 1 Page.
Notice of Allowance, dated Aug. 13, 2024, received in Japanese Patent Application No. 2021-110169, which corresponds with U.S. Appl. No. 15/113,779, 2 pages.
Office Action, dated Sep. 13, 2024, received in Chinese U.S. Appl. No. 15/655,707.2, which corresponds with U.S. Appl. No. 15/655,707, 8 pages.
Notice of Allowance, dated Nov. 12, 2024, received in Chinese U.S. Appl. No. 15/655,707.2, which corresponds with U.S. Appl. No. 15/655,707, 2 pages.
Office Action, dated Oct. 4, 2024, received in Japanese Patent Application No. 2023-184930, which corresponds with U.S. Appl. No. 17/863,189, 2 pages.
Extended European Search Report, dated Oct. 10, 2024, received in European Patent Application No. 24183896.0, 10 pages.
Patent, dated Jan. 21, 2025, received in Chinese Patent Application No. 202110182280.2, which corresponds with U.S. Appl. No. 15/655,707, 5 pages.
Notice of Allowance, dated Jan. 10, 2025, received in Japanese Patent Application No. 2023-184930, which corresponds with U.S. Appl. No. 17/863,189, 2 pages.

* cited by examiner

104

104

104

104

104

104

104

104

104

104

104

104

104

104

104

104

104

104

104

104

104

104

104

104

104

104

104

104

Figure 44D:
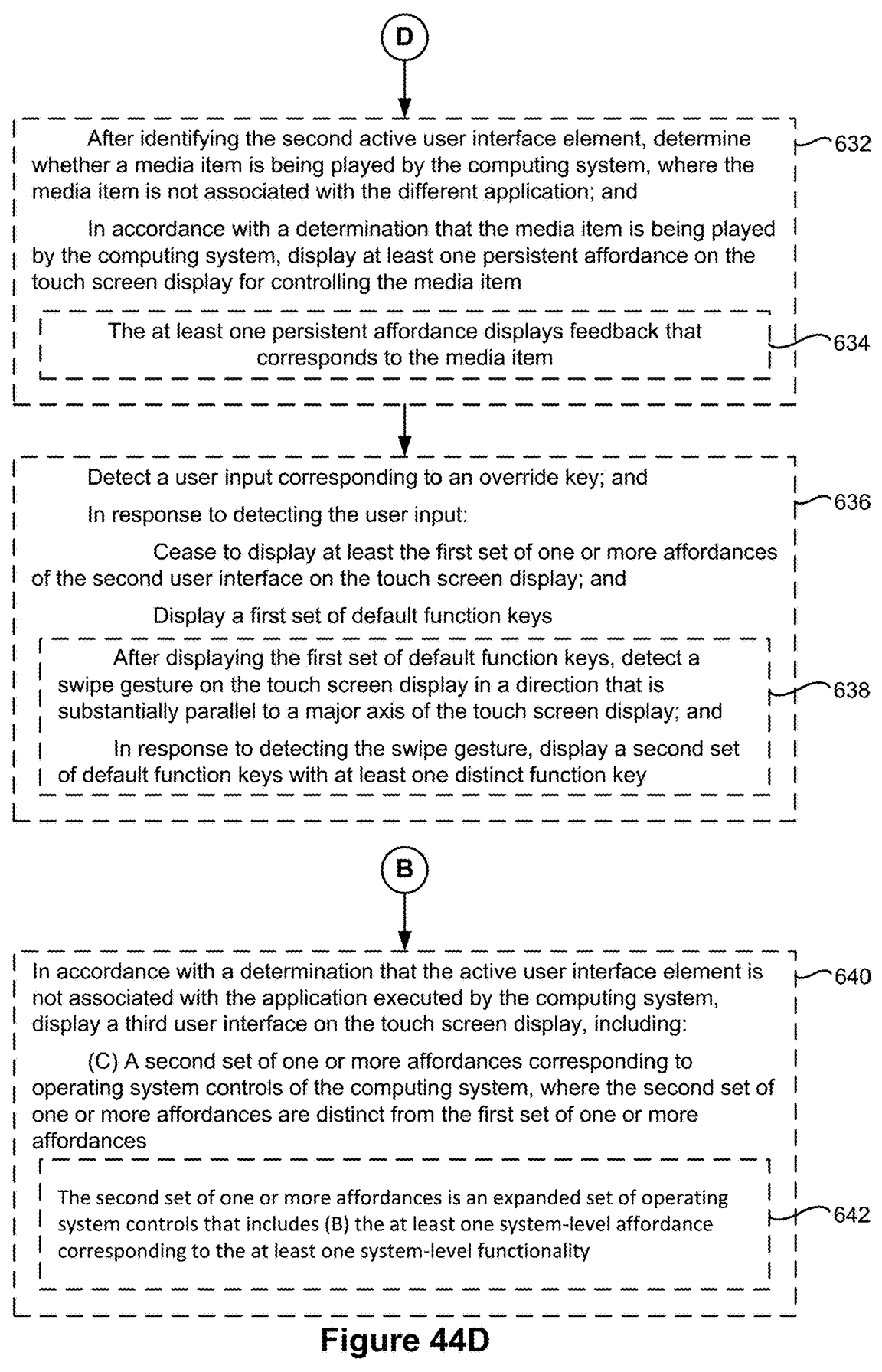

D

After identifying the second active user interface element, determine whether a media item is being played by the computing system, where the media item is not associated with the different application; and In accordance with a determination that the media item is being played by the computing system, display at least one persistent affordance on the touch screen display for controlling the media item

632

The at least one persistent affordance displays feedback that corresponds to the media item

634

Detect a user input corresponding to an override key; and

In response to detecting the user input:

Cease to display at least the first set of one or more affordances of the second user interface on the touch screen display; and Display a first set of default function keys

636

After displaying the first set of default function keys, detect a swipe gesture on the touch screen display in a direction that is substantially parallel to a major axis of the touch screen display; and In response to detecting the swipe gesture, display a second set of default function keys with at least one distinct function key

638

B

In accordance with a determination that the active user interface element is not associated with the application executed by the computing system, display a third user interface on the touch screen display, including:

(C) A second set of one or more affordances corresponding to operating system controls of the computing system, where the second set of one or more affordances are distinct from the first set of one or more affordances

640

The second set of one or more affordances is an expanded set of operating system controls that includes (B) the at least one system-level affordance corresponding to the at least one system-level functionality

Figure 45B:
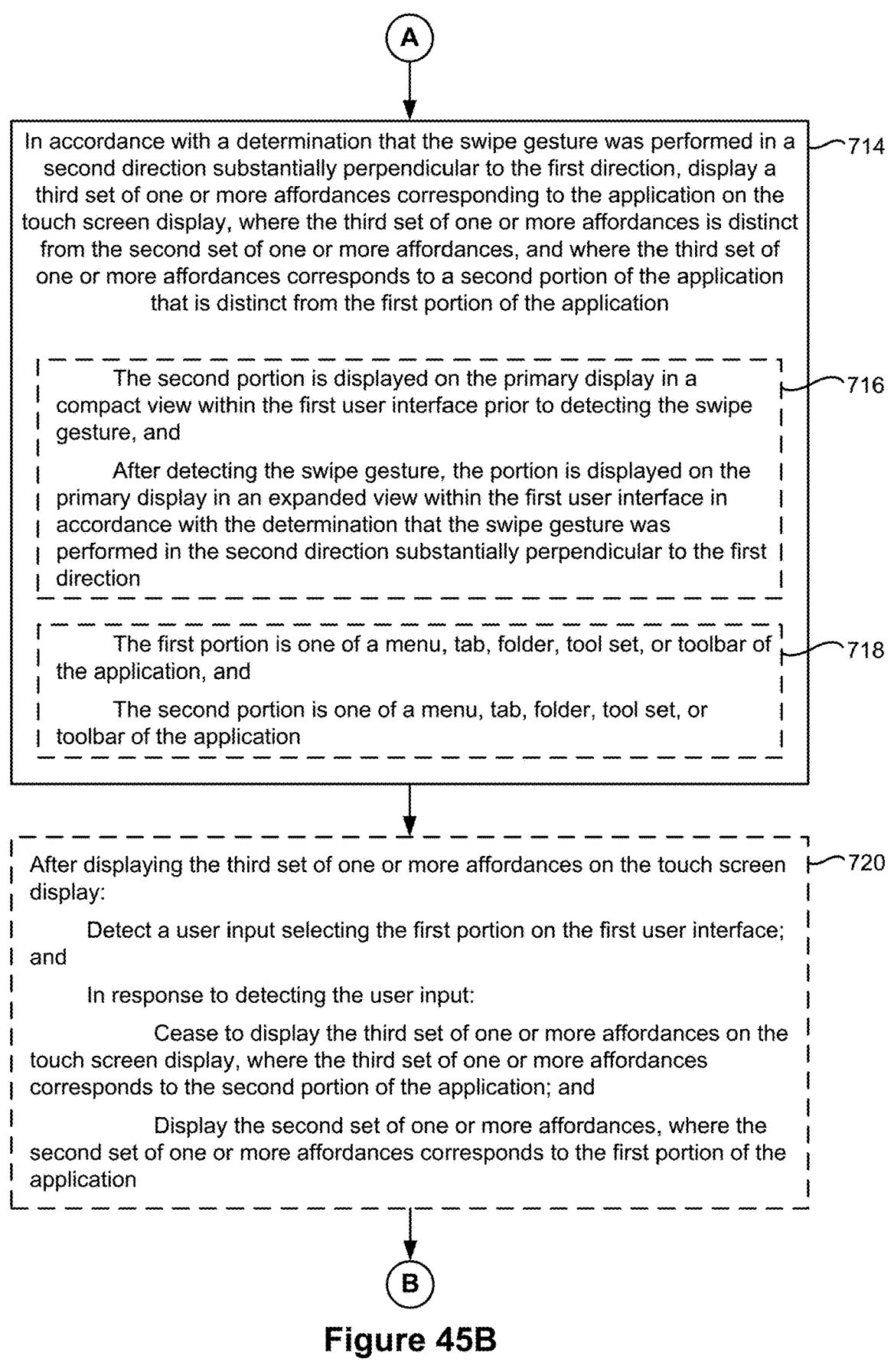

714: In accordance with a determination that the swipe gesture was performed in a second direction substantially perpendicular to the first direction, display a third set of one or more affordances corresponding to the application on the touch screen display, where the third set of one or more affordances is distinct from the second set of one or more affordances, and where the third set of one or more affordances corresponds to a second portion of the application that is distinct from the first portion of the application 716: The second portion is displayed on the primary display in a compact view within the first user interface prior to detecting the swipe gesture, and After detecting the swipe gesture, the portion is displayed on the primary display in an expanded view within the first user interface in accordance with the determination that the swipe gesture was performed in the second direction substantially perpendicular to the first direction 718: The first portion is one of a menu, tab, folder, tool set, or toolbar of the application, and The second portion is one of a menu, tab, folder, tool set, or toolbar of the application 720: After displaying the third set of one or more affordances on the touch screen display:

Detect a user input selecting the first portion on the first user interface; and In response to detecting the user input:

Cease to display the third set of one or more affordances on the touch screen display, where the third set of one or more affordances corresponds to the second portion of the application; and Display the second set of one or more affordances, where the second set of one or more affordances corresponds to the first portion of the application

Figure 45C:
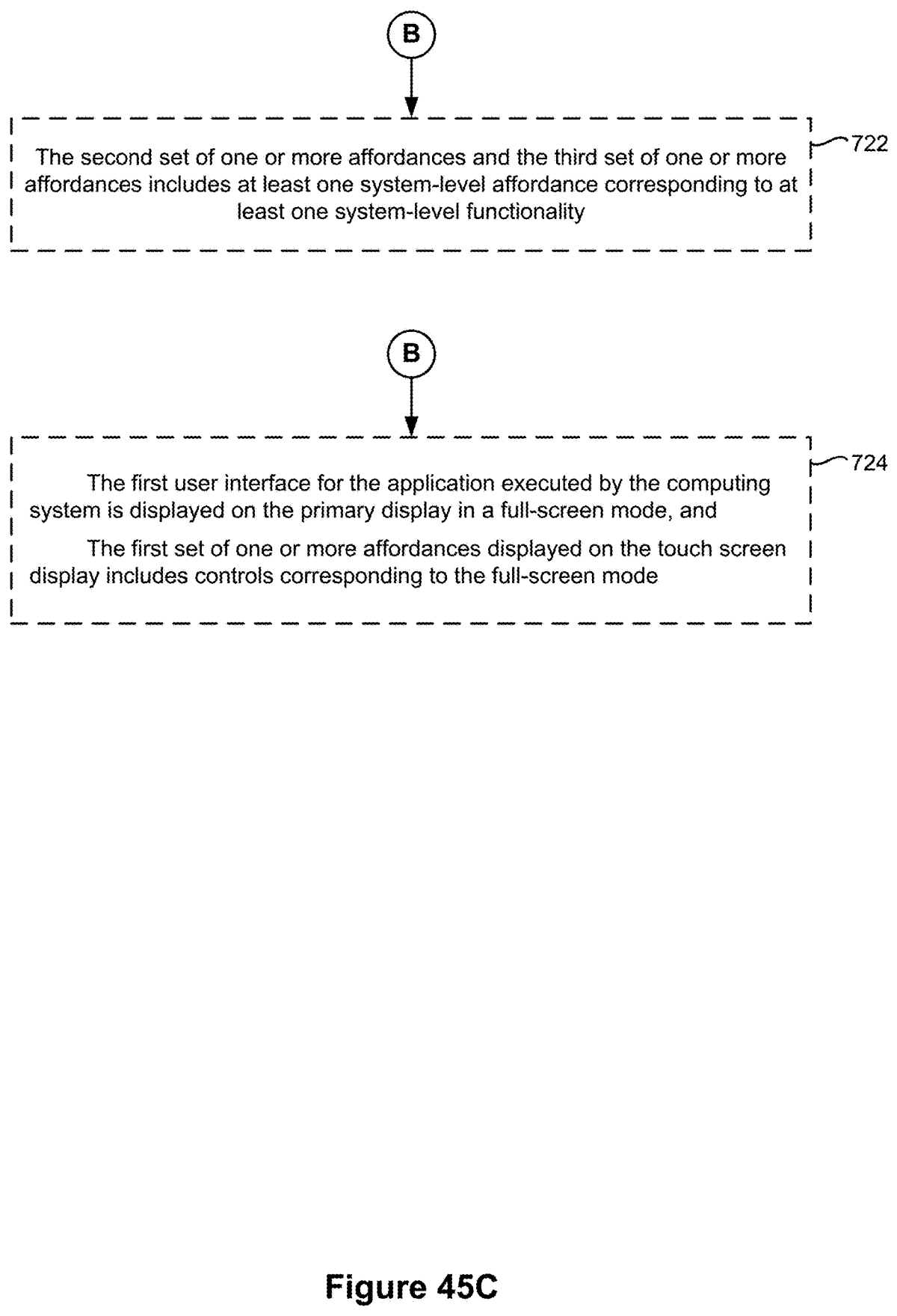

The second set of one or more affordances and the third set of one or more affordances includes at least one system-level affordance corresponding to at least one system-level functionality

722

B

The first user interface for the application executed by the computing system is displayed on the primary display in a full-screen mode, and The first set of one or more affordances displayed on the touch screen display includes controls corresponding to the full-screen mode

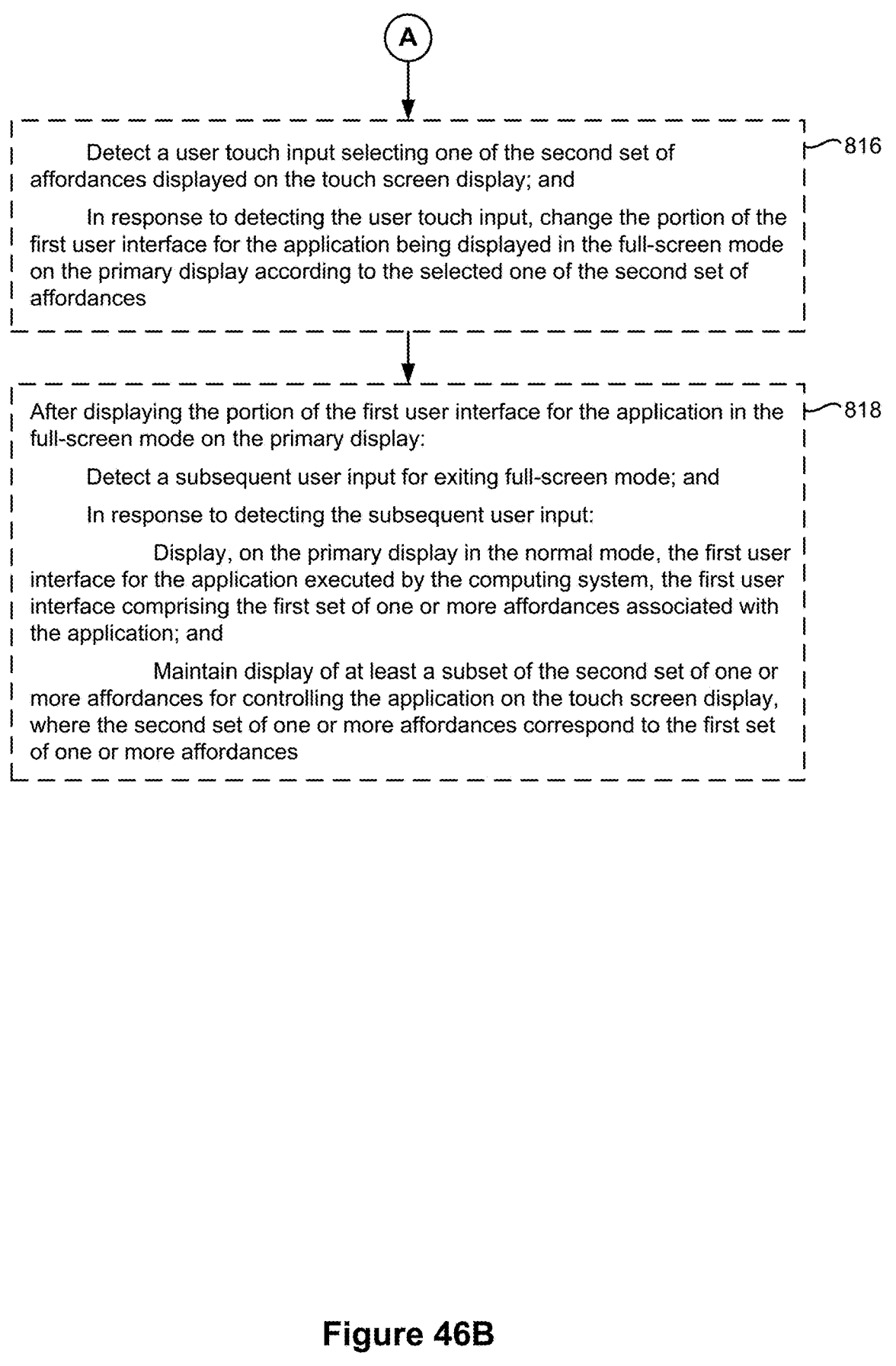

Detect a user touch input selecting one of the second set of affordances displayed on the touch screen display; and In response to detecting the user touch input, change the portion of the first user interface for the application being displayed in the full-screen mode on the primary display according to the selected one of the second set of affordances

818

After displaying the portion of the first user interface for the application in the full-screen mode on the primary display:

Detect a subsequent user input for exiting full-screen mode; and

In response to detecting the subsequent user input:

Display, on the primary display in the normal mode, the first user interface for the application executed by the computing system, the first user interface comprising the first set of one or more affordances associated with the application; and Maintain display of at least a subset of the second set of one or more affordances for controlling the application on the touch screen display, where the second set of one or more affordances correspond to the first set of one or more affordances

Figure 46B

Figure 47B:
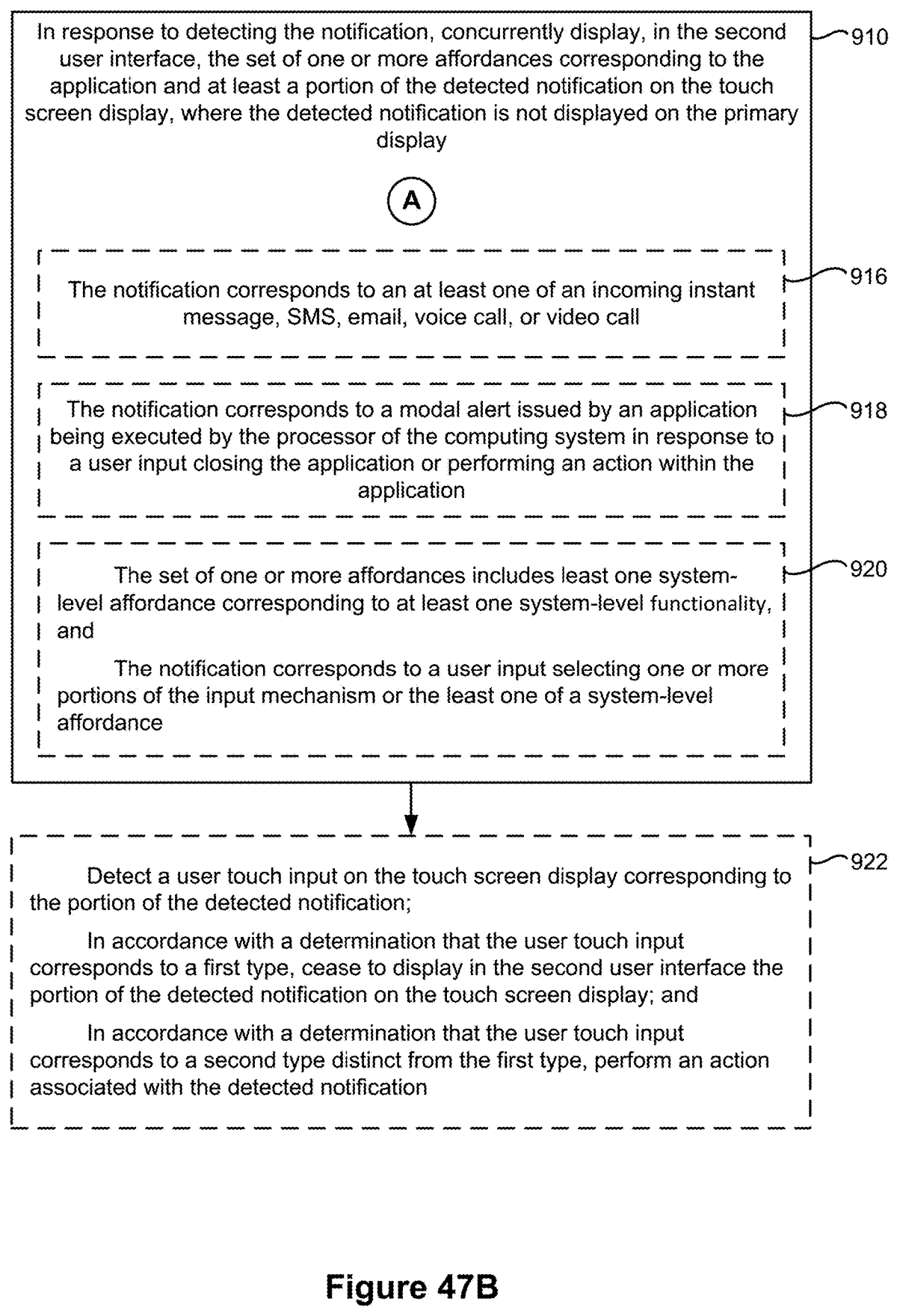

910: In response to detecting the notification, concurrently display, in the second user interface, the set of one or more affordances corresponding to the application and at least a portion of the detected notification on the touch screen display, where the detected notification is not displayed on the primary display (A)

916: The notification corresponds to an at least one of an incoming instant message, SMS, email, voice call, or video call 918: The notification corresponds to a modal alert issued by an application being executed by the processor of the computing system in response to a user input closing the application or performing an action within the application 920: The set of one or more affordances includes least one system-level affordance corresponding to at least one system-level functionality, and The notification corresponds to a user input selecting one or more portions of the input mechanism or the least one of a system-level affordance

↓

922: Detect a user touch input on the touch screen display corresponding to the portion of the detected notification;

In accordance with a determination that the user touch input corresponds to a first type, cease to display in the second user interface the portion of the detected notification on the touch screen display; and In accordance with a determination that the user touch input corresponds to a second type distinct from the first type, perform an action associated with the detected notification

Figure 48A:
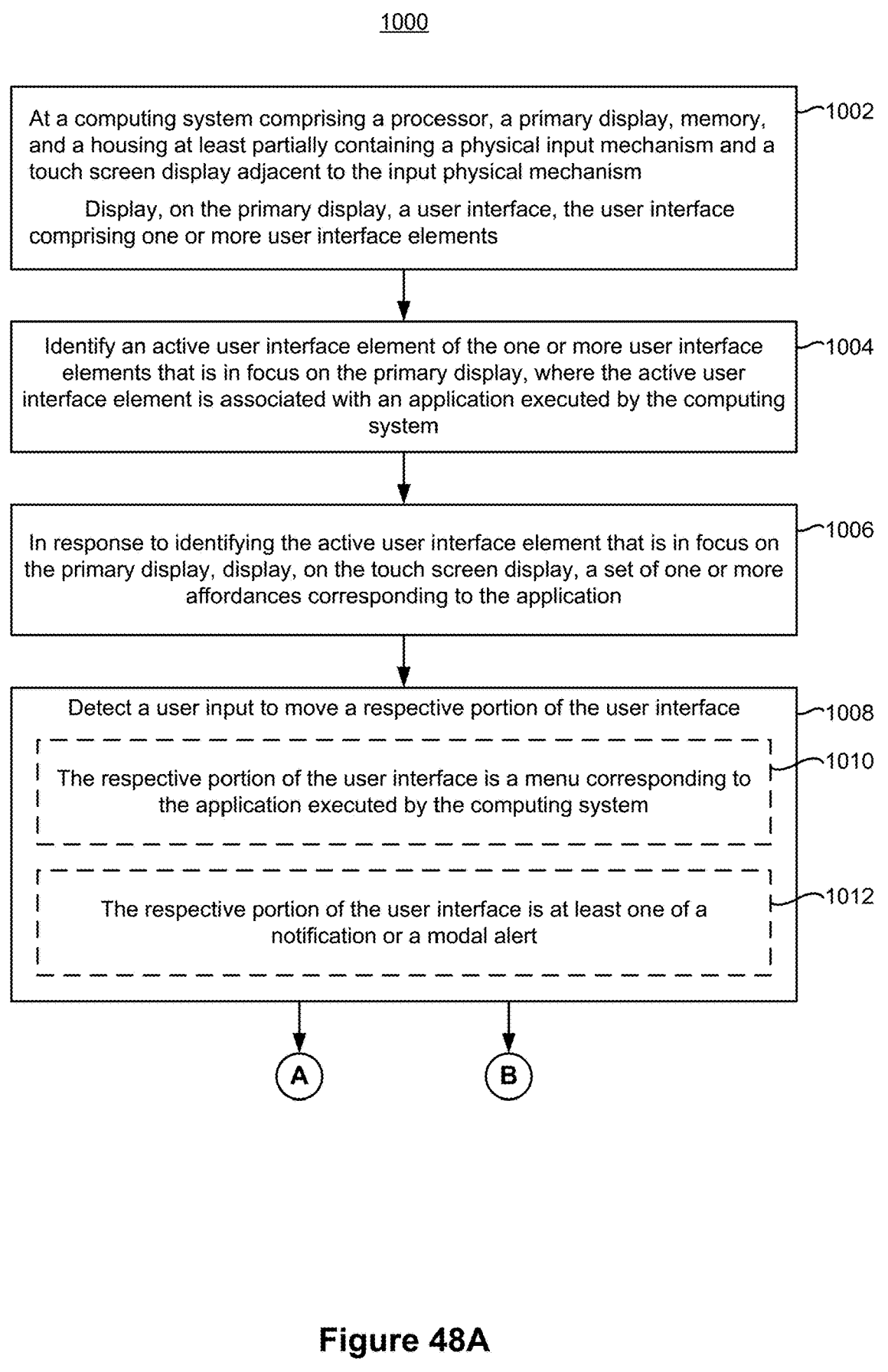

1002: At a computing system comprising a processor, a primary display, memory, and a housing at least partially containing a physical input mechanism and a touch screen display adjacent to the input physical mechanism Display, on the primary display, a user interface, the user interface comprising one or more user interface elements

↓

1004: Identify an active user interface element of the one or more user interface elements that is in focus on the primary display, where the active user interface element is associated with an application executed by the computing system

↓

1006: In response to identifying the active user interface element that is in focus on the primary display, display, on the touch screen display, a set of one or more affordances corresponding to the application

↓

1008: Detect a user input to move a respective portion of the user interface

1010: The respective portion of the user interface is a menu corresponding to the application executed by the computing system 1012: The respective portion of the user interface is at least one of a notification or a modal alert

Figure 48B:
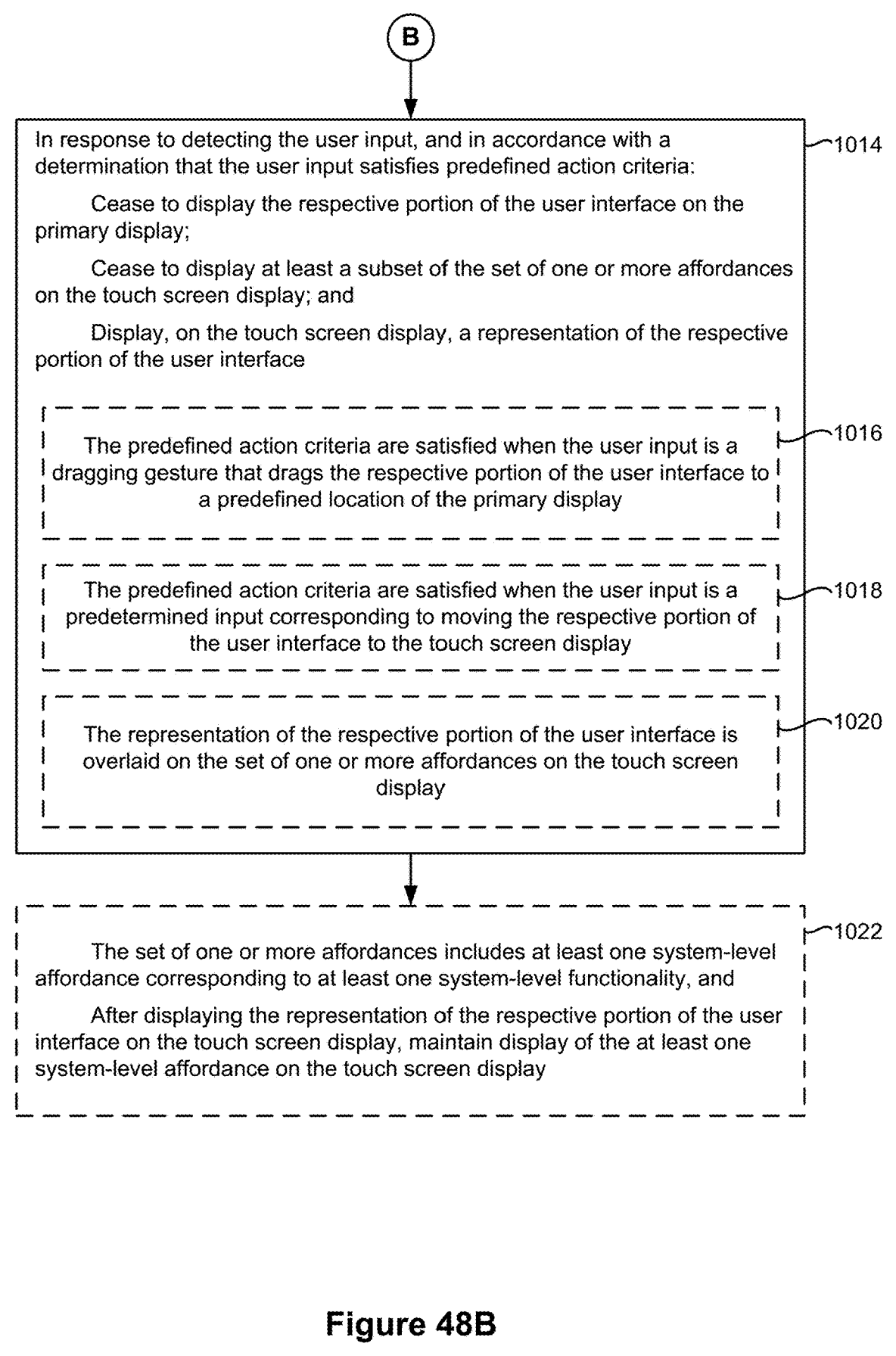

In response to detecting the user input, and in accordance with a determination that the user input satisfies predefined action criteria:

Cease to display the respective portion of the user interface on the primary display;

Cease to display at least a subset of the set of one or more affordances on the touch screen display; and Display, on the touch screen display, a representation of the respective portion of the user interface

1016

The predefined action criteria are satisfied when the user input is a dragging gesture that drags the respective portion of the user interface to a predefined location of the primary display

1018

The predefined action criteria are satisfied when the user input is a predetermined input corresponding to moving the respective portion of the user interface to the touch screen display

1020

The representation of the respective portion of the user interface is overlaid on the set of one or more affordances on the touch screen display

1022

The set of one or more affordances includes at least one system-level affordance corresponding to at least one system-level functionality, and After displaying the representation of the respective portion of the user interface on the touch screen display, maintain display of the at least one system-level affordance on the touch screen display

Figure 48C:
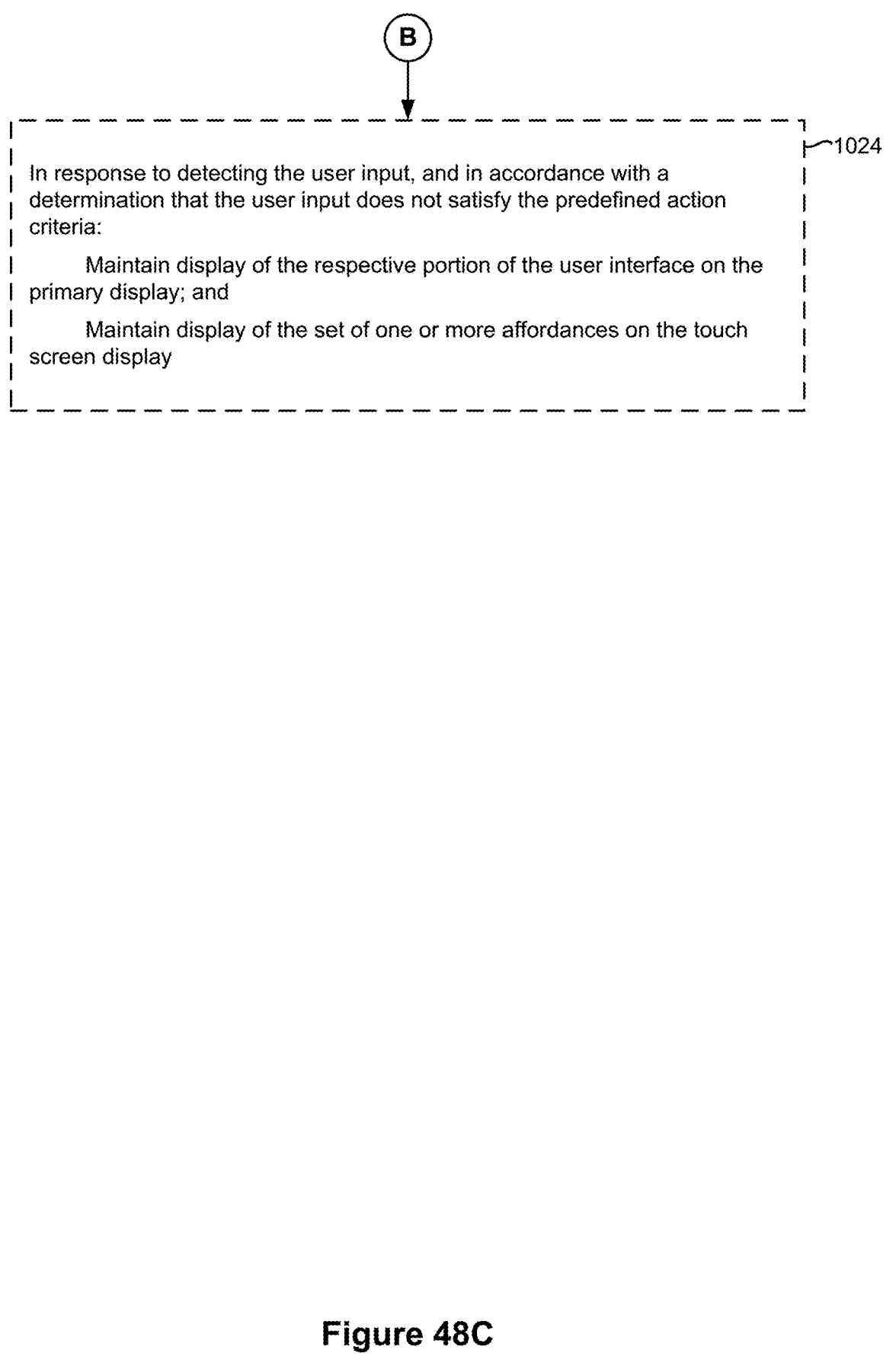

In response to detecting the user input, and in accordance with a determination that the user input does not satisfy the predefined action criteria:

Maintain display of the respective portion of the user interface on the primary display; and Maintain display of the set of one or more affordances on the touch screen display

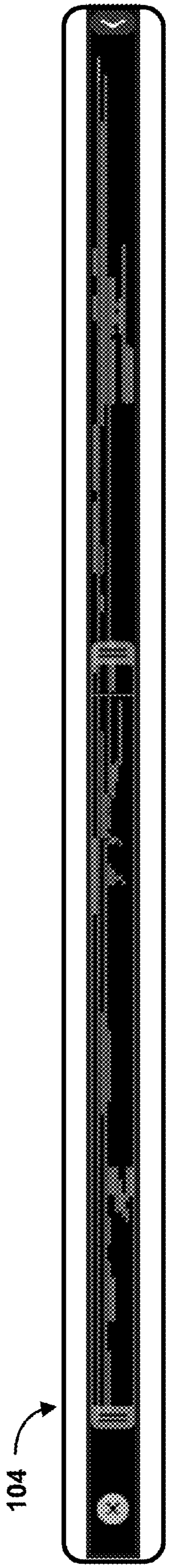
Figure 71C
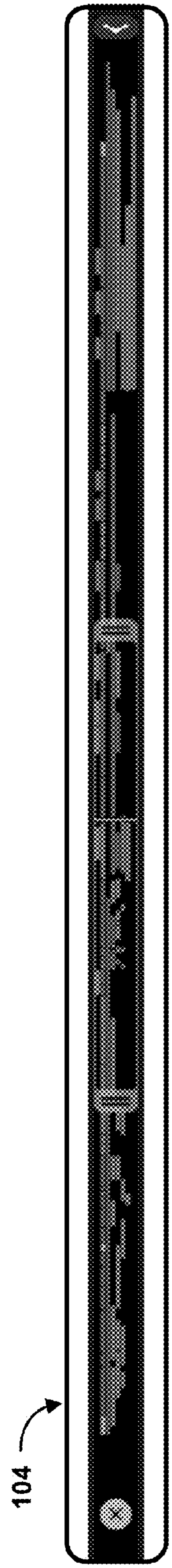
Figure 71D1

SYSTEMS AND METHODS FOR PROMPTING A LOG-IN TO AN ELECTRONIC DEVICE BASED ON BIOMETRIC INFORMATION RECEIVED FROM A USER

RELATED APPLICATIONS

This application is a continuation of U.S. application Ser. No. 17/863,189, filed Jul. 12, 2022, which is a continuation of U.S. application Ser. No. 16/862,427, filed Apr. 29, 2020, now U.S. Pat. No. 11,429,145, which is a continuation of U.S. patent application Ser. No. 16/361,122, filed Mar. 21, 2019, now U.S. Pat. No. 10,642,416, which is a continuation of U.S. patent application Ser. No. 15/655,707, filed Jul. 20, 2017, now U.S. Pat. No. 10,303,289, which claims priority to U.S. Provisional Application Ser. No. 62/412,792, filed Oct. 25, 2016, and U.S. Provisional Application Ser. No. 62/368,988, filed Jul. 29, 2016. U.S. patent application Ser. No. 16/361,122, filed Mar. 21, 2019, is also a continuation-in-part of U.S. patent application Ser. No. 15/275,298, filed Sep. 23, 2016, now U.S. Pat. No. 10,754,603, which claims priority to U.S. Provisional Application Ser. No. 62/368,988, filed Jul. 29, 2016, and which is a continuation-in-part of U.S. patent application Ser. No. 15/113,779, filed Jul. 22, 2016, now U.S. Pat. No. 10,606,539, which is a national phase entry of PCT/US2015/012694, filed Jan. 23, 2015, which claims priority to U.S. Provisional Application Ser. No. 62/104,023, filed Jan. 15, 2015, and to U.S. Provisional Application Ser. No. 61/930,663, filed Jan. 23, 2014. Each of these applications is hereby incorporated by reference in its respective entirety.

TECHNICAL FIELD

The disclosed embodiments relate to keyboards and, more specifically, to improved techniques for receiving input via a dynamic input and output (I/O) device.

BACKGROUND

Conventional keyboards include any number of physical keys for inputting information (e.g., characters) into the computing device. Typically, the user presses or otherwise movably actuates a key to provide input corresponding to the key. In addition to providing inputs for characters, a keyboard may include movably actuated keys related to function inputs. For example, a keyboard may include an "escape" or "esc" key to allow a user to activate an escape or exit function. In many keyboards, a set of functions keys for function inputs are located in a "function row." Typically, a set of keys for alphanumeric characters is located in a part of the keyboard that is closest to the user and a function row is located is a part of the keyboard that is further away from the user but adjacent to the alphanumeric characters. A keyboard may also include function keys that are not part of the aforementioned function row.

With the advent and popularity of portable computing devices, such as laptop computers, the area consumed by the dedicated keyboard may be limited by the corresponding size of a display. Compared with a peripheral keyboard for a desktop computer, a dedicated keyboard that is a component of a portable computing device may have fewer keys, smaller keys, or keys that are closer together to allow for a smaller overall size of the portable computing device.

Conventional dedicated keyboards are static and fixed in time regardless of the changes on a display. Furthermore, the functions of a software application displayed on a screen are typically accessed via toolbars and menus that a user interacts with by using a mouse. This periodically requires the user to switch modes and move the location of his/her hands between keyboard and mouse. Alternatively, the application's functions are accessed via complicated key combinations that require memory and practice. As such, it is desirable to provide an I/O device (and method for the I/O device) that addresses the shortcomings of conventional systems.

SUMMARY

The embodiments described herein address the above shortcomings by providing dynamic and space efficient I/O devices and methods. Such devices and methods optionally complement or replace conventional input devices and methods. Such devices and methods also reduce the amount of mode switching (e.g., moving one's hands between keyboard and mouse, and also moving one's eyes from keyboard to display) required of a user and thereby reduce the number of inputs required to activate a desired function (e.g., number of inputs required to select menu options is reduced, as explained in more detail below). Such devices and methods also make more information available on a limited screen (e.g., a touch-sensitive secondary display is used to provide more information to a user and this information is efficiently presented using limited screen space). Such devices and methods also provide improved man-machine interfaces, e.g., by providing emphasizing effects to make information more discernable on the touch-sensitive secondary display 104, by providing sustained interactions so that successive inputs from a user directed to either a touch-sensitive secondary display or a primary display cause the device to provide outputs which are then used to facilitate further inputs from the user (e.g., a color picker is provided that allows users to quickly preview how information will be rendered on a primary display, by providing inputs at the touch-sensitive secondary display, as discussed below), and by requiring fewer interactions from users to achieve desired results (e.g., allowing users to login to their devices using a single biometric input, as discussed below). For these reasons and those discussed below, the devices and methods described herein reduce power usage and improve battery life of electronic devices.

(A1) In accordance with some embodiments, a method is performed at a computing system (e.g., computing system 100 or system 200, FIGS. 1A-2D) that includes one or more processors, memory, a first housing that includes a primary display (e.g., housing 110 that includes the display 102 or housing 204 that includes display 102), and a second housing at least partially containing a physical keyboard (e.g., keyboard 106, FIG. 1A) and a touch-sensitive secondary display (e.g., dynamic function row 104, FIG. 1A, also referred to as "touch screen display"). In some embodiments, the touch-sensitive secondary display is separate from the physical keyboard (e.g., the touch-sensitive secondary display is included as part of a peripheral input mechanism 222 (i.e., a standalone display) or the touch-sensitive display is integrated with another device, such as touchpad 108, FIG. 2C). The method includes: displaying a first user interface on the primary display, the first user interface comprising one or more user interface elements; identifying an active user interface element among the one or more user interface elements that is in focus on the primary display; determining whether the active user interface element that is in focus on the primary display is associated with an application executed by the computing system; and, in accordance with a determination that the active user interface element that is in focus on the primary display is associated with the application executed by the computing system, displaying a second user interface on the touch screen display, including: (A) a first set of one or more affordances corresponding to the application; and (B) at least one system-level affordance corresponding to at least one system-level functionality.

Displaying application-specific and system-level affordances in a touch-sensitive secondary display in response to changes in focus made on a primary display provides the user with accessible affordances that are directly available via the touch-sensitive secondary display. Providing the user with accessible affordances that are directly accessibly via the touch-sensitive secondary display enhances the operability of the computing system and makes the user-device interface more efficient (e.g., by helping the user to access needed functions directly through the touch-sensitive secondary display with fewer interactions and without having to waste time digging through hierarchical menus to locate the needed functions) which, additionally, reduces power usage and improves battery life of the device by enabling the user to access the needed functions more quickly and efficiently. As well, the display of application-specific affordances on the touch-sensitive secondary display indicates an internal state of the device by providing affordances associated with the application currently in focus on the primary display.

(A2) In some embodiments of the method of A1, the computing system further comprises: (i) a primary computing device comprising the primary display, the processor, the memory, and primary computing device communication circuitry; and (ii) an input device comprising the housing, the touch screen display, the physical input mechanism, and input device communication circuitry for communicating with the primary computing device communication circuitry, wherein the input device is distinct and separate from the primary computing device.

(A3) In some embodiments of the method of any one of A1-A2, the physical input mechanism comprises a plurality of physical keys.

(A4) In some embodiments of the method of any one of A1-A3, the physical input mechanism comprises a touchpad.

(A5) In some embodiments of the method of any one of A1-A4, the application is executed by the processor in the foreground of the first user interface.

(A6) In some embodiments of the method of any one of A1-A5, the least one system-level affordance is configured upon selection to cause display of a plurality of system-level affordances corresponding to system-level functionalities on the touch screen display.

(A7) In some embodiments of the method of any one of A1-A3, the least one system-level affordance corresponds to one of a power control or escape control.

(A8) In some embodiments of the method of any one of A1-A7, at least one of the affordances displayed on the second user interface is a multi-function affordance.

(A9) In some embodiments of the method of A8, the method further includes: detecting a user touch input selecting the multi-function affordance; in accordance with a determination that the user touch input corresponds to a first type, performing a first function associated with the multi-function affordance; and, in accordance with a determination that the user touch input corresponds to a second type distinct from the first type, performing a second function associated with the multi-function affordance.

(A10) In some embodiments of the method of any one of A1-A9, the method further includes, in accordance with a determination that the active user interface element is not associated with the application executed by the computing system, displaying a third user interface on the touch screen display, including: (C) a second set of one or more affordances corresponding to operating system controls of the computing system, wherein the second set of one or more affordances are distinct from the first set of one or more affordances.

(A11) In some embodiments of the method of A10, the second set of one or more affordances is an expanded set of operating system controls that includes (B) the at least one system-level affordance corresponding to the at least one system-level functionality.

(A12) In some embodiments of the method of any one of A1-A11, the method further includes: detecting a user touch input selecting one of the first set of affordances; and, in response to detecting the user touch input: displaying a different set of affordances corresponding to functionalities of the application; and maintaining display of the at least one system-level affordance.

(A13) In some embodiments of the method of A12, the method further includes: detecting a subsequent user touch input selecting the at least one system-level affordance; and, in response to detecting the subsequent user touch input, displaying a plurality of system-level affordances corresponding to system-level functionalities and at least one application-level affordance corresponding to the application.

(A14) In some embodiments of the method of any one of A1-A13, the method further includes: after displaying the second user interface on the touch screen display, identifying a second active user interface element among the one or more user interface elements that is in focus on the primary display; determining whether the second active user interface element corresponds to a different application executed by the computing device; and, in accordance with a determination that the second active user interface element corresponds to the different application, displaying a fourth user interface on the touch screen display, including: (D) a third set of one or more affordances corresponding to the different application; and (E) the at least one system-level affordance corresponding to the at least one system-level functionality.

(A15) In some embodiments of the method of any one of A1-A14, the method further includes: after identifying the second active user interface element, determining whether a media item is being played by the computing system, wherein the media item is not associated with the different application; and, in accordance with a determination that media item is being played by the computing system, displaying at least one persistent affordance on the touch screen display for controlling the media item.

(A16) In some embodiments of the method of A15, the at least one persistent affordance displays feedback that corresponds to the media item.

(A17) In some embodiments of the method of any one of A1-A16, the method further includes: detecting a user input corresponding to an override key; and, in response to detecting the user input: ceasing to display at least the first set of one or more affordances of the second user interface on the touch screen display; and displaying a first set of default function keys.

(A18) In some embodiments of the method of A17, the method further includes: after displaying the first set of default function keys, detecting a swipe gesture on the touch screen display in a direction that is substantially parallel to a major axis of the touch screen display; and, in response to detecting the swipe gesture, displaying a second set of default function keys with at least one distinct function key.

(A19) In another aspect, a computing system is provided, the computing system including one or more processors, memory, a first housing that includes a primary display, and a second housing at least partially containing a physical keyboard and a touch-sensitive secondary display. One or more programs are stored in the memory and configured for execution by one or more processors, the one or more programs including instructions for performing or causing performance of any one of the methods of A1-A18.

(A20) In an additional aspect, a non-transitory computer readable storage medium storing one or more programs is provided, the one or more programs including instructions that, when executed by one or more processors of a computing system with memory, a first housing that includes a primary display, and second a housing at least partially containing a physical keyboard and a touch-sensitive secondary display distinct from the primary display, cause the computing system to perform or cause performance of any one of the methods of A1-A18.

(A21) In one more aspect, a graphical user interface on a computing system with one or more processors, memory, a first housing that includes a primary display, a second housing at least partially containing a physical input mechanism and a touch-sensitive secondary display distinct from the primary display, the graphical user interface comprising user interfaces displayed in accordance with any of the methods of claims A1-A18.

(A22) In one other aspect, a computing device is provided. The computing device includes a first housing that includes a primary display, a second housing at least partially containing a physical keyboard and a touch-sensitive secondary display distinct from the primary display, and means for performing or causing performance of any of the methods of claims A1-A18.

(B1) In accordance with some embodiments, an input device is provided. The input device includes: a housing at least partially enclosing a plurality of components, the plurality of components including: (i) a plurality of physical keys (e.g., on keyboard 106, FIG. 1A), wherein the plurality of physical keys at least includes separate keys for each letter of an alphabet; (ii) a touch-sensitive secondary display (also referred to as "touch screen display") disposed adjacent to the plurality of physical keys; and (iii) short-range communication circuitry configured to communicate with a computing device (e.g., computing system 100 or 200) disposed adjacent to the input device, wherein the computing device comprises a computing device display, a processor, and memory, and the short-range communication circuitry is configured to: transmit key presses of any of the plurality of physical keys and touch inputs on the touch screen display to the computing device; and receive instructions for changing display of affordances on the touch screen display based on a current focus on the computing device display. In some embodiments, when an application is in focus on the computing device display the touch screen display is configured to display: (A) one or more affordances corresponding to the application in focus; and (B) at least one system-level affordance, wherein the at least one system-level affordance is configured upon selection to cause display of a plurality of affordances corresponding to system-level functionalities.

Displaying application-specific and system-level affordances in a touch-sensitive secondary display in response to changes in focus made on a primary display provides the user with accessible affordances that are directly available via the touch-sensitive secondary display. Providing the user with accessible affordances that are directly accessibly via the touch-sensitive secondary display enhances the operability of the computing system and makes the user-device interface more efficient (e.g., by helping the user to access needed functions directly through the touch-sensitive secondary display with fewer interactions and without having to waste time digging through hierarchical menus to locate the needed functions) which, additionally, reduces power usage and improves battery life of the device by enabling the user to access the needed functions more quickly and efficiently. Furthermore, by dynamically updating affordances that are displayed in the touch-sensitive secondary display based on changes in focus at the primary display, the touch-sensitive secondary display is able to make more information available on a limited screen, and helps to ensure that users are provided with desired options right when those options are needed (thereby reducing power usage and extending battery life, because users do not need to waste power and battery life searching through hierarchical menus to located these desired options).

(B2) In some embodiments of the input device of B1, when the application is in focus on the computing device display the touch screen display is further configured to display at least to one of a power control affordance and an escape affordance.

(B3) In some embodiments of the input device of any one of B1-B2, the input device is a keyboard.

(B4) In some embodiments of the input device of B3, the computing device is a laptop computer that includes the keyboard.

(B5) In some embodiments of the input device of B3, the computing device is a desktop computer and the keyboard is distinct from the desktop computer.

(B6) In some embodiments of the input device of any one of B1-B5, the input device is integrated in a laptop computer.

(B7) In some embodiments of the input device of any one of B1-B6, the plurality of physical keys comprise a QWERTY keyboard.

(B8) In some embodiments of the input device of any one of B1-B7, the alphabet corresponds to the Latin alphabet.

(B9) In some embodiments of the input device of any one of B1-B8, the input device includes a touchpad.

(B10) In some embodiments of the input device of any one of B1-B9, the input device has a major dimension of at least 18 inches in length.

(B11) In some embodiments of the input device of any one of B1-B10, the short-range communication circuitry is configured to communicate less than 15 feet to the computing device.

(B12) In some embodiments of the input device of any one of B1-B11, the short-range communication circuitry corresponds to a wired or wireless connection to the computing device.

(B13) In some embodiments of the input device of any one of B1-B12, the input device includes a fingerprint sensor embedded in the touch screen display.

(C1) In accordance with some embodiments, a method is performed at a computing system (e.g., system 100 or system 200, FIGS. 1A-2D) that includes one or more processors, memory, a first housing that includes a primary display (e.g., housing 110 that includes the display 102 or housing 204 that includes display 102), and a second housing at least partially containing a physical keyboard (e.g., keyboard 106, FIG. 1A) and a touch-sensitive secondary display (e.g., dynamic function row 104, FIG. 1A, also referred to as "touch screen display"). In some embodiments, the touch-sensitive secondary display is separate from the physical keyboard (e.g., the touch-sensitive secondary display is a standalone display 222 or the touch-sensitive display is integrated with another device, such as touchpad 108, FIG. 2C). The method includes: displaying, on the primary display, a first user interface for an application executed by the computing system; displaying a second user interface on the touch screen display, the second user interface comprising a first set of one or more affordances corresponding to the application, wherein the first set of one or more affordances corresponds to a first portion of the application; detecting a swipe gesture on the touch screen display; in accordance with a determination that the swipe gesture was performed in a first direction, displaying a second set of one or more affordances corresponding to the application on the touch screen display, wherein at least one affordance in the second set of one or more affordances is distinct from the first set of one or more affordances, and wherein the second set of one or more affordances also corresponds to the first portion of the application; and, in accordance with a determination that the swipe gesture was performed in a second direction substantially perpendicular to the first direction, displaying a third set of one or more affordances corresponding to the application on the touch screen display, wherein the third set of one or more affordances is distinct from the second set of one or more affordances, and wherein the third set of one or more affordances corresponds to a second portion of the application that is distinct from the first portion of the application.

Allowing a user to quickly navigate through application-specific affordances in a touch-sensitive secondary display in response to swipe gestures provides the user with a convenient way to scroll through and quickly locate a desired function via the touch-sensitive secondary display. Providing the user with a convenient way to scroll through and quickly locate a desired function via the touch-sensitive secondary display enhances the operability of the computing system and makes the user-device interface more efficient (e.g., by helping the user to access needed functions directly through the touch-sensitive secondary display with fewer interactions and without having to waste time digging through hierarchical menus to locate the needed functions) which, additionally, reduces power usage and improves battery life of the device by enabling the user to access the needed functions more quickly and efficiently. Furthermore, by dynamically updating affordances that are displayed in the touch-sensitive secondary display in response to swipe gestures at the secondary display, the secondary display is able to make more information available on a limited screen, and helps to ensure that users are provided with desired options right when those options are needed (thereby reducing power usage and extending battery life, because users do not need to waste power and battery life searching through hierarchical menus to located these desired options).

(C2) In some embodiments of the method of C1, the second portion is displayed on the primary display in a compact view within the first user interface prior to detecting the swipe gesture, and the method includes: displaying the second portion on the primary display in an expanded view within the first user interface in accordance with the determination that the swipe gesture was performed in the second direction substantially perpendicular to the first direction.

(C3) In some embodiments of the method of C1, the first user interface for the application executed by the computing system is displayed on the primary display in a full-screen mode, and the first set of one or more affordances displayed on the touch screen display includes controls corresponding to the full-screen mode.

(C4) In some embodiments of the method of any one of C1-C3, the second set of one or more affordances and the third set of one or more affordances includes at least one system-level affordance corresponding to at least one system-level functionality.

(C5) In some embodiments of the method of any one of C1-C4, the method includes: after displaying the third set of one or more affordances on the touch screen display: detecting a user input selecting the first portion on the first user interface; and, in response to detecting the user input: ceasing to display the third set of one or more affordances on the touch screen display, wherein the third set of one or more affordances corresponds to the second portion of the application; and displaying the second set of one or more affordances, wherein the second set of one or more affordances corresponds to the first portion of the application.

(C6) In some embodiments of the method of any one of C1-C5, the first direction is substantially parallel to a major dimension of the touch screen display.

(C7) In some embodiments of the method of any one of C1-C5, the first direction is substantially perpendicular to a major dimension of the touch screen display.

(C8) In some embodiments of the method of any one of C1-C7, the first portion is one of a menu, tab, folder, tool set, or toolbar of the application, and the second portion is one of a menu, tab, folder, tool set, or toolbar of the application.

(C9) In another aspect, a computing system is provided, the computing system including one or more processors, memory, a first housing that includes a primary display, and a second housing at least partially containing a physical keyboard and a touch-sensitive secondary display. One or more programs are stored in the memory and configured for execution by one or more processors, the one or more programs including instructions for performing or causing performance of any one of the methods of C1-C8.

(C10) In an additional aspect, a non-transitory computer readable storage medium storing one or more programs is provided, the one or more programs including instructions that, when executed by one or more processors of a computing system with memory, a first housing that includes a primary display, and second a housing at least partially containing a physical keyboard and a touch-sensitive secondary display distinct from the primary display, cause the computing system to perform or cause performance of any one of the methods of C1-C8.

(C11) In one more aspect, a graphical user interface on a computing system with one or more processors, memory, a first housing that includes a primary display, a second housing at least partially containing a physical input mechanism and a touch-sensitive secondary display distinct from the primary display, the graphical user interface comprising user interfaces displayed in accordance with any of the methods of claims C1-C8.

(C12) In one other aspect, a computing device is provided. The computing device includes a first housing that includes a primary display, a second housing at least partially containing a physical keyboard and a touch-sensitive secondary display distinct from the primary display, and means for performing or causing performance of any of the methods of claims C1-C8.

(D1) In accordance with some embodiments, a method of maintaining functionality of an application while in full-screen mode is performed at a computing system (e.g., system 100 or system 200, FIGS. 1A-2D) that includes one or more processors, memory, a first housing that includes a primary display (e.g., housing 110 that includes the display 102 or housing 204 that includes display 102), and a second housing at least partially containing a physical keyboard (e.g., keyboard 106, FIG. 1A) and a touch-sensitive secondary display (e.g., dynamic function row 104, FIG. 1A, also referred to as "touch screen display"). In some embodiments, the touch-sensitive secondary display is separate from the physical keyboard (e.g., the touch-sensitive secondary display is a standalone display 222 or the touch-sensitive display is integrated with another device, such as touchpad 108, FIG. 2C). The method includes: displaying, on the primary display in a normal mode, a first user interface for the application executed by the computing system, the first user interface comprising a first set of one or more affordances associated with the application; detecting a user input for displaying at least a portion of the first user interface for the application in a full-screen mode on the primary display; and, in response to detecting the user input: ceasing to display the first set of one or more affordances associated with the application in the first user interface on the primary display; displaying, on the primary display in the full-screen mode, the portion of the first user interface for the application; and automatically, without human intervention, displaying, on the touch screen display, a second set of one or more affordances for controlling the application, wherein the second set of one or more affordances corresponds to the first set of one or more affordances.

Providing affordances for controlling an application via a touch-sensitive secondary display, while a portion of the application is displayed in a full-screen mode on a primary display, allows users to continue accessing functions that may no longer be directly displayed on a primary display. Allowing users to continue accessing functions that may no longer be directly displayed on a primary display provides the user with a quick and convenient way to access functions that may have become buried on the primary display and thereby enhances the operability of the computing system and makes the user-device interface more efficient (e.g., by helping the user to access needed functions directly through the touch-sensitive secondary display with fewer interactions and without having to waste time digging through hierarchical menus to locate the needed functions) which, additionally, reduces power usage and improves battery life of the device by enabling the user to access the needed functions more quickly and efficiently. Therefore, by shifting menu options from a primary display and to a touch-sensitive secondary display in order to make sure that content may be presented (without obstruction) in the full-screen mode, users are able to sustain interactions with the device and their workflow is not interrupted when shifting to the full-screen mode. Additionally, fewer interactions are required in order to access menu options while viewing full-screen content, as menu options that may have become buried behind content on the primary display is presented on the touch-sensitive secondary display for easy and quick access (and without having to exit full screen mode and then dig around looking for the menu options), thereby reducing power usage and improving battery life for the device.

(D2) In some embodiments of the method of D1, the second set of one or more affordances is the first set of one or more affordances.

(D3) In some embodiments of the method of any one of D1-D2, the second set of one or more affordances include controls corresponding to the full-screen mode.

(D4) In some embodiments of the method of any one of D1-D3, the method includes: detecting a user touch input selecting one of the second set of affordances displayed on the touch screen display; and, in response to detecting the user touch input, changing the portion of the first user interface for the application being displayed in the full-screen mode on the primary display according to the selected one of the second set of affordances.

(D5) In some embodiments of the method of any one of D1-D4, the method includes: after displaying the portion of the first user interface for the application in the full-screen mode on the primary display: detecting a subsequent user input for exiting the full-screen mode; and, in response to detecting the subsequent user input: displaying, on the primary display in the normal mode, the first user interface for the application executed by the computing system, the first user interface comprising the first set of one or more affordances associated with the application; and maintaining display of at least a subset of the second set of one or more affordances for controlling the application on the touch screen display, wherein the second set of one or more affordances correspond to the first set of one or more affordances.

(D6) In some embodiments of the method of any one of D1-D5, the user input for displaying at least the portion of the first user interface for the application in full-screen mode on the primary display is at least one of a touch input detected on the touch screen display and a control selected within the first user interface on the primary display.

(D7) In some embodiments of the method of any one of D1-D6, the second set of one or more affordances includes at least one system-level affordance corresponding to at least one system-level functionality.

(D8) In another aspect, a computing system is provided, the computing system including one or more processors, memory, a first housing that includes a primary display, and a second housing at least partially containing a physical keyboard and a touch-sensitive secondary display. One or more programs are stored in the memory and configured for execution by one or more processors, the one or more programs including instructions for performing or causing performance of any one of the methods of D1-D7.

(D9) In an additional aspect, a non-transitory computer readable storage medium storing one or more programs is provided, the one or more programs including instructions that, when executed by one or more processors of a computing system with memory, a first housing that includes a primary display, and second a housing at least partially containing a physical keyboard and a touch-sensitive secondary display distinct from the primary display, cause the computing system to perform or cause performance of any one of the methods of D1-D7.

(D10) In one more aspect, a graphical user interface on a computing system with one or more processors, memory, a first housing that includes a primary display, a second housing at least partially containing a physical input mechanism and a touch-sensitive secondary display distinct from the primary display, the graphical user interface comprising user interfaces displayed in accordance with any of the methods of claims D1-D7.

(D11) In one other aspect, a computing device is provided. The computing device includes a first housing that includes a primary display, a second housing at least partially containing a physical keyboard and a touch-sensitive secondary display distinct from the primary display, and means for performing or causing performance of any of the methods of claims D1-D7.

(E1) In accordance with some embodiments, a method is performed at a computing system (e.g., system 100 or system 200, FIGS. 1A-2D) that includes one or more processors, memory, a first housing that includes a primary display (e.g., housing 110 that includes the display 102 or housing 204 that includes display 102), and a second housing at least partially containing a physical keyboard (e.g., keyboard 106, FIG. 1A) and a touch-sensitive secondary display (e.g., dynamic function row 104, FIG. 1A, also referred to as "touch screen display"). In some embodiments, the touch-sensitive secondary display is separate from the physical keyboard (e.g., the touch-sensitive secondary display is a standalone display 222 or the touch-sensitive display is integrated with another device, such as touchpad 108, FIG. 2C). The method includes: displaying, on the primary display, a first user interface for an application executed by the computing system; displaying, on the touch screen display, a second user interface, the second user interface comprising a set of one or more affordances corresponding to the application; detecting a notification; and, in response to detecting the notification, concurrently displaying, in the second user interface, the set of one or more affordances corresponding to the application and at least a portion of the detected notification on the touch screen display, wherein the detected notification is not displayed on the primary display.

Displaying received notifications at a touch-sensitive secondary display allows users to continue their work on a primary display in an uninterrupted fashion, and allows them to interact with the received notifications via the touch-sensitive secondary display. Allowing users to continue their work on the primary display in an uninterrupted fashion and allowing users to interact with the received notifications via the touch-sensitive secondary display provides users with a quick and convenient way to review and interact with received notifications and thereby enhances the operability of the computing system and makes the user-device interface more efficient (e.g., by helping the user to conveniently access received notifications directly through the touch-sensitive secondary display and without having to interrupt their workflow to deal with a received notification). Furthermore, displaying receiving notifications at the touch-sensitive secondary display provides an emphasizing effect for received notifications at the touch-sensitive secondary display, as the received notification is, in some embodiments, displayed as overlaying other affordances in the touch-sensitive secondary display, thus ensuring that the received notification is visible and easily accessible at the touch-sensitive secondary display.

(E2) In some embodiments of the method of E1, the method includes: prior to detecting the notification, detecting a user input selecting a notification setting so as to display notifications on the touch screen display and to not display notifications on the primary display.

(E3) In some embodiments of the method of any one of E1-E2, the method includes: detecting a user touch input on the touch screen display corresponding to the portion of the detected notification; in accordance with a determination that the user touch input corresponds to a first type, ceasing to display in the second user interface the portion of the detected notification on the touch screen display; and, in accordance with a determination that the user touch input corresponds to a second type distinct from the first type, performing an action associated with the detected notification.

(E4) In some embodiments of the method of any one of E1-E3, the portion of the notification displayed on the touch screen display prompts a user of the computing system to select one of a plurality of options for responding to the detected notification.

(E5) In some embodiments of the method of any one of E1-E4, the portion of the notification displayed on the touch screen display includes one or more suggested responses to the detected notification.

(E6) In some embodiments of the method of any one of E1-E5, the notification corresponds to an at least one of an incoming instant message, SMS, email, voice call, or video call.

(E6) In some embodiments of the method of any one of E1-E5, the notification corresponds to a modal alert issued by an application being executed by the processor of the computing system in response to a user input closing the application or performing an action within the application.

(E7) In some embodiments of the method of any one of E1-E7, the set of one or more affordances includes least one system-level affordance corresponding to at least one system-level functionality, and the notification corresponds to a user input selecting one or more portions of the input mechanism or the least one of a system-level affordance.

(E8) In another aspect, a computing system is provided, the computing system including one or more processors, memory, a first housing that includes a primary display, and a second housing at least partially containing a physical keyboard and a touch-sensitive secondary display. One or more programs are stored in the memory and configured for execution by one or more processors, the one or more programs including instructions for performing or causing performance of any one of the methods of E1-E7.

(E9) In an additional aspect, a non-transitory computer readable storage medium storing one or more programs is provided, the one or more programs including instructions that, when executed by one or more processors of a computing system with memory, a first housing that includes a primary display, and second a housing at least partially containing a physical keyboard and a touch-sensitive secondary display distinct from the primary display, cause the computing system to perform or cause performance of any one of the methods of E1-E7.

(E10) In one more aspect, a graphical user interface on a computing system with one or more processors, memory, a first housing that includes a primary display, a second housing at least partially containing a physical input mechanism and a touch-sensitive secondary display distinct from the primary display, the graphical user interface comprising user interfaces displayed in accordance with any of the methods of claims E1-E7.

(E11) In one other aspect, a computing device is provided. The computing device includes a first housing that includes a primary display, a second housing at least partially containing a physical keyboard and a touch-sensitive secondary display distinct from the primary display, and means for performing or causing performance of any of the methods of claims E1-E7.

(F1) In accordance with some embodiments, a method of moving user interface portions is performed at a computing system (e.g., system 100 or system 200, FIGS. 1A-2D) that includes one or more processors, memory, a first housing that includes a primary display (e.g., housing 110 that includes the display 102 or housing 204 that includes display 102), and a second housing at least partially containing a physical keyboard (e.g., keyboard 106, FIG. 1A) and a touch-sensitive secondary display (e.g., dynamic function row 104, FIG. 1A). In some embodiments, the touch-sensitive secondary display is separate from the physical keyboard (e.g., the touch-sensitive secondary display is a standalone display 222 or the touch-sensitive display is integrated with another device, such as touchpad 108, FIG. 2C). The method includes: displaying, on the primary display, a user interface, the user interface comprising one or more user interface elements; identifying an active user interface element of the one or more user interface elements that is in focus on the primary display, wherein the active user interface element is associated with an application executed by the computing system; in response to identifying the active user interface element, displaying, on the touch screen display, a set of one or more affordances corresponding to the application; detecting a user input to move a respective portion of the user interface; and, in response to detecting the user input, and in accordance with a determination that the user input satisfies predefined action criteria: ceasing to display the respective portion of the user interface on the primary display; ceasing to display at least a subset of the set of one or more affordances on the touch screen display; and displaying, on the touch screen display, a representation of the respective portion of the user interface.

Allowing a user to quickly move user interface portions (e.g., menus, notifications, etc.) from a primary display and to a touch-sensitive secondary display provides the user with a convenient and customized way to access the user interface portions. Providing the user with a convenient and customized way to access the user interface portions via the touch-sensitive secondary display enhances the operability of the computing system and makes the user-device interface more efficient (e.g., by helping the user to access user interface portions directly through the touch-sensitive secondary display with fewer interactions and without having to waste time looking for a previously viewed (and possibly buried) user interface portion) which, additionally, reduces power usage and improves battery life of the device by enabling the user to access needed user interface portions more quickly and efficiently. Furthermore, displaying user interface portions at the touch-sensitive secondary display in response to user input provides an emphasizing effect for the user interface portions at the touch-sensitive secondary display, as a respective user interface portions is, in some embodiments, displayed as overlaying other affordances in the touch-sensitive secondary display, thus ensuring that the respective user interface portion is visible and easily accessible at the touch-sensitive secondary display.

(F2) In some embodiments of the method of F1, the respective portion of the user interface is a menu corresponding to the application executed by the computing system.

(F3) In some embodiments of the method of any one of F1-F2, the respective portion of the user interface is one of a notification and a modal alert.

(F4) In some embodiments of the method of any one of F1-F3, the predefined action criteria are satisfied when the user input is a dragging gesture that drags the respective portion of the user interface to a predefined location of the primary display.

(F5) In some embodiments of the method of any one of F1-F3, the predefined action criteria are satisfied when the user input is a predetermined input corresponding to moving the respective portion of the user interface to the touch screen display.

(F6) In some embodiments of the method of any one of F1-F5, the method includes: in response to detecting the user input, and in accordance with a determination that the user input does not satisfy the predefined action criteria: maintaining display of the respective portion of the user interface on the primary display; and maintaining display of the set of one or more affordances on the touch screen display.

(F7) In some embodiments of the method of any one of F1-F6, the set of one or more affordances includes at least one system-level affordance corresponding to at least one system-level functionality, the method includes: after displaying the representation of the respective portion of the user interface on the touch screen display, maintaining display of the at least one system-level affordance on the touch screen display.

(F8) In some embodiments of the method of any one of F1-F7, the representation of the respective portion of the user interface is overlaid on the set of one or more affordances on the touch screen display.

(F9) In another aspect, a computing system is provided, the computing system including one or more processors, memory, a first housing that includes a primary display, and a second housing at least partially containing a physical keyboard and a touch-sensitive secondary display. One or more programs are stored in the memory and configured for execution by one or more processors, the one or more programs including instructions for performing or causing performance of any one of the methods of F1-F8.

(F10) In an additional aspect, a non-transitory computer readable storage medium storing one or more programs is provided, the one or more programs including instructions that, when executed by one or more processors of a computing system with memory, a first housing that includes a primary display, and second a housing at least partially containing a physical keyboard and a touch-sensitive secondary display distinct from the primary display, cause the computing system to perform or cause performance of any one of the methods of F1-F8.

(F11) In one more aspect, a graphical user interface on a computing system with one or more processors, memory, a first housing that includes a primary display, a second housing at least partially containing a physical input mechanism and a touch-sensitive secondary display distinct from the primary display, the graphical user interface comprising user interfaces displayed in accordance with any of the methods of claims F1-F8.

(F12) In one other aspect, a computing device is provided. The computing device includes a first housing that includes a primary display, a second housing at least partially containing a physical keyboard and a touch-sensitive secondary display distinct from the primary display, and means for performing or causing performance of any of the methods of claims F1-F8.

(G1) In accordance with some embodiments, a method is performed at a computing system (e.g., system 100 or system 200, FIGS. 1A-2D) that includes one or more processors, memory, a first housing that includes a primary display (e.g., housing 110 that includes the display 102 or housing 204 that includes display 102), and a second housing at least partially containing a physical keyboard (e.g., keyboard 106, FIG. 1A) and a touch-sensitive secondary display (e.g., dynamic function row 104, FIG. 1A). In some embodiments, the touch-sensitive secondary display is separate from the physical keyboard (e.g., the touch-sensitive secondary display is a standalone display 222 or the touch-sensitive display is integrated with another device, such as touchpad 108, FIG. 2C). The method includes: receiving a request to open an application. In response to receiving the request, the method includes: (i) displaying, on the primary display, a plurality of user interface objects associated with an application executing on the computing system (e.g., the plurality of user interface objects correspond to tabs in Safari, individual photos in a photo-browsing application, individual frames of a video in a video-editing application, etc.), the plurality including a first user interface object displayed with its associated content and other user interface objects displayed without their associated content; and (ii) displaying, on the touch-sensitive secondary display, a set of affordances that each represent (i.e., correspond to) one of the plurality of user interface objects. The method also includes: detecting, via the touch-sensitive secondary display, a swipe gesture in a direction from a first affordance of the set of affordances and towards a second affordance of the set of affordances. In some embodiments, the first affordance represents the first user interface object and the second affordance represents a second user interface object that is distinct from the first user interface object. In response to detecting the swipe gesture, the method includes: updating the primary display (e.g., during the swipe gesture) to cease displaying associated content for the first user interface object and to display associated content for the second user interface object.

Allowing a user to quickly navigate through user interface objects on a primary display (e.g., browser tabs) by providing inputs at a touch-sensitive secondary display provides the user with a convenient way to quickly navigate through the user interface objects. Providing the user with a convenient way to quickly navigate through the user interface objects via the touch-sensitive secondary display (and reducing the number of inputs needed to navigate through the user interface objects, thus requiring fewer interactions to navigate through the user interface objects) enhances the operability of the computing system and makes the user-device interface more efficient (e.g., by requiring a single input or gesture at a touch-sensitive secondary display to navigate through user interface objects on a primary display) which, additionally, reduces power usage and improves battery life of the device by enabling the user to navigate through user interface objects on the primary display more quickly and efficiently. Moreover, as users provide an input at the touch-sensitive display (e.g., a swipe gesture) to navigate through the user interface objects on the primary display, each contacted affordance at the touch-sensitive display (that corresponds to one of the user interface objects) is visually distinguished from other affordances (e.g., a respective contacted affordance is magnified and a border may be highlighted), thus making information displayed on the touch-sensitive secondary display more discernable to the user.

(G2) In some embodiments of the method of G1, the method includes: detecting continuous travel of the swipe gesture across the touch-sensitive secondary display, including the swipe gesture contacting a third affordance that represents a third user interface object. In response to detecting that the swipe gesture contacts the third affordance, the method includes: updating the primary display to display associated content for the third user interface object.

(G3) In some embodiments of the method of any one of G1-G2, each affordance in the set of affordance includes a representation of respective associated content for a respective user interface object of the plurality.

(G4) In some embodiments of the method of any one of G1-G3, the method includes: before detecting the swipe gesture, detecting an initial contact with the touch-sensitive secondary display over the first affordance. In response to detecting the initial contact, the method includes: increasing a magnification level (or display size) of the first affordance.

(G5) In some embodiments of the method of any one of G1-G4, the application is a web browsing application, and the plurality of user interface objects each correspond to web-browsing tabs.

(G6) In some embodiments of the method of G6, the method includes: detecting an input at a URL-input portion of the web browsing application on the primary display. In response to detecting the input, the method includes: updating the touch-sensitive secondary display to include representations of favorite URLs.

(G7) In some embodiments of the method of any one of G1-G4, the application is a photo-browsing application, and the plurality of user interface objects each correspond to individual photos.

(G8) In some embodiments of the method of any one of G1-G4, the application is a video-editing application, and the plurality of user interface object each correspond to individual frames in a respective video.

(G9) In another aspect, a computing system is provided, the computing system including one or more processors, memory, a first housing that includes a primary display, and a second housing at least partially containing a physical keyboard and a touch-sensitive secondary display. One or more programs are stored in the memory and configured for execution by one or more processors, the one or more programs including instructions for performing or causing performance of any one of the methods of G1-G8.

(G10) In an additional aspect, a non-transitory computer readable storage medium storing one or more programs is provided, the one or more programs including instructions that, when executed by one or more processors of a computing system with memory, a first housing that includes a primary display, and second a housing at least partially containing a physical keyboard and a touch-sensitive secondary display distinct from the primary display, cause the computing system to perform or cause performance of any one of the methods of G1-G8.

(G11) In one more aspect, a graphical user interface on a computing system with one or more processors, memory, a first housing that includes a primary display, a second housing at least partially containing a physical input mechanism and a touch-sensitive secondary display distinct from the primary display, the graphical user interface comprising user interfaces displayed in accordance with any of the methods of claims G1-G8.

(G12) In one other aspect, a computing device is provided. The computing device includes a first housing that includes a primary display, a second housing at least partially containing a physical keyboard and a touch-sensitive secondary display distinct from the primary display, and means for performing or causing performance of any of the methods of claims G1-G8.

(H1) In accordance with some embodiments, a method is performed at a computing system (e.g., system 100 or system 200, FIGS. 1A-2D) that includes one or more processors, memory, a first housing that includes a primary display (e.g., housing 110 that includes the display 102 or housing 204 that includes display 102), and a second housing at least partially containing a physical keyboard (e.g., keyboard 106, FIG. 1A) and a touch-sensitive secondary display (e.g., dynamic function row 104, FIG. 1A). In some embodiments, the touch-sensitive secondary display is separate from the physical keyboard (e.g., the touch-sensitive secondary display is a standalone display 222 or the touch-sensitive display is integrated with another device, such as touchpad 108, FIG. 2C). The method includes: receiving a request to search within content displayed on the primary display of the computing device (e.g., the request corresponds to a request to search for text within displayed webpage content). In response to receiving the request, the method includes: (i) displaying, on the primary display, a plurality of search results responsive to the search, and focus is on a first search result of the plurality of search results; (ii) displaying, on the touch-sensitive secondary display, respective representations that each correspond to a respective search result of the plurality of search results. The method also includes: detecting, via the touch-sensitive secondary display, a touch input (e.g., a tap or a swipe) that selects a representation of the respective representations, the representation corresponding to a second search result of the plurality of search results distinct from the first search result. In response to detecting the input, the method includes changing focus on the primary display to the second search result.

Allowing a user to quickly navigate through search results on a primary display by providing inputs at a touch-sensitive secondary display provides the user with a convenient way to quickly navigate through the search results. Providing the user with a convenient way to quickly navigate through the search results via the touch-sensitive secondary display (and reducing the number of inputs needed to navigate through the search results, thus requiring fewer interactions from a user to browse through numerous search results quickly) enhances the operability of the computing system and makes the user-device interface more efficient (e.g., by requiring a single input or gesture at a touch-sensitive secondary display to navigate through numerous search results on a primary display) which, additionally, reduces power usage and improves battery life of the device by enabling the user to navigate through search results on the primary display more quickly and efficiently. Moreover, as users provide an input at the touch-sensitive display (e.g., a swipe gesture) to navigate through the search on the primary display, each contacted affordance at the touch-sensitive display (that corresponds to one of the search results) is visually distinguished from other affordances (e.g., a respective contacted affordance is magnified and a border may be highlighted), thus making information displayed on the touch-sensitive secondary display more discernable to the user.

(H2) In some embodiments of the method of H1, changing focus includes modifying, on the primary display, a visual characteristic of the particular search result (e.g., displaying the particular search result with a larger font size).

(H3) In some embodiments of the method of any one of H1-H2, the method includes: detecting a gesture that moves across at least two of the respective representations on the touch-sensitive secondary display. In response to detecting the gesture, the method includes: changing focus on the primary display to respective search results that correspond to the at least two of the respective representations as the swipe gestures moves across the at least two of the respective representations.

(H4) In some embodiments of the method of H3, the method includes: in accordance with a determination that a speed of the gesture is above a threshold speed, changing focus on the primary display to respective search results in addition to those that correspond to the at least two of the respective representations (e.g., if above the threshold speed, cycle through more search results in addition to those contacted during swipe).

(H5) In some embodiments of the method of any one of H3-H4, the gesture is a swipe gesture.

(H6) In some embodiments of the method of any one of H3-H4, the gesture is a flick gesture.

(H7) In some embodiments of the method of any one of H1-H6, the representations are tick marks that each correspond to respective search results of the search results.

(H8) In some embodiments of the method of H7, the tick marks are displayed in a row on the touch-sensitive secondary display in an order that corresponds to an ordering of the search results on the primary display.

(H9) In some embodiments of the method of any one of H1-H8, the request to search within the content is a request to locate a search string within the content, and the plurality of search results each include at least the search string.

(H9) In some embodiments of the method of H8, displaying the plurality of search results includes highlighting the search string for each of the plurality of search results.

(H10) In another aspect, a computing system is provided, the computing system including one or more processors, memory, a first housing that includes a primary display, and a second housing at least partially containing a physical keyboard and a touch-sensitive secondary display. One or more programs are stored in the memory and configured for execution by one or more processors, the one or more programs including instructions for performing or causing performance of any one of the methods of H1-H9.

(H11) In an additional aspect, a non-transitory computer readable storage medium storing one or more programs is provided, the one or more programs including instructions that, when executed by one or more processors of a computing system with memory, a first housing that includes a primary display, and second a housing at least partially containing a physical keyboard and a touch-sensitive secondary display distinct from the primary display, cause the computing system to perform or cause performance of any one of the methods of H1-H9.

(H12) In one more aspect, a graphical user interface on a computing system with one or more processors, memory, a first housing that includes a primary display, a second housing at least partially containing a physical input mechanism and a touch-sensitive secondary display distinct from the primary display, the graphical user interface comprising user interfaces displayed in accordance with any of the methods of claims H1-H9.

(H13) In one other aspect, a computing device is provided. The computing device includes a first housing that includes a primary display, a second housing at least partially containing a physical keyboard and a touch-sensitive secondary display distinct from the primary display, and means for performing or causing performance of any of the methods of claims H1-H9.

(I1) In accordance with some embodiments, a method is performed at a computing system (e.g., system 100 or system 200, FIGS. 1A-2D) that includes one or more processors, memory, a first housing that includes a primary display (e.g., housing 110 that includes the display 102 or housing 204 that includes display 102), and a second housing at least partially containing a physical keyboard (e.g., keyboard 106, FIG. 1A) and a touch-sensitive secondary display (e.g., dynamic function row 104, FIG. 1A). In some embodiments, the touch-sensitive secondary display is separate from the physical keyboard (e.g., the touch-sensitive secondary display is a standalone display 222 or the touch-sensitive display is integrated with another device, such as touchpad 108, FIG. 2C). The method includes: displaying, on the primary display, a calendar application. The method also includes: receiving a request to display information about an event that is associated with the calendar application (e.g., the request corresponds to a selection of an event that is displayed within the calendar application on the primary display). In response to receiving the request, the method includes: (i) displaying, on the primary display, event details for the first event, the event details including a start time and an end time for the event; and (ii) displaying, on the touch-sensitive secondary display, an affordance, the affordance (e.g., a user interface control) indicating a range of time that at least includes the start time and the end time.

Allowing a user to quickly and easily edit event details at a touch-sensitive secondary display provides the user with a convenient way to quickly edit event details without having to perform extra inputs (e.g., having to jump back and forth between using a keyboard and using a trackpad to modify the event details). Providing the user with a convenient way to quickly edit event details via the touch-sensitive secondary display (and reducing the number of inputs needed to edit the event details, thus requiring fewer interactions to achieve a desired result of editing event details) enhances the operability of the computing system and makes the user-device interface more efficient (e.g., by requiring a single input or gesture at a touch-sensitive secondary display to quickly edit certain event details) which, additionally, reduces power usage and improves battery life of the device by enabling the user to edit event details more quickly and efficiently. Additionally, by updating the primary display in response to inputs at the touch-sensitive secondary display (e.g., to show updated start and end times for an event), a user is able to sustain interactions with the device in an efficient way by providing inputs to modify the event and then immediately seeing those modifications reflected on the primary display, so that the user is then able to decide whether to provide an additional input or not.

(I2) In some embodiments of the method of I1, the method includes: detecting, via the touch-sensitive secondary display, an input at the user interface control that modifies the range of time. In response to detecting the input: (i) modifying at least one of the start time and the end time for the event in accordance with the input; and (ii) displaying, on the primary display, a modified range of time for the event in accordance with the input.

(I3) In some embodiments of the method of I2, the method includes: saving the event with the modified start and/or end time to the memory of the computing system.

(I4) in some embodiments of the method of any one of I1-I3, the input that modifies the range of time is a press input that remains in contact with the affordance for more than a threshold amount of time and then moves at least a portion the affordance on the touch-sensitive secondary display.

(I5) in some embodiments of the method of any one of I1-I3, the input that modifies the range of time is a swipe gesture that moves across the touch-sensitive secondary display and causes the computing system to select a new start time and a new end time for the event, wherein the new start and end times correspond to a time slot that is of a same duration covered by the start and end times (I6) In another aspect, a computing system is provided, the computing system including one or more processors, memory, a first housing that includes a primary display, and a second housing at least partially containing a physical keyboard and a touch-sensitive secondary display. One or more programs are stored in the memory and configured for execution by one or more processors, the one or more programs including instructions for performing or causing performance of any one of the methods of I1-I5.

(I7) In an additional aspect, a non-transitory computer readable storage medium storing one or more programs is provided, the one or more programs including instructions that, when executed by one or more processors of a computing system with memory, a first housing that includes a primary display, and second a housing at least partially containing a physical keyboard and a touch-sensitive secondary display distinct from the primary display, cause the computing system to perform or cause performance of any one of the methods of I1-I5.

(I8) In one more aspect, a graphical user interface on a computing system with one or more processors, memory, a first housing that includes a primary display, a second housing at least partially containing a physical input mechanism and a touch-sensitive secondary display distinct from the primary display, the graphical user interface comprising user interfaces displayed in accordance with any of the methods of claims I1-I5.

(I9) In one other aspect, a computing device is provided. The computing device includes a first housing that includes a primary display, a second housing at least partially containing a physical keyboard and a touch-sensitive secondary display distinct from the primary display, and means for performing or causing performance of any of the methods of claims I1-I5.

(J1) In accordance with some embodiments, a method is performed at a computing system (e.g., system 100 or system 200, FIGS. 1A-2D) that includes one or more processors, memory, a first housing that includes a primary display (e.g., housing 110 that includes the display 102 or housing 204 that includes display 102), and a second housing at least partially containing a physical keyboard (e.g., keyboard 106, FIG. 1A) and a touch-sensitive secondary display (e.g., dynamic function row 104, FIG. 1A). In some embodiments, the touch-sensitive secondary display is separate from the physical keyboard (e.g., the touch-sensitive secondary display is a standalone display 222 or the touch-sensitive display is integrated with another device, such as touchpad 108, FIG. 2C). The method includes: detecting a new connection between the computing system and an external device distinct from the computing system; and (e.g., connect a new monitor, connect headphones via Bluetooth or headphone jack, etc.). In response to detecting the new connection, the method includes: displaying, on the touch-sensitive secondary display, a plurality of affordances corresponding to functions available via the external device.

Allowing a user to efficiently utilize external devices via a touch-sensitive secondary display provides the user with a convenient way to access functions that may otherwise be buried in menus. Providing the user with a convenient way to access functions for external devices that may otherwise be buried in menus (and, therefore, reducing the number of inputs needed to access the functions, thus requiring fewer interactions in order to use external devices) enhances the operability of the computing system and makes the user-device interface more efficient (e.g., by requiring a single input or gesture at a touch-sensitive secondary display to perform a certain function for an external device) which, additionally, reduces power usage and improves battery life of the device by enabling the user to interact with external devices more quickly and efficiently. In this way, the touch-sensitive secondary display also conveys information about an internal state of the device (by reflecting a connecting status between the device and the external device, and allowing users to easily interact with the external device).

(J2) In some embodiments of the method of J1, the method includes: receiving, via the touch-sensitive secondary display, a selection of a first affordance that corresponds to a first function available via the external device. In response to receiving the selection, the method includes: initiating performance of the first function.

(J3) In some embodiments of the method of any one of J1-J2, the external device is an additional display, distinct from the primary display and the touch-sensitive display.

(J4) In some embodiments of the method of J3, the plurality of affordances include a first affordance that, when selected, causes the computing system to initiate performance of a display mirroring function via the additional display.

(J5) In another aspect, a computing system is provided, the computing system including one or more processors, memory, a first housing that includes a primary display, and a second housing at least partially containing a physical keyboard and a touch-sensitive secondary display. One or more programs are stored in the memory and configured for execution by one or more processors, the one or more programs including instructions for performing or causing performance of any one of the methods of J1-J4.

(J6) In an additional aspect, a non-transitory computer readable storage medium storing one or more programs is provided, the one or more programs including instructions that, when executed by one or more processors of a computing system with memory, a first housing that includes a primary display, and second a housing at least partially containing a physical keyboard and a touch-sensitive secondary display distinct from the primary display, cause the computing system to perform or cause performance of any one of the methods of J1-J4.

(J7) In one more aspect, a graphical user interface on a computing system with one or more processors, memory, a first housing that includes a primary display, a second housing at least partially containing a physical input mechanism and a touch-sensitive secondary display distinct from the primary display, the graphical user interface comprising user interfaces displayed in accordance with any of the methods of claims J1-J4.

(J8) In one other aspect, a computing device is provided. The computing device includes a first housing that includes a primary display, a second housing at least partially containing a physical keyboard and a touch-sensitive secondary display distinct from the primary display, and means for performing or causing performance of any of the methods of claims J1-J4.

(K1) In accordance with some embodiments, a method is performed at a computing system (e.g., system 100 or system 200, FIGS. 1A-2D) that includes one or more processors, memory, a first housing that includes a primary display (e.g., housing 110 that includes the display 102 or housing 204 that includes display 102), and a second housing at least partially containing a physical keyboard (e.g., keyboard 106, FIG. 1A) and a touch-sensitive secondary display (e.g., dynamic function row 104, FIG. 1A). In some embodiments, the touch-sensitive secondary display is separate from the physical keyboard (e.g., the touch-sensitive secondary display is a standalone display 222 or the touch-sensitive display is integrated with another device, such as touchpad 108, FIG. 2C). The method includes: displaying, on the primary display, a user interface for an application that is executing on the computing system; detecting a first input at a particular location within the user interface. In response to detecting the first input, the method includes: displaying, on the touch-sensitive secondary display, a set of affordances that each correspond to distinct characters.

Allowing a user to quickly and easily preview how characters will look within an application on a primary display by providing an intuitive input at a touch-sensitive secondary display provides the user with a convenient way to quickly preview how characters will look within the application. Providing the user with a convenient way to quickly preview how characters will look within an application enhances the operability of the computing system and makes the user-device interface more efficient (e.g., by requiring a single input or gesture at a touch-sensitive secondary display to quickly preview how characters will look, thus requiring fewer interactions to preview how these characters will look on the primary display) which, additionally, reduces power usage and improves battery life of the device by enabling the user to preview characters more quickly and efficiently. In this way, users are provided with efficient and sustained interactions with their devices, as the users are permitted to continue previewing characters and then continue providing inputs until a desired character is located.

(K2) In some embodiments of the method of K1, the method includes: detecting, via the touch-sensitive secondary display, a second input over a first affordance that corresponds to a first character of the distinct characters. In response to detecting the second input, the method includes: displaying on the primary display a preview of the first character at the particular location while the input remains in contact with the first affordance.

(K3) In some embodiments of the method of K2, the method includes: detecting, via the touch-sensitive secondary display, movement of the second input from the first affordance and to a second affordance that corresponds to a second character of the distinct characters. In response to detecting the movement of the second input from the first affordance and to the second affordance, the method includes: replacing the preview of the first character with a preview of the second character.

(K4) In some embodiments of the method of any one of K1-K3, the method includes: determining affordances to include in the set of affordances based at least in part on textual content included in the user interface.

(K5) In some embodiments of the method of K4, the determining is conducted in response to detecting that a user has modified textual content included in the user interface.

(K6) In some embodiments of the method of any one of K1-K5, the method includes: detecting liftoff of the second input while it is contact with second affordance. In response to detecting liftoff, the method includes: updating the user interface to include the second user interface element.

(K7) In some embodiments of the method of any one of K1-K5, the method includes: detecting an additional input while second input is in contact with second affordance. In response to detecting the additional input, the method includes: updating the user interface to include the second user interface element.

(K8) In some embodiments of the method of any one of K1-K7, the method includes: as the second input continues to move across the touch-sensitive secondary display, displaying previews for respective characters of the distinct characters as corresponding affordances in the set of affordances are contacted by the second input.

(K9) In some embodiments of the method of any one of K1-K8, the preview of second character remains displayed on the primary display while the input remains in contact with the second affordance (K10) In another aspect, a computing system is provided, the computing system including one or more processors, memory, a first housing that includes a primary display, and a second housing at least partially containing a physical keyboard and a touch-sensitive secondary display. One or more programs are stored in the memory and configured for execution by one or more processors, the one or more programs including instructions for performing or causing performance of any one of the methods of K1-K9.

(K11) In an additional aspect, a non-transitory computer readable storage medium storing one or more programs is provided, the one or more programs including instructions that, when executed by one or more processors of a computing system with memory, a first housing that includes a primary display, and second a housing at least partially containing a physical keyboard and a touch-sensitive secondary display distinct from the primary display, cause the computing system to perform or cause performance of any one of the methods of K1-K9.

(K12) In one more aspect, a graphical user interface on a computing system with one or more processors, memory, a first housing that includes a primary display, a second housing at least partially containing a physical input mechanism and a touch-sensitive secondary display distinct from the primary display, the graphical user interface comprising user interfaces displayed in accordance with any of the methods of claims K1-K9.

(K13) In one other aspect, a computing device is provided. The computing device includes a first housing that includes a primary display, a second housing at least partially containing a physical keyboard and a touch-sensitive secondary display distinct from the primary display, and means for performing or causing performance of any of the methods of claims K1-K9.

(L1) In accordance with some embodiments, a method is performed at a computing system (e.g., system 100 or system 200, FIGS. 1A-2D) that includes one or more processors, memory, a first housing that includes a primary display (e.g., housing 110 that includes the display 102 or housing 204 that includes display 102), and a second housing at least partially containing a physical keyboard (e.g., keyboard 106, FIG. 1A) and a touch-sensitive secondary display (e.g., dynamic function row 104, FIG. 1A). In some embodiments, the touch-sensitive secondary display is separate from the physical keyboard (e.g., the touch-sensitive secondary display is a standalone display 222 or the touch-sensitive display is integrated with another device, such as touchpad 108, FIG. 2C). The method includes: receiving a request to open a content-editing application (an application for composing and editing documents, drawings, photos, etc.). In response to receiving the request, the method includes: (i) displaying, on the primary display, the content-editing application; and (ii) displaying, on the touch-sensitive secondary display, a user interface control for modifying at least one visual characteristic that is used to render content within the content-editing application (e.g., a color picker that includes a sliding scale of color values used to select colors for content displayed within the content-editing application).

Therefore, users are provided with an intuitive way to modify visual characteristics that are used to render content within a content-editing application on a primary display by providing inputs at a touch-sensitive secondary display. Providing users with an intuitive way to modify visual characteristics in this way enhances the operability of the computing system and makes the user-device interface more efficient (e.g., by requiring a single input or gesture at a touch-sensitive secondary display to quickly preview how certain visual characteristics will look when used to render content on the primary display) which, additionally, reduces power usage and improves battery life of the device by enabling the user to preview changes to visual characteristics in a quicker and more efficient way. In this way, users are provided with efficient and sustained interactions with their devices, as the users are permitted to continue previewing how modifications to a visual characteristic will look on the primary display and then continue providing inputs until a desired modification for the visual characteristic is located.

(L2) In some embodiments of the method of L1, the method includes: detecting, via the touch-sensitive secondary display, an input at the user interface control that selects a first value for the at least one visual characteristic. After detecting the input, the method includes: rendering content in the content-editing application using the first value for the at least one visual characteristic (e.g., all new content added to the content-editing application is rendered using the first value and/or currently selected content is rendered using the first value).

(L3) In some embodiments of the method of any one of L1-L2, the user interface control includes respective controls that each correspond to a respective value for the at least one visual characteristic along a sliding scale of values.

(L4) In some embodiments of the method of L3, the sliding scale of values represents distinct shades of color.

(L5) In some embodiments of the method of L4, the first value corresponds to a first shade of a first color and the method includes: in accordance with a determination that the input satisfies predetermined criteria (remains in contact for more than threshold amount of time), modifying the user interface control on the touch-sensitive secondary display to include options for selecting other shades of the first color, distinct from the first shade of the first color.

(L6) In some embodiments of the method of any one of L1-L5, the method includes: before rendering the content, receiving a selection of the content, and rendering the content includes presenting a preview of the content using the first value for the at least one visual characteristic.

(L7) In some embodiments of the method of L6, the preview is presented while the input remains in contact with the touch-sensitive secondary display.

(L8) In some embodiments of the method of L7, the method includes: in response to detecting liftoff of the input, ceasing to display the preview.

(L9) In some embodiments of the method of L8, the method includes: in response to detecting liftoff of the input, displaying the portion of the editable content with the modified value for the at least one visual characteristic (L10) In another aspect, a computing system is provided, the computing system including one or more processors, memory, a first housing that includes a primary display, and a second housing at least partially containing a physical keyboard and a touch-sensitive secondary display. One or more programs are stored in the memory and configured for execution by one or more processors, the one or more programs including instructions for performing or causing performance of any one of the methods of L1-L9.

(L11) In an additional aspect, a non-transitory computer readable storage medium storing one or more programs is provided, the one or more programs including instructions that, when executed by one or more processors of a computing system with memory, a first housing that includes a primary display, and second a housing at least partially containing a physical keyboard and a touch-sensitive secondary display distinct from the primary display, cause the computing system to perform or cause performance of any one of the methods of L1-L9.

(L12) In one more aspect, a graphical user interface on a computing system with one or more processors, memory, a first housing that includes a primary display, a second housing at least partially containing a physical input mechanism and a touch-sensitive secondary display distinct from the primary display, the graphical user interface comprising user interfaces displayed in accordance with any of the methods of claims L1-L9.

(L13) In one other aspect, a computing device is provided. The computing device includes a first housing that includes a primary display, a second housing at least partially containing a physical keyboard and a touch-sensitive secondary display distinct from the primary display, and means for performing or causing performance of any of the methods of claims L1-L9.

(M1) In accordance with some embodiments, a method is performed at an electronic device (e.g., system 100 or system 200, FIGS. 1A-2D) that includes one or more processors, memory, a first housing that includes a primary display (e.g., housing 110 that includes the display 102 or housing 204 that includes display 102, also referred to as the "display"), and a second housing at least partially containing a physical keyboard (e.g., keyboard 106, FIG. 1A) and a touch-sensitive secondary display (e.g., dynamic function row 104, FIG. 1A). In some embodiments, the touch-sensitive secondary display is separate from the physical keyboard (e.g., the touch-sensitive secondary display is a standalone display 222 or the touch-sensitive display is integrated with another device, such as touchpad 108, FIG. 2C). In some embodiments, the electronic device also includes a biometric sensor that is integrated with the touch-sensitive secondary display or that is a separate component that is located adjacent to the touch-sensitive secondary display within the second housing. The method includes: while the device is in a locked state (e.g., the locked state is a state in which one or more features of the device are disabled and access to sensitive information or the ability to change or delete information is prohibited), displaying a respective log-in user interface that is associated with logging in to a plurality of user accounts including a first user account and a second user account. While displaying the log-in user interface, the method includes: receiving biometric information about a user. In response to receiving the biometric information, the method includes: (i) in accordance with a determination that the biometric information is consistent with biometric information for the first user account of the plurality of user accounts while the first user account does not have an active session on the device, displaying, on the display, a prompt to input a log-in credential for the first user account; and (ii) in accordance with a determination that the biometric information is consistent with biometric information for the second user account of the plurality of user accounts while the second user account does not have an active session on the device, displaying, on the display, a prompt to input a log-in credential for the second user account.

Therefore, users are provided with an intuitive way to access a user-specific login page by providing a single input at a biometric sensor. Providing users with an intuitive way to access a user-specific login page in this way enhances the operability of the computing system and makes the user-device interface more efficient (e.g., by requiring a single input or gesture at the biometric sensor to quickly access an appropriate, user-specific login page, thus fewer interactions are required to reach a user-specific login page) which, additionally, reduces power usage and improves battery life of the device by enabling the user to access the login page via single input.

(M2) In some embodiments of the method of M1, the method includes, in response to receiving the biometric information: in accordance with a determination that the biometric information is consistent with biometric information for the first user account of the plurality of user accounts while the first user account has an active session on the device, unlocking the device with respect to the first user account (e.g., without requiring additional user input).

(M3) In some embodiments of the method of any one of M1-M2, the method includes, in response to receiving the biometric information: in accordance with a determination that the biometric information is consistent with biometric information for the second user account of the plurality of user accounts while the second user account has an active session on the device, unlocking the device with respect to the second user account (e.g., without requiring additional user input).

(M4) In some embodiments of the method of any one of M1-M3, the method includes, in response to receiving the biometric information: in accordance with a determination that the biometric information is not consistent with biometric information for the any user account of the device, maintaining the device in the locked state.

(M5) In some embodiments of the method of any one of M1-M4, the log-in user interface includes a plurality of selectable affordances that correspond to the plurality of user accounts.

(M6) In some embodiments of the method of any one of M1-M5, the method includes, while displaying the prompt to input a log-in credential for the first user account, receiving entry of a log-in credential. In response to receiving entry of the log-in credential, the method includes: (i) in accordance with a determination that the log-in credential is consistent with a log-in credential for the first user account, unlocking the device with respect to the first user account; and (ii) in accordance with a determination that the log-in credential is not consistent with a log-in credential for the first user account, maintaining the device in the locked state.

(M7) In some embodiments of the method of any one of M1-M6, the method includes: while displaying the prompt to input a log-in credential for the second user account, receiving entry of a log-in credential. In response to receiving entry of the log-in credential: (i) in accordance with a determination that the log-in credential is consistent with a log-in credential for the second user account, unlocking the device with respect to the second user account; and (ii) in accordance with a determination that the log-in credential is not consistent with a log-in credential for the second user account, maintaining the device in the locked state.

(M8) In some embodiments of the method of any one of M1-M7, the log-in user interface includes instructions to provide biometric information.

(M9) In some embodiments of the method of any one of M1-M8, the device includes a secondary display that is adjacent to the biometric sensor (e.g., the touch-sensitive secondary display); and the method includes, while displaying the log-in user interface on the display of the device, displaying instructions at the secondary display to provide biometric information via the biometric sensor.

(M10) In some embodiments of the method of any one of M1-M9, the biometric sensor is a fingerprint sensor.

(M11) In some embodiments of the method of any one of M1-M9, the biometric sensor is a facial detection sensor.

(M12) In some embodiments of the method of any one of M1-M9, the biometric sensor is a retina scanner.

(M13) In another aspect, an electronic device is provided, the electronic device including one or more processors, memory, a display, and a biometric sensor. One or more programs are stored in the memory and configured for execution by one or more processors, the one or more programs including instructions for performing or causing performance of any one of the methods of M1-M12.

(M14) In an additional aspect, a non-transitory computer readable storage medium storing one or more programs is provided, the one or more programs including instructions that, when executed by one or more processors of a computing system with a display and a biometric sensor, cause the computing system to perform or cause performance of any one of the methods of M1-M12.

(M15) In one more aspect, a graphical user interface is provided on a computing system with one or more processors, memory, a display, and a biometric sensor, the graphical user interface comprising user interfaces displayed in accordance with any of the methods of claims M1-M12.

(M16) In one other aspect, a computing device is provided. The computing device includes a display and a biometric sensor, and means for performing or causing performance of any of the methods of claims M1-M12.

(N1) In accordance with some embodiments, a method is performed at an electronic device (e.g., system 100 or system 200, FIGS. 1A-2D) that includes one or more processors, memory, a first housing that includes a primary display (e.g., housing 110 that includes the display 102 or housing 204 that includes display 102, also referred to as the "display"), and a second housing at least partially containing a physical keyboard (e.g., keyboard 106, FIG. 1A) and a touch-sensitive secondary display (e.g., dynamic function row 104, FIG. 1A). In some embodiments, the touch-sensitive secondary display is separate from the physical keyboard (e.g., the touch-sensitive secondary display is a standalone display 222 or the touch-sensitive display is integrated with another device, such as touchpad 108, FIG. 2C). In some embodiments, the electronic device also includes a biometric sensor that is integrated with the touch-sensitive secondary display or that is a separate component that is located adjacent to the touch-sensitive secondary display within the second housing. The method includes: while the device is logged in to a first user account, displaying a user interface that is associated with the first user account (e.g., a home screen or desktop for the first user account). The device is associated with a plurality of user accounts including the first user account and a second user account, and the second user account is associated with biometric information that enables logging in to the second user account. While displaying the user interface that is associated with the first user account, the method includes: receiving an input via the input element with the integrated biometric sensor. In response to receiving the input via the input element with the integrated biometric sensor, the method includes: in accordance with a determination that the input meets second-user switching criteria while the second user account has an active session on the device, wherein the second-user switching criteria include a requirement that biometric information detected during the input with the input element is consistent with biometric information for the second user account of the plurality of user accounts: (i) unlocking the device with respect to the second user account; (ii) locking the device with respect to the first user account; and (iii) replacing display of the user interface associated with the first account with a user interface associated with the second user account.

Therefore, users are provided with an intuitive way to access an active, user-specific session on an electronic device by providing a single input at a biometric sensor. Providing users with an intuitive way to access an active, user-specific session in this way enhances the operability of the electronic device and makes the user-device interface more efficient (e.g., by requiring a single input or gesture at the biometric sensor to gain immediate access to the active session, therefore requiring fewer interactions to switch user accounts and login to the device) which, additionally, reduces power usage and improves battery life of the device by enabling the user to access the active session via single input.

(N2) In some embodiments of the method of N1, the method includes, in response to receiving the biometric information: in accordance with a determination that the input meets second-user switching criteria while the second user account does not have an active session on the device, wherein the second-user switching criteria include a requirement that biometric information detected during the input with the input element is consistent with biometric information for the second user account of the plurality of user accounts, displaying, on the display, a prompt to input a log-in credential for the second user account.

(N3) In some embodiments of the method of any one of N1-N2, the method includes, in response to receiving the biometric information: in accordance with a determination that the input meets third-user switching criteria while a third user account has an active session on the device, wherein the third-user switching criteria include a requirement that biometric information detected during the input with the input element is consistent with biometric information for the third user account of the plurality of user accounts: (i) unlocking the device with respect to the third user account; (ii) locking the device with respect to the first user account; and (iii) replacing display of the user interface associated with the first account with a user interface associated with the third user account.

(N4) In some embodiments of the method of any one of N1-N3, the method includes, in response to receiving the biometric information: in accordance with a determination that the input meets third-user switching criteria while the third user account does not have an active session on the device, wherein the third-user switching criteria include a requirement that biometric information detected during the input with the input element is consistent with biometric information for the third user account of the plurality of user accounts, displaying, on the display, a prompt to input a log-in credential for the third user account.

(N5) In some embodiments of the method of any one of N1-N2, the input element is a button, and the input via the input element with the integrated biometric sensor includes detecting a press input via the button.

(N6) In some embodiments of the method of N5, the second-user switching criteria include a criterion that the press input lasts for less than a first threshold amount of time; and the method includes, in response to receiving the press input via the input element with the integrated biometric sensor in accordance with a determination that the press input with the button lasts longer than the first threshold amount of time, putting the device into a low power mode (e.g., the low power mode corresponds to a suspended state of the electronic device in which the display is turned off).

(N7) In some embodiments of the method of N5, the second-user switching criteria include a criterion that the button press for less than a first threshold amount of time; and the method includes, in response to receiving the input via the input element with the integrated biometric sensor: (i) in accordance with a determination that the press input with the button lasts longer than the first threshold amount of time and less than a second threshold amount of time, putting the device into a low power mode (e.g., the low power mode corresponds to a sleep/suspended state of the electronic device in which the display is turned off and this low power mode is entered upon an end of the press input); and (ii) in accordance with a determination that the press input with the button lasts longer than the second threshold amount of time, displaying a menu of options for changing a state of the device (e.g., the menu of options include shut down, restart, sleep/suspend options that, when selected, shut down, restart, or sleep/suspend the device, respectively).

(N8) In some embodiments of the method of N7, the method includes, in response to receiving the input via the input element with the integrated biometric sensor: in accordance with a determination that the press input with the button lasts longer than a third threshold amount of time that is greater than the second threshold amount of time, restarting the device.

(N9) In some embodiments of the method of any one of N1-N8, the method includes, after replacing display of the user interface associated with the first account with a user interface associated with the second user account: while displaying the user interface that is associated with the second user account, receiving a second input via the input element with the integrated biometric sensor. In response to receiving the second input via the input element with the integrated biometric sensor: in accordance with a determination that the second input meets first-user switching criteria while the first user account has an active session on the device, wherein the first-user switching criteria include a requirement that biometric information detected during the input with the input element is consistent with biometric information for the first user account of the plurality of user accounts: (i) unlocking the device with respect to the first user account; (ii) locking the device with respect to the second user account; and (iii) replacing display of the user interface associated with the second account with a user interface associated with the first user account.

(N10) In another aspect, an electronic device is provided, the electronic device including one or more processors, memory, a display, and a biometric sensor. One or more programs are stored in the memory and configured for execution by one or more processors, the one or more programs including instructions for performing or causing performance of any one of the methods of N1-N9.

(N11) In an additional aspect, a non-transitory computer readable storage medium storing one or more programs is provided, the one or more programs including instructions that, when executed by one or more processors of a computing system with a display and a biometric sensor, cause the computing system to perform or cause performance of any one of the methods of N1-N9.

(N12) In one more aspect, a graphical user interface is provided on a computing system with one or more processors, memory, a display, and a biometric sensor, the graphical user interface comprising user interfaces displayed in accordance with any of the methods of claims N1-N9.

(N13) In one other aspect, a computing device is provided. The computing device includes a display and a biometric sensor, and means for performing or causing performance of any of the methods of claims N1-N9.

BRIEF DESCRIPTION OF DRAWINGS

The patent or application file contains at least one drawing executed in color. Copies of this patent or patent application publication with color drawing(s) will be provided by the Office upon request and payment of the necessary fee.

For a better understanding of the various described embodiments, reference should be made to the Description of Embodiments below, in conjunction with the following drawings in which like reference numerals refer to corresponding parts throughout the figures.

FIGS. 44A-44D are a flowchart of a method of updating a dynamic input and output device, in accordance with some embodiments.

FIGS. 45A-45C are a flowchart of a method of updating a dynamic input and output device, in accordance with some embodiments.

FIGS. 46A-46B are a flowchart of a method of maintaining functionality of an application while in full-screen mode, in accordance with some embodiments.

FIGS. 47A-47B are a flowchart of a method of displaying notifications on a touch screen display, in accordance with some embodiments.

FIGS. 48A-48C are a flowchart of a method of moving user interface portions, in accordance with some embodiments.

FIGS. 71C-71M are schematics of a touch-sensitive secondary display used to illustrate user interfaces for dynamically providing controls at the touch-sensitive secondary display for use with a video-editing application, in accordance with some embodiments.

FIGS. 72B-72K are schematics of a touch-sensitive secondary display used to illustrate user interfaces for dynamically providing controls for use with a video-editing application, in accordance with some embodiments.

DESCRIPTION OF EMBODIMENTS

Figure 45A:
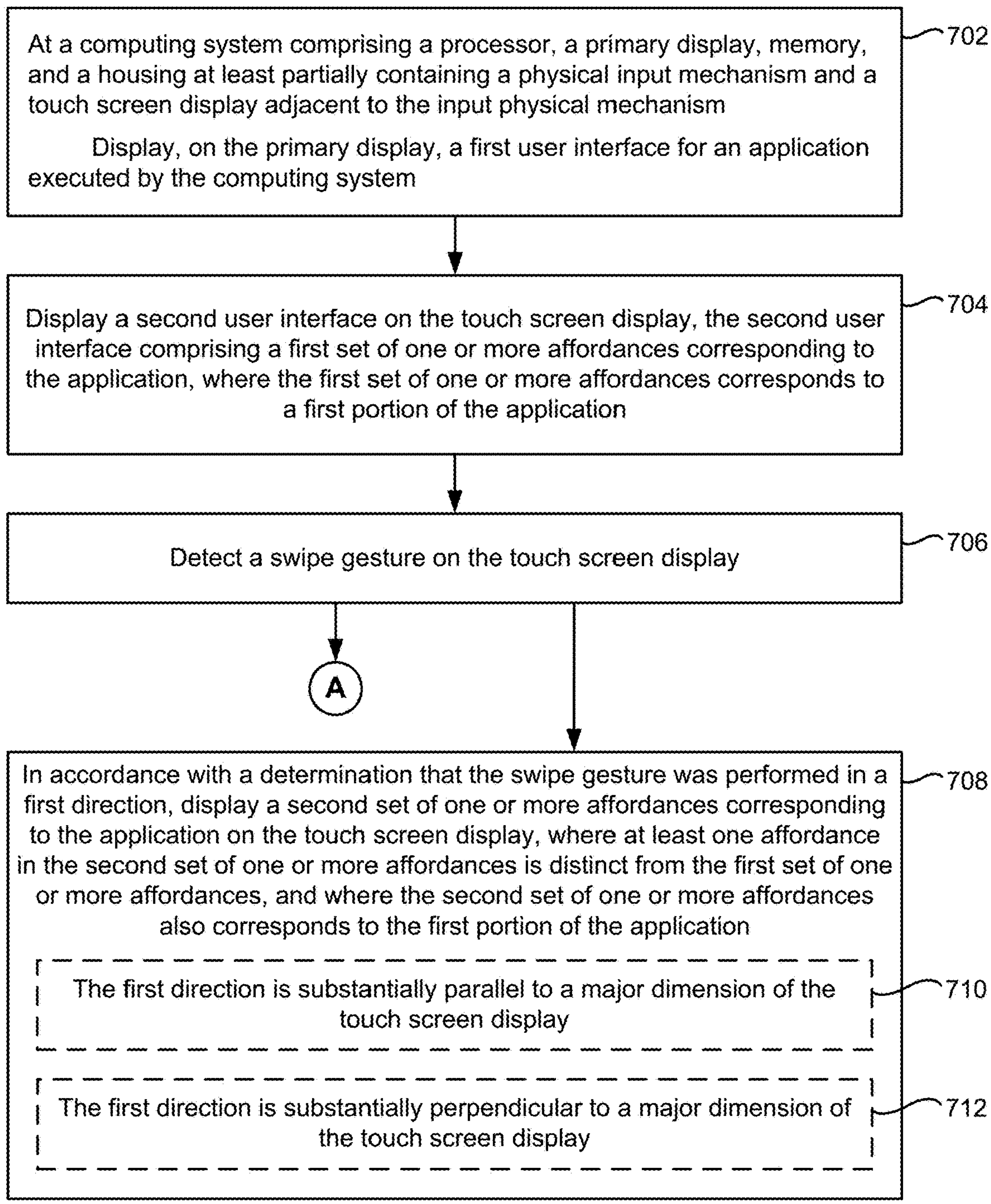
Figure 46A:
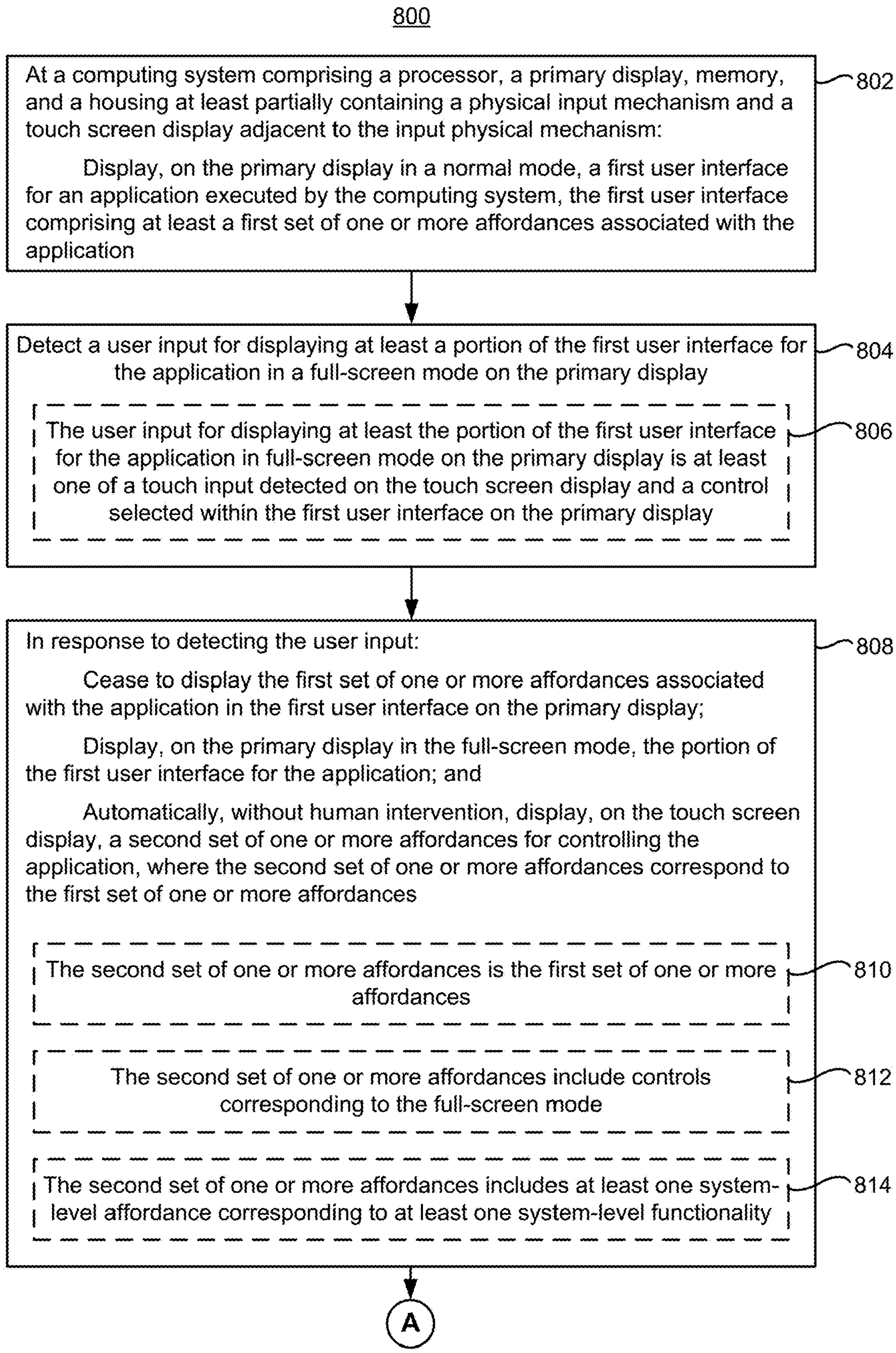
Figure 47A:
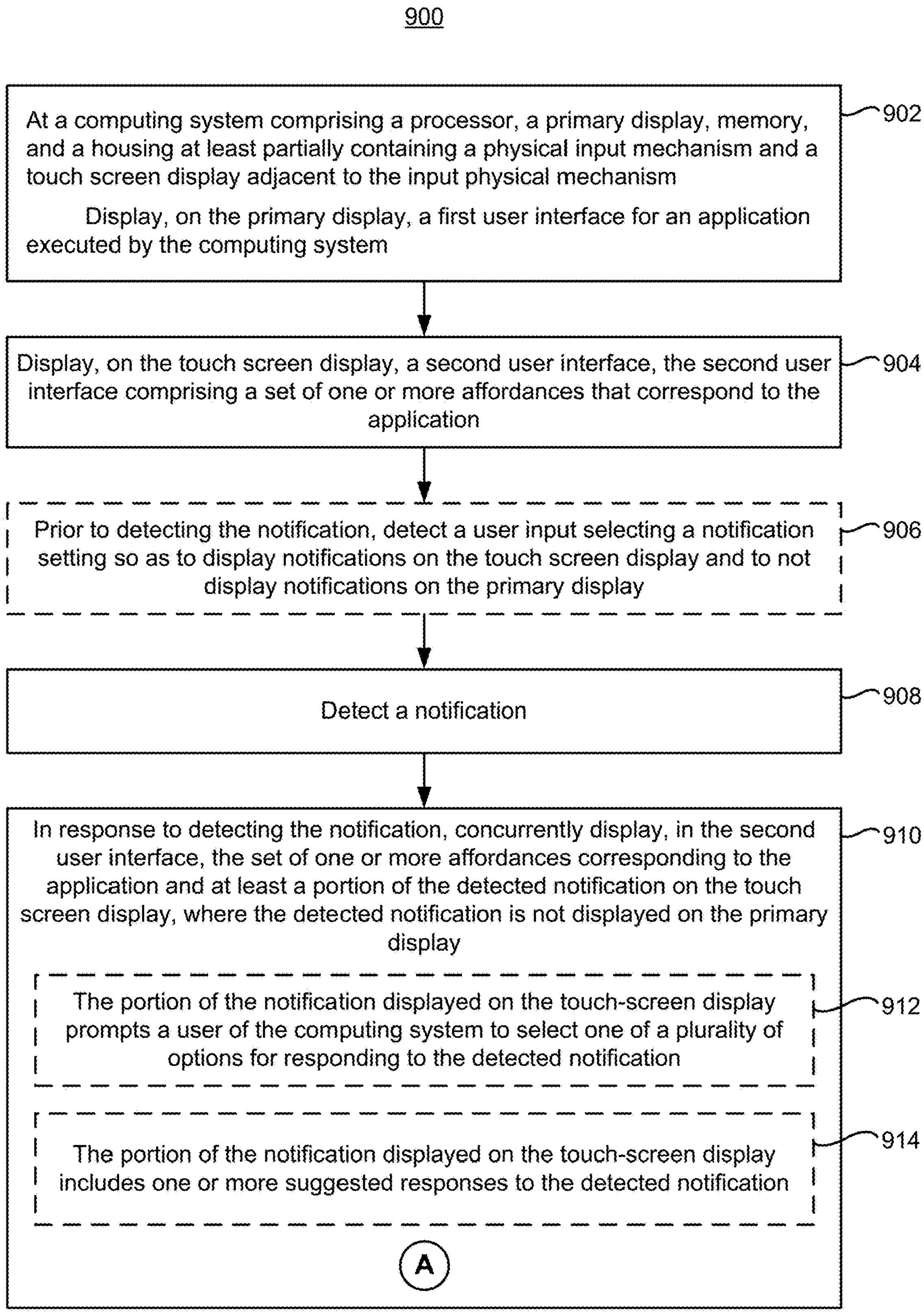

FIGS. 1A-1B, 2A-2D, 3A-3E, and 4 provide a description of example devices. FIGS. 5A-14E illustrate example user interfaces for updating a dynamic input and output device. FIGS. 44A-44D are a flowchart of a method 600 of updating a dynamic input and output device. FIGS. 45A-45C are a flowchart of a method 700 of updating a dynamic input and output device. FIGS. 46A-46B are a flowchart of a method 800 of maintaining functionality of an application while in full-screen mode. FIGS. 47A-47B are a flowchart of a method 900 of displaying notifications on a touch screen display. FIGS. 48A-48C are a flowchart of a method 1000 of moving user interface portions. The user interfaces in FIGS. 5A-14E are used to illustrate the methods and/or processes in FIGS. 44A-44D, 45A-45C, 46A-46B, 47A-47B, and 48A-48C.

FIGS. 49-54 and 66-67 include flowcharts of methods that utilize a touch-sensitive secondary display to enable efficient interactions at a computing system. The user interfaces in FIGS. 15A-43D are used to illustrate the methods and/or processes in FIGS. 49-54 and 66-67.

Example Devices and Systems

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1A:
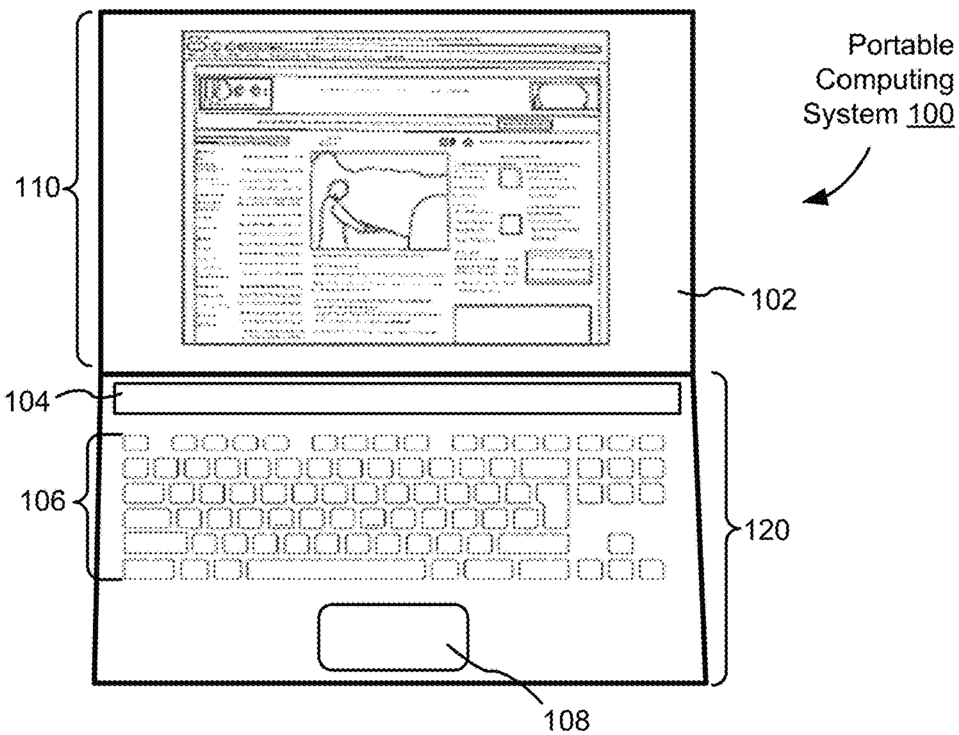
FIG. 1A is an illustrative diagram of a portable computing system (e.g., a laptop computer), in accordance with some embodiments.
Figure 1B:
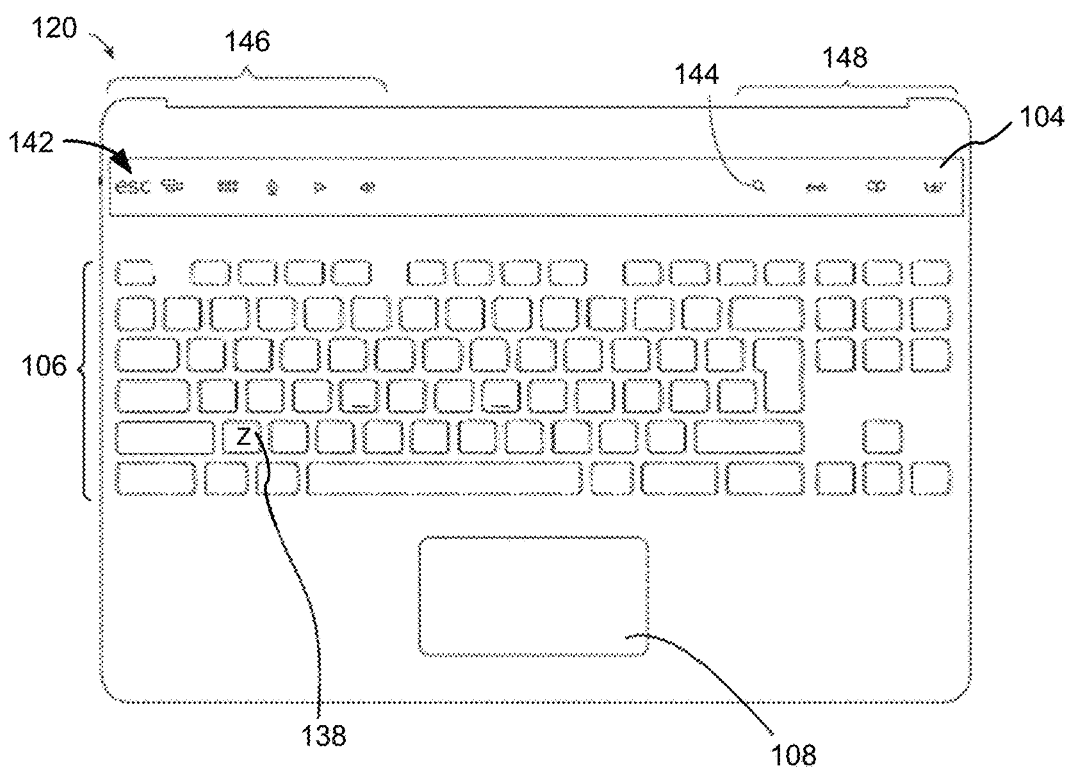
FIG. 1B is an illustrative diagram of a body portion of the portable computing system in FIG. 1A, in accordance with some embodiments.

FIG. 1A is an illustrative diagram of a portable computing system 100, in accordance with some embodiments. Portable computing system 100 may be, for example, a laptop computer, such as a MACBOOK® device, or any other portable computing device. Portable computing system 100 includes: (A) a display portion 110 (also referred to herein as a first housing 110 or housing 110) with a primary display 102; and (B) a body portion 120 (also referred to as a second housing 120 or housing 120) with a dynamic function row 104, a set of physical (i.e., movably actuated) keys 106, and a touchpad 108 partially contained within a same housing. Display portion 110 is typically mechanically, electrically, and communicatively coupled with body portion 120 of portable computing system 100. For example, portable computing system 100 may include a hinge, allowing display portion 110 to be rotated relative to body portion 120. Portable computing system 100 includes one or more processors and memory storing one or more programs for execution by the one or more processors to perform any of the embodiments described herein. In some embodiments, dynamic function row 104, which is described in more detail with reference to FIG. 1B, is a touch screen display using resistive sensing, acoustic sensing, capacitive sensing, optical sensing, infrared sensing, or the like to detect user touch inputs and selections. In some embodiments, primary display 102 of display portion 110 is also a touch screen display.

FIG. 1B is an illustrative diagram of body portion 120 of portable computing system 100 in accordance with some embodiments. Body portion 120 includes a set of physical keys 106 (also referred to herein as "physical keys 106" and "keyboard 106"), a dynamic function row 104, and a touchpad 108 partially contained within a same housing. In some embodiments, dynamic function row 104, which is a touch screen, replaces a function row of the set of physical keys 106 allowing the space consumed by the set of physical keys 106 to be reduced, allowing for a smaller overall body portion 120 or allowing other portions, such as touchpad 108, to be larger. In some embodiments, dynamic function row 104 is approximately 18 inches in length relative to a major dimension of the set of physical keys 106. Although called a "row" for ease of explanation, in some other embodiments, the touch screen comprising dynamic function row 104 in FIG. 1A may take any other form such as a square, circle, a plurality of rows, column, a plurality of columns, a plurality of separate sectors, or the like. Although FIGS. 1A-1B show dynamic function row 104 replacing the function row of the set of physical keys 106, in some other embodiments, dynamic function row 104 may additionally and/or alternatively replace a numpad section, editing/function section, or the like of the set of physical keys 106.

Each physical key of the set of physical keys 106 has at least one associated input. The input may be a printable character, non-printable character, function, or other input. The input associated with a physical key may be shown by a letter, word, symbol, or other indicia shown (e.g., printed) on the surface of the key in Latin script, Arabic characters, Chinese characters, or any other script. For example, the particular physical key indicated at 138 is associated with alphabetic character "z" as indicated by the letter z shown on the key. In another example, a physical key labeled with the word "command" may be associated with a command function. For example, the set of physical keys 106 is associated with a QWERTY, Dvorak, or other keyboard layouts with alphanumeric, numeric, and/or editing/function sections (e.g., standard, extended, or compact) according to ISO/IEC 9995, ANSI-INCITS 154-1988, JIS X 6002-1980, or other similar standards.

A signal corresponding to an input associated with a physical key may be received by the processor of portable computing system 100 (or computing device 202 in FIG. 2A-2D or peripheral keyboard 206 in FIGS. 2A-2B) when a key has been activated by a user. In an illustrative example, each key of the set of physical keys 106 includes two plates and a spring. A user may activate a key by pressing down on the key, which compresses the spring. When the spring is compressed, the two plates may come into contact, allowing electric current to flow through the connected plates. An input corresponding to the key may be provided to a processor in response to the flow of the current through the connected plates. For example, in response to activation of one of the set of keys 106 of peripheral keyboard 206 in FIG. 2C, an input corresponding to the activated key is provided to computing device 202. It will be recognized that other systems for movably actuated keys could be used.

In some embodiments, dynamic function row 104 is a touch screen display (also referred to herein as a touch-sensitive secondary display) that displays one or more user-selectable symbols 142 (sometimes also herein called "user interface elements," "user interface components," "affordances," "buttons," or "soft keys"). For example, dynamic function row 104 replaces the function row keys on a typical keyboard. A user may select a particular one of the one or more user-selectable symbols 142 by touching a location on the touch screen display that corresponds to the particular one of the one or more user-selectable symbols 142. For example, a user may select the user-selectable symbol indicated by magnifying glass symbol 144 by tapping dynamic function row 104 such that the user's finger contacts dynamic function row 104 at the position of the magnifying glass indicator 214. In some embodiments, a tap contact or a tap gesture includes touch-down of a contact and lift-off of the contact within a predetermined amount of time (e.g., 250 ms or the like). In some embodiments, the touch screen display of dynamic function row 104 is implemented using resistive sensing, acoustic sensing, capacitive sensing, optical sensing, infrared sensing, or the like to detect user inputs and selections.

When a user selects a particular one of the one or more user-selectable symbols 142, a signal corresponding to the particular one of the one or more user-selectable symbols 142 is generated by dynamic function row 104. For example, when a user taps "esc" on dynamic function row 104, dynamic function row 104 transmits a signal indicating a user input corresponding to an escape function to the processor of portable computing system 100 (or computing device 202 in FIG. 2A-2D, or the processor of peripheral keyboard 206 in FIG. 2A-2B, or the processor of first input mechanism 212, FIG. 2C or the processor of peripheral input mechanism 222, FIG. 2D).

Figure 2A:
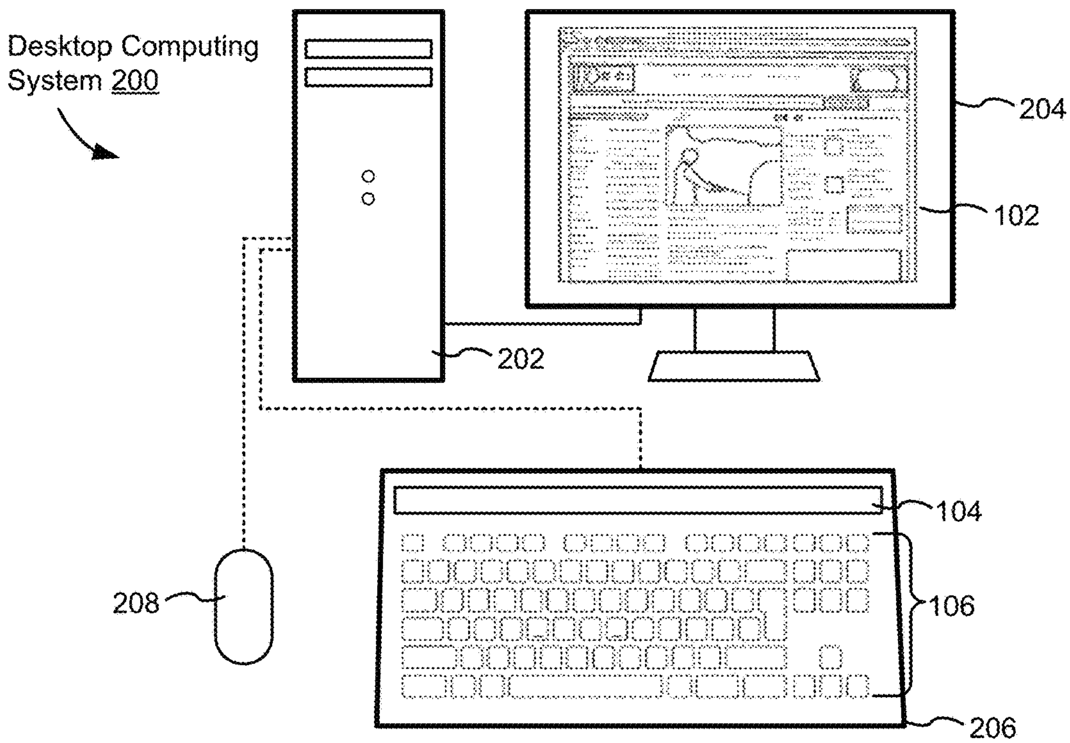
FIG. 2A is an illustrative diagram of a first implementation of a desktop computing system, in accordance with some embodiments.
Figure 2B:
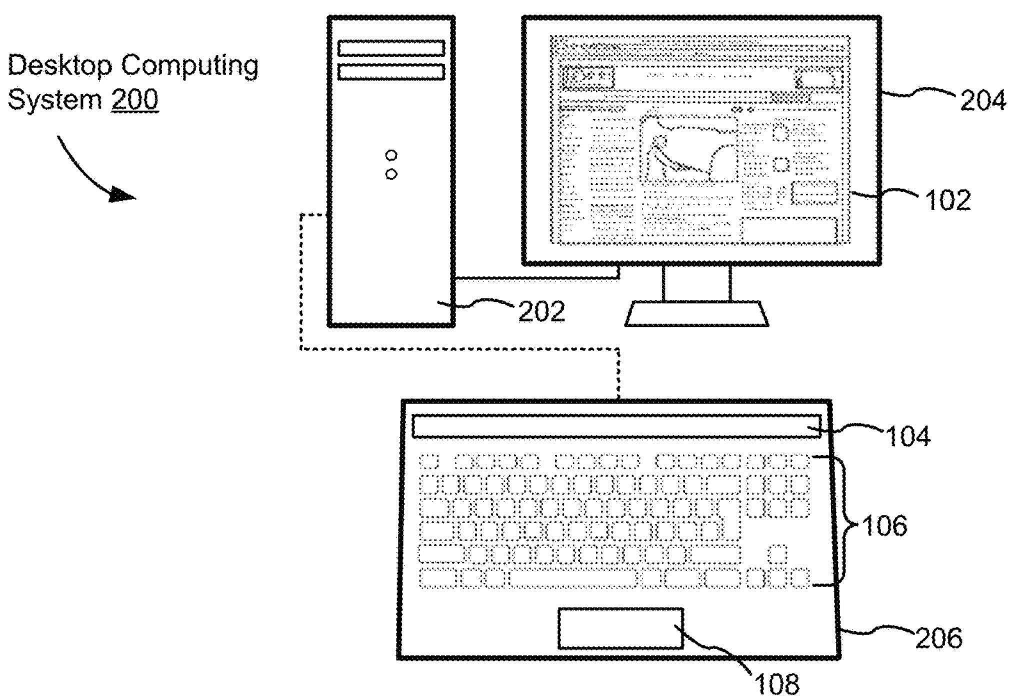
FIG. 2B is an illustrative diagram of a second implementation of a desktop computing system, in accordance with some embodiments.
Figure 2C:
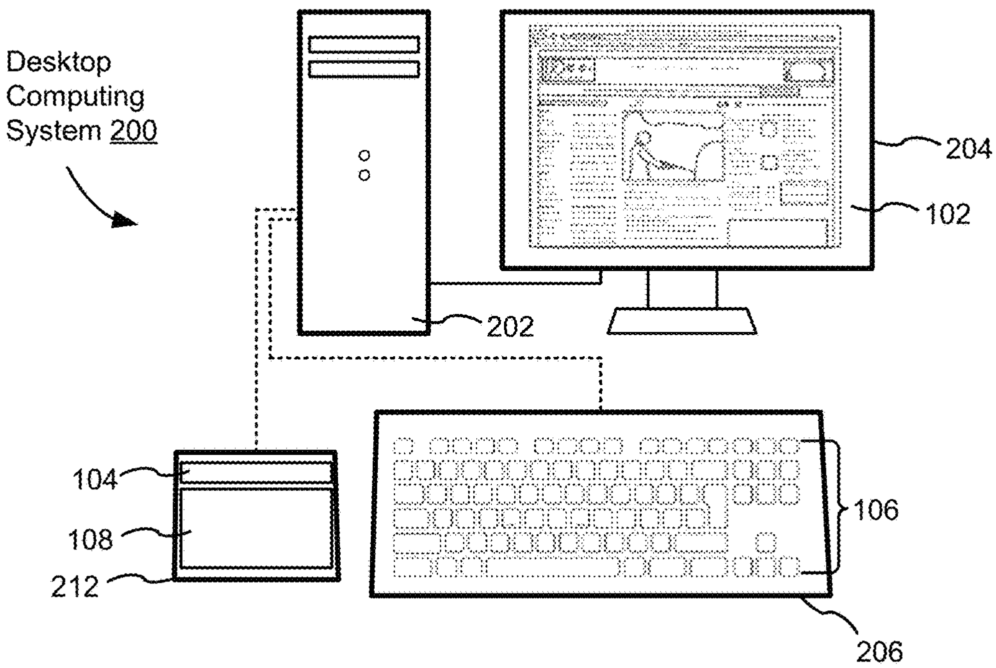
FIG. 2C is an illustrative diagram of a third implementation of a desktop computing system, in accordance with some embodiments.
Figure 2D:
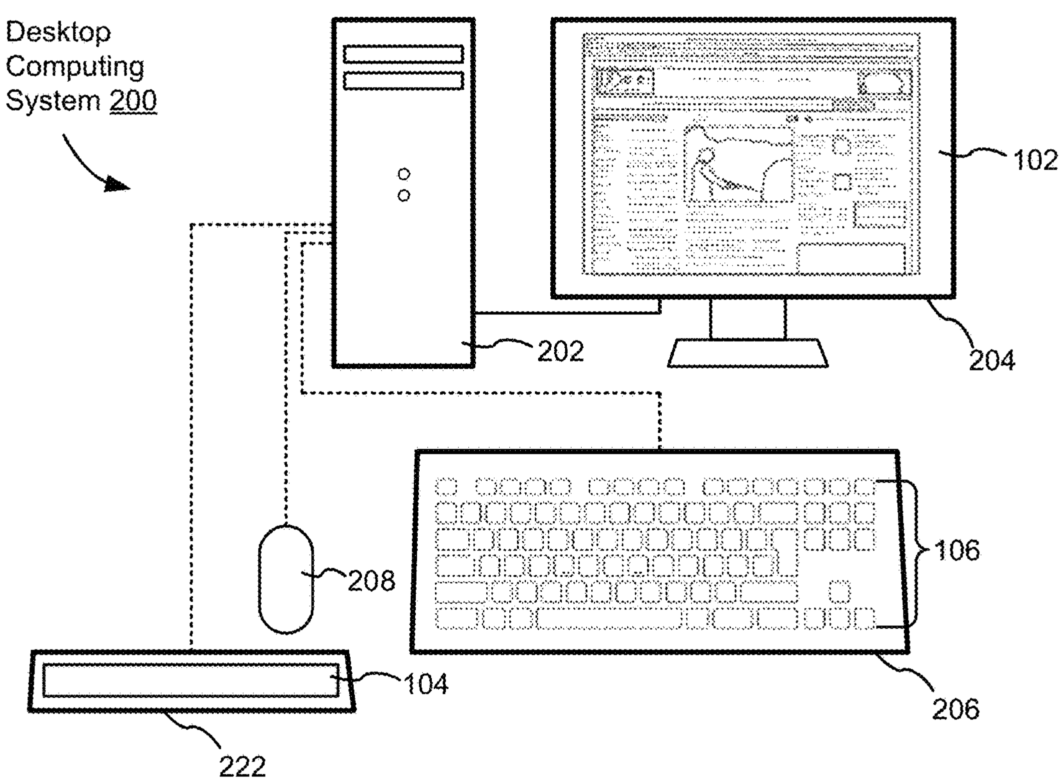
FIG. 2D is an illustrative diagram of a fourth implementation of a desktop computing system, in accordance with some embodiments.

In some embodiments, when a particular one of the one or more user-selectable symbols 142 is selected, dynamic function row 104 transmits a signal corresponding to a position on the touch screen display where the particular one of the one or more user-selectable symbols 142 is displayed, to the processor of portable computing system 100 (or computing device 202 in FIG. 2A-2D, or the processor of peripheral keyboard 206 in FIG. 2A-2B, or the processor of first input mechanism 212, FIG. 2C or the processor of peripheral input mechanism 222, FIG. 2D). For example, dynamic function row 104 may transmit a signal including a position value (0 to 20) depending on the position on the touch screen display of the particular one of the one or more user-selectable symbols 142 that was selected. In the illustrative example of FIG. 1B, the "esc" symbol may have a position value of 0, magnifying glass symbol 144 may have a position value of 16, and so on. A processor of portable computing system 100 (or computing device 202 in FIG. 2A-2D, or the processor of peripheral keyboard 206 in FIG. 2A-2B, or the processor of first input mechanism 212, FIG. 2C, or the processor of peripheral input mechanism 222, FIG. 2D) may receive the signal indicating the position value of the selected user-selectable symbol and interpret the position value using contextual information, such as an element of a graphical user interface displayed on primary display 102 of display portion 110 (or peripheral display device 204, FIGS. 2A-2D) that is currently active or that has focus.

Each of the one or more user-selectable symbols 142 may include an indicator, such as a symbol (e.g., a magnifying glass symbol as shown at 144), an abbreviated word (e.g., "esc"), an unabbreviated word, a character, an image, an animated image, a video, or the like. In some embodiments, a respective one of the one or more user-selectable symbols 142 is capable of receiving user input(s).

An input may be associated with each of the one or more user-selectable symbols 142. The input may be a function, character, numerical value, and the like. A respective one of the one or more user-selectable symbols 142 may include an indicator that corresponds to the input for the respective one of the one or more user-selectable symbols 142. For example, in FIG. 1B, the user-selectable symbol with the abbreviated word "esc" indicates to the user that an escape function is associated with the user-selectable symbol. A function associated with the one or more user-selectable symbols 142 may be activated when the user selects a user-selectable symbol. For example, an escape function may be activated when a user selects the user-selectable symbol with the indicator "esc." Activation of the function may have different effects depending on the current state of portable computing system 100 (or computing device 202 in FIGS. 2A-2D). For example, when a dialog box is open on primary display 102 of display portion 110 (or peripheral display device 204, FIGS. 2A-2D), activating an escape function on dynamic function row 104 may close the dialog box. In another example, when a game application is being executed by a processor of portable computing system 100 (or computing device 202 in FIGS. 2A-2D), activating an escape function on dynamic function row 104 may pause the game.

In some embodiments, functions may be associated with combinations of movably actuated keys and/or user-selectable symbols. For example, simultaneous actuation of a command key and "c" key (i.e., command+c) may be associated with a "copy" function. In another example, simultaneous actuation of the command key and selection of the user-selectable symbol with the indicator "esc" (i.e., command+esc) may activate a function to open a particular application such as a media player application. In yet another example, simultaneous selection of two user-selectable symbols (e.g., the user-selectable symbol with the indicator "esc" and the user-selectable symbol 144 with the magnifying glass indicator) may result in activation of a function, such as a specialized search function.

In some embodiments, a first subset 146 of the one or more user-selectable symbols 142 of dynamic function row 104 may be associated with one group of functions and a second subset 148 of the one or more user-selectable symbols 142 of dynamic function row 104 may be associated with a second group of functions. For example, the user-selectable symbols in first subset 146 may be global functions (e.g., system-level functions or affordances), and the user-selectable symbols in second subset 148 may be application-specific functions. As such, the user-selectable symbols in second subset 148 change when the focus shifts from a first element of a graphical user interface displayed on primary display 102 (e.g., a first window corresponding to an Internet browser application) to a second element of the graphical user interface (e.g., a second window corresponding to an e-mail application). In contrast, the user-selectable symbols in first subset 146 are maintained when the focus shifts from the first element of the graphical user interface to the second element of the graphical user interface.

In some embodiments, the user-selectable symbols in second subset 148 are determined based on an active user interface element display on primary display 102 that is in focus. In some embodiments, the term "in focus" can refer to the active element of the user interface (e.g., a window associated with an application, a particular toolbar or menu associated with an application, or the operating system) that is currently in the foreground and actively running or is controllable by input received from a user of the computing system such as a key press, mouse click, voice command, gestural motion, or the like.

In some embodiments, the first subset 146 of the one or more user-selectable symbols 142 corresponding to global user-selectable symbols occupies a first area of dynamic function row 104 (e.g., the left half of dynamic function row 104), and the second subset 148 of the one or more user-selectable symbols 142 occupies a second area of dynamic function row 104 (e.g., the right half of dynamic function row 104). It will be realized that other proportions of dynamic function row 104 may be allocated to the first subset 146 and the second subset 148. In some embodiments, when no application has focus, the second area of dynamic function row 104 may not include any user-selectable symbols. In some embodiments, dynamic function row 104 includes three or more subsets of user-selectable symbols. In some embodiments, dynamic function row 104 includes a single set of user-selectable symbols that are not divided into subsets. While a single row of user-selectable symbols are shown in dynamic function row 104 in FIG. 1B, it will be recognized that dynamic function row 104 may include multiple rows of user-selectable symbols.

In some embodiments, the change in focus changes which element of the graphical user interface displayed on primary display 102 of display portion 110 (or peripheral display device 204, FIGS. 2A-2D) is active and which element will receive user input. The user input may be received from a keyboard, mouse, touchpad, or other user input device. Additionally and/or alternatively, in some embodiments, the change in focus changes an element that is shown in the foreground of a graphical user interface displayed on primary display 102 of display portion 110 (or peripheral display device 204, FIGS. 2A-2D).

In some embodiments, the change in focus occurs in response to user input, for example, in response to user selection of an element of a graphical user interface (e.g., a different window) displayed on primary display 102 of display portion 110 (or peripheral display device 204, FIG. 2A-2D) or in response to user selection of a user-selectable symbol (e.g., one of the affordances/symbols displayed on dynamic function row 104). The user selection may be a key stroke, a mouse click, a mouse over, a command+tab input, or the like. In some embodiments, the change in focus occurs in response to a determination by an operating system of portable system 100 (or computing device 202 in FIGS. 2A-2D). For example, when a user closes an application window that has focus, the operating system may give focus to a different application, such as an application that had focus prior to the closed application window. In another example, when a user closes an application window that has focus, the operating system may give focus to a dialog box prompting the user to save changes made to a document via the application.

In some embodiments, the change in focus may be a change from one element associated with an application to another element associated with the same application (e.g., from an e-mail composition window of an e-mail application to an inbox list window of an e-mail application or from one tab of an Internet browser application to another tab of an Internet browser application). In some embodiments, the change in focus may be a change from an element associated with one application to an element associated with another application (e.g., from an Internet browser window to an e-mail application window). Further, in some embodiments, the change in focus may be a change from an element associated with an application to an element associated with an operating system, such as a system dialog box, a system setting control (e.g., volume control), a window associated with a file/folder navigation application (e.g., Apple Inc.'s FINDER application), etc. Additionally, focus may also be directed to a dialog box, file directory, setting control (e.g., volume control), or any other element of a graphical user interface for which information can be presented to a user and/or user input can be received.

FIG. 2A is an illustrative diagram of a first implementation of desktop computing system 200 in accordance with some embodiments. Desktop computing system 200 includes a computing device 202, a peripheral display device 204 with primary display 102, a peripheral keyboard 206, and a peripheral mouse 208. Computing device 202 includes one or more processors and memory storing one or more programs for execution by the one or more processors. In some embodiments, peripheral display device 204 may be integrated with computing device 202 such as an iMAC® device. In some embodiments, primary display 102 of peripheral display device 204 is a touch screen display. In FIG. 2A, peripheral display device 204 (also referred to herein as a first housing 204 or housing 204), peripheral keyboard 206, and peripheral mouse 208 are communicatively coupled to computing device 202 via a wired connection, such as USB or PS/2, or via a wireless communication link, using a communication protocol such as Bluetooth, Wi-Fi, or the like. For example, peripheral keyboard 206 (also referred to herein as second housing 206 or housing 206) is not more than fifteen feet from computing device 202 (e.g. approximately three feet away). In FIG. 2A, peripheral keyboard 206 includes dynamic function row 104 and a set of physical keys 106 at least partially contained within a same housing. In some embodiments, dynamic function row 104, which is described in more detail with reference to FIG. 1B, is a touch screen display. In some embodiments, peripheral keyboard 206 includes one or more processors and memory storing one or more programs that may be executed by the one or more processors of peripheral keyboard 206 to perform any of the embodiments described herein. In some embodiments, peripheral keyboard 206 relays signals indicating user inputs (e.g., key strokes and selections of user-selectable symbols/affordances displayed by dynamic function row 104) to computing device 202.

FIG. 2B is an illustrative diagram of a second implementation of desktop computing system 200 in accordance with some embodiments. In FIG. 2B, desktop computing system 200 includes a computing device 202, a peripheral display device 204 with primary display 102, and a peripheral keyboard 206. In FIG. 2B, peripheral display device 204 and peripheral keyboard 206 are communicatively coupled to computing device 202 via a wired connection, such as USB or PS/2, or via a wireless communication link, using a communication protocol such as Bluetooth, Wi-Fi, or the like. In FIG. 2B, peripheral keyboard 206 includes dynamic function row 104, a set of physical keys 106, and touchpad 108 at least partially contained within a same housing. In some embodiments, dynamic function row 104, which is described in more detail with reference to FIG. 1B, is a touch screen display. In some embodiments, peripheral keyboard 206 includes one or more processors and memory storing one or more programs that may be executed by the one or more processors of peripheral keyboard 206 to perform any of the embodiments described herein. In some embodiments, peripheral keyboard 206 relays signals indicating user inputs (e.g., key strokes, user interactions with touchpad 108, and selections of user-selectable symbols/affordances displayed by dynamic function row 104) to computing device 202.

FIG. 2C is an illustrative diagram of a third implementation of desktop computing system 200 in accordance with some embodiments. In FIG. 2C, desktop computing system 200 includes a computing device 202, a peripheral display device 204 with primary display 102, a peripheral keyboard 206, and a first peripheral input mechanism 212. In FIG. 2C, peripheral display device 204, peripheral keyboard 206, and the first peripheral input mechanism 212 are communicatively coupled to computing device 202 via a wired connection, such as USB or PS/2, or via a wireless communication link, using a communication protocol such as Bluetooth, Wi-Fi, or the like. In FIG. 2C, peripheral keyboard 206 includes a set of physical keys 106, and the first peripheral input mechanism 212 includes dynamic function row 104 and touchpad 108 at least partially contained within a same housing. In some embodiments, dynamic function row 104, which is described in more detail with reference to FIG. 1B, is a touch screen display. In some embodiments, the first peripheral input mechanism 212 includes one or more processors and memory storing one or more programs that may be executed by the one or more processors of the first peripheral input mechanism 212 to perform any of the embodiments described herein. In some embodiments, the first peripheral input mechanism 212 relays signals indicating user inputs (e.g., user interactions with touchpad 108 and user selections of user-selectable symbols/affordances displayed by dynamic function row 104) to computing device 202.

FIG. 2D is an illustrative diagram of a fourth implementation of desktop computing system 200 in accordance with some embodiments. In FIG. 2D, desktop computing system 200 includes a computing device 202, a peripheral display device 204 with primary display 102, a peripheral keyboard 206, a peripheral mouse 208, and a second peripheral input mechanism 222. In FIG. 2D, peripheral display device 204, peripheral keyboard 206, peripheral mouse 208, and the second peripheral input mechanism 222 are communicatively coupled to computing device 202 via a wired connection, such as USB or PS/2, or via a wireless communication link, using a communication protocol such as Bluetooth, Wi-Fi, or the like. In FIG. 2A, peripheral keyboard 206 includes dynamic function row 104 and a set of physical keys 106. In FIG. 2D, peripheral keyboard 206 includes a set of physical keys 106, and the second peripheral input mechanism 222 includes dynamic function row 104 at least partially contained within the housing of the second peripheral input mechanism 222. In some embodiments, dynamic function row 104, which is described in more detail with reference to FIG. 1B, is a touch screen display. In some embodiments, the second peripheral input mechanism 222 includes one or more processors and memory storing one or more programs that may be executed by the one or more processors of the second peripheral input mechanism 222 to perform any of the embodiments described herein. In some embodiments, the second peripheral input mechanism 222 relays signals indicating user inputs (e.g., user selections of user-selectable symbols/affordances displayed by dynamic function row 104) to computing device 202.

Figure 3A:
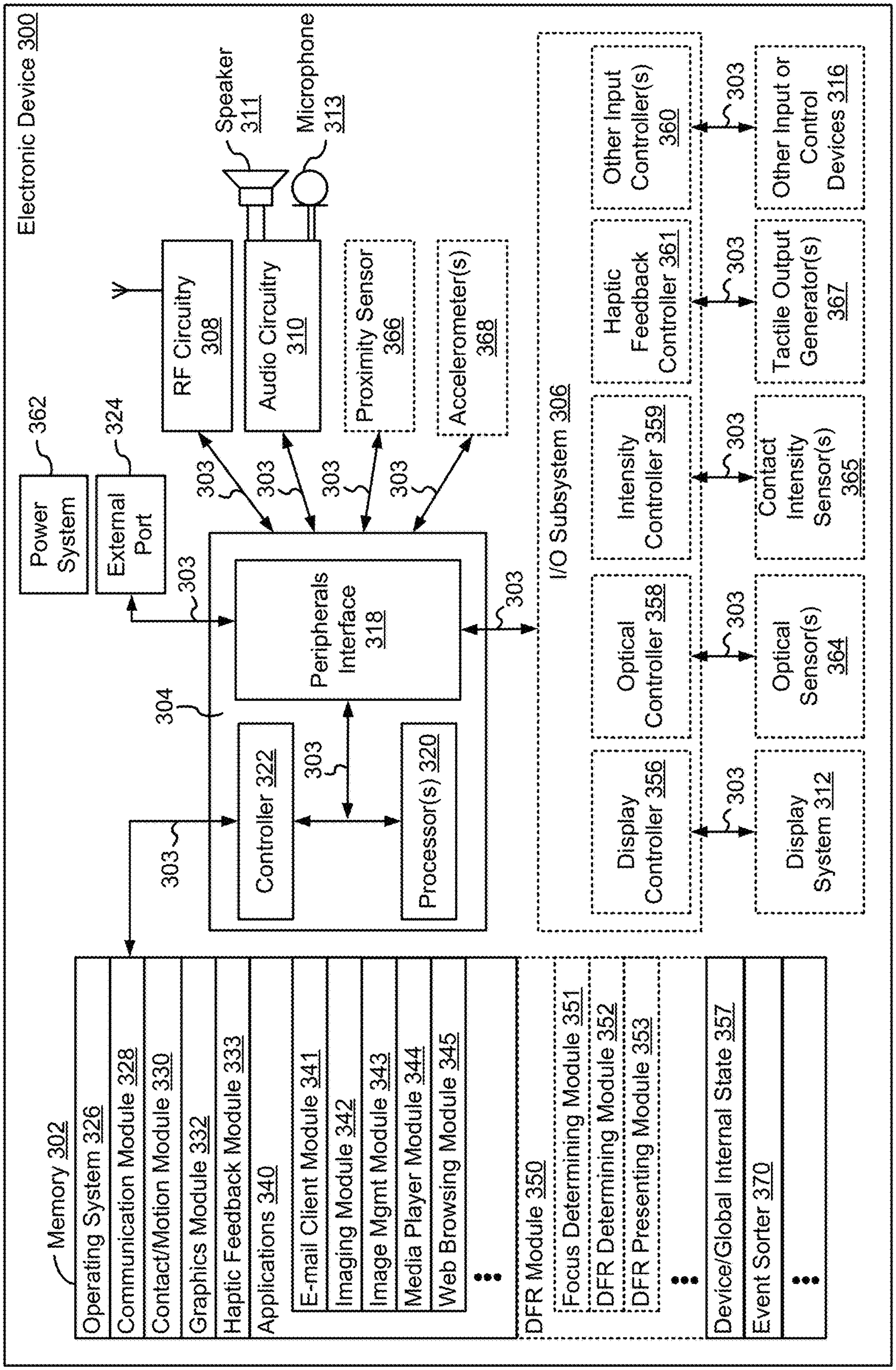
FIG. 3A is a block diagram of an electronic device, in accordance with some embodiments.

FIG. 3A is a block diagram of an electronic device 300, in accordance with some embodiments. In some embodiments, electronic device 300 is a portable electronic device, such as a laptop (e.g., portable computing system 100, FIG. 1A). In some embodiments, electronic device 300 is not a portable device, but is a desktop computer (e.g., computing device 202 of desktop computing system 200, FIGS. 2A-2D), which is communicatively coupled with a peripheral display system (e.g., peripheral display device 204, FIGS. 2A-2D) and optionally a peripheral touch-sensitive surface (e.g., a touchpad 108, FIGS. 2B-2C and/or a touch-sensitive display, such as peripheral display device 204, FIGS. 2A-2D and/or dynamic function row 104, FIGS. 2A-2D).

Electronic device 300 typically supports a variety of applications, such as one or more of the following: a drawing application, a presentation application, a word processing application, a website creation application, a disk authoring application, a spreadsheet application, a gaming application, a video conferencing application, an e-mail application, an instant messaging application, an image management application, a digital camera application, a digital video camera application, a web browser application, and/or a media player application.

The various applications that are executed on electronic device 300 optionally use at least one common physical user-interface device, such as the touch-sensitive surface. One or more functions of the touch-sensitive surface as well as corresponding information displayed by electronic device 300 are, optionally, adjusted and/or varied from one application to the next and/or within an application. In this way, a common physical architecture (such as the touch-sensitive surface) of electronic device 300 optionally supports the variety of applications with user interfaces that are intuitive and transparent to the user.

Electronic device 300 includes memory 302 (which optionally includes one or more computer readable storage mediums), memory controller 322, one or more processing units (CPU(s)) 320, peripherals interface 318, RF circuitry 308, audio circuitry 310, speaker 311, microphone 313, input/output (I/O) subsystem 306, other input or control devices 316, and external port 324. Electronic device 300 optionally includes a display system 312 (e.g., primary display 102 of display portion 110, FIG. 1A and/or dynamic function row 104, FIGS. 1A-1B), which may be a touch-sensitive display (sometimes also herein called a "touch screen" or a "touch screen display"). Electronic device 300 optionally includes one or more optical sensors 364. Electronic device 300 optionally includes one or more intensity sensors 365 for detecting intensity of contacts on a touch-sensitive surface such as touch-sensitive display or a touchpad. Electronic device 300 optionally includes one or more tactile output generators 367 for generating tactile outputs on a touch-sensitive surface such as touch-sensitive display or a touchpad (e.g., touchpad 108, FIGS. 1A-1B). These components optionally communicate over one or more communication buses or signal lines 303.

As used in the specification, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or touch/track pad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that electronic device 300 is only an example and that electronic device 300 optionally has more or fewer components than shown, optionally combines two or more components, or optionally has a different configuration or arrangement of the components. The various components shown in FIG. 3A are implemented in hardware, software, firmware, or a combination thereof, including one or more signal processing and/or application specific integrated circuits.

Memory 302 optionally includes high-speed random access memory and optionally also includes non-volatile memory, such as one or more magnetic disk storage devices, flash memory devices, or other non-volatile solid-state memory devices. Access to memory 302 by other components of electronic device 300, such as CPU(s) 320 and peripherals interface 318, is, optionally, controlled by memory controller 322. Peripherals interface 318 can be used to couple input and output peripherals to CPU(s) 320 and memory 302. The one or more processing units 320 run or execute various software programs and/or sets of instructions stored in memory 302 to perform various functions for electronic device 300 and to process data. In some embodiments, peripherals interface 318, CPU(s) 320, and memory controller 322 are, optionally, implemented on a single chip, such as chip 304. In some other embodiments, they are, optionally, implemented on separate chips.

RF (radio frequency) circuitry 308 receives and sends RF signals, also called electromagnetic signals. RF circuitry 308 converts electrical signals to/from electromagnetic signals and communicates with communications networks and other communications devices via the electromagnetic signals. RF circuitry 308 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 308 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g, and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 310, speaker 311, and microphone 313 provide an audio interface between a user and electronic device 300. Audio circuitry 310 receives audio data from peripherals interface 318, converts the audio data to an electrical signal, and transmits the electrical signal to speaker 311. Speaker 311 converts the electrical signal to human-audible sound waves. Audio circuitry 310 also receives electrical signals converted by microphone 313 from sound waves. Audio circuitry 310 converts the electrical signals to audio data and transmits the audio data to peripherals interface 318 for processing. Audio data is, optionally, retrieved from and/or transmitted to memory 302 and/or RF circuitry 308 by peripherals interface 318. In some embodiments, audio circuitry 310 also includes a headset jack. The headset jack provides an interface between audio circuitry 310 and removable audio input/output peripherals, such as output-only headphones or a headset with both output (e.g., a headphone for one or both ears) and input (e.g., a microphone).

I/O subsystem 306 couples the input/output peripherals of electronic device 300, such as display system 312 and other input or control devices 316, to peripherals interface 318. I/O subsystem 306 optionally includes display controller 356, optical sensor controller 358, intensity sensor controller 359, haptic feedback controller 361, and one or more other input controllers 360 for other input or control devices. The one or more other input controllers 360 receive/send electrical signals from/to other input or control devices 316. The other input or control devices 316 optionally include physical buttons (e.g., push buttons, rocker buttons, etc.), dials, slider switches, joysticks, click wheels, and so forth. In some alternate embodiments, other input controller(s) 360 are, optionally, coupled with any (or none) of the following: a keyboard, infrared port, USB port, and a pointer device such as a mouse. The one or more physical buttons optionally include an up/down button for volume control of speaker 311 and/or microphone 313.

Display system 312 (e.g., primary display 102 of display portion 110, FIG. 1A and/or dynamic function row 104, FIGS. 1A-1B) provides an output interface (and, optionally, an input interface when it is a touch-sensitive display) between electronic device 300 and a user. Display controller 356 receives and/or sends electrical signals from/to display system 312. Display system 312 displays visual output to the user. The visual output optionally includes graphics, text, icons, video, and any combination thereof (collectively termed "graphics"). In some embodiments, some or all of the visual output corresponds to user-interface objects/elements.

In some embodiments, display system 312 (e.g., primary display 102 of display portion 110, FIG. 1A and/or dynamic function row 104, FIGS. 1A-1B) is a touch-sensitive display with a touch-sensitive surface, sensor, or set of sensors that accepts input from the user based on haptic and/or tactile contact. As such, display system 312 and display controller 356 (along with any associated modules and/or sets of instructions in memory 302) detect contact (and any movement or breaking of the contact) on display system 312 and convert the detected contact into interaction with user-interface objects (e.g., one or more soft keys, icons, web pages, or images) that are displayed on display system 312. In one example embodiment, a point of contact between display system 312 and the user corresponds to an area under a finger of the user.

Display system 312 (e.g., primary display 102 of display portion 110, FIG. 1A and/or dynamic function row 104, FIGS. 1A-1B) optionally uses LCD (liquid crystal display) technology, LPD (light emitting polymer display) technology, LED (light emitting diode) technology, or OLED (organic light emitting diode) technology, although other display technologies are used in other embodiments. In some embodiments, when display system 312 is a touch-sensitive display, display system 312 and display controller 356 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with display system 312. In one example embodiment, projected mutual capacitance sensing technology is used, such as that found in the iPHONE®, iPODTOUCH®, and iPAD® from Apple Inc. of Cupertino, California.

Display system 312 (e.g., primary display 102 of display portion 110, FIG. 1A and/or dynamic function row 104, FIGS. 1A-1B) optionally has a video resolution in excess of 400 dpi (e.g., 500 dpi, 800 dpi, or greater). In some embodiments, display system 312 is a touch-sensitive display with which the user optionally makes contact using a stylus, a finger, and so forth. In some embodiments, the user interface is designed to work primarily with finger-based contacts and gestures. In some embodiments, electronic device 300 translates the rough finger-based input into a precise pointer/cursor position or command for performing the actions desired by the user.

In some embodiments, in addition to display system 312, electronic device 300 optionally includes a touchpad (e.g., touchpad 108, FIGS. 1A-1B) for activating or deactivating particular functions. In some embodiments, the touchpad is a touch-sensitive area of electronic device 300 that, unlike display system 312, does not display visual output. In some embodiments, when display system 312 is a touch-sensitive display, the touchpad is, optionally, a touch-sensitive surface that is separate from display system 312, or an extension of the touch-sensitive surface formed by display system 312.

Electronic device 300 also includes power system 362 for powering the various components. Power system 362 optionally includes a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in portable devices.

Electronic device 300 optionally also includes one or more optical sensors 364 coupled with optical sensor controller 358 in I/O subsystem 306. Optical sensor(s) 364 optionally includes charge-coupled device (CCD) or complementary metal-oxide semiconductor (CMOS) phototransistors. Optical sensor(s) 364 receive light from the environment, projected through one or more lens, and converts the light to data representing an image. In conjunction with imaging module 343, optical sensor(s) 364 optionally capture still images or video. In some embodiments, an optical sensor is located on the front of electronic device 300 so that the user's image is, optionally, obtained for videoconferencing while the user views the other video conference participants on display system 312.

Electronic device 300 optionally also includes one or more contact intensity sensor(s) 365 coupled with intensity sensor controller 359 in I/O subsystem 306. Contact intensity sensor(s) 365 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 365 receives contact intensity information (e.g., pressure information or a proxy for pressure information) from the environment. In some embodiments, at least one contact intensity sensor is collocated with, or proximate to, a touch-sensitive surface (e.g., touchpad 108, FIG. 1A-1B or display system 312 when it is a touch-sensitive display).

Electronic device 300 optionally also includes one or more tactile output generators 367 coupled with haptic feedback controller 361 in I/O subsystem 306. Tactile output generator(s) 367 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor(s) 365 receives tactile feedback generation instructions from haptic feedback module 333 and generates tactile outputs that are capable of being sensed by a user of electronic device 300. In some embodiments, at least one tactile output generator is collocated with, or proximate to, a touch-sensitive surface (e.g., touchpad 108, FIG. 1A-1B or display system 312 when it is a touch-sensitive display) and, optionally, generates a tactile output by moving the touch-sensitive surface vertically (e.g., in/out of a surface of electronic device 300) or laterally (e.g., back and forth in the same plane as a surface of electronic device 300).

Electronic device 300 optionally also includes one or more proximity sensors 366 coupled with peripherals interface 318. Alternately, proximity sensor(s) 366 are coupled with other input controller(s) 360 in I/O subsystem 306. Electronic device 300 optionally also includes one or more accelerometers 368 coupled with peripherals interface 318. Alternately, accelerometer(s) 368 are coupled with other input controller(s) 360 in I/O subsystem 306.

In some embodiments, the software components stored in memory 302 include operating system 326, communication module 328 (or set of instructions), contact/motion module 330 (or set of instructions), graphics module 332 (or set of instructions), applications 340 (or sets of instructions), and dynamic function row module 350 (or sets of instructions). Furthermore, in some embodiments, memory 302 stores device/global internal state 357 (or sets of instructions), as shown in FIG. 3A. Device/global internal state 357 includes one or more of: active application state, indicating which applications, if any, are currently active and/or in focus; display state, indicating what applications, views or other information occupy various regions of display system 312 (e.g., primary display 102 of display portion 110, FIG. 1A and/or dynamic function row 104, FIGS. 1A-1B) and/or a peripheral display system (e.g., primary display 102 of peripheral display device 204, FIGS. 2A-2D and/or dynamic function row 104, FIGS. 2A-2D); sensor state, including information obtained from various sensors and input or control devices 316 of electronic device 300; and location information concerning the location and/or attitude of electronic device 300.

Operating system 326 (e.g., DARWIN, RTXC, LINUX, UNIX, OS X, WINDOWS, or an embedded operating system such as VXWorks) includes various software components and/or drivers for controlling and managing general system tasks (e.g., memory management, storage device control, power management, etc.) and facilitates communication between various hardware and software components.

Communication module 328 facilitates communication with other devices (e.g., computing device 202, FIGS. 2A-2D; peripheral mouse 208, FIGS. 2A and 2D; peripheral keyboard 206, FIGS. 2A-2B; first peripheral input mechanism 212, FIG. 2C; and/or second peripheral input mechanism 222, FIG. 2D) over one or more external ports 324 and/or RF circuitry 308 and also includes various software components for sending/receiving data via RF circuitry 308 and/or external port 324. External port 324 (e.g., Universal Serial Bus (USB), FIREWIRE, etc.) is adapted for coupling directly to other devices or indirectly over a network (e.g., the Internet, wireless LAN, etc.). In some embodiments, external port 324 is a multi-pin (e.g., 30-pin) connector that is the same as, or similar to and/or compatible with the 30-pin connector used on iPod® devices.

Contact/motion module 330 optionally detects contact with display system 312 when it is a touch-sensitive display (in conjunction with display controller 356) and other touch sensitive devices (e.g., a touchpad or physical click wheel). Contact/motion module 330 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 330 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 330 also detects contact on a touchpad (e.g., touchpad 108, FIGS. 1A-1B).

In some embodiments, contact/motion module 330 uses a set of one or more intensity thresholds to determine whether an operation has been performed by a user (e.g., to determine whether a user has selected or "clicked" on an affordance). In some embodiments at least a subset of the intensity thresholds are determined in accordance with software parameters (e.g., the intensity thresholds are not determined by the activation thresholds of particular physical actuators and can be adjusted without changing the physical hardware of electronic device 300). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 330 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap contact includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and in some embodiments also followed by detecting a finger-up (lift off) event.

Graphics module 332 includes various known software components for rendering and causing display of graphics on primary display 102 (e.g., primary display 102 of display portion 110, FIG. 1A or primary display 102 of peripheral display device 204, FIGS. 2A-2D) or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like. In some embodiments, graphics module 332 stores data representing graphics to be used. Each graphic is, optionally, assigned a corresponding code. Graphics module 332 receives, from applications etc., one or more codes specifying graphics to be displayed along with, if necessary, coordinate data and other graphic property data, and then generates screen image data to output to display controller 356.

Haptic feedback module 333 includes various software components for generating instructions used by tactile output generator(s) 367 to produce tactile outputs at one or more locations on electronic device 300 in response to user interactions with electronic device 300.

Applications 340 optionally include the following modules (or sets of instructions), or a subset or superset thereof:

- e-mail client module 341 (sometimes also herein called "mail app" or "e-mail app") for receiving, sending, composing, and viewing e-mails;
- imaging module 342 for capturing still and/or video images;
- image management module 343 (sometimes also herein called "photo app") for editing and viewing still and/or video images;

media player module 344 (sometimes also herein called "media player app") for playback of audio and/or video; and web browsing module 345 (sometimes also herein called "web browser") for connecting to and browsing the Internet.

Examples of other applications 340 that are, optionally, stored in memory 302 include messaging and communications applications, word processing applications, other image editing applications, drawing applications, presentation applications, JAVA-enabled applications, encryption applications, digital rights management applications, voice recognition applications, and voice replication applications.

In conjunction with one or more of RF circuitry 308, display system 312 (e.g., primary display 102 of display portion 110, FIG. 1A and/or dynamic function row 104, FIGS. 1A-1B), display controller 356, and contact module 330, graphics module 332, e-mail client module 341 includes executable instructions to create, send, receive, and manage e-mail in response to user instructions. In conjunction with image management module 343, e-mail client module 341 makes it very easy to create and send e-mails with still or video images taken with imaging module 342.

In conjunction with one or more of display system 312 (e.g., primary display 102 of display portion 110, FIG. 1A and/or dynamic function row 104, FIGS. 1A-1B), display controller 356, optical sensor(s) 364, optical sensor controller 358, contact module 330, graphics module 332, and image management module 343, imaging module 342 includes executable instructions to capture still images or video (including a video stream) and store them into memory 302, modify characteristics of a still image or video, or delete a still image or video from memory 302.

In conjunction with one or more of display system 312 (e.g., primary display 102 of display portion 110, FIG. 1A and/or dynamic function row 104, FIGS. 1A-1B), display controller 356, contact module 330, graphics module 332, and imaging module 342, image management module 343 includes executable instructions to arrange, modify (e.g., edit), or otherwise manipulate, label, delete, present (e.g., in a digital slide show or album), and store still and/or video images.

In conjunction with one or more of display system 312 (e.g., primary display 102 of display portion 110, FIG. 1A and/or dynamic function row 104, FIGS. 1A-1B), display controller 356, contact module 330, graphics module 332, audio circuitry 310, speaker 311, RF circuitry 308, and web browsing module 345, media player module 344 includes executable instructions that allow the user to download and play back recorded music and other sound files stored in one or more file formats, such as MP3 or AAC files, and executable instructions to display, present or otherwise play back videos (e.g., on primary display 102 of display portion 110, FIG. 1A or primary display 102 of peripheral display device 2014, FIGS. 2A-2B connected via external port 324).

In conjunction with one or more of RF circuitry 308, display system 312 (e.g., primary display 102 of display portion 110, FIG. 1A and/or dynamic function row 104, FIGS. 1A-1B), display controller 356, contact module 330, and graphics module 332, web browsing module 345 includes executable instructions to browse the Internet in accordance with user instructions, including searching, linking to, receiving, and displaying web pages or portions thereof, as well as attachments and other files linked to web pages.

Dynamic function row (DFR) module 350 includes: focus determining module 351, DFR determining module 352, and DFR presenting module 353. In some embodiments, focus determining module 351 is configured to determine an active user interface element that is in focus on the graphical user interface displayed by display system 312 (e.g., primary display 102 of display portion 110, FIG. 1A) or a peripheral display system (e.g., peripheral display device 204, FIGS. 2A-2D). In some embodiments, DFR determining module 352 is configured to determine graphics (e.g., a set of one or more affordances) based on the active user interface element that is in focus. In some embodiments, DFR presenting module 353 is configured to render the graphics determined by DFR determining module 352 on display system 312 (e.g., dynamic function row 104, FIGS. 1A-1B). DFR presenting module 353 includes various known software components for rendering and causing display of graphics on display system 312 (e.g., dynamic function row 104, FIGS. 1A-1B), including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations, and the like. In some embodiments, DFR module 350 includes other modules for: adjusting the sensitivity of dynamic function row 104; adjusting the audible and/or haptic feedback provided by dynamic function row 104; adjusting the settings of affordances and information displayed by dynamic function row 104 (e.g., size, brightness, font, language, and the like); adjusting the current power mode of dynamic function row 104 (e.g., normal and low-power modes); and the like.

In some embodiments, the dynamic function row module 350 interfaces with components that allow for providing predicted/proactive/suggested content items (including predicted recipients, suggested text completion strings, proactively suggested applications, etc.). Proactively suggesting content items is discussed in more detail in U.S. application Ser. No. 15/167,713, which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 302 optionally stores a subset of the modules and data structures identified above. Furthermore, memory 302 optionally stores additional modules and data structures not described above.

Figure 3B:
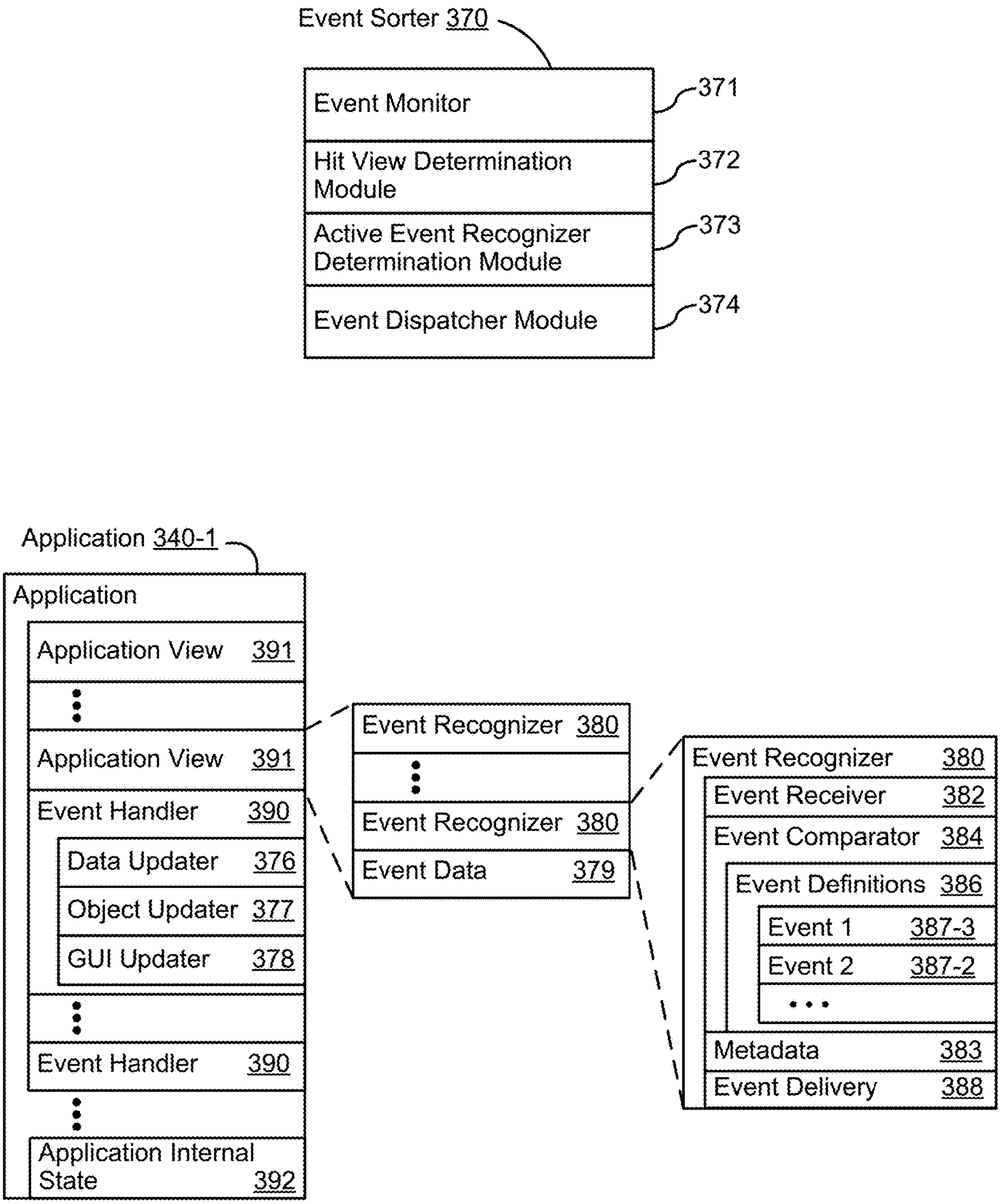
FIG. 3B is a block diagram of components for event handling of FIG. 3A, in accordance with some embodiments.

FIG. 3B is a block diagram of components for event handling of FIG. 3A, in accordance with some embodiments. In some embodiments, memory 302 (FIG. 3A) includes event sorter 370 (e.g., in operating system 326) and an application 340-1 (e.g., any of the aforementioned applications 341, 342, 343, 344, or 345).

Event sorter 370 receives event information and determines the application 340-1 and application view 391 of application 340-1 to which to deliver the event information. Event sorter 370 includes event monitor 371 and event dispatcher module 374. In some embodiments, application 340-1 includes application internal state 392, which indicates the current application view(s) displayed on display system 312 (e.g., primary display 102 of display portion 110, FIG. 1A and/or dynamic function row 104, FIGS. 1A-1B) when the application is active or executing. In some embodiments, device/global internal state 357 is used by event sorter 370 to determine which application(s) is (are) currently active or in focus, and application internal state 392 is used by event sorter 370 to determine application views 391 to which to deliver event information.

In some embodiments, application internal state 392 includes additional information, such as one or more of: resume information to be used when application 340-1 resumes execution, user interface state information that indicates information being displayed or that is ready for display by application 340-1, a state queue for enabling the user to go back to a prior state or view of application 340-1, and a redo/undo queue of previous actions taken by the user.

Event monitor 371 receives event information from peripherals interface 318. Event information includes information about a sub-event (e.g., a user touch on display system 312 when it is a touch-sensitive display, as part of a multi-touch gesture). Peripherals interface 318 transmits information it receives from I/O subsystem 306 or a sensor, such as proximity sensor(s) 366, accelerometer(s) 368, and/or microphone 313 (through audio circuitry 310). Information that peripherals interface 318 receives from I/O subsystem 306 includes information from display system 312 when it is a touch-sensitive display or another touch-sensitive surface (e.g., touchpad 108, FIGS. 1A-1B).

In some embodiments, event monitor 371 sends requests to the peripherals interface 318 at predetermined intervals. In response, peripherals interface 318 transmits event information. In other embodiments, peripheral interface 318 transmits event information only when there is a significant event (e.g., receiving an input above a predetermined noise threshold and/or for more than a predetermined duration).

In some embodiments, event sorter 370 also includes a hit view determination module 372 and/or an active event recognizer determination module 373.

Hit view determination module 372 provides software procedures for determining where a sub-event has taken place within one or more views, when display system 312 displays more than one view, where views are made up of controls and other elements that a user can see on the display.

Another aspect of the user interface associated with an application is a set of views, sometimes herein called application views or user interface windows, in which information is displayed and touch-based gestures occur. The application views (of an application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 372 receives information related to sub-events of a touch-based gesture. When an application has multiple views organized in a hierarchy, hit view determination module 372 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 373 determines which view or views within a view hierarchy should receive a particular sequence of sub-events. In some embodiments, active event recognizer determination module 373 determines that only the hit view should receive a particular sequence of sub-events. In other embodiments, active event recognizer determination module 373 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 374 dispatches the event information to an event recognizer (e.g., event recognizer 380). In embodiments including active event recognizer determination module 373, event dispatcher module 374 delivers the event information to an event recognizer determined by active event recognizer determination module 373. In some embodiments, event dispatcher module 374 stores in an event queue the event information, which is retrieved by a respective event receiver 382.

In some embodiments, operating system 326 includes event sorter 370. Alternatively, application 340-1 includes event sorter 370. In yet other embodiments, event sorter 370 is a stand-alone module, or a part of another module stored in memory 302, such as contact/motion module 330.

In some embodiments, application 340-1 includes a plurality of event handlers 390 and one or more application views 391, each of which includes instructions for handling touch events that occur within a respective view of the application's user interface. Each application view 391 of the application 340-1 includes one or more event recognizers 380. Typically, an application view 391 includes a plurality of event recognizers 380. In other embodiments, one or more of event recognizers 380 are part of a separate module, such as a user interface kit (not shown) or a higher level object from which application 340-1 inherits methods and other properties. In some embodiments, a respective event handler 390 includes one or more of: data updater 376, object updater 377, GUI updater 378, and/or event data 379 received from event sorter 370. Event handler 390 optionally utilizes or calls data updater 376, object updater 377 or GUI updater 378 to update the application internal state 392. Alternatively, one or more of the application views 391 includes one or more respective event handlers 390. Also, in some embodiments, one or more of data updater 376, object updater 377, and GUI updater 378 are included in an application view 391.

A respective event recognizer 380 receives event information (e.g., event data 379) from event sorter 370, and identifies an event from the event information. Event recognizer 380 includes event receiver 382 and event comparator 384. In some embodiments, event recognizer 380 also includes at least a subset of: metadata 383, and event delivery instructions 388 (which optionally include sub-event delivery instructions).

Event receiver 382 receives event information from event sorter 370. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 384 compares the event information to predefined event or sub-event definitions and, based on the comparison, determines an event or sub-event, or determines or updates the state of an event or sub-event. In some embodiments, event comparator 384 includes event definitions 386. Event definitions 386 contain definitions of events (e.g., predefined sequences of sub-events), for example, event 1 (387-1), event 2 (387-2), and others. In some embodiments, sub-events in an event 387 include, for example, touch begin, touch end, touch movement, touch cancellation, and multiple touching. In one example, the definition for event 1 (387-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (387-2) is a dragging on a displayed object. The dragging, for example, comprises a touch (or contact) on the displayed object for a predetermined phase, a movement of the touch across display system 312 when it is a touch-sensitive display, and lift-off of the touch (touch end). In some embodiments, the event also includes information for one or more associated event handlers 390.

In some embodiments, event definition 387 includes a definition of an event for a respective user-interface object. In some embodiments, event comparator 384 performs a hit test to determine which user-interface object is associated with a sub-event. For example, in an application view in which three user-interface objects are displayed on display system 312, when a touch is detected on display system 312 when it is a touch-sensitive display, event comparator 384 performs a hit test to determine which of the three user-interface objects is associated with the touch (sub-event). If each displayed object is associated with a respective event handler 390, the event comparator uses the result of the hit test to determine which event handler 390 should be activated. For example, event comparator 384 selects an event handler associated with the sub-event and the object triggering the hit test.

In some embodiments, the definition for a respective event 387 also includes delayed actions that delay delivery of the event information until after it has been determined whether the sequence of sub-events does or does not correspond to the event recognizer's event type.

When a respective event recognizer 380 determines that the series of sub-events do not match any of the events in event definitions 386, the respective event recognizer 380 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 380 includes metadata 383 with configurable properties, flags, and/or lists that indicate how the event delivery system should perform sub-event delivery to actively involved event recognizers. In some embodiments, metadata 383 includes configurable properties, flags, and/or lists that indicate how event recognizers interact, or are enabled to interact, with one another. In some embodiments, metadata 383 includes configurable properties, flags, and/or lists that indicate whether sub-events are delivered to varying levels in the view or programmatic hierarchy.

In some embodiments, a respective event recognizer 380 activates event handler 390 associated with an event when one or more particular sub-events of an event are recognized. In some embodiments, a respective event recognizer 380 delivers event information associated with the event to event handler 390. Activating an event handler 390 is distinct from sending (and deferred sending) sub-events to a respective hit view. In some embodiments, event recognizer 380 throws a flag associated with the recognized event, and event handler 390 associated with the flag catches the flag and performs a predefined process.

In some embodiments, event delivery instructions 388 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 376 creates and updates data used in application 340-1. For example, data updater 376 stores a video file used by media player module 344. In some embodiments, object updater 377 creates and updates objects used by application 340-1. For example, object updater 377 creates a new user-interface object or updates the position of a user-interface object. GUI updater 378 updates the GUI. For example, GUI updater 378 prepares display information and sends it to graphics module 332 for display on display system 312 (e.g., primary display 102 of display portion 110, FIG. 1A and/or dynamic function row 104, FIGS. 1A-1B).

In some embodiments, event handler(s) 390 includes or has access to data updater 376, object updater 377, and GUI updater 378. In some embodiments, data updater 376, object updater 377, and GUI updater 378 are included in a single module of an application 340-1 or application view 391. In other embodiments, they are included in two or more software modules.

It shall be understood that the foregoing discussion regarding event handling of user touches on touch-sensitive displays also applies to other forms of user inputs to operate electronic device 300 with input-devices, not all of which are initiated on touch screens. For example, mouse movement and mouse button presses, optionally coordinated with single or multiple keyboard presses or holds; contact movements such as taps, drags, scrolls, etc., on touchpads; pen stylus inputs; movement of the device; oral instructions; detected eye movements; biometric inputs; and/or any combination thereof are optionally utilized as inputs corresponding to sub-events which define an event to be recognized.

Figure 4:
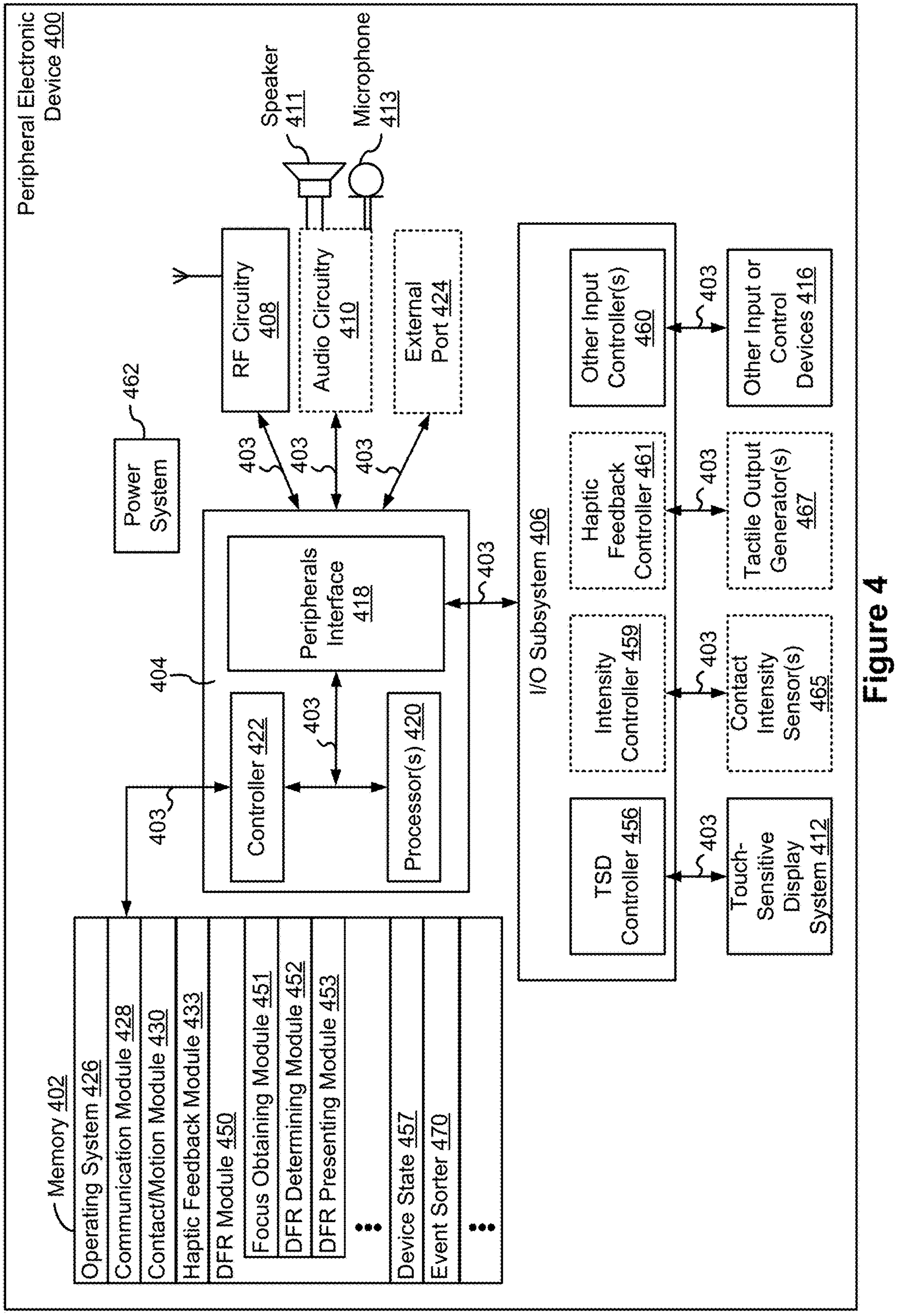
FIG. 4 is a block diagram of a peripheral electronic device, in accordance with some embodiments.

FIG. 4 shows a block diagram of a peripheral electronic device 400, in accordance with some embodiments. In some embodiments, peripheral electronic device 400 is a peripheral input and output device that at least partially contains a dynamic function row 104 and a physical input mechanism, such as a set of physical keys (e.g., the set of physical keys 106, FIGS. 2A-2B) and/or a touchpad (e.g., touchpad 108, FIGS. 2B-2C), within a same housing. Examples of peripheral electronic device 400 includes: peripheral keyboard (e.g., peripheral keyboard 206, FIGS. 2A-2B), a peripheral touch-sensitive surface (e.g., first peripheral input mechanism 212, FIG. 2C), or other peripheral input mechanisms (e.g., second peripheral input mechanism 222, FIG. 2D).

Peripheral electronic device 400 is communicatively coupled with computing device 202 (FIGS. 2A-2D). For example, peripheral electronic device 400 is communicatively coupled with computing device 202 via a wired connection, such as USB or PS/2, or via a wireless communication link, using a communication protocol such as Bluetooth, Wi-Fi, or the like. Peripheral electronic device 400 may rely on some of the components or procedures in electronic device 300 (FIG. 3A) or some of these components or procedures may be completed by, located in, or housed by peripheral electronic device 400 instead of electronic device 300.

In some embodiments, peripheral electronic device 400 includes one or more of memory 402 (which optionally includes one or more computer readable storage mediums), memory controller 422, one or more processing units (CPU(s)) 420, peripherals interface 418, RF circuitry 408, audio circuitry 410, speaker 411, microphone 413, input/output (I/O) subsystem 406, other input or control devices 416, and external port 424. Peripheral electronic device 400 includes a touch-sensitive display system 412 (e.g., dynamic function row 104, FIGS. 2A-2D) (sometimes also herein called a "touch-sensitive display," a "touch screen," or a "touch screen display").

Peripheral electronic device 400 optionally includes one or more intensity sensors 465 for detecting intensity of contacts on a touch-sensitive surface such as touch-sensitive display system 412 or a touchpad (e.g., touchpad 108, FIGS. 2B-2C). Peripheral electronic device 400 optionally includes one or more tactile output generators 467 for generating tactile outputs on a touch-sensitive surface such as touch-sensitive display system 412 or a touchpad (e.g., touchpad 108, FIGS. 2B-2C). These components optionally communicate over one or more communication buses or signal lines 403.

Memory 402 optionally includes high-speed random access memory and optionally also includes non-volatile memory, such as one or more magnetic disk storage devices, flash memory devices, or other non-volatile solid-state memory devices. Access to memory 402 by other components of peripheral electronic device 400, such as CPU(s) 420 and peripherals interface 418, is, optionally, controlled by memory controller 422. Peripherals interface 418 can be used to couple CPU(s) 420 and memory 402 to I/O subsystem 406 and other circuitry. The one or more processing units 420 run or execute various software programs and/or sets of instructions stored in memory 402 to perform various functions for peripheral electronic device 400 and to process data. In some embodiments, peripherals interface 418, CPU(s) 420, and memory controller 422 are, optionally, implemented on a single chip, such as chip 404. In some other embodiments, they are, optionally, implemented on separate chips.

RF (radio frequency) circuitry 408 receives and sends RF signals, also called electromagnetic signals. RF circuitry 408 converts electrical signals to/from electromagnetic signals and communicates with communications networks and other communications devices via the electromagnetic signals. RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The wireless communication optionally uses any of a plurality of communications standards, protocols and technologies, including but not limited to near field communication (NFC), Bluetooth, Wireless Fidelity (Wi-Fi) (e.g., IEEE 802.11a, IEEE 802.11b, IEEE 802.11g, and/or IEEE 802.11n), Wi-MAX, or any other suitable communication protocol, including communication protocols not yet developed as of the filing date of this document.

Optional audio circuitry 410, speaker 411, and microphone 413 provide an audio interface between a user and peripheral electronic device 400. Audio circuitry 410 receives audio data from peripherals interface 418, converts the audio data to an electrical signal, and transmits the electrical signal to speaker 411. Speaker 411 converts the electrical signal to human-audible sound waves. Audio circuitry 410 also receives electrical signals converted by microphone 413 from sound waves. Audio circuitry 410 converts the electrical signals to audio data and transmits the audio data to peripherals interface 418 for processing. Audio data is, optionally, retrieved from and/or transmitted to memory 402 and/or RF circuitry 408 by peripherals interface 418. In some embodiments, audio circuitry 410 also includes a headset jack. The headset jack provides an interface between audio circuitry 410 and removable audio input/output peripherals, such as output-only headphones or a headset with both output (e.g., a headphone for one or both ears) and input (e.g., a microphone).

I/O subsystem 406 couples the input/output peripherals of peripheral electronic device 400, such as touch-sensitive display system 412 (e.g., dynamic function row 104, FIGS. 2A-2D), to peripherals interface 418. I/O subsystem 406 optionally includes display controller 456, intensity sensor controller 459, haptic feedback controller 461, and one or more input controllers 460 for other input or control devices 416. The one or more other input controllers 460 receive/send electrical signals from/to other input or control devices 416. The other input or control devices 416 optionally include physical buttons (e.g., push buttons, rocker buttons, etc.), dials, slider switches, joysticks, click wheels, a set of physical keys, a touchpad, and so forth.

Touch-sensitive display system 412 (e.g., dynamic function row 104, FIGS. 2A-2D) provides an input/output interface between peripheral electronic device 400 and a user. Touch-sensitive display (TSD) controller 456 receives and/or sends electrical signals from/to touch-sensitive display system 412. Touch-sensitive display system 412 displays visual output to the user. The visual output optionally includes graphics, text, icons, video, and any combination thereof (collectively termed "graphics"). In some embodiments, some or all of the visual output corresponds to user-interface objects/elements.

Touch-sensitive display system 412 (e.g., dynamic function row 104, FIGS. 2A-2D) includes a touch-sensitive surface, sensor, or set of sensors that accepts input from the user based on haptic and/or tactile contact. As such, touch-sensitive display system 412 and TSD controller 456 (along with any associated modules and/or sets of instructions in memory 402) detect contact (and any movement or breaking of the contact) on touch-sensitive display system 412 and convert the detected contact into signals used to select or control user-interface objects (e.g., one or more soft keys, icons, web pages, or images) that are displayed on touch-sensitive display system 412. In one example embodiment, a point of contact between touch-sensitive display system 412 and the user corresponds to an area of touch-sensitive display system 412 in contact with a finger of the user.

Touch-sensitive display system 412 (e.g., dynamic function row 104, FIGS. 2A-2D) optionally uses LCD (liquid crystal display) technology, LPD (light emitting polymer display) technology, LED (light emitting diode) technology, or OLED (organic light emitting diode) technology, although other display technologies are used in other embodiments. Touch-sensitive display system 412 and TSD controller 456 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 412. In one example embodiment, projected mutual capacitance sensing technology is used, such as that found in the iPHONE®, iPODTOUCH®, and iPAD® from Apple Inc. of Cupertino, California.

Touch-sensitive display system 412 (e.g., dynamic function row 104, FIGS. 2A-2D) optionally has a video resolution in excess of 400 dpi (e.g., 500 dpi, 800 dpi, or greater). In some embodiments, the user makes contact with touch-sensitive display system 412 using a stylus, a finger, and so forth. In some embodiments, the user interface is designed to work primarily with finger-based contacts and gestures.

In some embodiments, in addition to touch-sensitive display system 412, peripheral electronic device 400 optionally includes a touchpad (e.g., touchpad 108, FIGS. 2B-2C). In some embodiments, the touchpad is a touch-sensitive area of peripheral electronic device 400 that, unlike touch-sensitive display system 412, does not display visual output. In some embodiments, the touchpad is, optionally, a touch-sensitive surface that is separate from touch-sensitive display system 412, or an extension of the touch-sensitive surface formed by touch-sensitive display system 412.

Peripheral electronic device 400 also includes power system 462 for powering the various components. Power system 462 optionally includes a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in portable devices.

Peripheral electronic device 400 optionally also includes one or more contact intensity sensors 465 coupled with intensity sensor controller 459 in I/O subsystem 406. Contact intensity sensor(s) 465 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 465 receives contact intensity information (e.g., pressure information or a proxy for pressure information) from the environment. In some embodiments, at least one contact intensity sensor is collocated with, or proximate to, a touch-sensitive surface (e.g., touch-sensitive display system 412 and/or touchpad 108, FIGS. 2B-2C).

Peripheral electronic device 400 optionally also includes one or more tactile output generators 467 coupled with haptic feedback controller 461 in I/O subsystem 406. Tactile output generator(s) 467 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor(s) 465 receives tactile feedback generation instructions from haptic feedback module 433 and generates tactile outputs that are capable of being sensed by a user of peripheral electronic device 400. In some embodiments, at least one tactile output generator is collocated with, or proximate to, a touch-sensitive surface (e.g., touch-sensitive display system 412 and/or touchpad 108, FIGS. 2B-2C) and, optionally, generates a tactile output by moving the touch-sensitive surface vertically (e.g., in/out of a surface of peripheral electronic device 400) or laterally (e.g., back and forth in the same plane as a surface of peripheral electronic device 400).

In some embodiments, the software components stored in memory 402 include operating system 426, communication module 428 (or set of instructions), contact/motion module 430 (or set of instructions), and dynamic function row module 450 (or sets of instructions). Furthermore, in some embodiments, memory 402 stores device state 457 including the display state, indicating what views or other information occupy various regions of touch-sensitive display system 412 (e.g., dynamic function row 104, FIGS. 2A-2D).

Operating system 426 includes various software components and/or drivers for controlling and managing general system tasks (e.g., memory management, storage device control, power management, etc.) and facilitates communication between various hardware and software components.

Communication module 428 facilitates communication with other devices (e.g., computing device 202, FIGS. 2A-2D) over one or more external ports 424 and/or RF circuitry 408 and also includes various software components for sending/receiving data via RF circuitry 408 and/or external port 424. External port 424 (e.g., Universal Serial Bus (USB), FIREWIRE, etc.) is adapted for coupling directly to other devices or indirectly over a network (e.g., the Internet, wireless LAN, etc.).

Contact/motion module 430 optionally detects contact with touch-sensitive display system 412 and other touch sensitive devices (e.g., a touchpad or physical click wheel). Contact/motion module 430 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 430 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 430 also detects contact on a touchpad (e.g., touchpad 108, FIGS. 2B-2C).

In some embodiments, contact/motion module 430 uses a set of one or more intensity thresholds to determine whether an operation has been performed by a user (e.g., to determine whether a user has selected or "clicked" on an affordance). In some embodiments at least a subset of the intensity thresholds are determined in accordance with software parameters (e.g., the intensity thresholds are not determined by the activation thresholds of particular physical actuators and can be adjusted without changing the physical hardware of peripheral electronic device 400). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 430 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap contact includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and in some embodiments also followed by detecting a finger-up (lift off) event.

Haptic feedback module 433 includes various software components for generating instructions used by tactile output generator(s) 467 to produce tactile outputs at one or more locations on peripheral electronic device 400 in response to user interactions with peripheral electronic device 400.

Dynamic function row (DFR) module 450 includes: focus obtaining module 451, DFR determining module 452, and DFR presenting module 453. In some embodiments, focus obtaining module 451 is configured to obtain an indication of an active user interface element that is the current focus of the graphical user interface displayed on primary display 102 of peripheral display device 204 (FIGS. 2A-2D) from computing device 202 (FIGS. 2A-2D). In some embodiments, DFR determining module 452 is configured to determine graphics (e.g., a set of one or more affordances) based on the active user interface element that is current focus. Alternatively, in some embodiments, computing device 202 (FIGS. 2A-2D) determines the graphics (e.g., the set of one or more affordances) based on the active user interface element that is in focus and provides the graphics to peripheral electronic device 400 or a component thereof (e.g., DFR module 450) for display on touch-sensitive display system 412 (e.g., dynamic function row 104, FIGS. 2A-2D). In some embodiments, DFR presenting module 453 is configured to render the graphics determined by DFR determining module 452 (or provided by computing device 202) on touch-sensitive display system 412 (e.g., dynamic function row 104, FIGS. 2A-2D). DFR presenting module 453 includes various known software components for rendering and causing display of graphics on touch-sensitive display system 412, including components for changing the visual impact (e.g., brightness, transparency, saturation, contrast or other visual property) of graphics that are displayed. In some embodiments, DFR module 450 includes other modules for: adjusting the sensitivity of dynamic function row 104; adjusting the audible and/or haptic feedback provided by dynamic function row 104; adjusting the settings of affordances and information displayed by dynamic function row 104 (e.g., size, brightness, font, language, and the like); adjusting the current power mode of dynamic function row 104 (e.g., normal and low-power modes); and the like.

In some embodiments, memory 402 includes event sorter 470 (e.g., in operating system 426). In some embodiments, event sorter 470 performs the same functions as event sorter 370 (FIG. 3B) and includes a subset or superset of the modules, procedures, and instructions of event sorter 370 (FIG. 3B). As such, event sorter 470 will not be described for the sake of brevity.

It should be appreciated that peripheral electronic device 400 is only an example and that peripheral electronic device 400 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Each of the above identified modules correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 402 optionally stores a subset of the modules and data structures identified above. Furthermore, memory 402 optionally stores additional modules and data structures not described above.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of system 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

In some embodiments one or more predefined intensity thresholds are used to determine whether a particular input satisfies an intensity-based criterion. For example, the one or more predefined intensity thresholds include (i) a contact detection intensity threshold $IT_0$, (ii) a light press intensity threshold $IT_L$, (iii) a deep press intensity threshold $IT_D$ (e.g., that is at least initially higher than $I_L$), and/or (iv) one or more other intensity thresholds (e.g., an intensity threshold $I_H$ that is lower than $I_L$). In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 3C:
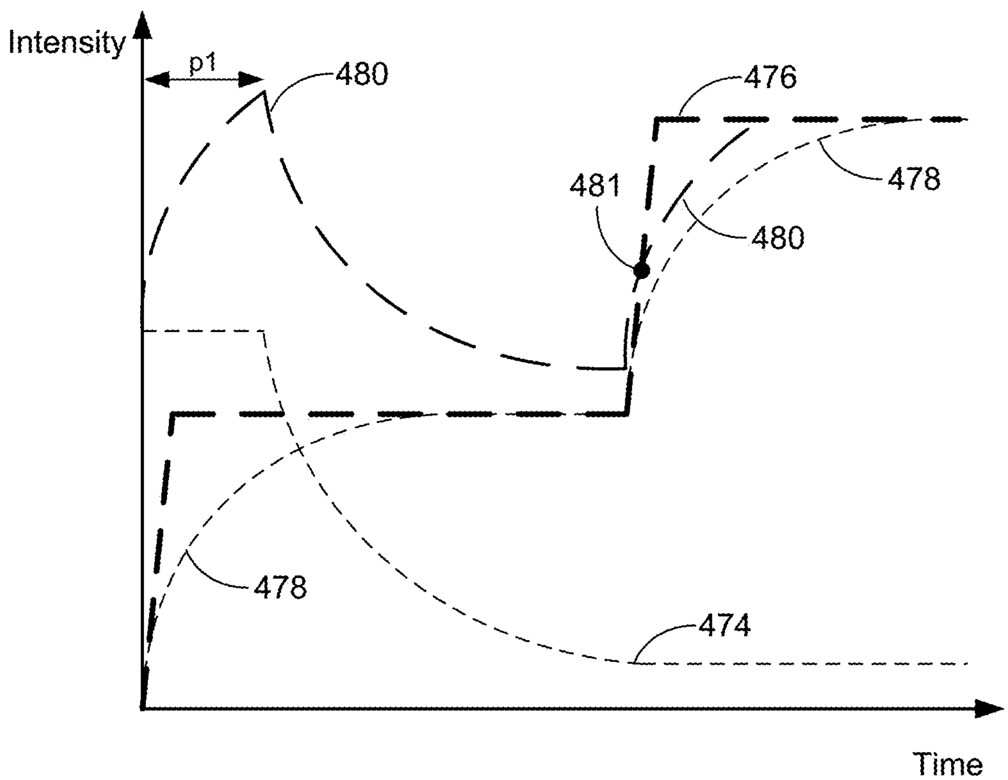
FIGS. 3C-3E illustrate examples of dynamic intensity thresholds in accordance with some embodiments.

For example, FIG. 3C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 3C), the "deep press" response is triggered.

Figure 3D:
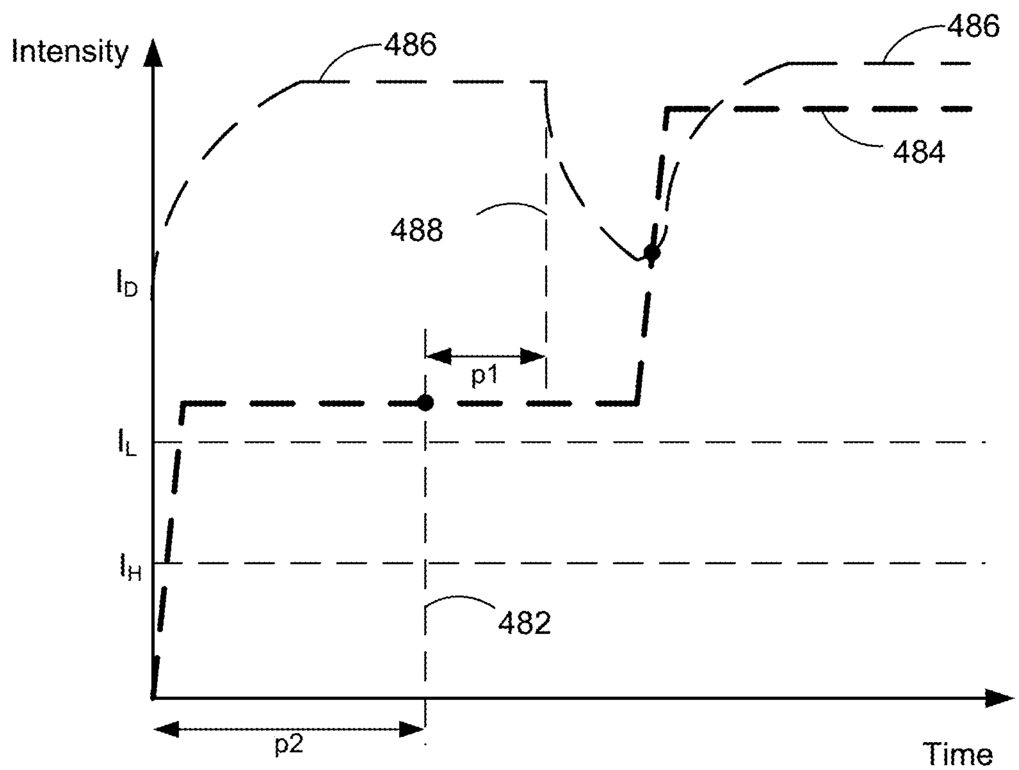

FIG. 3D illustrates another dynamic intensity threshold 486 (e.g., intensity threshold $I_D$). FIG. 3D also illustrates two other intensity thresholds: a first intensity threshold $I_H$ and a second intensity threshold $I_L$. In FIG. 3D, although touch input 484 satisfies the first intensity threshold $I_D$ and the second intensity threshold $I_L$ prior to time p2, no response is provided until delay time p2 has elapsed at time 482. Also in FIG. 3D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_D$ or the second intensity threshold $I_L$.

Figure 3E:
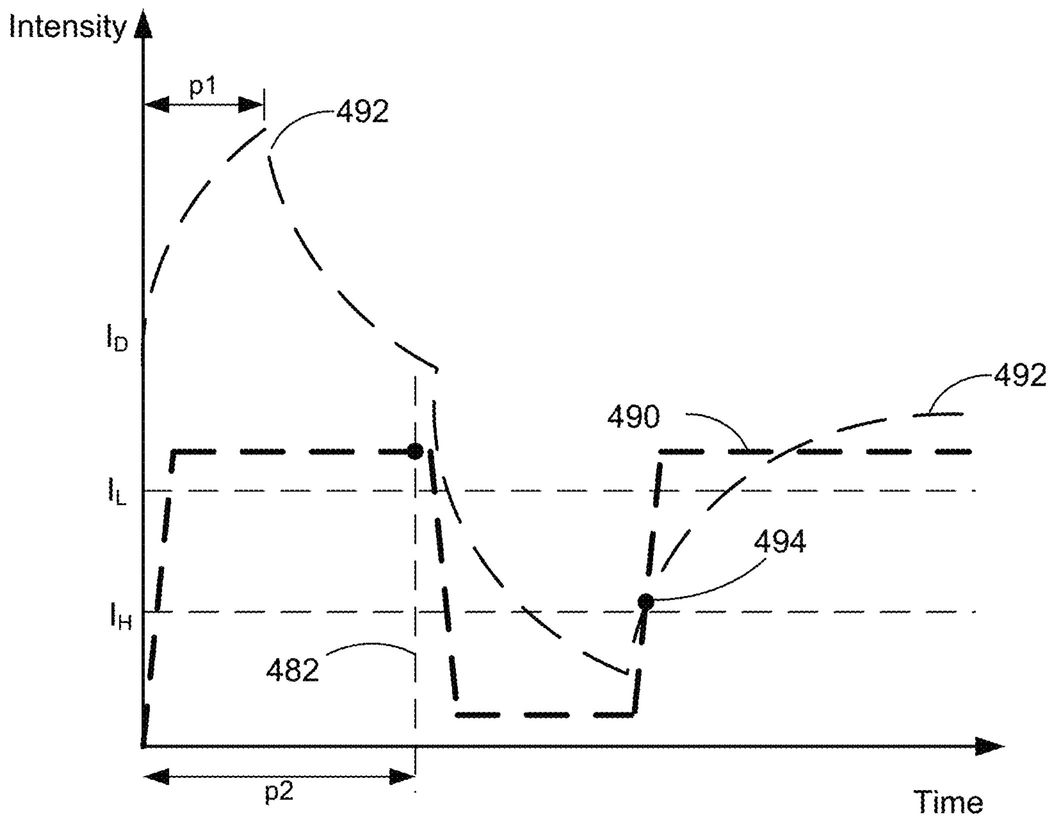

FIG. 3E illustrate yet another dynamic intensity threshold 492 (e.g., intensity threshold $I_D$). In FIG. 3E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold ITS is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UIs") and associated processes that may be implemented by portable computing system 100 (FIG. 1A) or desktop computing system 200 (FIGS. 2A-2D). In some embodiments, primary display 102 is implemented in display portion 110 of portable computing system 100 (FIG. 1A). Alternatively, in some embodiments, primary display 102 is implemented in peripheral display device 204 (FIGS. 2A-2D). In some embodiments, dynamic function row 104 is a touch-sensitive display implemented in body portion 120 of portable computing system 100 (FIGS. 1A-1B). Alternatively, in some embodiments, dynamic function row 104 is a touch-sensitive display implemented in peripheral keyboard 206 (FIGS. 2A-2B), first peripheral input mechanism 212 (FIG. 2C), or peripheral input mechanism 222 (FIG. 2D).

FIGS. 5A-14E illustrate example user interfaces for displaying application-specific affordances on a dynamically updated touch screen display in accordance with some embodiments. The user interfaces in these figures are used to illustrate the methods and/or processes described below, including the methods in FIGS. 44A-44D, 45A-45C, 46A-46B, 47A-47B, and 48A-48C. One of ordinary skill in the art will appreciate that the following user interfaces are merely examples. Moreover, one of ordinary skill in the art will appreciate that additional affordances and/or user interface elements, or that fewer affordances and/or user interface elements may be used in practice.

Figure 5A:
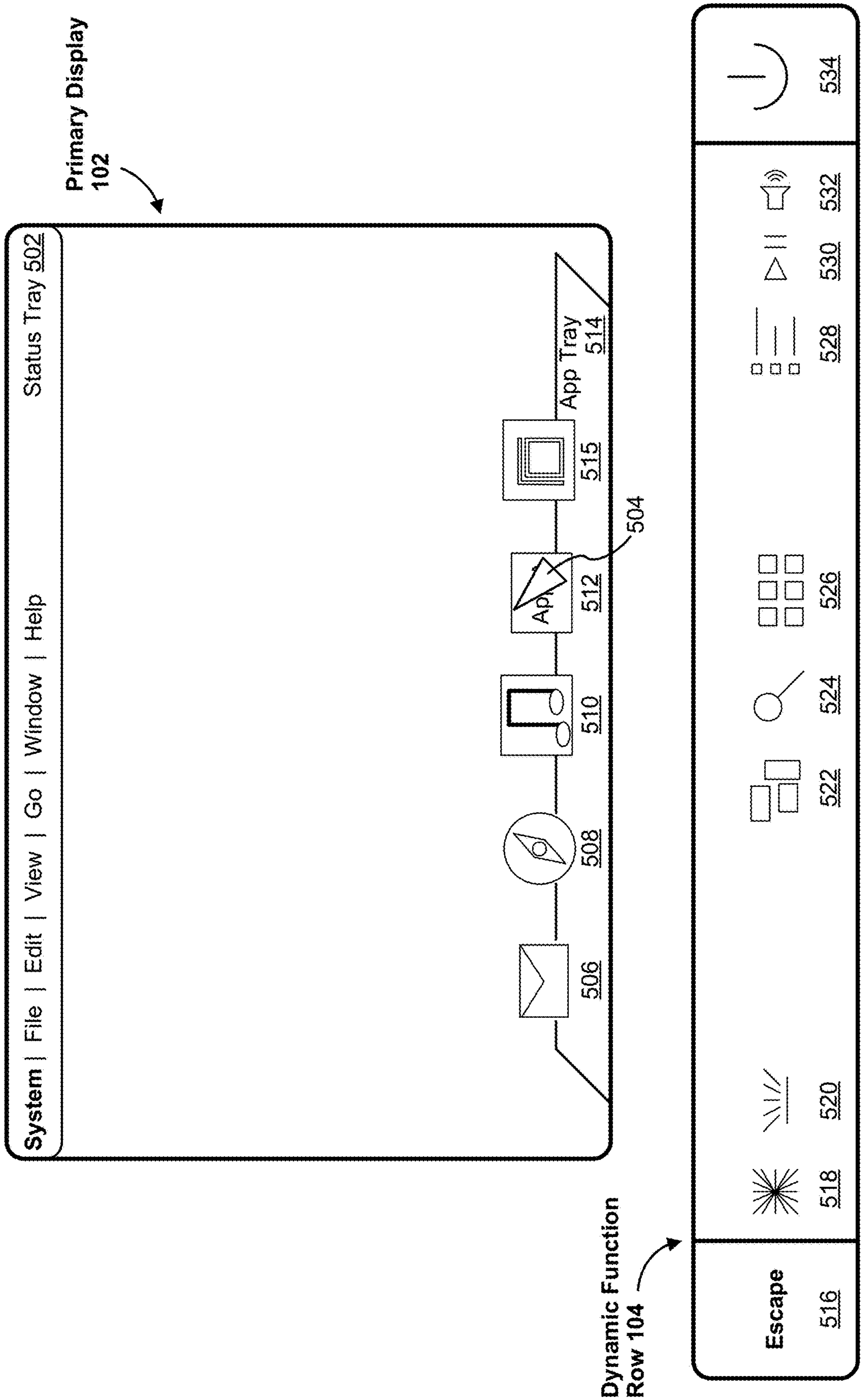
FIGS. 5A-5E, 6A-6F, 7A-7D, 8A-8H, 9, 10A-10H, 11A-11H, 12A-12H, 13A-13C, 14A-14E, 15A-15H, 16A-16T, 17A-17G, 18A-18I, 19A-19K, 20A-20G, 21A-21J, 22A-22C, 23A-23B, 24A-24N, 25A-25C, 26A-26E, 27A-27O, 28A-28P, 29A-29T, 30A-30F, 31A-31B, 32A-32E, 33A-33K, 34A-34C, 35A-35B, 36A-36W, 37A-37M, 38A-38J, 39, 40, 41A-41E, 42A-42B, and 43A-43D illustrate example user interfaces for dynamically providing user interface controls at a touch-sensitive secondary display, in accordance with some embodiments.

FIG. 5A illustrates primary display 102 displaying a status tray 502 indicating that the system (i.e., the operating system) is currently in focus, and an application (app) tray 514 with a plurality of executable/selectable application icons including: a mail application icon 506 (e.g., corresponding to e-mail client module 341, FIG. 3A), a web browser application icon 508 (e.g., corresponding to web browsing module 345, FIG. 3A), a media player application icon 510 (e.g., corresponding to media player module 344, FIG. 3A), an application A icon 512 (e.g., corresponding to a game), and a photo application icon 515 (e.g., corresponding to image management module 343, FIG. 3A). In some embodiments, status tray 502 indicates an application that is currently running in the foreground and also includes a plurality of menus (e.g., the file, edit, view, go, window, and help menus in FIG. 5A) each including a set of corresponding controls for the application. FIG. 5A also illustrates primary display 102 displaying cursor 504 at a location corresponding to application A icon 512. In some embodiments, cursor 504 is controlled by touchpad 108 of portable computing system 100 (FIGS. 1A-1B), peripheral mouse 208 of desktop computing system 200 (FIGS. 2A and 2D), touchpad 108 of peripheral keyboard 206 (FIG. 2B), touchpad 108 of first peripheral input mechanism 212 (FIG. 2C), or the like.

FIG. 5A further illustrates dynamic function row 104 (e.g., a touch-sensitive display) displaying a plurality of affordances based on the current focus of primary display 102 (i.e., the operating system because no application windows are open). For example, in FIG. 5A, the system/operating system is currently in focus on primary display 102. In FIG. 5A, dynamic function row 104 includes persistent controls implemented as physical and/or soft keys, including: escape affordance 516, which, when activated (e.g., via a tap contact), invokes a corresponding function (e.g., exiting an application which is currently in focus on primary display 102 or pausing a game); and power control 534, which, when activated (e.g., via a tap contact), causes display of a modal alert (e.g., modal alert 5308, FIG. 14E) on dynamic function row 104 and/or primary display 102 for logging out, restarting, or powering-off portable computing system 100 or desktop computing system 200.

In FIG. 5A, dynamic function row 104 also includes a plurality of system-level affordances, including: brightness affordance 518 for adjusting the brightness of primary display 102, FIGS. 1A and 2A-2B; brightness affordance 520 for adjusting the brightness of the set of physical keys 106, FIGS. 1A-1B and 2A-2B (when applicable) and/or the brightness of dynamic function row 104; exposé affordance 522, which, when activated (e.g., via a tap contact), causes display of preview windows for active applications on primary display 102, FIGS. 1A and 2A-2B; search affordance 524 for performing a local search (e.g., for an electronic document) and/or an Internet search; launchpad affordance 526, which, when activated (e.g., via a tap contact), causes display of default or user-selected widgets and tools on primary display 102, FIGS. 1A and 2A-2B; notifications affordance 528, which, when activated (e.g., via a tap contact), causes display of a notification center on primary display 102, FIGS. 1A and 2A-2B including recent messages, notifications, calendar events, and/or the like; play/pause affordance 530 for initiating playback or pausing playback of media items (e.g., songs, podcasts, videos, and the like); and volume control affordance 532 for adjusting the volume of a media item being played. For example, when a tap is detected on brightness affordance 520, dynamic function row 104 displays a brightness slider for adjusting the brightness of the set of physical keys 106 and/or the brightness of dynamic function row 104 (e.g., similar to the volume slider 5100 in FIG. 6F). In some embodiments, the plurality of system-level affordances also include a settings affordance (not shown) for accessing adjusting settings associated with the dynamic function row 104 such as symbol/icon size, touch detection sensitivity, haptic feedback, audible feedback, animations for change in focus, power modes, and the like.

Figure 5B:
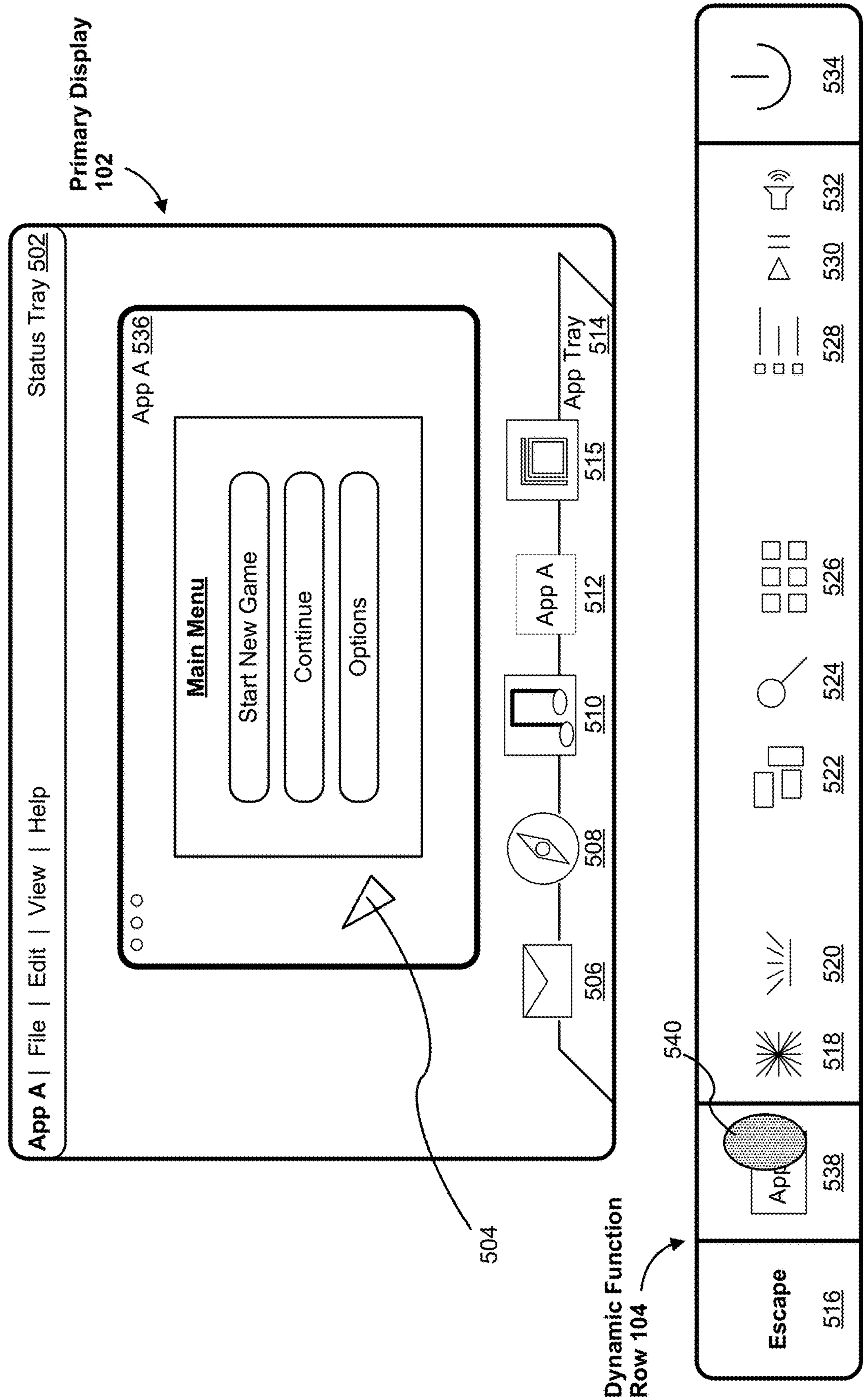

FIG. 5B illustrates primary display 102 displaying a window 536 for application A (e.g., a fantasy RPG game) in response to detecting selection of application A icon 512 with cursor 504 in FIG. 5A. In FIG. 5B, application A is in a main menu mode (e.g., the fantasy RPG game is paused), and window 536 displays a main menu for application A. Window 536 for application A is in focus on primary display 102. In FIG. 5B, status tray 502 indicates that application A is running in the foreground, and app tray 514 also indicates that application A is running in the foreground based on the shadow behind application A icon 512. In FIG. 5B, window 536 for application A includes three selectable affordances in the upper left-hand corner for closing window 536, maximizing the size of window 536, and minimizing window 536 (from left-to-right, respectively).

FIG. 5B also illustrates dynamic function row 104 displaying affordance 538 in addition to the persistent controls (i.e., affordances 516 and 534) and the plurality of system-level affordances (i.e., affordances 518, 520, 522, 524, 526, 528, 530, and 532) in response to detecting selection of application A icon 512 with cursor 504 in FIG. 5A. When activated (e.g., via a tap contact), affordance 538 causes dynamic function row 104 to display a first set of affordances and/or indicators corresponding to application A (e.g., control set A in FIG. 5C). FIG. 5B further illustrates dynamic function row 104 receiving and detecting contact 540 (e.g., a tap contact) at a location corresponding to affordance 538.

Figure 5C:
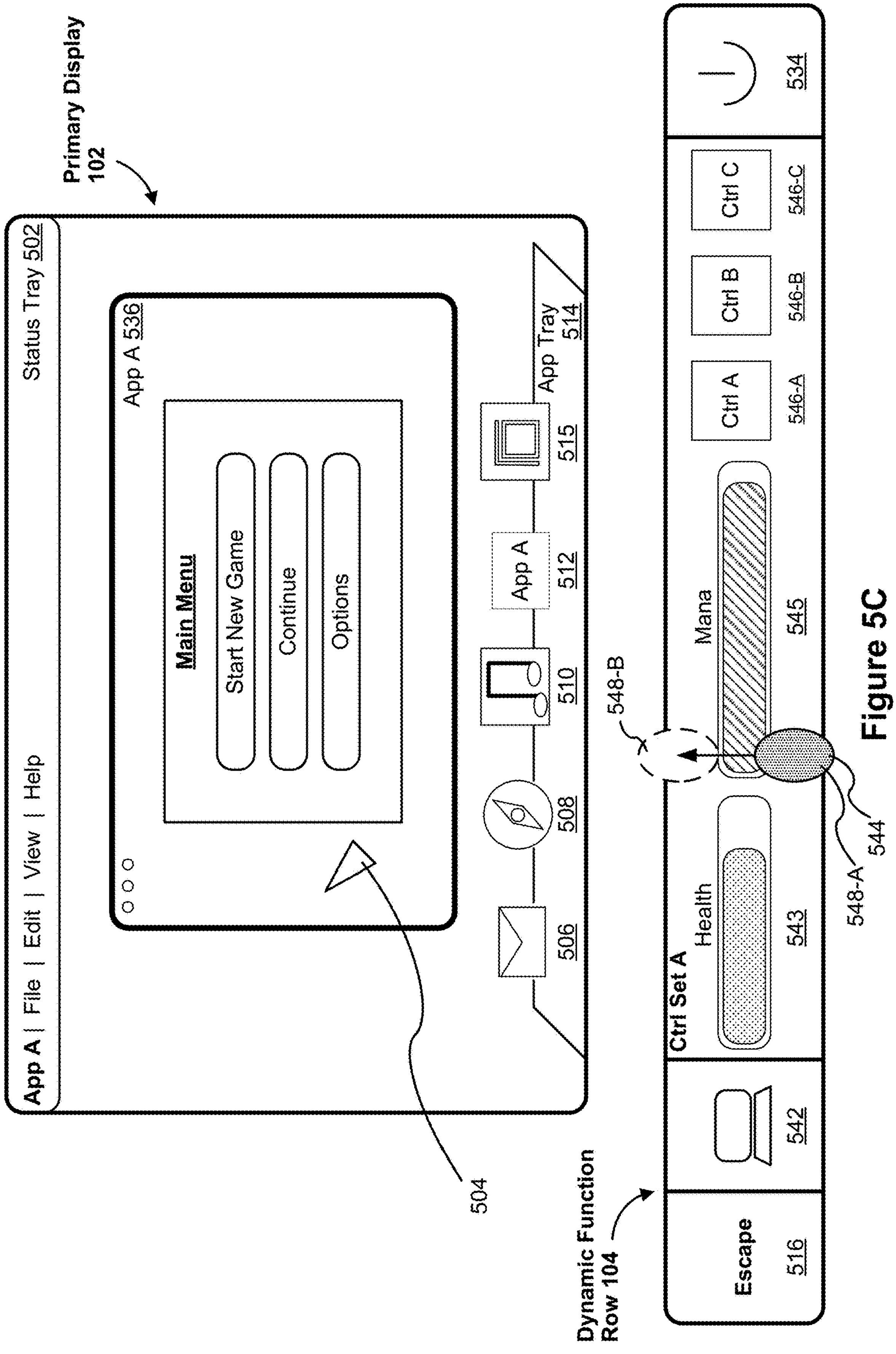

FIG. 5C illustrates dynamic function row 104 displaying a first set of affordances and/or indicators (e.g., control set A) corresponding to application A and at least one system-level affordance (e.g., affordance 542) in response to detecting selection of affordance 538 in FIG. 5B. In FIG. 5C, the first set of affordances and/or indicators (e.g., control set A) corresponding to application A (e.g., the fantasy RPG game) includes a health indicator 543 and a mana indicator 545 related to an in-game character/avatar controlled by the user of portable computing system 100 or desktop computing system 200 while playing application A. In FIG. 5C, the first set of affordances and/or indicators (e.g., control set A) corresponding to application A also includes control affordances 546-A, 546-B, and 546-C for controlling the in-game character/avatar. When activated (e.g., via a tap contact), affordance 542 causes dynamic function row 104 to display the plurality of system-level affordances (e.g., affordances 518, 520, 522, 524, 526, 528, 530, and 532 shown in FIG. 5A). FIG. 5C also illustrates dynamic function row 104 receiving and detecting an upward swipe gesture with contact 544 moving from a first location 548-A to a second location 548-B.

Figure 5D:
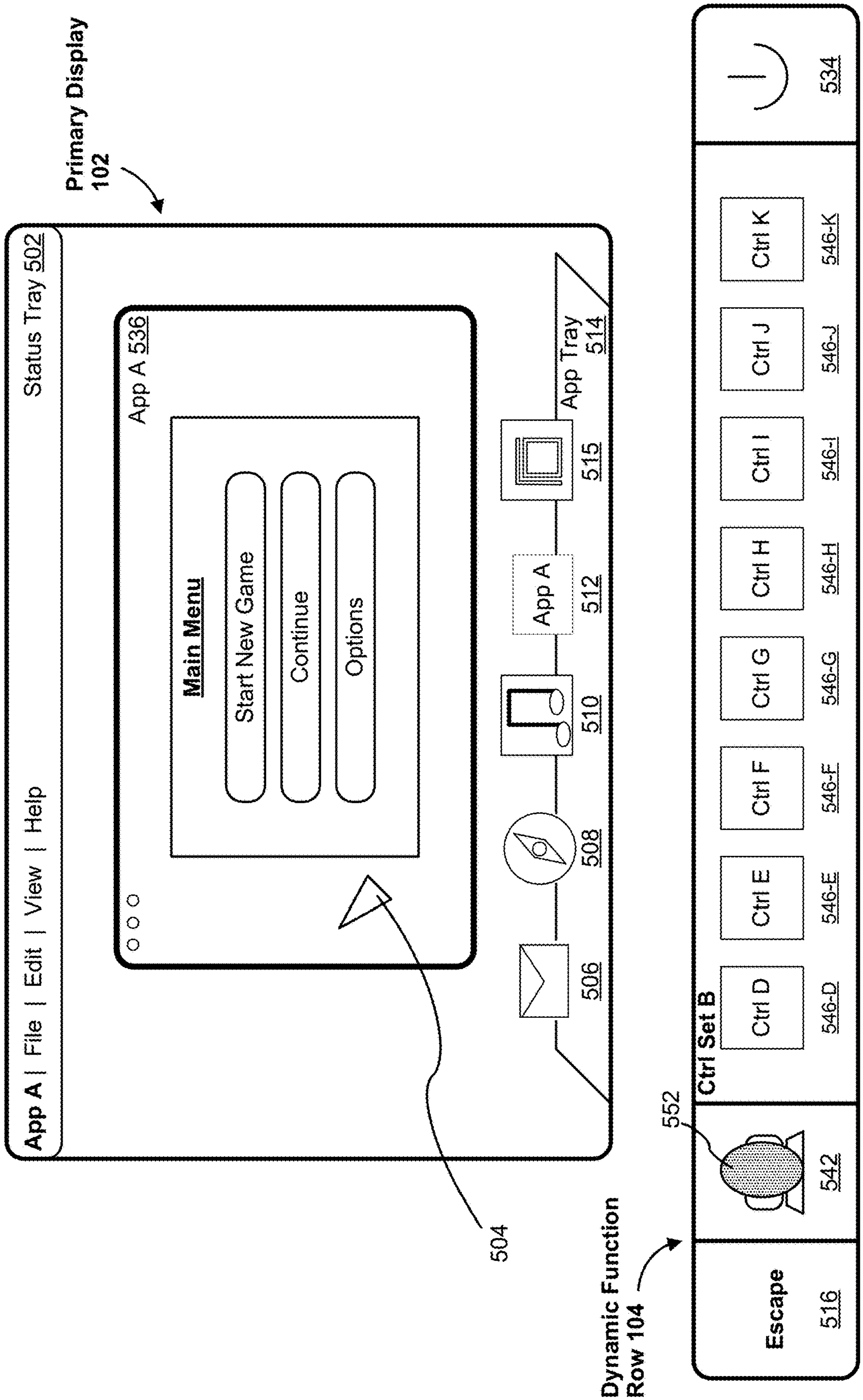

FIG. 5D illustrates dynamic function row 104 displaying a second set of affordances and/or indicators (e.g., control set B) corresponding to application A and the at least one system-level affordance (e.g., affordance 542) in response to detecting the upward swipe gesture in FIG. 5C. In FIG. 5D, the second set of affordances and/or indicators (e.g., control set B) corresponding to application A includes control affordances 546-D, 546-E, 546-F, 546-G, 546-H, 546-I, 546-J, and 546-K for controlling the in-game character/avatar controlled by the user of portable computing system 100 or desktop computing system 200 while playing application A. FIG. 5D also illustrates dynamic function row 104 receiving and detecting contact 552 (e.g., a tap contact) at a location corresponding to affordance 542.

Figure 5E:
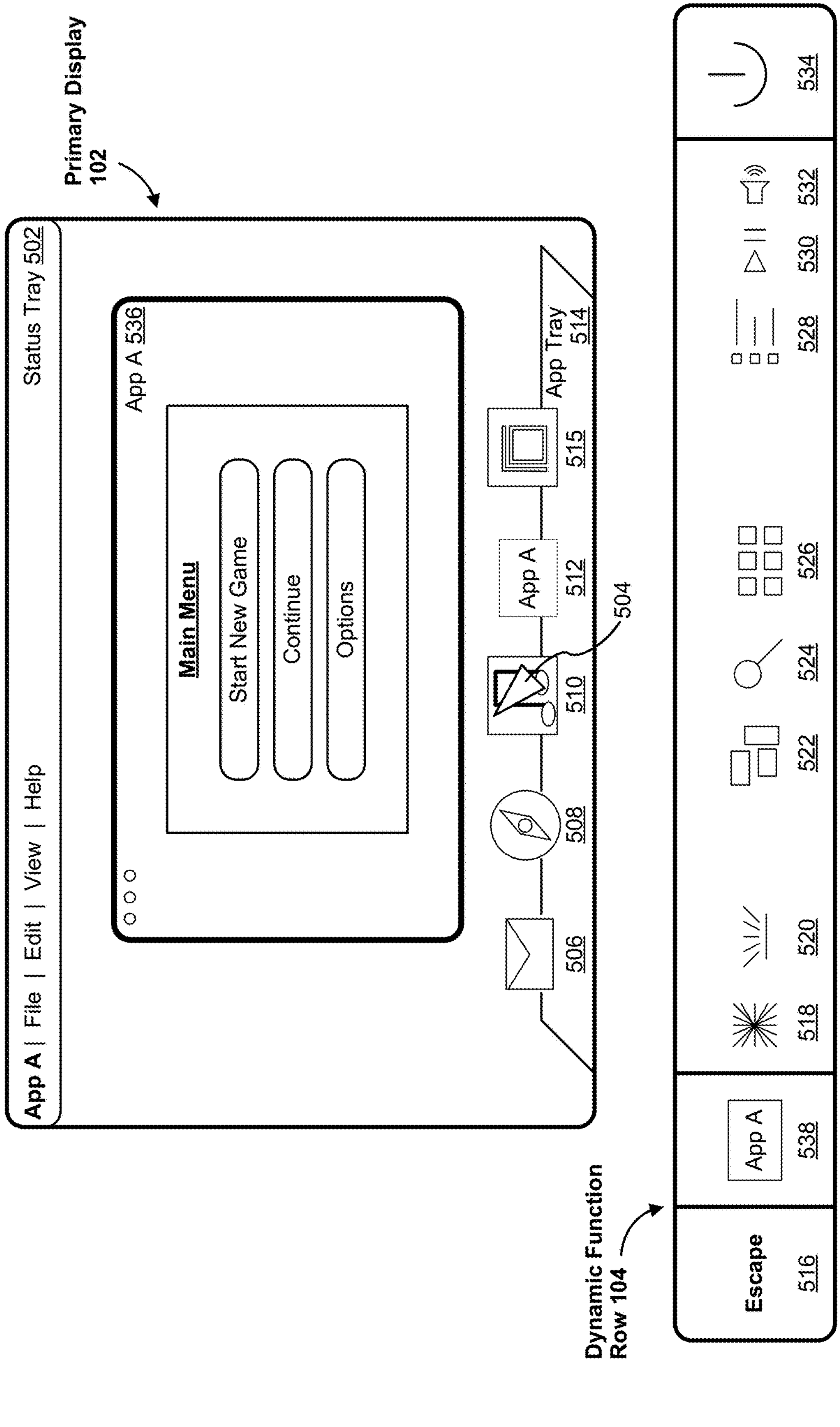

FIG. 5E illustrates dynamic function row 104 displaying persistent controls (i.e., affordances 516 and 534), the plurality of system-level affordances (i.e., affordances 518, 520, 522, 524, 526, 528, 530, and 532), and affordance 538 corresponding to application A in response to detecting selection of affordance 542 in FIG. 5D. FIG. 5E also illustrates primary display 102 displaying cursor 504 at a new location corresponding to media player application icon 510.

Figure 6A:
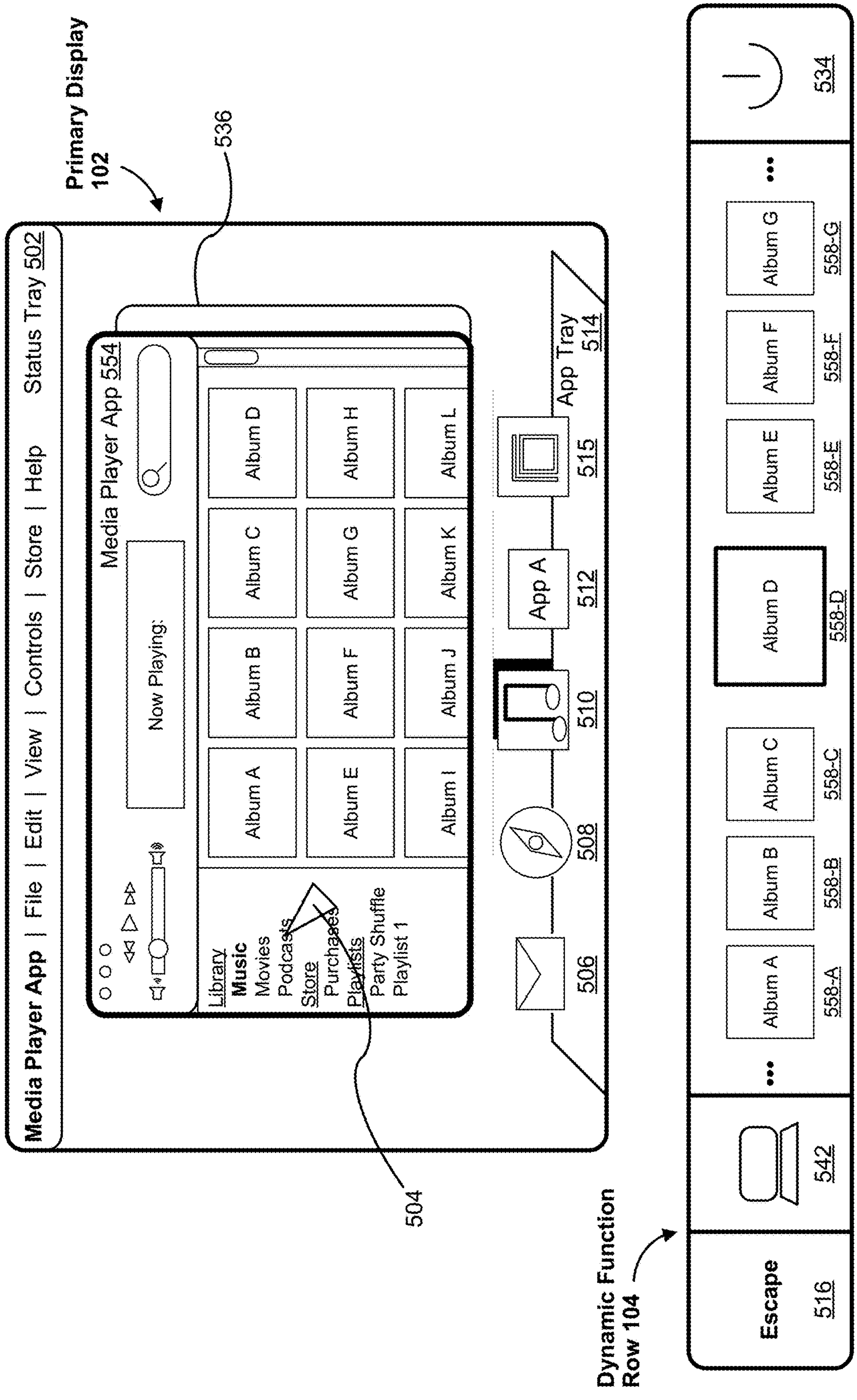

FIG. 6A illustrates primary display 102 displaying a window 554 for the media player application in response to detecting selection of media player application icon 510 with cursor 504 in FIG. 5E. For example, window 554 is overlaid on window 536. In FIG. 6A, window 554 displays a plurality of albums associated with a music sub-section of a user's media library. In FIG. 6A, the music sub-section of the user's media library is in focus on primary display 102 as shown by "Music" displayed in bold and albums A-L at least partially displayed in window 554. In FIG. 6A, status tray 502 indicates that the media player application is running in the foreground, and app tray 514 also indicates that the media player application is running in the foreground based on the shadow behind media player application icon 510. FIG. 6A also illustrates primary display 102 displaying cursor 504 at a location corresponding to the podcasts sub-section of the user's media library.

FIG. 6A further illustrates dynamic function row 104 displaying a plurality of album affordances 558 (e.g., album affordances 558-A to 558-G) and the at least one system-level affordance (e.g., affordance 542) in response to detecting selection of media player application icon 510 with cursor 504 in FIG. 5E. In FIG. 6A, the plurality of album affordances 558 correspond to a subset of the albums currently displayed in window 554. In some embodiments, the plurality of album affordances 558 mirror the albums currently displayed in window 554. For example, in response to selection of album affordance 558-D (e.g., via a tap contact), portable computing system 100 or computing device 200 causes playback of album D by audio circuitry 310 (FIG. 3A) and also causes primary display 102 to display album D in the now playing region of window 554.

Figure 6B:
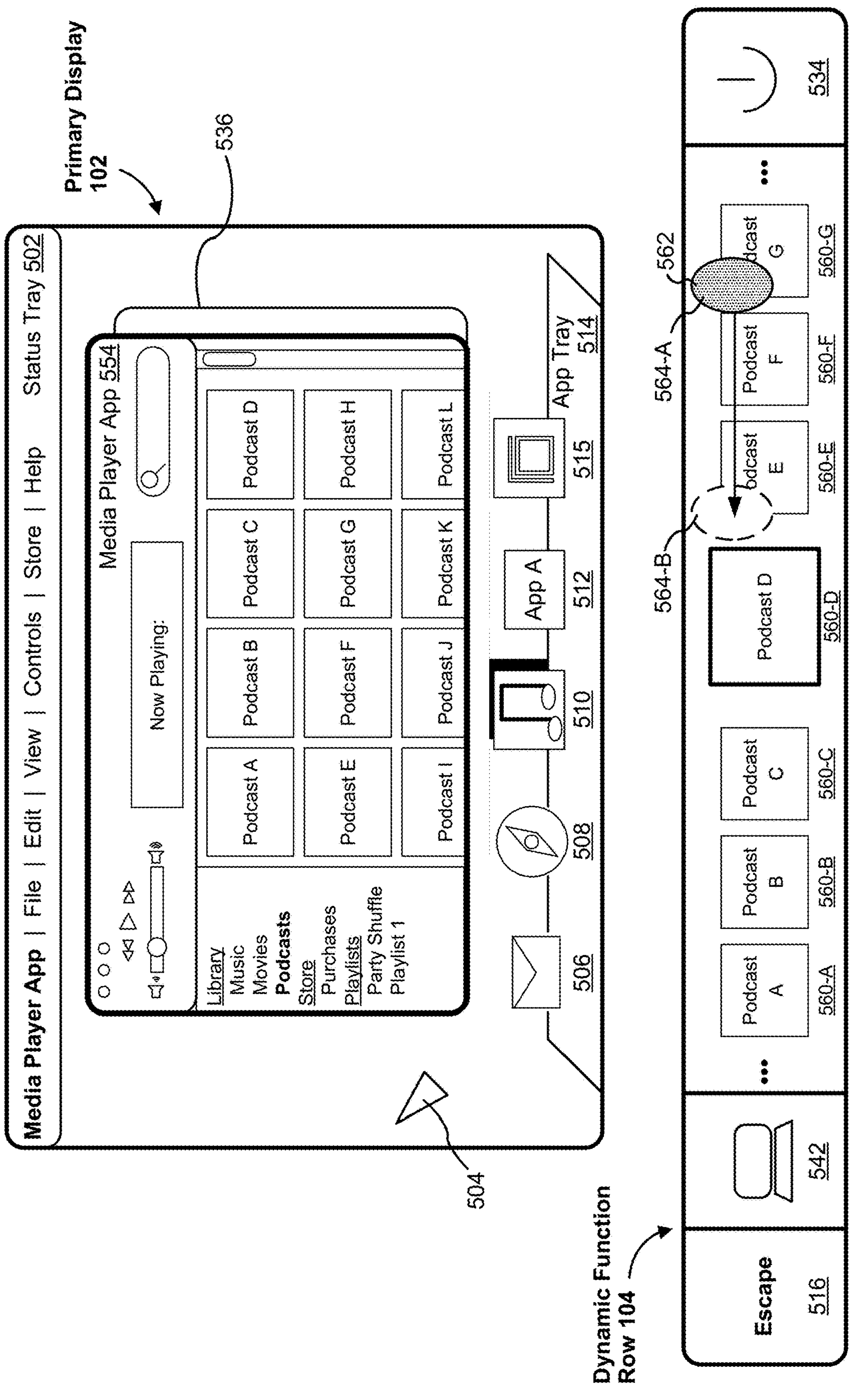

FIG. 6B illustrates primary display 102 displaying a first plurality of podcasts in window 554 in response to detecting selection of the podcasts sub-section with cursor 504 in FIG. 6A. In FIG. 6B, window 554 displays a plurality of podcasts associated with a podcasts sub-section of the user's media library. In FIG. 6B, the podcasts sub-section of the user's media library is in focus on primary display 102 as shown by "Podcasts" displayed in bold in the menu and podcasts A-L at least partially displayed in window 554.

FIG. 6B also illustrates dynamic function row 104 displaying a first plurality of podcast affordances 560 (e.g., podcast affordances 560-A to 560-G) and the at least one system-level affordance (e.g., affordance 542) in response to detecting selection of the podcasts sub-section with cursor 504 in FIG. 6A. In FIG. 6B, the plurality of podcast affordances 560 correspond to a subset of the podcasts currently displayed in window 554. For example, in response to selection of podcast affordance 560-D (e.g., via a tap contact), portable computing system 100 or computing device 200 causes playback of podcast D by audio circuitry 310 (FIG. 3A) and also causes primary display 102 to display podcast D in the now playing region of window 554. FIG. 6B further illustrates dynamic function row 104 detecting a right-to-left swipe gesture with contact 562 moving from a first location 564-A to a second location 564-B.

Figure 6C:
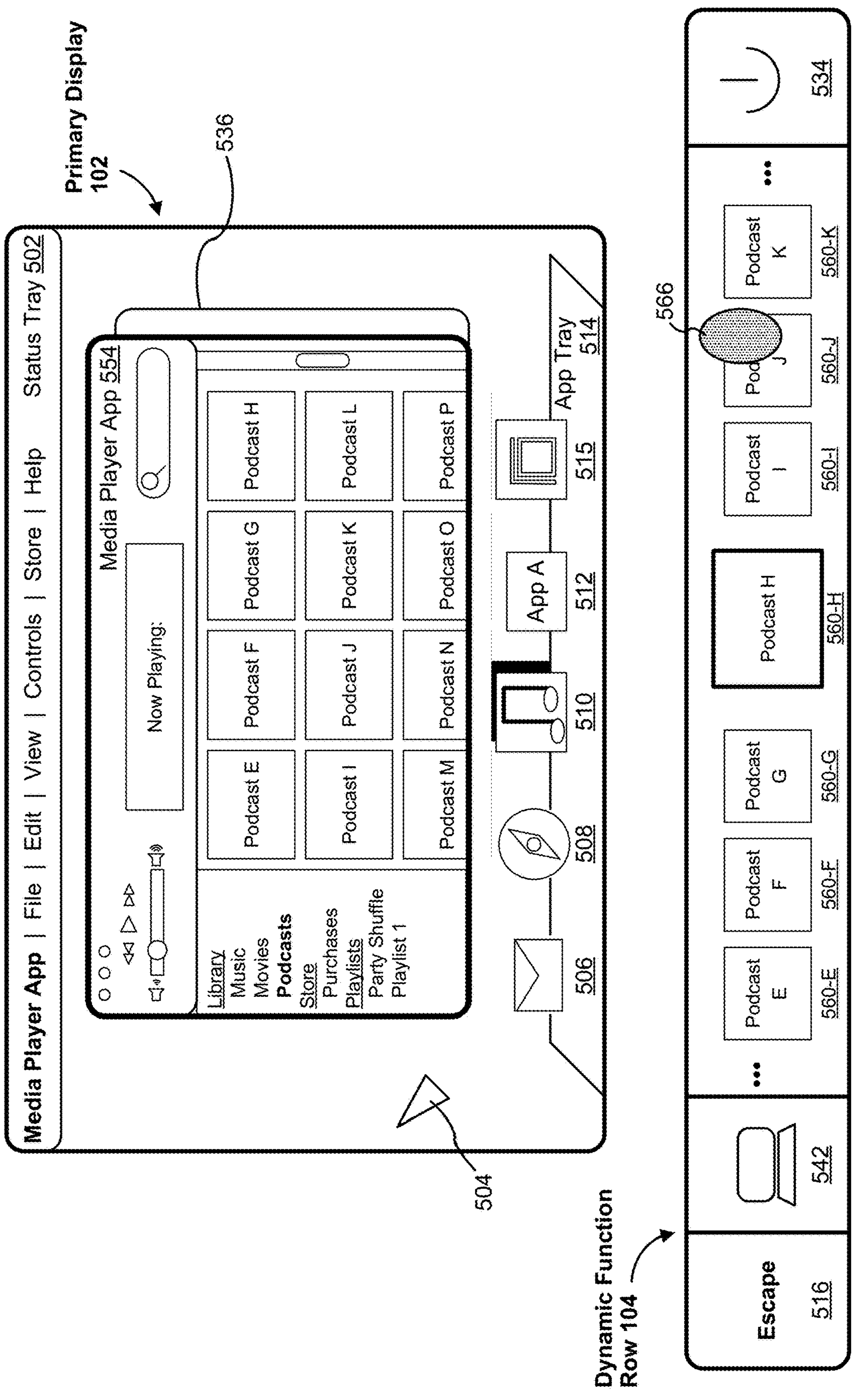

FIG. 6C illustrates primary display 102 displaying a second plurality of podcast affordances 560 (e.g., podcast affordances 560-E to 560-P) in window 554 in response to detecting the right-to-left swipe gesture in 6B. FIG. 6C also illustrates dynamic function row 104 displaying a second plurality of podcast affordances 560 (e.g., podcast affordances 560-E to 560-K) and the at least one system-level affordance (e.g., affordance 542) in response to detecting the right-to-left swipe gesture in 6B. FIG. 6C further illustrates dynamic function row 104 receiving and detecting contact 566 (e.g., a tap contact) at a location corresponding to podcast affordance 560-J.

Figure 6D:
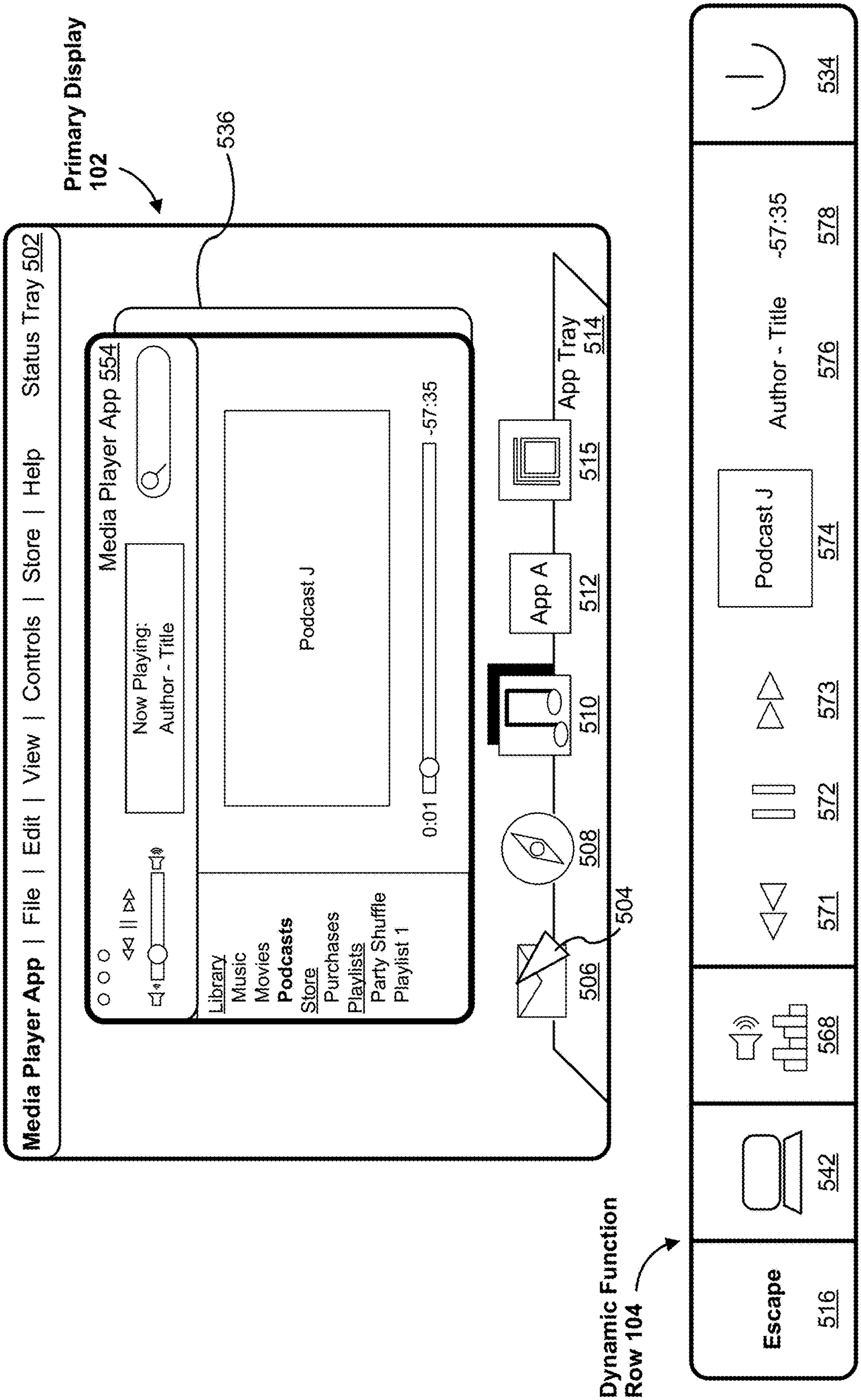

FIG. 6D illustrates primary display 102 displaying playback of podcast J in window 554 in response to detecting selection of podcast affordance 560-J in FIG. 6C. FIG. 6D also illustrates primary display 102 displaying cursor 504 at a location corresponding to mail application icon 506.

FIG. 6D further illustrates dynamic function row 104 displaying persistent volume control 568 along with playback controls and indicators in response to detecting selection of podcast affordance 560-J in FIG. 6C. In FIG. 6D, persistent volume control 568 indicates that podcast J is not muted and also displays equalizer feedback for podcast J. In FIG. 6D, the playback controls include a rewind control 571, pause control 572, and fast-forward control 573 for controlling the playback of podcast J. In FIG. 6D, the playback indicators include an image 574 corresponding to podcast J (e.g., cover art or an associated image), indicator 576 displaying the author and title of podcast J, and a time remaining indicator 578.

Figure 6E:
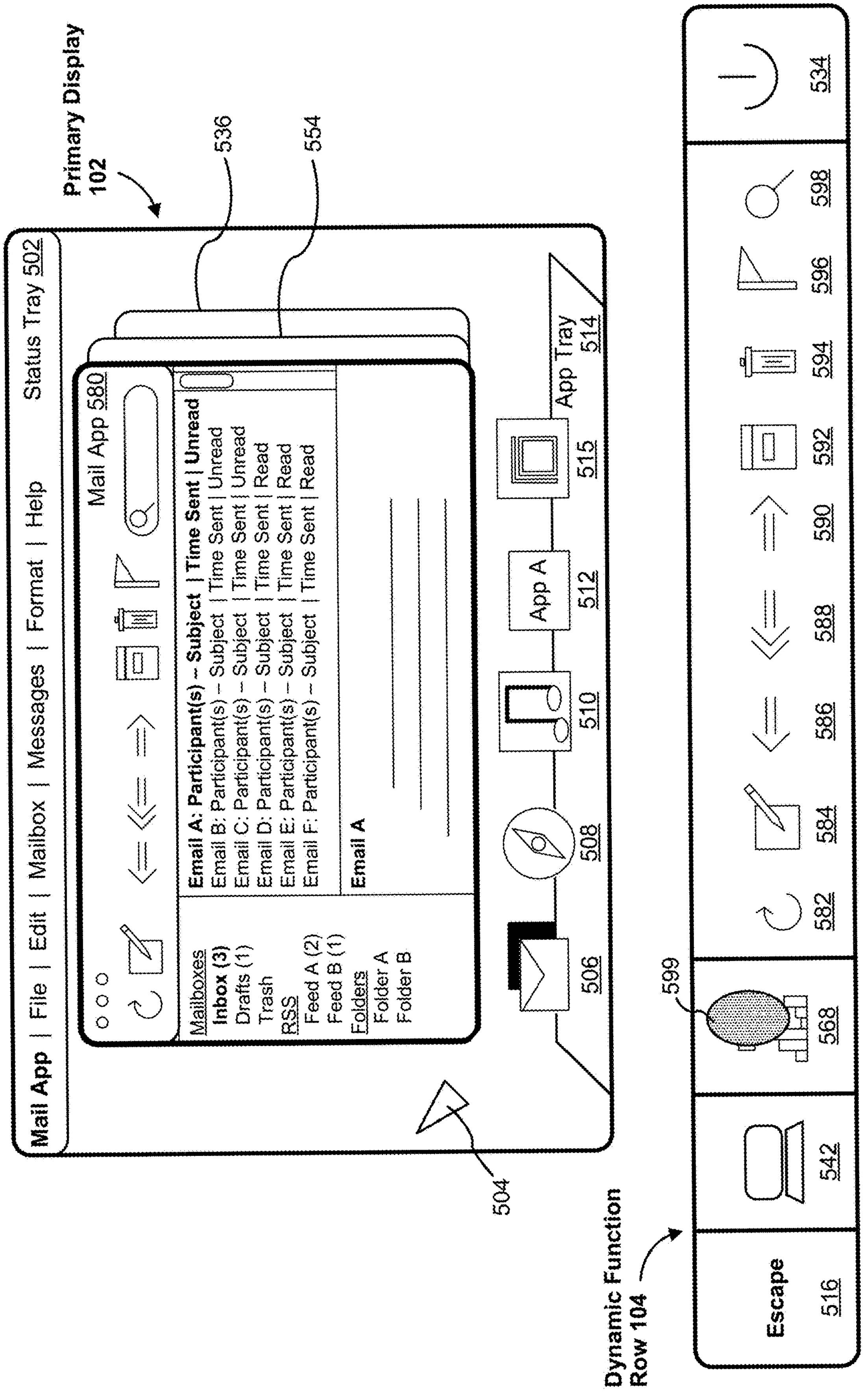

FIG. 6E illustrates primary display 102 displaying a window 580 for the mail application in response to detecting selection of mail application icon 506 with cursor 504 in FIG. 6D. For example, window 580 is overlaid on windows 554 and 536. In FIG. 6E, window 580 displays a list of a plurality of emails (e.g., emails A-F) in a user's inbox and the contents of selected email A. In some embodiments, a newest or the most urgent email is displayed at the top of the list of the plurality of emails in the user's inbox and the email at the top of the list is automatically selected. In FIG. 6E, email A is in focus on primary display 102 as email is displayed in bold within the list of the plurality of emails and email A's contents are displayed in window 580 below the list. In FIG. 6E, status tray 502 indicates that the mail application is running in the foreground, and app tray 514 also indicates that the mail application is running in the foreground based on the shadow behind mail application icon 506.

Figure 7A:
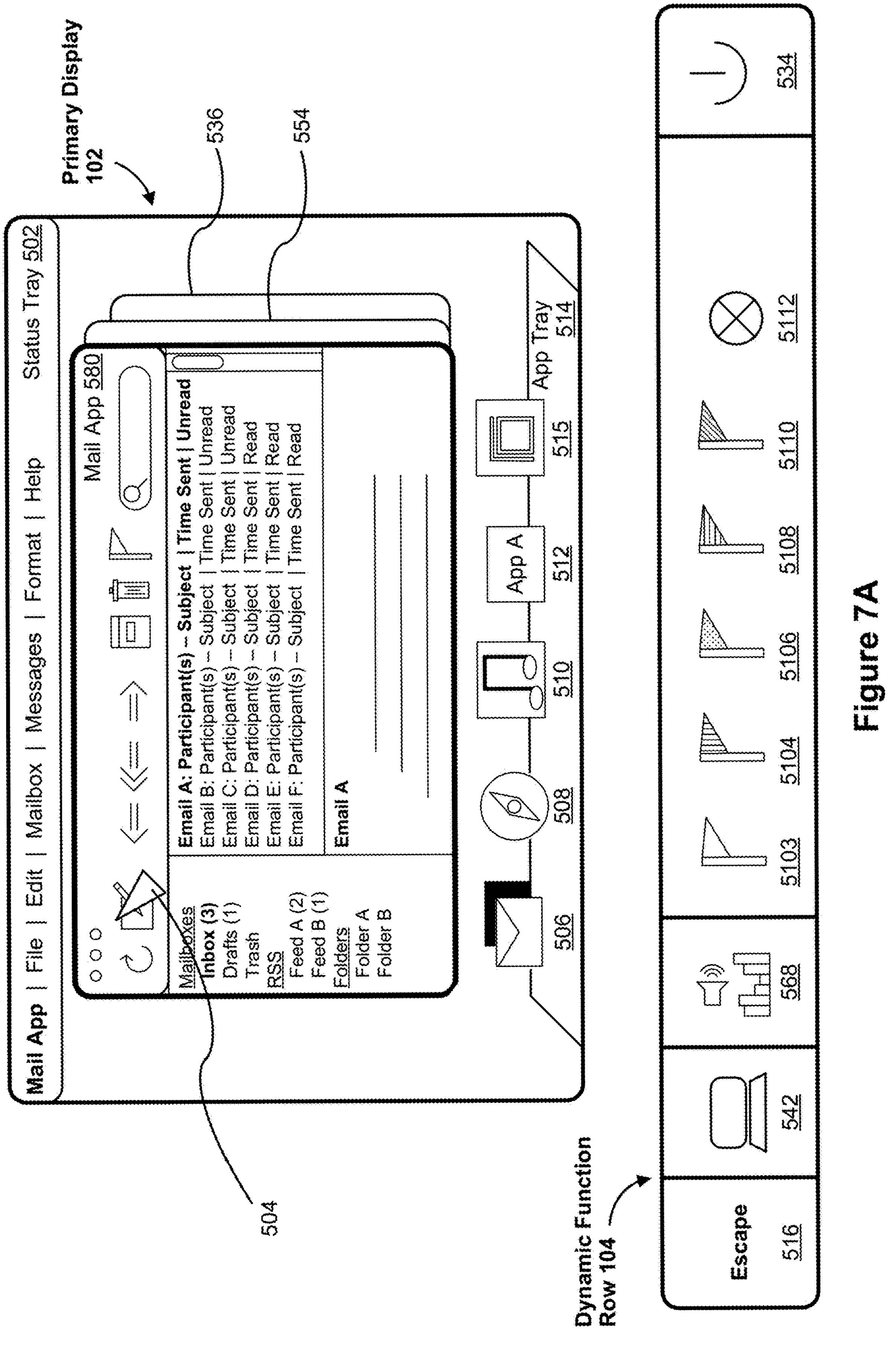

FIG. 6E also illustrates dynamic function row 104 displaying a plurality of affordances corresponding to email A (e.g., affordances 582, 584, 586, 588, 590, 592, 594, 596, and 598) and the at least one system-level affordance (e.g., affordance 542) in response to detecting selection of mail application icon 506 with cursor 504 in FIG. 6D. In FIG. 6E, the plurality of affordances corresponding to email A include: affordance 582, which, when activated (e.g., via a tap contact), refreshes the inbox; affordance 584, which, when activated (e.g., via a tap contact), causes primary display 102 to display a sub-window for composing a new email (e.g., shown in FIG. 7B); affordance 586, which, when activated (e.g., via a tap contact), causes primary display 102 to display a sub-window for replying to the sender of email A; affordance 588, which, when activated (e.g., via a tap contact), causes primary display 102 to display a sub-window for replying to all recipients of email A; affordance 590, which, when activated (e.g., via a tap contact), causes primary display 102 to display a sub-window for forwarding email A; affordance 592, which, when activated (e.g., via a tap contact), causes email A to be archived to a default mailbox or folder; affordance 594, which, when activated (e.g., via a tap contact), causes email A to be deleted; affordance 596, which, when activated (e.g., via a tap contact), causes dynamic function row 104 to display a set of affordances for selecting different flags, which optionally correspond to pre-existing folders, to be applied to email A (e.g., as shown in FIG. 7A); and affordance 598, which, when activated (e.g., via a tap contact), causes primary display 102 or dynamic function row 104 to display a search dialogue for searching the user's inbox. FIG. 6E further illustrates dynamic function row 104 receiving and detecting contact 599 (e.g., a long press gesture) at a location corresponding to persistent volume control 568.

Figure 6F:
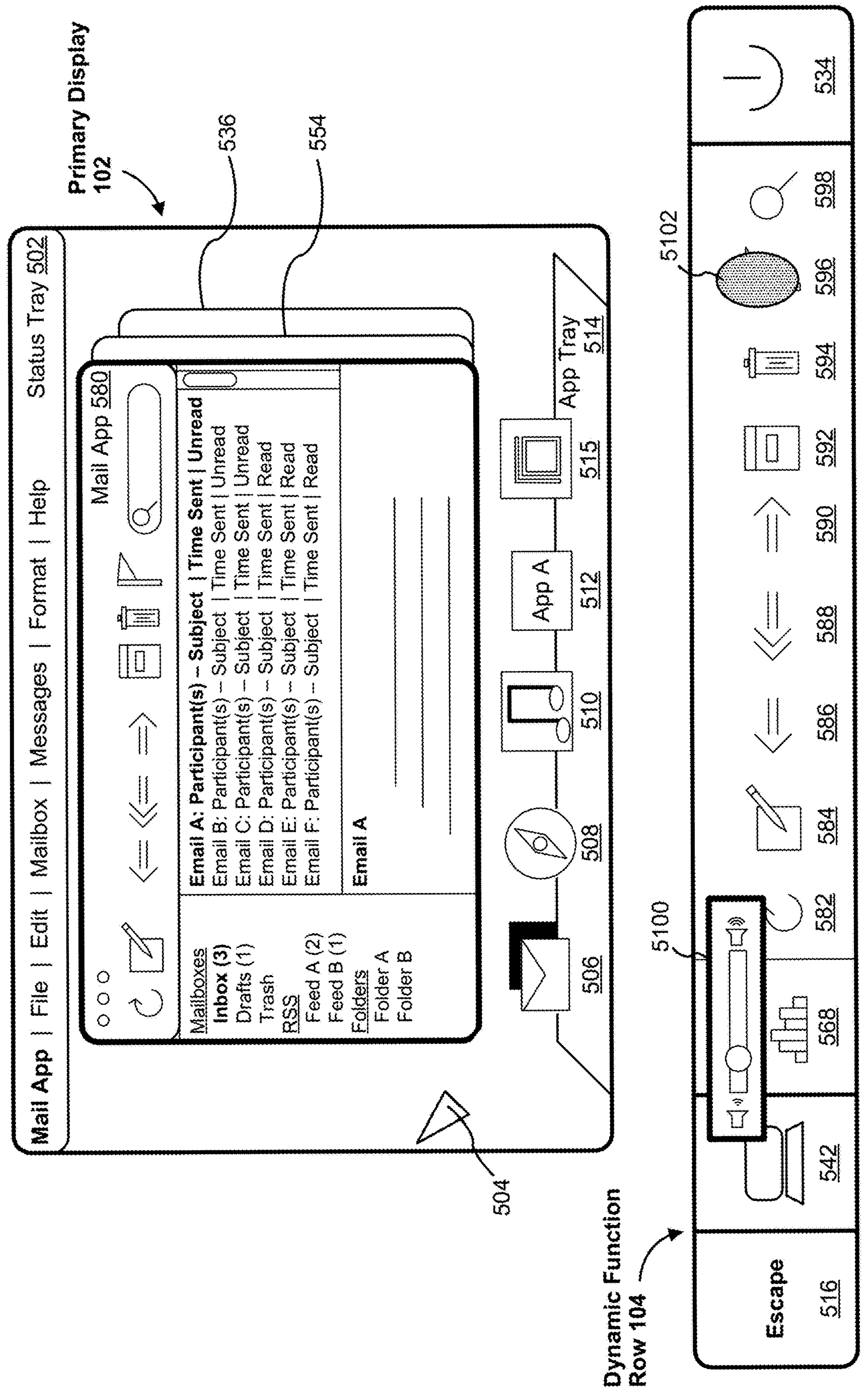

FIG. 6F illustrates dynamic function row 104 displaying volume slider 5100 for adjusting the playback volume of podcast J, which was initiated in FIG. 6C, in response to detecting the long press gesture at the location corresponding to persistent volume control 568 in FIG. 6E. The circle/thumb in volume slider 5100 can be dragged by the user of portable computing system 100 or desktop computing system 200 to adjust the volume. Alternatively, in some embodiments, dynamic function row 104 displays playback controls (e.g., pause, fast forward, rewind, next track, previous track, and the like) for controlling the playback of podcast J, which was initiated in FIG. 6C, in response to detecting the long press gesture at the location corresponding to persistent volume control 568 in FIG. 6E. In FIG. 6F, volume slider 5100 is overlaid on the plurality of affordances corresponding to email A. FIG. 6F also illustrates dynamic function row 104 receiving and detecting contact 5102 (e.g., a tap contact) at a location corresponding to affordance 596.

In other embodiments, volume slider 5100 is displayed in a separate region from the plurality of affordances corresponding to email A. As such, while volume slider 5100 is activated, the plurality of affordances corresponding to email A (e.g., affordances 582, 584, 586, 588, 590, 592, 594, 596, and 598) are animatedly scrolled or shrunken to ensure enough display space is available to display volume slider 5100. In some embodiments, the circle/thumb is displayed under the user's finger in response to the long press gesture to allow the user to slide the circle/thumb without having to remove the contact from the affordance.

FIG. 7A illustrates dynamic function row 104 displaying a set of affordances 5103, 5104, 5106, 5108, and 5110 for selecting different flags, which optionally correspond to pre-existing folders, to be applied to email A in response to detecting selection of affordance 596 in FIG. 6F. In FIG. 7A, dynamic function row 104 also displays exit affordance 5112 for ceasing to display the set of affordances 5103, 5104, 5106, 5108, and 5110 on dynamic function row 104 and displaying the plurality of affordances corresponding to email A on dynamic function row 104 (e.g., as shown in FIG. 6E). FIG. 7A also illustrates primary display 102 displaying cursor 504 at a location corresponding to an email composition affordance in window 580.

Figure 7B:
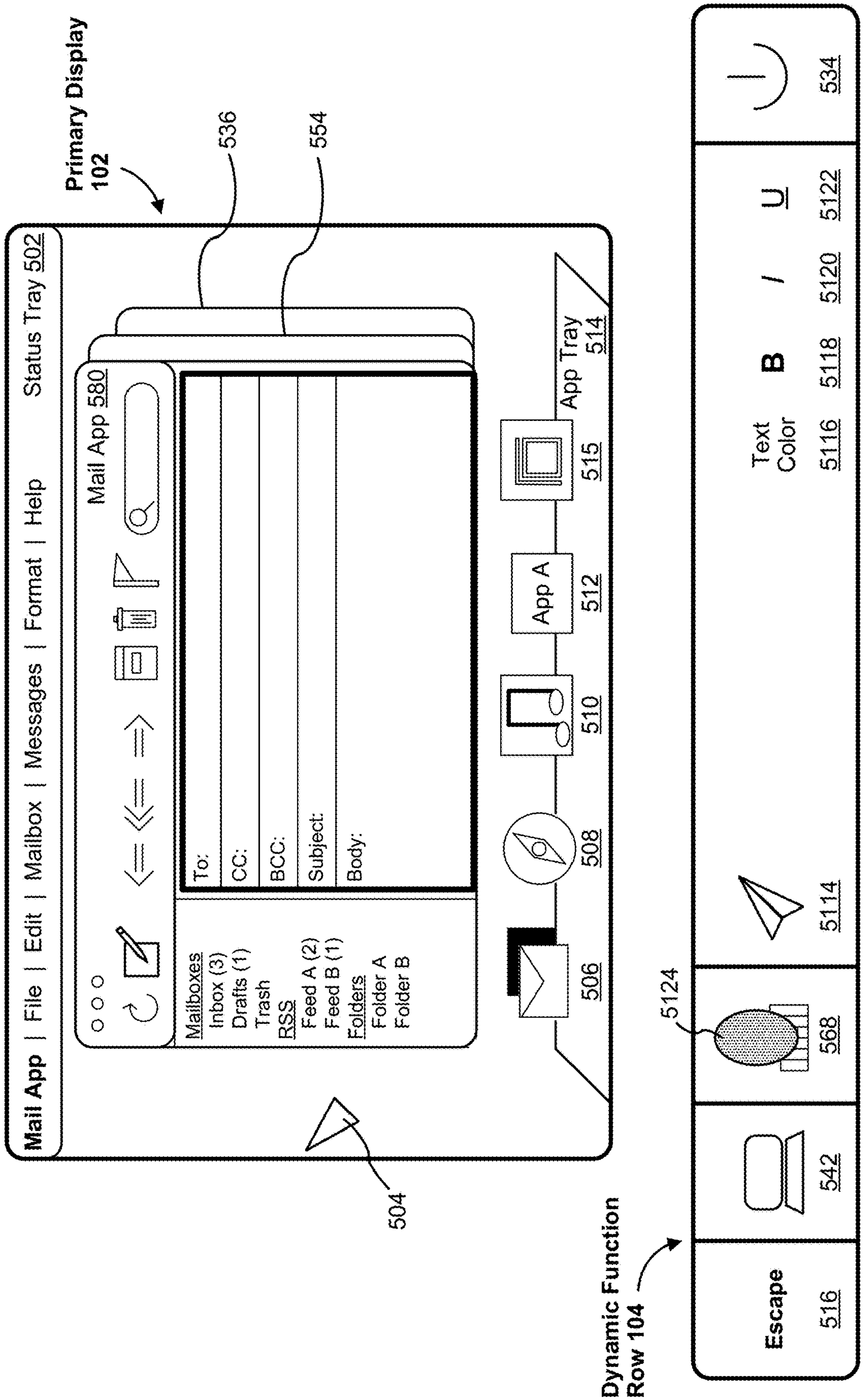

FIG. 7B illustrates primary display 102 displaying a sub-window for composing a new email within window 580 in response to detecting selection of the email composition affordance with cursor 504 in FIG. 7A. In FIG. 7B, the sub-window for composing a new email is in focus on primary display 102 as the email composition affordance is displayed with thicker lines and also as indicated by the thick lines surrounding the sub-window for composing a new email.

FIG. 7B also illustrates dynamic function row 104 displaying a set of affordances corresponding to composing a new email in response to detecting selection of the email composition affordance with cursor 504 in FIG. 7A. In FIG. 7B, the set of affordances corresponding to composing a new email includes an affordance 5114, which, when activated (e.g., via a tap contact), causes portable computing system 100 or desktop computing system 200 to send the newly composed email; affordance 5116 for changing the text color of text for the new email; affordance 5118 for emboldening selected text of the new email; affordance 5120 for italicizing selected text of the new email; and affordance 5122 for underlining selected text of the new email. FIG. 7B further illustrates dynamic function row 104 receiving and detecting contact 5124 (e.g., a tap contact) at a location corresponding to persistent volume control 568.

Figure 7C:
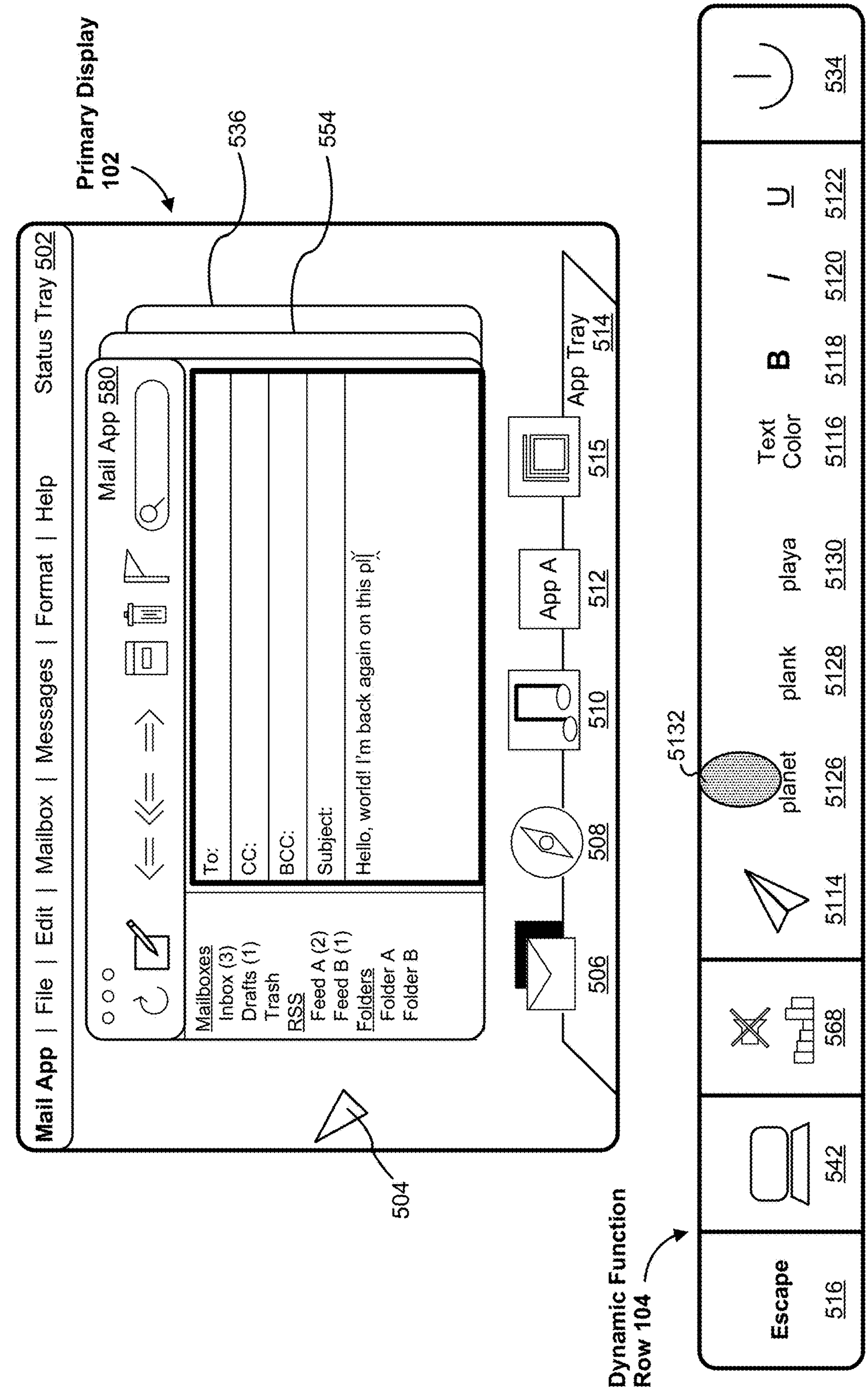

FIG. 7C illustrates primary display 102 displaying text in the body of the new email in the sub-window for composing a new email within window 580 and an indicator of the current insertion position located after the characters "pl."

FIG. 7C also illustrates dynamic function row 104 displaying persistent volume control 568 indicating that podcast J is muted in response to detecting the tap contact at the location corresponding to persistent volume control 568 in FIG. 7B. In FIG. 7C, persistent volume control 568 displays equalizer feedback for podcast J even while podcast J, whose playback was initiated in FIG. 6C, is muted (i.e., shows that podcast J is still playing but is muted). In FIG. 7C, dynamic function row 104 displays predictive words 5126, 5128, and 5130 for completing the word beginning with "pl" that is being typed in the body of the new email based on the insertion point in the sub-window within window 580. FIG. 7C further illustrates dynamic function row 104 receiving and detecting contact 5132 (e.g., a tap contact) at a location corresponding to predictive word 5126 (i.e., "planet").

Figure 7D:
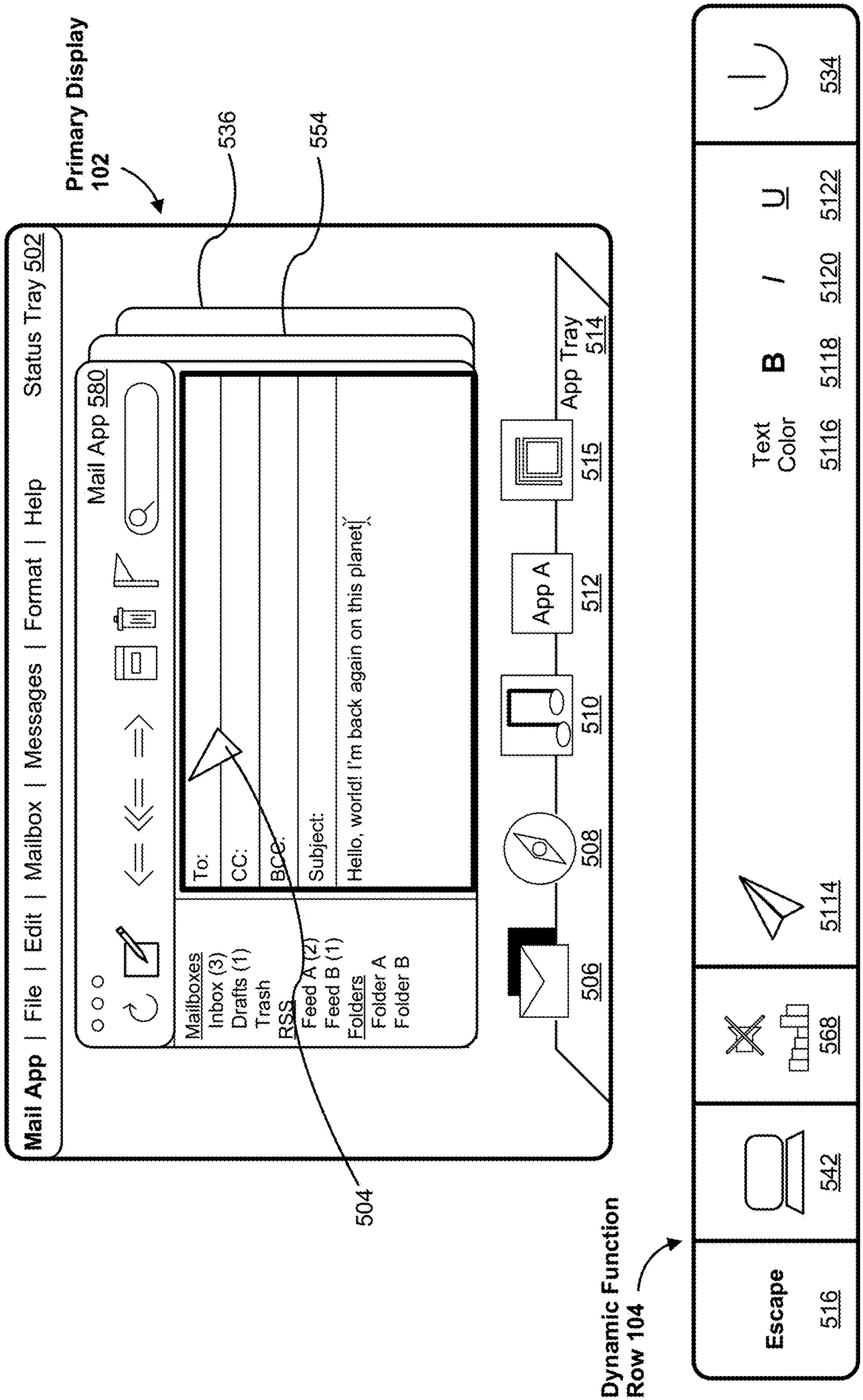

FIG. 7D illustrates primary display 102 displaying the word "planet" in the body of the new email in the sub-window for composing a new email within window 580 in response to detecting the selection of predictive word 5126 (i.e., "planet") in FIG. 7C. FIG. 7D also illustrates primary display 102 displaying cursor 504 at a location corresponding to the "To:" field of the sub-window for composing a new email.

Figure 8A:
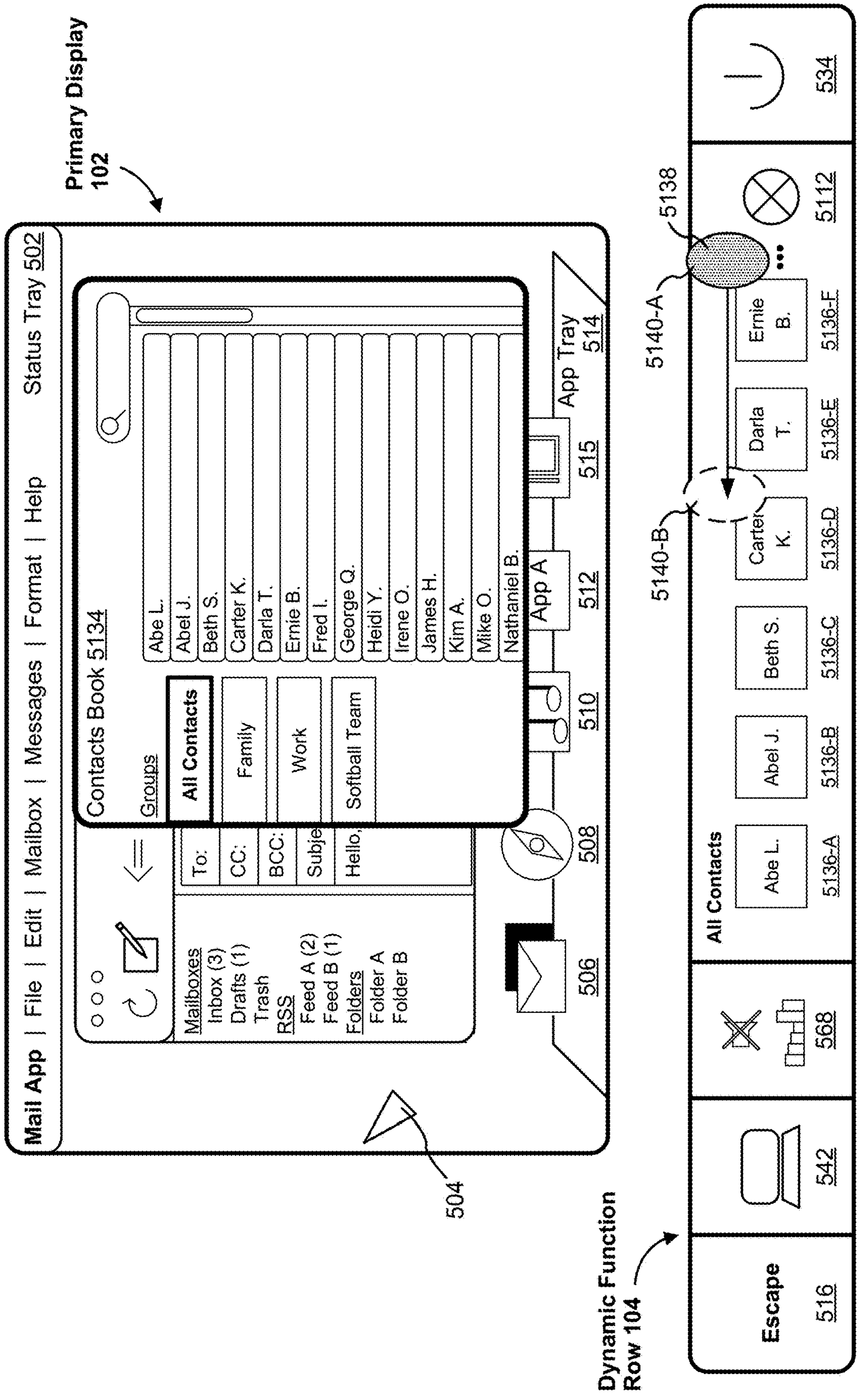

FIG. 8A illustrates primary display 102 displaying menu 5134 corresponding to the user's contact book in response to detecting selection of the "To:" field with cursor 504 in FIG. 7D. In FIG. 8A, menu 5134 includes a list of a plurality of contacts corresponding the "All Contacts" group of the user's contact book (e.g., a list of pre-existing or automatically populated contacts). In FIG. 8A, the "All Contacts" group of the user's contact book is in focus on primary display 102 as indicated by the thick lines surrounding the "All Contacts" group in menu 5134.

FIG. 8A also illustrates dynamic function row 104 displaying a first plurality of contact affordances 5136 (e.g., contact affordances 5136-A to 5136-F) corresponding to the "All Contacts" group of the user's contact book and the at least one system-level affordance (e.g., affordance 542) in response to detecting selection of the "To:" field with cursor 504 in FIG. 7D. In FIG. 8A, dynamic function row 104 also displays exit affordance 5112, which, when activated (e.g., via a tap contact), causes primary display 102 to cease displaying menu 5134 on primary display 102 and also causes dynamic function row 104 to cease displaying the first plurality of contact affordances 5136. FIG. 8A further illustrates dynamic function row 104 detecting a right-to-left swipe gesture with contact 5138 moving from a first location 5140-A to a second location 5140-B (e.g., the user scrolls right-to-left through All Contacts).

Figure 8B:
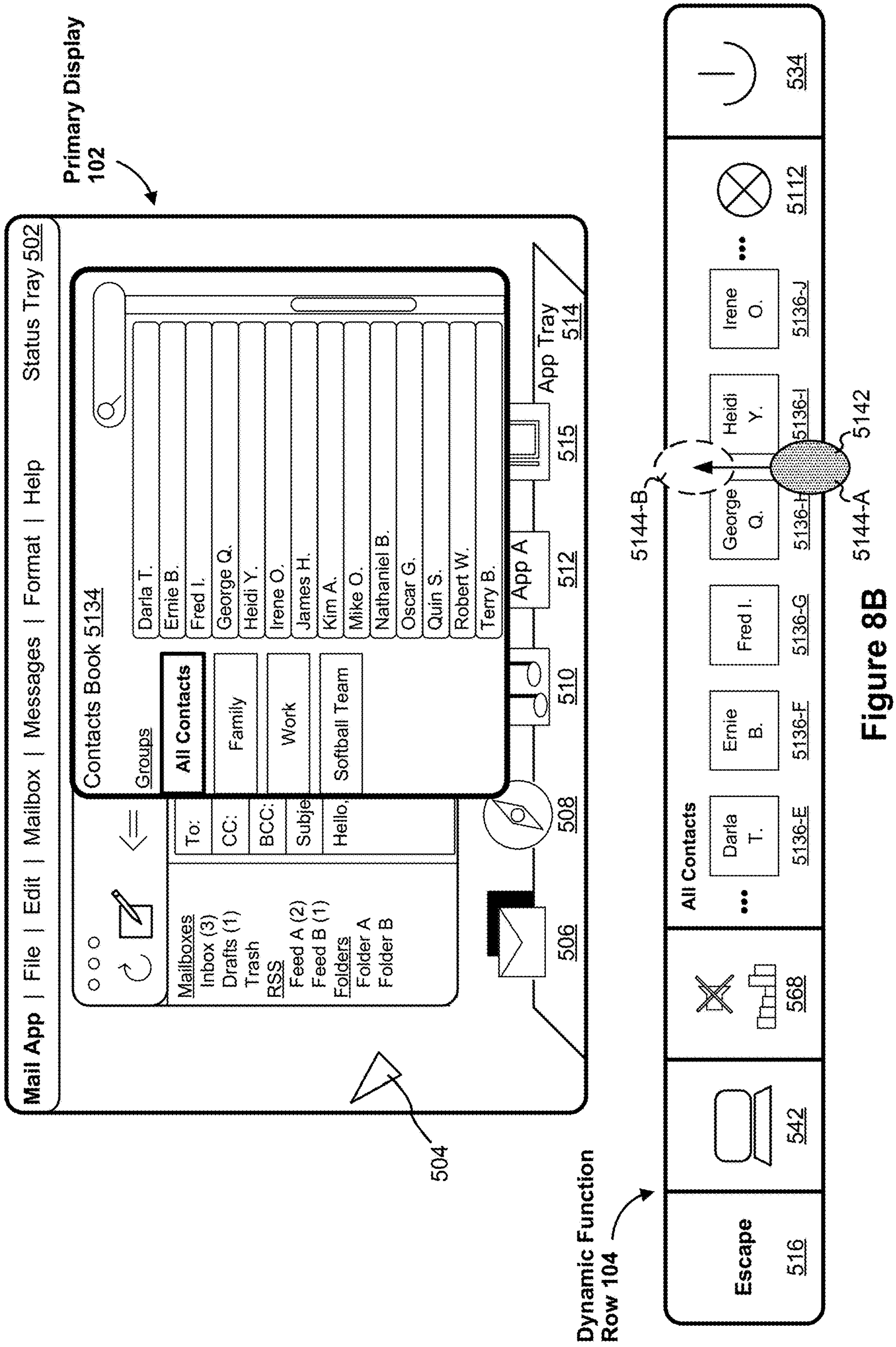

FIG. 8B illustrates dynamic function row 104 displaying a second plurality of contact affordances 5136 (e.g., contact affordances 5136-E to 5136-J) corresponding to the "All Contacts" group of the user's contact book and the at least one system-level affordance (e.g., affordance 542) in response to detecting the right-to-left swipe gesture in 8A. FIG. 8B also illustrates dynamic function row 104 detecting an upward swipe gesture with contact 5142 moving from a first location 5144-A to a second location 5144-B.

Figure 8C:
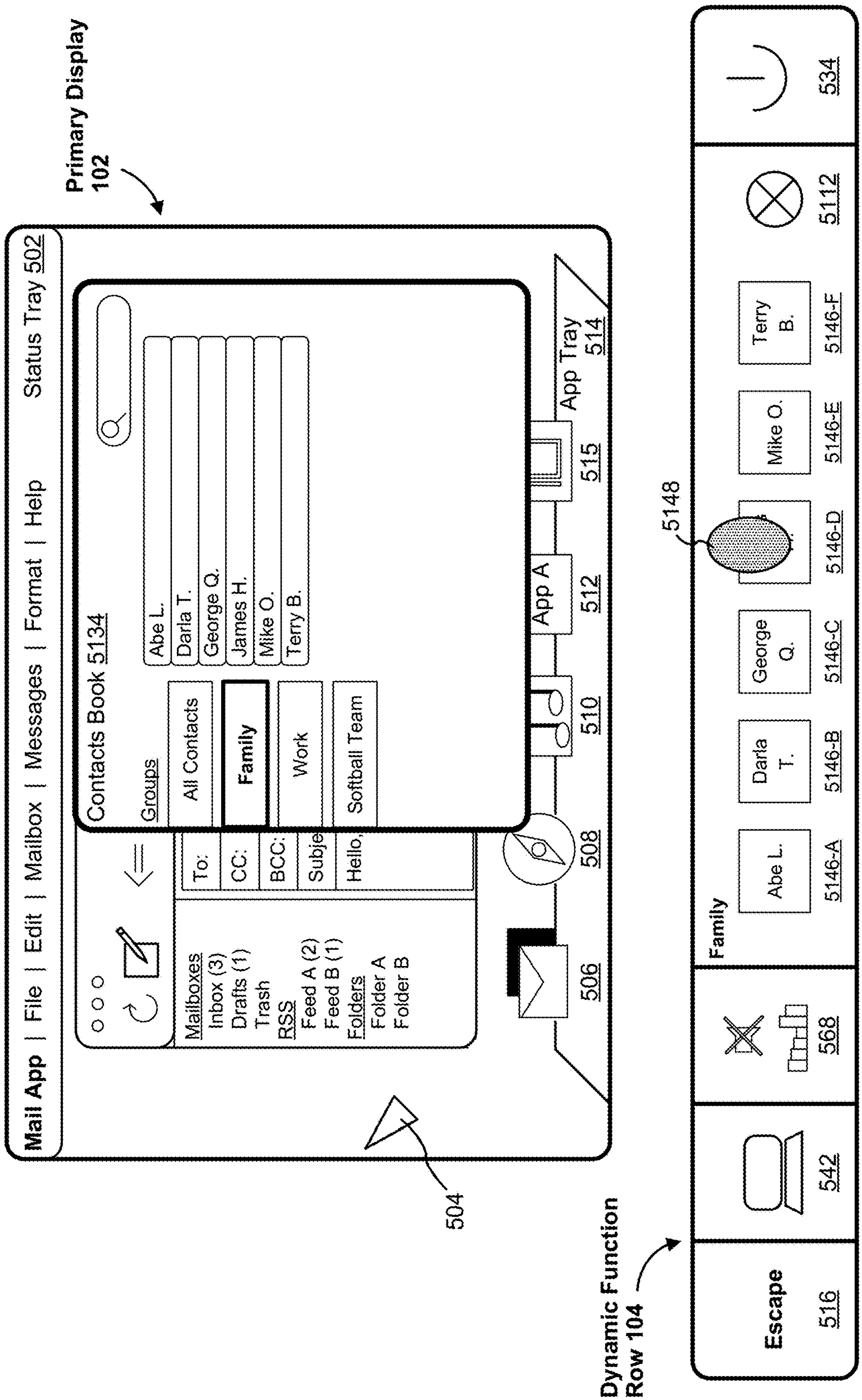

FIG. 8C illustrates primary display 102 displaying a list of a plurality of contacts corresponding the "Family" group of the user's contact book in response to detecting the upward swipe gesture in FIG. 8B. In FIG. 8C, the "Family" group of the user's contact book is in focus on primary display 102 as indicated by the thick lines surrounding the "Family" group in menu 5134.

FIG. 8C also illustrates dynamic function row 104 displaying a plurality of contact affordances 5146 (e.g., contact affordances 5146-A to 5146-F) corresponding to the "Family" group of the user's contact book and the at least one system-level affordance (e.g., affordance 542) in response to detecting upward swipe gesture in FIG. 8B. FIG. 8C further illustrates dynamic function row 104 receiving and detecting contact 5148 (e.g., a tap contact) at a location corresponding to contact affordance 5146-D, which is associated with a contact named "James H." within the "Family" group of the user's contact book.

Figure 8D:
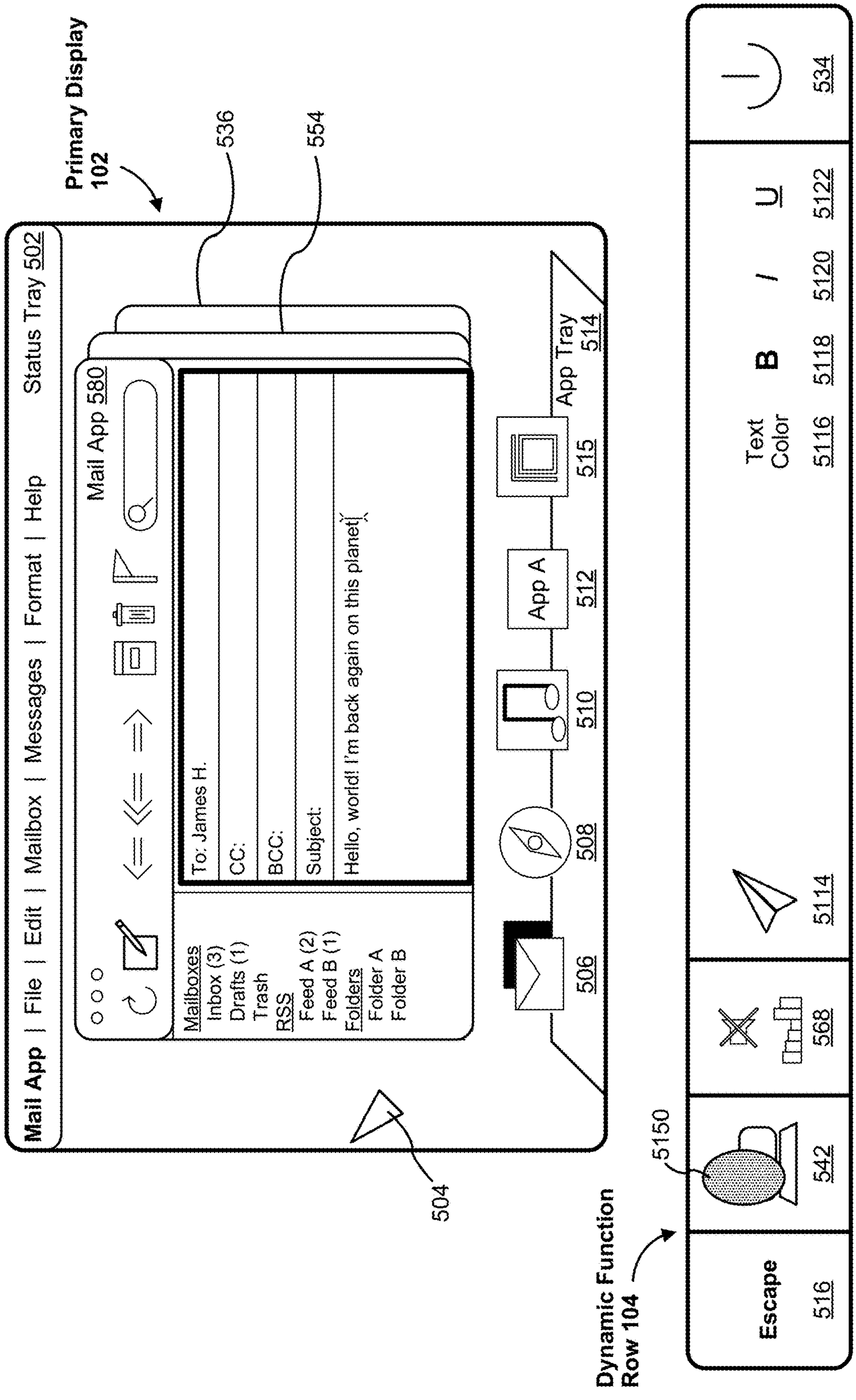

FIG. 8D illustrates primary display 102 displaying "James H." in the "To:" field of the sub-window for composing a new email within window 580 in response to detecting selection of contact affordance 5146-D in FIG. 8C. FIG. 8D also illustrates dynamic function row 104 replacing display of the plurality of contact affordances 5146 (e.g., contact affordances 5146-A to 5146-F) corresponding to the "Family" group of the user's contact book with the set of affordances (e.g., affordances 5114, 5116, 5118, 5120, and 5122) corresponding to composing a new email in response to detecting selection of contact affordance 5146-D in FIG. 8C. FIG. 8D further illustrates dynamic function row 104 receiving and detecting contact 5150 (e.g., a tap contact) at a location corresponding to the at least one system-level affordance 542.

Figure 8E:
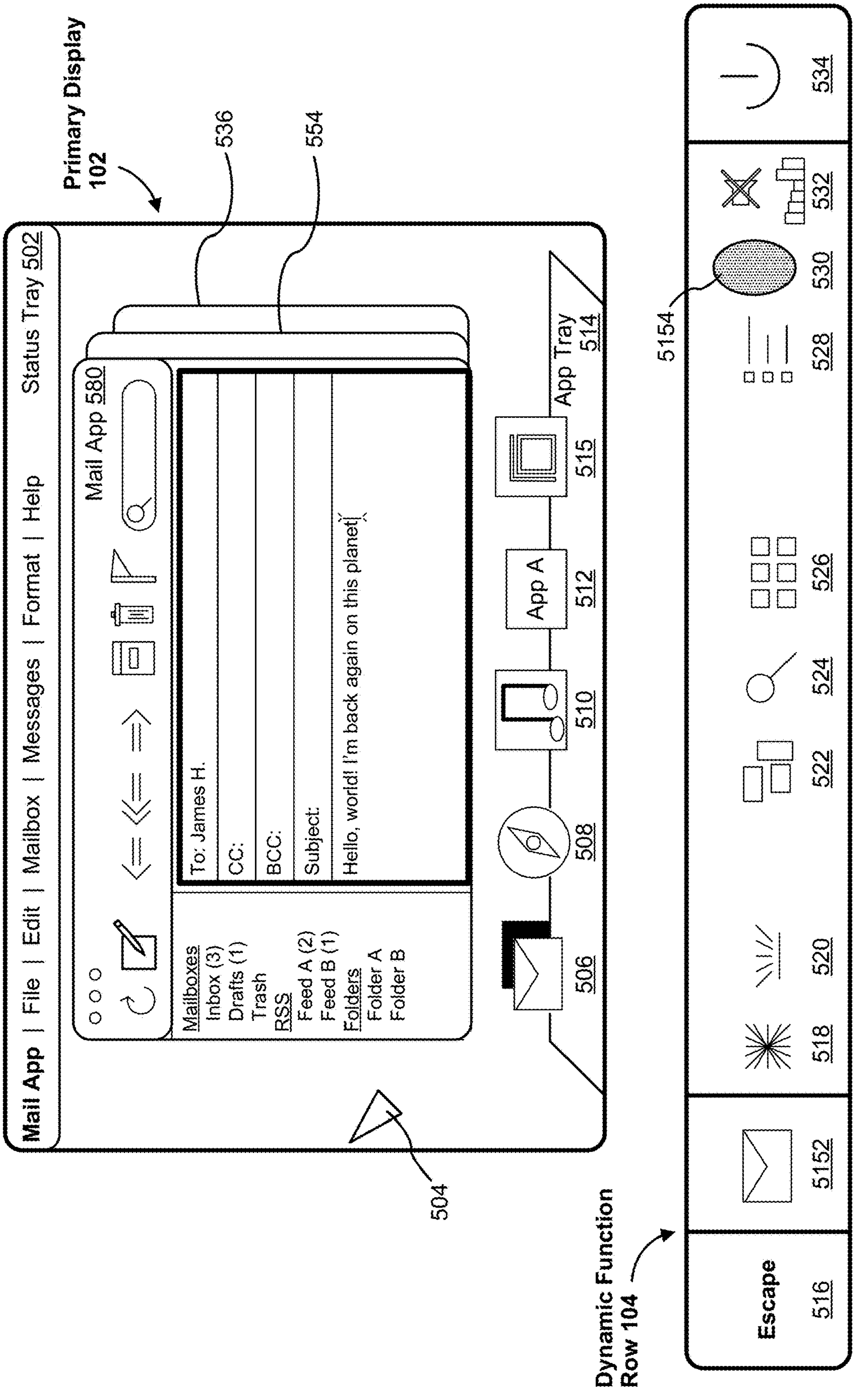

FIG. 8E illustrates dynamic function row 104 displaying persistent controls (i.e., affordances 516 and 534), the plurality of system-level affordances (i.e., affordances 518, 520, 522, 524, 526, 528, 530, and 532), and affordance 5152 corresponding to the mail application in response to detecting selection of affordance 542 in FIG. 8D. FIG. 8E also illustrates dynamic function row 104 receiving and detecting contact 5154 (e.g., a tap contact) at a location corresponding to play/pause affordance 530. For example, in response to detecting selection of play/pause affordance 530, portable computing system 100 or desktop computing system 200 pauses playback of podcast J, which was initiated by the interactions described with respect to FIG. 6C and was muted by the interactions described with respect to FIG. 7B. Playback of podcast J may be re-initiated by a subsequent selection of play/pause affordance 530 in FIG. 8E.

Figure 8F:
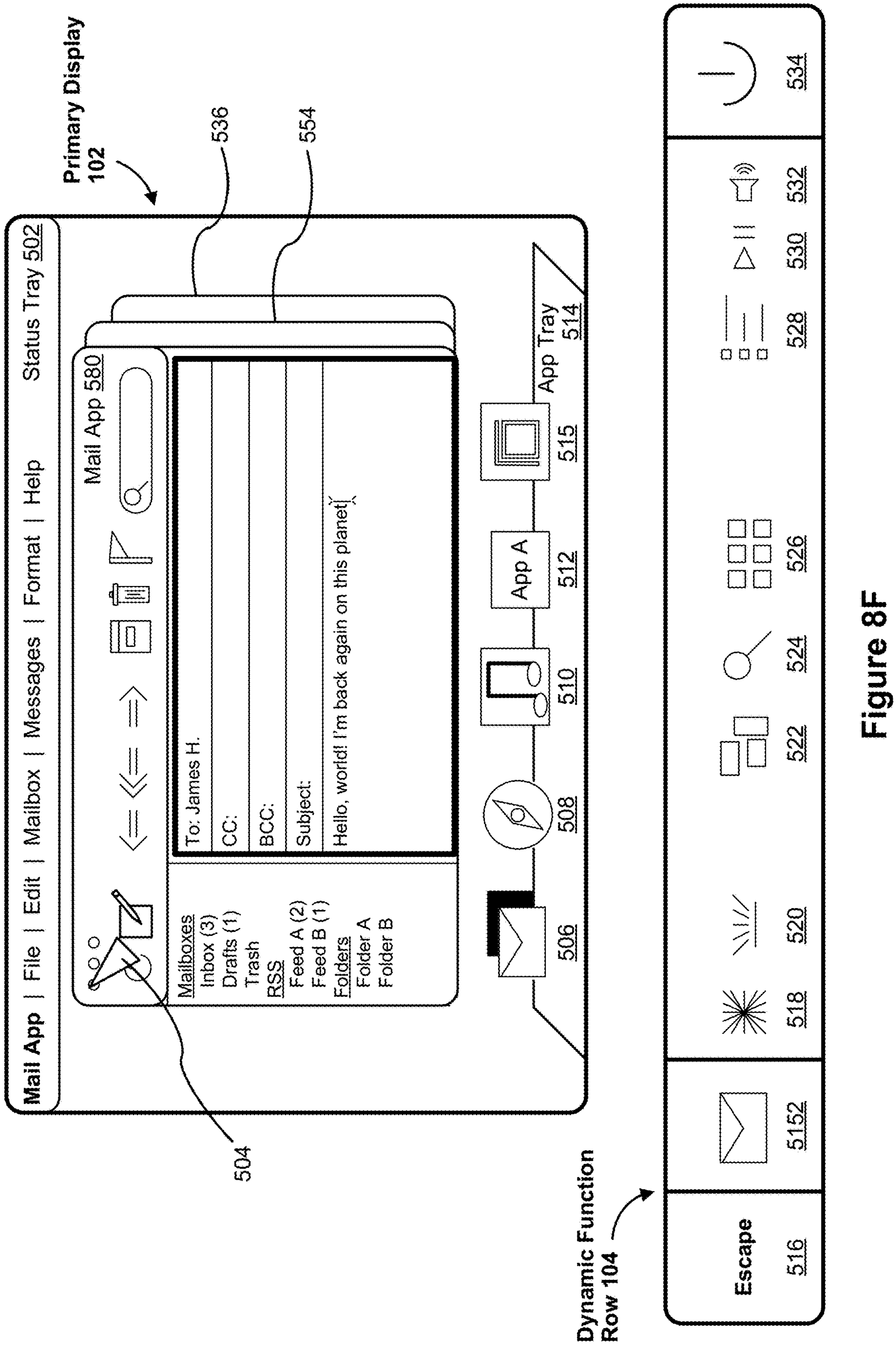
Figure 8G:
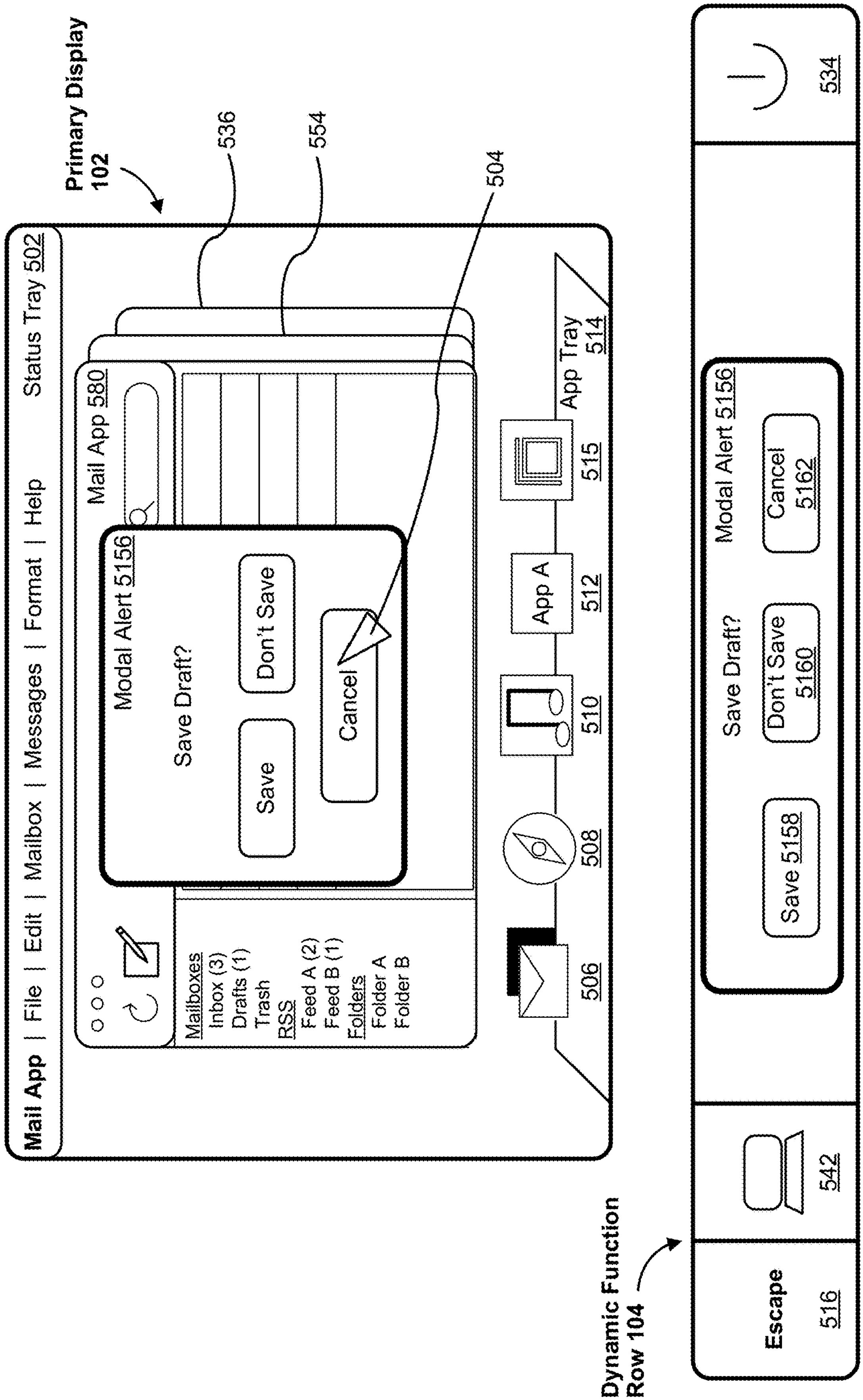

FIG. 8F illustrates primary display 102 displaying cursor 504 at a location corresponding to an exit affordance for closing window 580. FIG. 8G illustrates primary display 102 displaying modal alert 5156 in response to detecting selection of the exit affordance with cursor 504 in FIG. 8F. In FIG. 8G, modal alert 5156 is in focus on primary display 102. In FIG. 8G, modal alert 5156 displayed on primary display 102 prompts the user to save the draft email prior to closing window 580 and includes a "Save" affordance, a "Don't Save" affordance, and a "Cancel" affordance. FIG. 8G also illustrates primary display 102 displaying cursor 504 at a location corresponding to "Cancel" affordance. The display of modal alerts on the dynamic function row increasing efficiency and provides a better user experience because it removes the need for the user to move their eyes between the keyboard and the screen and also removes the need for the user to move their hands from the keyboard to another input device such as a mouse.

FIG. 8G further illustrates dynamic function row 104 displaying modal alert 5156 and the at least one system-level affordance (e.g., affordance 542) in response to detecting selection of the exit affordance with cursor 504 in FIG. 8F. In some embodiments, a modal alert is a notification corresponding to an email, SMS, or the like received by portable computing system 100 or desktop computing system 200, an alert associated with an application (e.g., as a save dialog, an exit confirmation dialog, or a send email confirmation dialog), or the like. In FIG. 8G, modal alert 5156 displayed on dynamic function row 104 prompts the user to save the draft email prior to closing window 580 and includes a "Save" affordance 5158, a "Don't Save" affordance 5160, and a "Cancel" affordance 5162. Affordances 5158, 5160, and 5162 are merely examples, and other affordances may be used to control or respond to modal alerts.

Figure 8H:
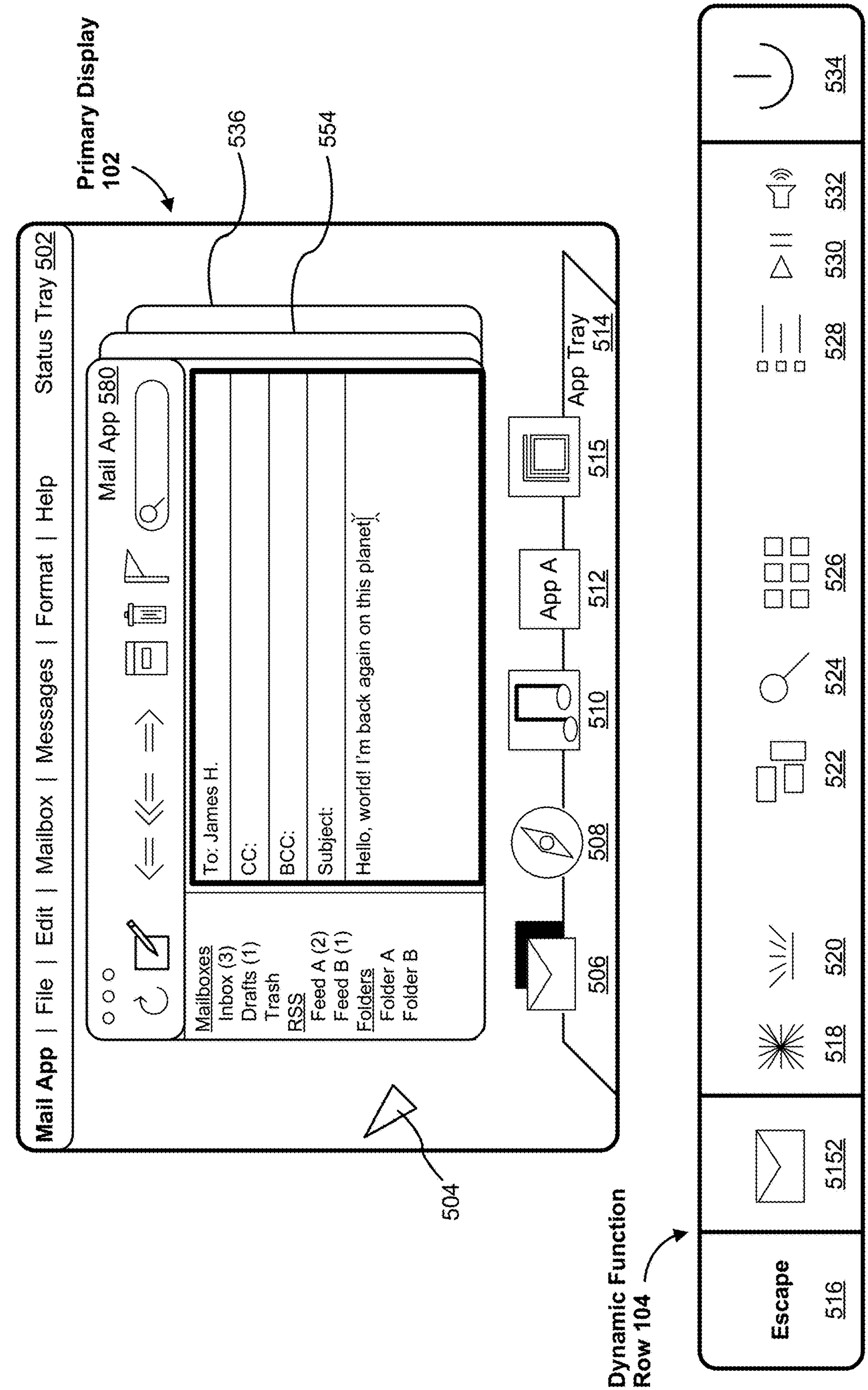

FIG. 8H illustrates primary display 102 ceasing to display modal alert 5156 and maintaining display of the sub-window for composing a new email (as in FIG. 8F) in response to detecting selection of "Cancel" affordance with cursor 504 in FIG. 8G. FIG. 8H also illustrates dynamic function row 104 ceasing to display modal alert 5156 and displaying persistent controls (i.e., affordances 516 and 534), the plurality of system-level affordances (i.e., affordances 518, 520, 522, 524, 526, 528, 530, and 532), and affordance 5152 corresponding to the mail application (as in FIG. 8F) in response to detecting selection of Cancel" affordance with cursor 504 in FIG. 8G.

Figure 9:
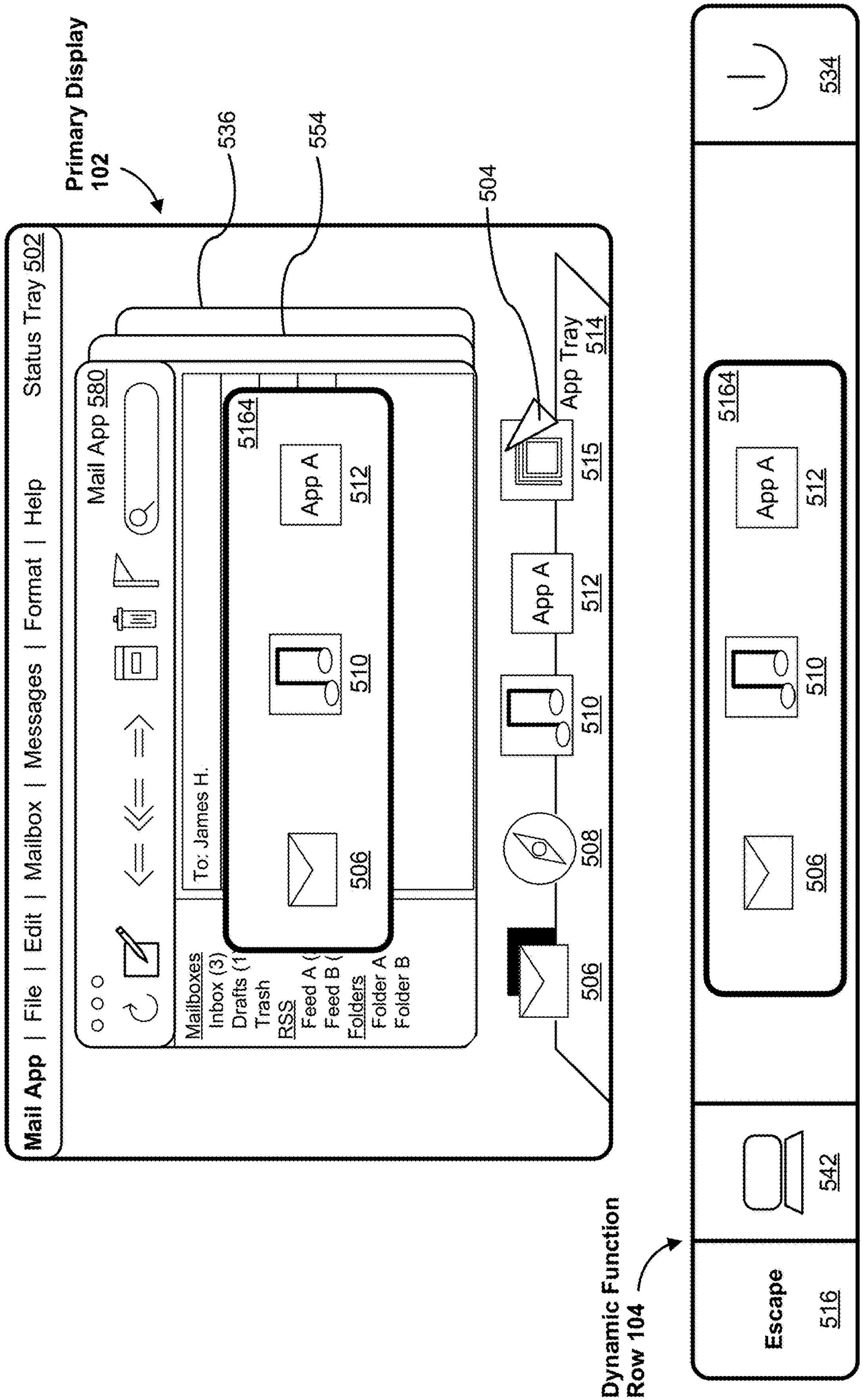

FIG. 9 illustrates primary display 102 displaying an application selection window 5164 in response to receiving a signal corresponding to a specified physical key combination (e.g., alt+tab) from the set of physical keys 106 of portable computing system 100 (FIG. 1A-1B) or from the set of physical keys 106 of peripheral keyboard 206 of desktop computing system 200 (FIGS. 2A-2D). In FIG. 9, application selection window 5164 displayed on primary display 102 includes: mail application icon 506, which, when activated (e.g., via selection by cursor 504) causes primary display 102 to display window 580 corresponding to the mail application in the foreground; media player application icon 510, which, when activated (e.g., via selection by cursor 504) causes primary display 102 to display window 554 corresponding to the media player application in the foreground; and application A icon 512, which, when activated (e.g., via selection by cursor 504) causes primary display 102 to display window 536 corresponding to application A in the foreground. FIG. 9 also illustrates primary display 102 displaying cursor 504 at a location corresponding to photo application icon 515.

FIG. 9 further illustrates dynamic function row 104 displaying application selection window 5164 and the at least one system-level affordance (e.g., affordance 542) in response to receiving a signal corresponding to a specified physical key combination (e.g., alt+tab) from the set of physical keys 106 of portable computing system 100 (FIG. 1A-1B) or from the set of physical keys 106 of peripheral keyboard 206 of desktop computing system 200 (FIGS. 2A-2D). In FIG. 9, application selection window 5164 displayed on dynamic function row 104 includes: mail application icon 506, which, when activated (e.g., via a tap contact) causes primary display 102 to display window 580 corresponding to the mail application in the foreground; media player application icon 510, which, when activated (e.g., via a tap contact) causes primary display 102 to display window 554 corresponding to the media player application in the foreground; and application A icon 512, which, when activated (e.g., via a tap contact) causes primary display 102 to display window 536 corresponding to application A in the foreground.

Figure 10A:
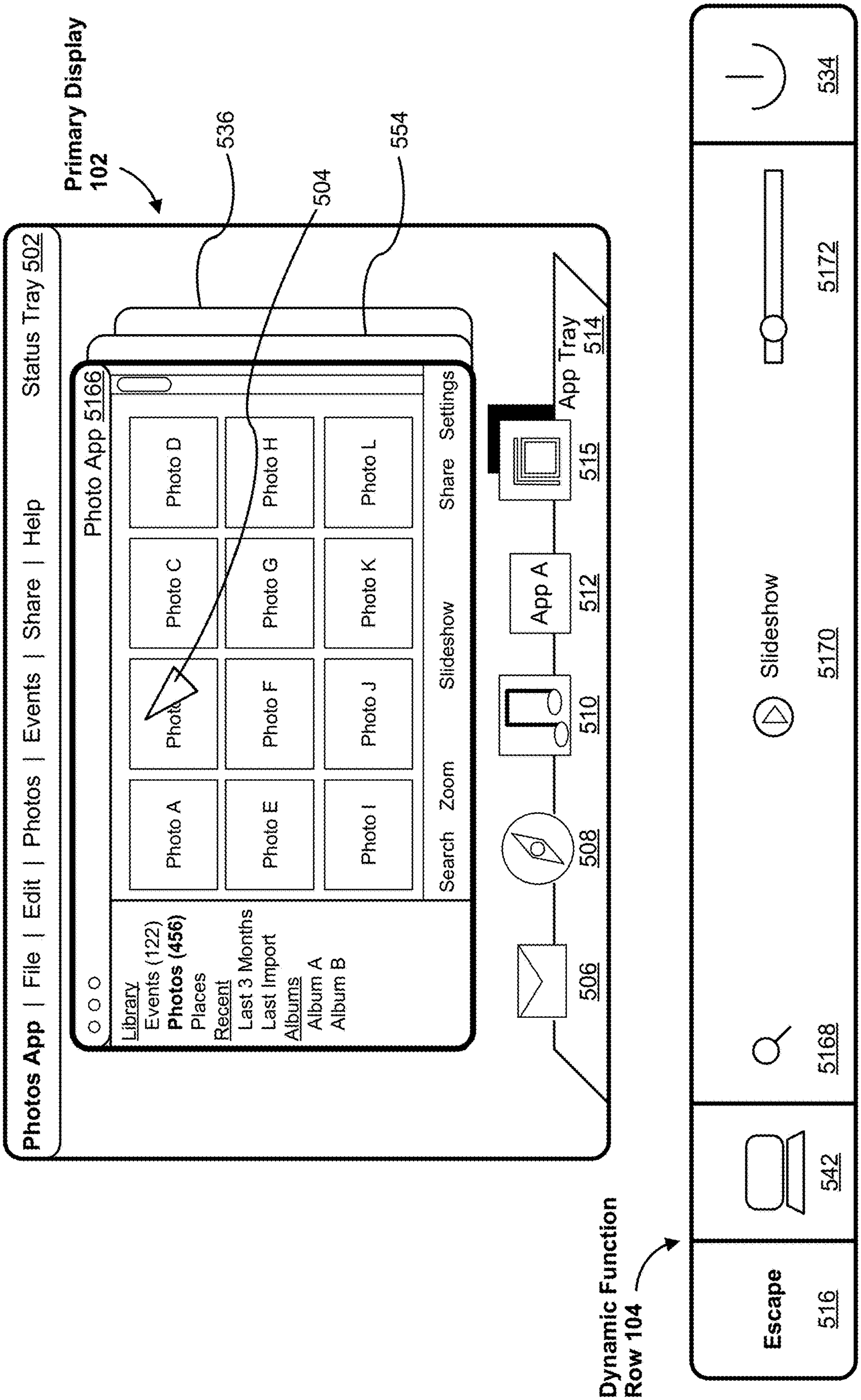

FIG. 10A illustrates primary display 102 displaying a window 5166 for the photo application in response to detecting selection of photo application icon 515 with cursor 504 in FIG. 9. For example, window 5166 is overlaid on windows 580, 554, and 536. In FIG. 10A, window 5166 displays a plurality of photos associated with an all photos sub-section of a user's photo library. In FIG. 10A, the all photos sub-section of a user's photo library is in focus on primary display 102 as shown by "Photos" displayed in bold and photos A-L at least partially displayed in window 5166. In FIG. 10A, status tray 502 indicates that the photo application is running in the foreground, and app tray 514 also indicates that the photo application is running in the foreground based on the shadow behind photo application icon 515. FIG. 10A also illustrates primary display 102 displaying cursor 504 at a location corresponding to photo B within window 5166.

FIG. 10A further illustrates dynamic function row 104 displaying a plurality of affordances corresponding to the all photos sub-section of the user's photo library (e.g., affordances 5168, 5170, and 5172) and the at least one system-level affordance (e.g., affordance 542) in response to detecting selection of photo application icon 515 with cursor 504 in FIG. 9. In FIG. 10A, dynamic function row 104 includes: search affordance 5168, for searching the user's photo library; slideshow affordance 5170, which, when activated (e.g., via a tap contact), initiates a slideshow of the selected photos or all photos in the all photos sub-section of the user's photo library in a full-screen mode (e.g., shown in FIG. 10C); and slider affordance 5172 for scrolling the photos displayed from the all photos sub-section of the user's photo library that are displayed in window 5166.

Figure 10B:
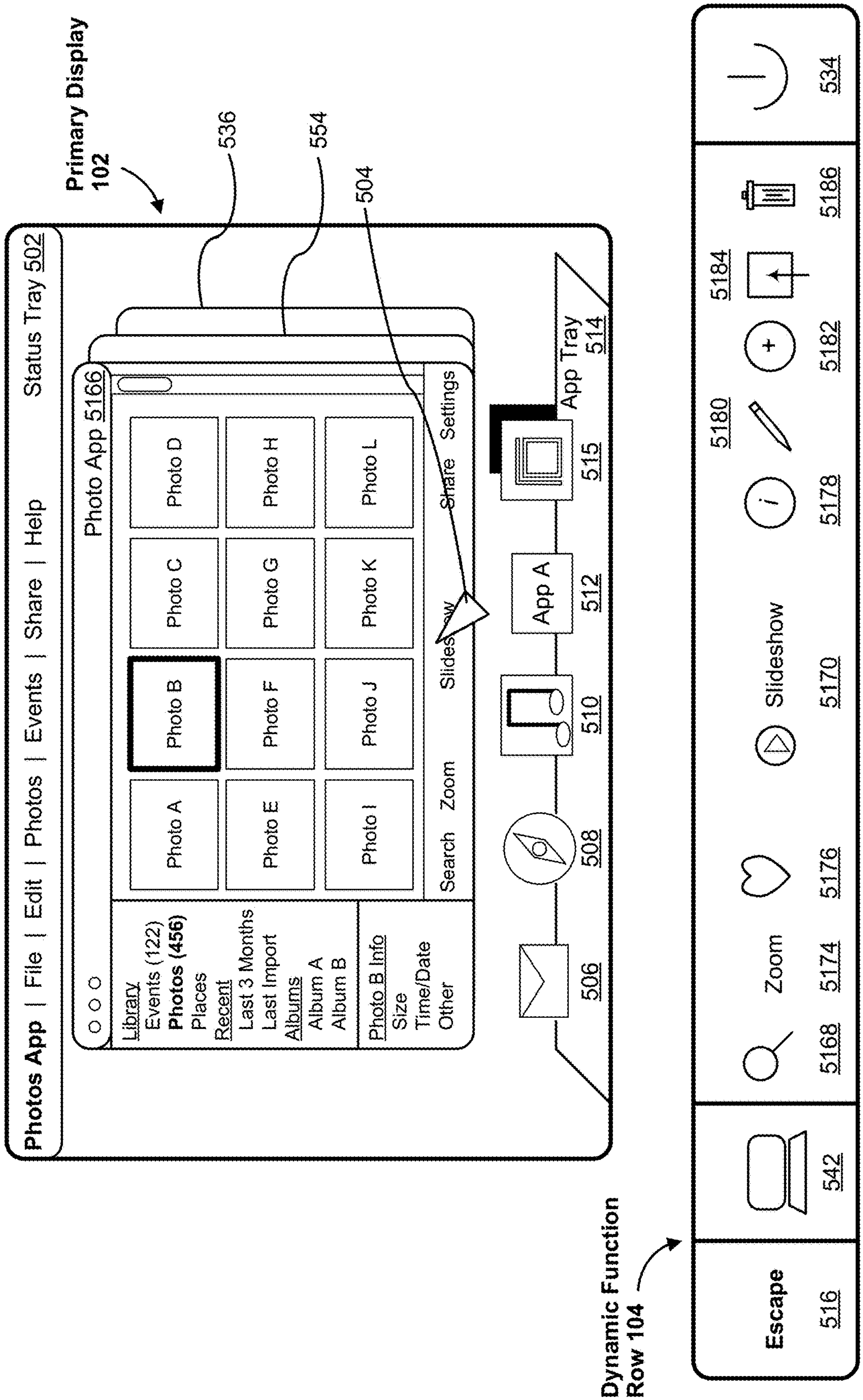

FIG. 10B illustrates primary display 102 displaying selected photo B in window 5166 in response to detecting selection of photo B with cursor 504 in FIG. 10A. In FIG. 10B, selected photo B is in focus on primary display 102 as shown by the thick lines surrounding photo B in window 5166. FIG. 10B also illustrates primary display 102 displaying cursor 504 at a location corresponding to a slideshow affordance.

FIG. 10B further illustrates dynamic function row 104 displaying a set of affordances corresponding to selected photo B in response to detecting selection of photo B with cursor 504 in FIG. 10A. In FIG. 10B, the set of affordance corresponding to selected photo B include: search affordance 5168 for searching the user's photo library; zoom affordance 5174 for zooming into selected photo B; like affordance 5176 for liking selected photo B; slideshow affordance 5170, which, when activated (e.g., via a tap contact), initiates a slideshow of the selected photos or all photos in the all photos sub-section of the user's photo library in a full-screen mode (e.g., shown in FIG. 10C); information affordance 5178 for displaying information corresponding to selected photo B, such as size, location, time/date, and the like, on dynamic function row 104 and/or primary display 102; editing affordance 5180, which, when activated (e.g., via a tap contact), causes dynamic function row 104 to display tools for editing selected photo B (e.g., shown in FIG. 10F) and/or causes primary display 102 to display an editing interface for editing selected photo B; photo adding affordance 5182 for adding selected photo B to a photo album; sharing affordance 5184 for sharing selected photo B via one or more communication modes (e.g., social media networks, SMS, email, and the like); and deletion affordance 5186 for deleting selected photo B from the user's photo library.

Figure 10C:
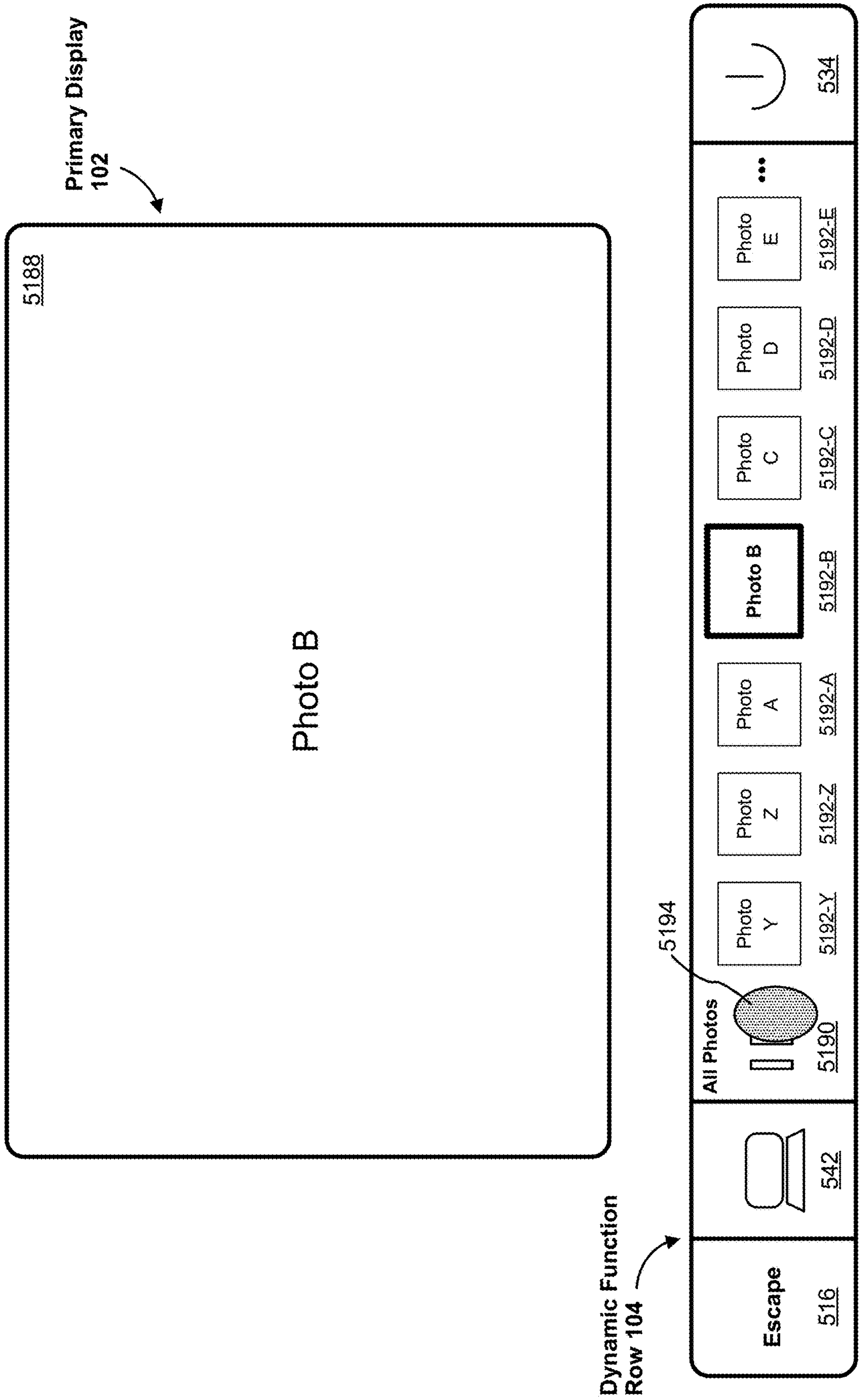

FIG. 10C illustrates primary display 102 displaying a slideshow of photos from the all photos sub-section of the user's photo library in window 5188 in response to detecting selection of the slideshow affordance with cursor 504 in FIG. 10B. In FIG. 10C, primary display 102 displays window 5188 with photo B in full-screen mode.

FIG. 10C also illustrates dynamic function row 104 displaying a plurality of thumbnail images (e.g., thumbnail images 5192-Y, 5192-Z, 5192-A, 5192-B, 5192-C, 5192-D, and 5192-E) corresponding to the photos in the all photos sub-section of the user's photo library in response to detecting selection of the slideshow affordance with cursor 504 in FIG. 10B. In FIG. 10C, the thick lines surrounding thumbnail image 5192-B indicate that photo B is currently displayed by primary display 102. In FIG. 10C, dynamic function row 104 also displays a pause affordance 5190, which, when activated (e.g., via a tap contact), causes the slideshow to be paused and also causes primary display 102 to exit the full-screen mode. FIG. 10C further illustrates dynamic function row 104 receiving and detecting contact 5194 (e.g., a tap contact) at a location corresponding to pause affordance 5190.

Figure 10D:
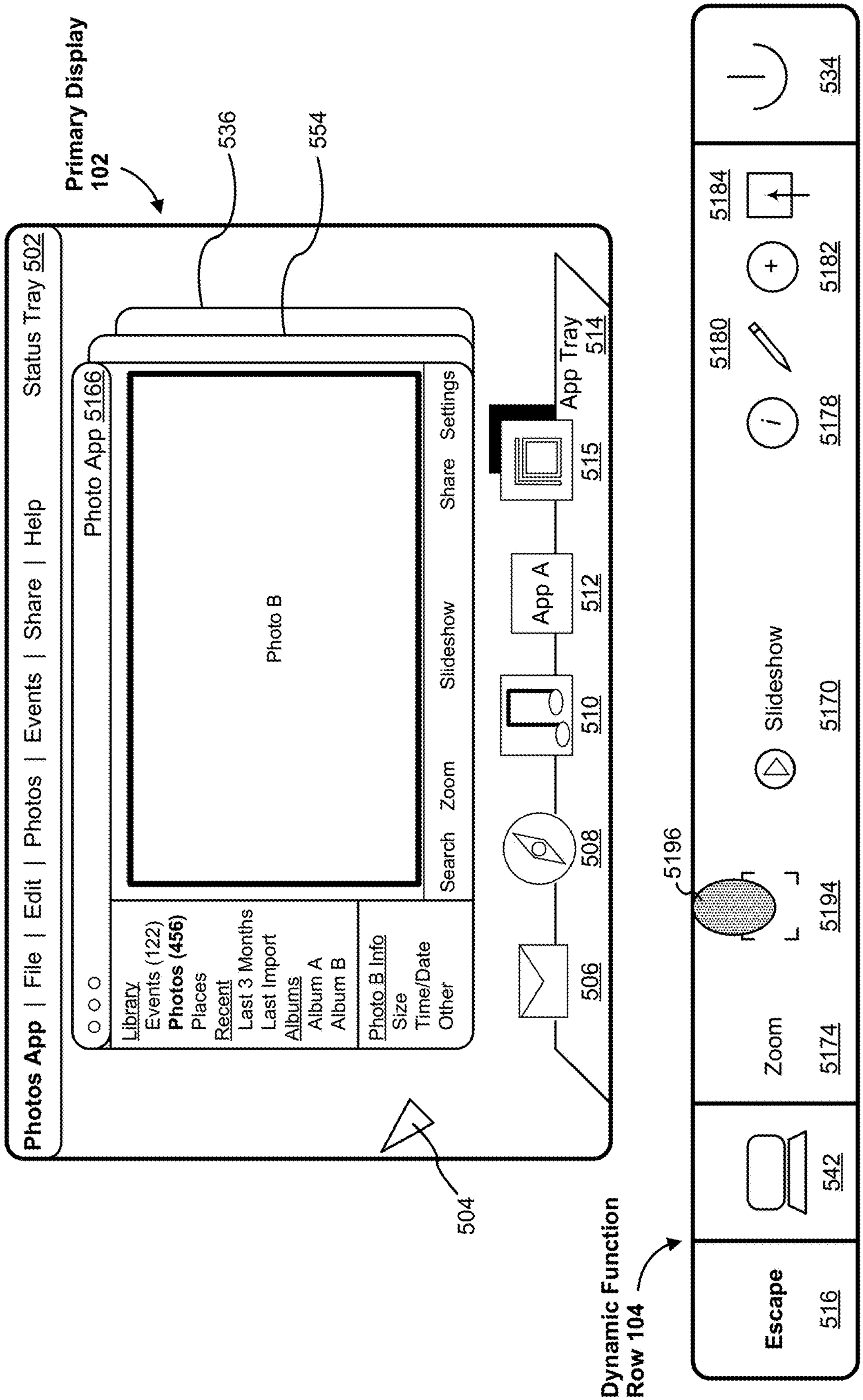

FIG. 10D illustrates primary display 102 displaying photo B in an expanded view within window 5166 in response to detecting selection of pause affordance 5190 in FIG. 10C. In FIG. 10D, the expanded view of photo B is in focus on primary display 102 as shown by the thick lines surrounding the expanded view of photo B in window 5166.

FIG. 10D also illustrates dynamic function row 104 displaying a set of affordances corresponding to photo B in response to detecting selection of pause affordance 5190 in FIG. 10C. In FIG. 10D, the set of affordance corresponding to photo B include: zoom affordance 5174, which, when activated (e.g., via a tap contact), causes dynamic function row 104 and/or primary display 102 to display zoom controls that enable the user of portable computing system 100 or desktop computing system 200 to zoom into or zoom out from photo B; full-screen affordance 5194, which, when activated (e.g., via a tap contact), causes primary display 102 to display photo B in full-screen mode; slideshow affordance 5170, which, when activated (e.g., via a tap contact), initiates a slideshow of the selected photos or all photos in the all photos sub-section of the user's photo library in a full-screen mode; information affordance 5178 for displaying information corresponding to selected photo B, such as size, location, time/date, and the like, on dynamic function row 104 and/or primary display 102; editing affordance 5180, which, when activated (e.g., via a tap contact), causes dynamic function row 104 to display tools for editing selected photo B and/or causes primary display 102 to display an editing interface for editing selected photo B; photo adding affordance 5182 for adding selected photo B to a photo album; and sharing affordance 5184 for sharing selected photo B via one or more communication modes (e.g., social media networks, SMS, email, and the like). FIG. 10D further illustrates dynamic function row 104 receiving and detecting contact 5196 (e.g., a tap contact) at a location corresponding to full-screen affordance 5196.

Figure 10E:
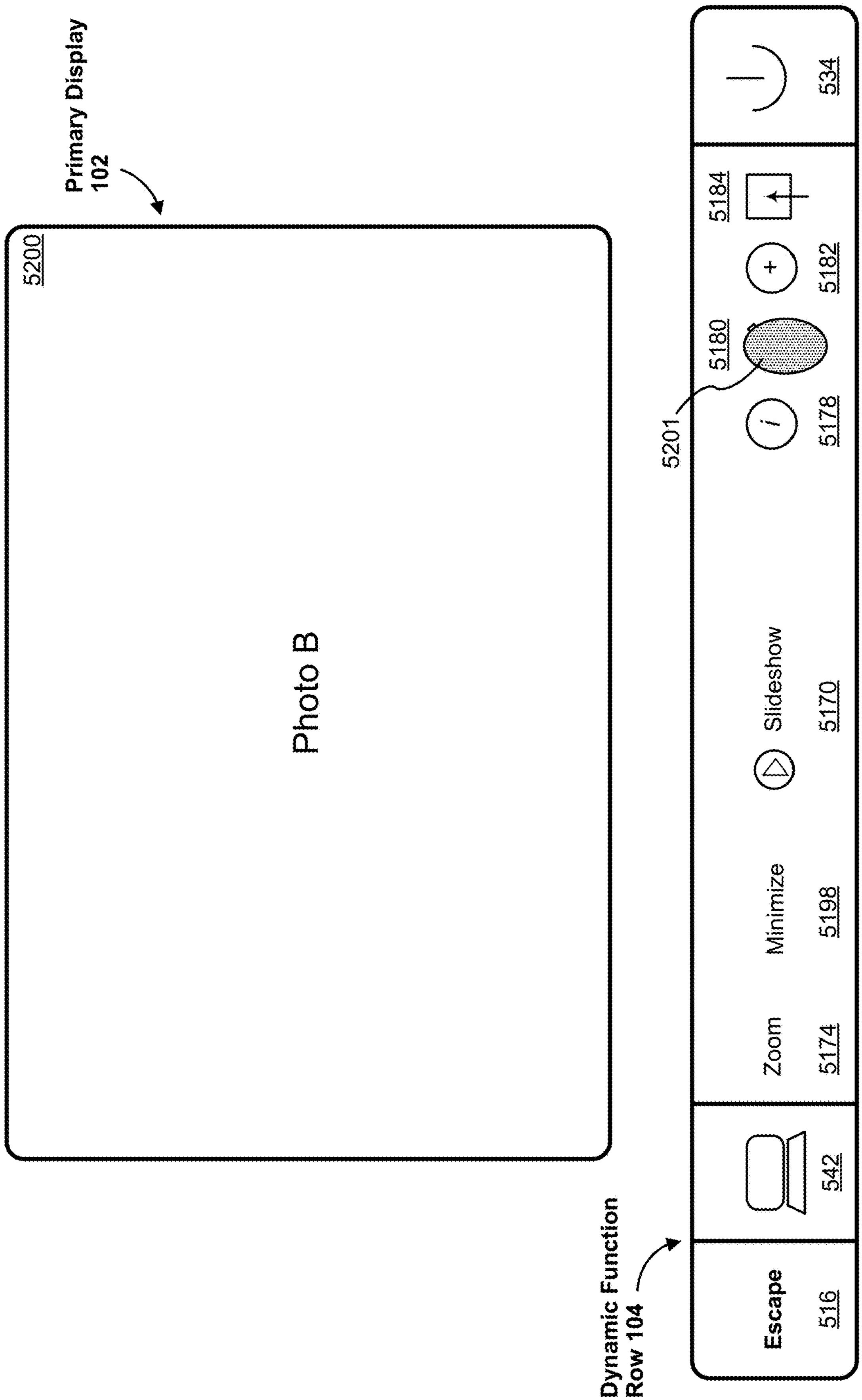

FIG. 10E illustrates primary display 102 displaying photo B in full-screen mode within window 5200 in response to detecting selection of full-screen affordance 5196 in FIG. 10D. FIG. 10E also illustrates dynamic function row 104 displaying minimize affordance 5198 in response to detecting selection of full-screen affordance 5196 in FIG. 10D. When activated (e.g., via a tap contact), minimize affordance 5198 causes primary display 102 to display photo B in the expanded view within window 5166 (as shown in FIG. 10D). FIG. 10E further illustrates dynamic function row 104 receiving and detecting contact 5201 (e.g., a tap contact) at a location corresponding to editing affordance 5180.

Figure 10F:
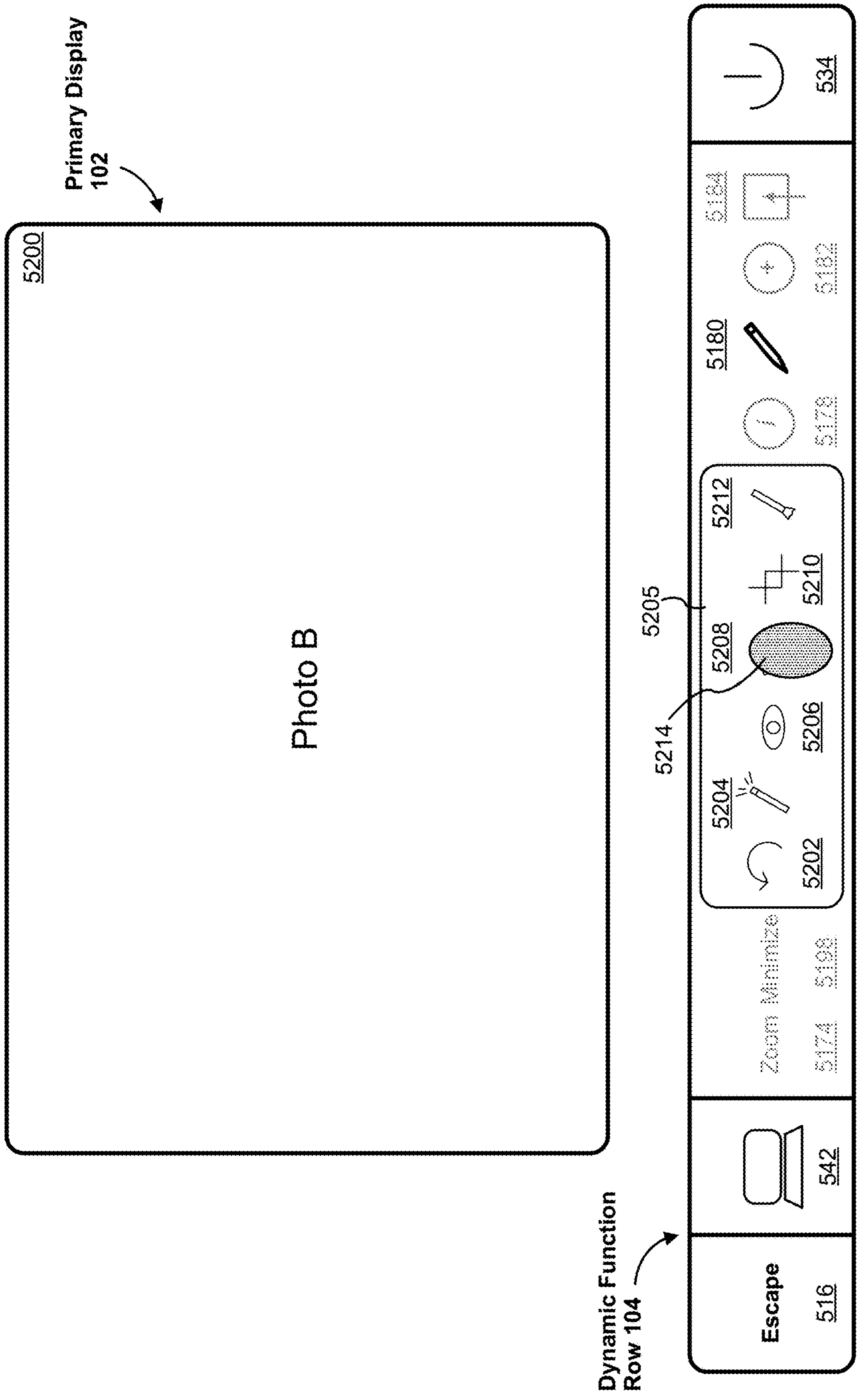

FIG. 10F illustrates dynamic function row 104 displaying a set of editing tools 5205 in response to detecting selection of editing affordance 5180 in FIG. 10E.

FIG. 10F also illustrates dynamic function row 104 displaying editing affordance 5180 with a thickened/bold outline and all other affordances displayed in FIG. 10E (e.g., zoom affordance 5174, minimize affordance 5198, information affordance 5178, photo adding affordance 5182, and sharing affordance 5184) with increased translucency in response to detecting selection of editing affordance 5180 in FIG. 10E.

In FIG. 10F, the set of editing tools 5205 includes: a rotate tool 5202, which, when activated (e.g., via a tap contact) causes dynamic function row 104 to display controls for rotating photo B clockwise or counter-clockwise within window 5200; an enhance tool 5204, which, when activated (e.g., via a tap contact) causes dynamic function row 104 to display controls for enhancing photo B such as applying filters to photo B, adjusting the brightness of photo B, adjusting the saturation of photo B, and/or the like; a red-eye reduction tool 5206, which, when activated (e.g., via a tap contact) causes dynamic function row 104 to display controls for reducing the red-eye of persons in photo B; a straighten tool 5208, which, when activated (e.g., via a tap contact) causes dynamic function row 104 to display controls for straightening the orientation of photo B within window 5200; a crop tool 5210, which, when activated (e.g., via a tap contact) causes dynamic function row 104 to display controls for cropping photo B within window 5200; and a retouching tool 5212, which, when activated (e.g., via a tap contact) causes dynamic function row 104 to display controls for re-touching photo B such as removal and airbrush effects. FIG. 10F further illustrates dynamic function row 104 receiving and detecting contact 5214 (e.g., a tap contact) at a location corresponding to straighten tool 5208.

Figure 10G:
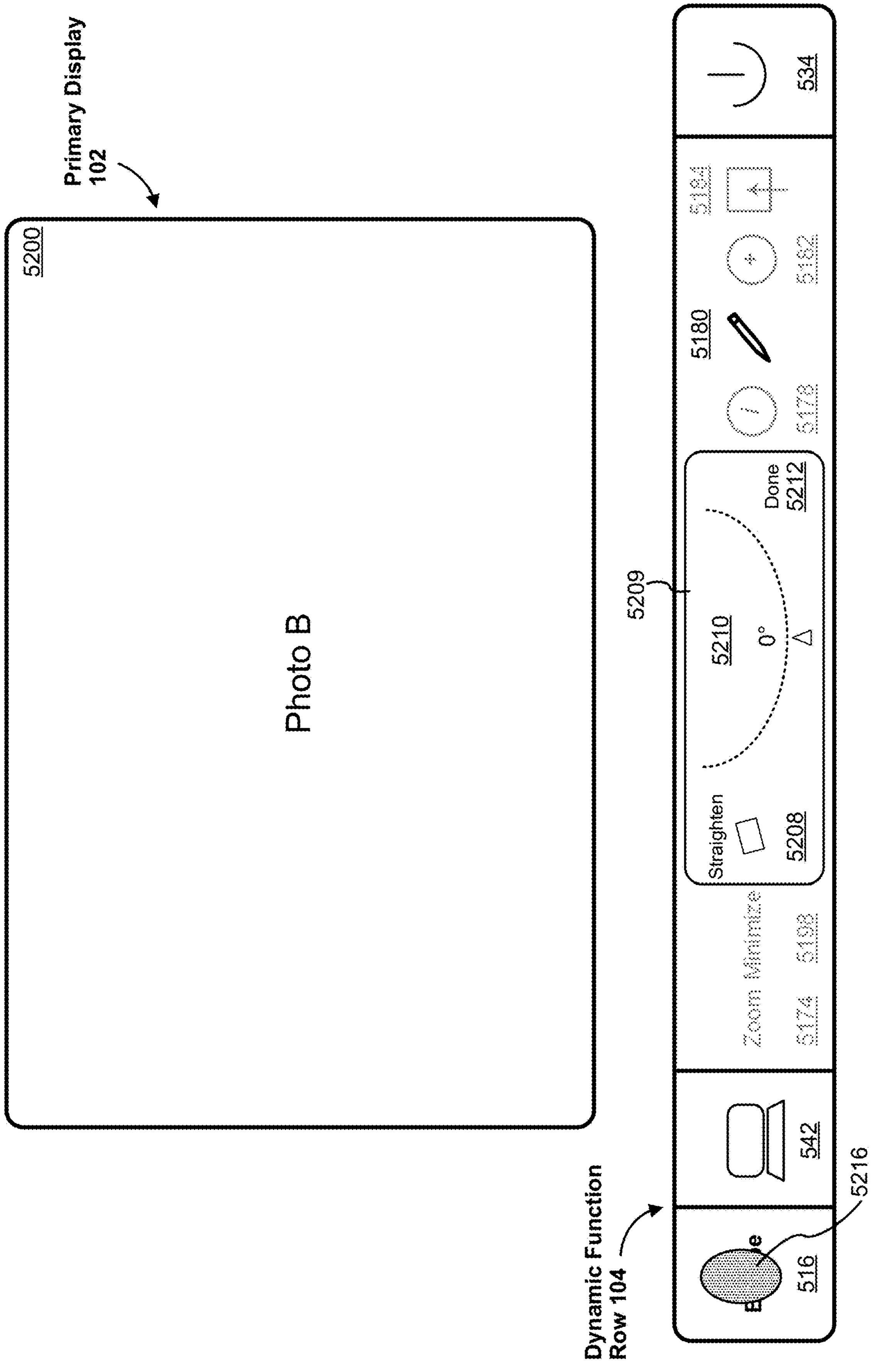

FIG. 10G illustrates dynamic function row 104 displaying a set of controls 5209 for straightening the orientation of photo B within window 5200 in response to detecting selection of straighten tool 5208 in FIG. 10F. In FIG. 10G, the set of controls 5209 corresponding to the straightening tool 2208 includes a slider 5210 for adjusting the orientation of photo B within window 5200 and done affordance 5212, which, when activated (e.g., via a tap contact), causes dynamic function row 104 to cease displaying the set of controls 5209 and to display the set of editing tools 5205 (as shown in FIG. 10F). FIG. 10G also illustrates dynamic function row 104 receiving and detecting contact 5216 (e.g., a tap contact) at a location corresponding to escape affordance 516.

For example, the user of portable computing system 100 or desktop computing system 200 is able to adjust the orientation of photo B within window 5200 by performing a left-to-right swipe/drag gesture or a right-to-left swipe/drag gesture at a location originating on slider 5210 or within the set of controls 5209. For example, in response to detecting an upward swipe gesture on dynamic function row 104, dynamic function row 104 displays a set of controls corresponding to crop tool 5210. In another example, in response to detecting a downward swipe gesture on dynamic function row 104, dynamic function row 104 displays a set of controls corresponding to red-eye reduction tool 5206.

Figure 10H:
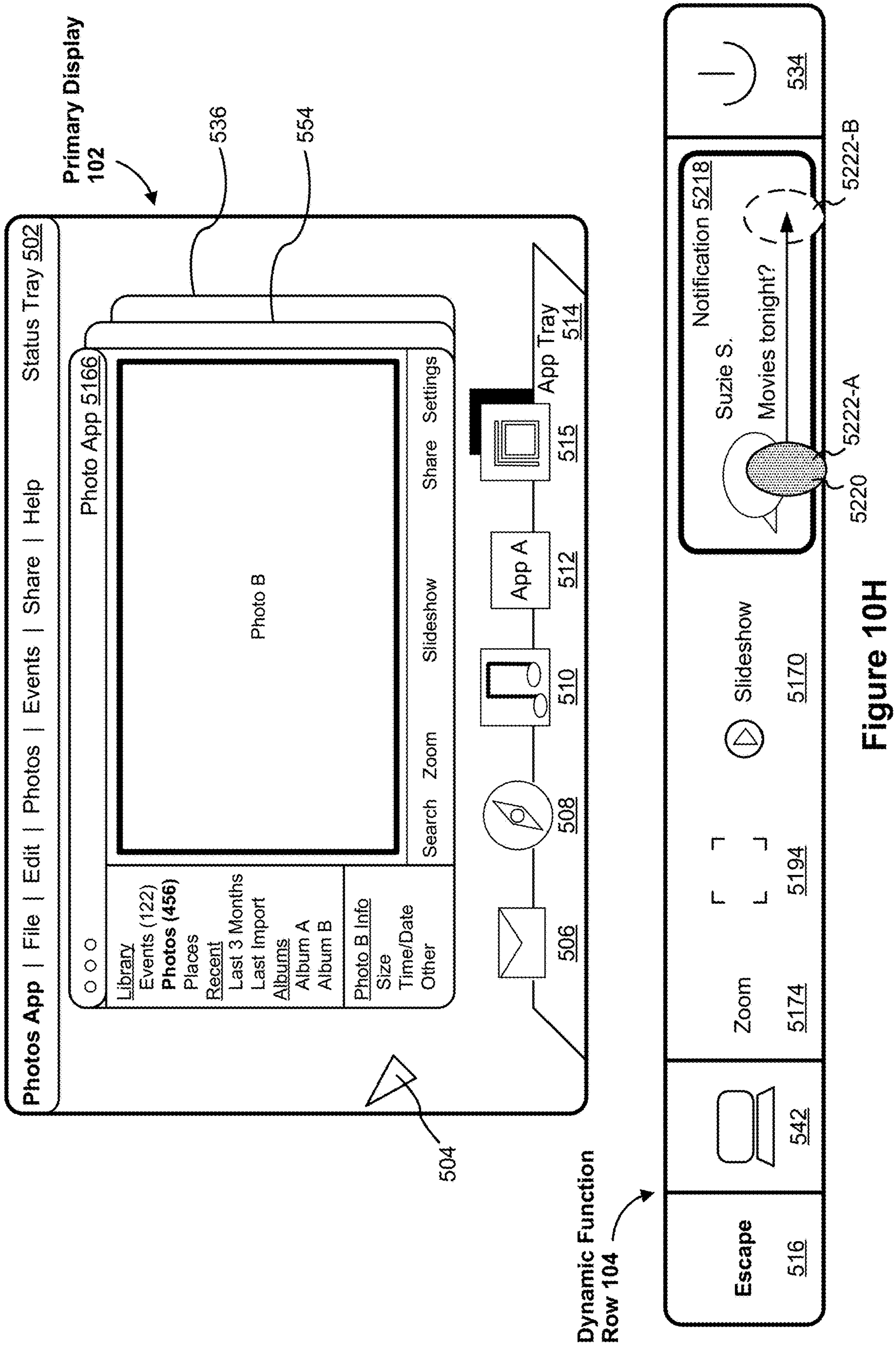

FIG. 10H illustrates primary display 102 displaying photo B in the expanded view within window 5166 in response to detecting selection of escape affordance 516 in FIG. 10G. FIG. 10H illustrates dynamic function row 104 displaying a set of affordances corresponding to photo B (as shown in FIG. 10D) in response to detecting selection of escape affordance 516 in FIG. 10G. In FIG. 10H, the set of affordance corresponding to photo B include: zoom affordance 5174, which, when activated (e.g., via a tap contact), causes dynamic function row 104 and/or primary display 102 to display zoom controls that enable the user of portable computing system 100 or desktop computing system 200 to zoom into or zoom out from photo B; full-screen affordance 5194, which, when activated (e.g., via a tap contact), causes primary display 102 to display photo B in full-screen mode; slideshow affordance 5170, which, when activated (e.g., via a tap contact), initiates a slideshow of the selected photos or all photos in the all photos sub-section of the user's photo library in a full-screen mode; information affordance 5178 for displaying information corresponding to selected photo B, such as size, location, time/date, and the like, on dynamic function row 104 and/or primary display 102; editing affordance 5180, which, when activated (e.g., via a tap contact), causes dynamic function row 104 to display tools for editing selected photo B and/or causes primary display 102 to display an editing interface for editing selected photo B; photo adding affordance 5182 for adding selected photo B to a photo album; and sharing affordance 5184 for sharing selected photo B via one or more communication modes (e.g., social media networks, SMS, email, and the like).

FIG. 10H also illustrates dynamic function row 104 displaying notification 5218 overlaid on affordances 5178, 5180, 5182, and 5184 in response to reception of notification 5218 by portable computing system 100 or desktop computing system 200. In FIG. 10H, notification 5218 corresponds to an SMS, instant message, or the like sent by Suzie S. to the user of portable computing system 100 or desktop computing system 200, where the notification's content inquiries "Movies tonight?" FIG. 10H further illustrates dynamic function row 104 detecting a left-to-right swipe gesture with contact 5220 from a first location 5222-A within notification 5128 to a second location 5222-B.

Figure 11A:
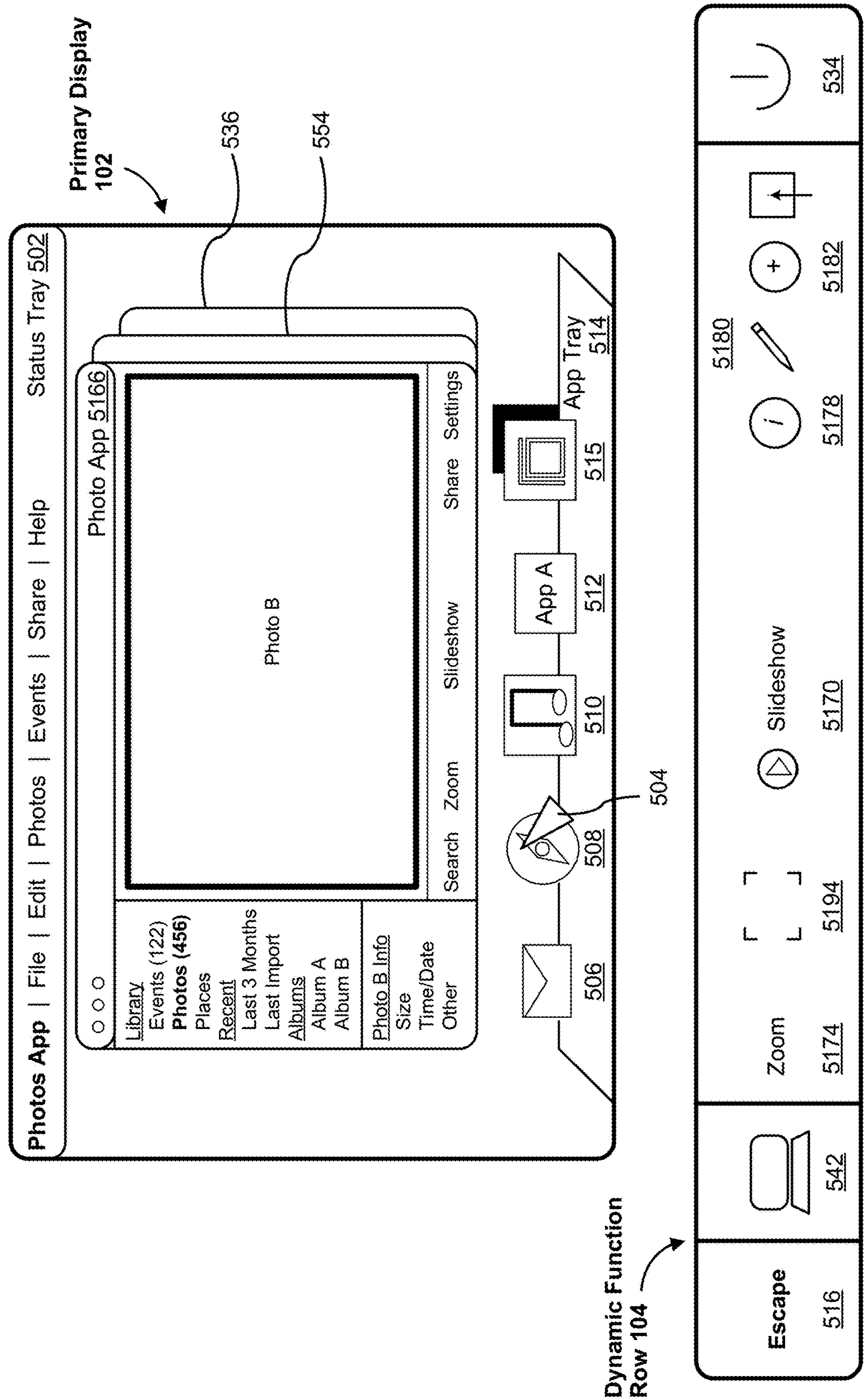

FIG. 11A illustrates dynamic function row 104 ceasing to display notification 5218 in response to detecting the left-to-right swipe gesture in FIG. 10H. FIG. 11A also illustrates primary display 102 displaying cursor 504 at a location corresponding to web browser application icon 508.

Figure 11B:
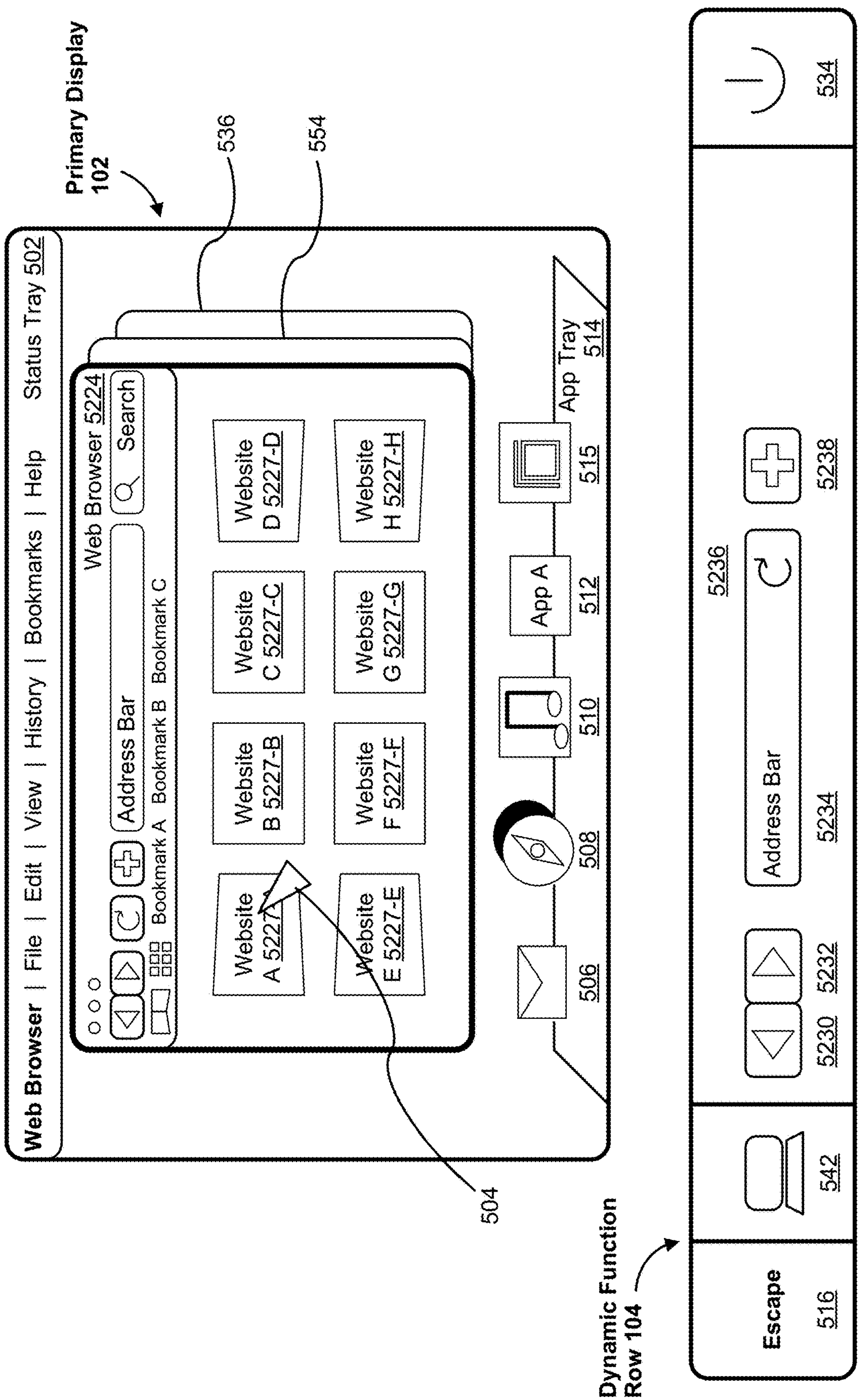

FIG. 11B illustrates primary display 102 displaying a window 5224 for the web browser application in response to detecting selection of web browser application icon 508 with cursor 504 in FIG. 11A. For example, window 5224 is overlaid on window 5166. In FIG. 11B, window 5224 includes controls for the web browser application including browsing controls (e.g., last web page, next web page, refresh, and add to favorites), an address bar, a search bar, a show-all bookmarks affordance (e.g., resembling an open book), a show-all open tabs affordance (e.g., a grid of six squares), and affordances for particular bookmarks A, B, and C. In FIG. 11B, window 5224 shows a home interface for the web browser application including a plurality of affordances 5227 linking to favorite websites or most frequently visited websites A-H. In FIG. 11B, window 5224 for application A is in focus on primary display 102. In FIG. 11B, status tray 502 indicates that the web browser application is running in the foreground, and app tray 514 also indicates that the web browser application is running in the foreground based on the shadow behind the web browser application icon 508.

Figure 11C:
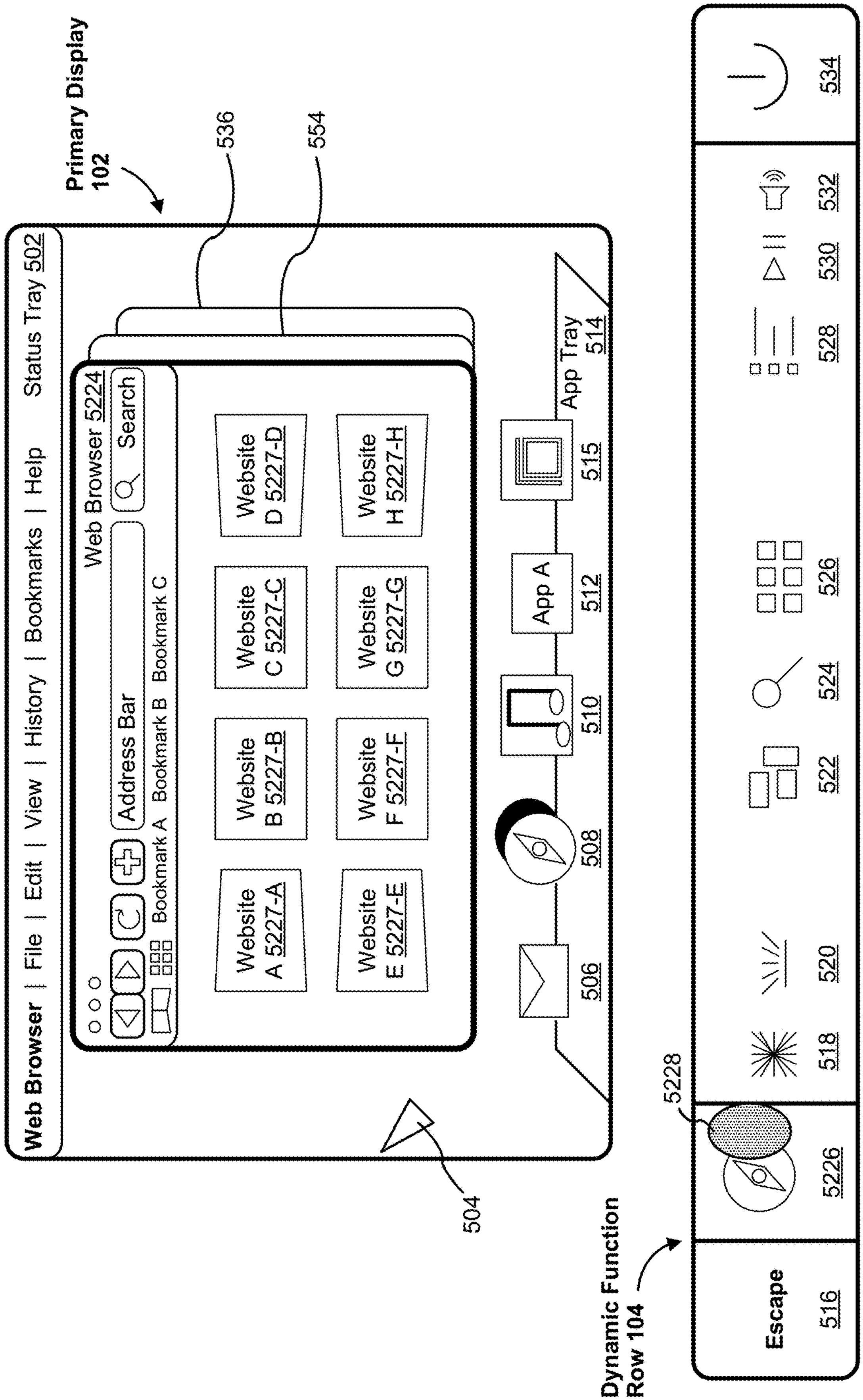

FIG. 11B also illustrates dynamic function row 104 displaying affordance 5226 in addition to the persistent controls (i.e., affordances 516 and 534) and the plurality of system-level affordances (i.e., affordances 518, 520, 522, 524, 526, 528, 530, and 532) in response to detecting selection of web browser application icon 508 with cursor 504 in FIG. 11A. When activated (e.g., via a tap contact), affordance 5226 causes dynamic function row 104 to display a set of controls for the web browser application (e.g., affordances 5230, 5232, and 5238, and address bar 5234 as shown in FIG. 11C). FIG. 11B further illustrates dynamic function row 104 receiving and detecting contact 5228 (e.g., a tap contact) at a location corresponding to affordance 5226.

FIG. 11C illustrates dynamic function row 104 displaying a set of controls for the web browser application in response to detecting selection of affordance 5226 in FIG. 11B. In FIG. 11C, the set of controls for the web browser application includes: affordance 5230 for displaying a web page visited before the one currently displayed by the web browser application within window 5224; affordance 5232 for displaying a web page visited after the one currently displayed by the web browser application within window 5224; affordance 5238 for adding the web page currently displayed by the web browser application to a favorites list or a bookmarks folder; and address bar 5234 for displaying the URL of the web page currently displayed by the web browser application. In FIG. 11C, address bar 5234 also includes a refresh affordance 5236 for refreshing the web page currently displayed by the web browser application. FIG. 11C also illustrates primary display 102 displaying cursor 504 at a location corresponding to affordance 5227-A, which links to website A.

Figure 11D:
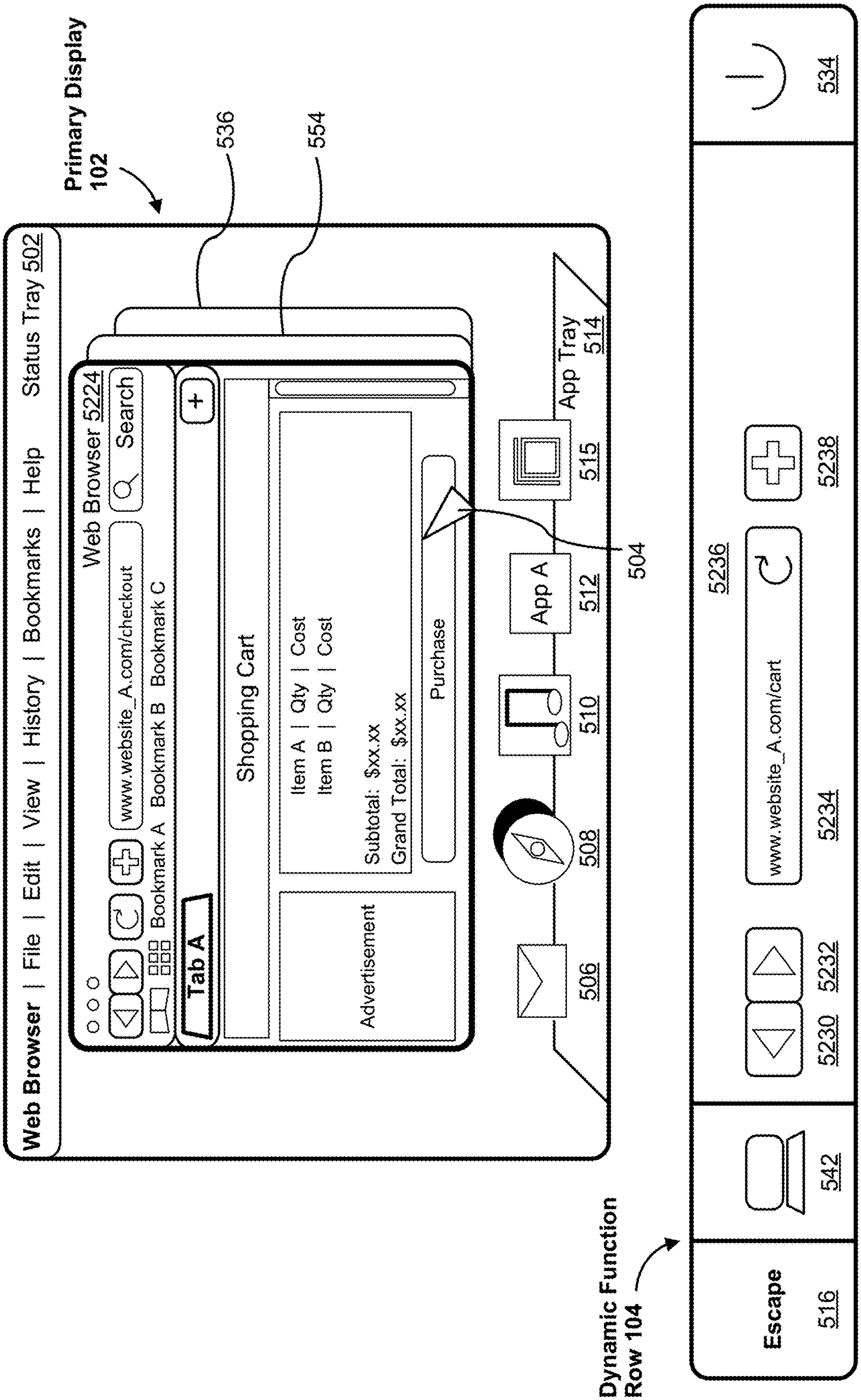

FIG. 11D illustrates primary display 102 displaying an interface for tab A within window 5224 after detecting selection of affordance 5227-A corresponding to website A with cursor 504 in FIG. 11C. In FIG. 11D, the interface for tab A is in focus on primary display 102 as indicated by the thick lines surrounding tab A and the bold text for tab A. In FIG. 11D, the interface for tab A shows a checkout web page of website A (e.g., associated with the URL: www.website_A.com/checkout). The checkout web page corresponds to the user's virtual shopping cart, which includes Items A and B for purchase. FIG. 11D also illustrates primary display 102 displaying cursor 504 at a location corresponding to a purchase affordance within window 5224. FIG. 11C further illustrates dynamic function row 104 displaying the URL (e.g., www.website_A.com/checkout) for the checkout web page of website A in address bar 5234.

Figure 11E:
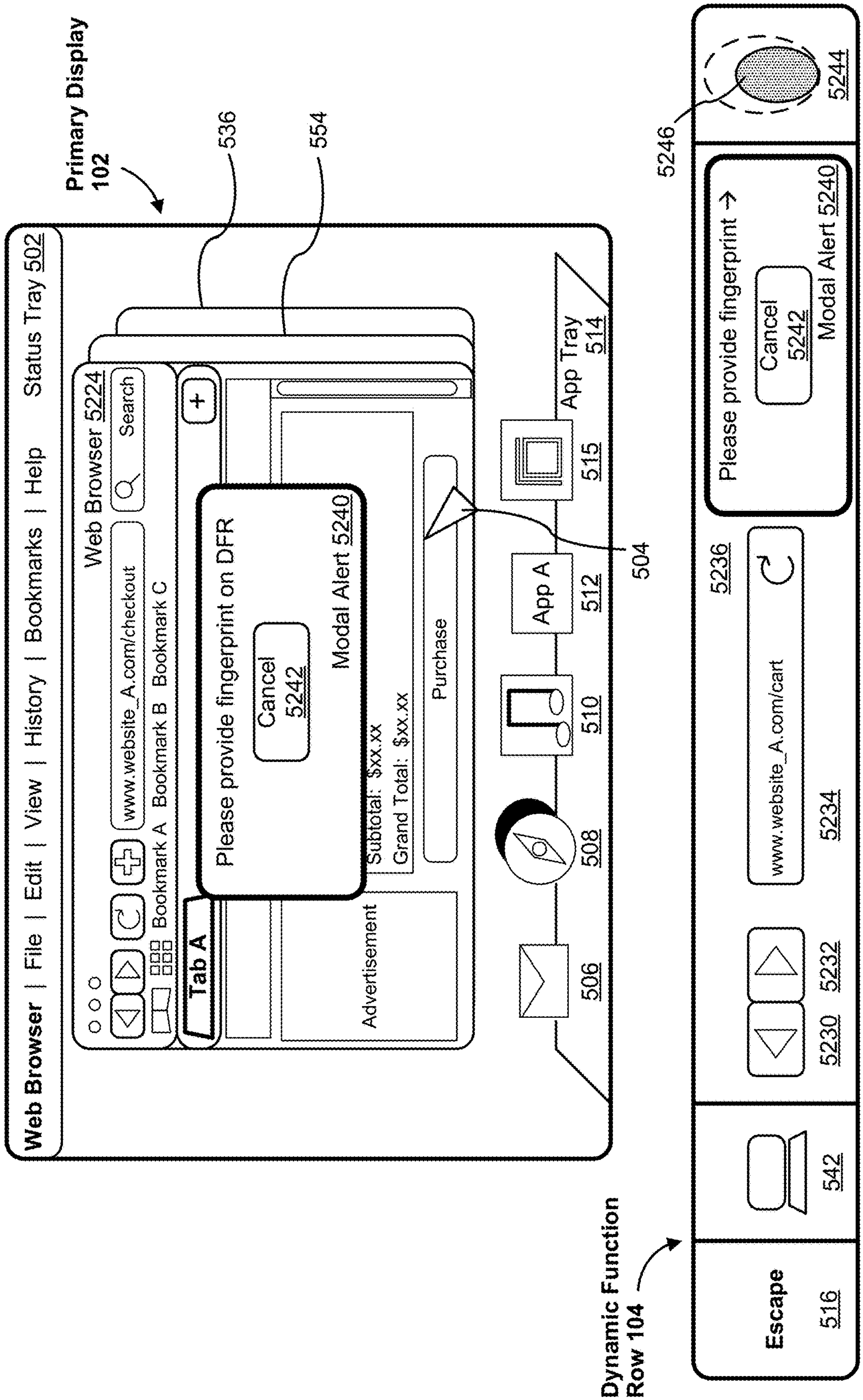

FIG. 11E illustrates primary display 102 displaying modal alert 5240 overlaid on window 5224 in response to detecting selection of the purchase affordance with cursor 504 in FIG. 11D. In FIG. 11E, modal alert 5240 displayed on primary display 102 prompts the user of portable computing system 100 or desktop computing system 200 to provide their fingerprint on dynamic function row 104 and also includes cancel affordance 5242, which, when activated (e.g., via selection by cursor 504) causes cancelation of the purchase. For example, modal alert 5240 is displayed in accordance with security settings (e.g., default or user-specified) that requires a fingerprint to validate purchases initiated by portable computing system 100 or desktop computing system 200. For example, in some embodiments, primary display 102 and/or dynamic function row 104 displays the modal alert prompting the user of portable computing system 100 or desktop computing system 200 to provide their fingerprint on dynamic function row 104 upon logging into portable computing system 100 or desktop computing system 200, when entering a password to access an application or website, when entering a password to decrypt the data stored by portable computing system 100 or desktop computing system 200, when deleting folders and/or data from portable computing system 100 or desktop computing system 200, when taking other destructive actions, and/or the like.

FIG. 11E also illustrates dynamic function row 104 displaying modal alert 5240 in response to detecting selection of the purchase affordance with cursor 504 in FIG. 11D. In FIG. 11E, modal alert 5240 displayed on dynamic function row 104 prompts the user of portable computing system 100 or desktop computing system 200 to provide their fingerprint in fingerprint region 5244 of dynamic function row 104 and also includes cancel affordance 5242, which, when activated (e.g., via a tap contact) causes cancelation of the purchase. In some embodiments, dynamic function row 104 is configured to detect a fingerprint within fingerprint region 5244 of dynamic function row 104, which also corresponds to power control 534 in FIGS. 5A-11D. In some embodiments, dynamic function row 104 is configured to detect a fingerprint at any location within its touch-sensitive area. FIG. 11E further illustrates dynamic function row 104 receiving and detecting contact 5246 (e.g., a press and hold gesture) within fingerprint region 5244.

Figure 11F:
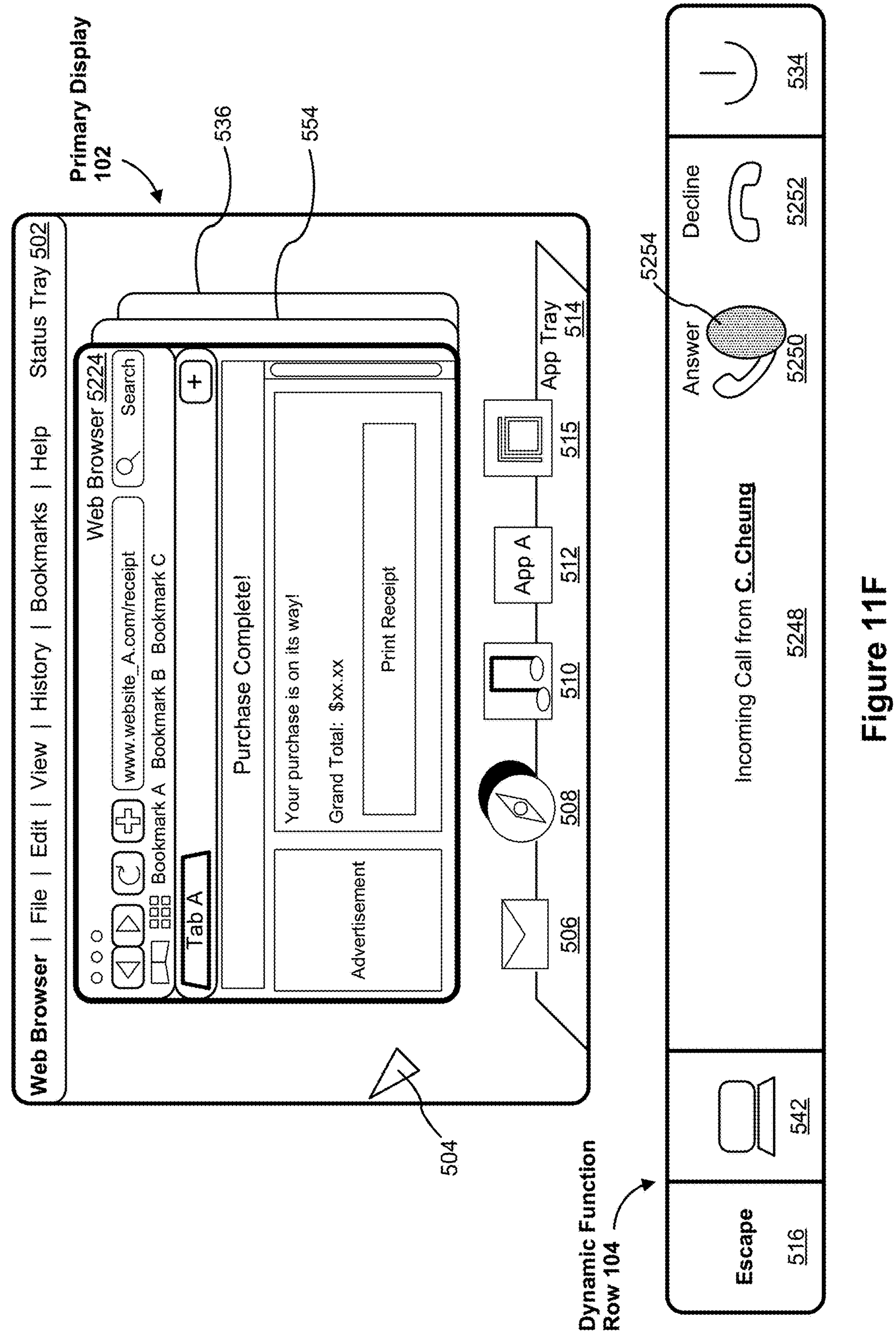

FIG. 11F illustrates primary display 102 displaying an interface for tab A within window 5224 after detecting contact 5246 within fingerprint region 5244 in FIG. 11E. In FIG. 11F, the interface for tab A shows a receipt web page of web site A (e.g., associated with the URL: www.website_A.com/reciept) indicating that the purchase was completed after validation of the fingerprint provided by the user of portable computing system 100 or desktop computing system 200 in FIG. 11E.

FIG. 11F also illustrates dynamic function row 104 displaying an interface 5248 associated with an incoming voice call from C. Cheung along with the at least one system-level affordance (e.g., affordance 542) in response to reception of the incoming voice call by portable computing system 100 or desktop computing system 200. In FIG. 11F, interface 5248 includes a first affordance 5250 for answering the incoming call and a second affordance 5252 for declining the incoming call. FIG. 11F further illustrates dynamic function row 104 receiving and detecting contact 5254 (e.g., a tap contact) at a location corresponding to first affordance 5250. For example, after detecting selection of first affordance 5250, a communication connection (e.g., VoIP) between C. Cheung and the user of portable computing system 100 or desktop computing system 200 is established for the voice call.

Figure 11G:
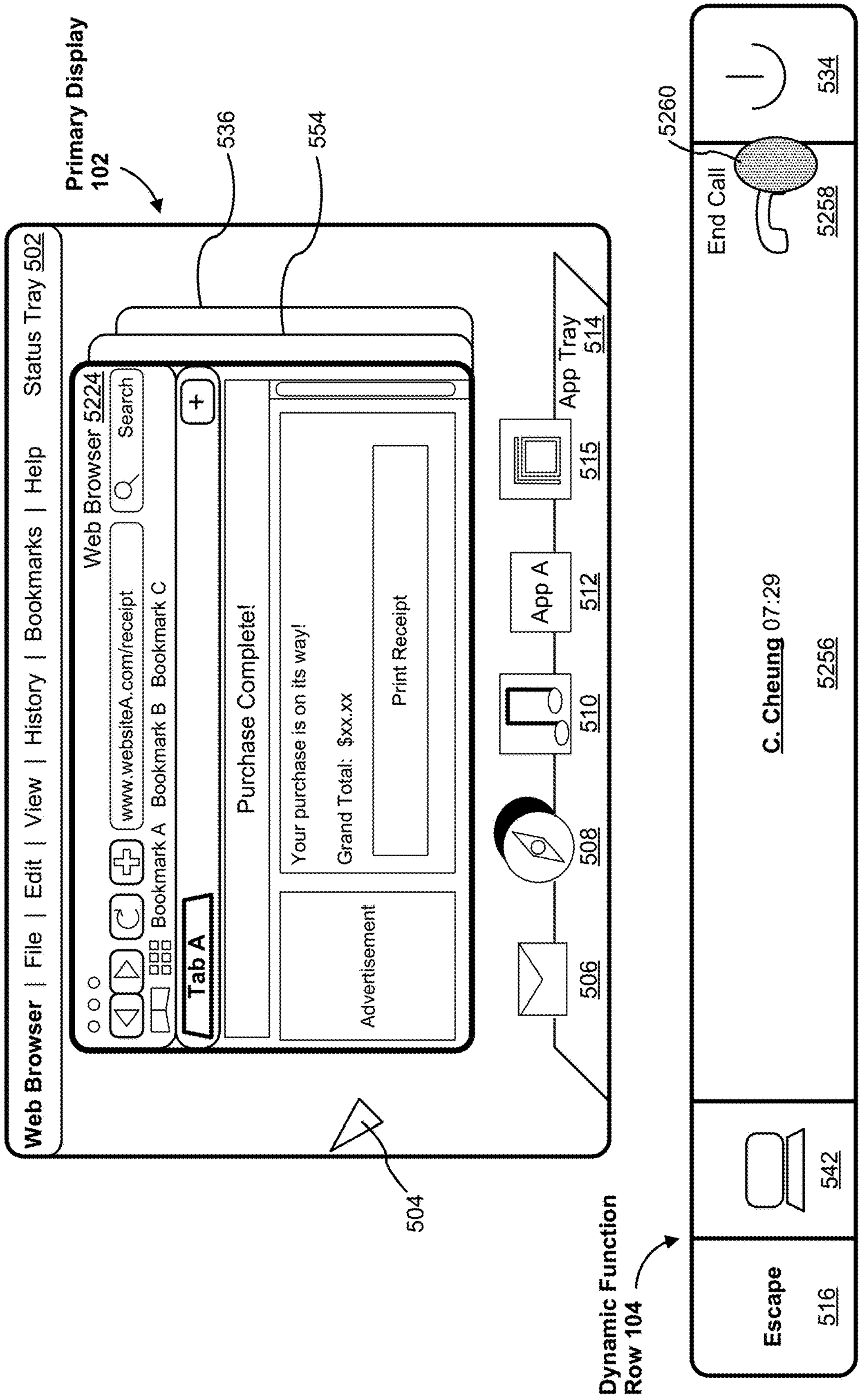

FIG. 11G illustrates dynamic function row 104 displaying an interface 5256 associated with an ongoing voice call between C. Cheung and the user of portable computing system 100 or desktop computing system 200 along with the at least one system-level affordance (e.g., affordance 542) after detecting selection of first affordance 5250 in FIG. 11F. In FIG. 11G, interface 5256 includes affordance 5258 for ending the voice call and an indicator of the total voice call time (e.g., 7 minutes and 29 seconds). In some embodiments, during the ongoing voice call, affordances associated with the focus of primary display 102 are not displayed on dynamic function row 104. In some embodiments, after the voice call has lasted a predefined amount of time, interface 5256 is displayed in a compact mode and affordances associated with the focus of primary display 102 may be displayed on dynamic function row 104. FIG. 11G also illustrates dynamic function row 104 receiving and detecting contact 5260 at a location corresponding to affordance 5258.

Figure 11H:
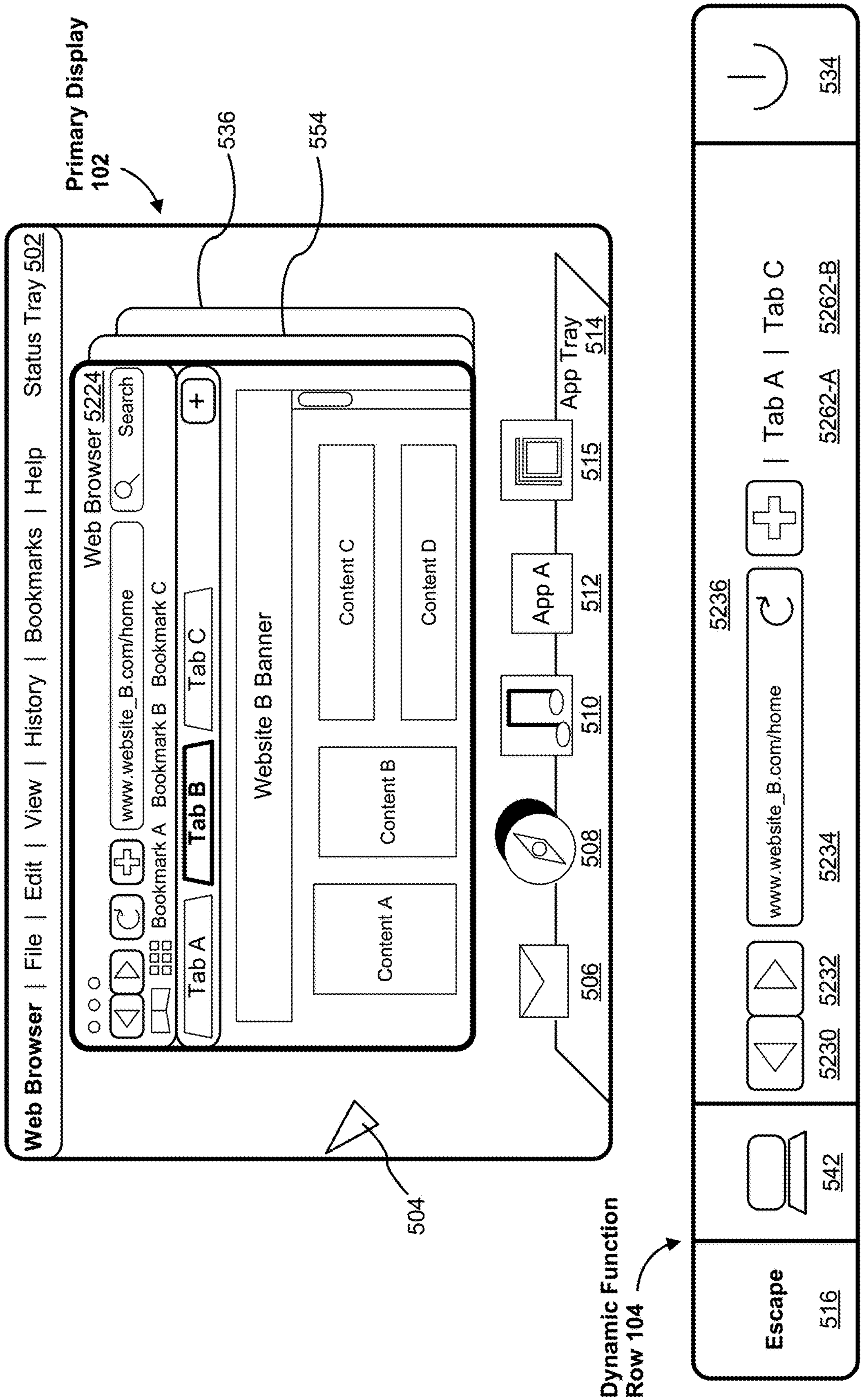

FIG. 11H illustrates primary display 102 displaying an interface for tab B within window 5224, where tabs A, B, and C are open within the web browser application. In FIG. 11H, the interface for tab B shows the home web page of website B (e.g., associated with the URL: www.website_B.com/home). In FIG. 11H, the interface for tab B is in focus on primary display 102 as indicated by the thick lines surrounding tab B and the bold text for tab B.

FIG. 11H also illustrates dynamic function row 104 ceasing to display interface 5256 after detecting selection of affordance 5258 in FIG. 11G. In FIG. 11H, dynamic function row 104 includes the URL for the home web page of website B in address bar 5234 (e.g., www.website_B.com/home). In FIG. 11H, dynamic function row 104 also includes: affordance 5262-A, which, when activated (e.g., by a tap contact), causes primary display 102 to display an interface for tab A and also causes dynamic function row 104 to show the URL corresponding to tab B in address bar 5234; and affordance 5262-B, which, activated (e.g., by a tap contact), causes primary display 102 to display an interface for tab C and also causes dynamic function row 104 to show the URL corresponding to tab C in address bar 5234.

Figure 12A:
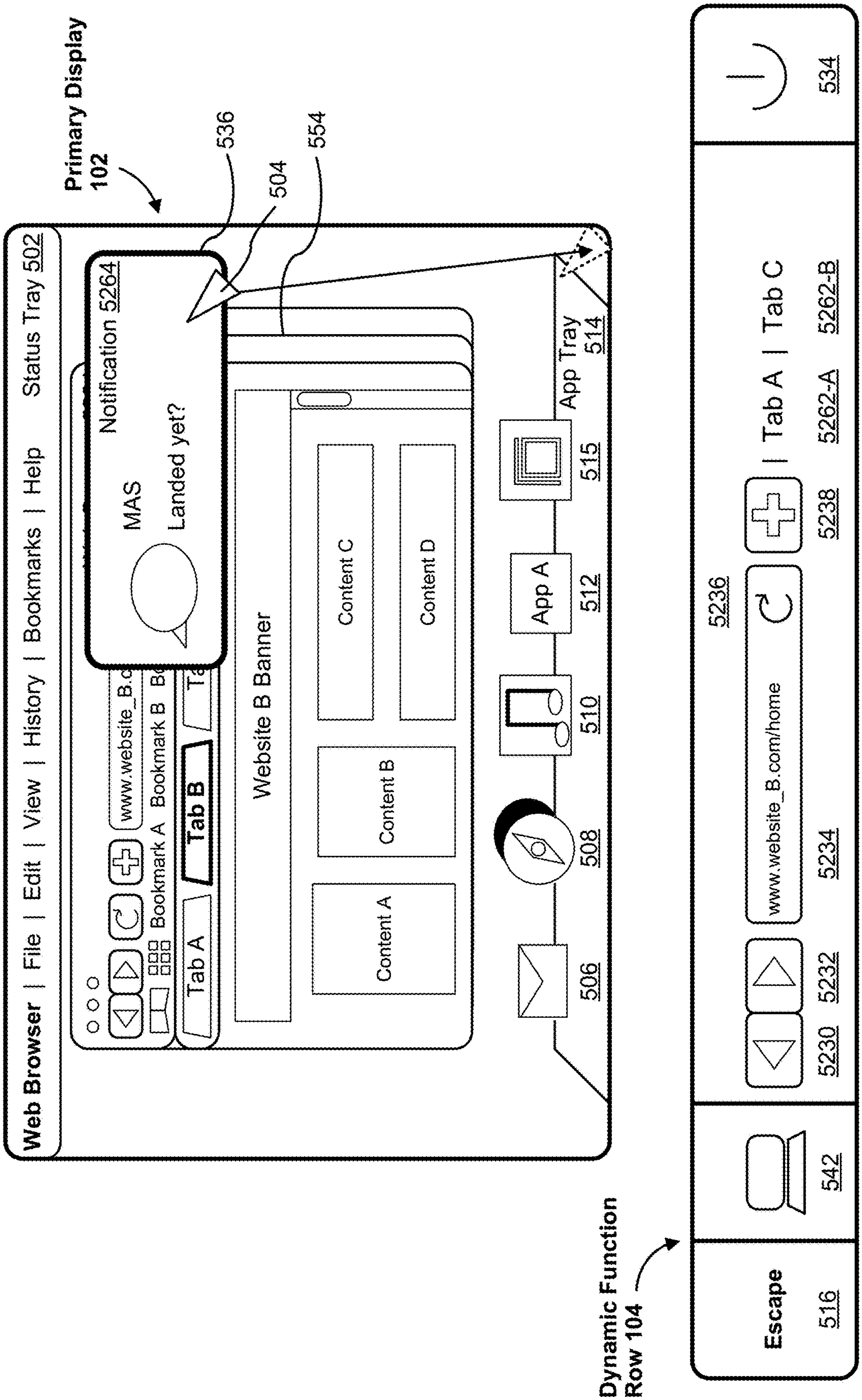

FIG. 12A illustrates primary display 102 displaying notification 5264 overlaid on window 5264 in response to reception of notification 5264 by portable computing system 100 or desktop computing system 200. In FIG. 12A, notification 5264 corresponds to an SMS, instant message, or the like sent by MAS to the user of portable computing system 100 or desktop computing system 200, where the notification's content inquiries "Landed yet?" FIG. 12A illustrates primary display 102 displaying the user of portable computing system 100 or desktop computing system 200 dragging notification 5264 with cursor 504 to a predefined location in the bottom right-hand corner of primary display 102. For example, the user portable computing system 100 or desktop computing system 200 is able to cause display of a respective menu, notification, modal alert, or the like on dynamic function row 104 in response to dragging the respective menu, notification, modal alert, or the like from its origin location on primary display 102 to a predefined location (e.g., the bottom right-hand corner or another similar location). In some embodiments, the predefined location is one of a plurality of predefined locations that operate in a similar manner, where the plurality of predefined locations are default or user-specific locations.

Figure 12B:
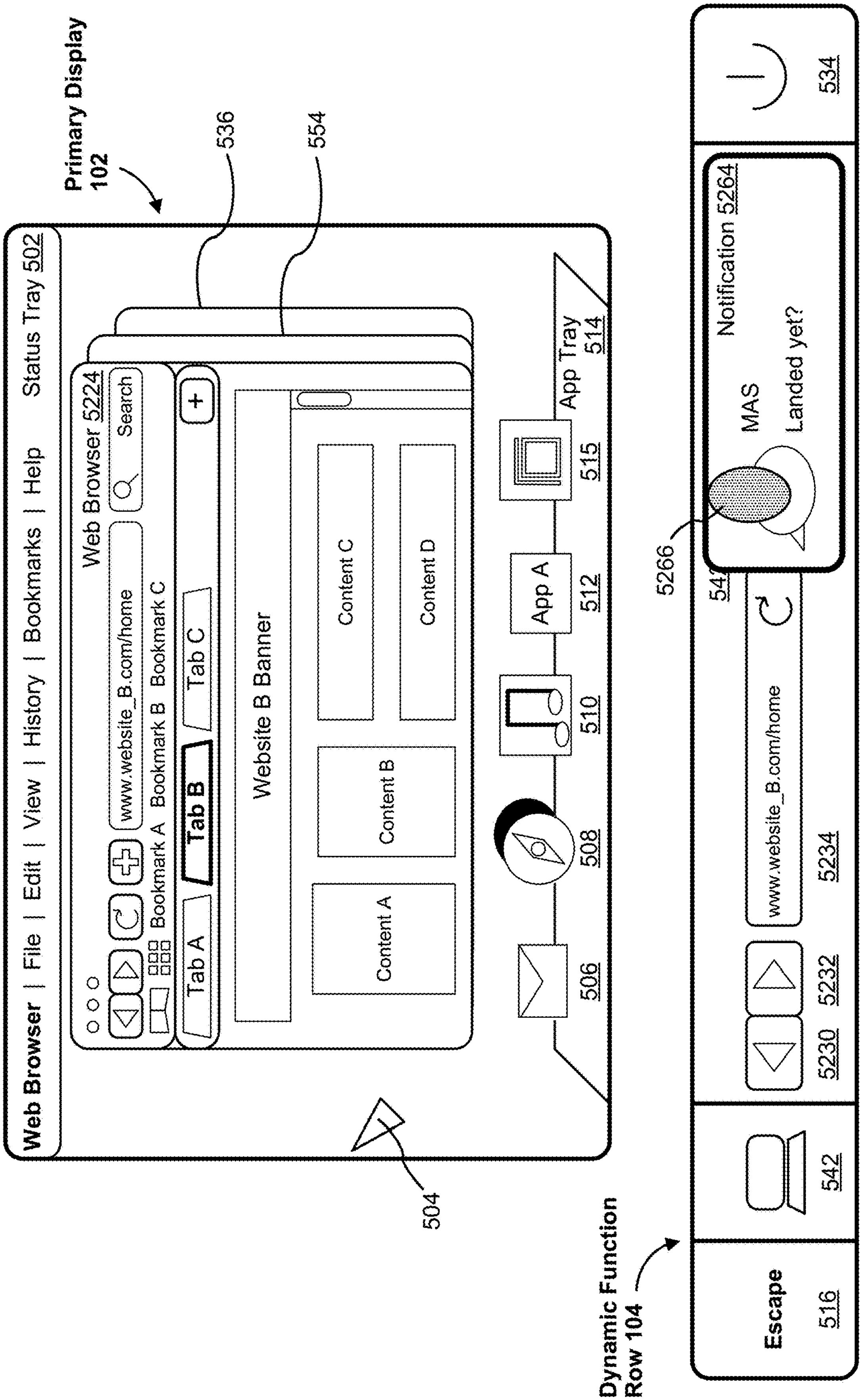

FIG. 12B illustrates primary display 102 ceasing to display notification 5264 overlaid on window 5264 in response to the user of portable computing system 100 or desktop computing system 200 dragging notification 5264 with cursor 504 to the predefined location in the bottom right-hand corner of primary display 102 in FIG. 12A. FIG. 12B also illustrates dynamic function row 104 displaying notification 5264 overlaid on affordances 5262-A and 5262-B in response to the user of portable computing system 100 or desktop computing system 200 dragging notification 5264 with cursor 504 to the predefined location in the bottom right-hand corner of primary display 102 in FIG. 12A. FIG. 12B further illustrates dynamic function row 104 receiving and detecting contact 5266 (e.g., a tap contact) at a location within notification 5264.

Figure 12C:
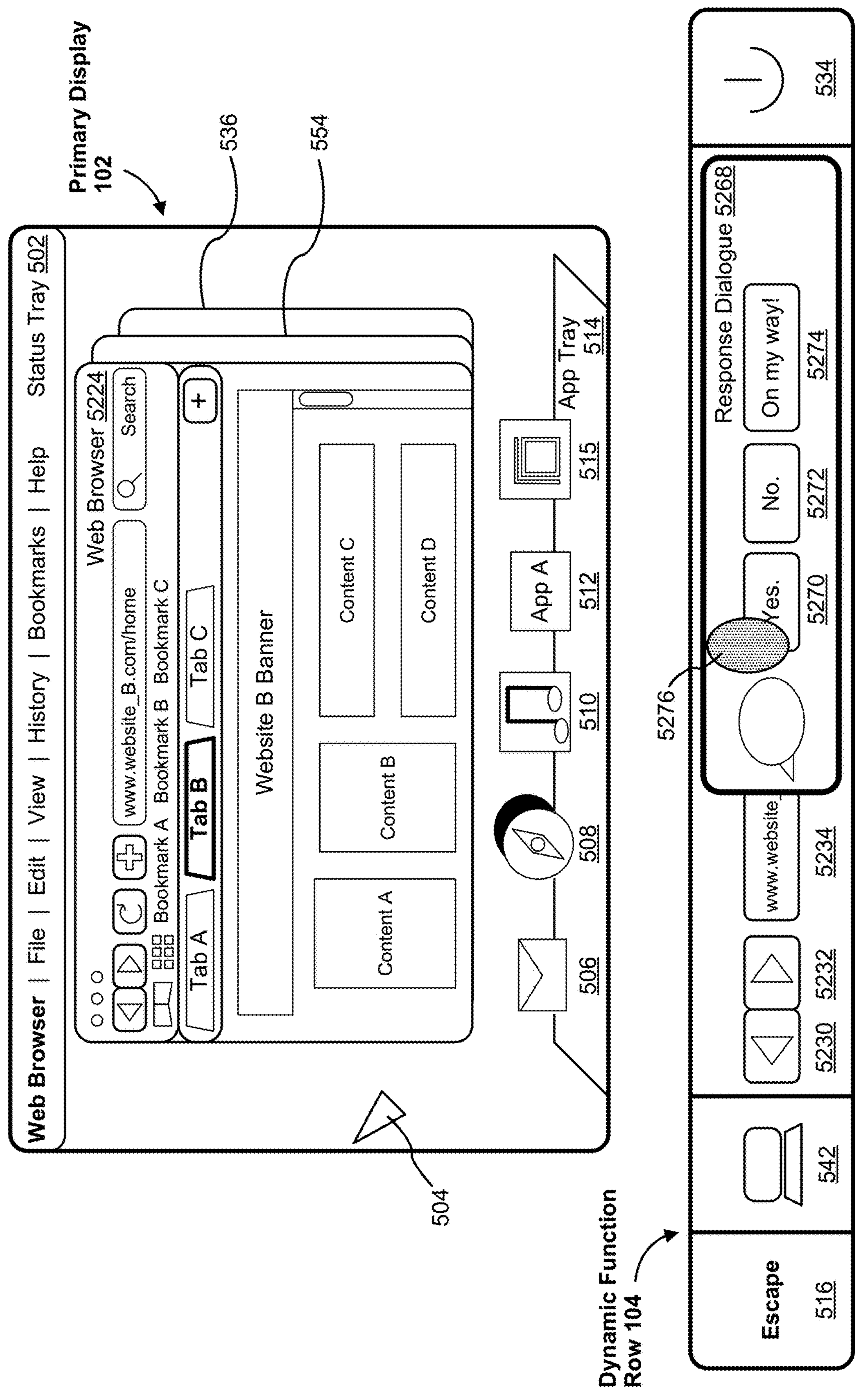

FIG. 12C illustrates dynamic function row 104 displaying response dialogue box 5268 in response to detecting contact 5266 at the location within notification 5264 in FIG. 12B. Alternatively, in some embodiments, an application corresponding to notification 5264 is opened in response to detecting contact 5266 at the location within notification 5264 in FIG. 12B. In FIG. 12C, response dialogue box 5268 includes a plurality of predictive responses to the content of notification 5264 shown in FIGS. 12A-12B. In FIG. 12C, response dialogue box 5268 includes a first predictive response 5270 ("Yes."), a second predictive response 5272 ("No."), and a third predictive response 5274 ("On my way!"). FIG. 12C also illustrates dynamic function row 104 receiving and detecting contact 5276 (e.g., a tap contact) at a location corresponding to the first predictive response 5270. For example, in response to selection of the first predictive response 5270, portable computing system 100 or desktop computing system 200 causes the first predictive response 5270 ("Yes.") to be sent to MAS via a default communication mode (e.g., SMS, instant message, or the like) or a same communication mode as the one by which notification 5264 was sent to the user of portable computing system 100 or desktop computing system 200.

Figure 12D:
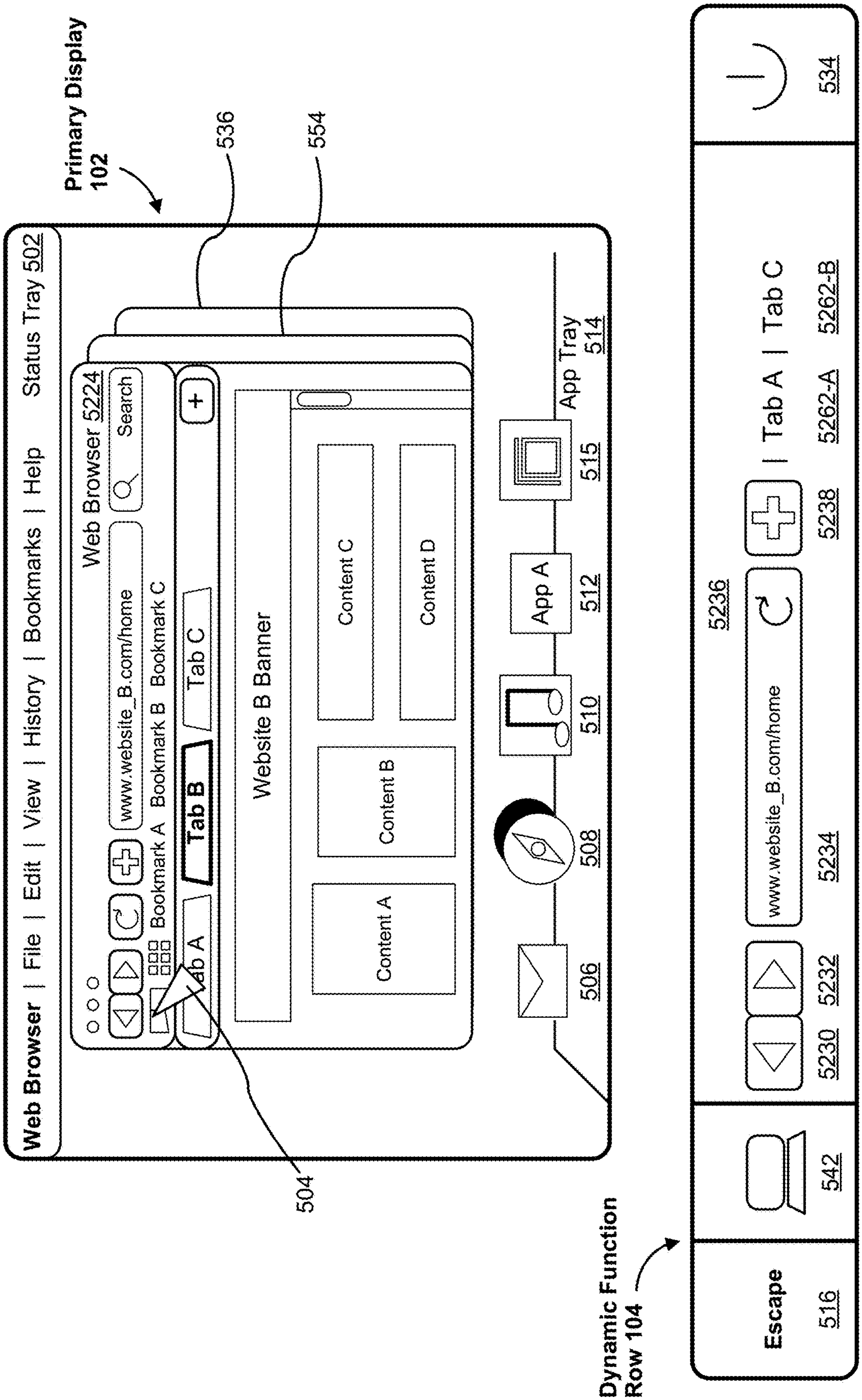
Figure 12E:
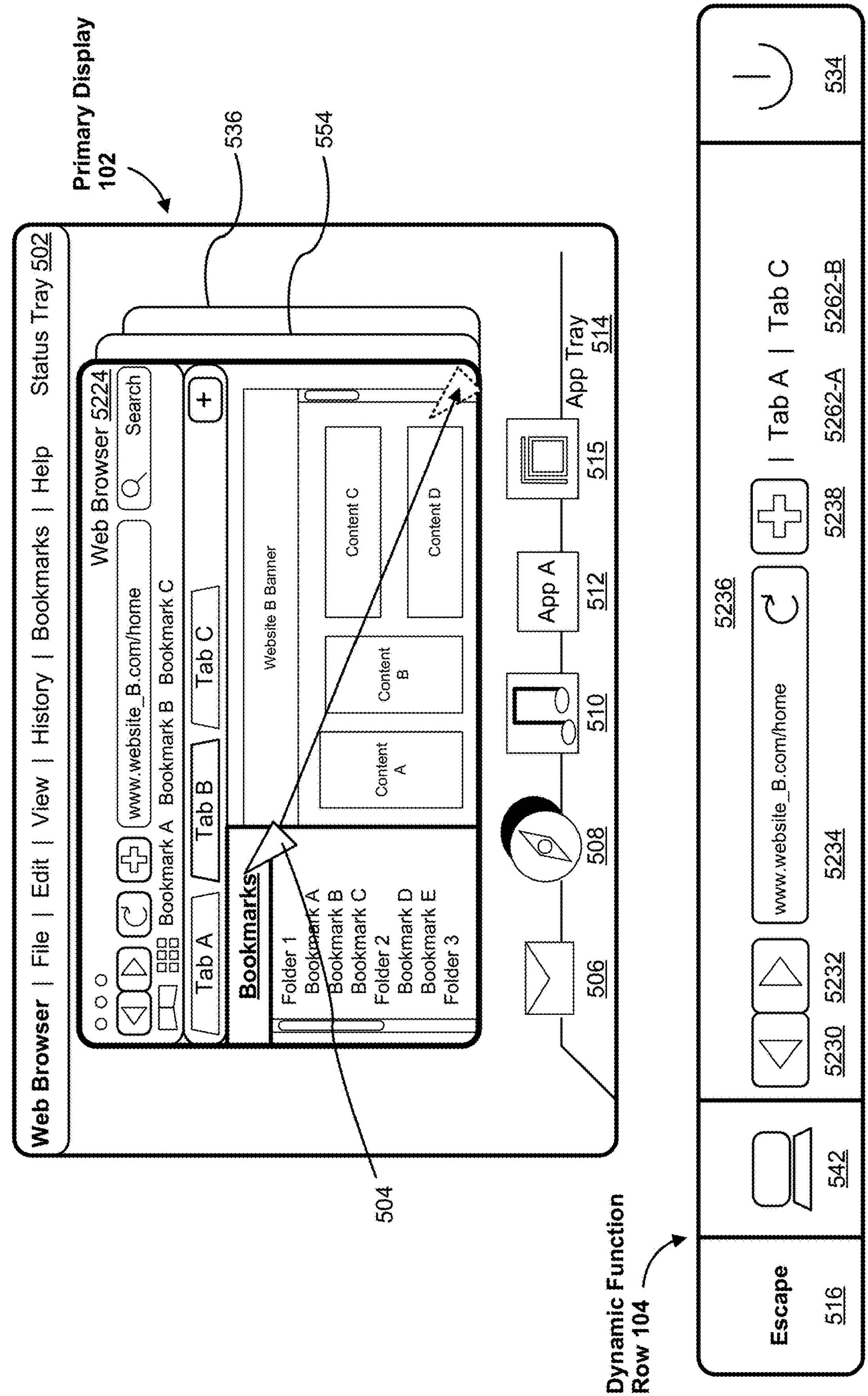

FIG. 12D illustrates primary display 102 displaying cursor 504 at a location corresponding to the show-all bookmarks affordance (e.g., resembling an open book) within window 5224. FIG. 12E illustrates primary display 102 displaying a bookmarks sidebar within window 5224 in response to detecting selection of the show-all bookmarks affordance with cursor 504 in FIG. 12D. In FIG. 12E, the bookmarks sidebar is in focus on primary display 102 as indicated by the thick lines surrounding the bookmarks sidebar. FIG. 12E also illustrates the user of portable computing system 100 or desktop computing system 200 dragging the bookmarks sidebar with cursor 504 to the predefined location in the bottom right-hand corner of primary display 102.

Figure 12F:
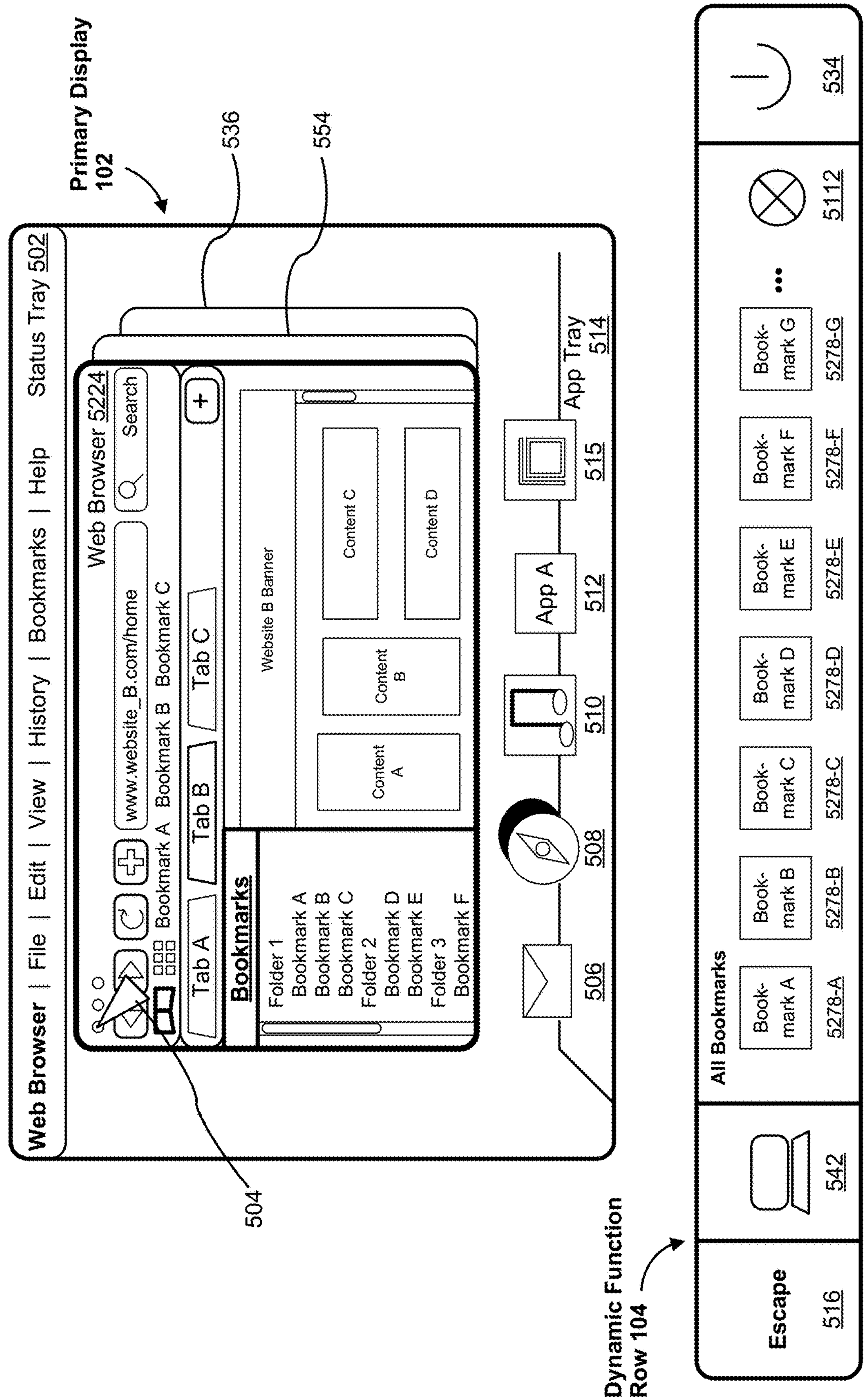

FIG. 12F illustrates dynamic function row 104 displaying a set of bookmark affordances 5278 (e.g., bookmark affordances 5278-A to 5278-G) corresponding to all pre-existing bookmarks in response to the user of portable computing system 100 or desktop computing system 200 dragging the bookmarks sidebar with cursor 504 to the predefined location in the bottom right-hand corner of primary display 102 in FIG. 12E. For example, when a respective one of the set of bookmark affordances 5278 is activated (e.g., via a tap contact), primary display 102 displays a website corresponding to the respective one of the set of bookmark affordances 5278 in a new tab within window 5224. Continuing with this example, when the respective one of the set of bookmark affordances 5278 is activated (e.g., via a tap contact), dynamic function row 104 ceases to display the set of bookmark affordances 5278 and displays the set of controls for the web browser application and the URL for the website corresponding to the respective one of the set of bookmark affordances 5278 in address bar 5234 (e.g., as shown in FIG. 12E). In FIG. 12F, dynamic function row 104 also displays exit affordance 5112, which, when activated (e.g., via a tap contact), causes dynamic function row 104 to cease displaying the set of bookmark affordances 5278 and display the set of controls for the web browser application as shown in FIG. 12E. FIG. 12F also illustrates primary display 102 displaying cursor 504 at a location corresponding to an exit affordance for closing window 5224.

Figure 12G:
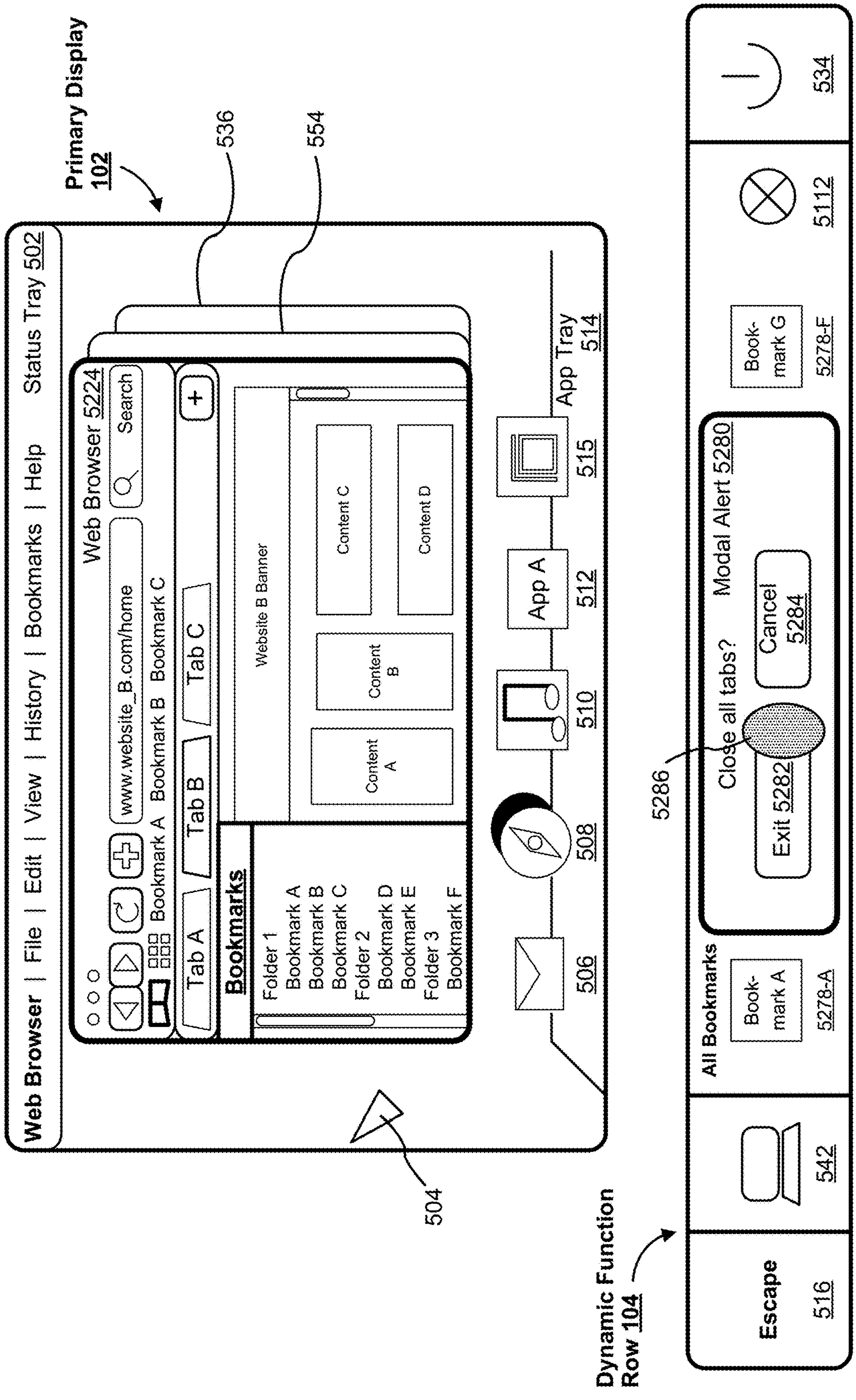

FIG. 12G illustrates dynamic function row 104 displaying modal alert 5280 overlaid on the set of bookmark affordances 5278 in response to detecting selection of the exit affordance with cursor 504 in FIG. 12F. In FIG. 12G, modal alert 5280 prompts the user of portable computing system 100 or desktop computing system 200 to confirm that they intend to close all open tabs within the web browser application. In FIG. 12G, modal alert 5280 includes: exit affordance 5282, which, when activated (e.g., via a tap contact), causes primary display 102 to cease display of window 5224; and cancel affordance 5284, which, when activated (e.g., via a tap contact), dismisses modal alert 5280 and causes primary display 102 to maintain display of window 5224. FIG. 12G also illustrates dynamic function row 104 receiving and detecting contact 5286 (e.g., a tap contact) at a location corresponding to exit affordance 5282.

Figure 12H:
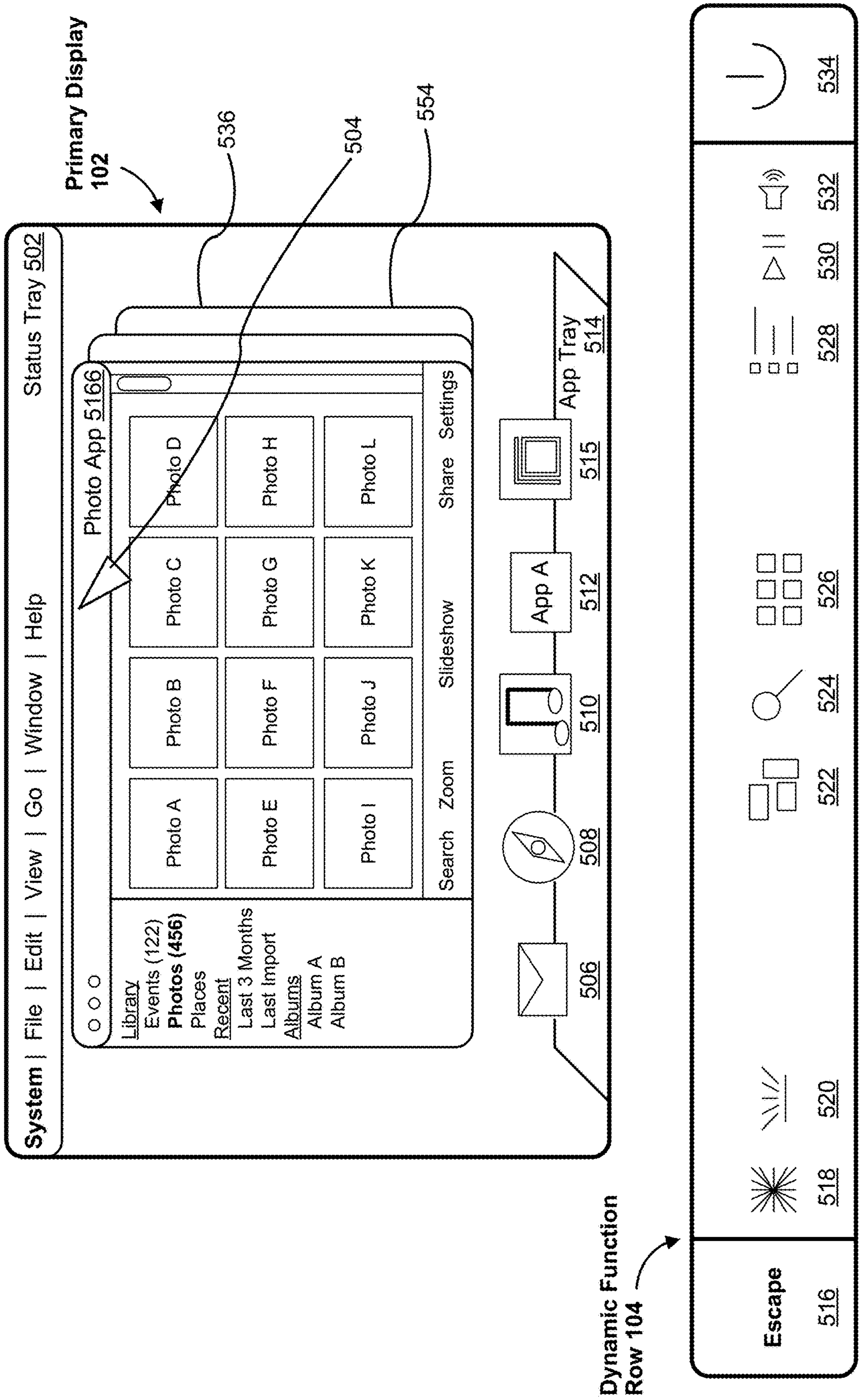

FIG. 12H illustrates primary display 102 ceasing to display window 5224 and displaying window 5166 for the photo application in response to detecting selection of exit affordance 5282 in FIG. 12G. In FIG. 12H, status tray 502 indicates that the system/operating system is currently in focus on primary display 102. FIG. 12H also illustrates primary display 102 displaying cursor 504 at a location corresponding to window 5166. FIG. 12H further illustrates dynamic function row 104 displaying the persistent controls (i.e., affordances 516 and 534) and the plurality of system-level affordances (i.e., affordances 518, 520, 522, 524, 526, 528, 530, and 532) in response to detecting selection of exit affordance 5282 in FIG. 12G and based on the current focus (e.g., the system/operating system) of primary display 102.

Figure 13A:
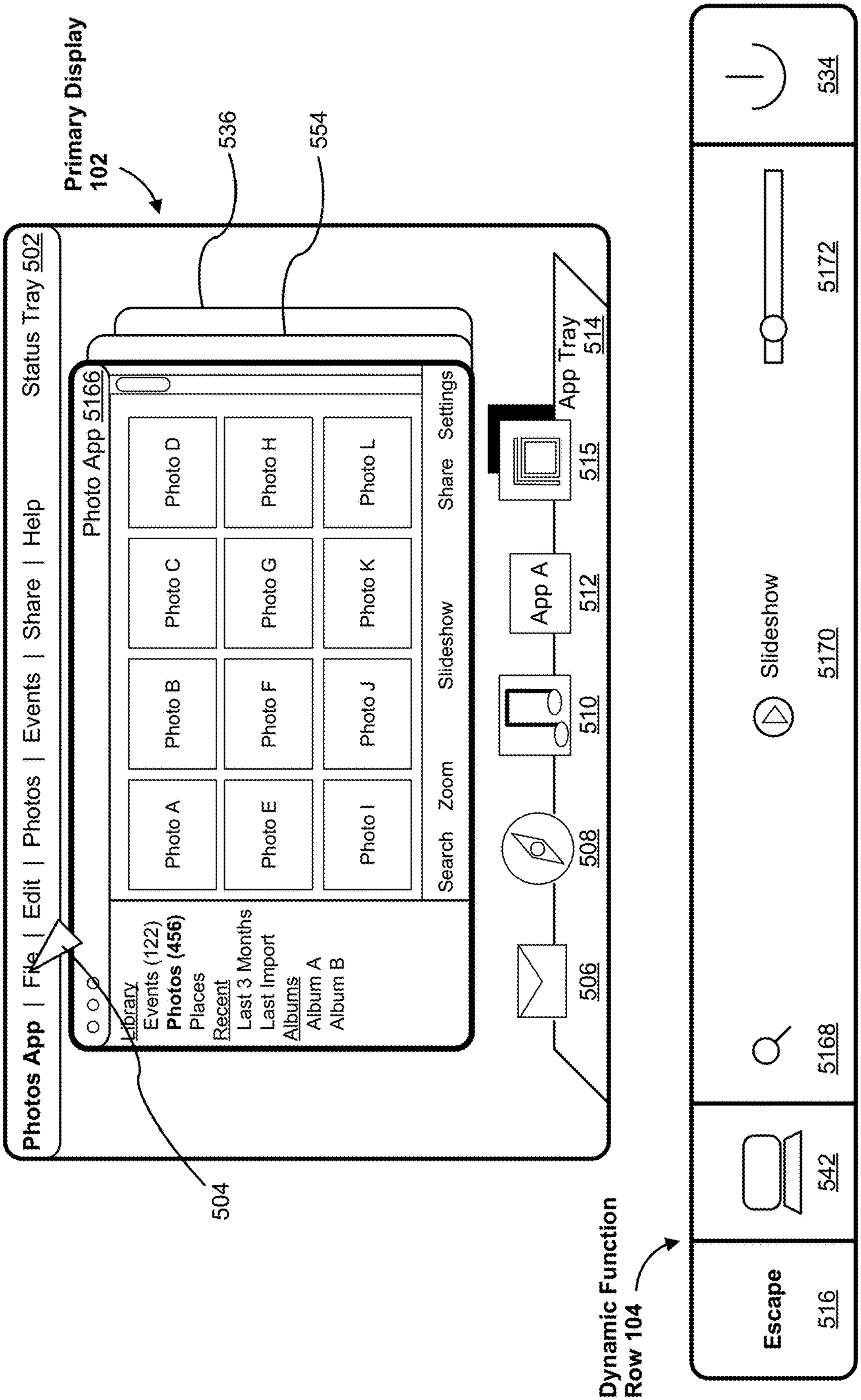

In FIG. 13A, the focus of primary display 102 is the photo application in response to detecting selection of window 5166 with cursor 504 in FIG. 12H. More specifically, the all photos sub-section of a user's photo library is in focus on primary display 102 as shown by "Photos" displayed in bold and photos A-L at least partially displayed in window 5166. In FIG. 13A, status tray 502 indicates that the photo application is running in the foreground, and app tray 514 also indicates that the photo application is running in the foreground based on the shadow behind photo application icon 515. FIG. 13A also illustrates primary display 102 displaying cursor 504 at a location corresponding to the file menu within status tray 502. FIG. 13A further illustrates dynamic function row 104 displaying a plurality of affordances corresponding to the all photos sub-section of the user's photo library (e.g., affordances 5168, 5170, and 5172) and the at least one system-level affordance (e.g., affordance 542) in response to detecting selection of window 5166 with cursor 504 in FIG. 12H.

Figure 13B:
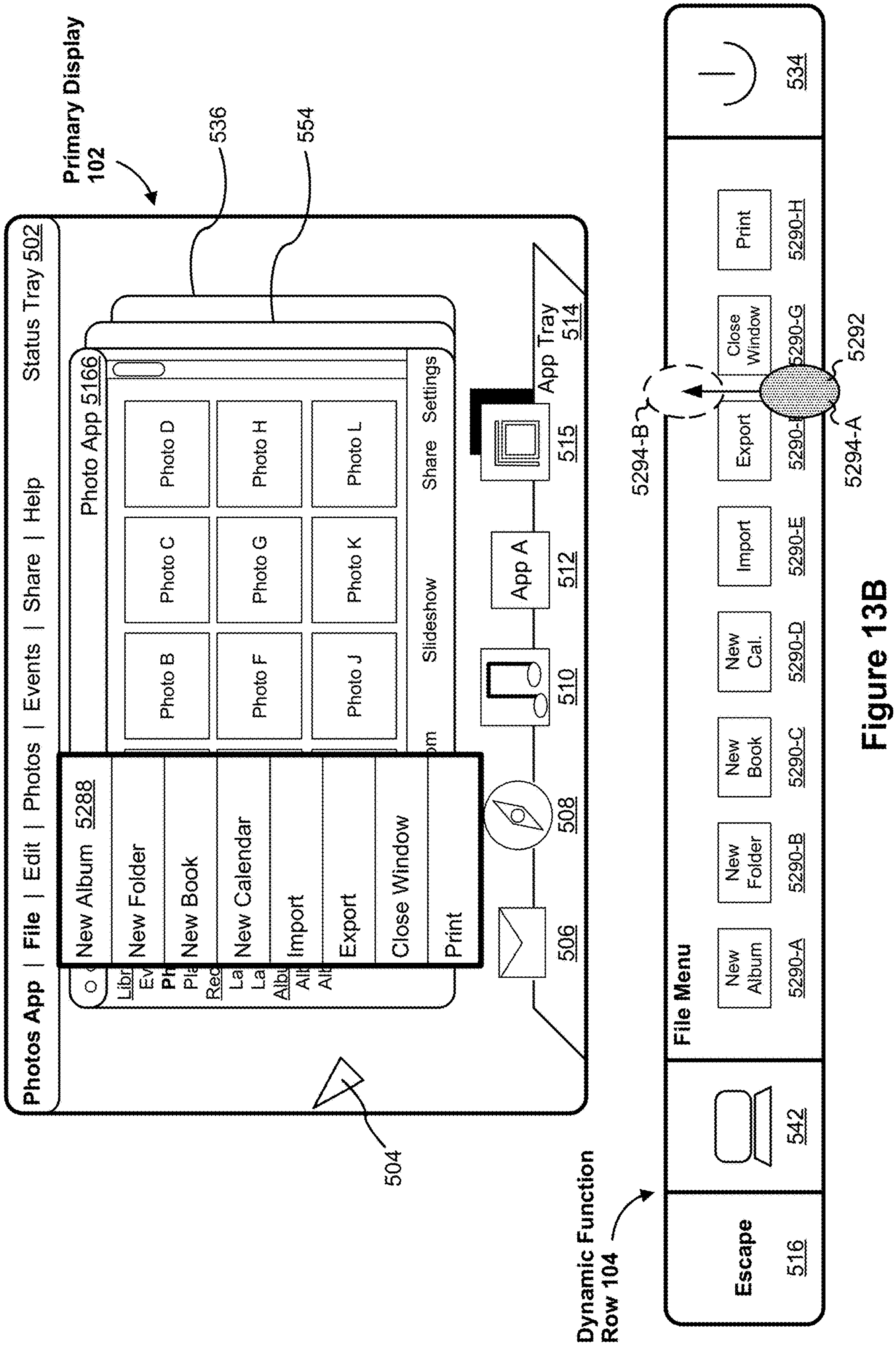

FIG. 13B illustrates primary display 102 displaying a menu of file controls 5288 in response to detecting selection of the file menu with cursor 504 in FIG. 13A. In FIG. 13B, the menu of file controls 5288 is in focus on primary display 102. In FIG. 13B, the menu of file controls 5288 includes a new album control, a new folder control, a new calendar control, an import control, an export control, a close window control, and a print control.

FIG. 13B also illustrates dynamic function row 104 displaying a first plurality of affordances 5290 in response to detecting selection of the file menu with cursor 504 in FIG. 13A. In FIG. 13B, the first plurality of affordances 5290 correspond to the file controls shown in the menu of file controls 5288 displayed by primary display 102. For example, when activated (e.g., via a tap contact), affordance 5290-G (e.g., corresponding to a close window file control) causes primary display 102 to cease display of window 5166 and also causes dynamic function row 104 to cease display of the first plurality of affordances 5290. FIG. 13B further illustrates dynamic function row 104 receiving and detecting an upward swipe gesture with contact 5292 moving from a first location 5294-A to a second location 5294-B.

Figure 13C:
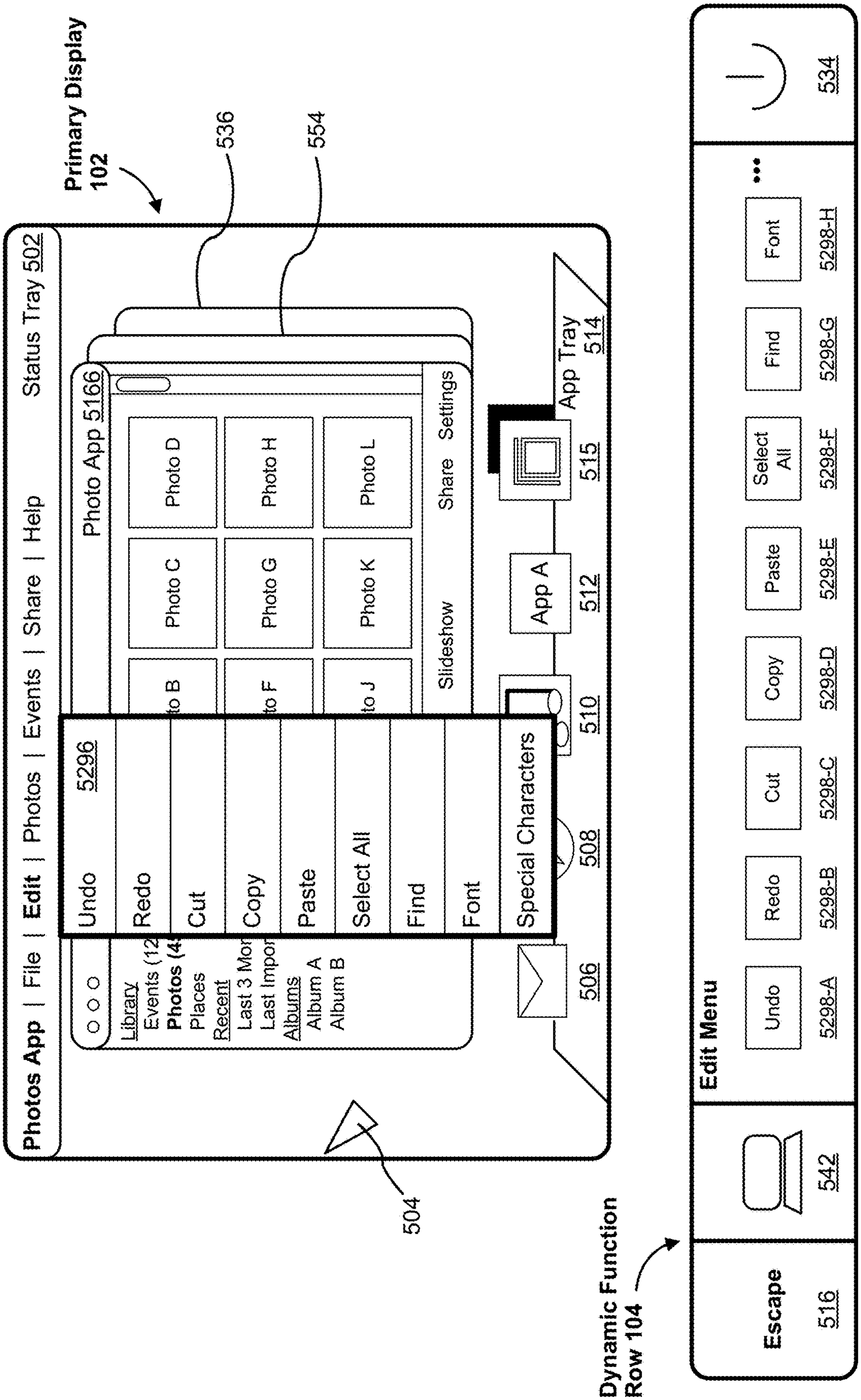

FIG. 13C illustrates primary display 102 displaying a menu of edit controls 5296 in response to detecting the upward swipe gesture in FIG. 13B. For example, primary display 102 displays a menu of help controls in response to detecting a downward swipe on dynamic function row in FIG. 13B. In FIG. 13C, the menu of edit controls 5296 is in focus on primary display 102. In FIG. 13B, the menu of edit controls 5296 includes an undo control, a redo control, a cut control, a copy control, a paste control, a select all control, a find control, a font control, and a special characters control.

FIG. 13C also illustrates dynamic function row 104 displaying a second plurality of affordances 5298 in response to detecting the upward swipe gesture in FIG. 13B. In FIG. 13C, the second plurality of affordances 5298 correspond to the edit controls shown in the menu of edit controls 5296 displayed by primary display 102. For example, the user of portable computing system 100 or desktop computing system 200 is able to view the balance of the plurality of affordances 5298 (e.g., the special characters affordance 5289-I) on dynamic function row 104 by performing a left-to-right swipe gesture on dynamic function row 104.

Figure 14A:
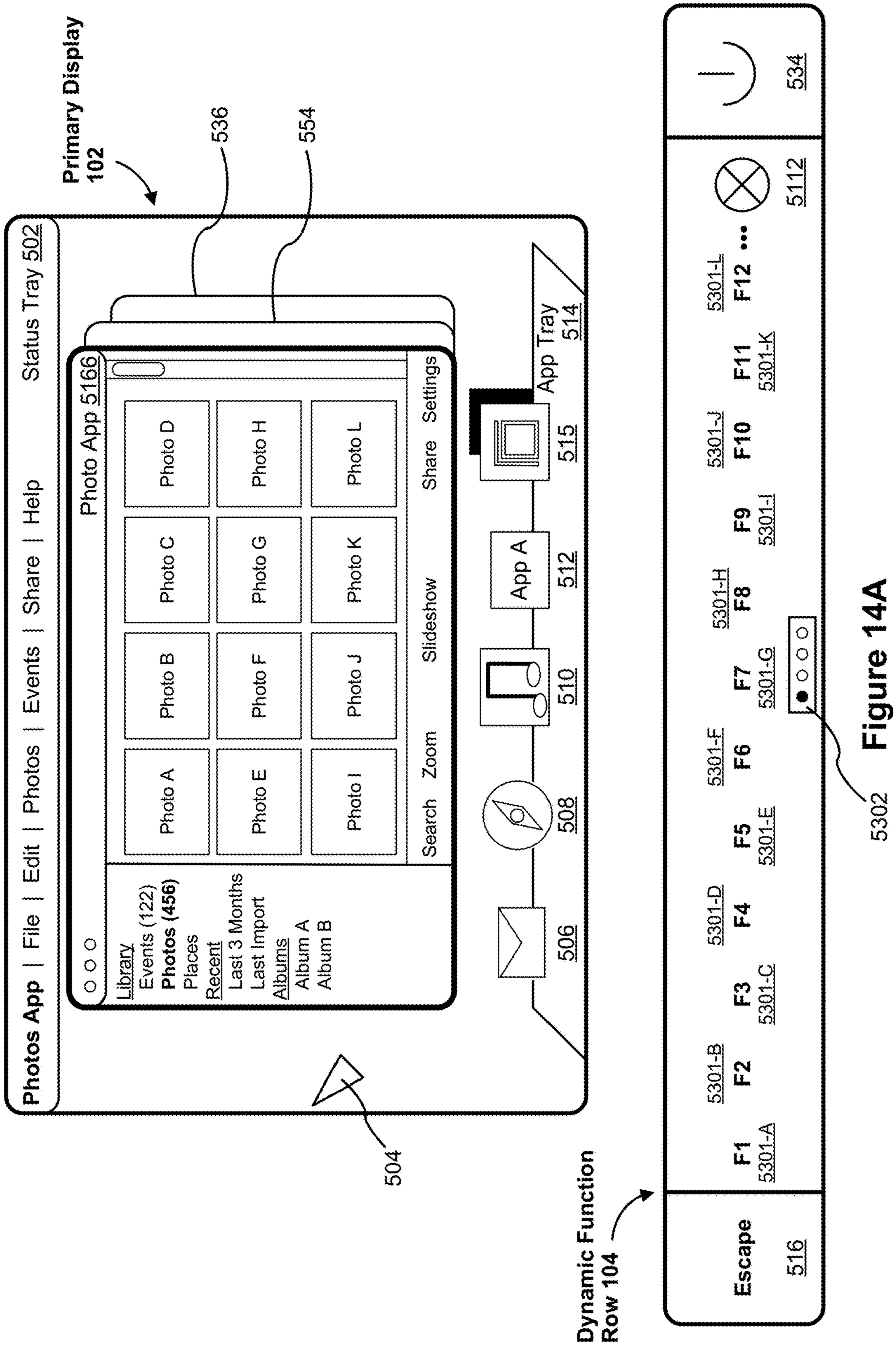

FIG. 14A illustrates dynamic function row 104 displaying a first plurality of affordances 5301 along with the persistent controls (e.g., affordances 516 and 534) in response to receiving a signal from the set of physical keys 106 of portable computing system 100 (FIG. 1A-1B) or from the set of physical keys 106 of peripheral keyboard 206 of desktop computing system 200 (FIGS. 2A-2D) corresponding to a specified physical key (e.g., a function key) or a specified physical key combination for overriding the current affordances displayed by dynamic function row 104. In FIG. 14A, dynamic function row 104 displays the first plurality of affordances 5301 (e.g., corresponding to F1-F12) and an exit affordance 5112 for ceasing to display the first plurality of affordances 5301 on dynamic function row 104. In FIG. 14A, dynamic function row 104 also navigation aid 5302 indicating that the first plurality of affordances 5301 is the first of four sets of affordances. For example, the user of portable computing system 100 or desktop computing system 200 is able to reveal additional affordances within the first plurality of affordances 5301 (e.g., corresponding to F13, . . . ) by performing a left-to-right or right-to-left swipe gesture on dynamic function row 104. In some embodiments, the first plurality of affordances 5301 includes a customized symbol row set by the user of the computing system or a set of most frequently used symbols and/or special characters.

Figure 14B:
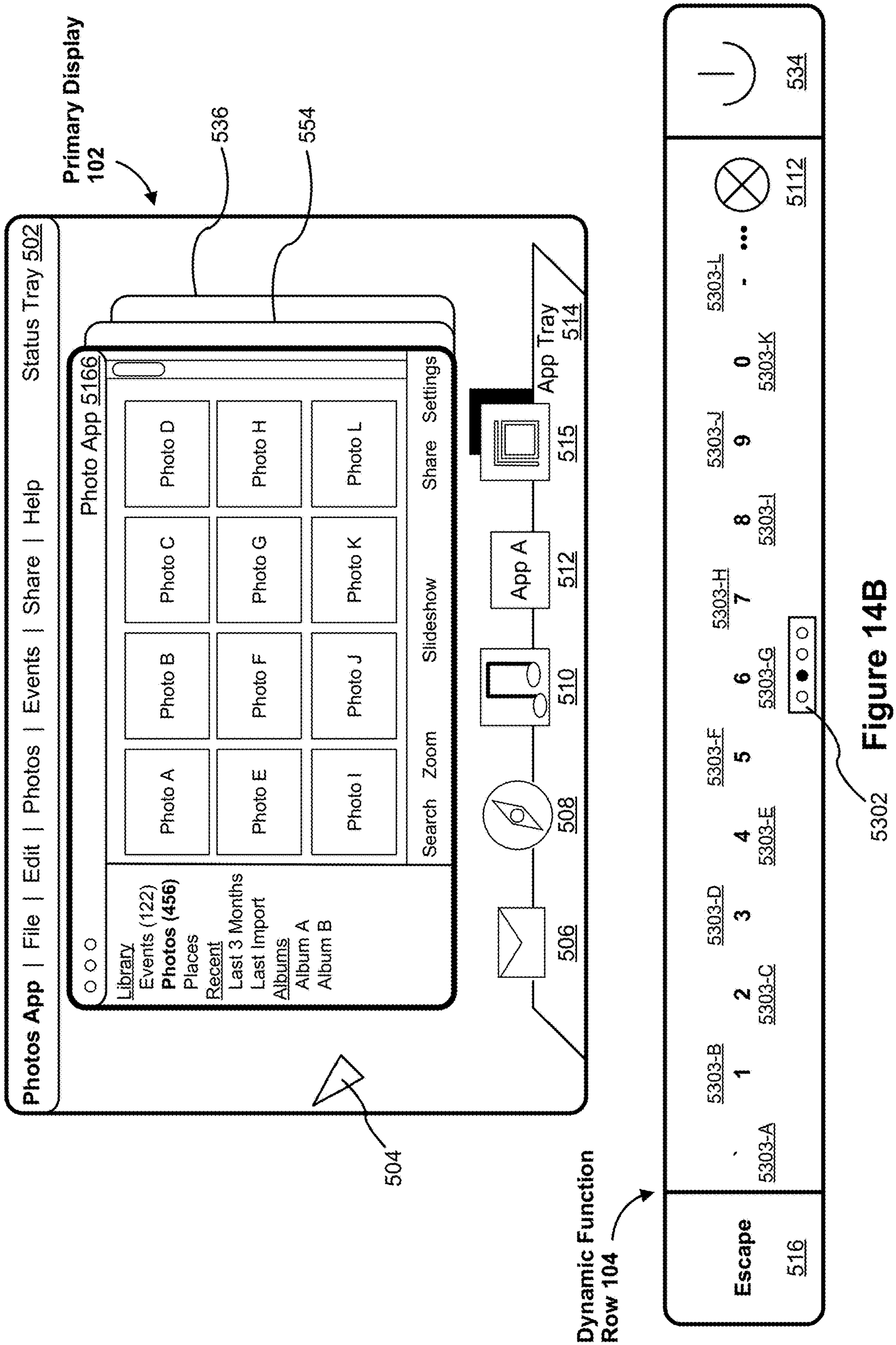

FIG. 14B illustrates dynamic function row 104 displaying a second plurality of affordances 5303 along with the persistent controls (e.g., affordances 516 and 534) in response to receiving a second signal from the set of physical keys 106 of portable computing system 100 (FIG. 1A-1B) or from the set of physical keys 106 of peripheral keyboard 206 of desktop computing system 200 (FIGS. 2A-2D) corresponding to a specified physical key (e.g., a function key) or a specified physical key combination for overriding the current affordances displayed by dynamic function row 104. Alternatively, in some embodiments, dynamic function row 104 displays the second plurality of affordances 5303 in response to detecting an upward swipe gesture on dynamic function row 104 in FIG. 14A. In FIG. 14B, dynamic function row 104 displays the second plurality of affordances 5301 (e.g., corresponding to 1, 2, 3, . . . ) and an exit affordance 5112 for ceasing to display the second plurality of affordances 5303 on dynamic function row 104. In FIG. 14B, navigation aid 5302 indicates that the second plurality of affordances 5302 is the second of four sets of affordances. For example, the user of portable computing system 100 or desktop computing system 200 is able to reveal additional affordances within the second plurality of affordances 5302 by performing a left-to-right or right-to-left swipe gesture on dynamic function row 104.

Figure 14C:
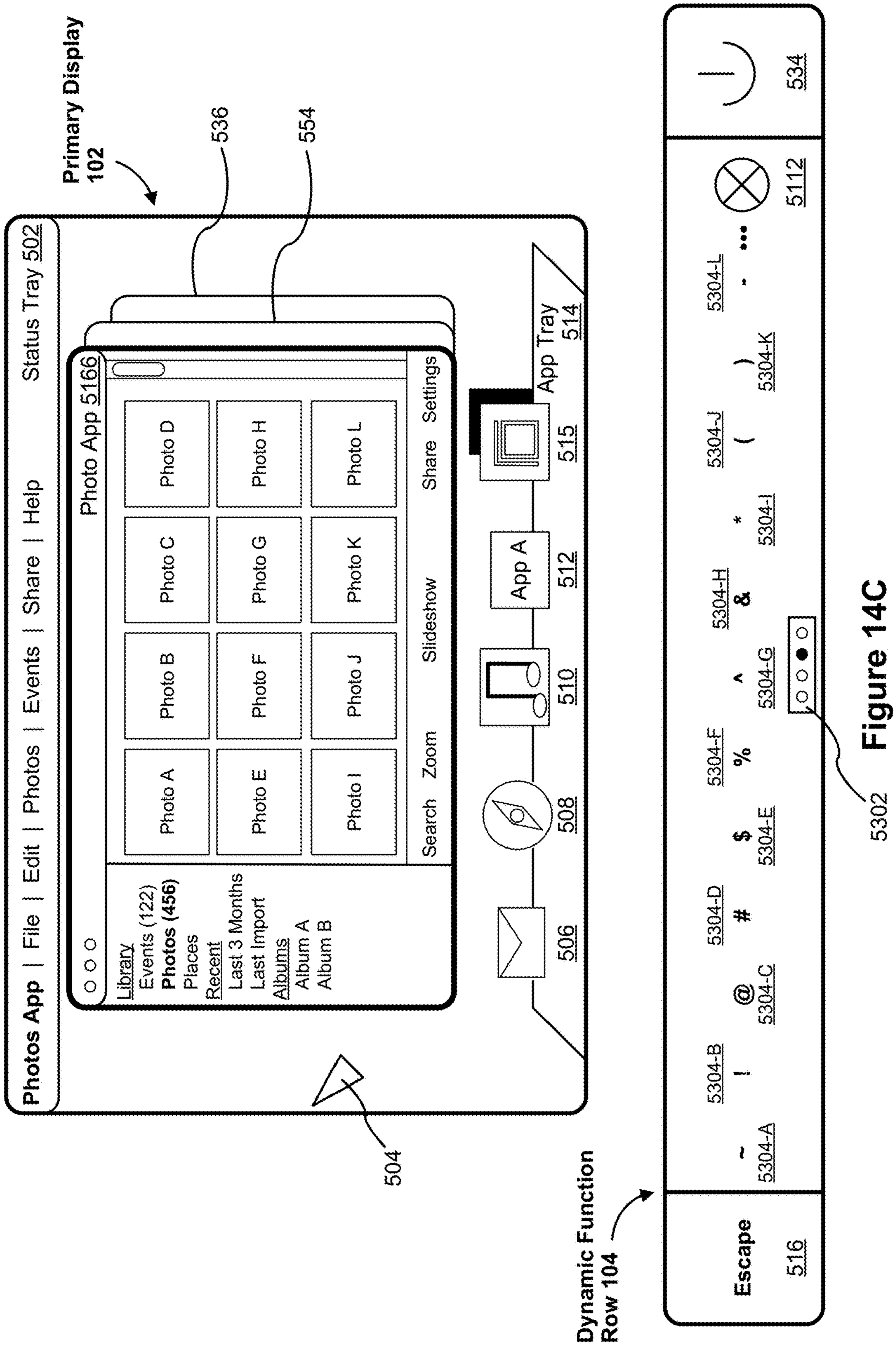

FIG. 14C illustrates dynamic function row 104 displaying a third plurality of affordances 5304 along with the persistent controls (e.g., affordances 516 and 534) in response to receiving a third signal from the set of physical keys 106 of portable computing system 100 (FIG. 1A-1B) or from the set of physical keys 106 of peripheral keyboard 206 of desktop computing system 200 (FIGS. 2A-2D) corresponding to a specified physical key (e.g., a function key) or a specified physical key combination for overriding the current affordances displayed by dynamic function row 104. Alternatively, in some embodiments, dynamic function row 104 displays the third plurality of affordances 5304 in response to detecting an upward swipe gesture on dynamic function row 104 in FIG. 14B. In FIG. 14C, dynamic function row 104 displays the third plurality of affordances 5304 (e.g., corresponding to —, !, @, #, . . . ) and an exit affordance 5112 for ceasing to display the third plurality of affordances 5304 on dynamic function row 104. In FIG. 14C, navigation aid 5302 indicates that the third plurality of affordances 5302 is the third of four sets of affordances. For example, the user of portable computing system 100 or desktop computing system 200 is able to reveal additional affordances within the third plurality of affordances 5304 by performing a left-to-right or right-to-left swipe gesture on dynamic function row 104.

Figure 14D:
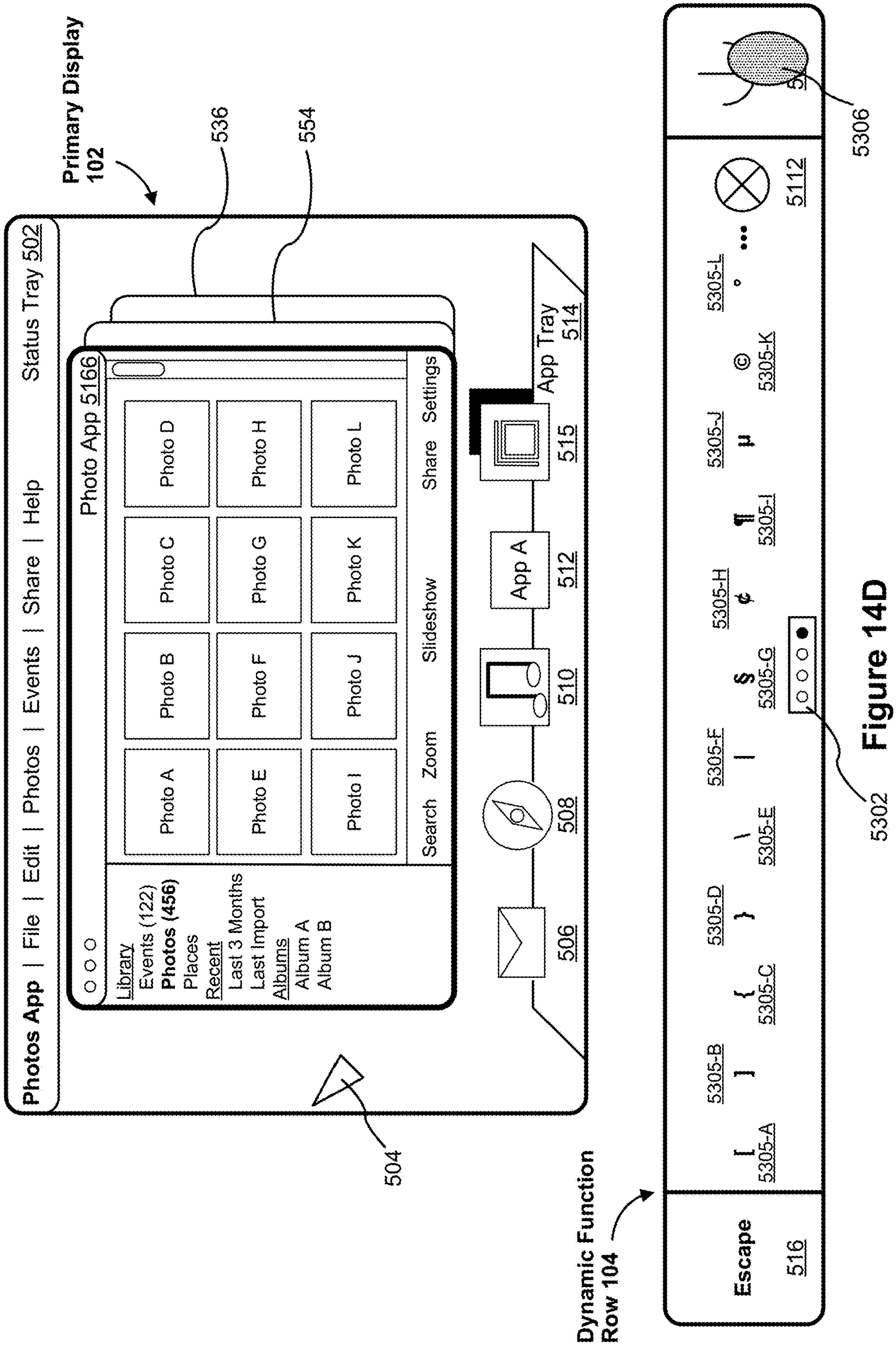

FIG. 14D illustrates dynamic function row 104 displaying a fourth plurality of affordances 5305 along with the persistent controls (e.g., affordances 516 and 534) in response to receiving a fourth signal from the set of physical keys 106 of portable computing system 100 (FIG. 1A-1B) or from the set of physical keys 106 of peripheral keyboard 206 of desktop computing system 200 (FIGS. 2A-2D) corresponding to a specified physical key (e.g., a function key) or a specified physical key combination for overriding the current affordances displayed by dynamic function row 104. Alternatively, in some embodiments, dynamic function row 104 displays the fourth plurality of affordances 5305 in response to detecting an upward swipe gesture on dynamic function row 104 in FIG. 14C. In FIG. 14D, dynamic function row 104 displays the fourth plurality of affordances 5305 (e.g., corresponding to [,], {,}, . . . ) and an exit affordance 5112 for ceasing to display the fourth plurality of affordances 5305 on dynamic function row 104. In FIG. 14D, navigation aid 5302 indicates that the fourth plurality of affordances 5305 is the fourth of four sets of affordances. For example, the user of portable computing system 100 or desktop computing system 200 is able to reveal additional affordances within the fourth plurality of affordances 5305 by performing a left-to-right or right-to-left swipe gesture on dynamic function row 104. FIG. 14D further illustrates dynamic function row 104 receiving and detecting contact 5306 (e.g., a tap contact) at a location corresponding to power control 534.

Figure 14E:
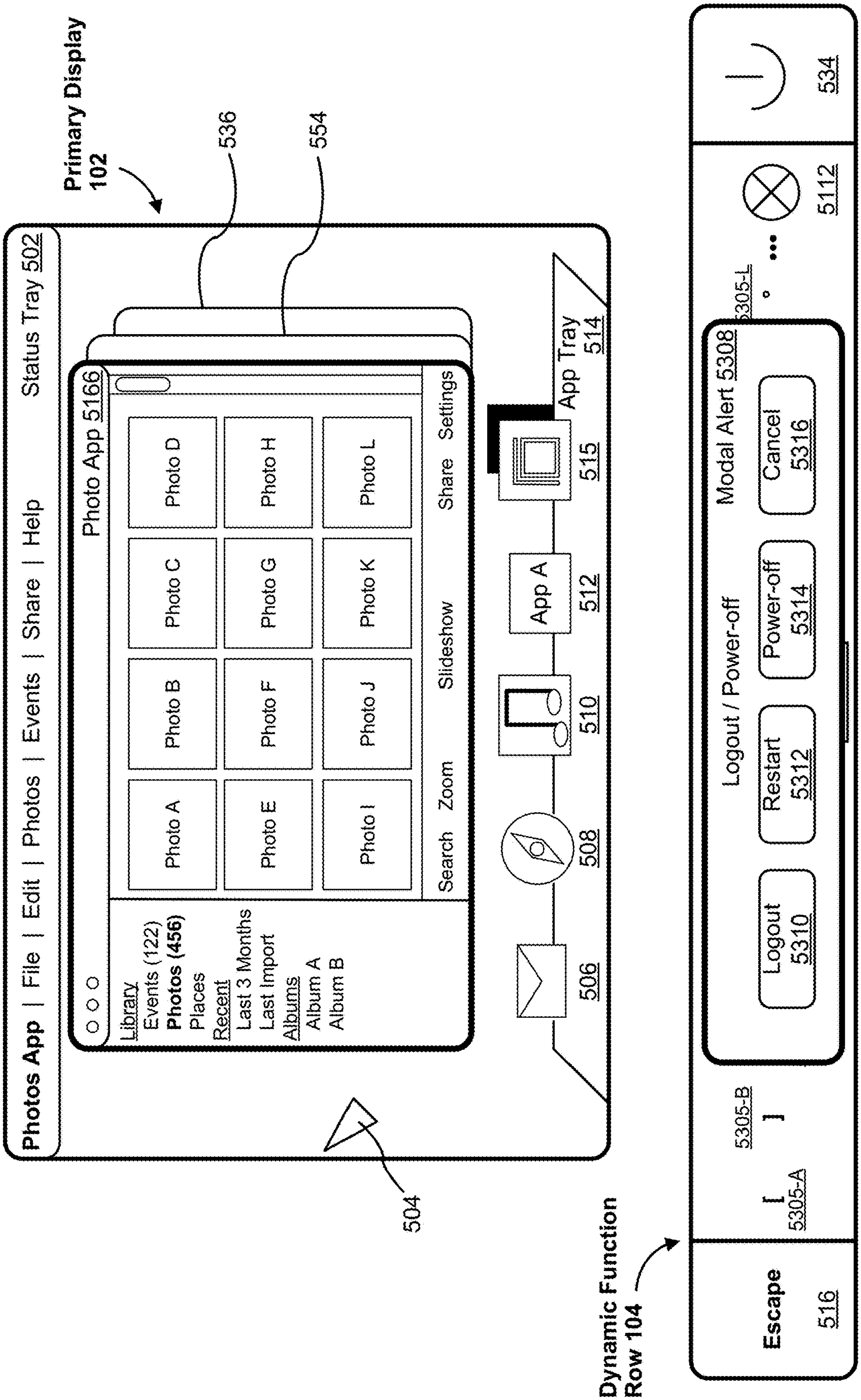

FIG. 14E illustrates dynamic function row 104 displaying modal alert 5308 in response to detecting selection of power control 534 in FIG. 14D. For example, modal alert 5308 is overlaid on the fourth plurality of functions affordance 5305. In FIG. 14E, modal alert 5308 prompts the user of portable computing system 100 or desktop computing system 200 to select one of a plurality of options, including: logout affordance 5310, which, when activated (e.g., via a tap contact), causes the current user of the user of portable computing system 100 or desktop computing system 200 to be logged out from portable computing system 100 or desktop computing system 200 (i.e., computing device 202, FIGS. 2A-2D); restart affordance 5312, which, when activated (e.g., via a tap contact), causes restart of portable computing system 100 or desktop computing system 200 (i.e., computing device 202, FIGS. 2A-2D); power-off affordance 5314, which, when activated (e.g., via a tap contact), causes portable computing system 100 or desktop computing system 200 (i.e., computing device 202, FIGS. 2A-2D) to power-off; and cancel affordance 5316, which, when activated (e.g., via a tap contact), causes dynamic function row 104 to cease display of modal alert 5308.

Figure 15A:
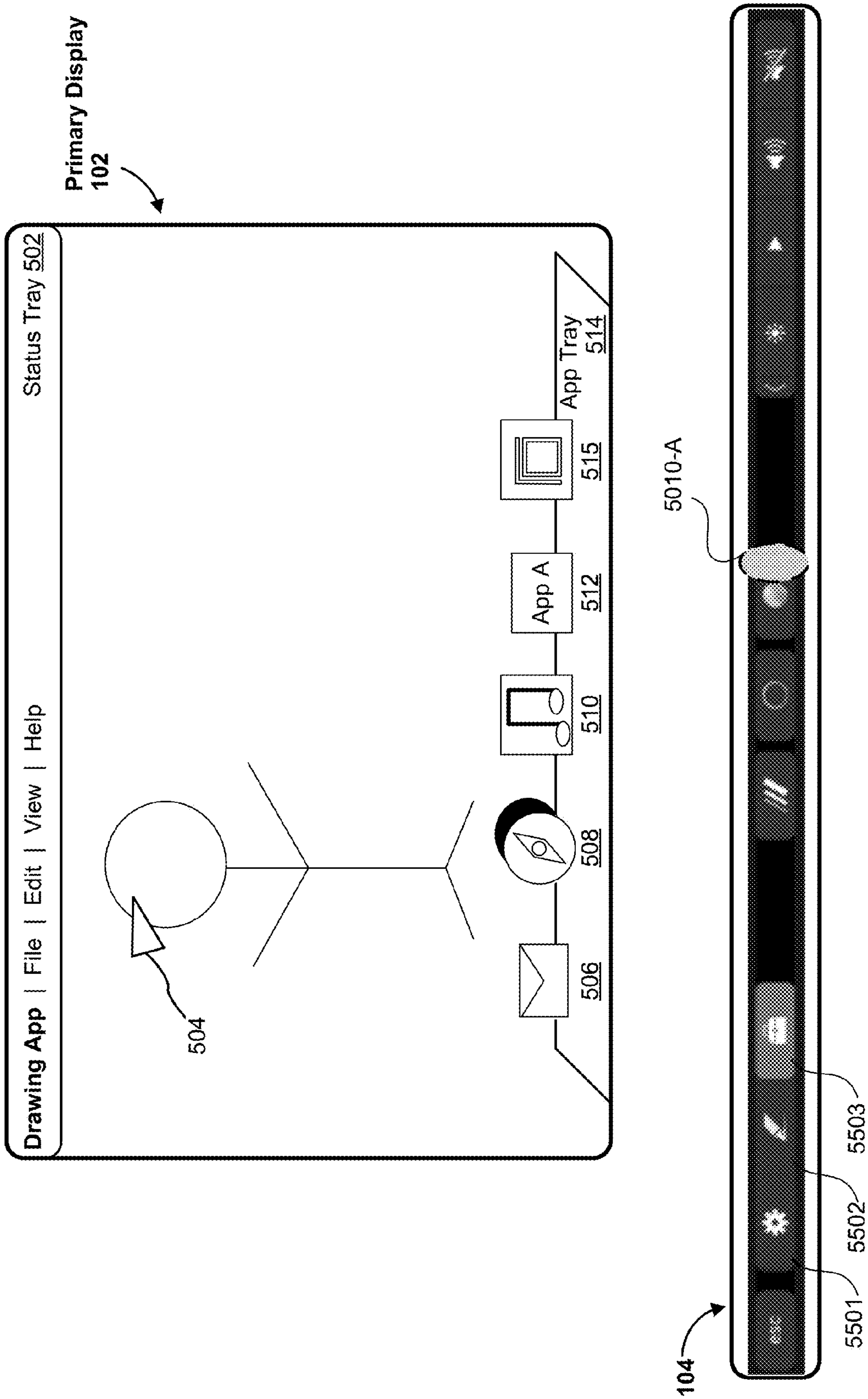

In some embodiments, the dynamic function row 104 (also referred to herein as the "touch-sensitive secondary display 104") is populated with affordances that allow a user to easily manipulate a visual characteristic used to render content on the primary display 102. A few examples are shown in FIGS. 15A-15H. In particular, FIG. 15A shows that a user is interacting with a drawing application on the primary display 102. In response to a selection of an editable portion within the drawing application (e.g., the user selects the head of the shown stick figure by placing the cursor 504 over the head and clicking or pressing using an input device), the touch-sensitive secondary display 104 is updated to include editing options. As shown in FIG. 15A, in response to a user selecting a portion of an editable drawing object, the touch-sensitive secondary display is updated to include affordances that each correspond to various editing functions that are available for the type of editable object that was selected (e.g., different affordances are displayed depending on whether graphical or textual content is selected by the user, as explained in more detail below in reference to FIGS. 24A-24N).

In some embodiments, the affordances that each correspond to various editing functions include: (i) a general editing affordance 5501 that, when selected, causes the touch-sensitive secondary display to display general editing options; (ii) a highlight styles affordance 5502 that, when selected, causes the touch-sensitive secondary display to begin displaying highlighting options; and (iii) a markup affordance 5503 that, when selected (shown as selected in FIG. 15A), causes the touch-sensitive secondary display to begin displaying options for modifying visual characteristics that are used to render content on the primary display 102.

In some embodiments, in response to a selection of markup affordance 5503, the touch-sensitive secondary display begins displaying the options for modifying visual characteristics. In some embodiments and as shown in FIG. 15A, these options are displayed adjacent to the markup affordance 5503 (e.g., the affordances that each correspond to various editing functions are displayed in a first region of the touch-sensitive secondary display and the options are displayed in an adjacent second region). In some embodiments, the first and second regions are included within an application-specific section of the touch-sensitive secondary display and other affordances are shown to the left (e.g., the "esc" affordance shown in FIG. 15A) and to the right of the application-specific section (e.g., affordances that allow for modifying brightness, for controlling playback of media content in the background of the computing system, and volume).

Figure 15B:
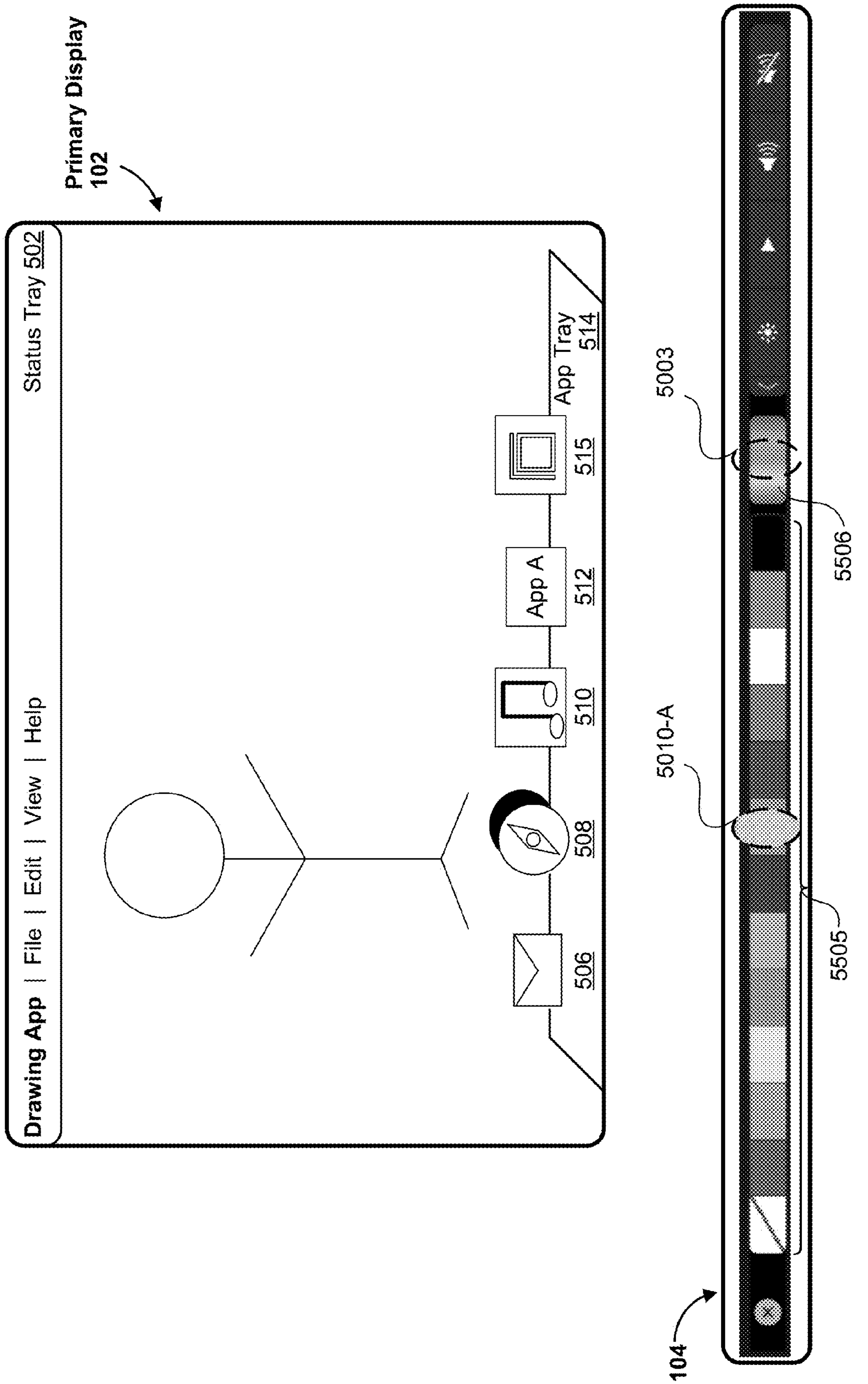
Figure 15C:
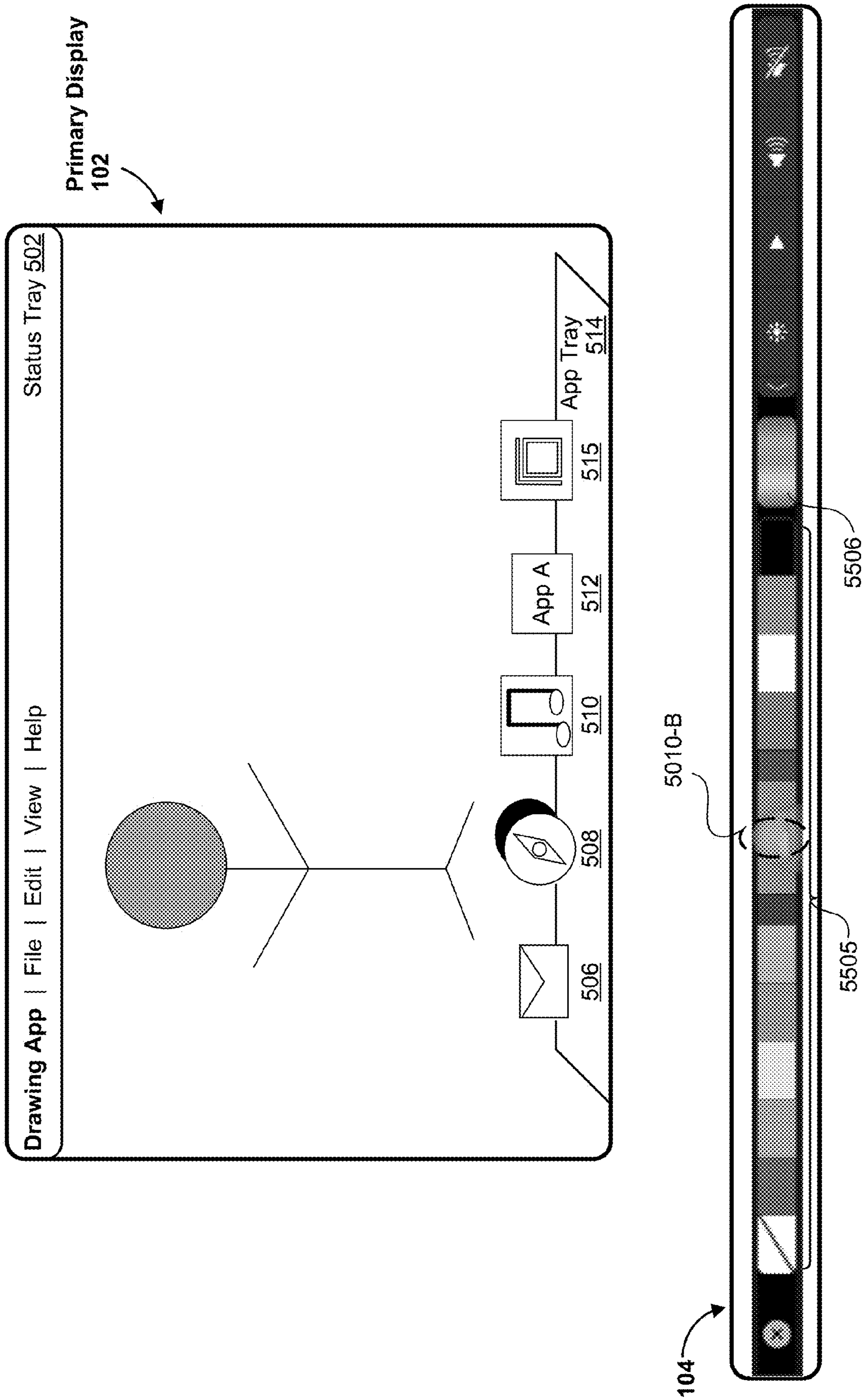

In some embodiments, in response to detecting a selection of a color picker affordance (e.g., selection 5010-A, FIG. 15A), the touch-sensitive secondary display is shown using an overlay display mode in which color picking options are presented as occupying most of the application-specific portion of the touch-sensitive secondary display 104. As shown in FIG. 15B, the color picking objects are presented in a user interface control 5505 (also referred to as a color picker 5505) for modifying a visual characteristic (e.g., color) that is used to render content on the primary display. Other example visual characteristics include tint, shade, and opacity.

In some embodiments, if the user initiates a press-and-hold gesture (e.g., the user contacts a particular color shown in the user interface control 5505 and maintains the contact for more than a threshold amount of time, such as 0.5, 1, 1.5, or 2 seconds) or if the user contact over the particular color and a characteristic intensity of that contact satisfy an intensity threshold, then the user interface control 5505 shown in the touch-sensitive secondary display is updated to include additional options that correspond to the particular color. For example, in response to input 5010-B over a representation of the color pink (e.g., a press-and-hold input or an input that satisfies the intensity threshold), the user interface control is updated to include additional shades of pink that are available for selection. As shown in FIGS.

15C-15D, in response to the input 5010-B, additional shades of pink are presented for selection within the touch-sensitive secondary display and the head of the editable object within the drawing application on primary display 102 is rendered using the particular color.

Figure 15D:
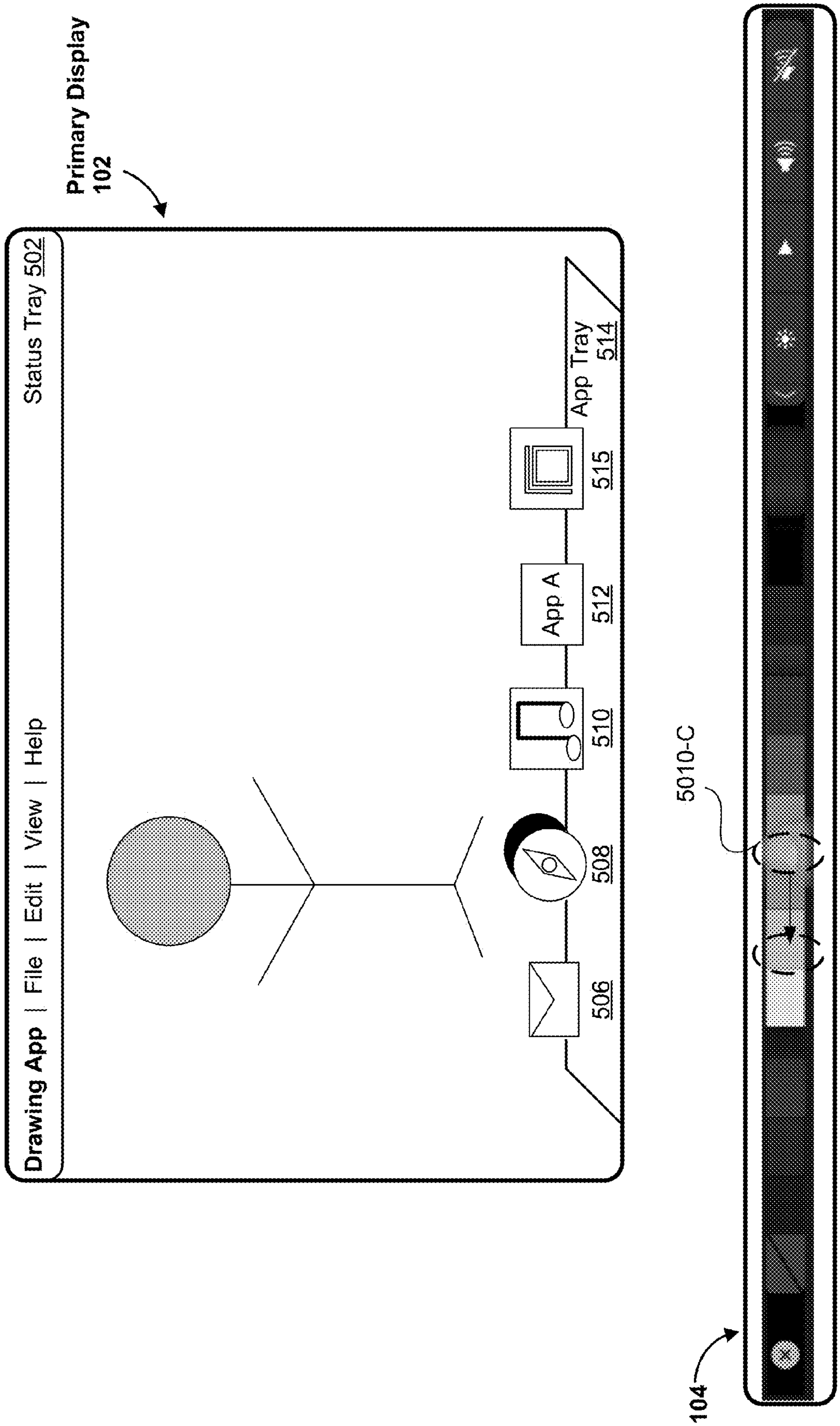

In some embodiments, the user is able to slide input 5010-C across the representations of the additional shades of pink on the touch-sensitive secondary display and, in response, the head of the editable object shown on the primary display 102 is rendered using each contacted shade of pink. As shown in FIG. 15D, the user contacts a different shade of pink using input 5010-C and, in response, the primary display 102 renders content using the different shade of pink. In some embodiments, the inputs 5010-A, 5010-B, and 5010-C correspond to one continuous input and, in this way, users are able to quick and efficiently preview how objects will look after selecting various values for a particular visual characteristic.

Figure 15E:
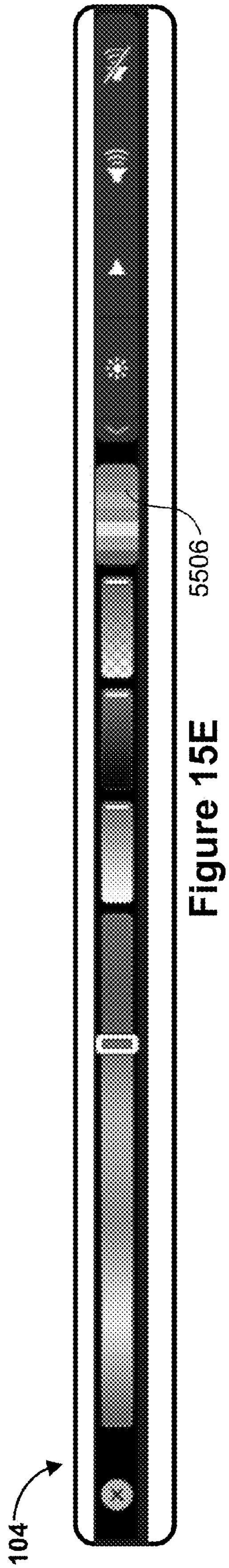
Figure 15F:
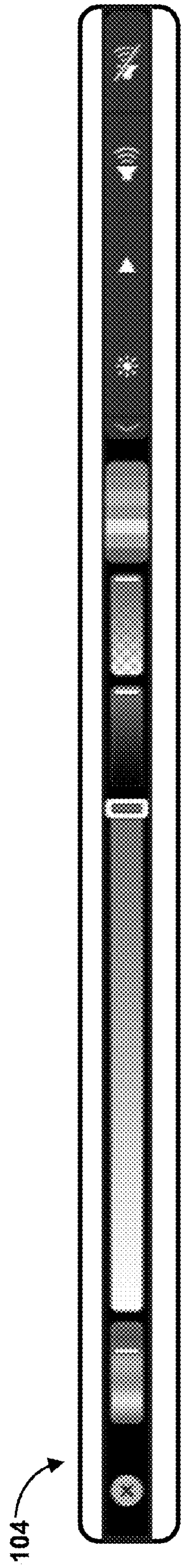
Figure 15G:
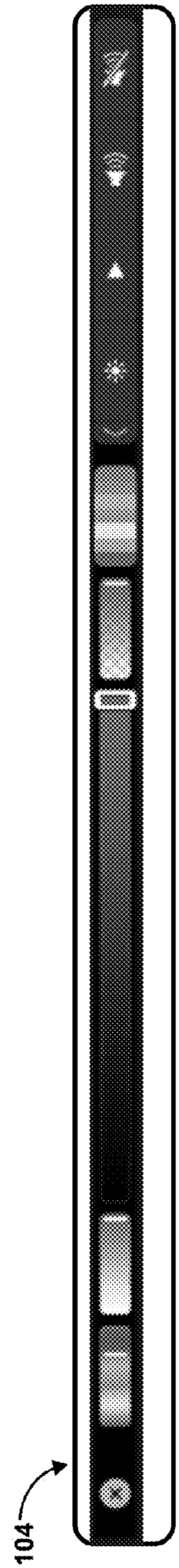
Figure 15H:
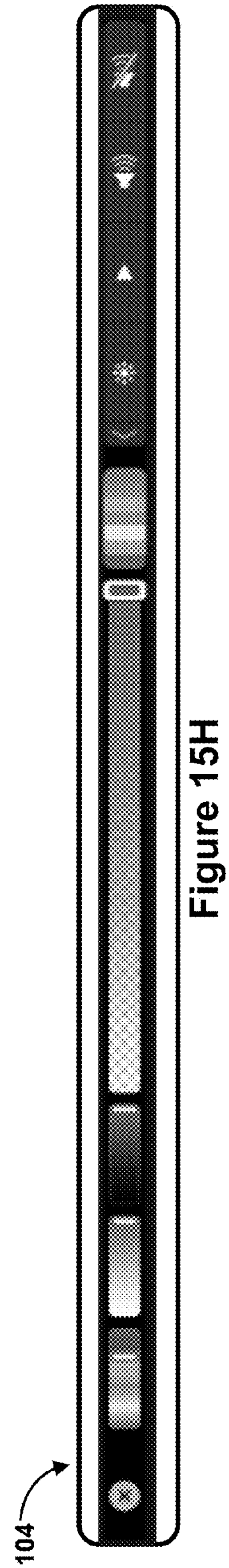

In some embodiments, the user interface control 5505 has at least two display modes that allow for choosing between basic and advanced modifying functions for a particular visual characteristic. In some embodiments, users are able to toggle between these at least two display modes by selecting a mode-switching affordance 5506. For example, in response to input 5003 shown in FIG. 15B, the color picker 5505 is shown in an advanced display mode (distinct from the basic display mode shown in FIG. 15B-15C) as shown in FIG. 15E and the mode-switching affordance is shown in a different display state that corresponds to a basic mode for the color picker 5505. In some embodiments, the advanced display mode also includes displaying user interface controls that allow for modifying other visual characteristics (examples are shown in FIGS. 15F-15H for tint, shade, and opacity, respectively). In some embodiments, the user is able to select any of the respective user interface controls and is then able to slide across a respective user interface control to cause the primary display 102 to begin rendering a preview of how a selected object will appear.

Figure 16A:
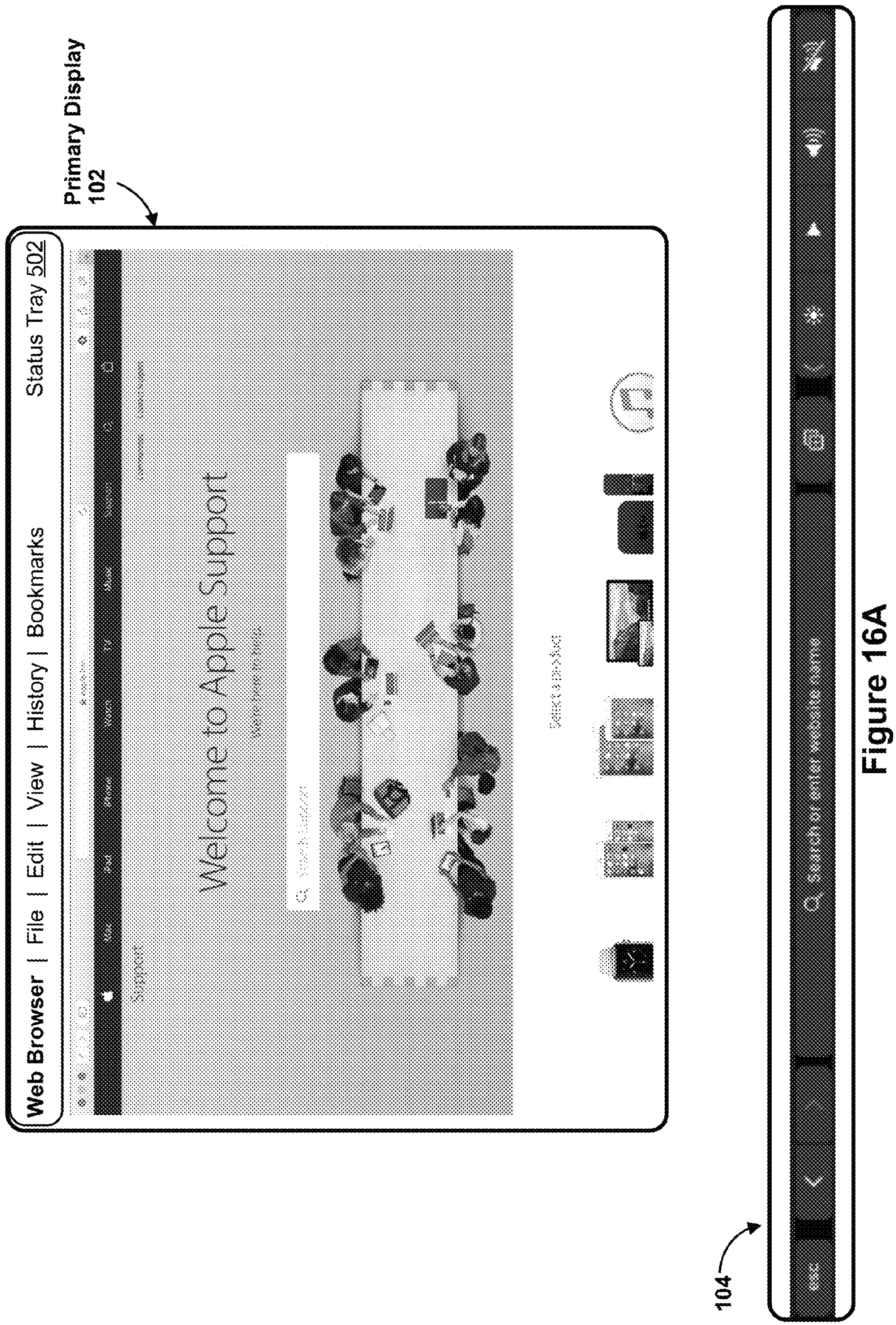
Figure 16B:
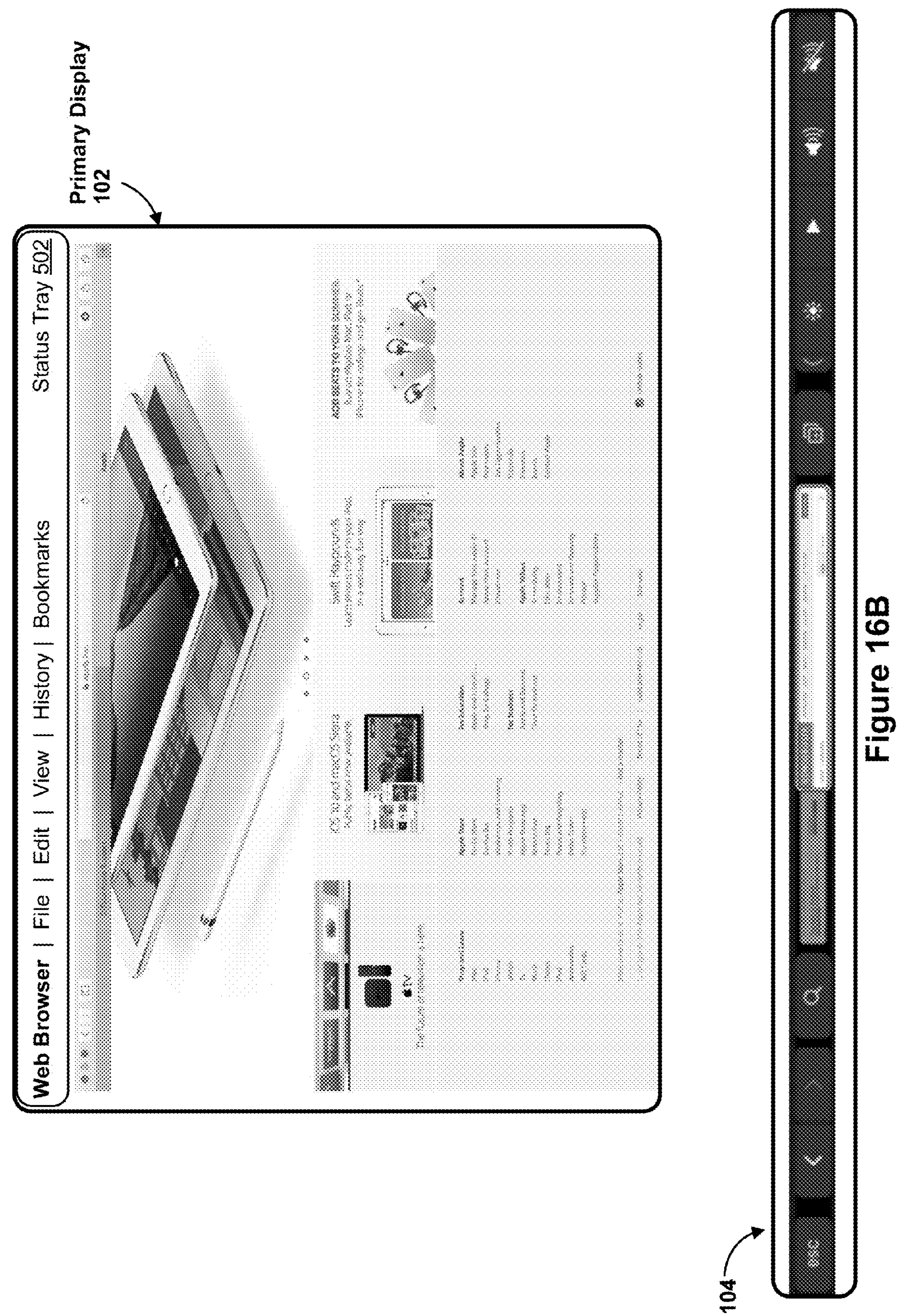

In some embodiments, the application-specific section of the touch-sensitive secondary display 104 changes to include different affordances when the user opens up a new application (e.g., switches from the content-editing application shown in FIGS. 15A-15D). As shown in FIGS. 16A-16M, the touch-sensitive secondary display 104 includes affordances that allow users to quickly and efficiently navigate through web content and perform browser-specific functions directly from the touch-sensitive secondary display 104. In some embodiments, the application-specific section of the touch-sensitive secondary display 104 displays representations of tabs that correspond to tabs shown in a web browser on the primary display 102. FIG. 16A illustrates example affordances shown in touch-sensitive secondary display 104 while a web browser includes only a single tab. In accordance with a determination that the web browser includes more than a single tab, the touch-sensitive secondary display 104 is updated to include representations corresponding to each of the tabs (e.g., examples are shown for 2-10 tabs in FIGS. 16B-16C and 16F-16L, respectively). In some embodiments, the touch-sensitive secondary display 104 is configured to display representations for a predefined number of tabs (e.g., up to 15 tabs, as shown in the example shown in FIG. 16M).

Figure 16C:
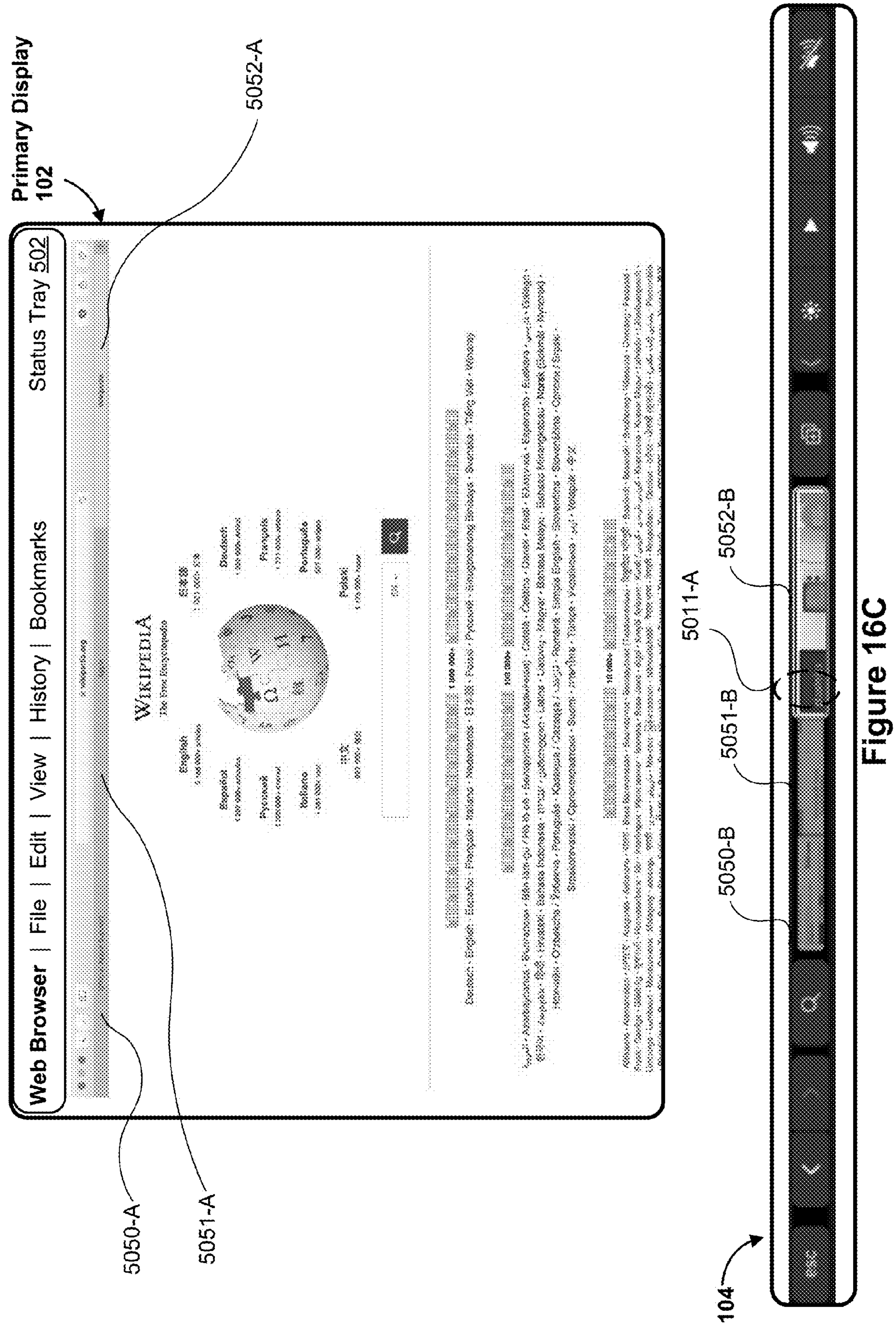
Figure 16D:
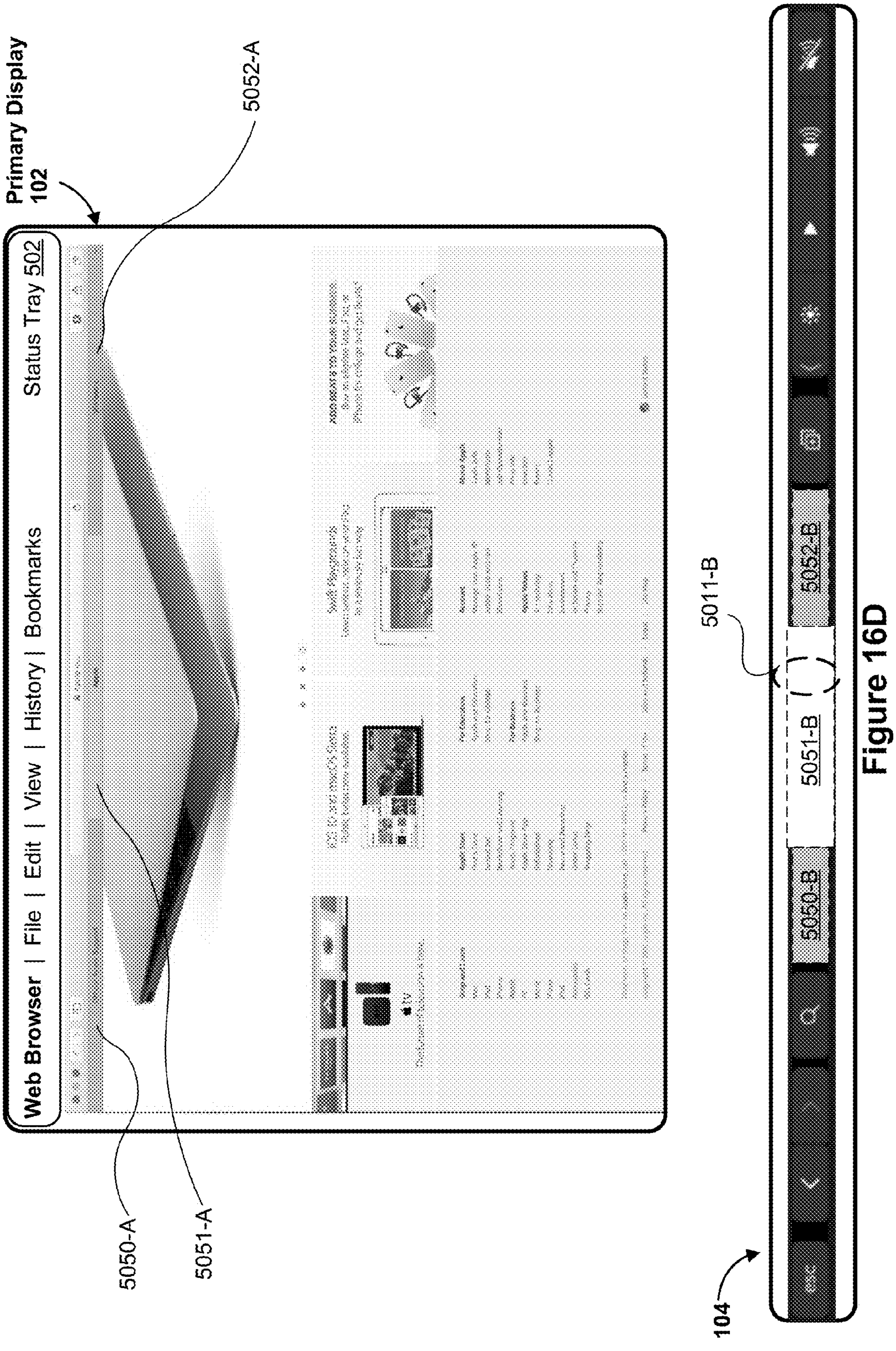
Figure 16E:
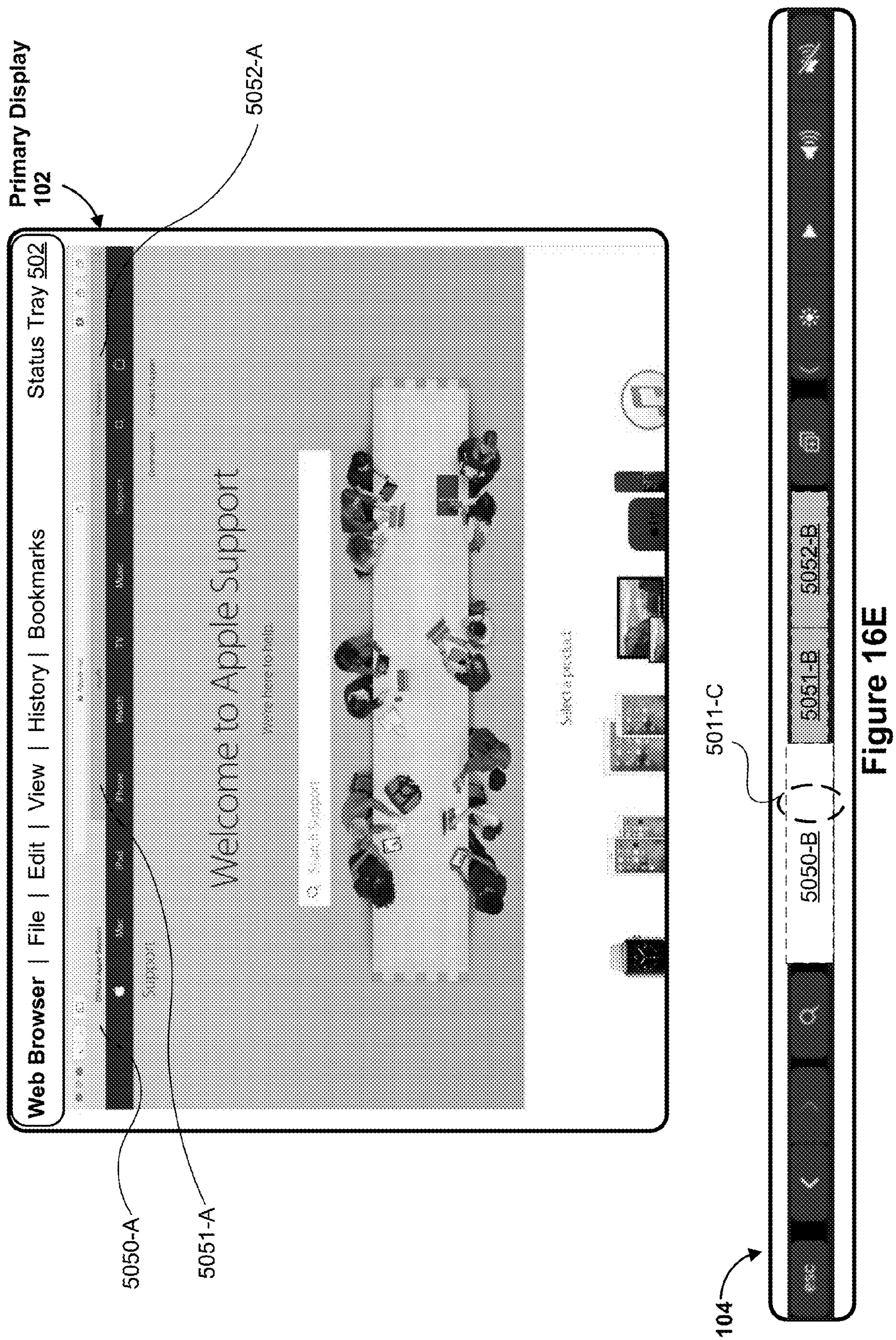
Figure 16F:
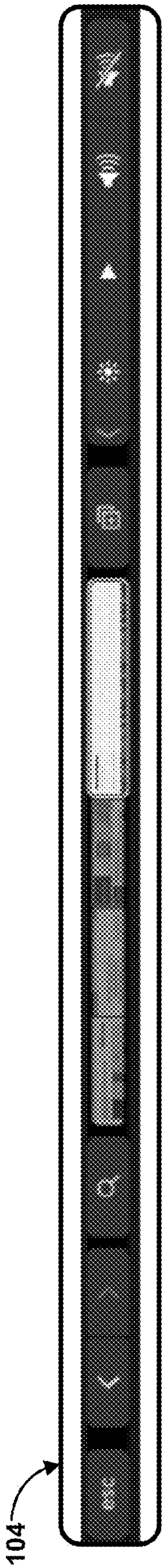
Figure 16G:
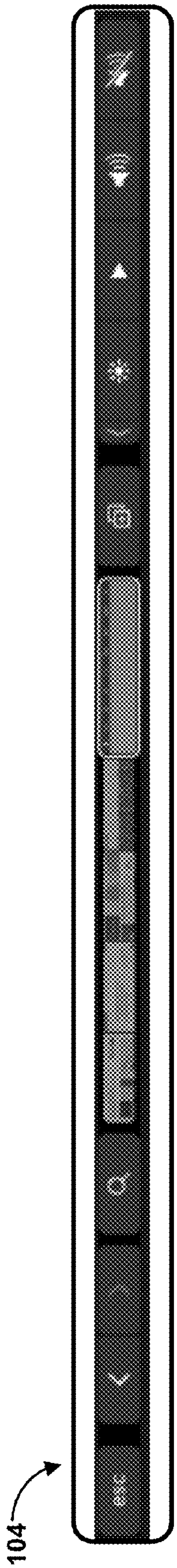
Figure 16H:
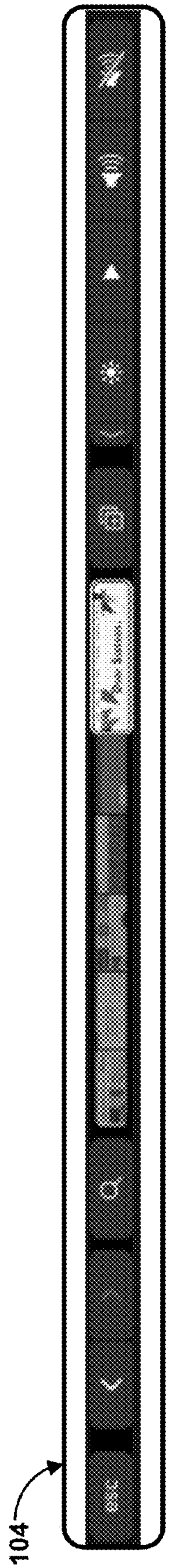
Figure 16I:
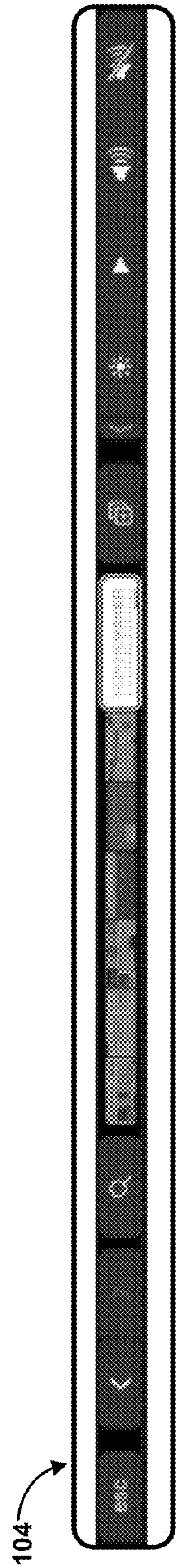
Figure 16J:
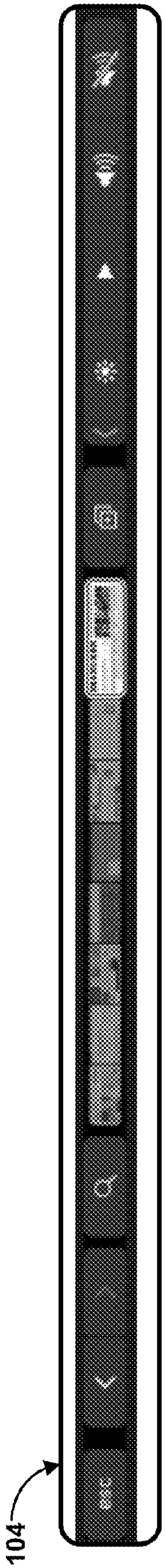
Figure 16K:
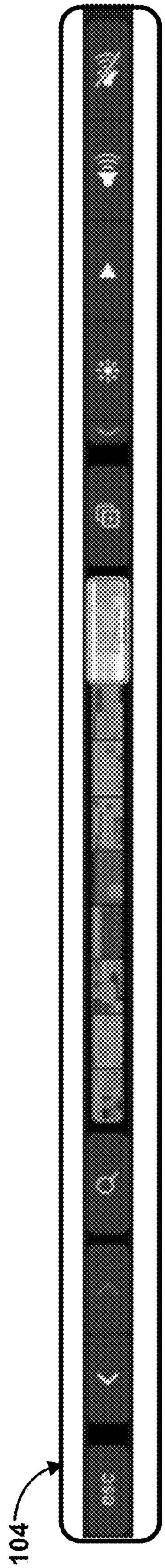
Figure 16L:
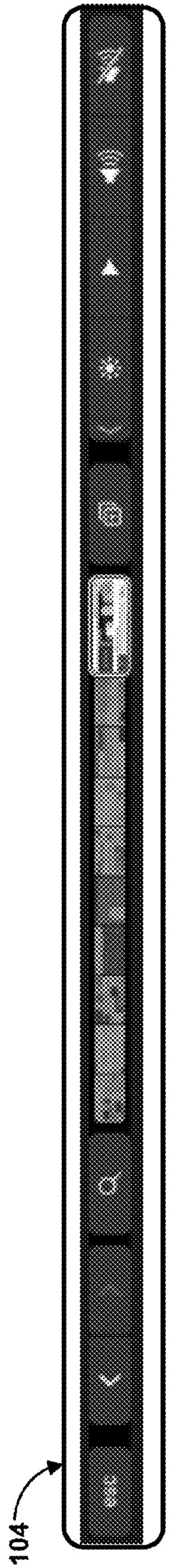
Figure 16M:
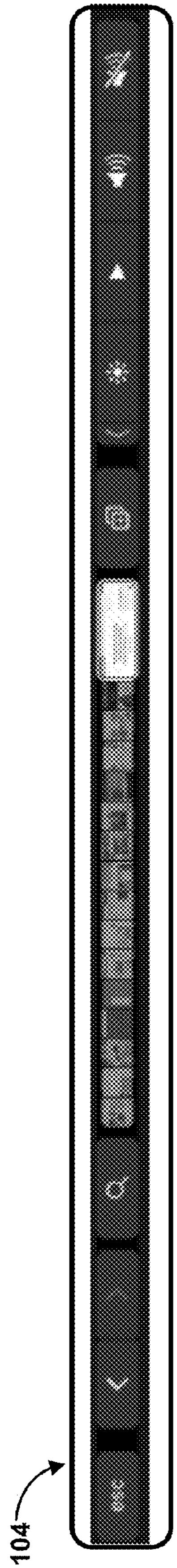
Figure 16N:
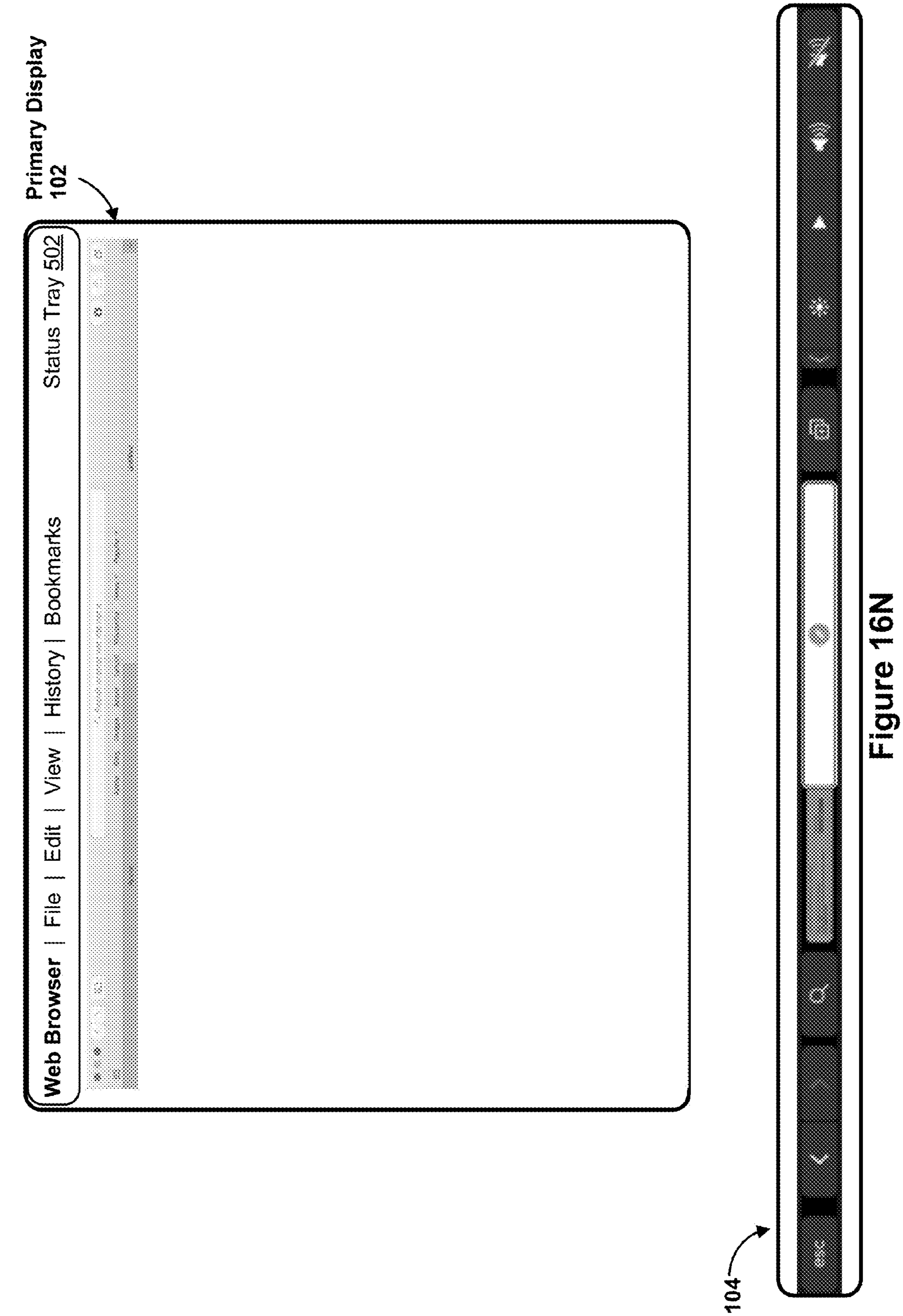
Figure 16O:
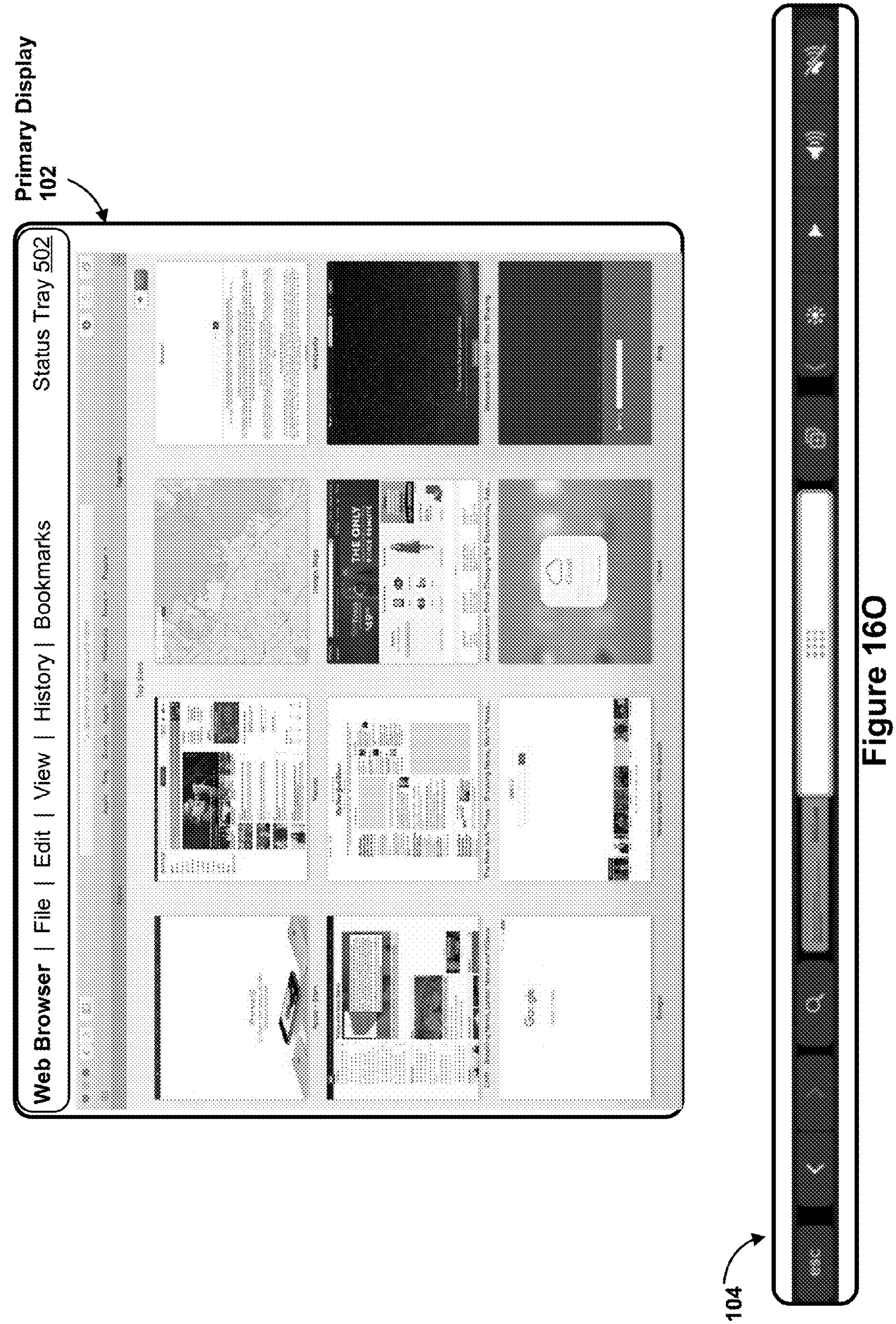

By providing representations of each of the tabs directly within the touch-sensitive secondary display 104, users are able to navigate through tabs very quickly (e.g., instead of having to cycle through tabs using a trackpad or using a complicated sequence of keyboard inputs). In some embodiments, the user is able to provide a single gesture at the touch-sensitive secondary display 104 that allows for quick navigation between each of the tabs shown on the primary display 102. An example of such quick navigation between three different tabs of web content using affordances shown in the touch-sensitive secondary display 104 is shown in FIGS. 16C-16E. Additional details regarding FIGS. 16A-16M are provided below in reference to method 1100 and FIG. 49.

Figure 16P:
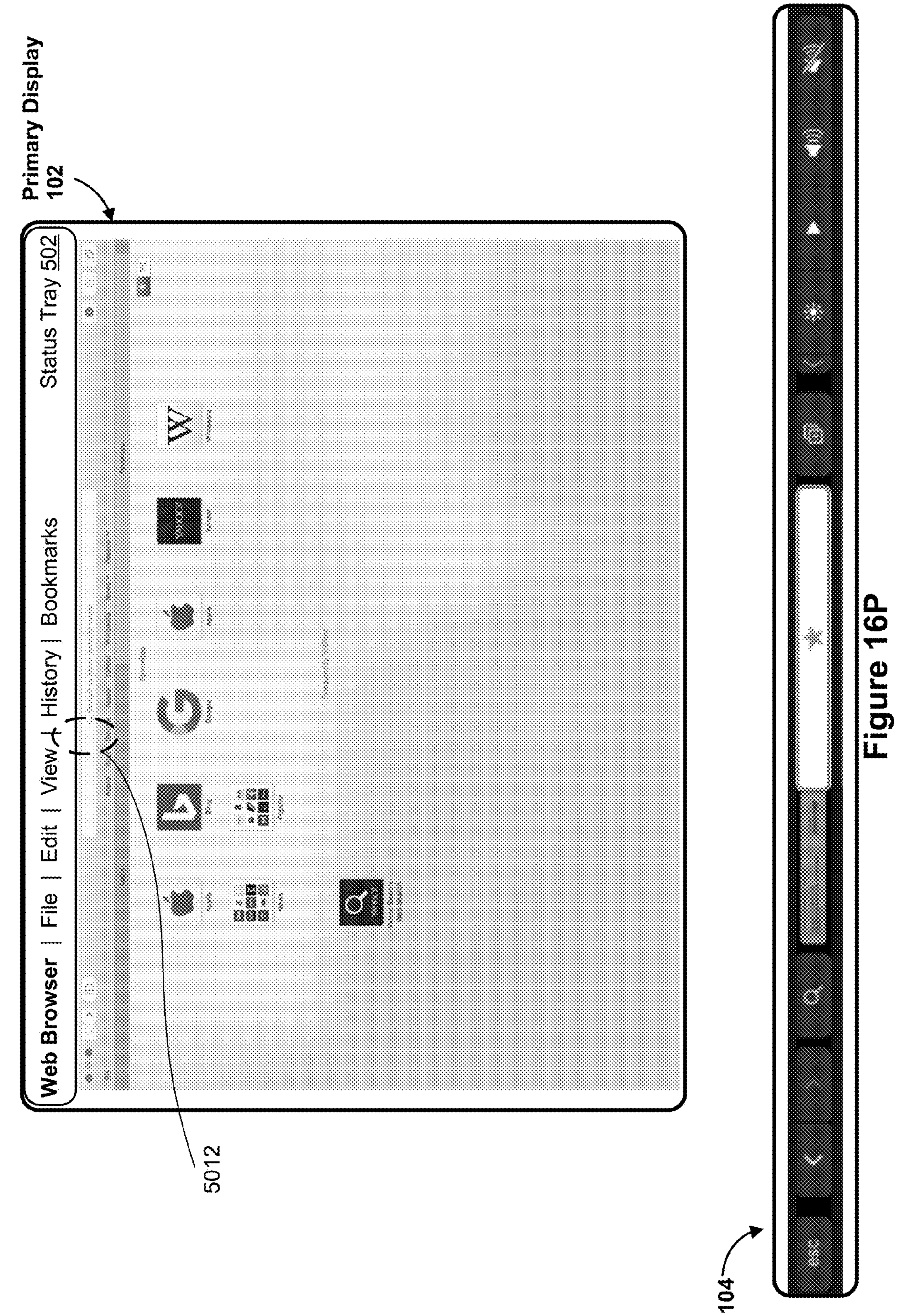

In some embodiments, the representations shown in the touch-sensitive secondary display show a shrunken/mini-view of content associated with a corresponding tab in the web browser on primary display 102 (e.g., as shown in FIG. 12H each of the representations of respective tabs includes a mini-view of web content for a corresponding tab). In some embodiments, appropriate representations are also shown in the touch-sensitive secondary display for a blank tab (FIG. 16N), a top sites tab (FIG. 16O), and a favorites tab (FIG. 16P).

Figure 16Q:
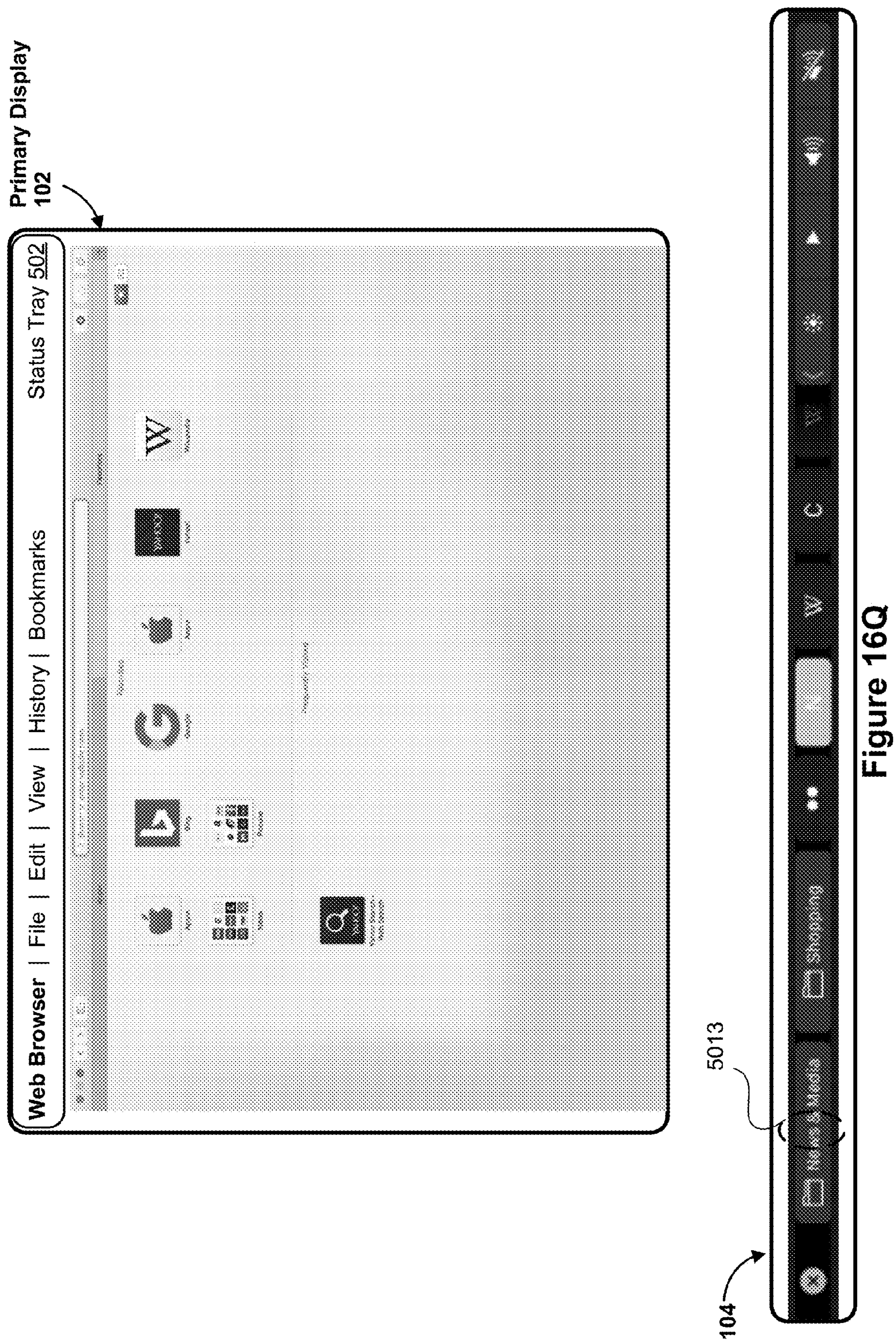
Figure 16R:
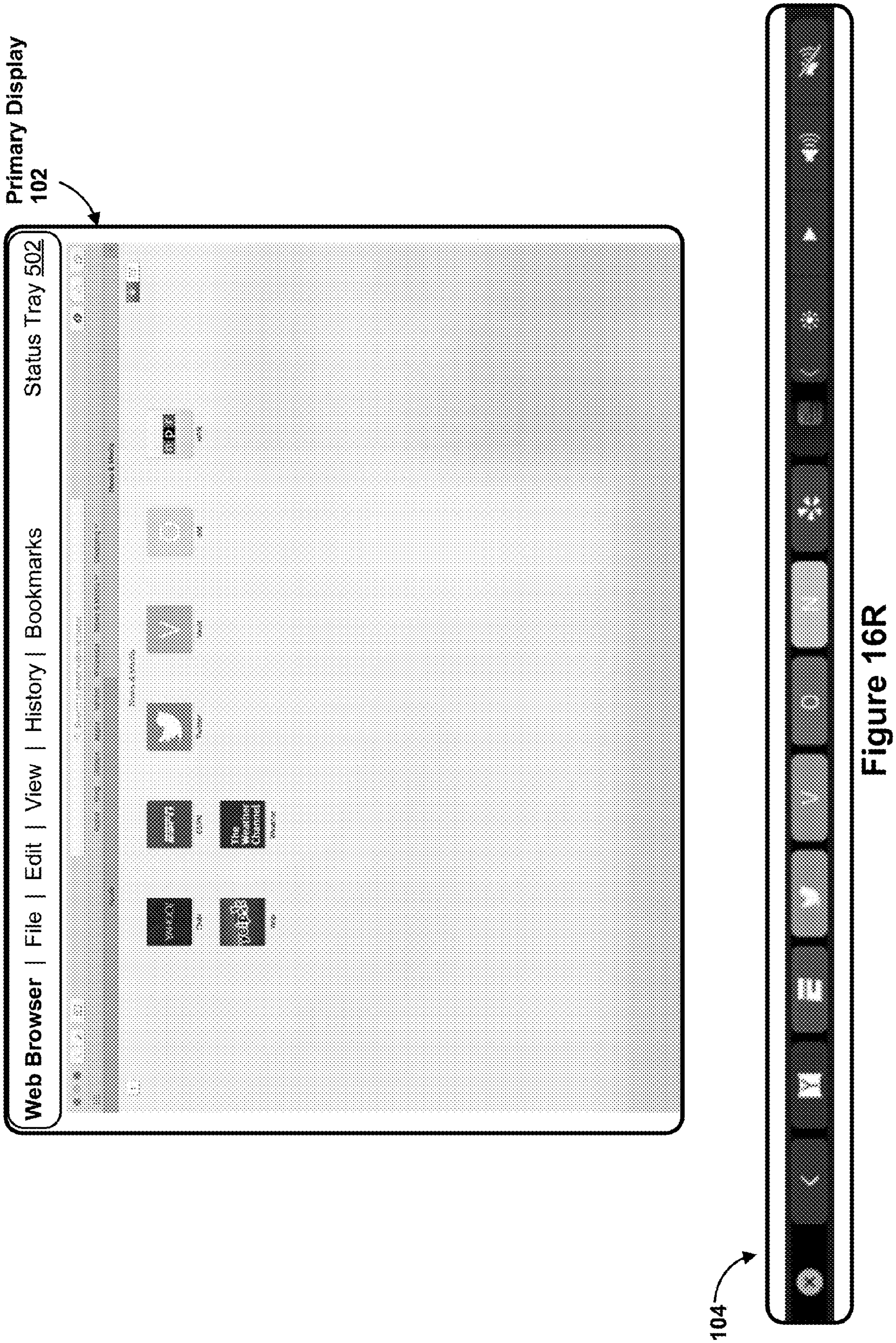

In some embodiments, users are able to navigate through a hierarchy of favorite sites that is displayed on the primary display 102 using affordances that are shown in the touch-sensitive secondary display 104. For example, FIG. 16Q shows the touch-sensitive secondary display 104 with affordances that each correspond to one or more favorite sites. In response to a selection of one of these affordances (e.g., input 5013 selecting a folder "News & Media" of favorites, FIG. 16Q), the primary display 102 is updated as is the touch-sensitive secondary display 104 (e.g., to include representations of favorite sites included in the folder, as shown in FIG. 16R).

Figure 16S:
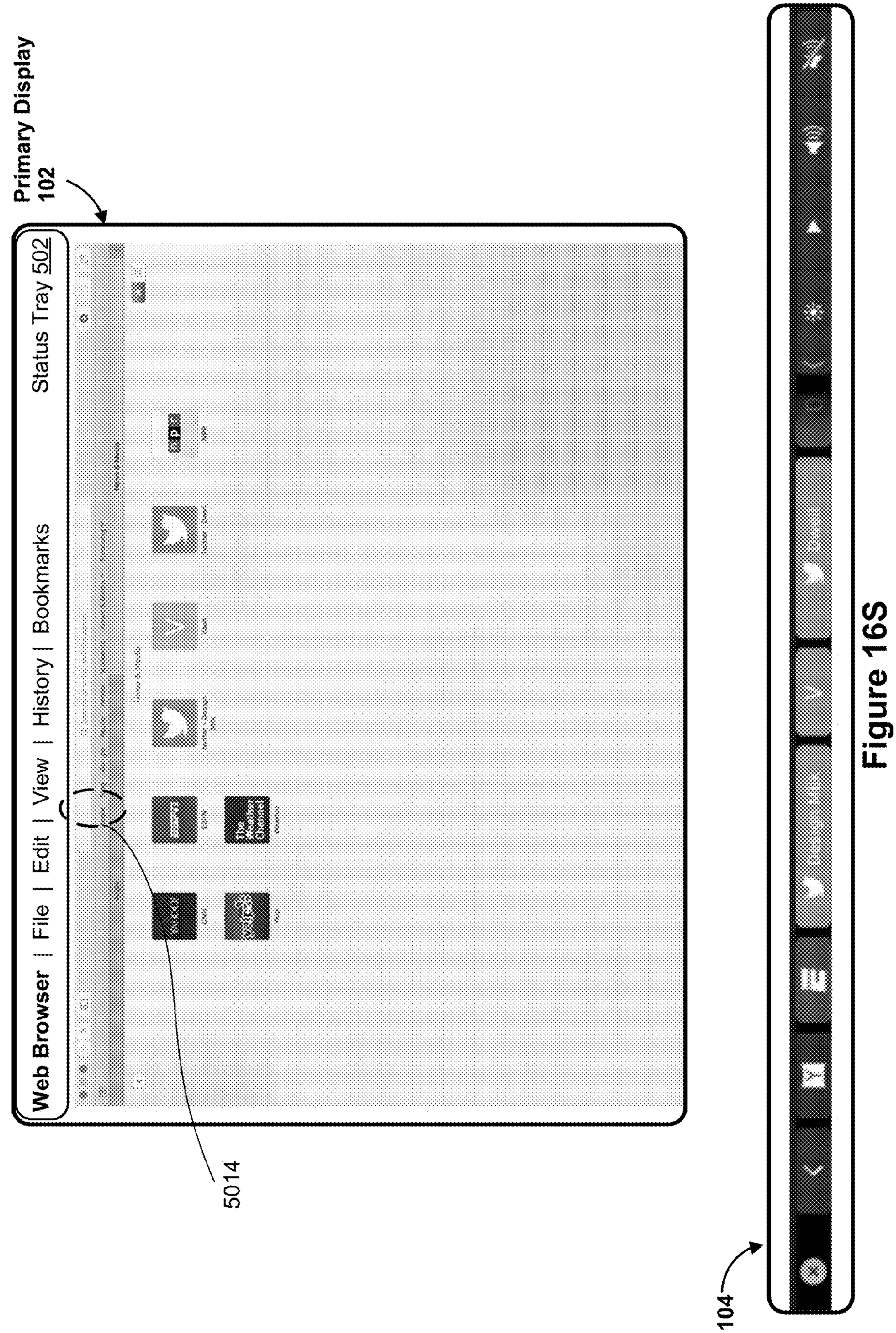
Figure 16T:
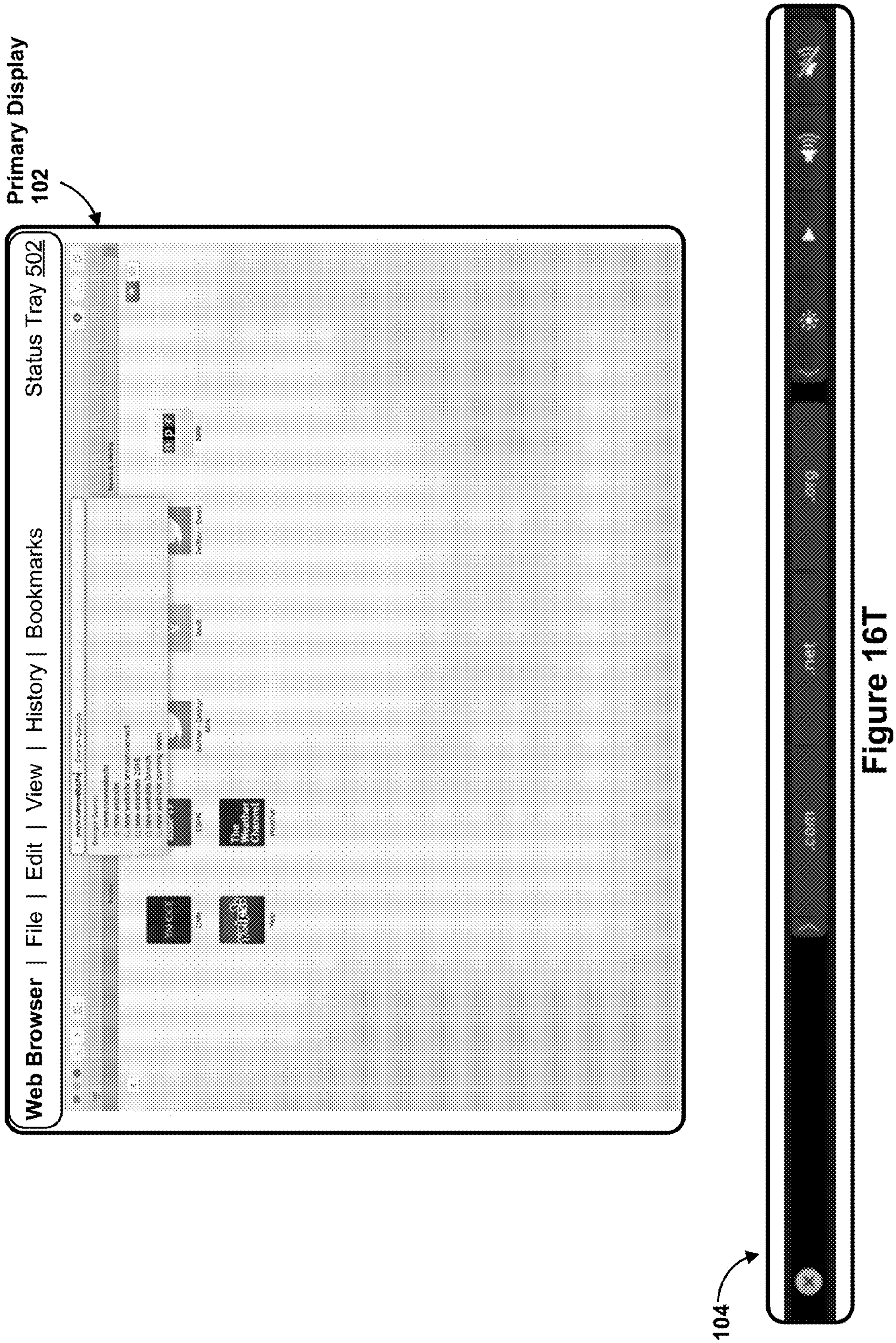

In accordance with a determination that one or more of the favorite sites shown on the primary display 102 are from a same base domain (e.g., URL), the touch-sensitive secondary display includes additional details about the one or more favorite sites. For example, the "Design Milk" and "Dwell" favorites are both from the "twitter.com" domain and, as such, the touch-sensitive secondary display 104 includes additional details (e.g., a TWITTER handle in addition to an icon for TWITTER, as shown in FIG. 16S). FIG. 16S-16T also illustrates that the touch-sensitive secondary display 104 is updated in response to inputs received via the primary display 102. For example, in response to input 5014 selecting the URL bar and to the user typing in some text in the URL bar, the touch-sensitive secondary display 104 is updated to include text completion options (e.g., ".com," ".net," ".org" and the like to help a user while typing a domain name, as shown in FIG. 16T).

Figure 17A:
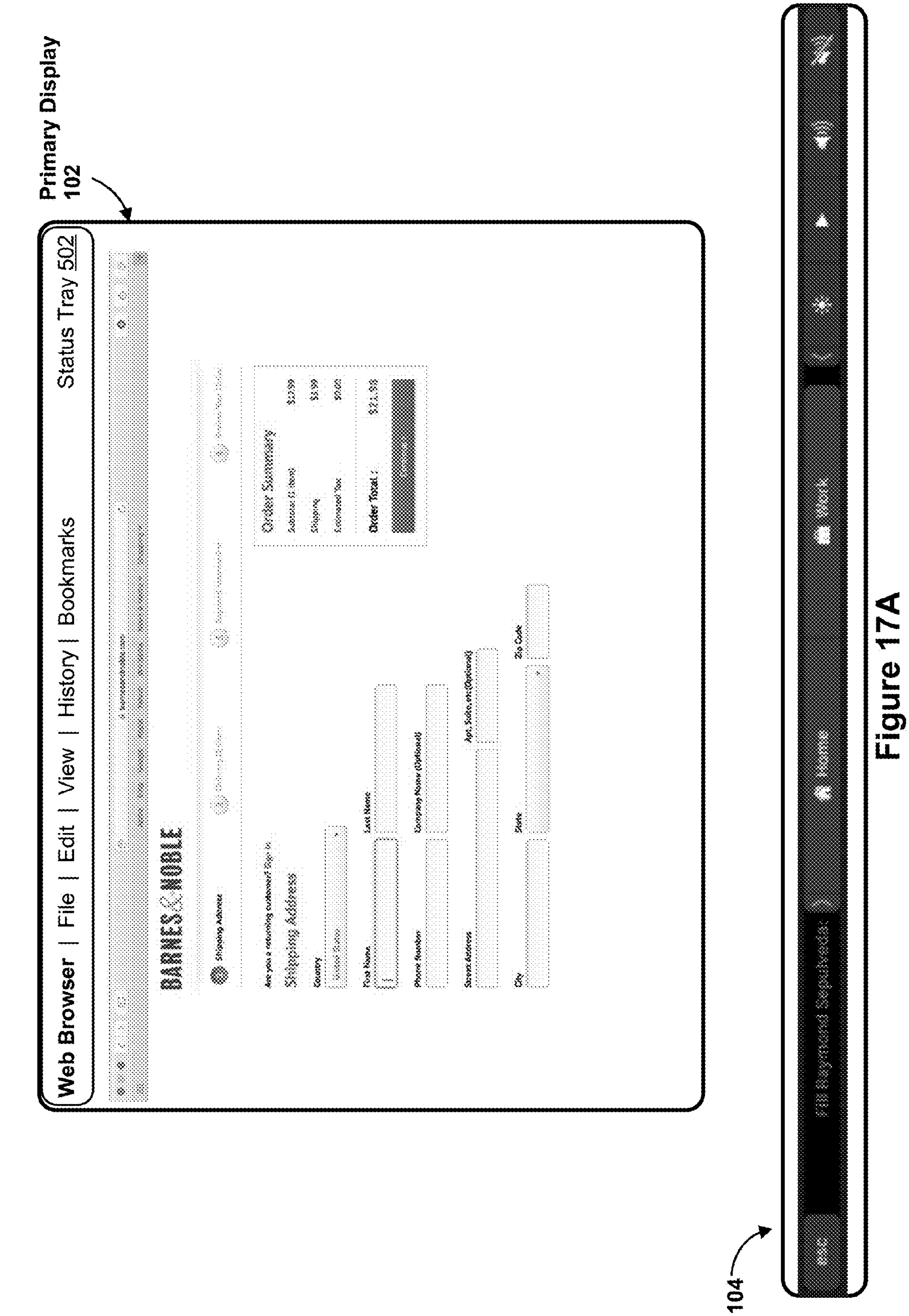
Figure 17B:
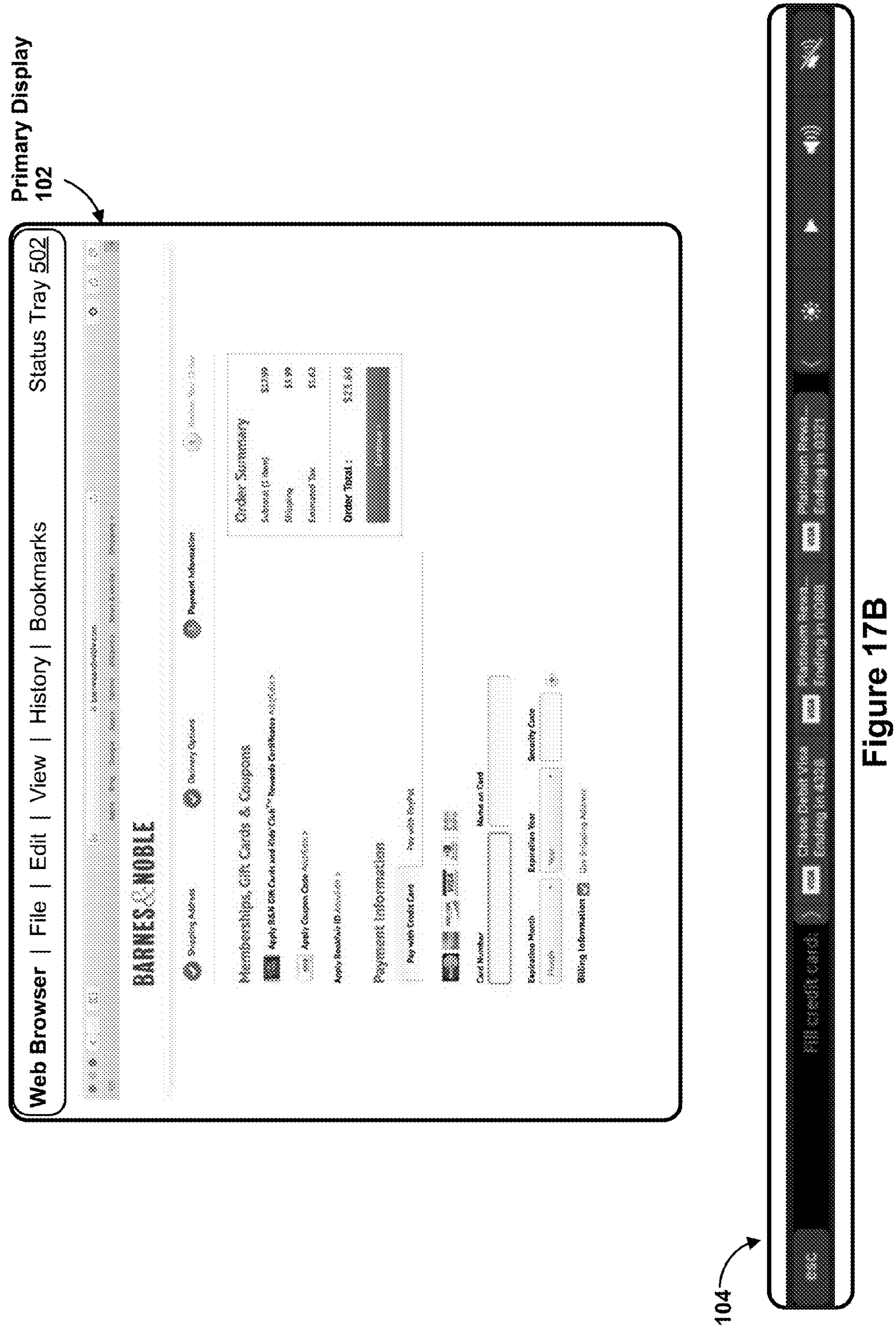

FIGS. 17A-17G provide examples of suggesting content (e.g., content to complete various form elements) and actions (e.g., an action to submit payment) to a user via the touch-sensitive secondary display 104. As shown in FIG. 17A, while the user is interacting with a web page that includes form entry elements on the primary display 102, the touch-sensitive secondary display 104 is updated to include suggest content for use in completing form elements. For example, the user is provided with affordances for auto-completing either "Home" or "Work" address information (FIG. 17A). As another example, after completing initial form elements and navigating to a payment entry page, the touch-sensitive secondary display 104 is updated to include affordances that correspond to stored credit card details (as shown in FIG. 17B) (upon selection of a particular affordance at the touch-sensitive secondary display 104, the primary display 102 is updated to include the stored credit card details corresponding to the particular affordance).

Figure 17C:
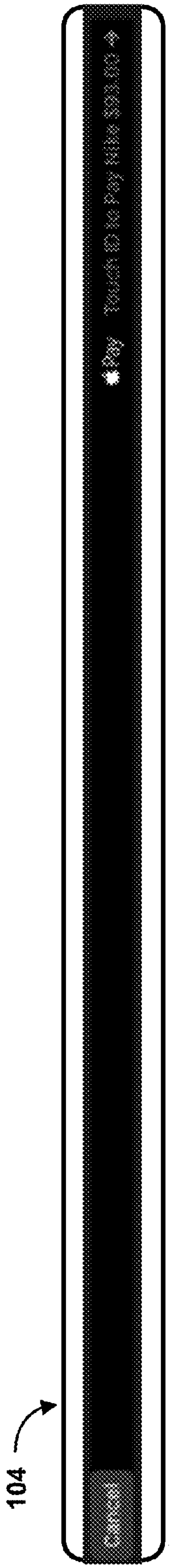
Figure 17D:
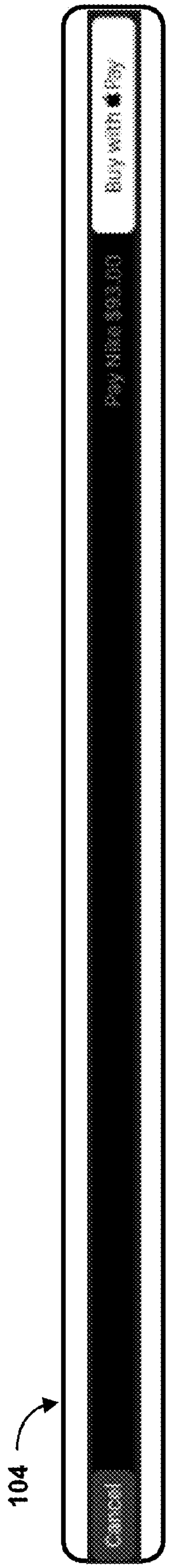
Figure 17E:
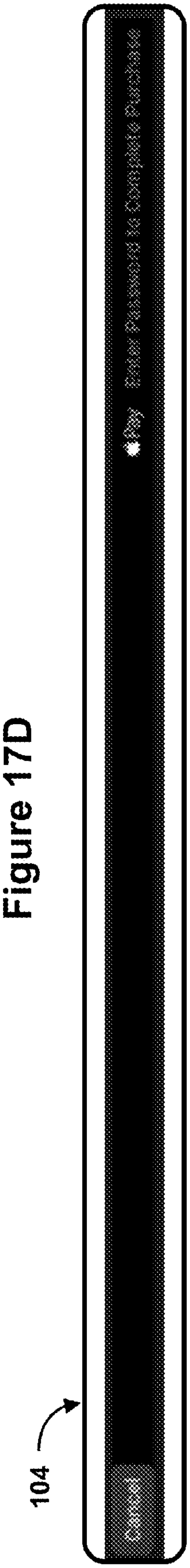
Figure 17F:
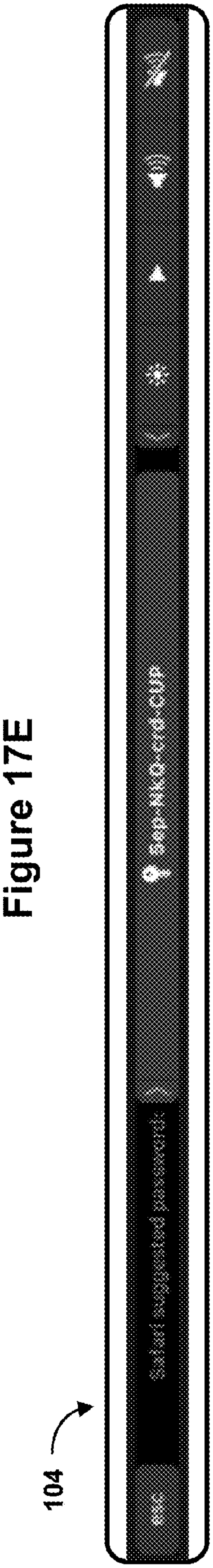
Figure 17G:
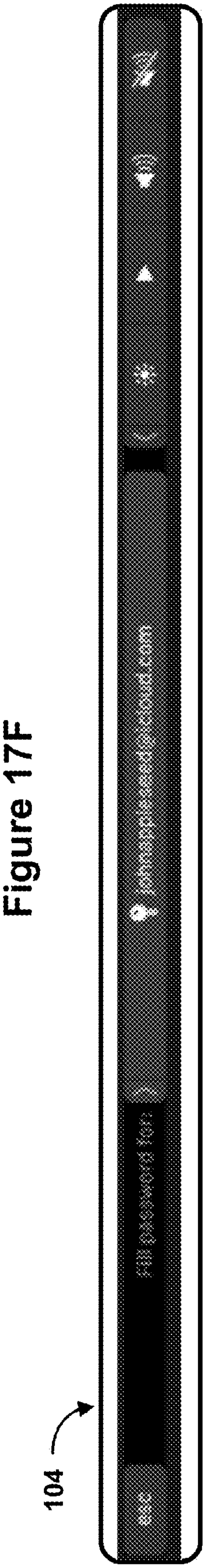

Another non-limiting example is providing an affordance for inputting a suggested or stored password (FIGS. 17F-17G).

In some embodiments, the touch-sensitive secondary display 104 also includes affordances for sending payment after a user provides an authenticated fingerprint (as shown in FIGS. 17C-17E).

Figure 18A:
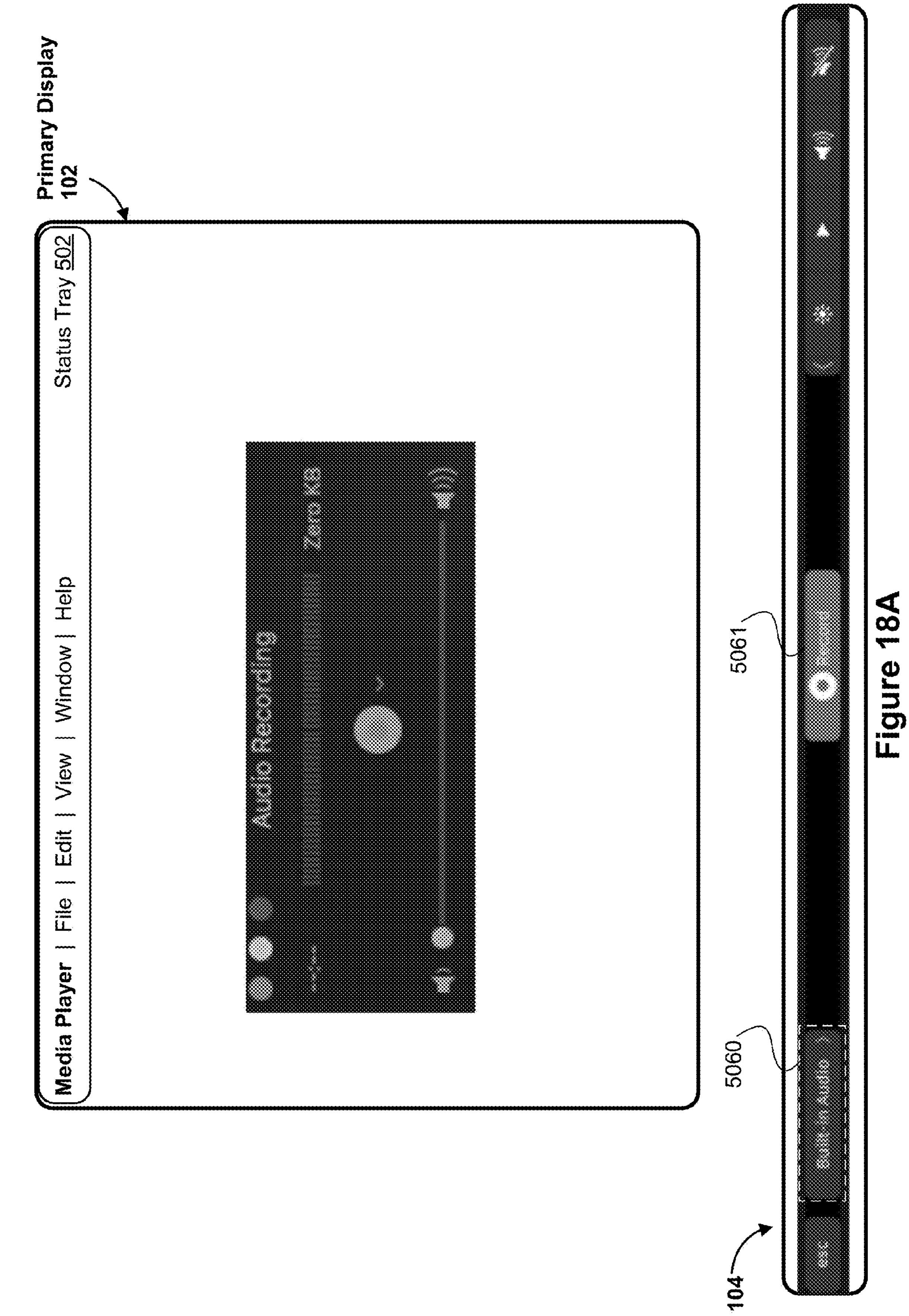

In some embodiments, the touch-sensitive secondary display 104 also displays affordances that correspond to audio recording, video recording, and screen recording functions available via a media player application. Some examples are shown in FIGS. 18A-18I. As shown in FIG. 18A, in response to a user opening an audio recording dialog on the primary display 102, the touch-sensitive secondary display 104 is updated to include an affordance 5061 for starting an audio recording and an optional affordance 5060 for configuring audio options.

Figure 18B:
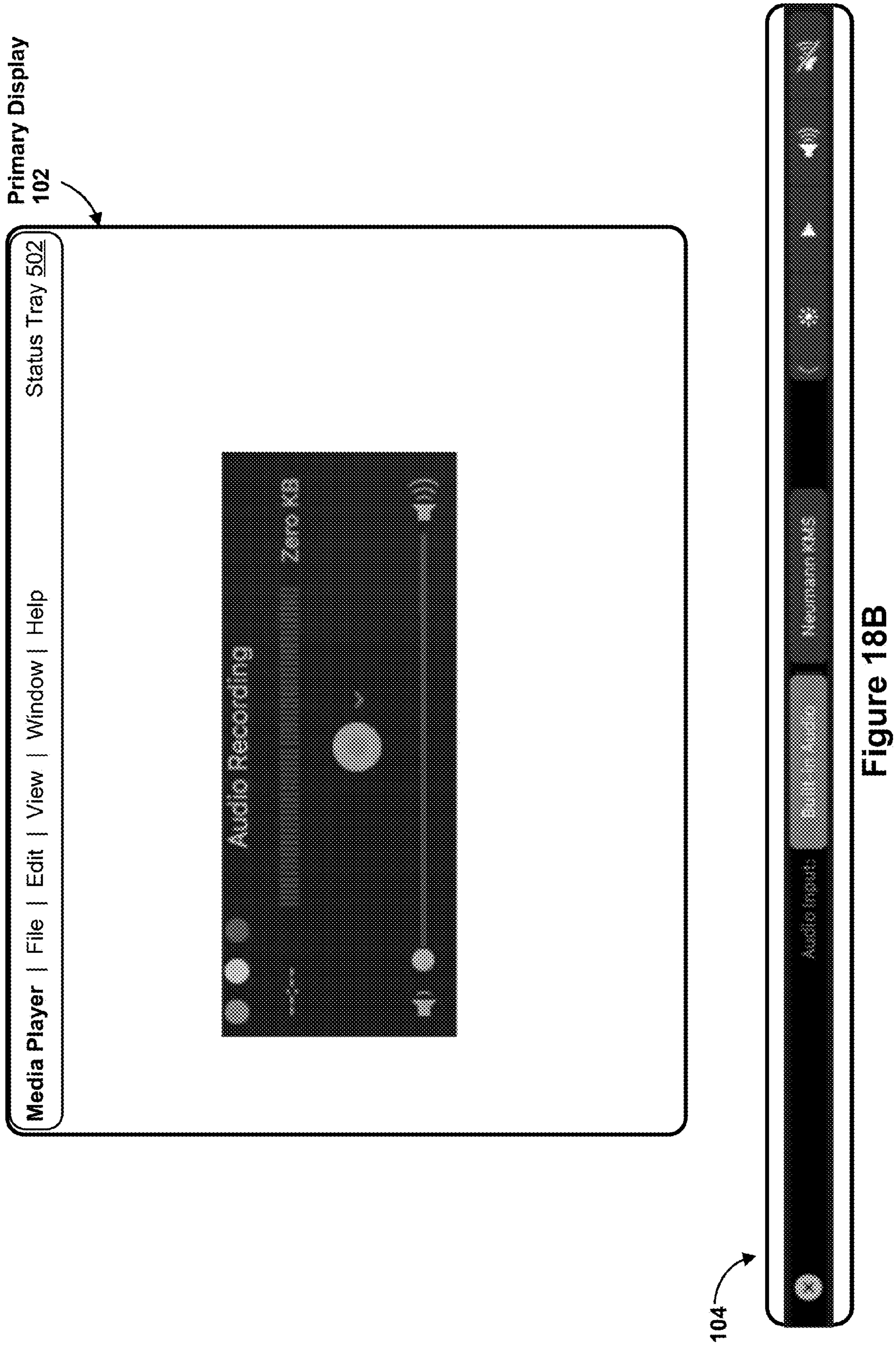

In some embodiments, in response to a selection of the affordance 5060, the touch-sensitive secondary display 104 is updated to include selectable options for each available audio input (e.g., an option for "Built-in Audio" and another option for "Neumann KMS," as shown in FIG. 18B). In some embodiments, the selectable options are displayed in an overlay display mode within the touch-sensitive secondary display 104 and, in response to a selection of the "x" icon shown in the left side of the touch-sensitive secondary display 104, the overlay display mode is exited and the touch-sensitive secondary display 104 again appears as shown in FIG. 18A.

Figure 18C:
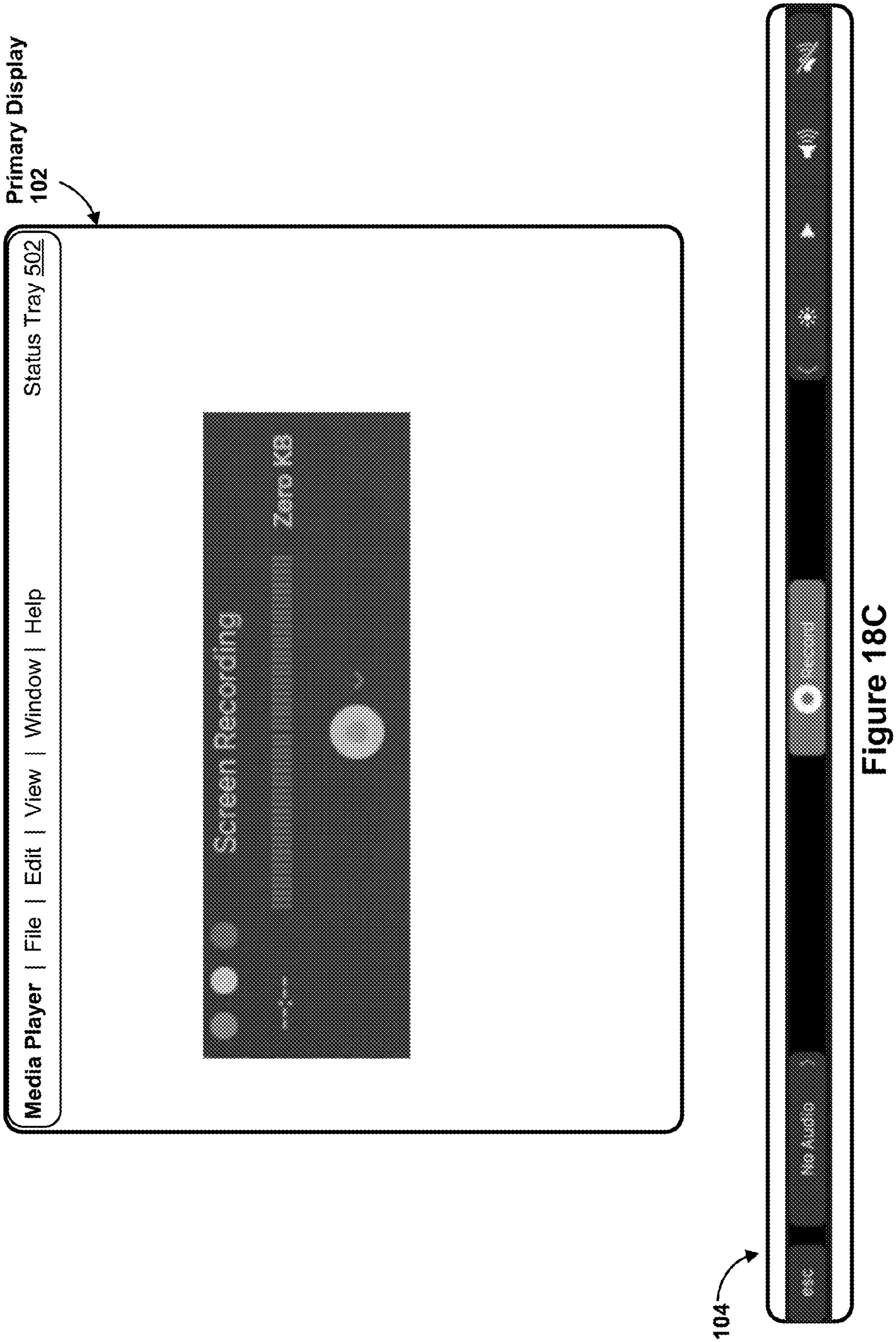
Figure 18D:
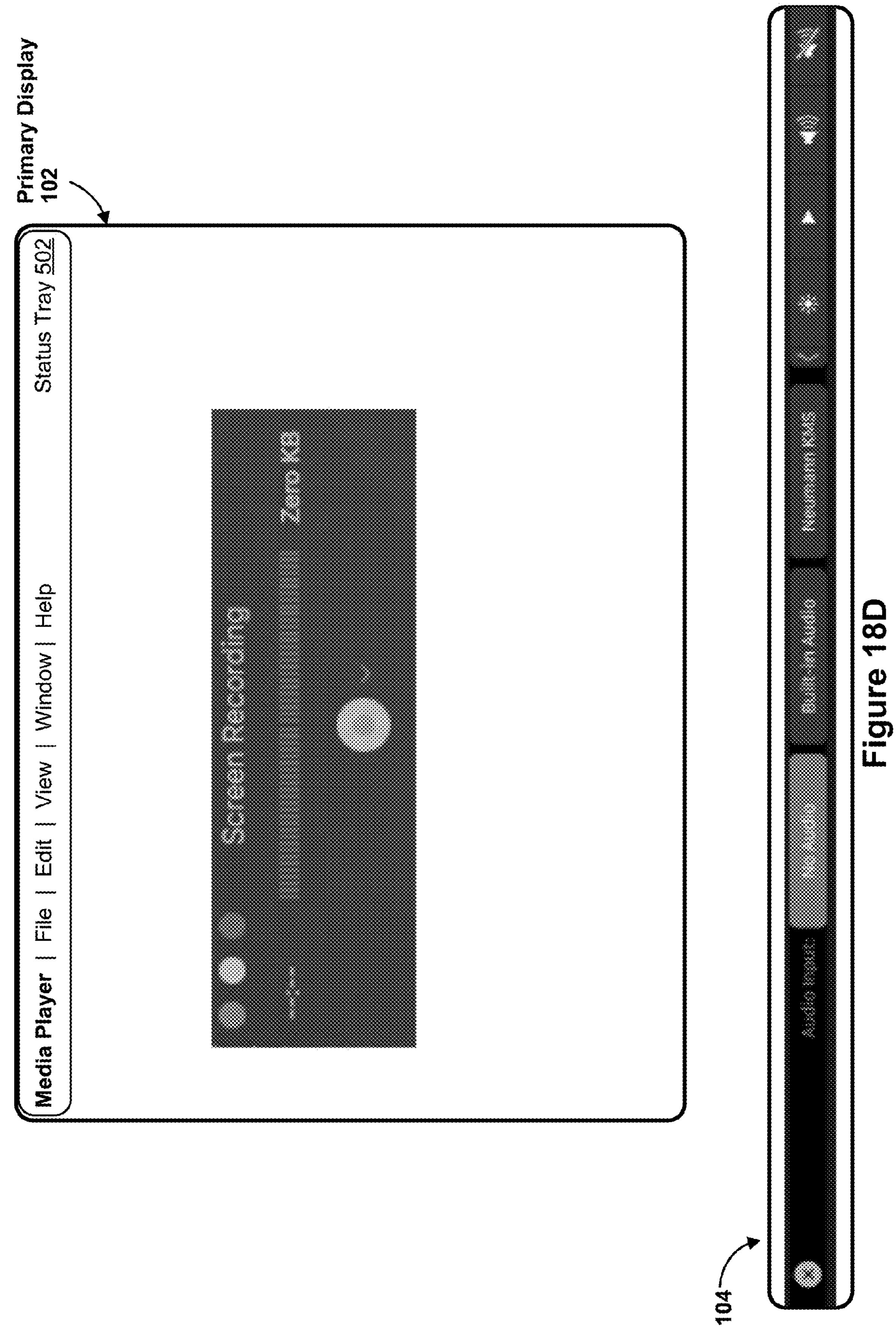
Figure 18E:
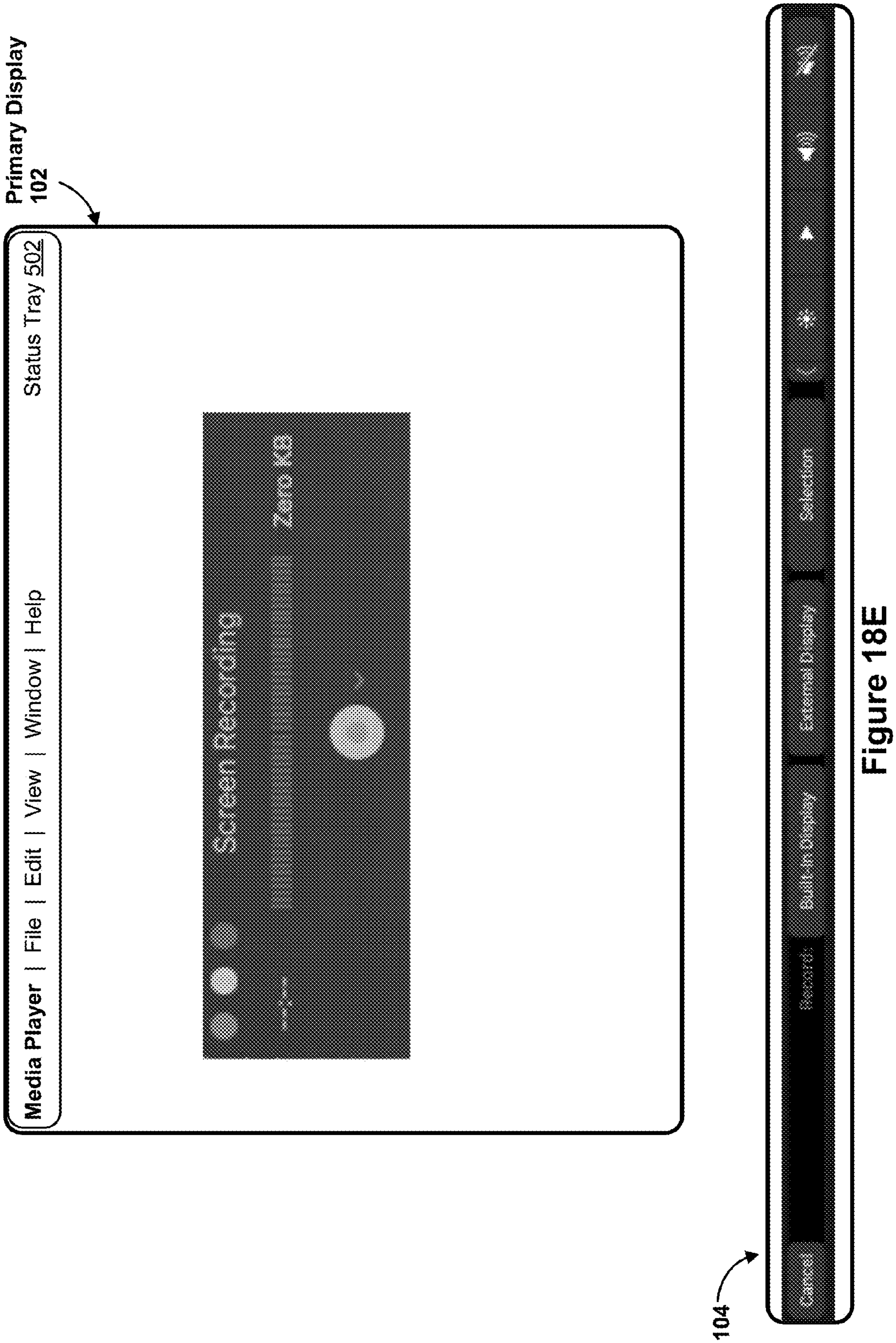

Turning now to FIGS. 18C, in response to a user opening a screen recording dialog on the primary display 102, the touch-sensitive secondary display 104 is updated to include a first affordance for starting a screen recording and an optional second affordance for configuring audio options. In response to detecting a selection of the second affordance, the touch-sensitive secondary display 104 is updated to present audio options. In some embodiments, in response to detecting a selection of the first affordance, the touch-sensitive secondary display 104 is updated to present recording options (including options for selecting the screen to record from, FIG. 18E) and, after the user selects from the recording options, the screen recording is initiated and the primary display 102 is updated to indicate that the screen recording has started. In other embodiments, the screen recording begins directly after selection the first affordance.

Figure 18F:
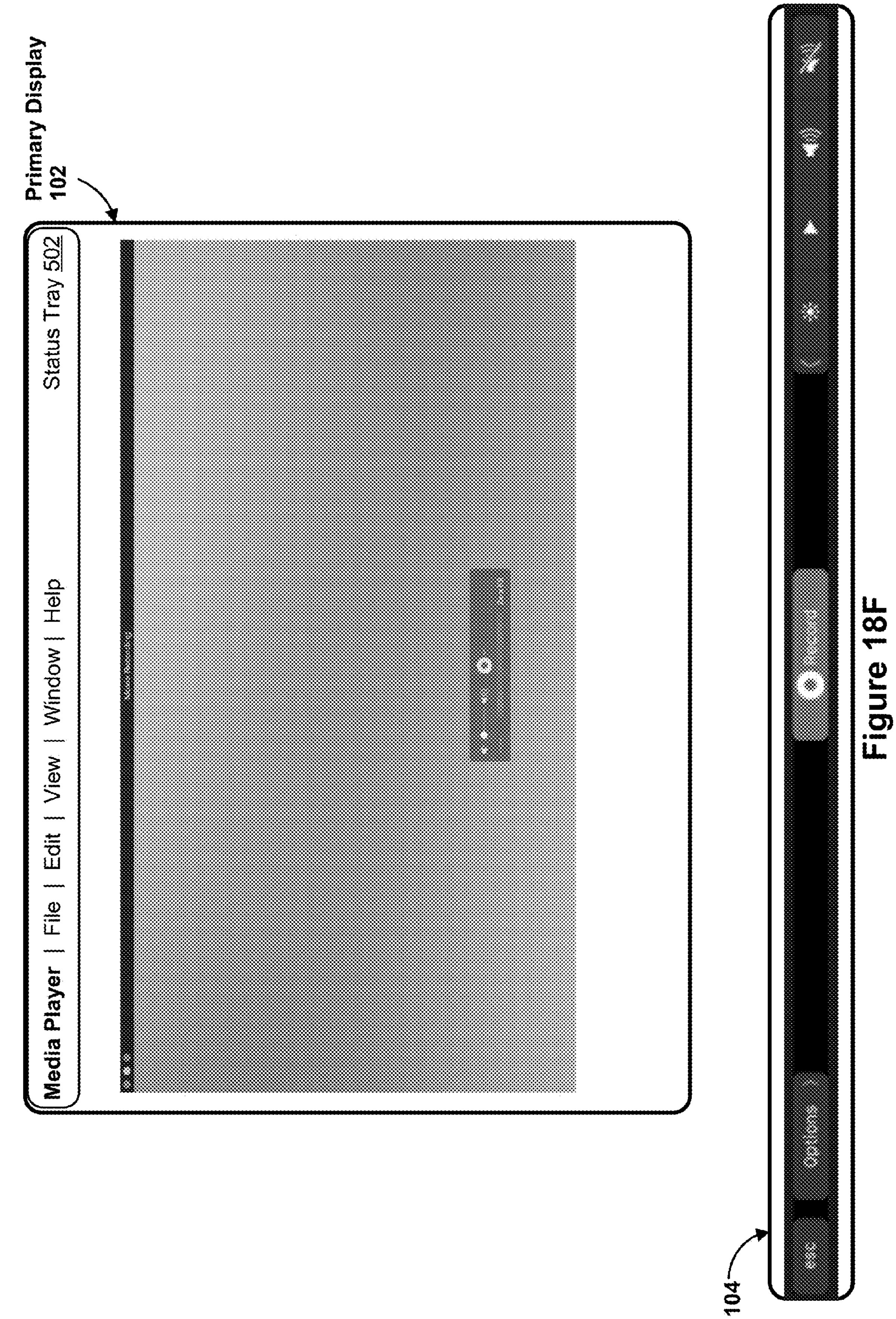
Figure 18G:
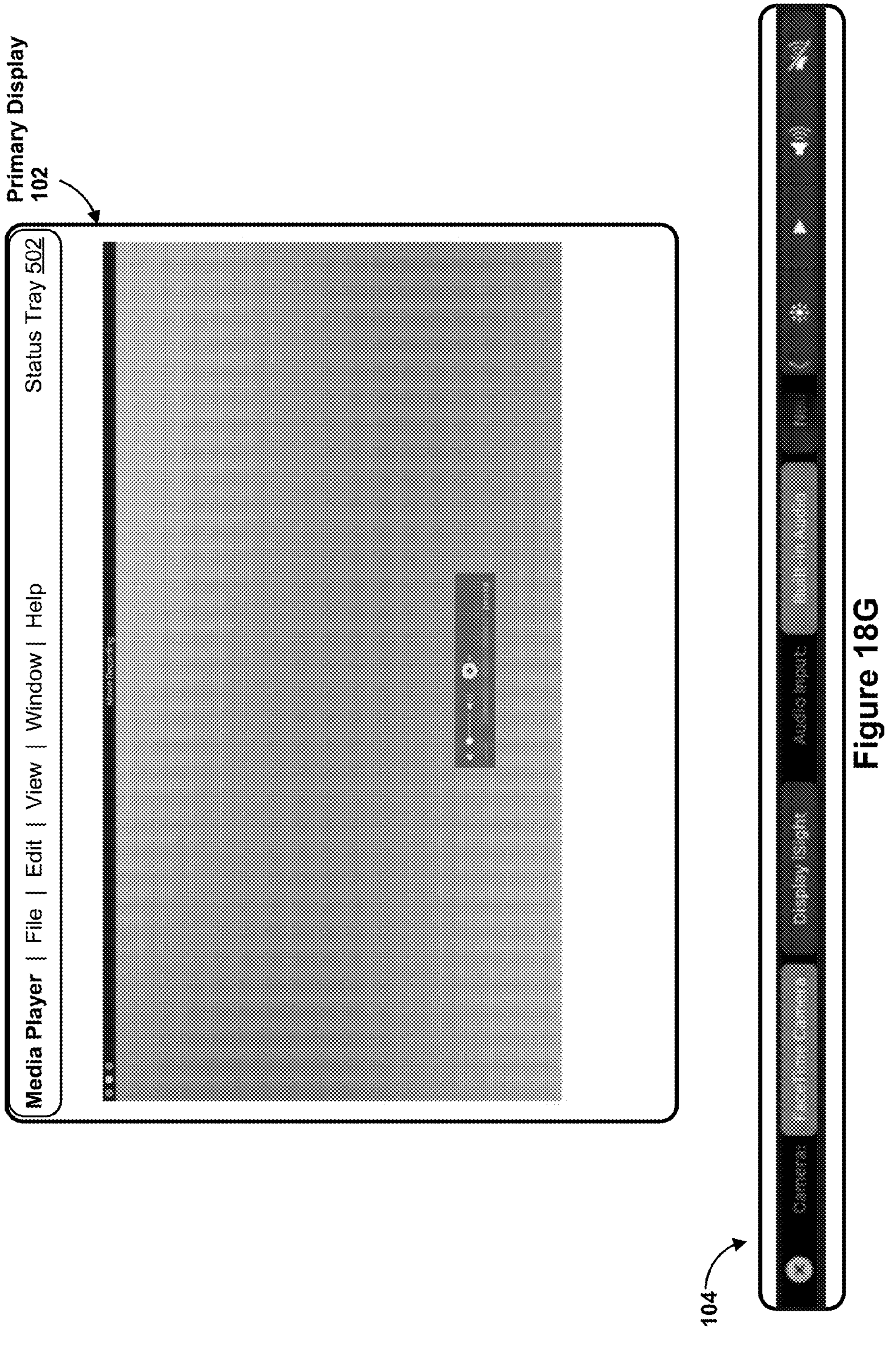

FIGS. 18F-18G show example affordances shown in the touch-sensitive secondary display 104 in response to a user opening a video recording dialog. In some embodiments, a user is able to utilize these affordances to quickly configure recording options (and without having to navigate through complex menu hierarchies to locate these options), such as camera options and audio input options (as shown in FIG. 18G).

Figure 18H:
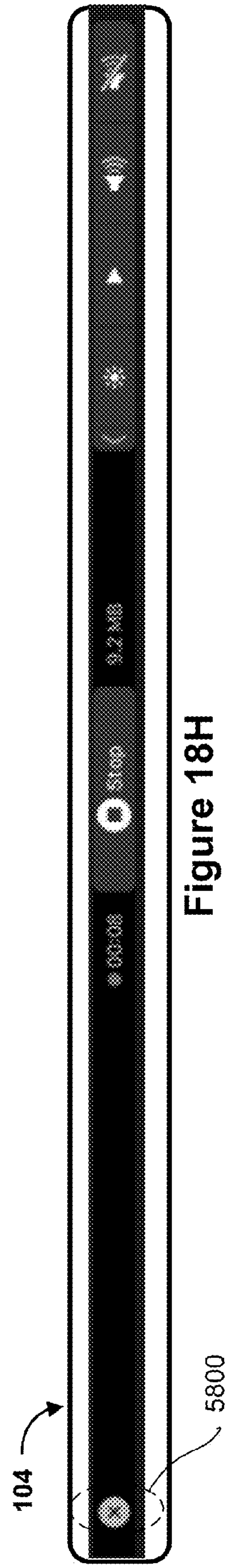
Figure 18I:
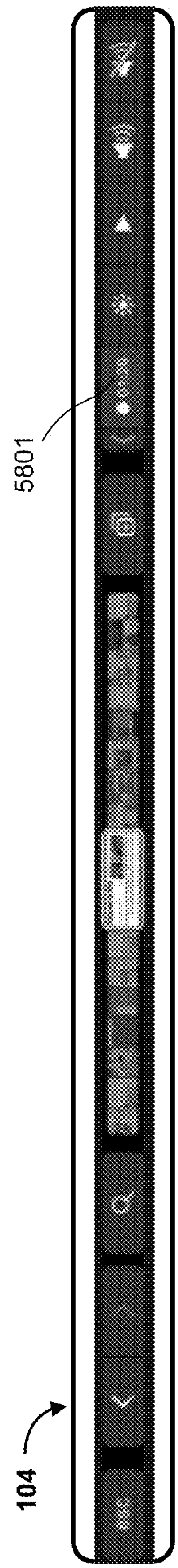

In some embodiments, if a user begins recording audio, video, or screen content and the user exits the media application, then the touch-sensitive secondary display 104 is updated to include status indicators (such as a file size for the ongoing recording) and user interface controls that allow for controlling the ongoing recording (FIG. 18H). In some embodiments, if the user begins a recording, exits the media application by opening a web browser application, and then selects the "x" icon (e.g., input 5800) shown in FIG. 18H, then in response, the touch-sensitive secondary display 104 is updated to include affordances that correspond to the web browser and a recording status indicator 5801 corresponding to the ongoing recording is provided in the touch-sensitive secondary display 104 (e.g., as shown in FIG. 18I).

In some embodiments, controls and/or affordances presented in the touch-sensitive secondary display 104 also help to provide quick and easy access to useful functions while playing a media item. Some examples of useful functions include seeking through the media item, selecting subtitle and audio configuration options, and/or trimming the media item (example user interfaces shown in the touch-sensitive secondary display 104 to perform the useful functions are provided in FIGS. 19A-19K).

Figure 19A:
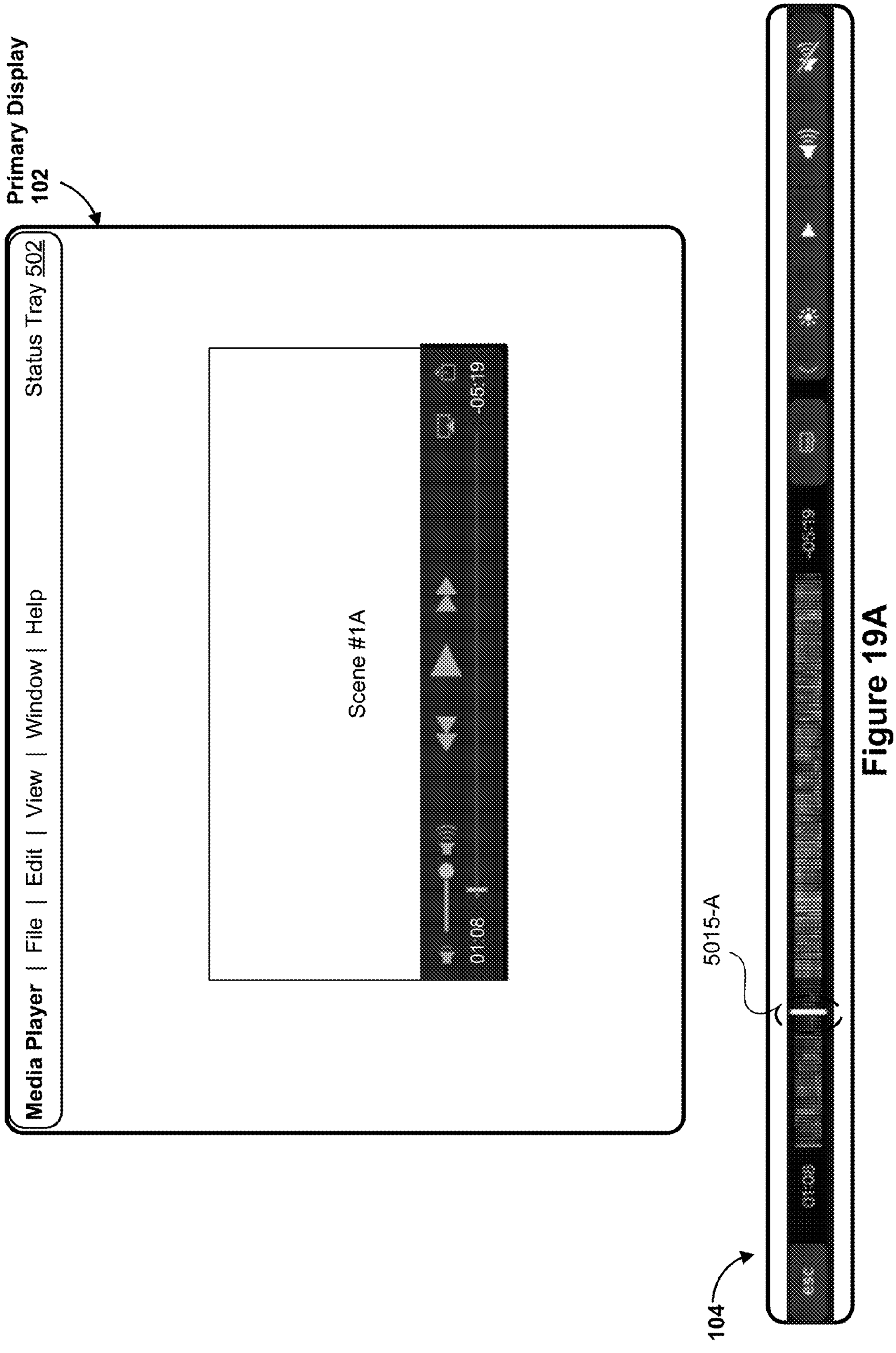
Figure 19B:
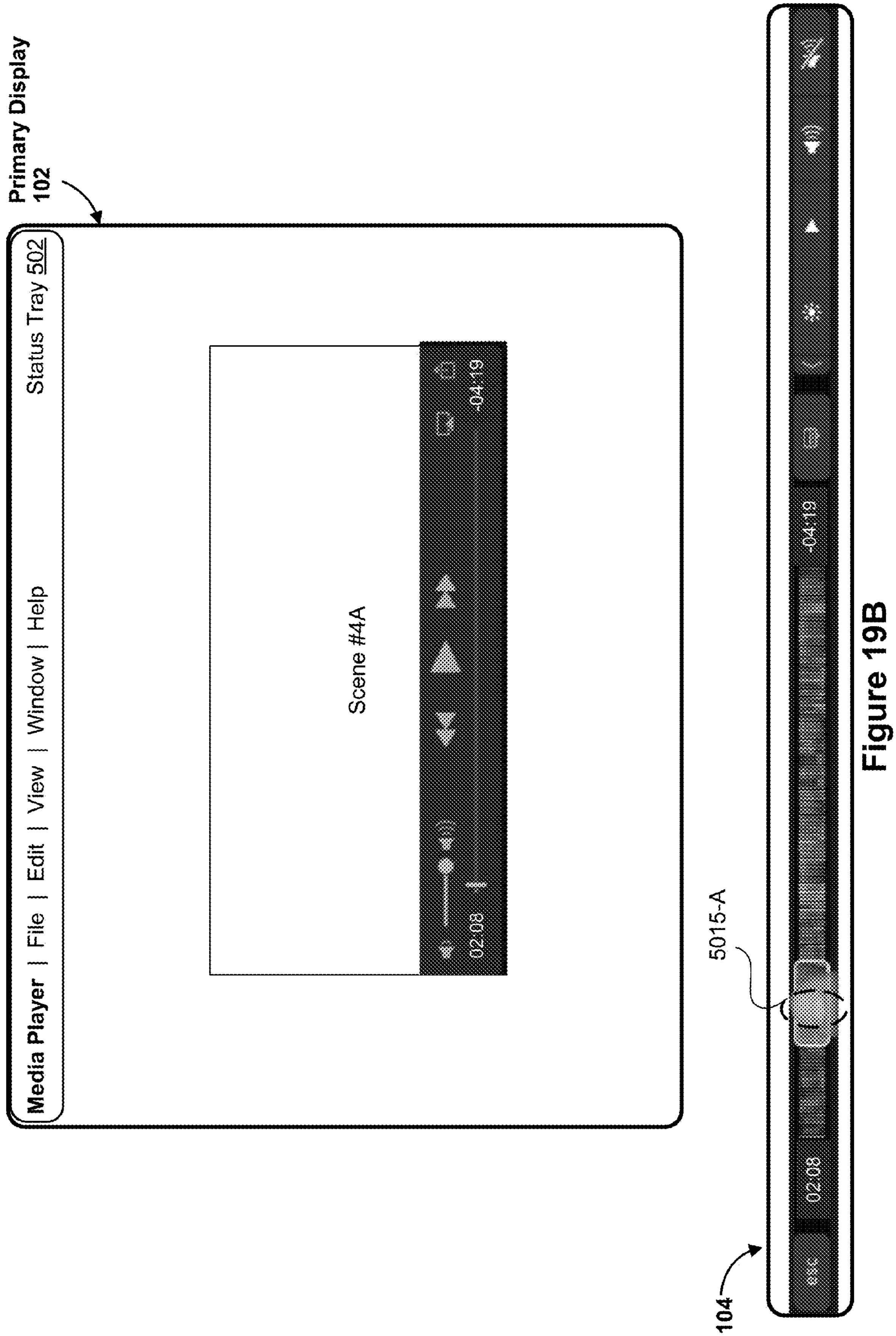

As shown in FIG. 19A, while the primary display 102 is displaying a media item, the touch-sensitive secondary display 104 includes representations of portions of the media item. In some embodiments, users are able to provide an input in order to quick navigate through a media item. For example, in response to input 5015-A and movement of the input 5015-A in a substantially rightward direction across the touch-sensitive secondary display 104, the primary display is updated to seek through the media item (e.g., to go from showing content correspond to Scene #1A, FIG. 19A, to showing content corresponding to Scene #4A, FIG. 19B). The touch-sensitive secondary display 104 also seeks through the representations of the portions of the media item in accordance with the movement of the input 5015-A. As shown in FIG. 19B, in accordance with a determination that the input 5015-A satisfies a time-based or intensity-based threshold, the touch-sensitive secondary display 104 provides a zoomed-in view for one of the representations that is currently contacted by the input 5015-A.

Figure 19C:
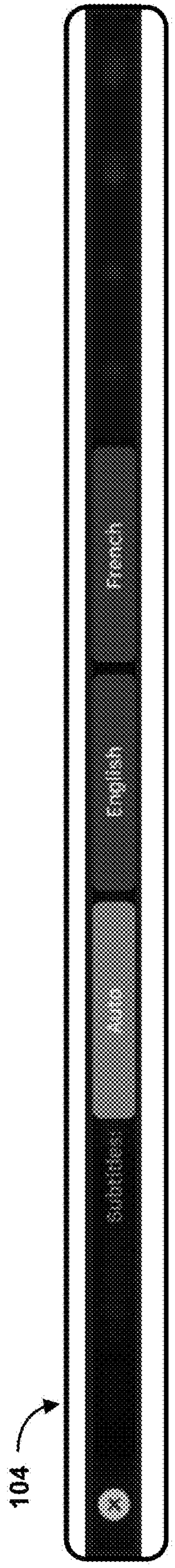
Figure 19D:
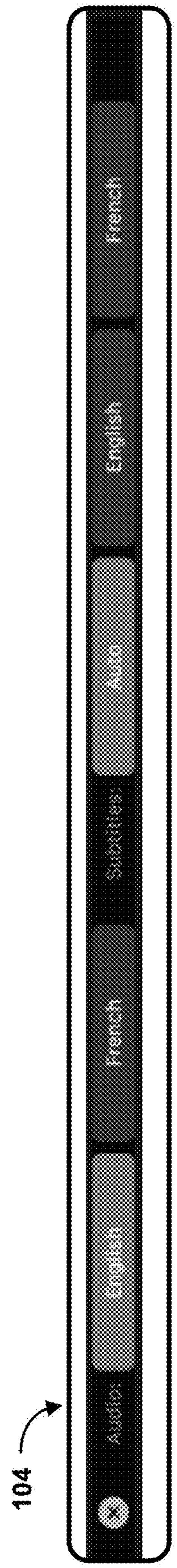
Figure 19E:
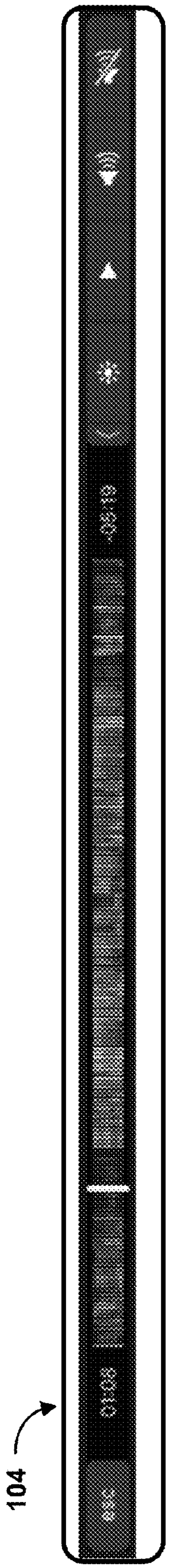

In some embodiments, the representations of portions of the media item correspond to a type of the media item. For example, in accordance with a determination that the media item is of a first type (e.g., stored video content or other video content for which thumbnails are available), the touch-sensitive secondary display 104 includes thumbnail representations of particular frames within the media item. In accordance with a determination that the media item is of a second type (e.g., streaming video content for which thumbnail previews are not available), the touch-sensitive secondary display 104 does not include thumbnail representations (as shown in FIG. 16R). In accordance with a determination that the media item is of a third type (e.g., live video content), the touch-sensitive secondary display 104 does not include thumbnail representations (as shown in FIG. 19H). In accordance with a determination that the media item is of a fourth type (e.g., audio-only content), the touch-sensitive secondary display 104 includes an audio graph representing the media item (e.g., as shown in FIG. 19I).

Figure 19F:
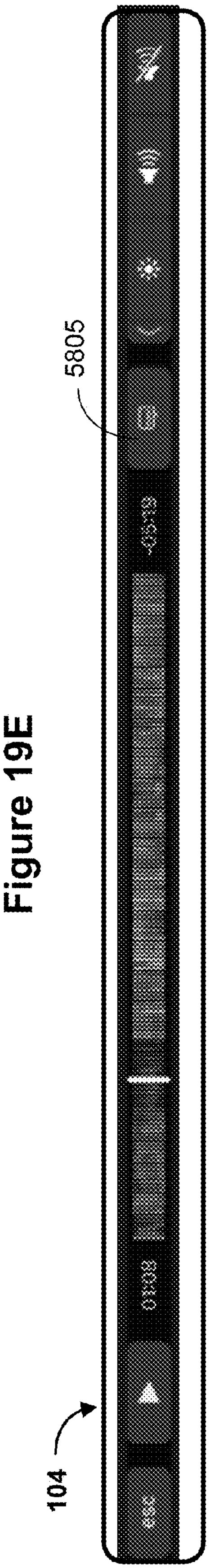
Figure 19G:
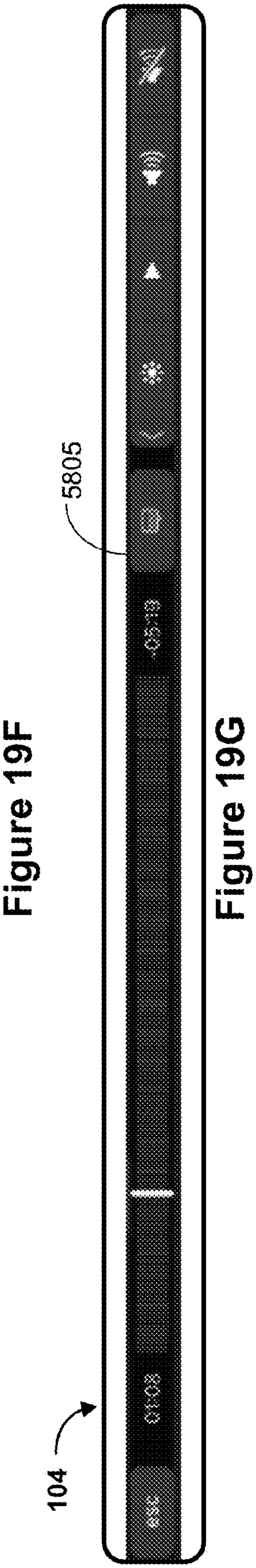
Figure 19H:
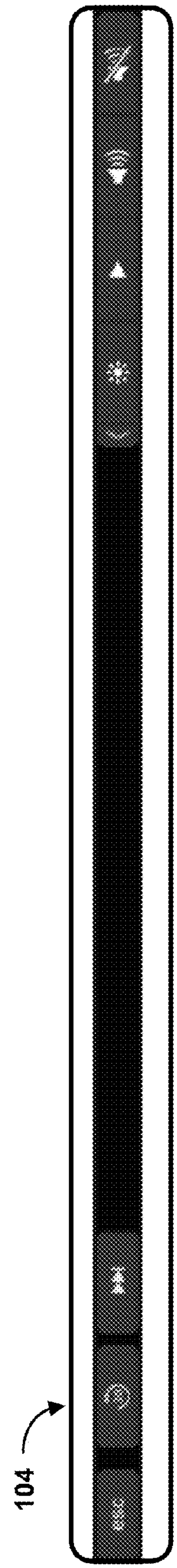
Figure 19I:
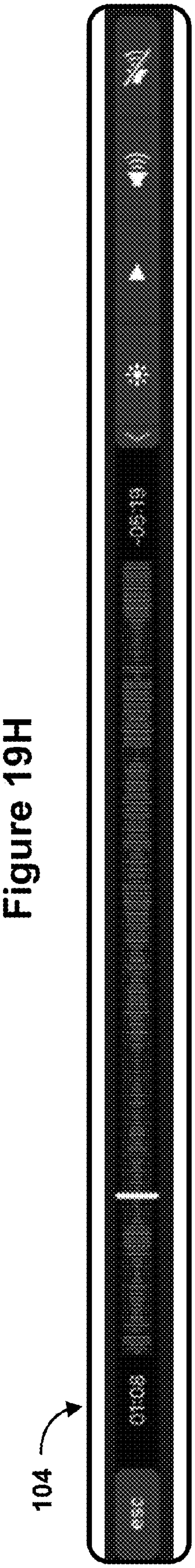

In some embodiments, in accordance with a determination that subtitles are available (e.g., via a media content provider or other associated entity), the touch-sensitive secondary display 104 includes an audio-configuration affordance 5805 (as shown for FIGS. 19F and 19G). In response to detecting a selection of the audio-configuration affordance 5805, the touch-sensitive secondary display is updated to display available subtitle and audio configuration options for the media item (e.g., examples are shown in FIGS. 19C and 19D).

Figure 19J:
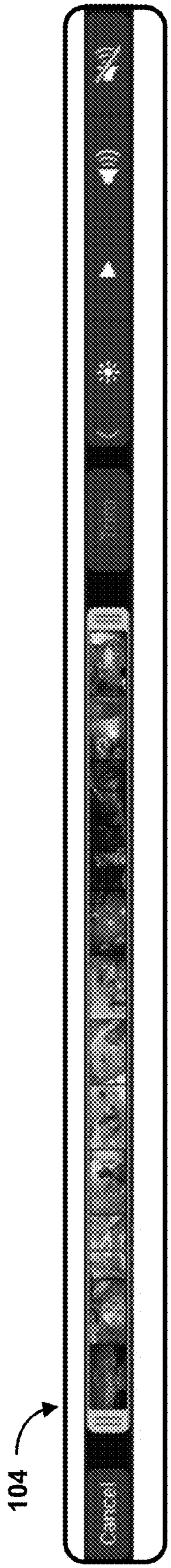
Figure 19K:
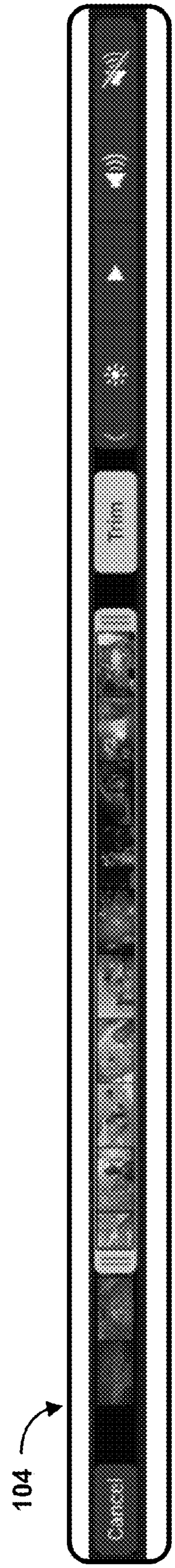

In some embodiments, the media item discussed above is also editable and the touch-sensitive secondary display 104 includes user interface controls that allow for modifying the media item (e.g., to trim the media item, as shown in FIGS. 19J-19K).

Turning now to FIGS. 20A-20G, example user interfaces are presented in which the touch-sensitive secondary display 104 is used to help facilitate faster data entry and, in particular, faster creation of reminders (or other object types for other types of applications). In some embodiments, in response to a user opening up a reminders application, the touch-sensitive secondary display 104 is populated to include a new object affordance that, when selected (e.g., using input 5016, FIG. 20A), causes creation of a new reminder (or some other new content item for other types of applications).

Figure 20A:
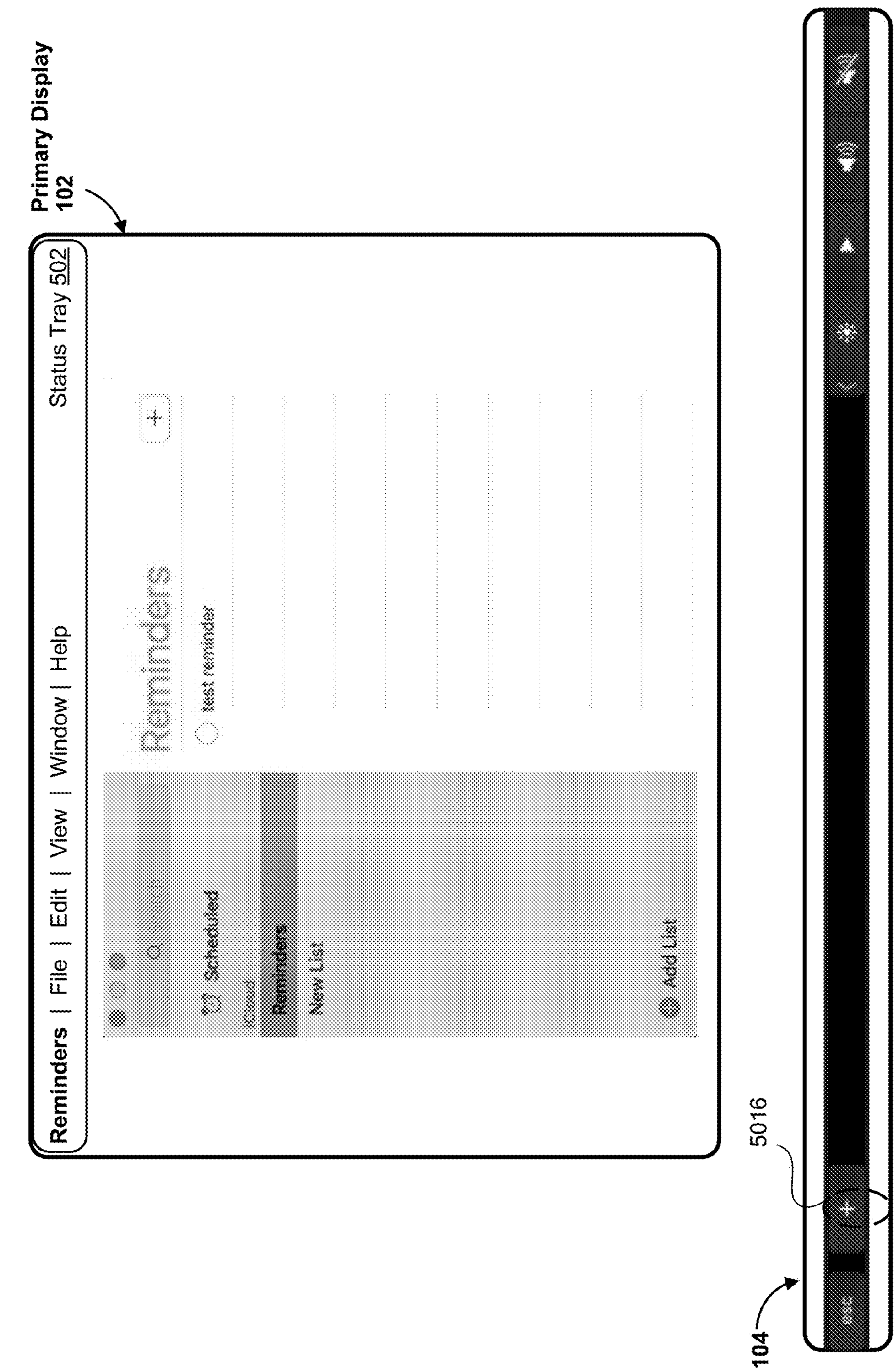
Figure 20B:
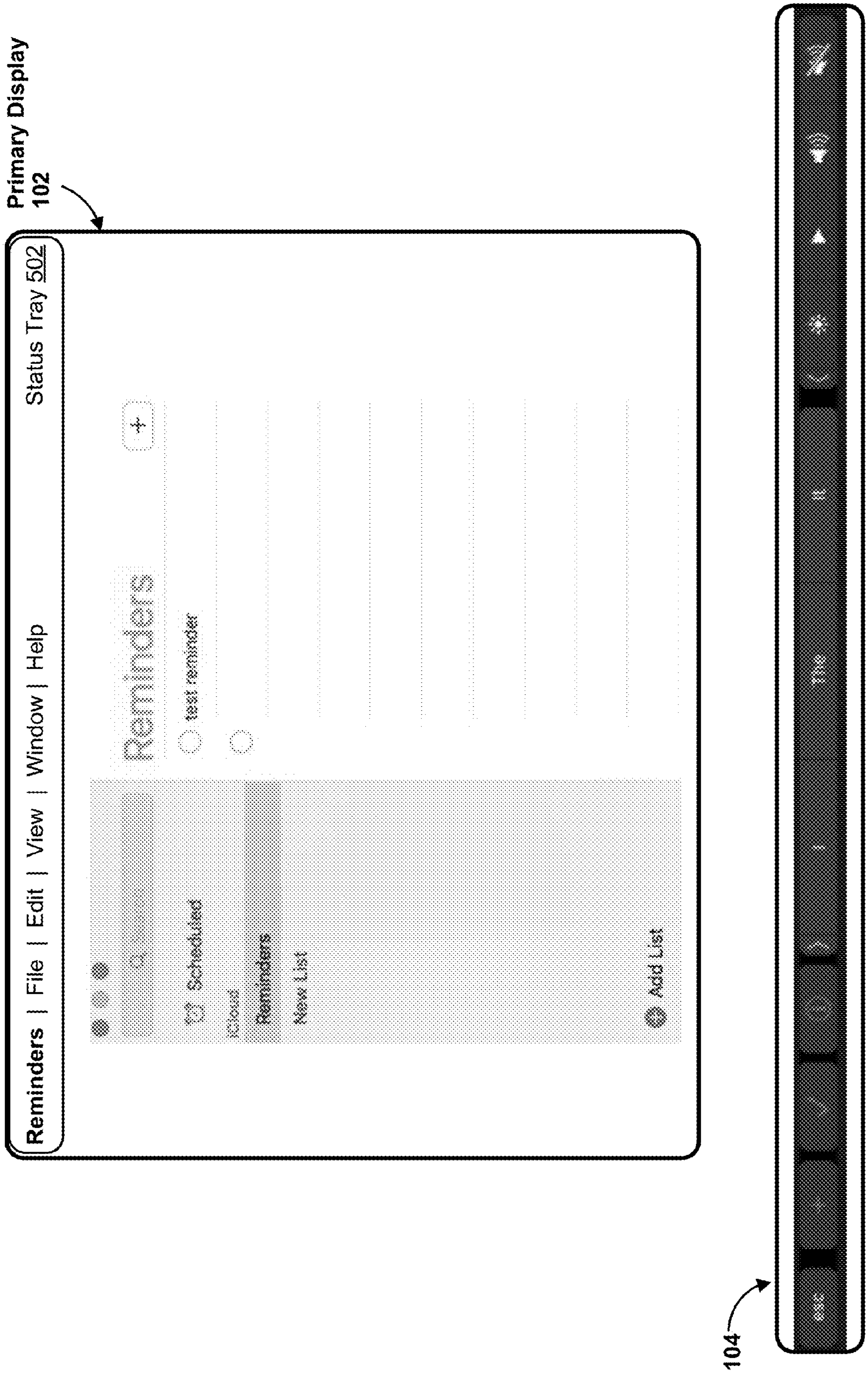
Figure 20C:
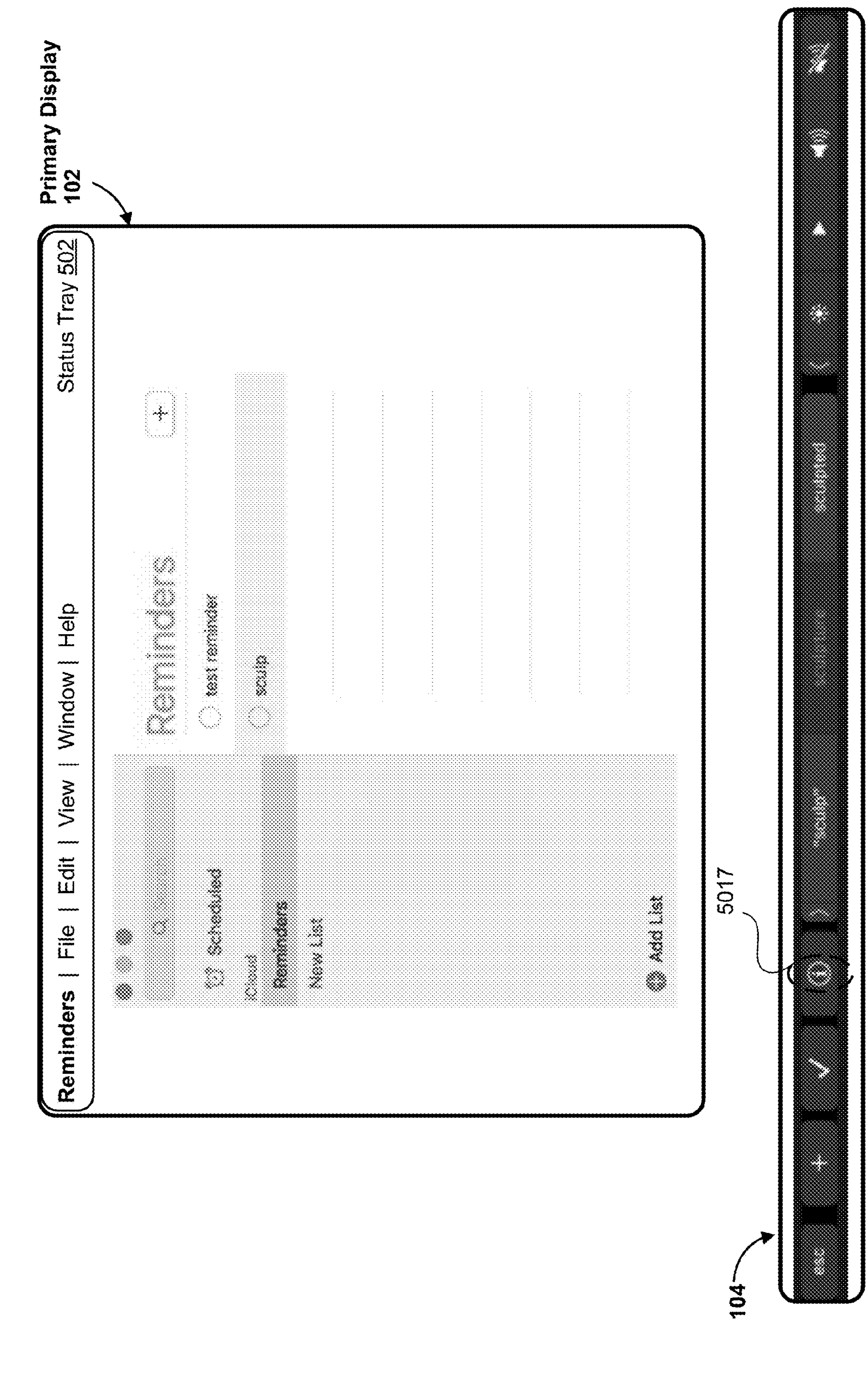
Figure 20D:
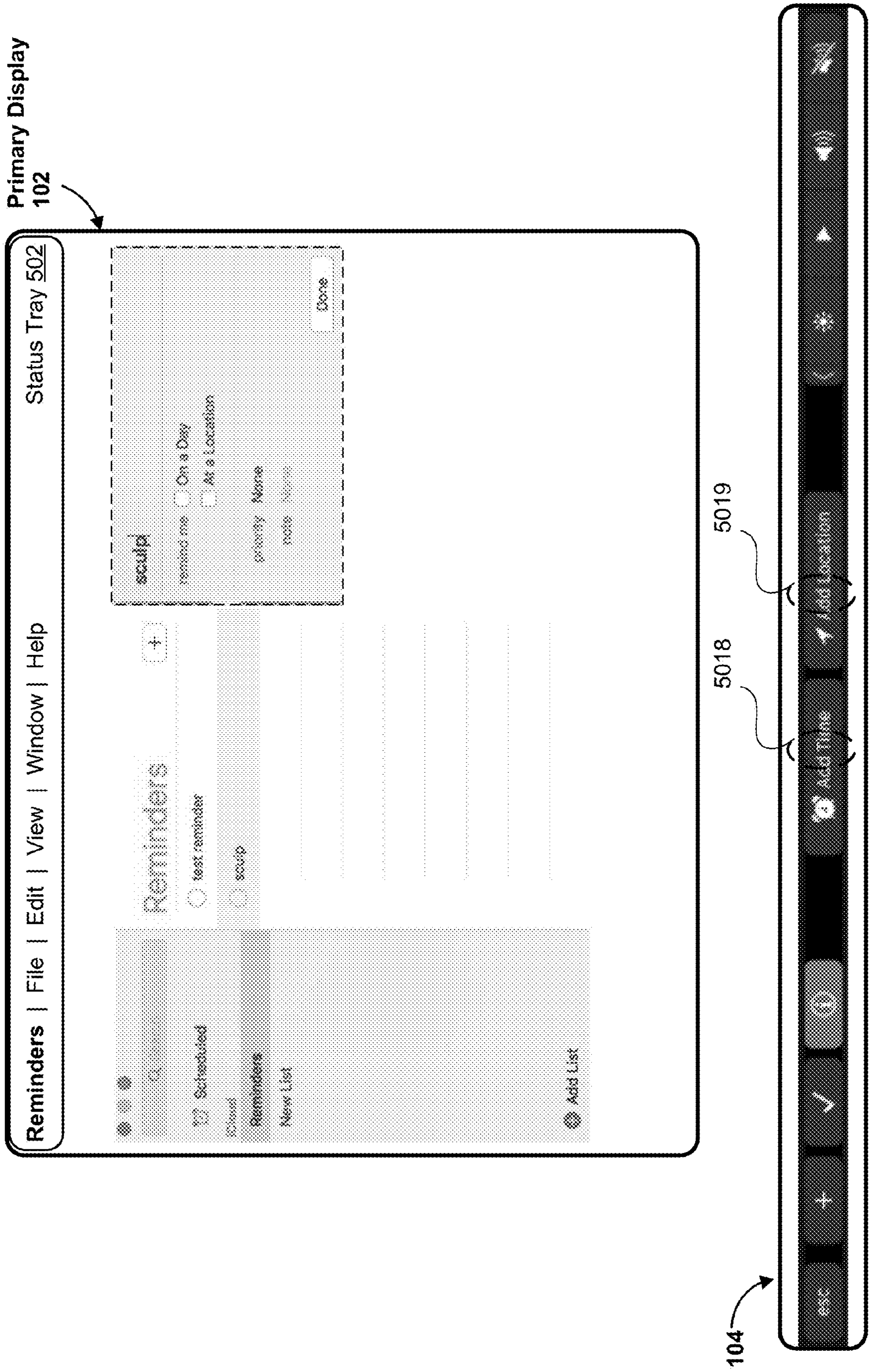

In response to detecting the input 5016, the touch-sensitive secondary display 104 displays the new object affordance in an inactive state (i.e., the new object affordance is greyed out and is not selectable), displays a reminder completion affordance (e.g., a checkmark icon that, when selected, causes a computing device in communication with the touch-sensitive secondary display 104 to mark a currently selected reminder on the primary display 102 as complete), a reminder details affordance (e.g., an i included within a circle that, when selected, causes the computing device to display options for editing details associated with the currently selected reminder), and text-entry options for adding text to the currently selected reminder. In some embodiments, the reminder completion affordance and the reminder details affordance are initially shown in the inactive state until the user provides a title for the currently selected reminder. As shown in FIG. 20C, in accordance with a determination that the user has provided the title, the touch-sensitive secondary display 104 displays the new object affordance, the reminder completion affordance, and the reminder details affordance in active, selectable states. FIG. 20C also illustrates that the text-entry options change as the user provides additional text (e.g., new text-entry options are selected based at least in part on text previously entered by the user).

In response to an input at the reminder details affordance (e.g., input 5017), the touch-sensitive secondary display 104 is populated to include an "Add Time" affordance and an "Add Location" affordance (FIG. 20D), instead of the text-entry options that were previously shown.

Figure 20E:
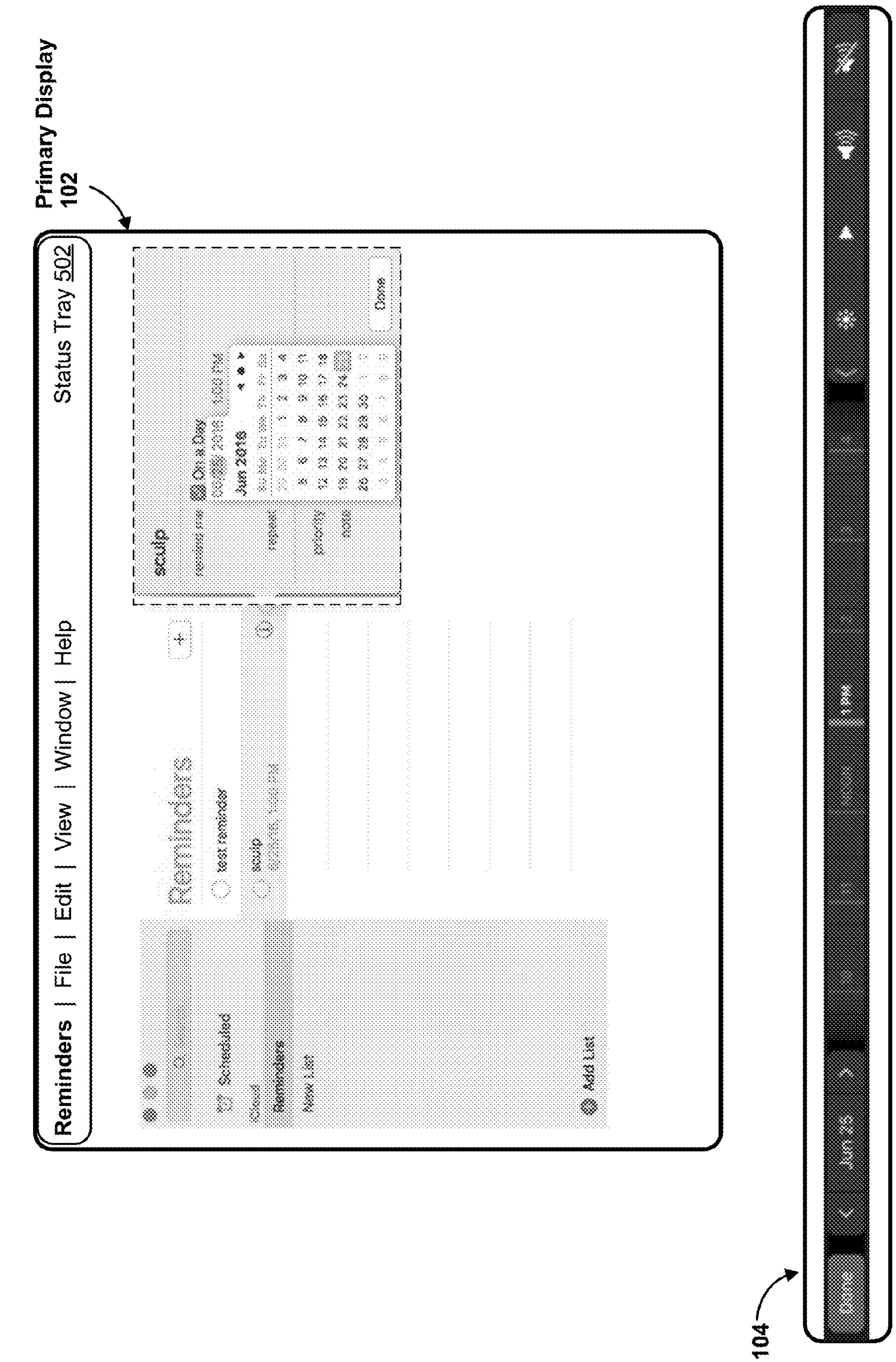
Figure 20F:
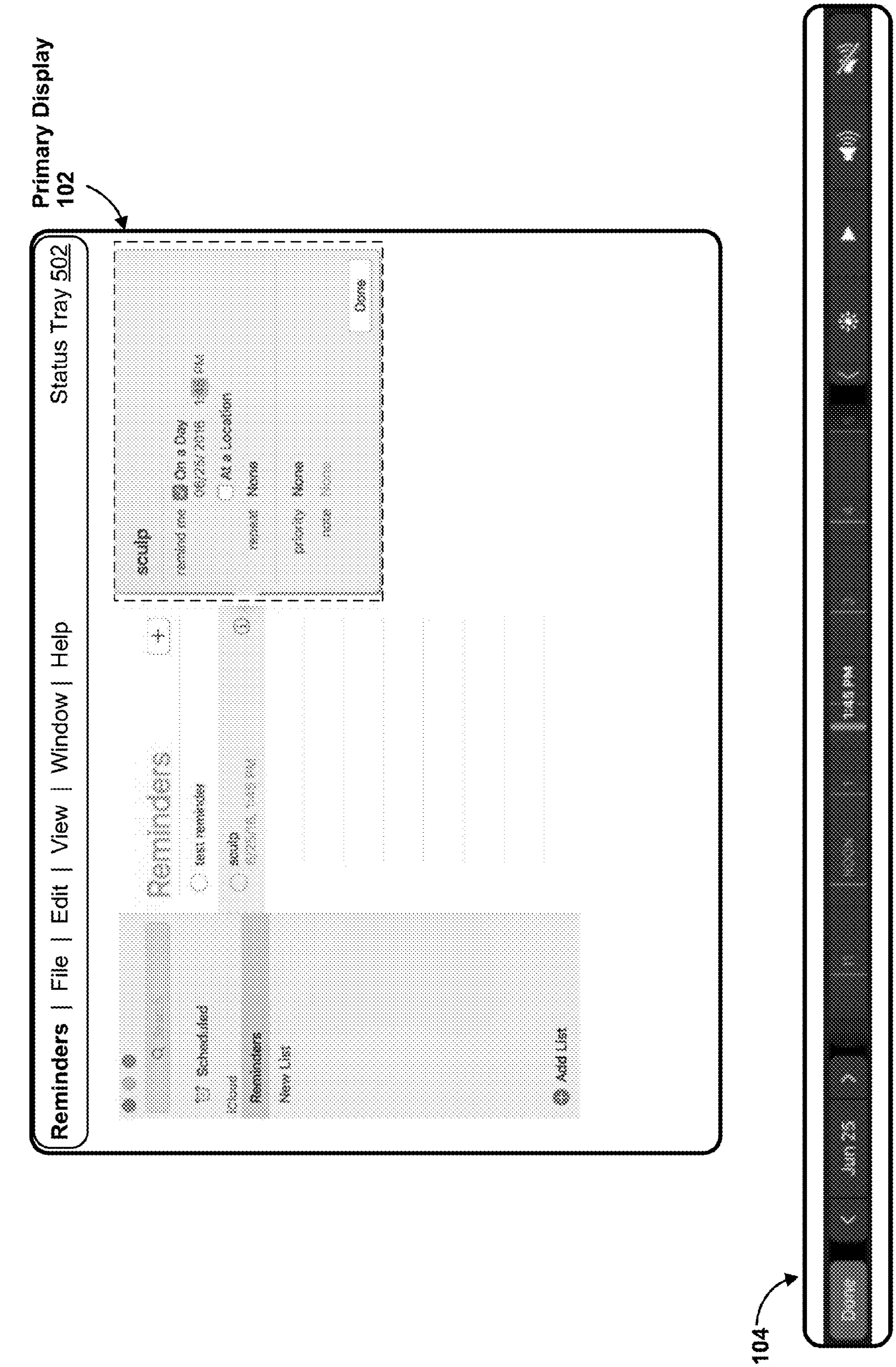

In response to detecting input 5018 at the Add Time affordance, the touch-sensitive secondary display 104 is populated to include options for selecting a date and time for the currently selected reminder on the primary display 102. As shown in FIGS. 20E-20F, as the user modifies these options, the user interface for the reminders application shown on primary display 102 is updated accordingly (e.g., to reflect that the user modified the reminder time from 1 PM to 1:45 PM).

In some embodiments, in a response to a gesture (e.g., a press and hold gesture that remains in contact with the touch-sensitive secondary display 104 for more than a predetermined amount of time, such as 0.5-1.5 seconds) at a date affordance (e.g., showing "Jun 25" in FIG. 20E), the touch-sensitive secondary display is updated to include a control that allows for selecting a new date. In some embodiments the control that allows for selecting the new date appears and extends out from a point at which the gesture contacts the touch-sensitive secondary display. In some embodiments, the user is then able to slide the gesture over the control and select a new date for use with the reminder. In some embodiments, in conjunction with displaying the control, the time slide shown in FIG. 20E is reduced to a smaller display size in which only a selected time range is shown.

Figure 20G:
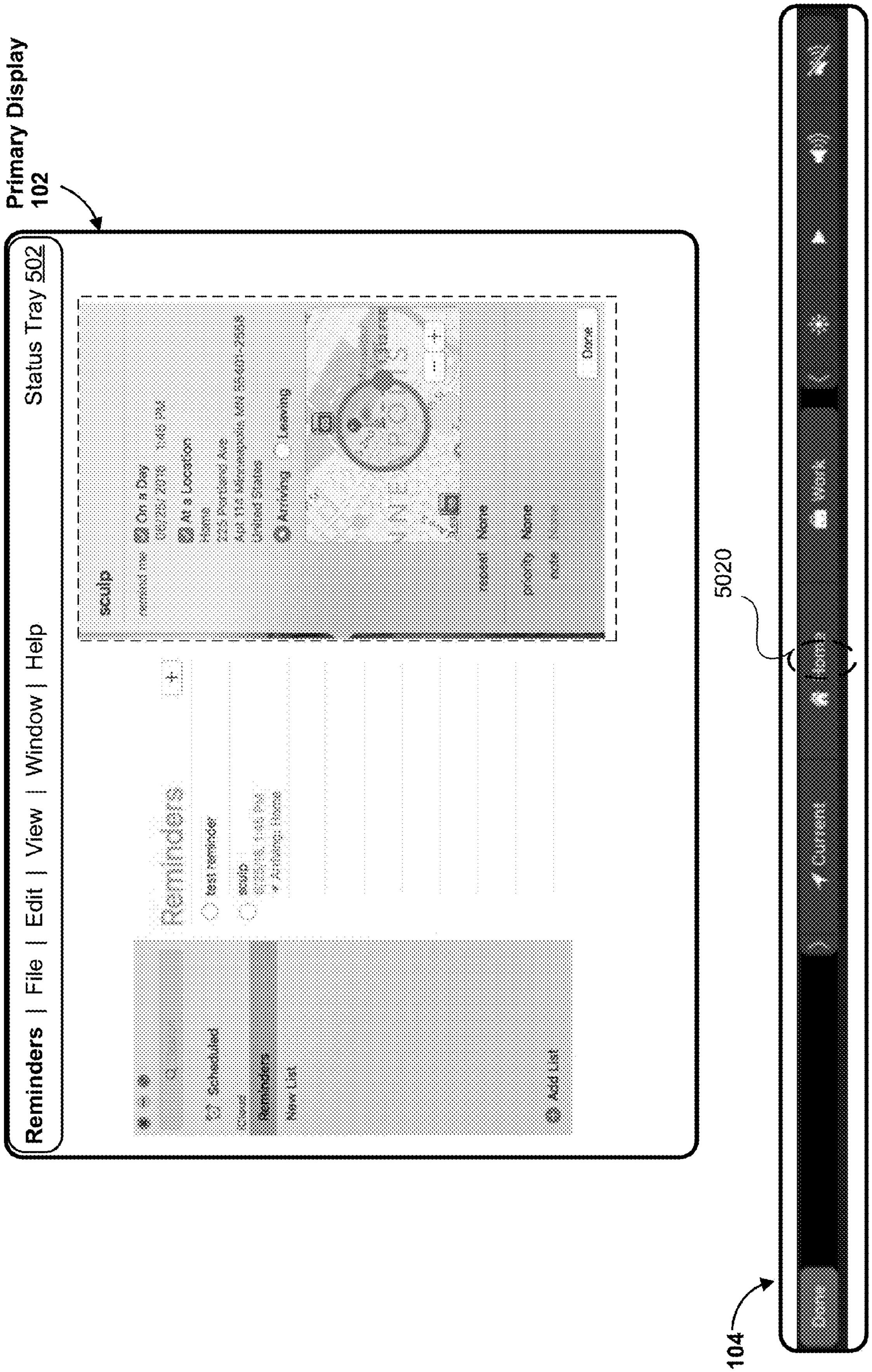

In response to detecting input 5019 over the Add Location affordance, the touch-sensitive secondary display 104 is populated to include location-selection options (as shown in FIG. 20G). As shown in FIG. 20G, in response to a selection of one of the location-selection options (e.g., the "Home" option using input 5020), the primary display 102 is updated accordingly (e.g., to include an address and map representation corresponding to the selected location).

In some embodiments, the touch-sensitive secondary display 104 is populated to include affordances that allow for accessing functions available via a desktop management application (e.g., FINDER application). FIGS. 21A-21J illustrate example affordances that are shown in the touch-sensitive secondary display 104 that, when selected, cause a computing device that is in communication with the touch-sensitive secondary display 104 to perform various file management functions (including searching for files, modifying file names and other characteristics, sharing, posting, or moving files, and deleting files).

Figure 21A:
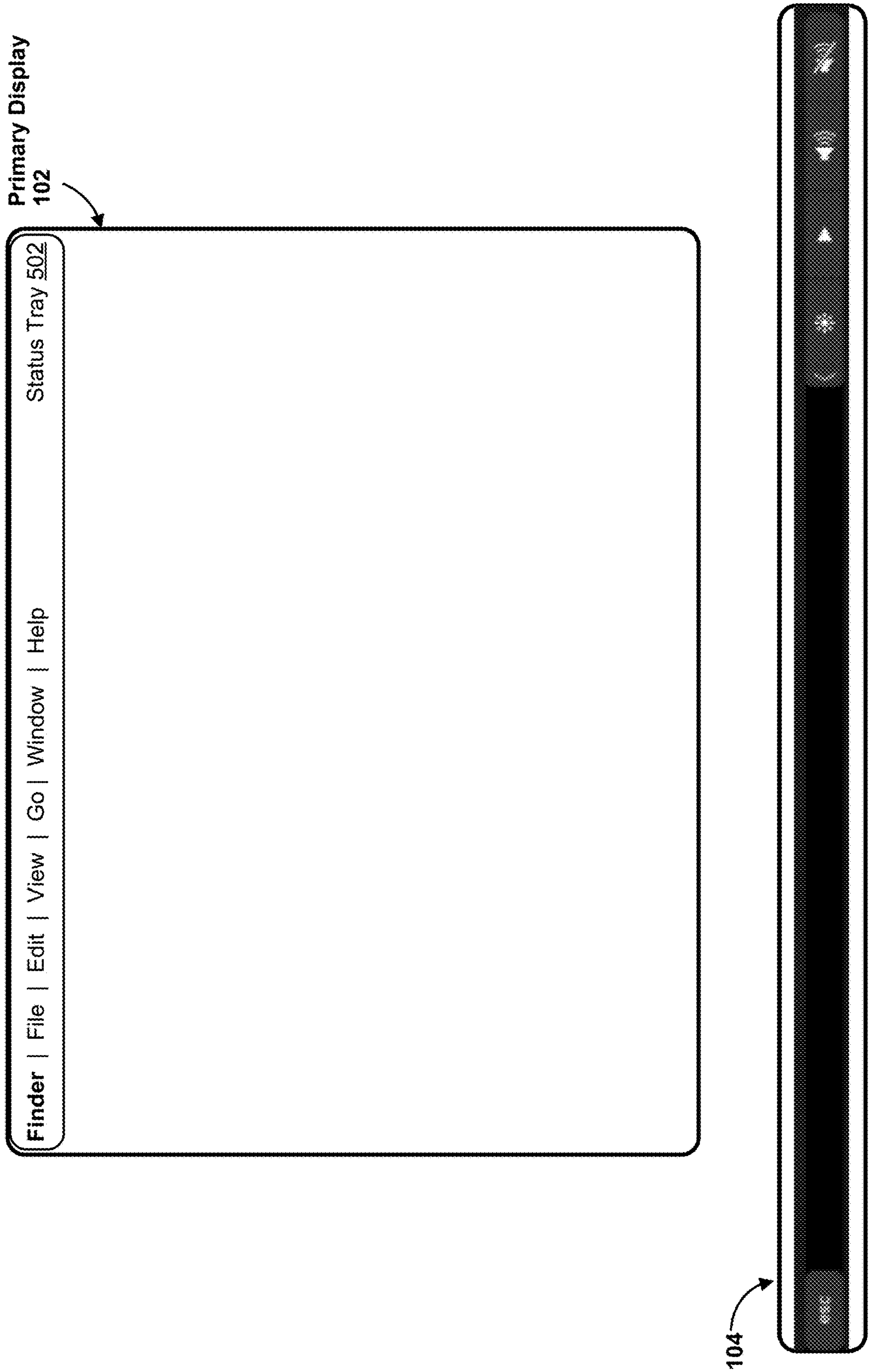
Figure 21B:
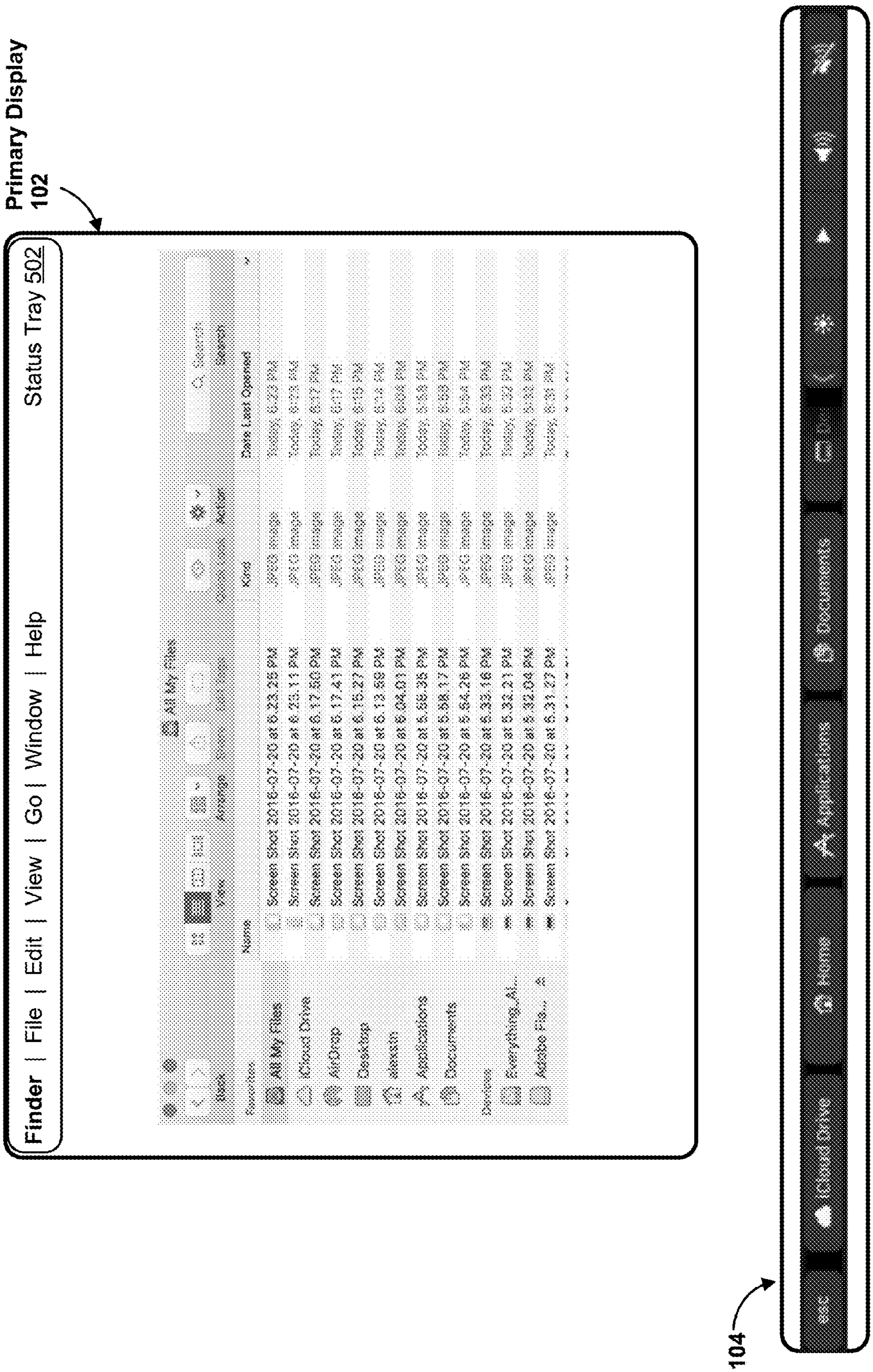
Figure 21C:
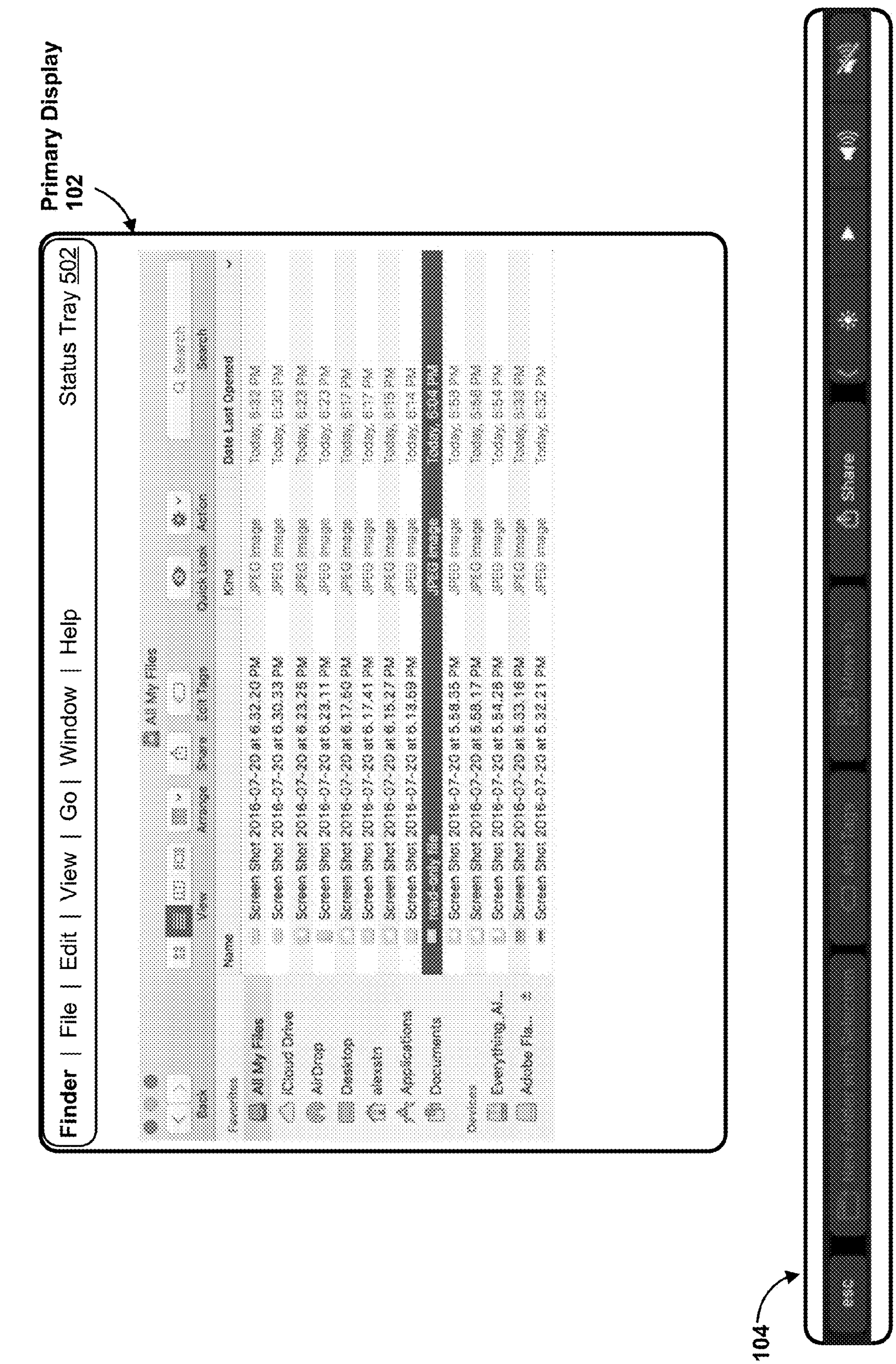

In some embodiments, when a user initially accesses the desktop management application, the touch-sensitive secondary display 104 does not display any application-specific affordances for the desktop management application, as shown in FIG. 21A (in other embodiments, the touch-sensitive secondary display 104 may include options for accessing favorite folders). In response to opening up a new window on the primary display 102 (e.g., an "All My Files" window, FIG. 21B) and before selecting a file shown within the new window, the touch-sensitive secondary display 104 is populated to include affordances for navigating through various folders, internal disk drives, removable/external disk drives, and the like. For example, as shown in FIG. 21B, the touch-sensitive secondary display 104 includes affordances for navigating to "iCloud Drive," "Home," "Applications," "Documents," "Desktop," and others by performing a right-to-left swipe gesture in order to reveal additional affordances.

Figure 21D:
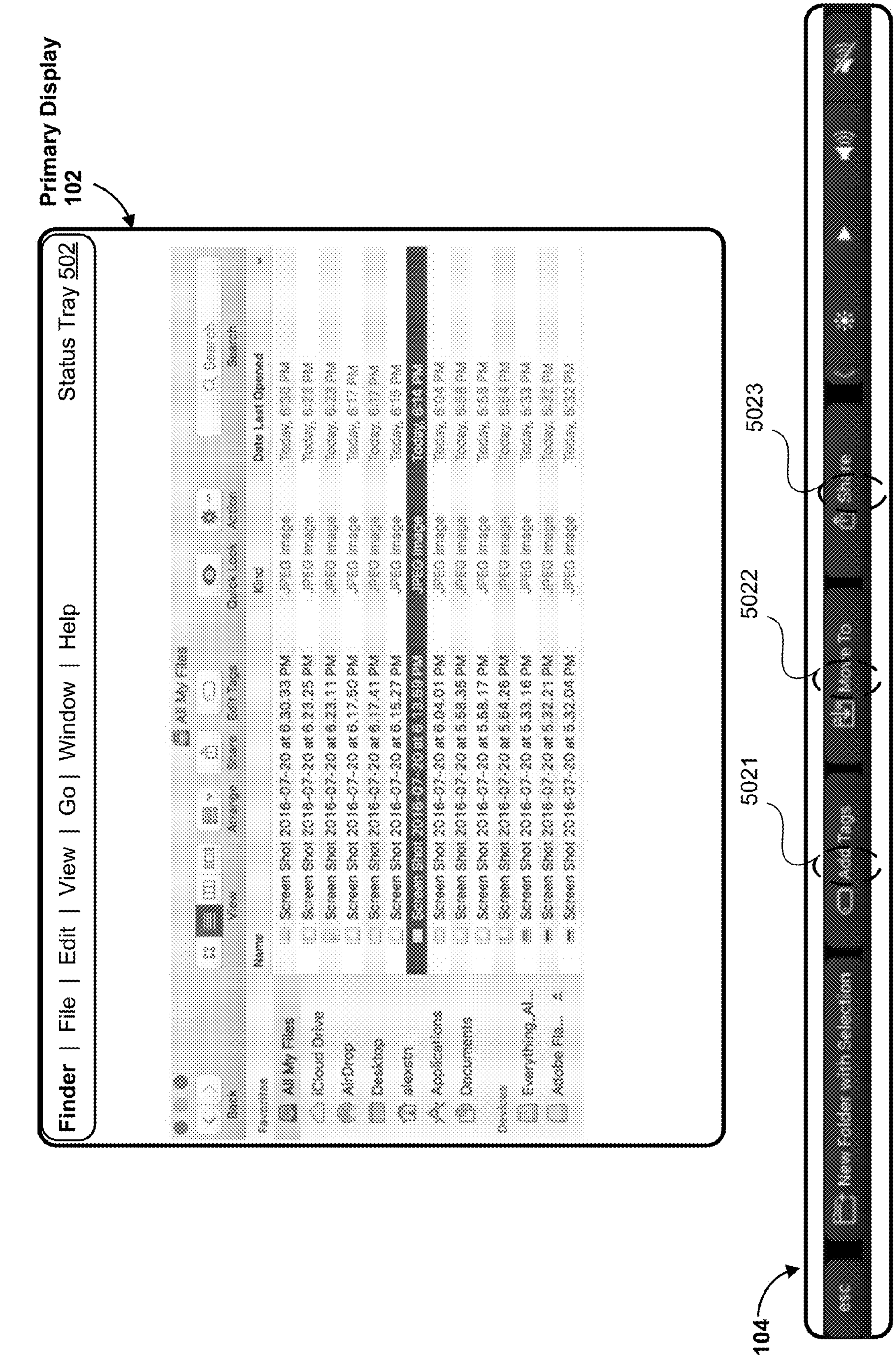

In some embodiments, in response to a selection of a respective file that is displayed within the new window shown (e.g., a selection of a "read-only file," FIG. 21C, or a selection of some other file, FIG. 21D), the touch-sensitive secondary display is updated to include options for interacting with the respective file. In some embodiments, in accordance with a determination that the respective file is a read-only file, some of the options presented in the touch-sensitive secondary display 104 are shown in an inactive display mode (e.g., the "New Folder with Selection," "Add Tags," and "Move To" options are greyed out in FIG. 21C). In some embodiments, in accordance with a determination that the respective file is not a read-only file, all options are presented in an active display mode (e.g., as shown in FIG. 21D).

Figure 21E:
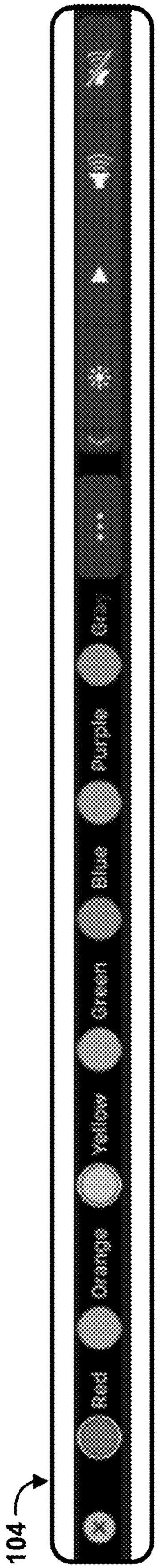
Figure 21F:
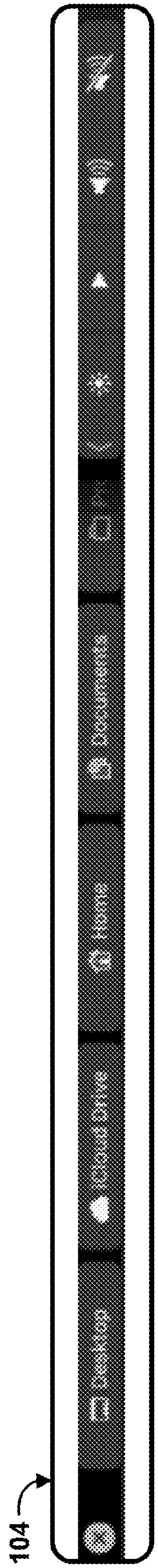

In some embodiments, in response to a selection of any one of the options (e.g., in response to any one of the inputs 5021, 5022, and 5023), the touch-sensitive secondary display 104 is updated. For example: in response to input 5021, the touch-sensitive secondary display 104 is updated to include options for tagging the respective file (as shown in FIG. 21E); in response to input 5022, the touch-sensitive secondary display 104 is updated to include options for moving the respective file (as shown in FIG. 21F); and in response to input 5023, the touch-sensitive secondary display 104 is updated to include options for sharing the respective file (as shown in FIG. 21G).

Figure 21G:
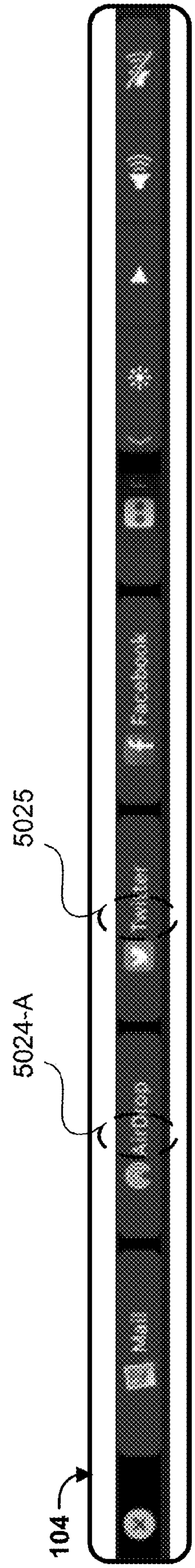
Figure 21H:
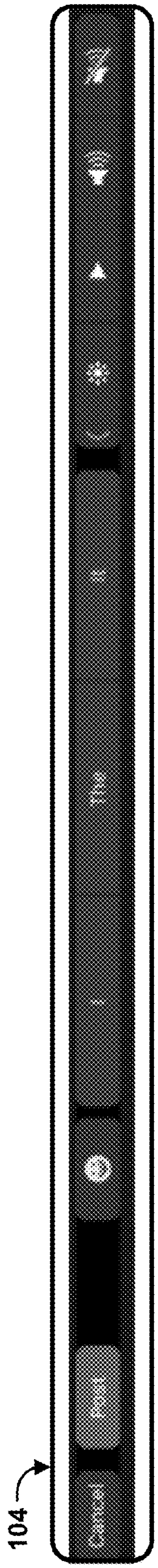

In some embodiments (and as shown in FIG. 21G), the options for sharing the respective file include sending the respective file via a mail application, sending the respective file via a short-range communication protocol (e.g., AIRDROP), and/or posting the respective file via one or more social networking applications (e.g., TWITTER, FACEBOOK, INSTAGRAM, etc.). After a user selects one of the sharing/sending/posting options shown in FIG. 21G, the primary display 102 is updated to display an appropriate application and the touch-sensitive secondary display 104 is updated to display lower-level sharing options. For example, in response to input 5025 (FIG. 21G), the primary display 102 is updated to display an appropriate application (e.g., a TWITTER application, including a representation of the respective file that will be posted) and the touch-sensitive secondary display 104 is updated to display text-entry options for adding text to the post and a button that, when selected, posts the respective file and any added text.

Figure 21I:
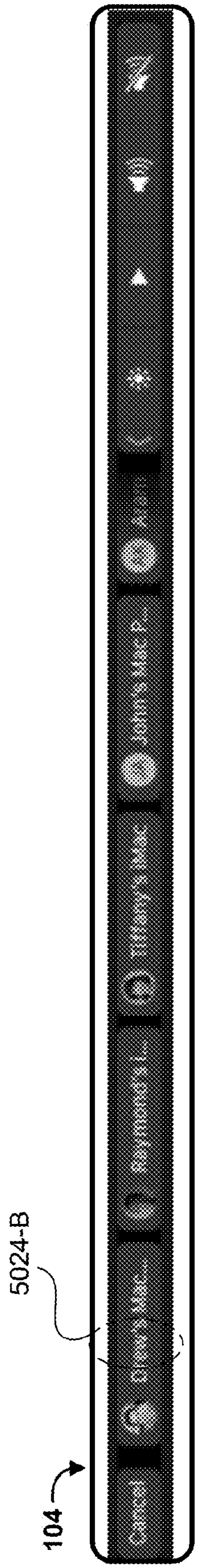
Figure 21J:
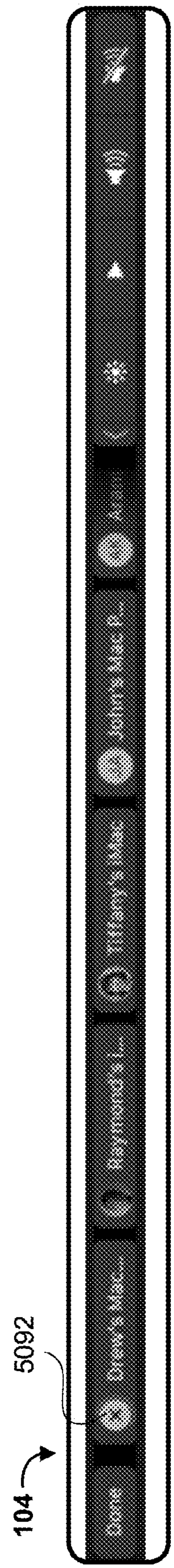

As another example, in response to input 5024-A (FIG. 21G), the touch-sensitive secondary display 104 is updated to include lower-level sharing options for selecting a device to which the respective file should be sent (e.g., as shown in FIG. 21I, the touch-sensitive secondary display includes affordances for each of a plurality of nearby devices to which the respective file may be sent). In response to input 5024-B, the computing device initiates sending of the respective file and the touch-sensitive secondary display 104 is updated to include a status indicator 5092 reflecting progress of the sending (FIG. 21J).

Figure 22A:
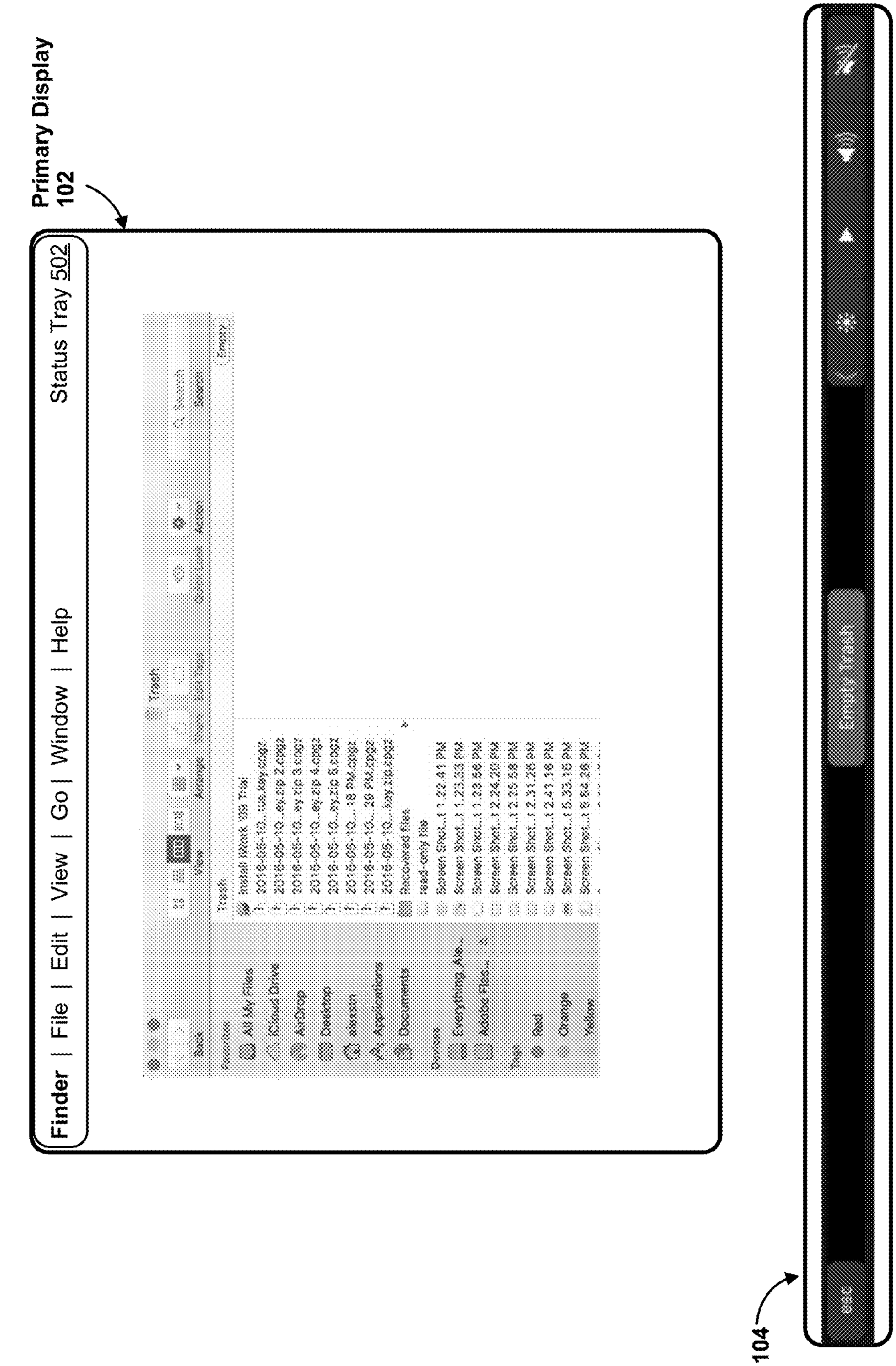
Figure 22B:
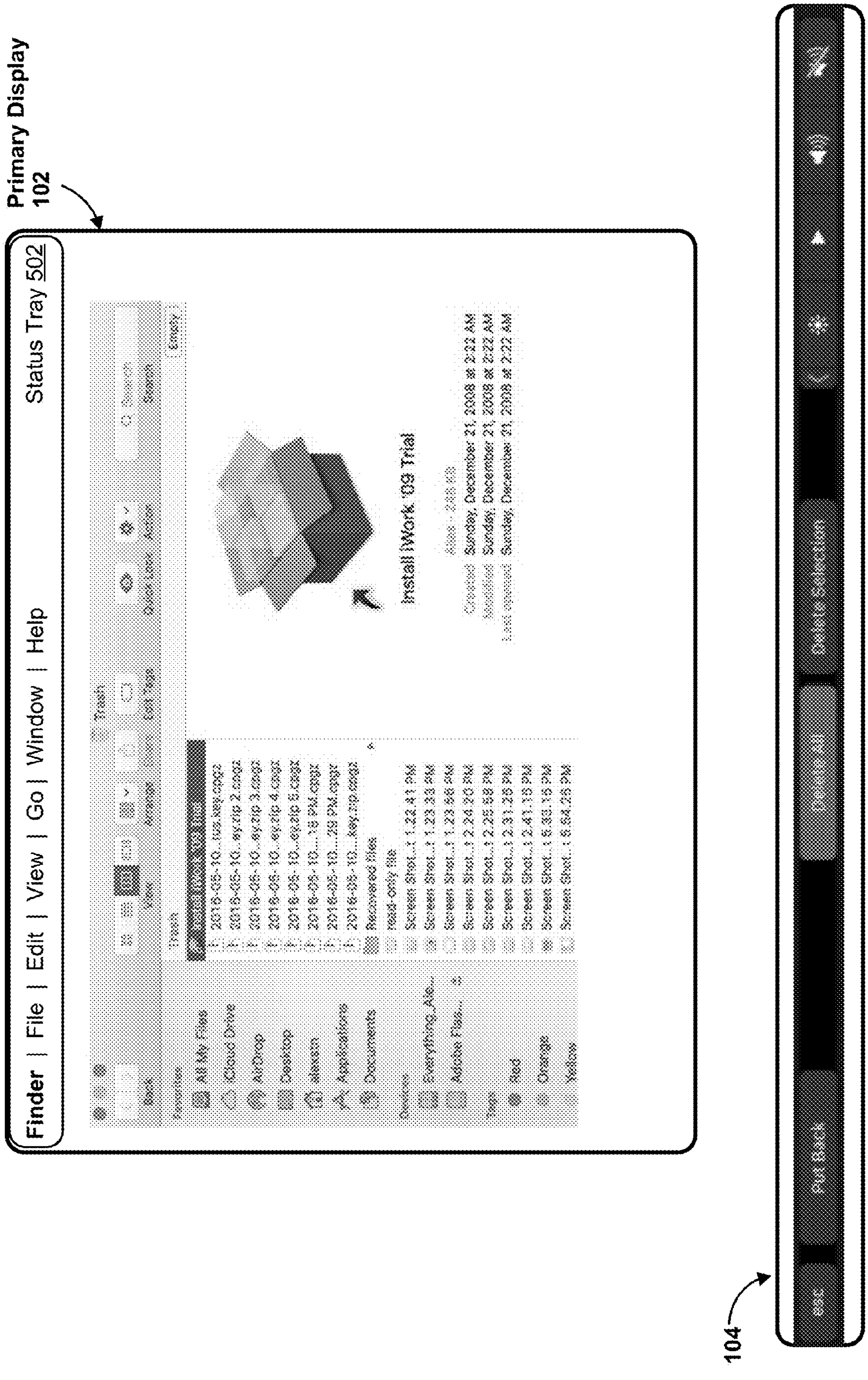
Figure 22C:
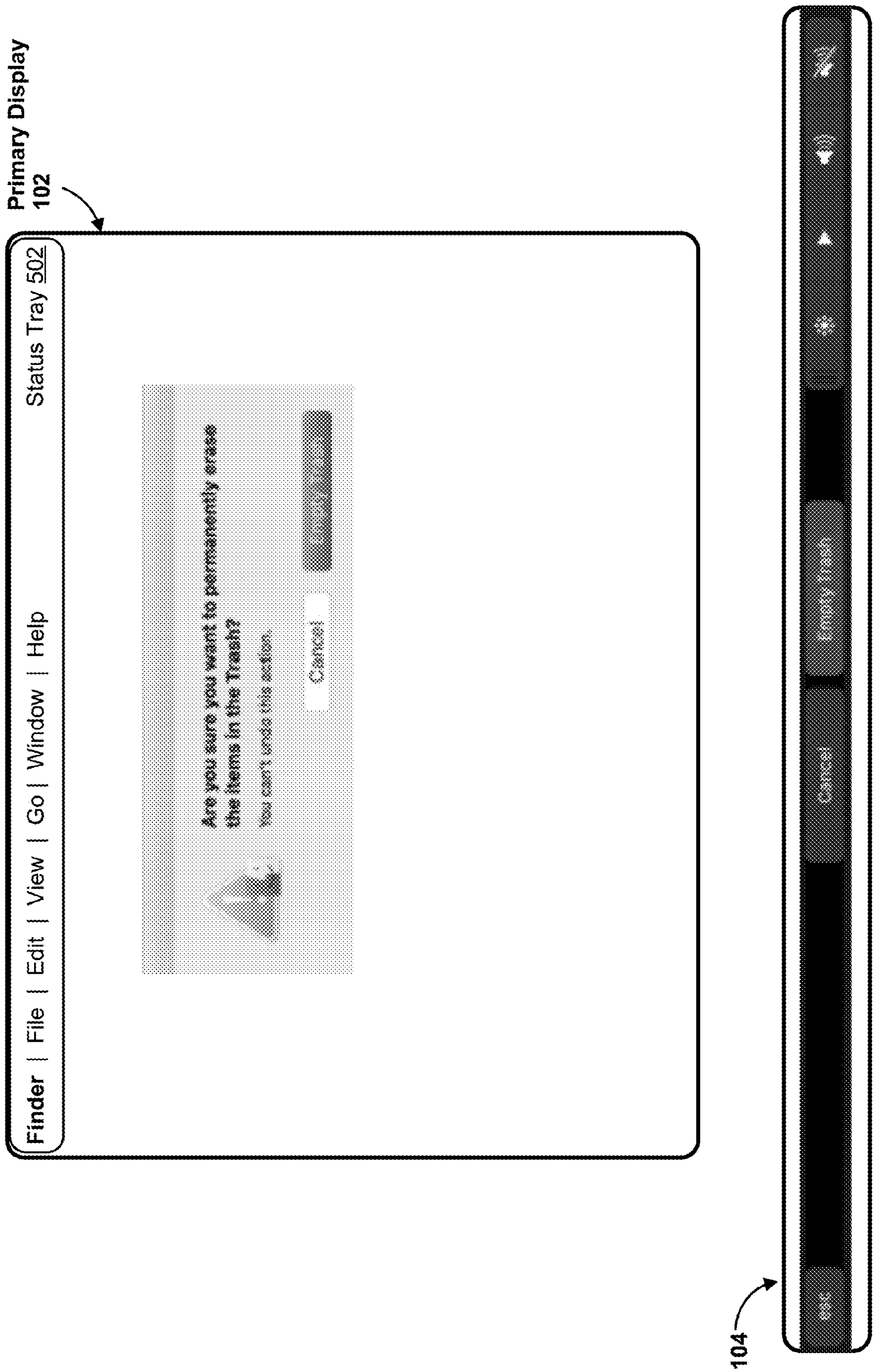
Figure 23A:
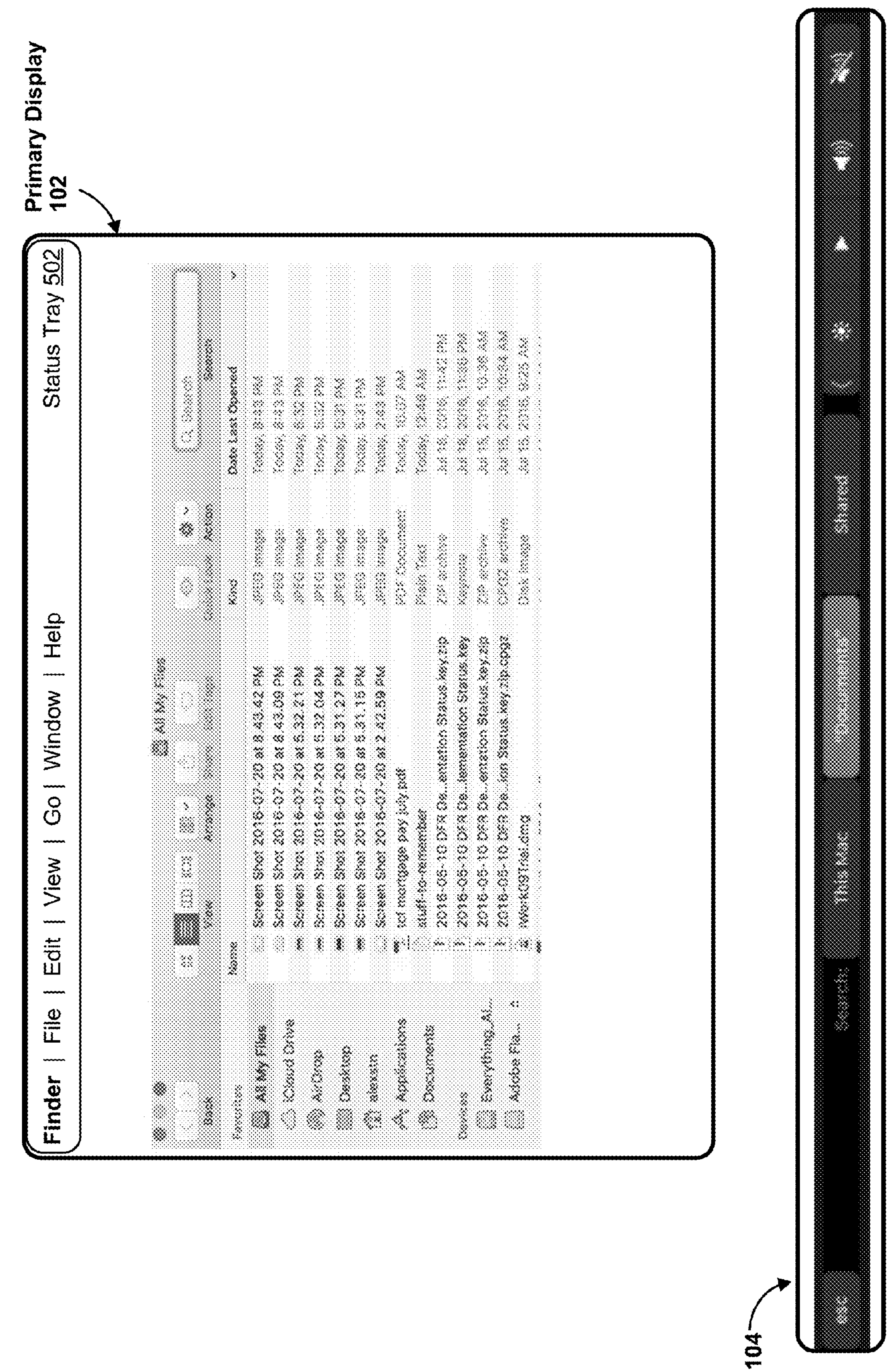
Figure 23B:
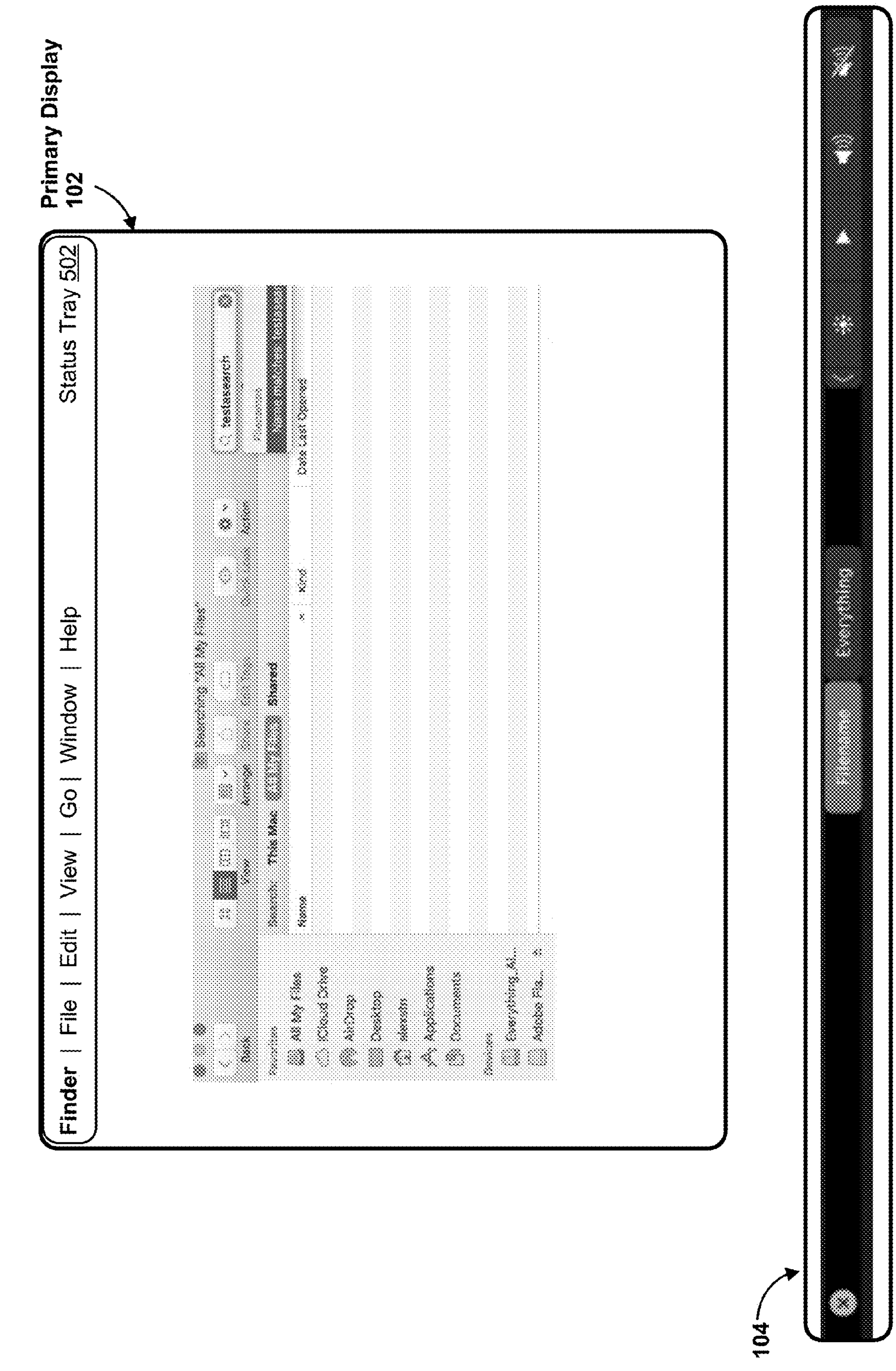

FIGS. 22A-22C illustrate examples of using the touch-sensitive secondary display 104 to more quickly access trash-emptying functions (e.g., instead of having to navigate to, locate, and then select trash-emptying functions from a hierarchical menu), these functions are displayed in the touch-sensitive secondary display 104 for selection using a single input. In some embodiments, while viewing a window for "Trash" when no file is selected, the touch-sensitive secondary display 104 includes an affordance that, when selected, causes the computing system to empty the entire trash (e.g., the "Empty Trash" affordance of FIG. 22A). In some embodiments (and as shown in FIG. 22B), while viewing a window for "Trash" when a file is selected, the touch-sensitive secondary display 104 includes affordance that, when selected, causes the computing system to empty the entire trash (e.g., the "Delete All" affordance), to delete just the selected file (e.g., the "Delete Selection" affordance), or to remove the selected file from the trash (e.g., the "Put Back" affordance). FIG. 22C illustrates that the touch-sensitive secondary display 104 may also display controls from a modal dialog on the primary display 102, in response to selection of the "Delete All" or the "Empty Trash" affordances, thus allowing the user to quickly and easily complete the trash emptying function by providing inputs at only the touch-sensitive secondary display 104.

In some embodiments, while viewing a trash window or while viewing some other window (e.g., an All My Files window), the user is able to begin searching all files by selecting a search box. In response to a selection of the search box, the touch-sensitive secondary display 104 is updated to include searching options (e.g., options for choosing a directory or folder in which the search should be conducted, FIG. 23A), or options for choosing whether to search by "Filename" or "Everything," FIG. 23B).

Figure 24A:
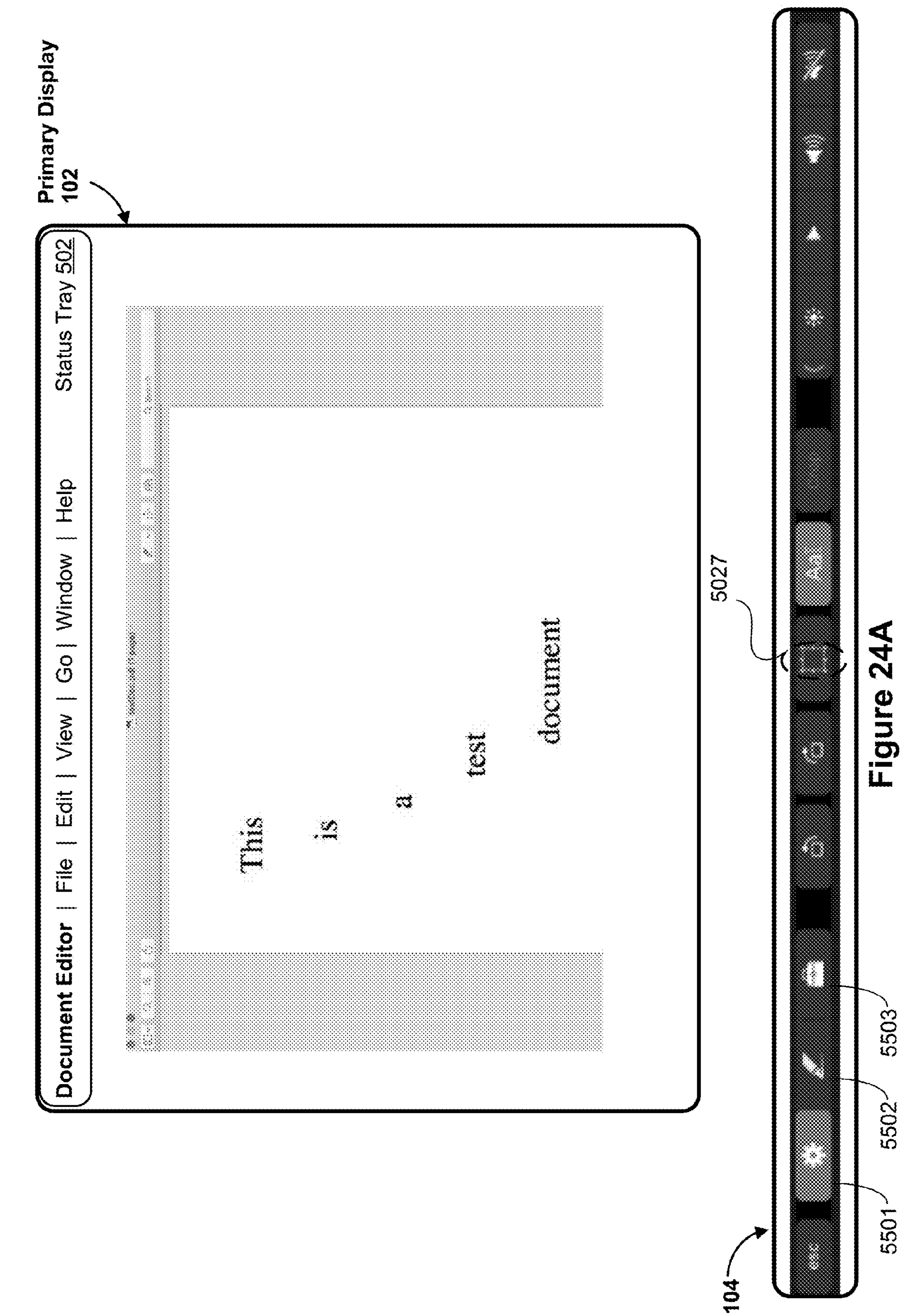
Figure 24B:
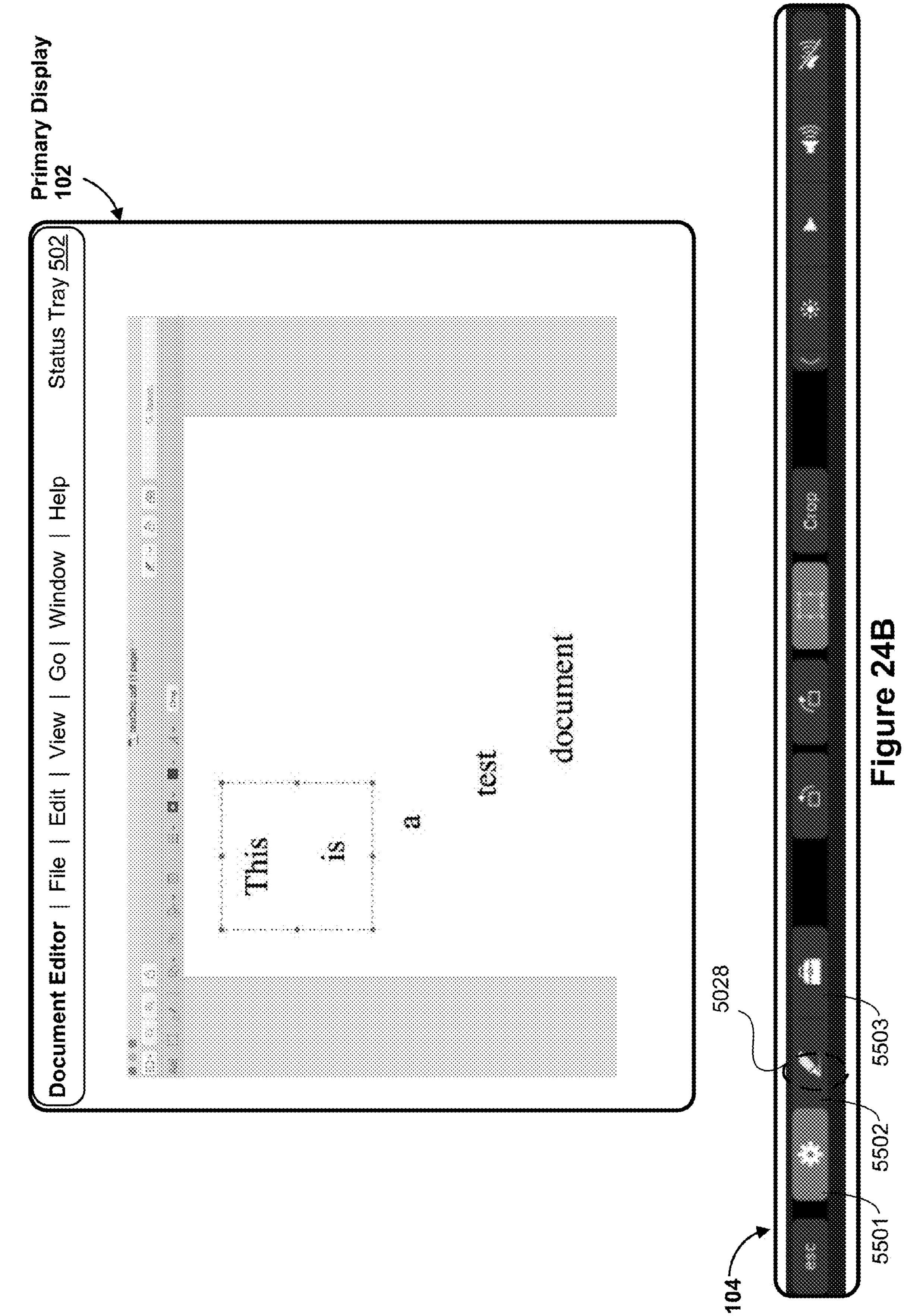
Figure 24C:
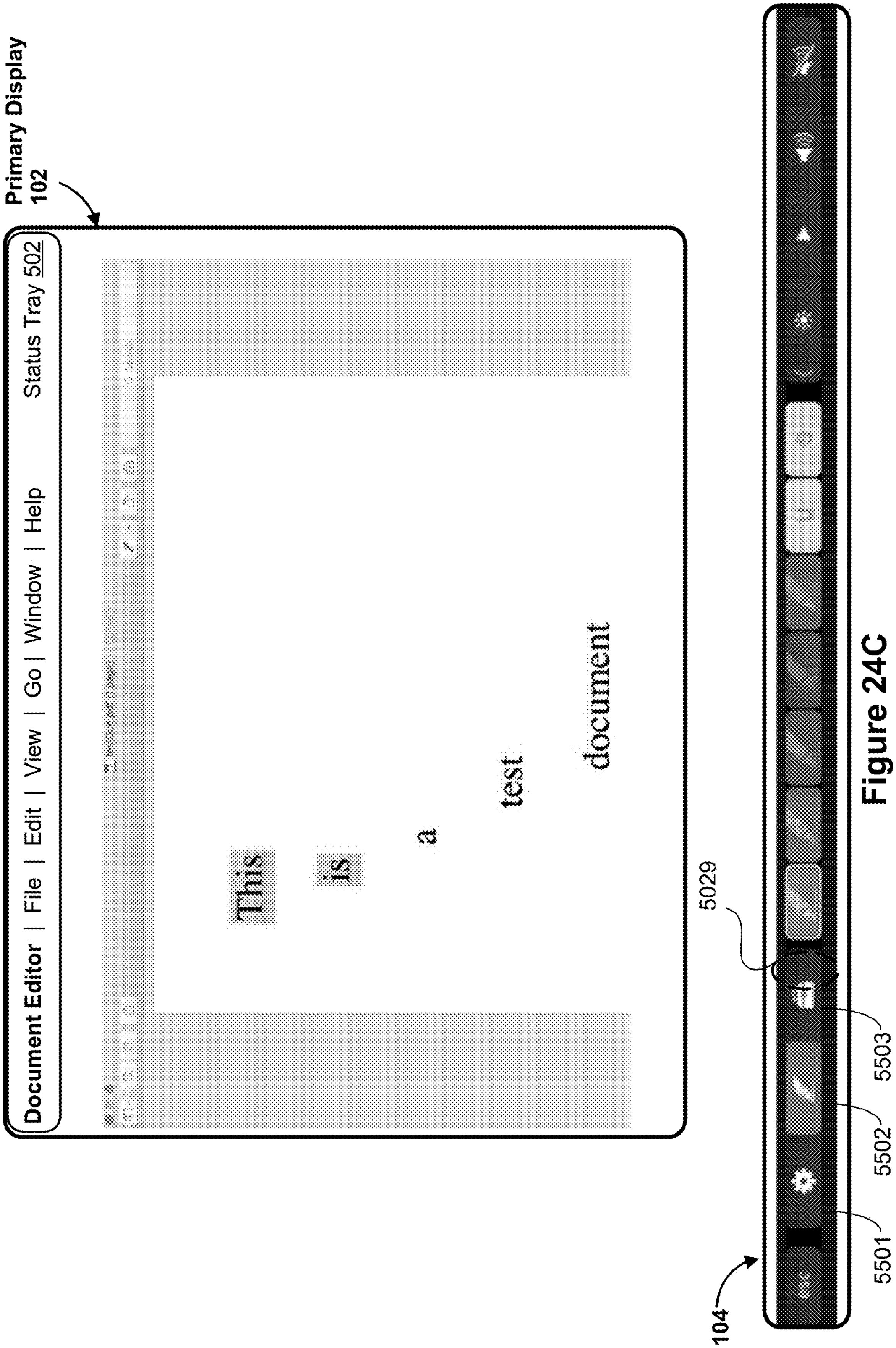
Figure 24D:
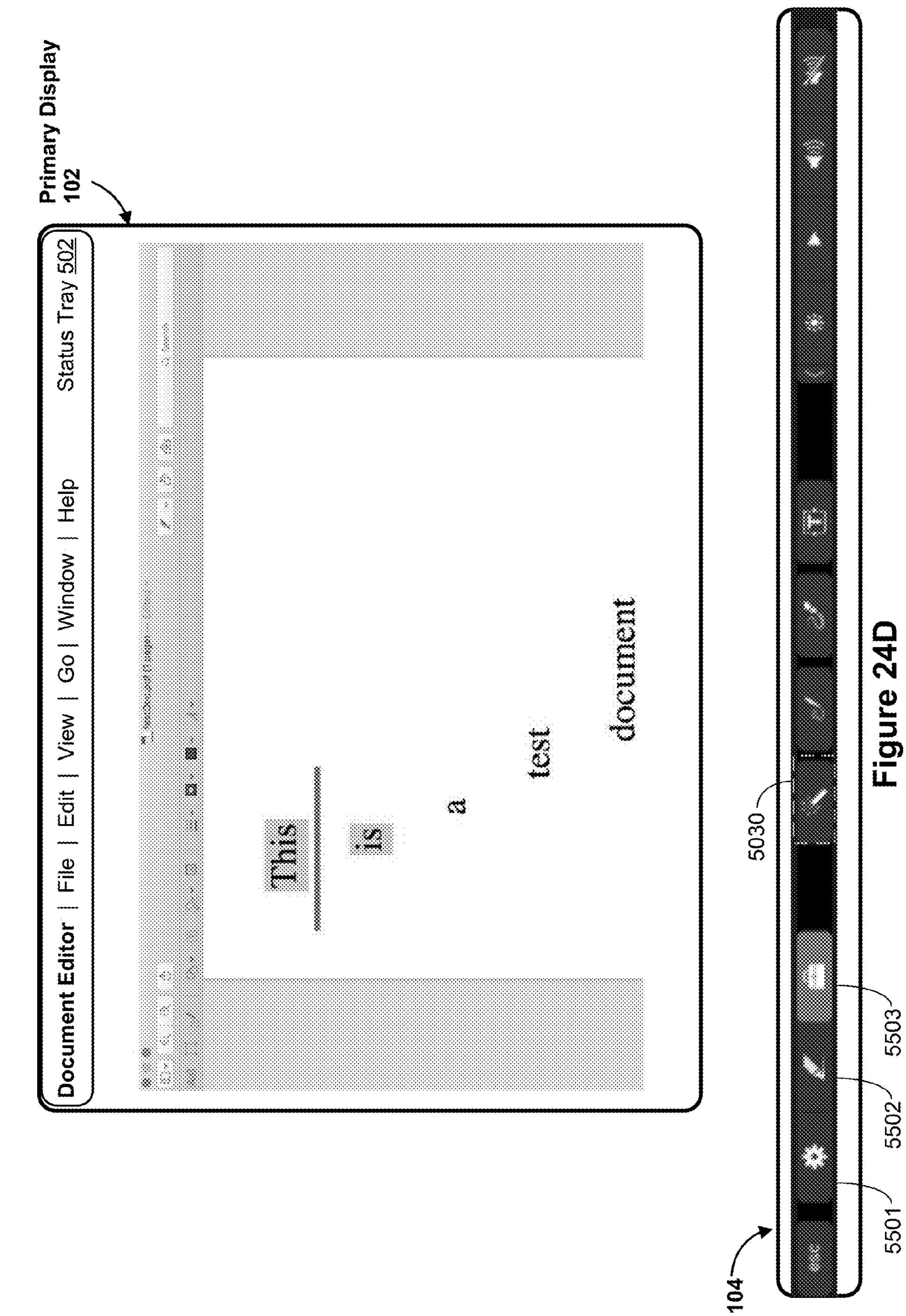
Figure 24E:
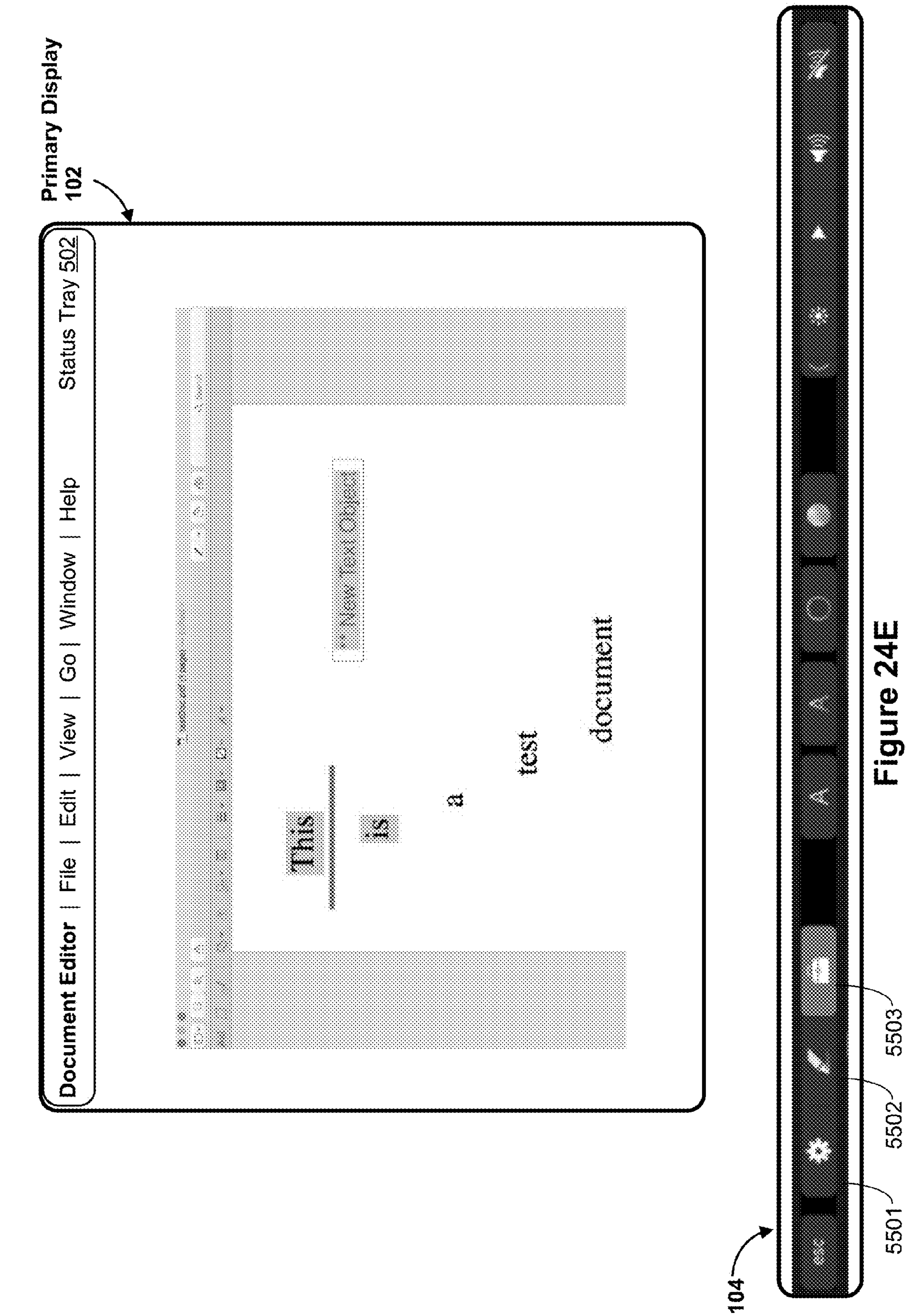
Figure 24F:
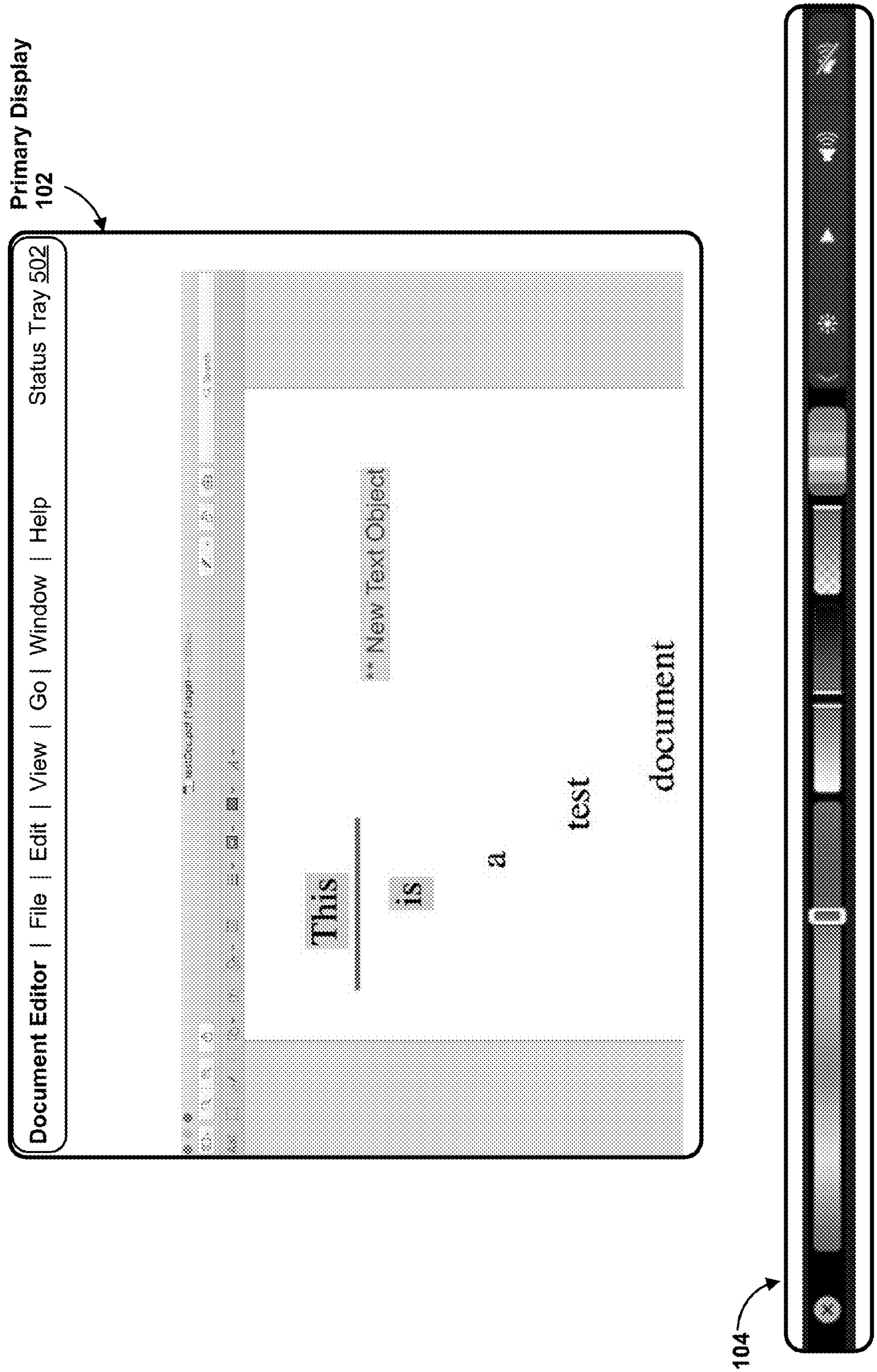
Figure 24G:
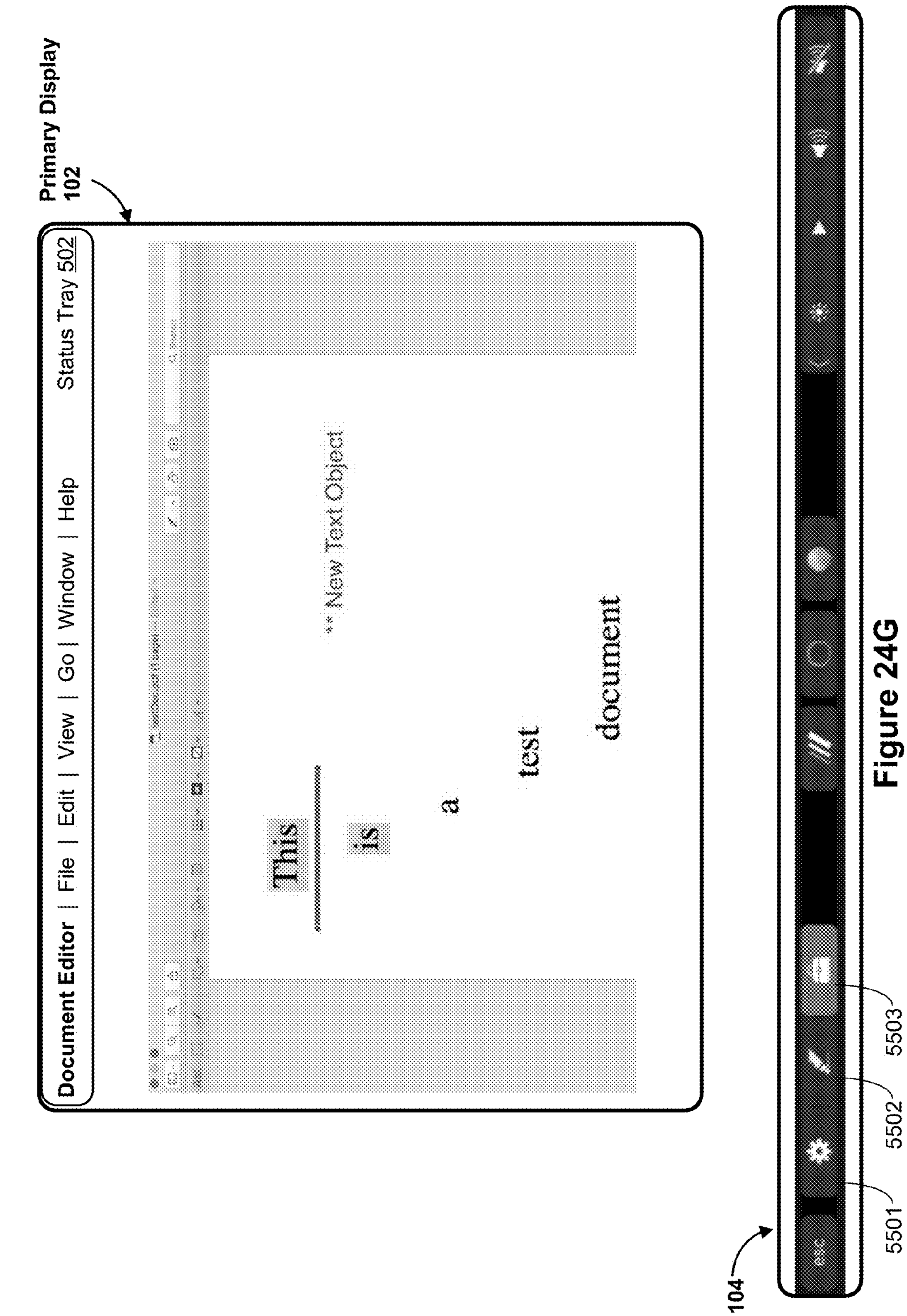
Figure 24H:
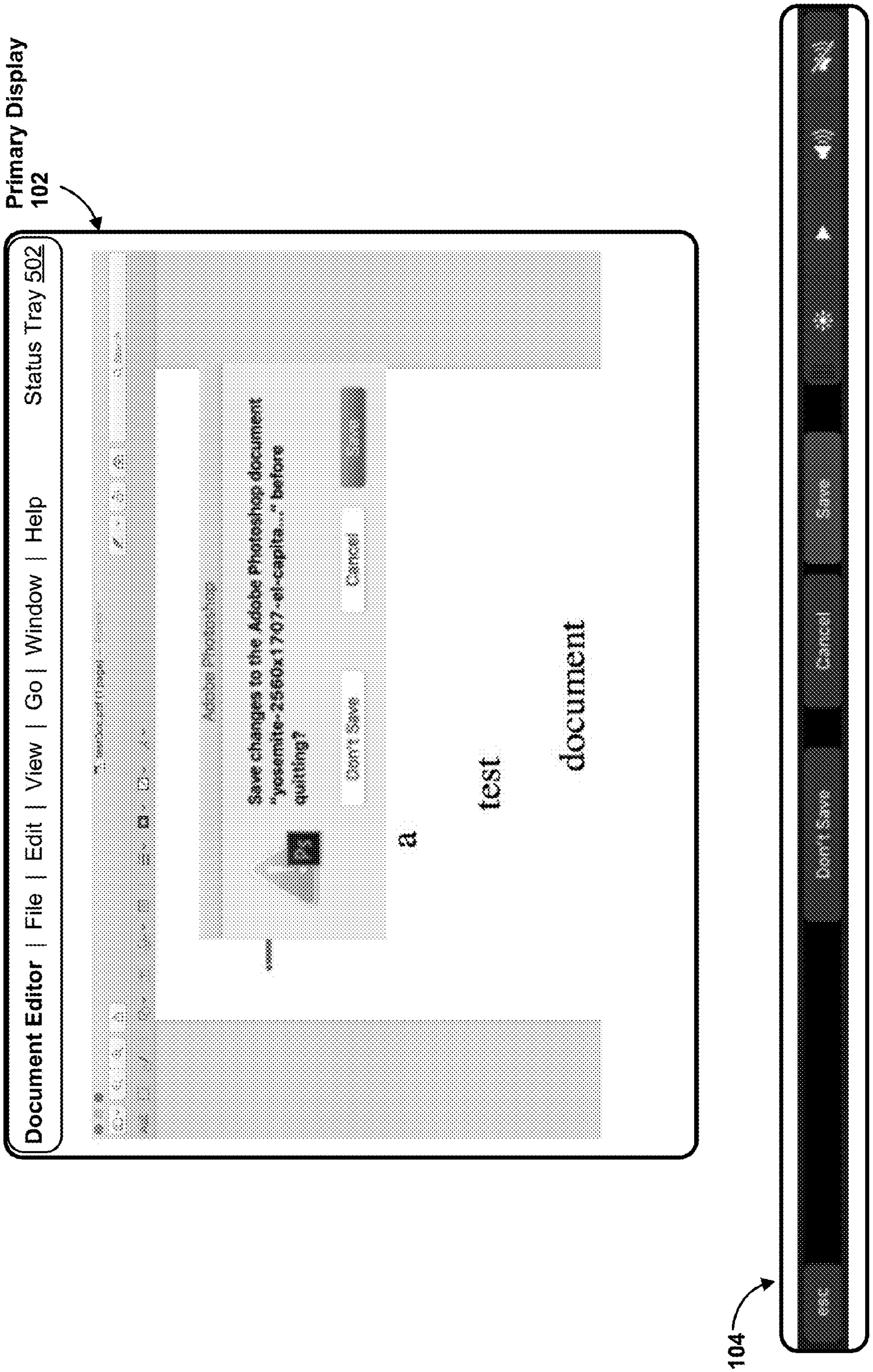
Figure 24I:
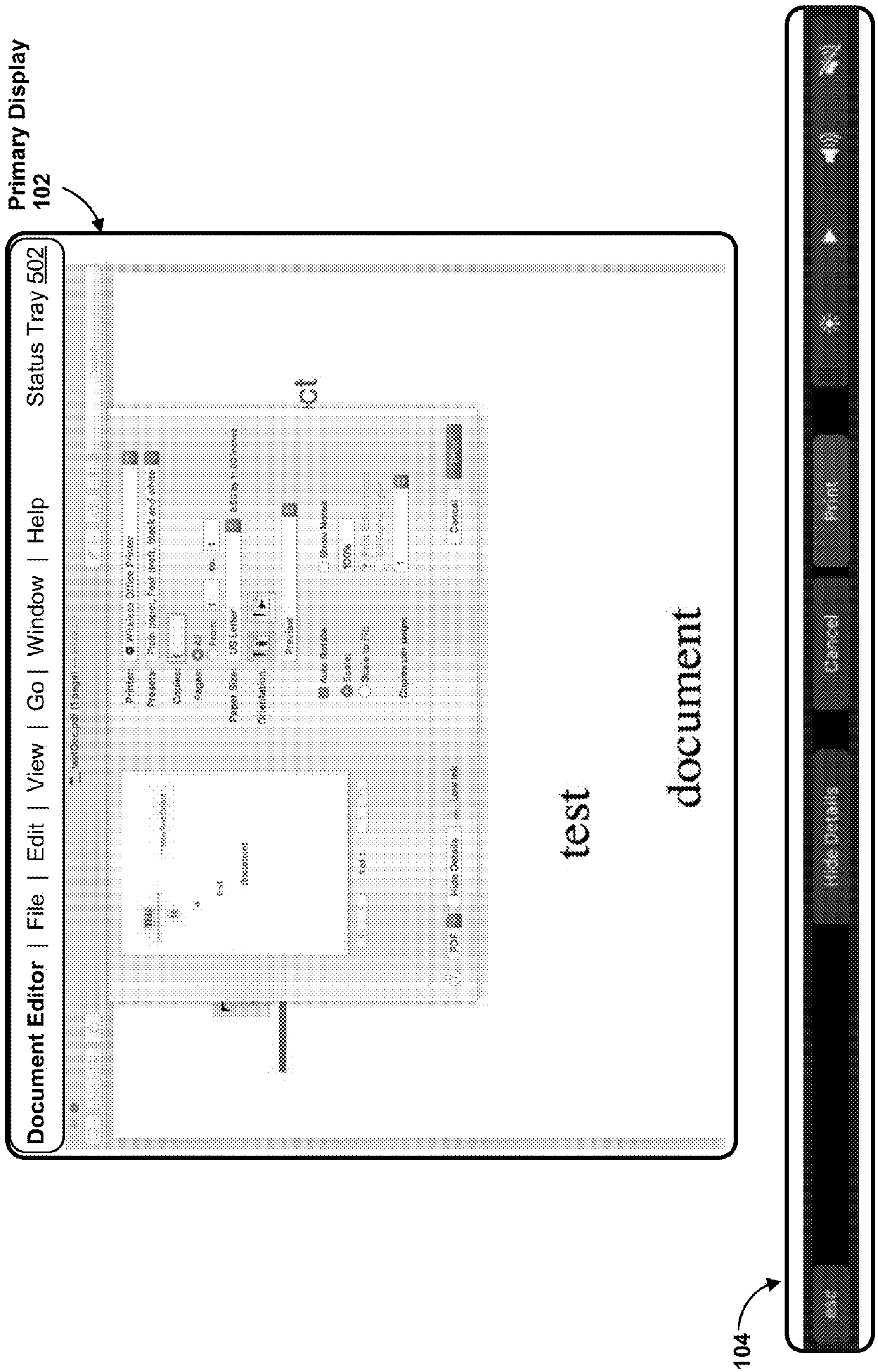
Figure 24J:
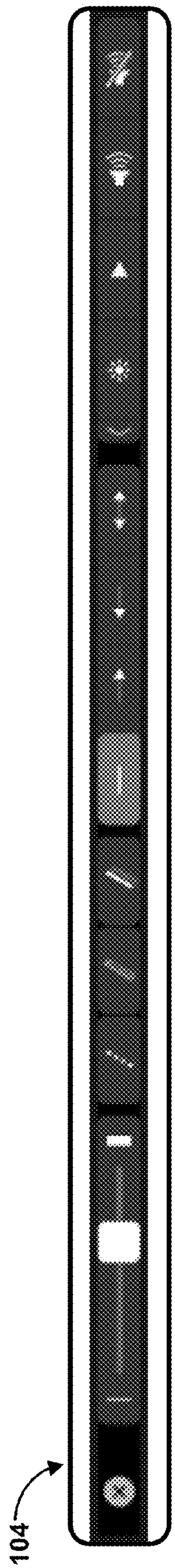
Figure 24K:
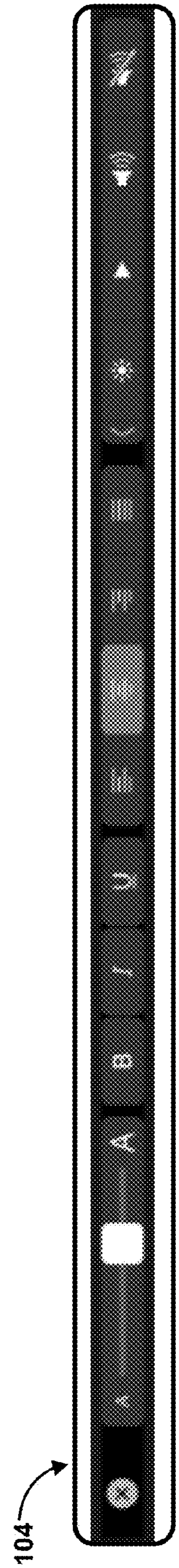
Figure 24L:
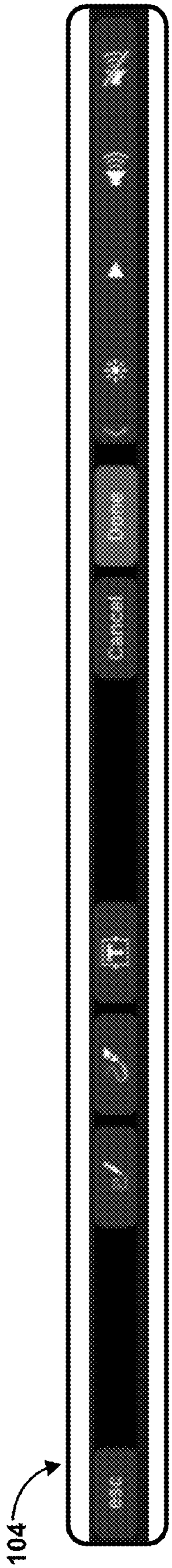
Figure 24M:
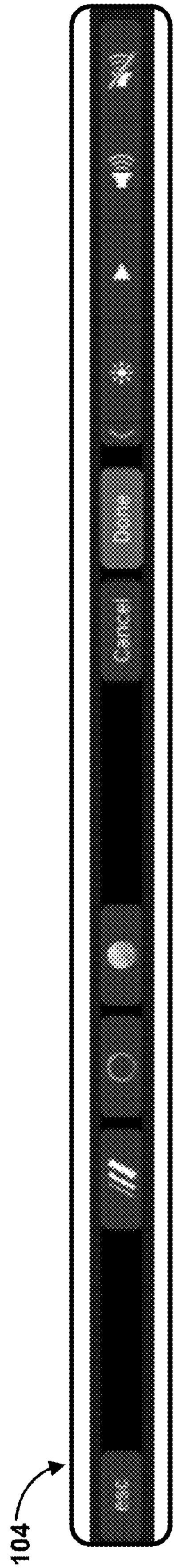
Figure 24N:
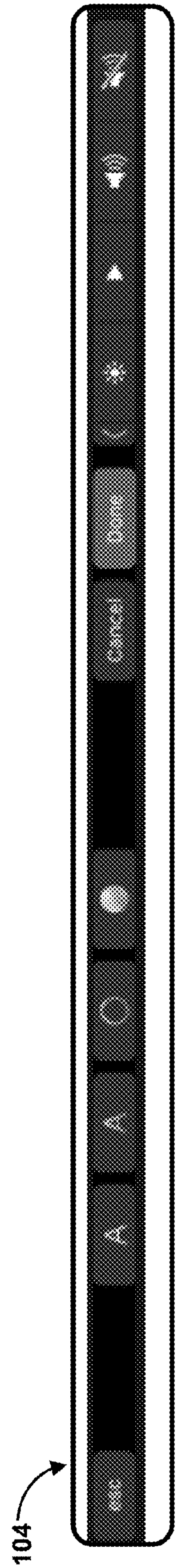

In some embodiments, the touch-sensitive secondary display 104 is populated to include affordances that allow for quickly accessing document editing functions (a few examples are provided in FIGS. 24A-24N).

In particular, as shown in FIG. 24A, in response to a user opening up a document editing application (e.g., a word processing application), the touch-sensitive secondary display 104 is populated to include a set of affordances for performing document editing functions. In some embodiments, the set of affordances includes a first affordance 5501 (e.g., a general editing affordance 5501), a second affordance 5502 (e.g., a highlight styles affordance 5502), and a third affordance 5503 (e.g., a markup affordance 5503). In some embodiments, each of the first, second, and third affordances are associated with additional affordances that are displayed after user input. For example, in response to a selection of the first affordance 5501, the touch-sensitive secondary display 104 is updated to include additional affordances that are associated with the first affordance (FIG. 24A).

As shown in FIG. 24A, the additional affordances that are associated with the first affordance include (i) a counter-clockwise rotation affordance that, when selected, causes a selected object on the primary display 102 to be rotated 90 degrees in a counter-clockwise direction; (ii) a clockwise rotation affordance that, when selected, causes a selected object on the primary display 102 to be rotated 90 degrees in a clockwise direction; (iii) a rectangular selection tool that, when selected, allows for the use of a rectangular selection tool on the primary display 102; (iv) an optional text options affordance; and (v) a crop affordance that, when selected, causes cropping of a selected portion of an object displayed on the primary display 102. FIG. 24A also illustrates a selection of the rectangular selection tool from the touch-sensitive secondary display 104 (e.g., via input 5027).

In FIG. 24B, the user has selected a portion of a displayed document on the primary display 102 and also selects the highlight styles affordance 5502 from the touch-sensitive secondary display 104 (e.g., via input 5028). In response to the selection of the highlight styles affordance 5502, the touch-sensitive secondary display 104 is updated to include additional affordances that are associated with the highlight styles affordance, including five different affordances for highlighting in various colors, an underline affordance, and a strikethrough affordance (FIG. 24C).

FIG. 24C also illustrates user selection of the markup affordance 5503 (e.g., via input 5029) and, in response, the touch-sensitive secondary display 104 is updated to include default affordances that are associated with the markup affordance 5503 (e.g., those shown in FIG. 19K adjacent to the markup affordance 5503). In some embodiments, the default affordances include one or more optional affordances 5030 that are displayed if the primary display 102 includes image content. In some embodiments, as a user selects objects on the primary display 102, the default affordances are replaced with additional affordances that are selected based on a type of object that is currently selected on the primary display 102 (e.g., a graphical or a textual object).

For example, In accordance with a determination that the type of object that is currently selected on the primary display 102 is of a first type (e.g., is a textual object, such as the "New Text Object" shown in FIG. 24E), then the additional affordances include those shown in FIG. 24E. The additional affordances allow for easy and quick modifications of visual characteristics used to render the selected object on the primary display 102 (e.g., as shown in FIGS. 24F-24G, the user may modify a color characteristic by simply adjusting/sliding a control for the color picker). In accordance with a determination that the type of object that is currently selected on the primary display 102 is of a second type (e.g., is a drawn graphical object, such as the red line shown in FIG. 24G), then the additional affordances include those shown in FIG. 24**G.

In some embodiments, if a user attempts to exit an application (e.g., such as the document-editing application shown on primary display 102 in FIG. 24H), then the touch-sensitive secondary display 104 is updated to include options for interacting with a modal save dialog. In some embodiments, the touch-sensitive secondary display 104 is also configured to display printing options in response to a request to print a document that is currently display on the primary display 102 (e.g., as shown in FIG. 24I).

FIGS. 24J-24K include example affordances displayed on the touch-sensitive secondary display 104 in response to a user request to modify line styles (e.g., FIG. 24J) and in response to a user request to modify text styles (e.g., FIG. 24K).

In some embodiments, document-editing functions are available to markup objects included within mail messages (e.g., emails, text messages, etc.). FIGS. 24L-24N provide examples in which the touch-sensitive secondary display 104 is populated to include some of the document-editing functions discussed above (in particular, the functions associated with markup affordance 5503).

Figure 25A:
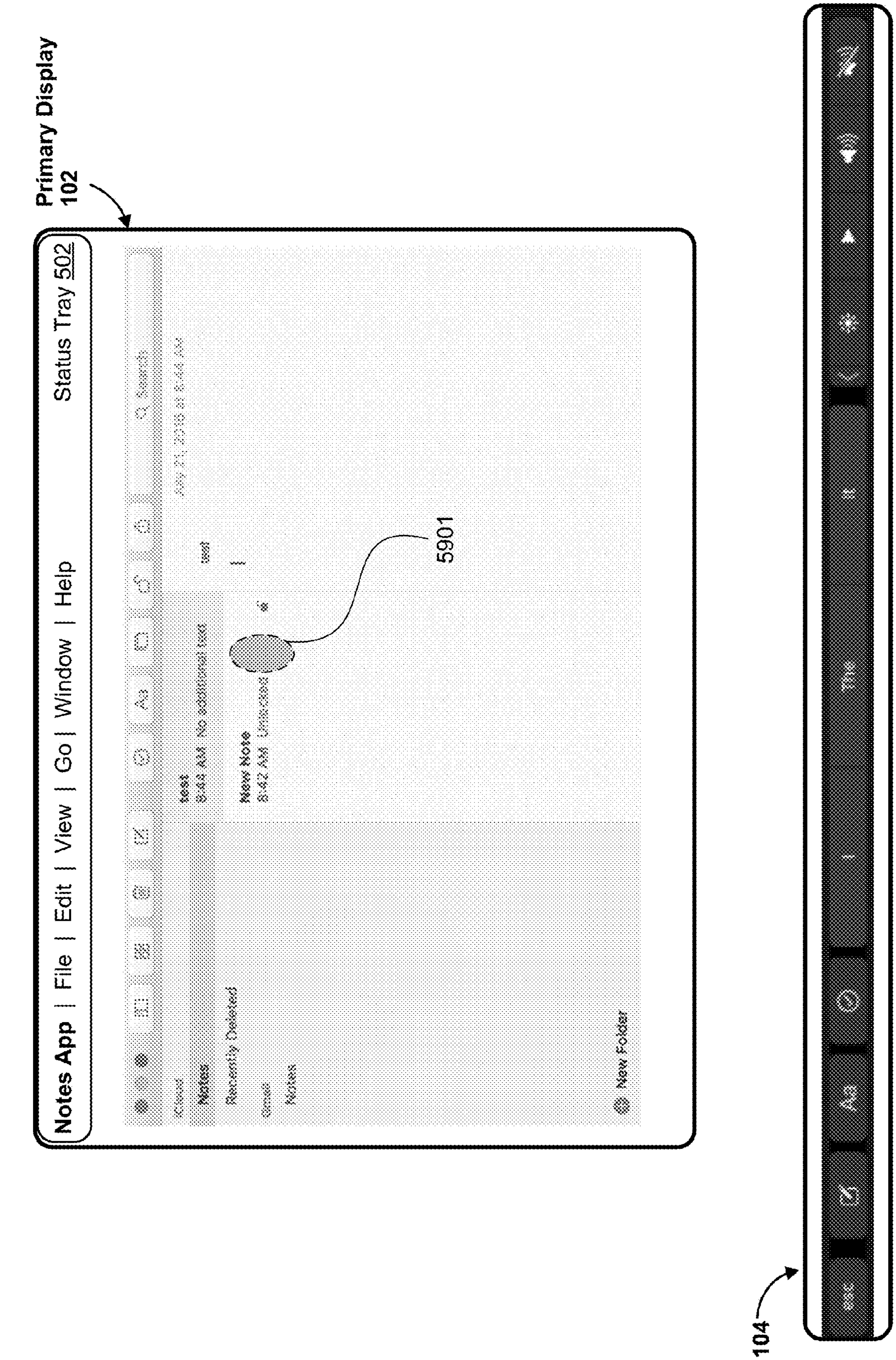
Figure 25B:
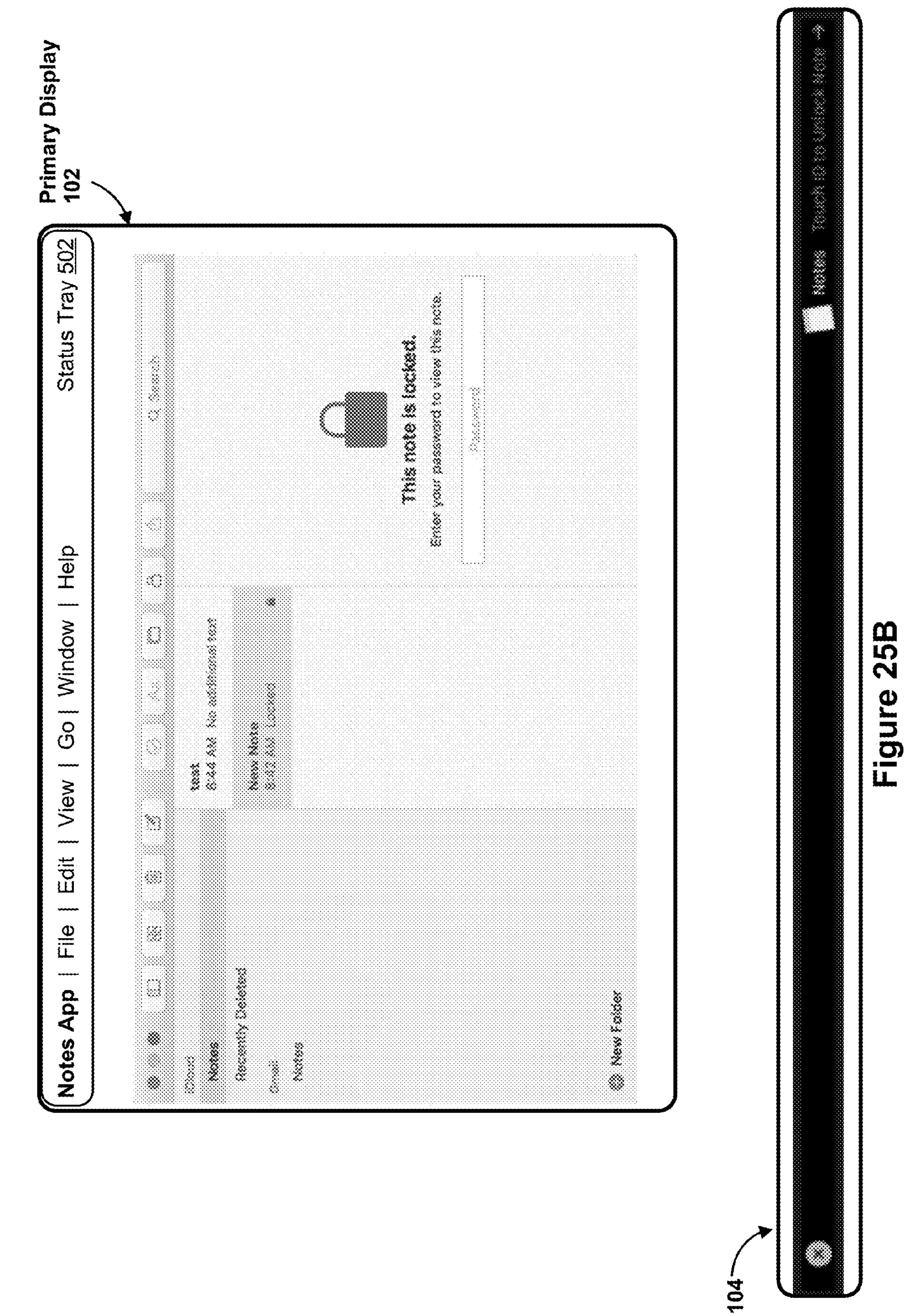
Figure 25C:
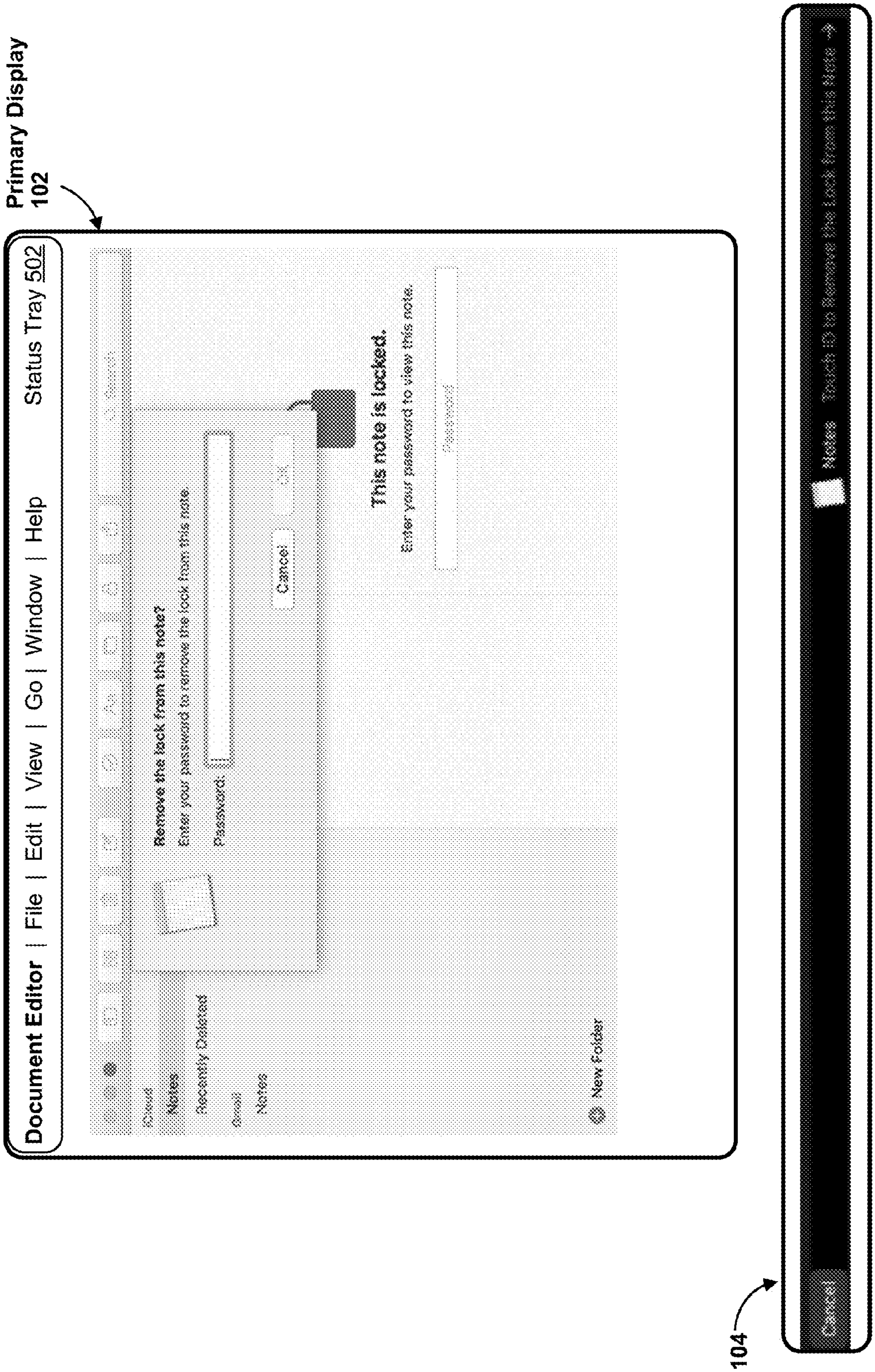

In some embodiments, the touch-sensitive secondary display 104 is populated to include affordances for performing unlock operations. For example, FIG. 25A an input 5901 requesting to access a locked object (e.g., a locked notes file object). In response to detecting the input 5901, the touch-sensitive secondary display 104 ceases to display text-editing and text-suggestion options (as shown in FIG. 25A) and instead displays an instruction that the locked object may be unlocked by providing an authorized fingerprint at (or adjacent to) the touch-sensitive secondary display 104. As shown in FIG. 25B, the touch-sensitive secondary display 104 includes an icon for the Notes application and an instruction to "Touch ID to Unlock Note" along with an arrow instructing the user where the fingerprint should be provided. In this way, the user is able to unlock the locked object by providing a single input (the authorized fingerprint) instead of having to enter a potentially lengthy passcode.

Figure 26A:
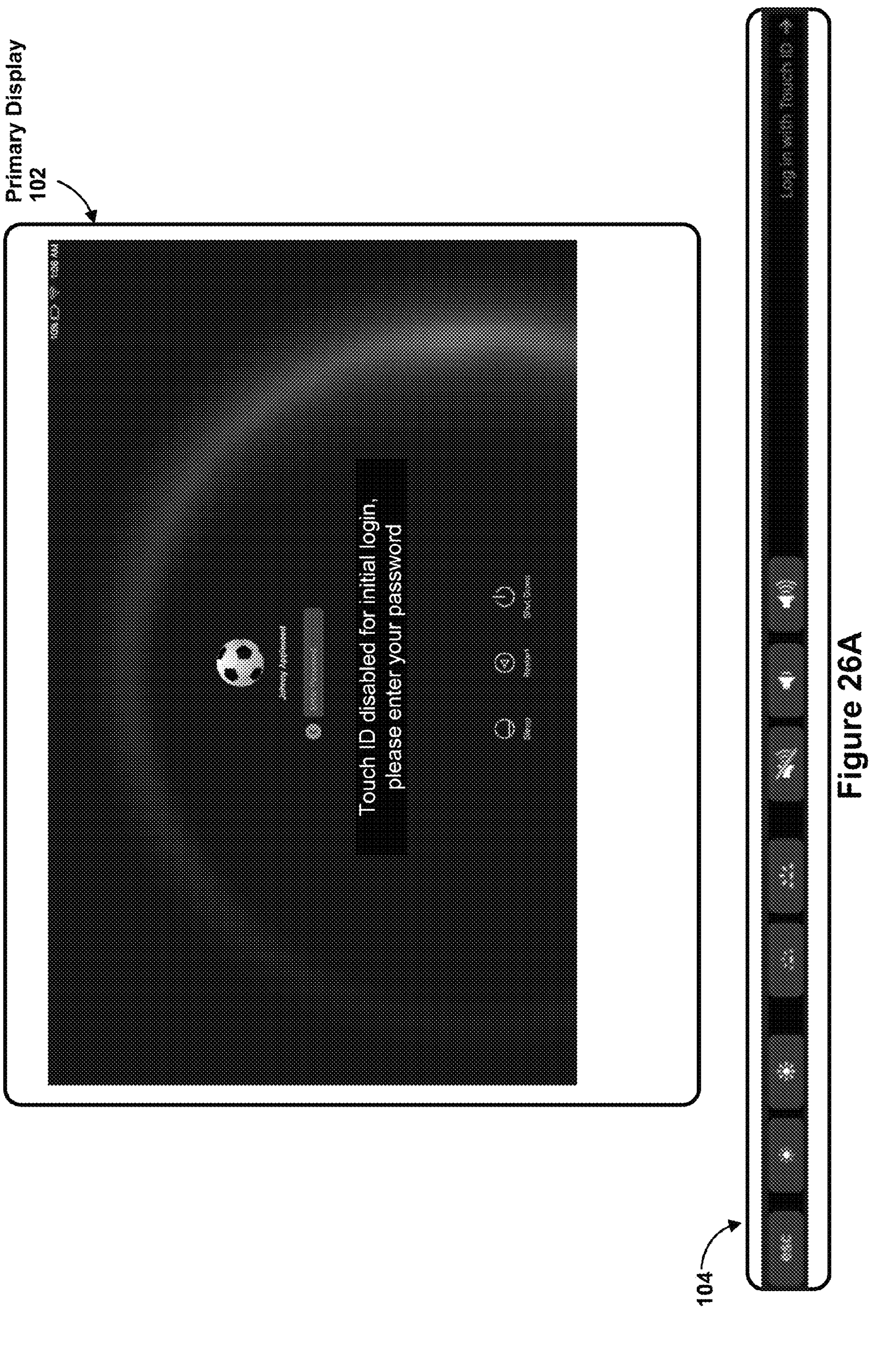
Figure 26B:
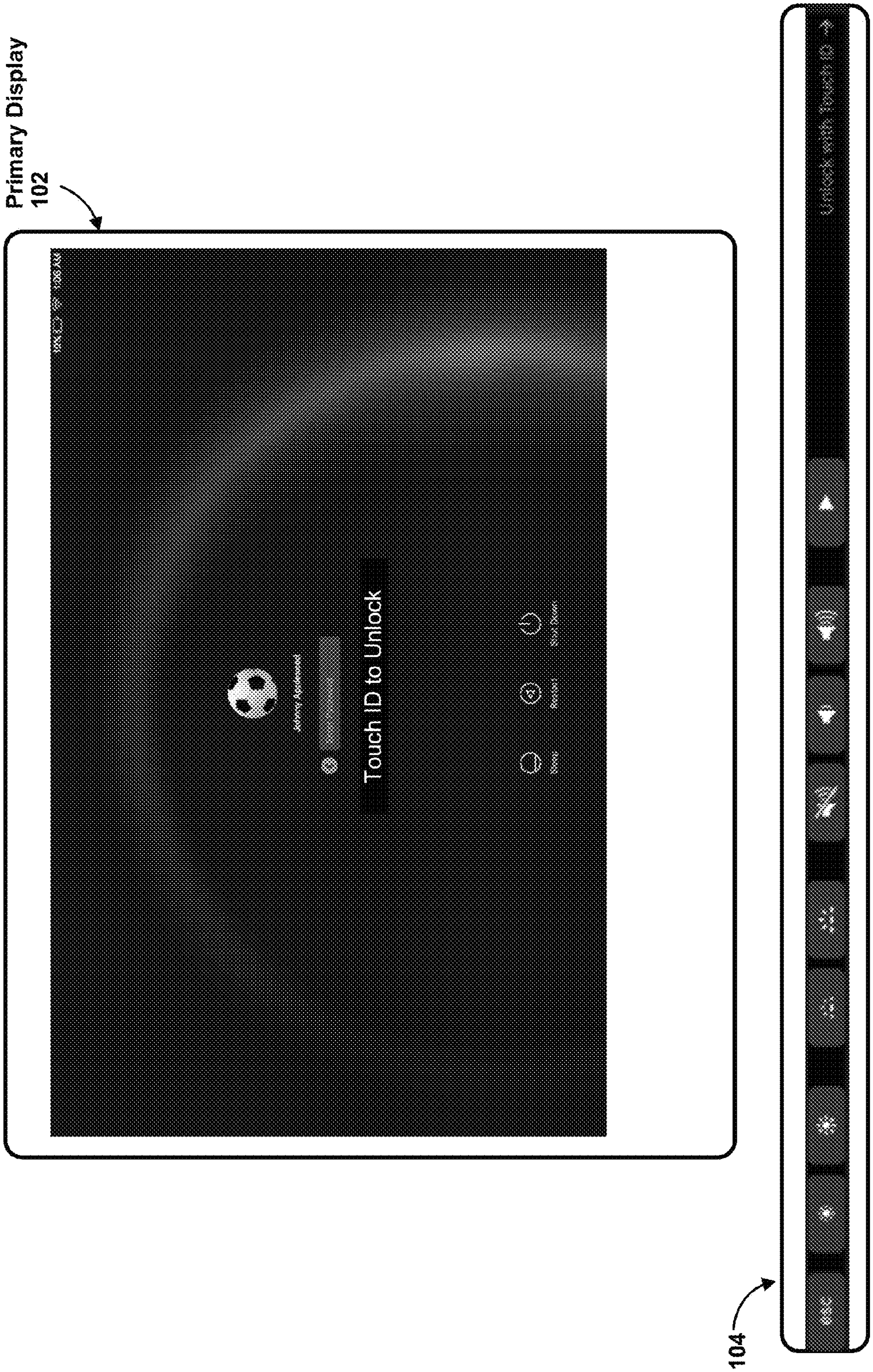
Figure 26C:
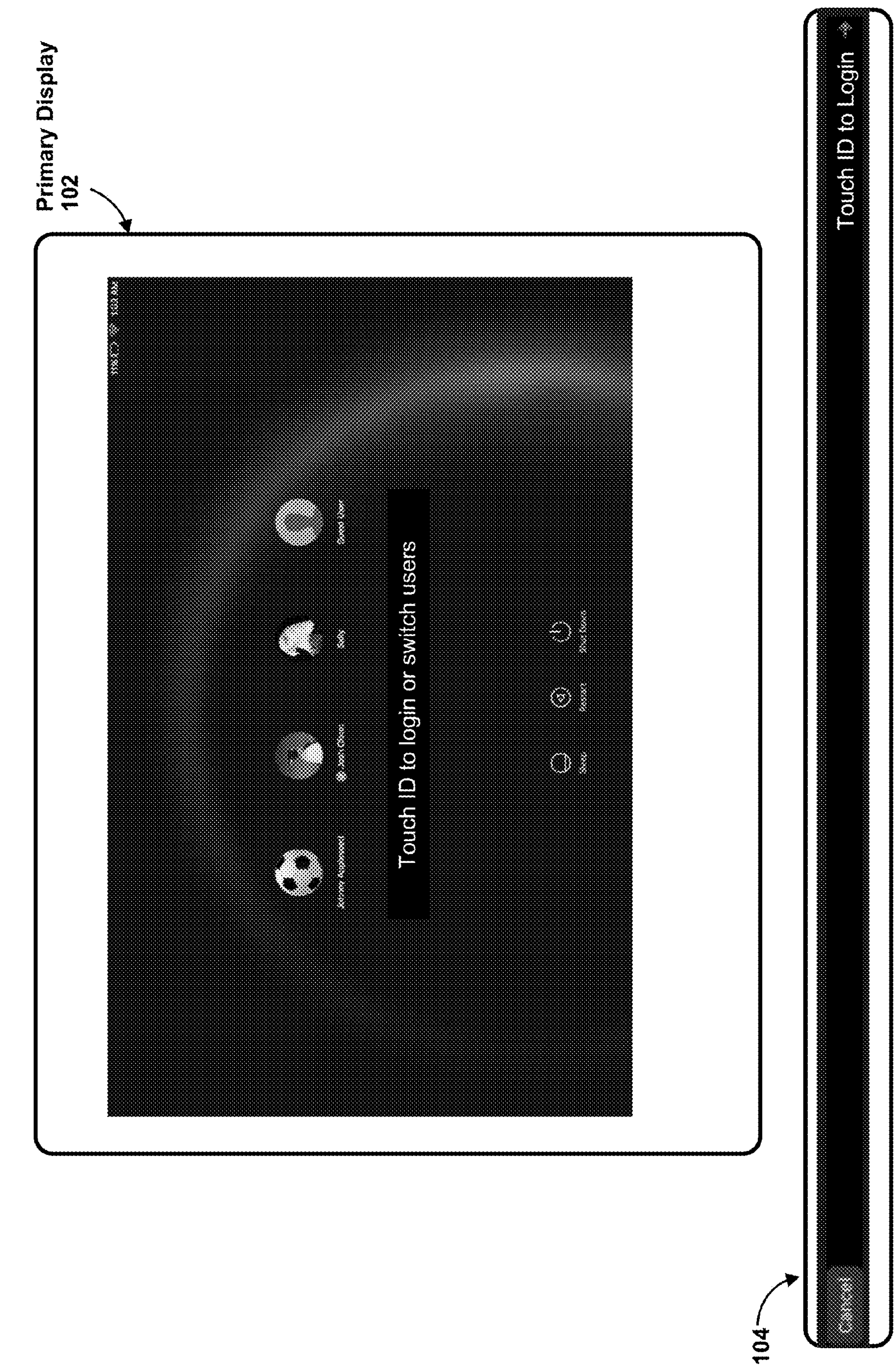
Figure 26D:
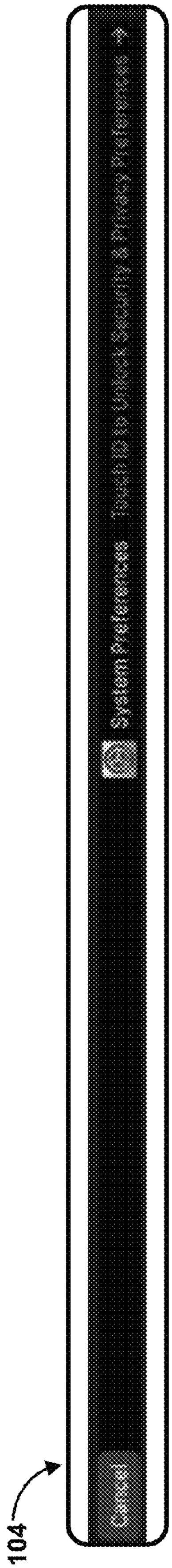
Figure 26E:
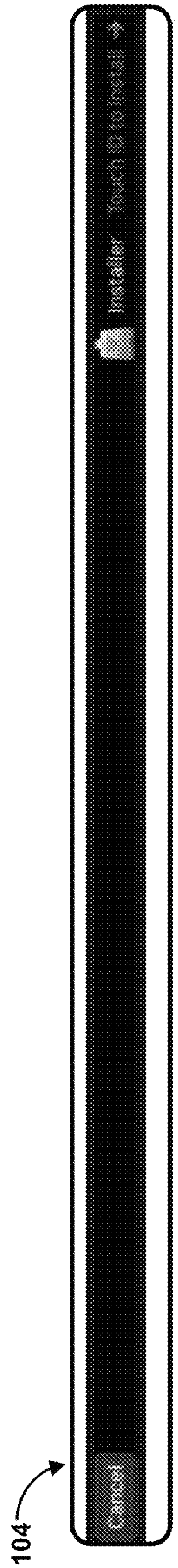

In some embodiments, the touch-sensitive secondary display 104 is also populated to include instructions for performing an unlock function in response to (i) the user accessing a login screen (e.g., as shown in FIG. 26A) or attempting to switch to a different user from the login screen or elsewhere (e.g., as shown in FIG. 26C); (ii) the user exiting from a locked screensaver (e.g., as shown in FIG. 26B); (iii) the user attempting to access a locked system preference (e.g., as shown in FIG. 26D); and (iv) the user attempting to install a new component (e.g., as shown in FIG. 26E).

In some embodiments, if the computing system is associated with at least two users (e.g., the computing system has been configured to have login profiles for each of the at least two users), then when the computing system is initially started up, a login screen is displayed that allows for selecting whether to login as a first or a second of the at least two users. In some embodiments, in response to detecting that a respective user has provided an authorized fingerprint (e.g., at a region of the touch-sensitive secondary display 104 that accepts fingerprints), the computing system matches the authorized fingerprint to one of the first or the second users and then causes the primary display 102 to show a new login screen that is specific to the matched user (e.g., the new login screen asks the respective user to enter a password to gain access to the computing system). In this way, the respective user simply provides a fingerprint instead of having to navigate using a trackpad or mouse to select one of the at least two users from the login screen.

In some embodiments, providing an authorized fingerprint enables the respective user to gain immediate access to the computing system. In some embodiments, an initial login has already been performed (e.g., during the initial login, a password is entered to gain access to the computing system) and the computing system has been locked at a later point in time. If a user then provides an authorized fingerprint to gain access after that later point in time, then in accordance with a determination that the authorized fingerprint matches a valid user of the computing system, then immediate access to the computing system is granted. In some embodiments, when the computing system is locked at the later point in time, at least two users have active login sessions at the computing system (either of these two users is able to simply provide a fingerprint in order to re-gain access to the computing system). Additional details regarding the use of biometric sensors to gain access and perform other functions at the computing system are provided below for methods 2800 and 2900, described below in reference to FIGS. 66 and 67.

In some embodiments, the touch-sensitive secondary display 104 is populated to include affordances for navigating through photos (or other media items), for modifying photos, and for performing other functions available via a photo-editing or photo-browsing application. Some examples are shown in FIGS. 27A-29T.

Figure 27A:
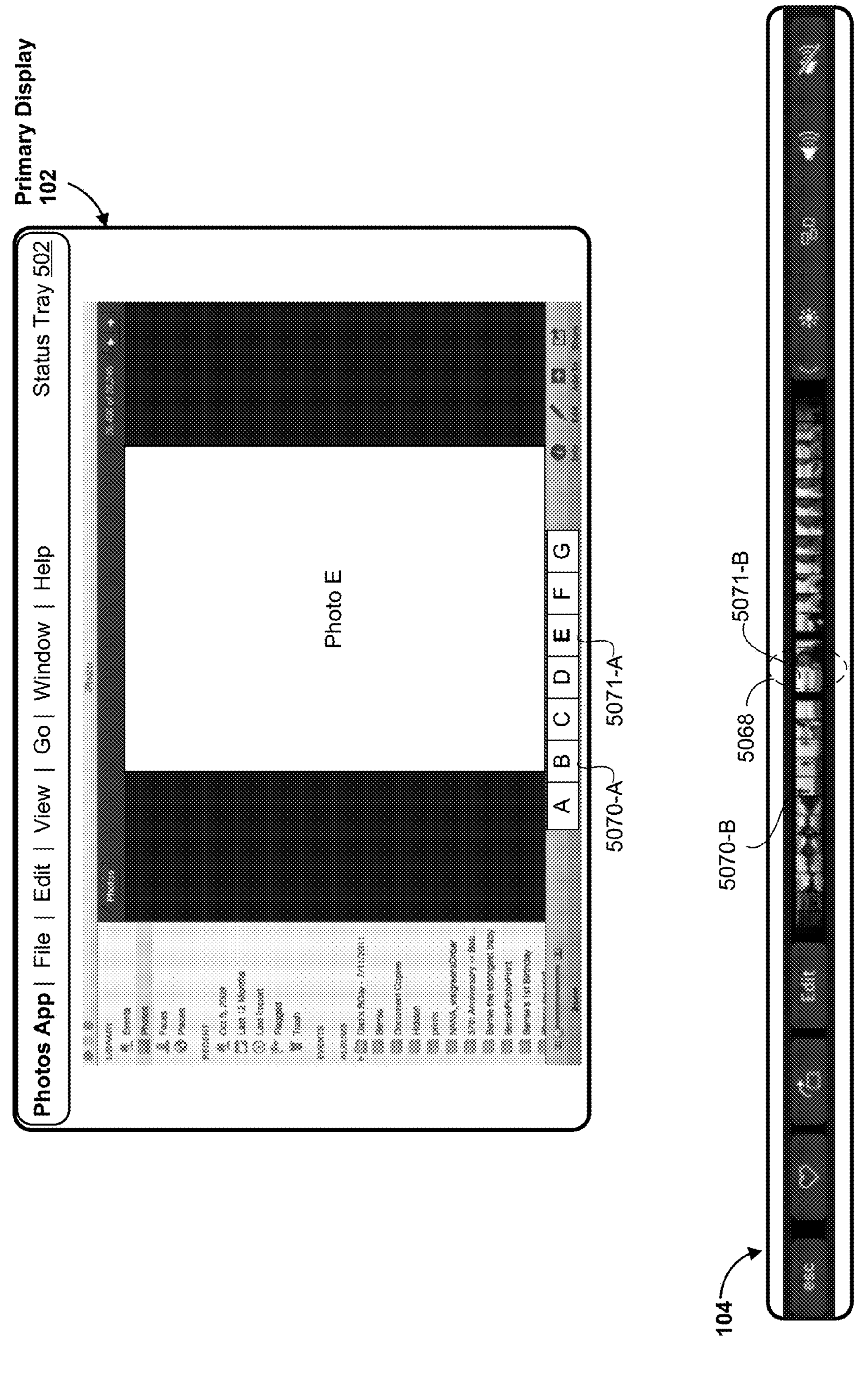

In particular, FIG. 27A shows that, while a user is viewing a plurality of photos associated with a photo-editing application on the primary display 102, the touch-sensitive secondary display 104 is populated to include representations of each of the plurality of photos (e.g., mini-views 5070-B, 5071-B, etc. of each of the plurality of photos), among other options for interacting with the plurality of photos (e.g., to flag one of the photos as a favorite, to rotate a photo, and/or to edit a photo). FIG. 27A illustrates that the photo-editing application is currently displaying "Photo E" and that a respective representation for Photo E in the touch-sensitive secondary display 104 (e.g., representation 5071-B) is displayed in a larger format to provide an indication that Photo E is the currently displayed photo.

Figure 27B:
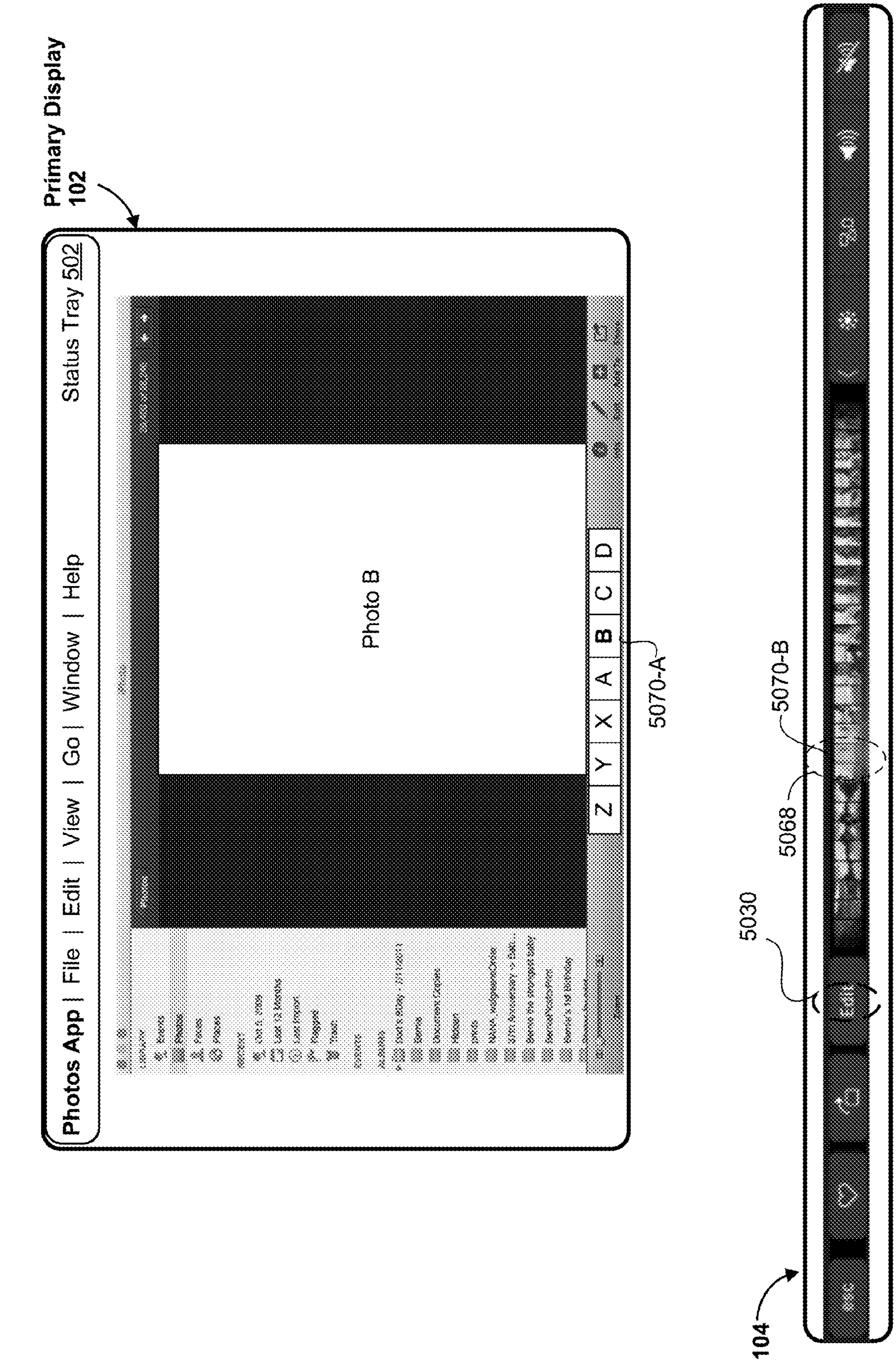

By providing an input at the touch-sensitive secondary display 104 (e.g., a tap or a swipe gesture), the user is able to quickly navigate through the plurality of photos on the primary display 102. For example, as shown in FIG. 27B, the user provides a swipe gesture 5068 at the touch-sensitive secondary display 104 in a substantially right-to-left direction and, in response, both the primary display 102 and the touch-sensitive secondary display 104 are updated in accordance with movement of the swipe gesture 5068. As the swipe gesture 5068 travels across the touch-sensitive secondary display 104, the photos shown on the primary display 102 are updated based on which representations are contacted by the swipe gesture 5068 in the touch-sensitive secondary display 104 (as shown in FIG. 27B).

Figures 27C, 27D, 27E, 27F, 27G:
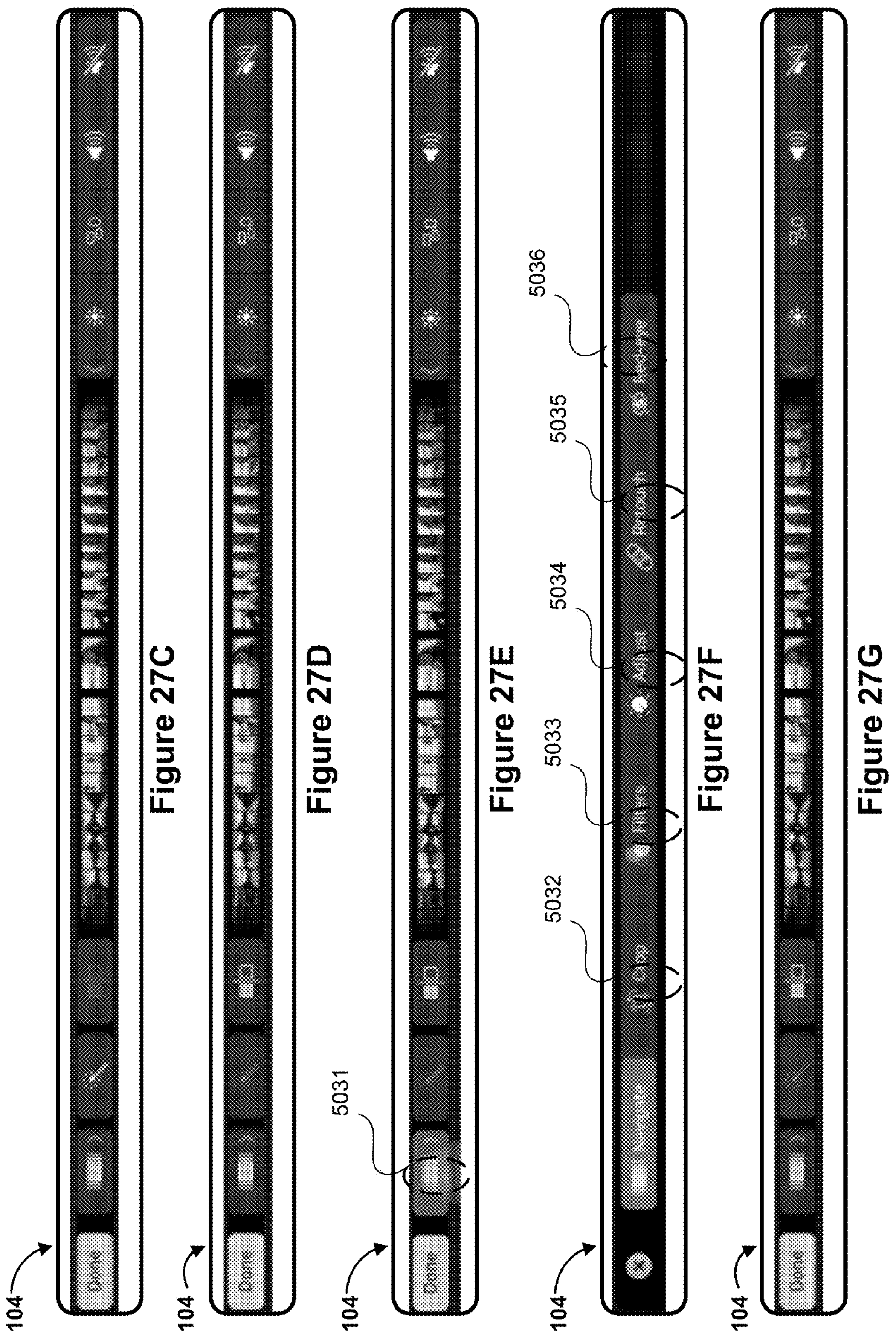
Figure 27H:
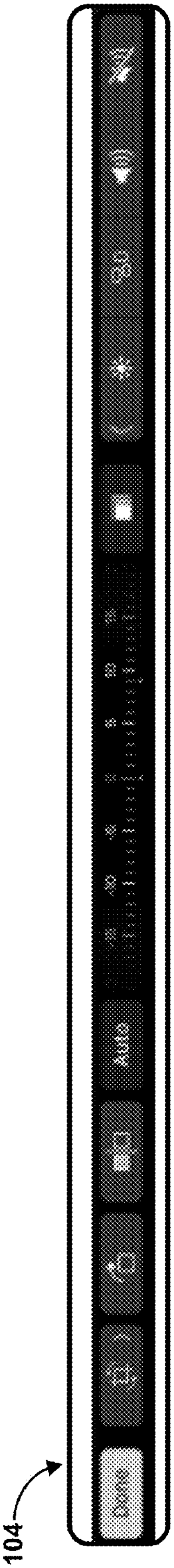
Figure 27I:
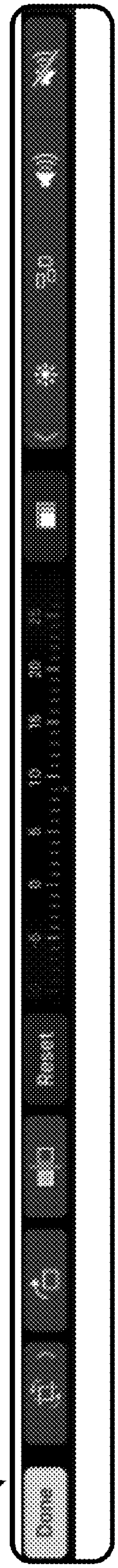
Figure 27J:
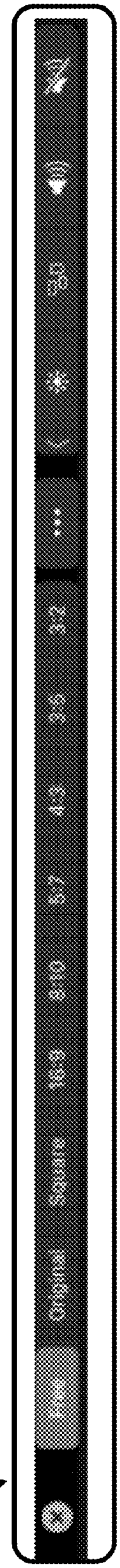
Figure 27K:
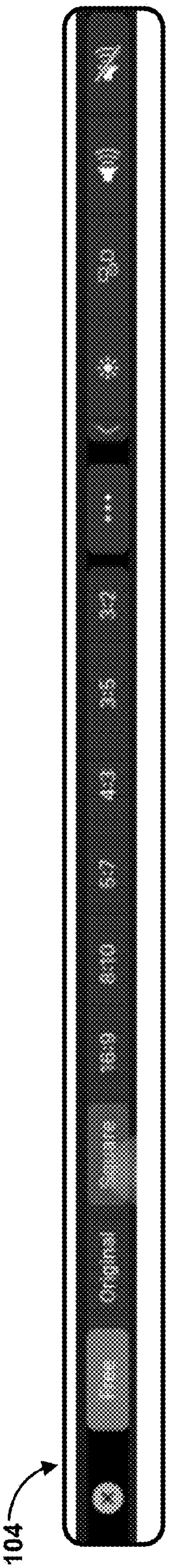

FIG. 27B also illustrates a selection of an edit button on the touch-sensitive secondary display 104 (e.g., via input 5030). In response to the input 5030, the touch-sensitive secondary display 104 is updated to include photo-editing options (e.g., as shown in FIG. 27C) for the currently selected photo shown on the primary display 102. In some embodiments, in response to a selection of a respective photo-editing option, the touch-sensitive secondary display 104 is updated to reflect the selection (e.g., as shown in FIG. 27D for an enhance affordance).

In response to a selection of a tool navigation affordance (e.g., via input 5031, FIG. 27E), the touch-sensitive secondary display 104 is updated to include additional editing tools, including "Crop," "Filters," "Adjust," "Retouch," and "Red-eye" editing functions. In some embodiments, the touch-sensitive secondary display 104 also includes an "x" icon that, when selected, causes the touch-sensitive secondary display 104 to ceases to display overlaid content (e.g., as shown in FIG. 27G, the overlaid content is no longer displayed in response to selection of the “x” icon).

Returning to the discussion of FIG. 27F, the user is able to select any of the additional editing tools shown on the touch-sensitive secondary display 104. In some embodiments, the selection is performed by tapping on one of the additional editing tools (e.g., using any one of inputs 5032, 5033, 5034, 5035, and 5036). In some embodiments, the user may press and hold an input over the tool navigation affordance (e.g., input 5031, FIG. 27E is a press and hold input) and the user then slides the input 5031 towards a desired one of the additional editing tools (e.g., the inputs 5032-5036 correspond to either a liftoff of input 5031 or any additional press to indicate a selection). FIGS. 27H-27K illustrate example controls available after input 5032 of the crop tool (in some embodiments, these controls include controls for rotating an object (FIGS. 27H-27I) and controls for modifying an aspect ratio for an object (FIGS. 27J-27K)).

Figure 27L:
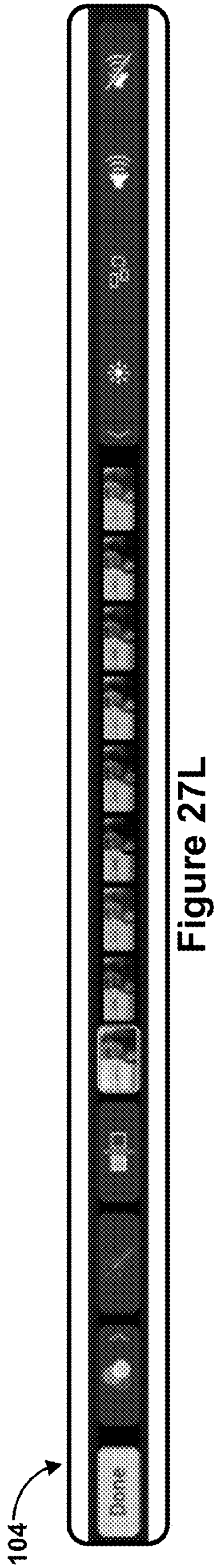
Figure 27M:
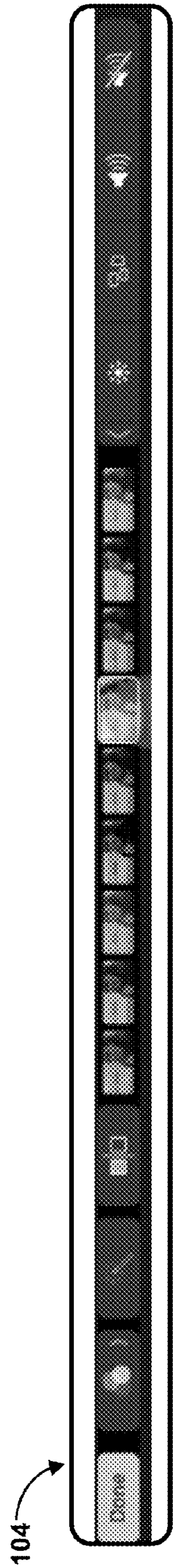
Figure 27N:
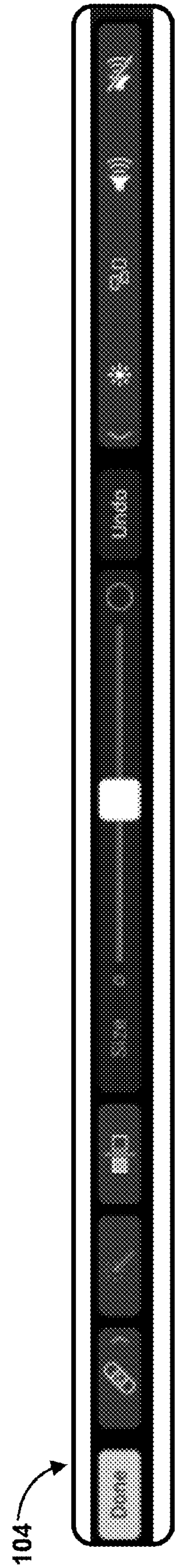
Figure 27O:
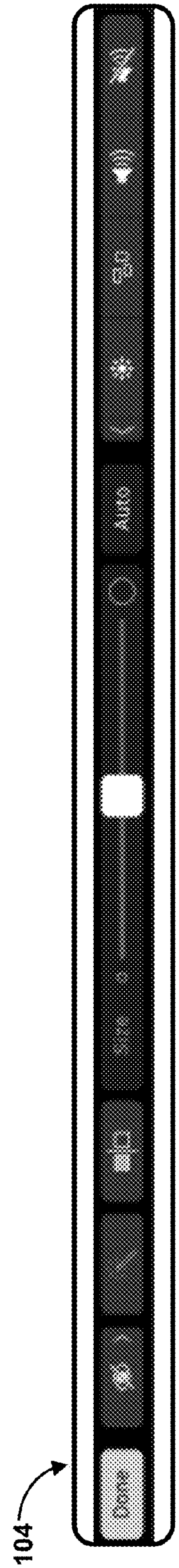

Turning now to FIGS. 27L-27M, example controls that are available in response to input 5033 over a filters tool are shown in the touch-sensitive secondary display 104. As to inputs 5035 and 5036, example controls displayed in the touch-sensitive secondary display 104 in response to these inputs are provided in FIG. 27N (retouch controls) and 27O (red-eye controls), respectively.

Figure 28A:
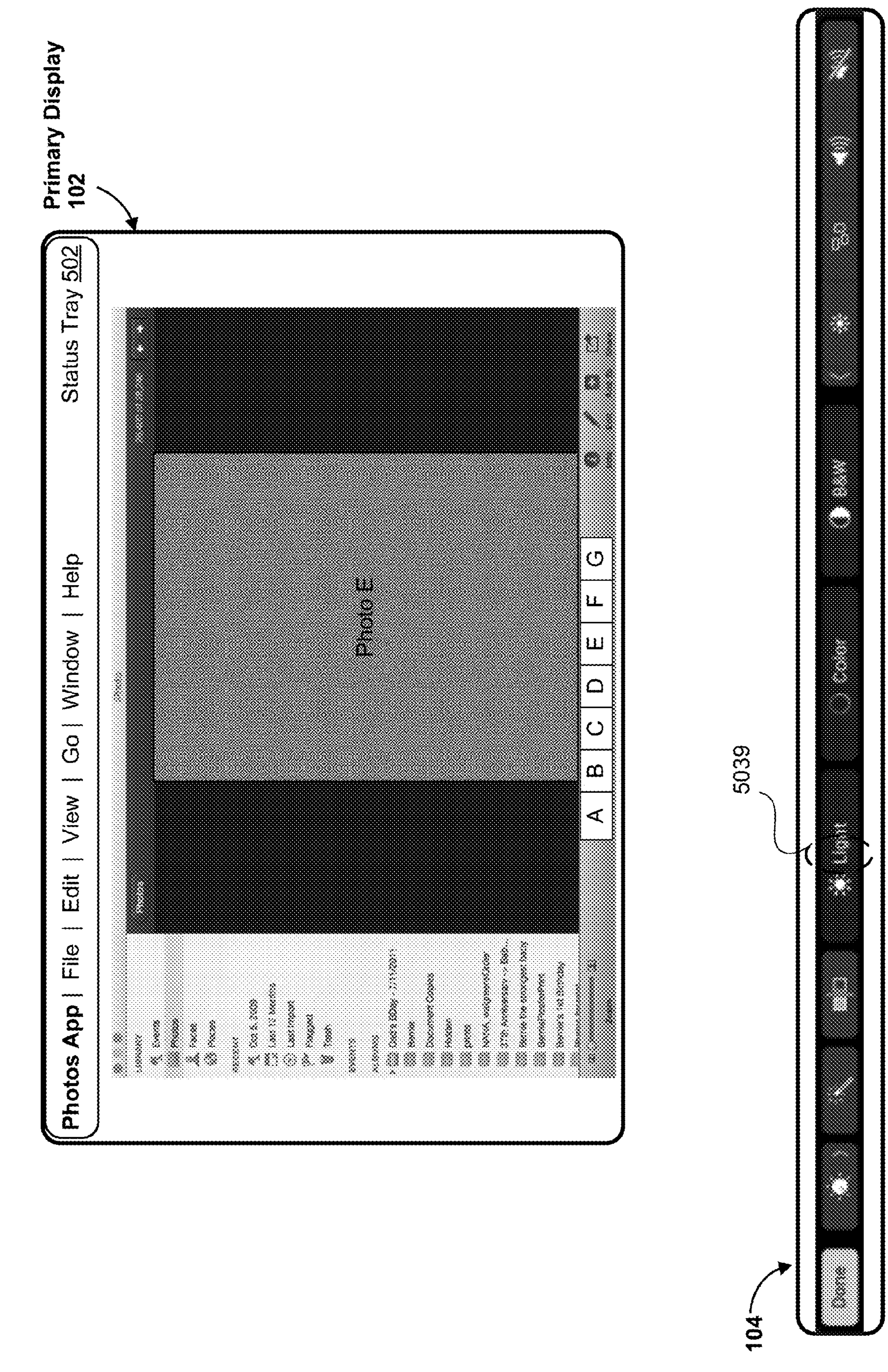
Figure 28B:
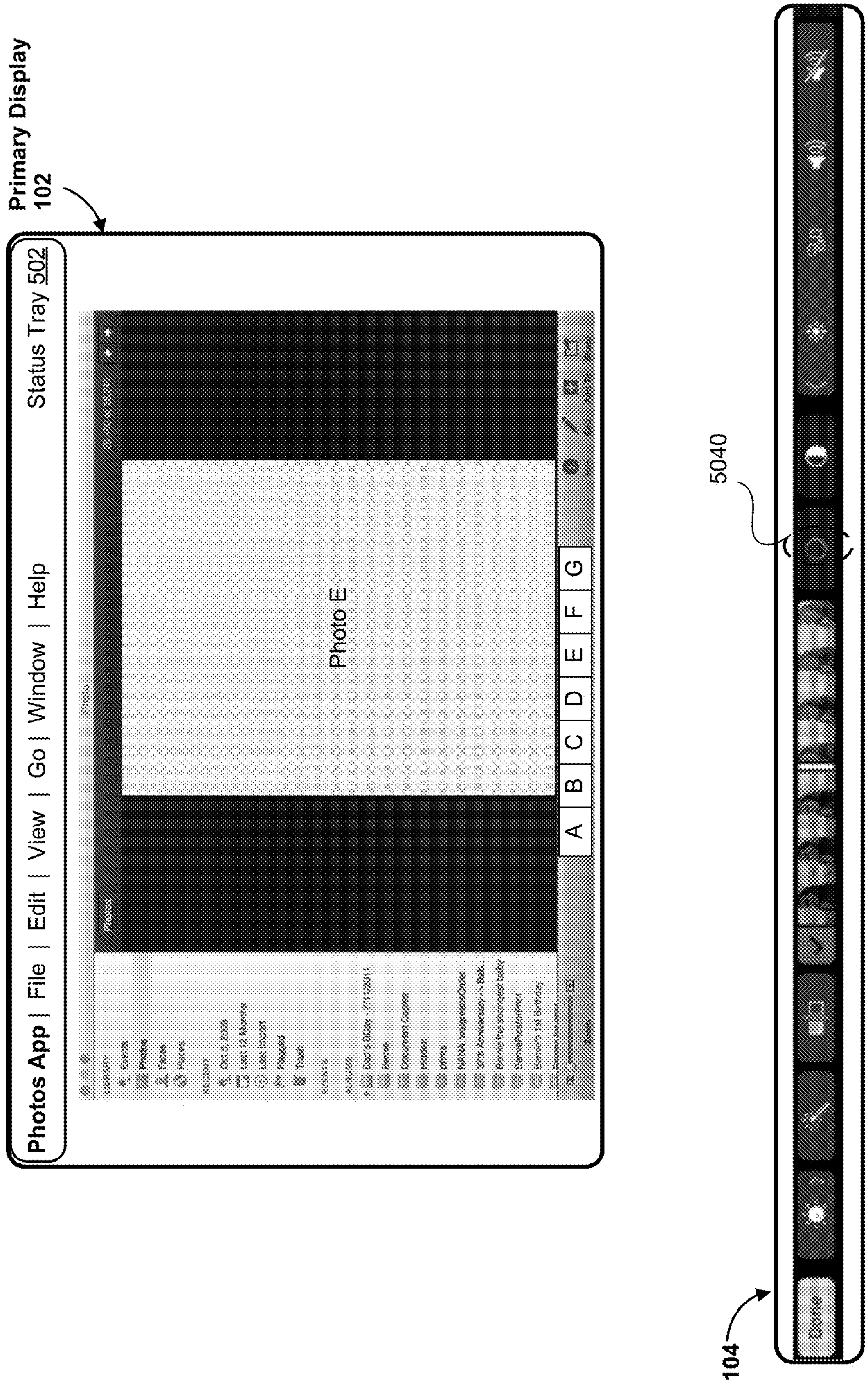
Figure 28C:
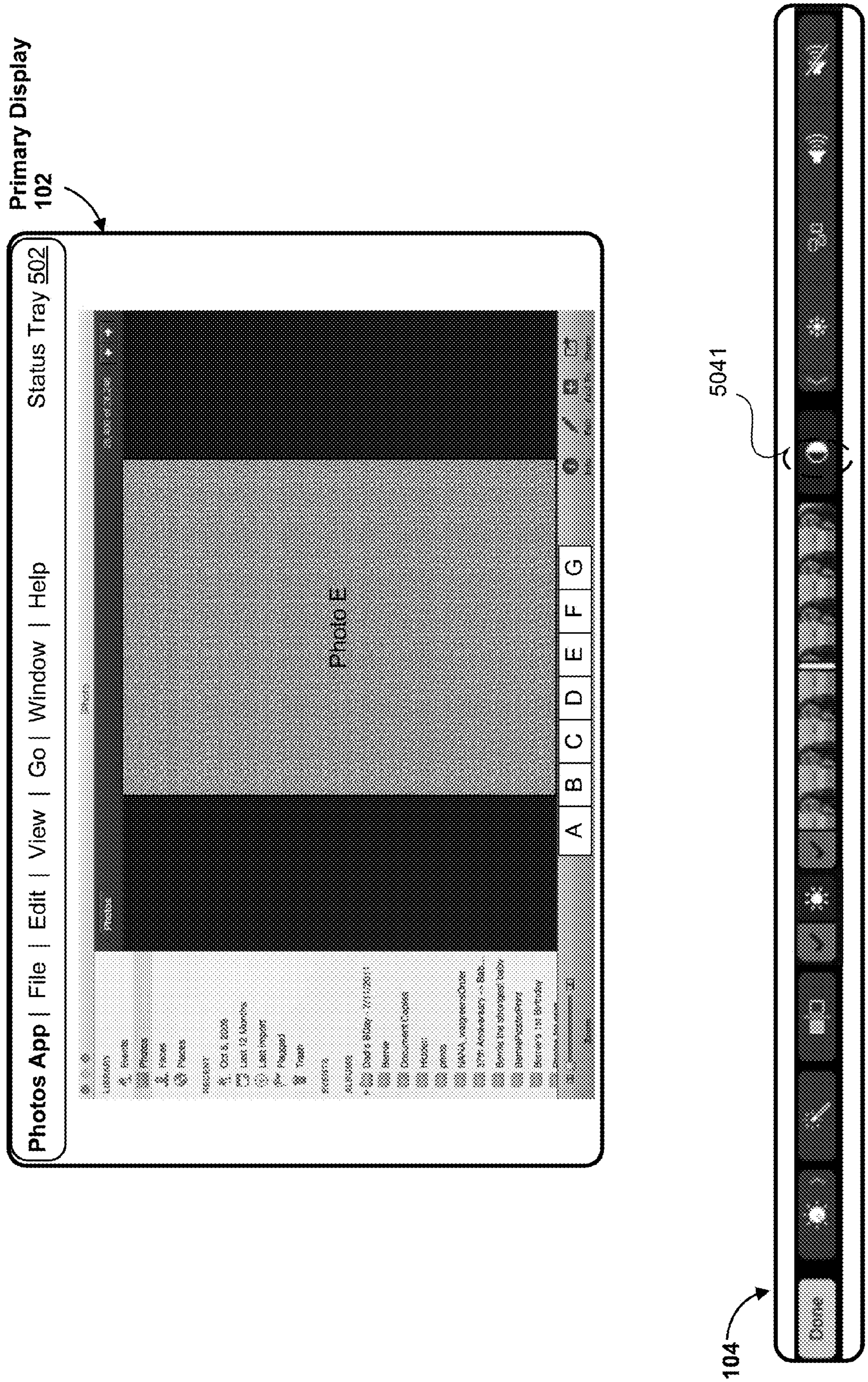
Figure 28D:
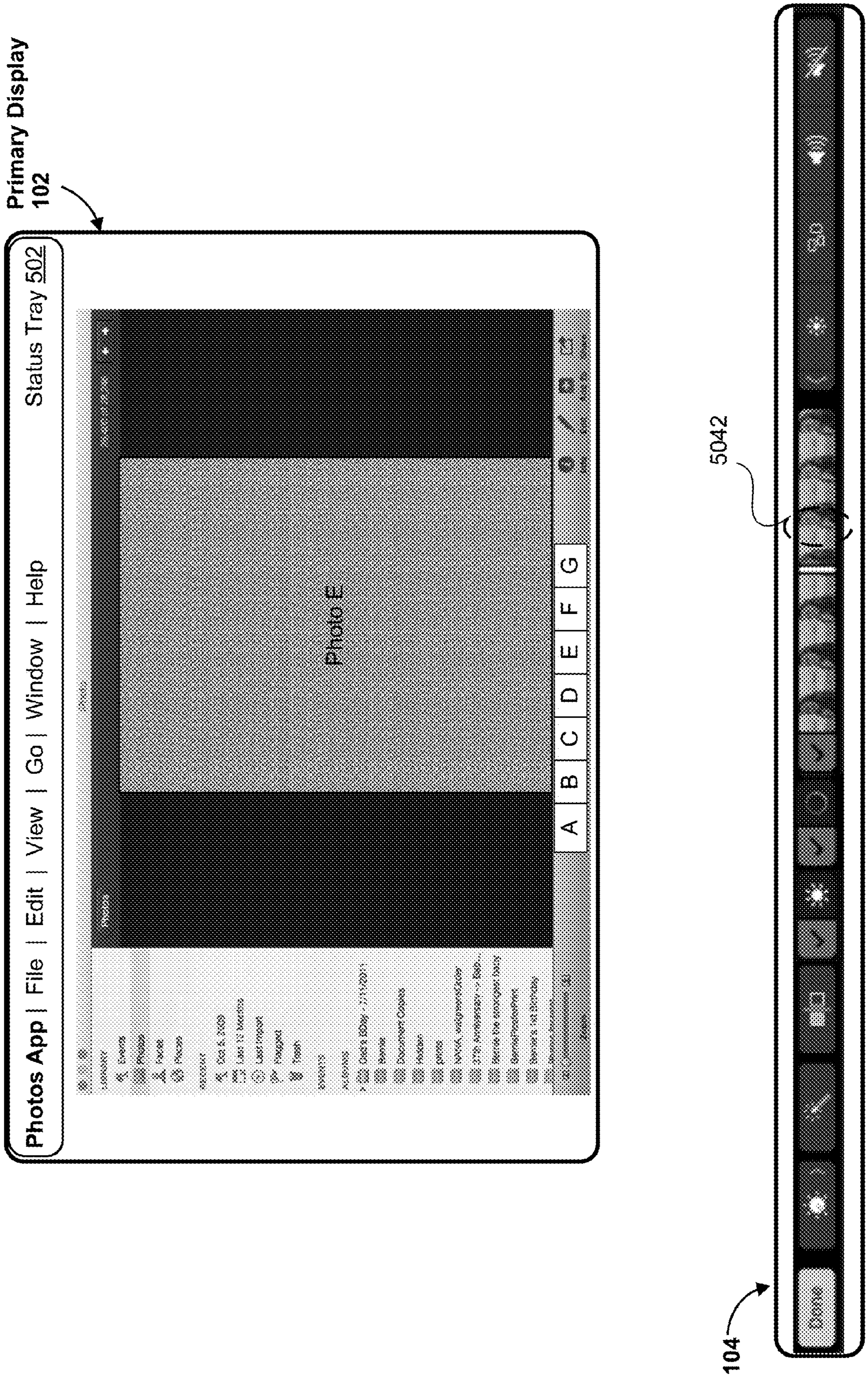
Figure 28E:
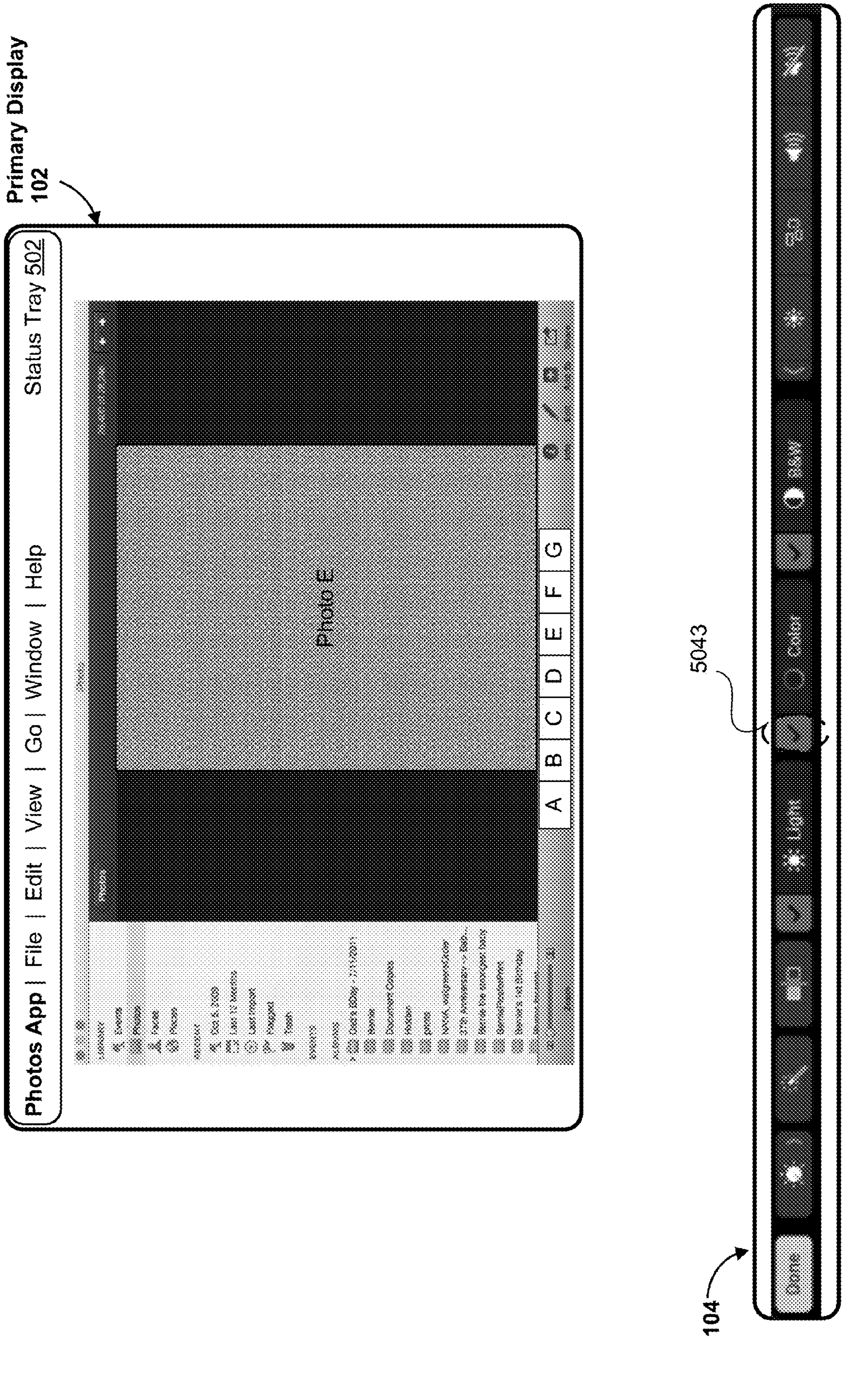

Turning now to FIG. 28A, example adjustment controls that are displayed in response to input 5034 in the touch-sensitive secondary display 104 are shown. As shown in FIG. 28A, the adjustment controls include controls for modifying light, color, and contrast (“B&W”) aspects of an image. In response to each of inputs 5039, 5040, and 5041 (FIGS. 28A, 28B, 28C, respectively), the touch-sensitive secondary display 104 is updated to include a slider control that allows for modifying light, color, and contrast, respectively, for an image (as shown in FIGS. 28A-28C, a photo displayed on the primary display 102 is updated as a respective slider control is modified at the touch-sensitive secondary display 104).

Figure 28F:
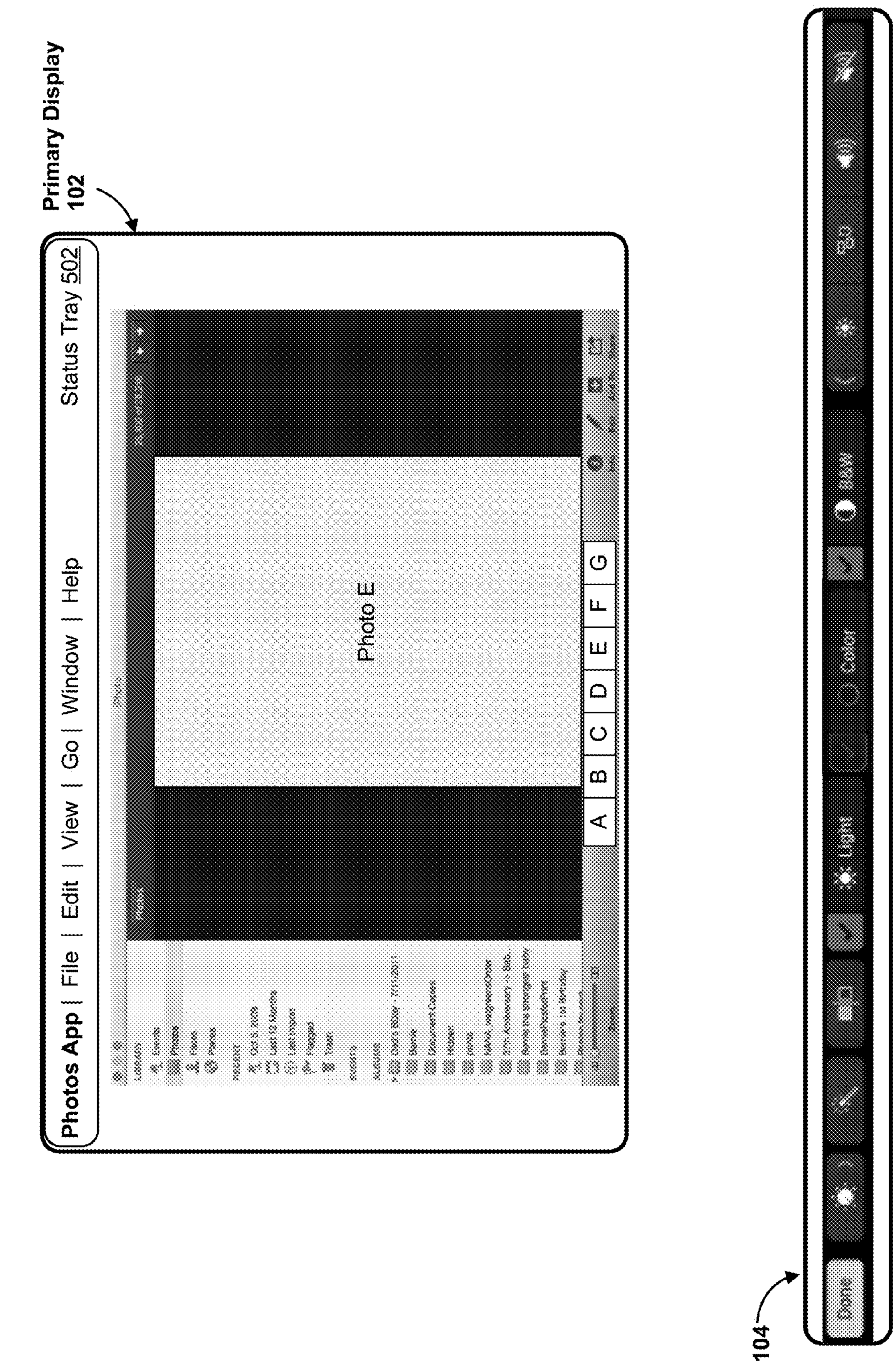
Figure 28G:
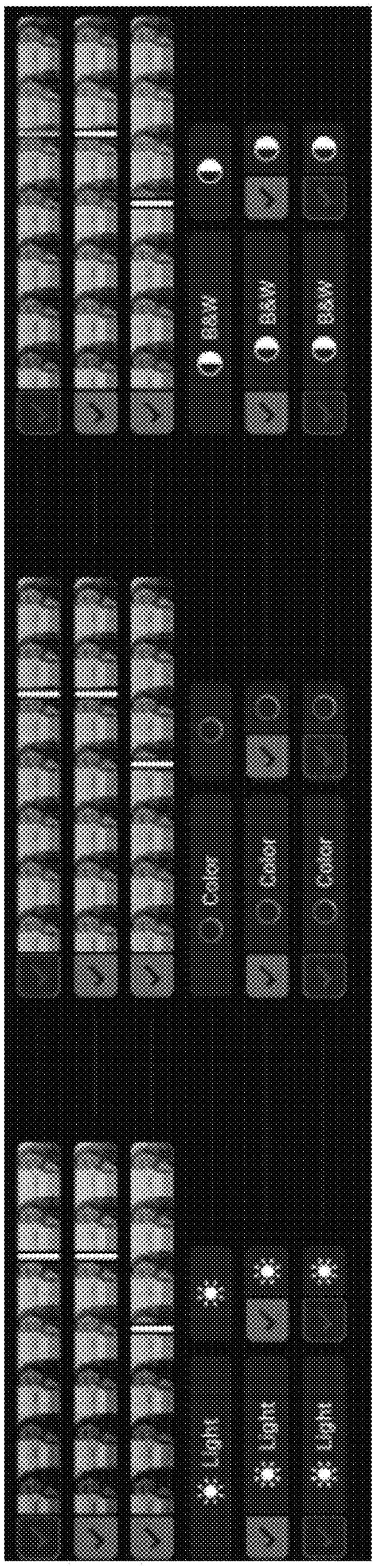

In some embodiments, after a respective slider control is modified in the touch-sensitive secondary display 104, a checkmark that is highlighted using blue is displayed to indicate that a photo displayed on the primary display 102 has been rendered using the modification. In some embodiments, users are easily able to revert modifications by tapping at the checkmark (e.g., in response to input 5043 at the checkmark for the color slider control, Photo E is no longer rendered using the color modifications and the blue highlighting at the touch-sensitive secondary display 104 is no longer presented, as shown in FIG. 28F). FIG. 28G provides an overview of various presentation states for each of the light, color, and contrast slider controls.

Figure 28H:
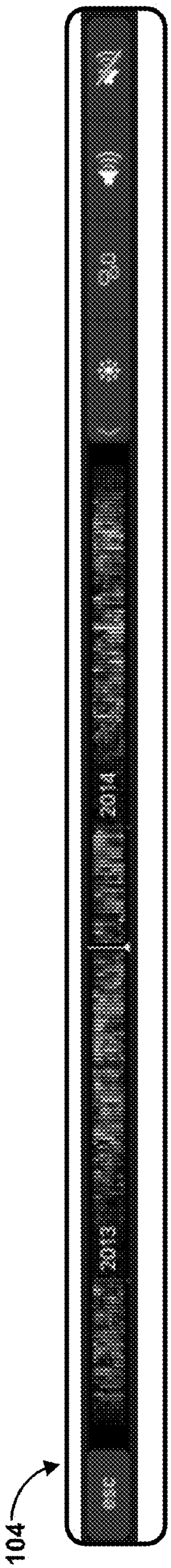
Figure 28I:
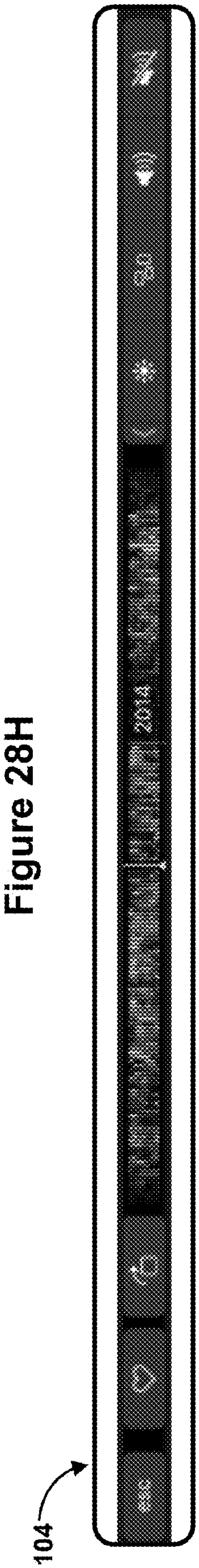
Figure 28J:
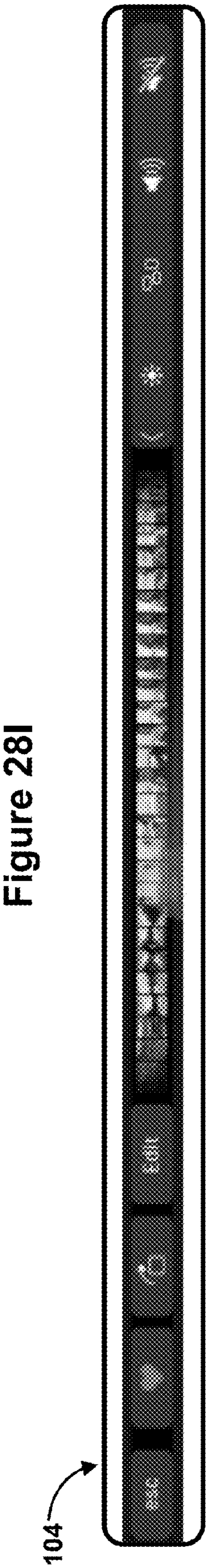
Figure 28K:
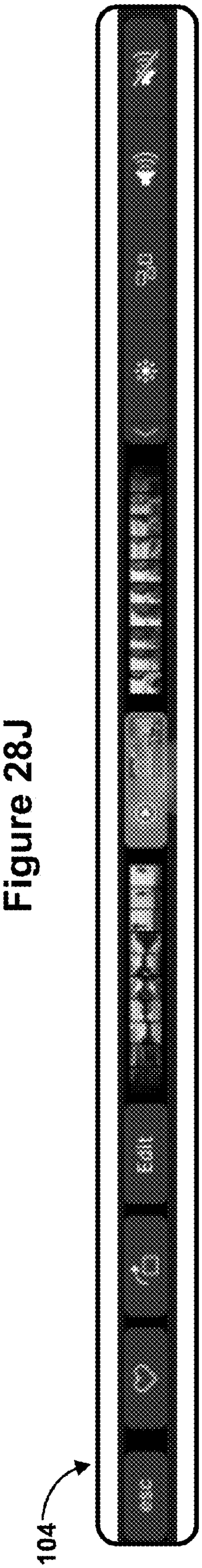
Figure 28L:
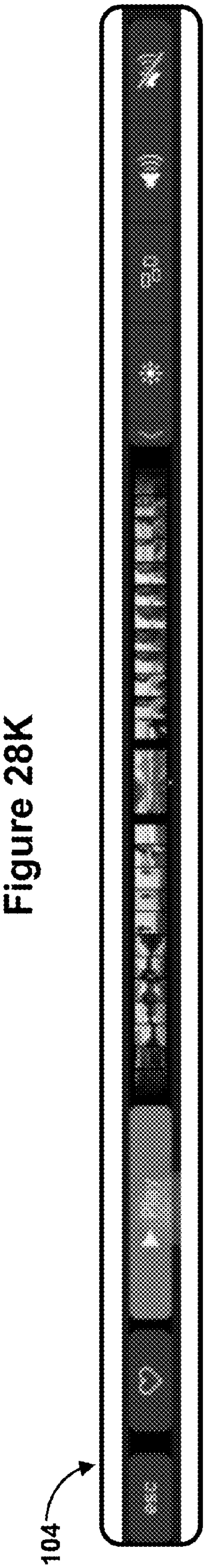

Additional examples of controls displayed in the touch-sensitive secondary display 104 and used to browse through photos are shown in FIGS. 28H-28L. In particular: FIG. 28H illustrates controls displayed in the touch-sensitive secondary display 104 for navigating through photos at a years/collections level; FIG. 28I illustrates that, in response to a selection of a photo while browsing through photos at the years/collections level, the touch-sensitive secondary display 104 includes additional options (including a favorites icon and a rotation icon); FIG. 28J illustrates a selection of the favorites icon while browsing through individual photos; FIG. 28K illustrates that if a representation of a live photo is contacted while navigating through photos (and, in some embodiments, after a scrubber comes to rest at the representation of the live photo), then a different scrubber representation is presented; and FIG. 28L illustrates that if a representation of a video is contact while navigating through photos (and, in some embodiments, after a scrubber comes to rest at the representation of the video), then another different scrubber representation is presented and a play button is provided to allow for playback of the video.

Figure 28M:
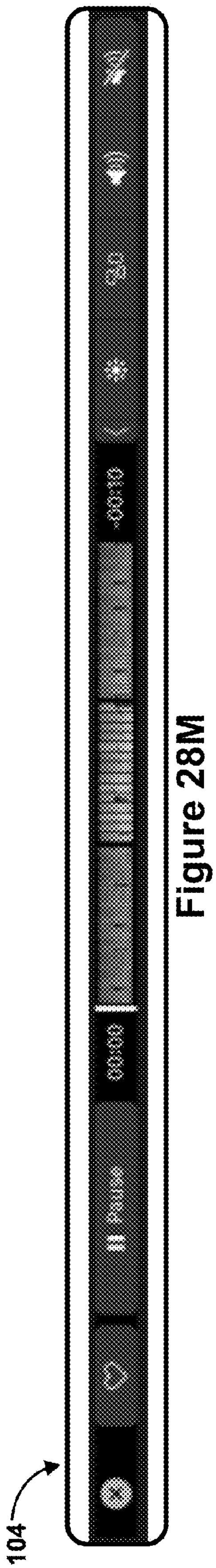
Figure 28N:
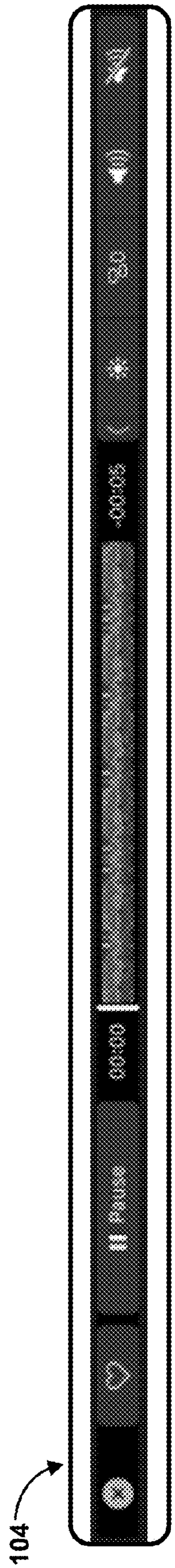
Figure 28O:
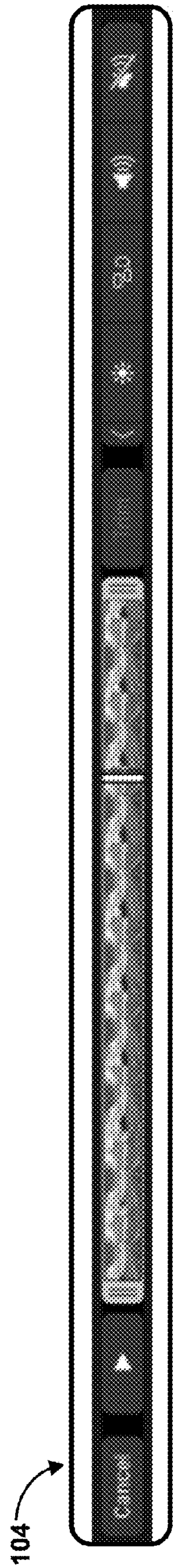
Figure 28P:
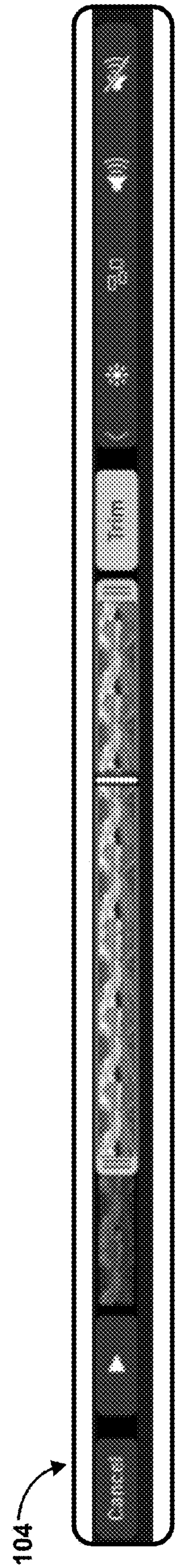

In some embodiments, the representations that are displayed in the touch-sensitive secondary display 104 are presented differently for various types of videos (e.g., an example for a slo-mo video is shown in FIG. 28M and an example for a regular video is shown in FIG. 28N). Some embodiments also allow for trimming videos directly from the touch-sensitive secondary display 104 (e.g., as shown in FIGS. 280-28P).

Figure 29A:
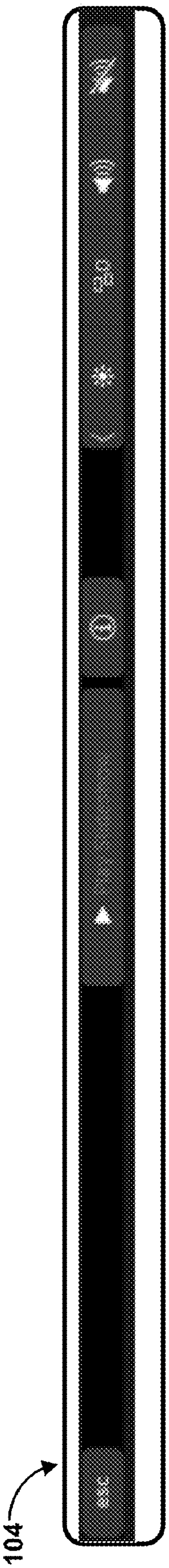
Figure 29B:
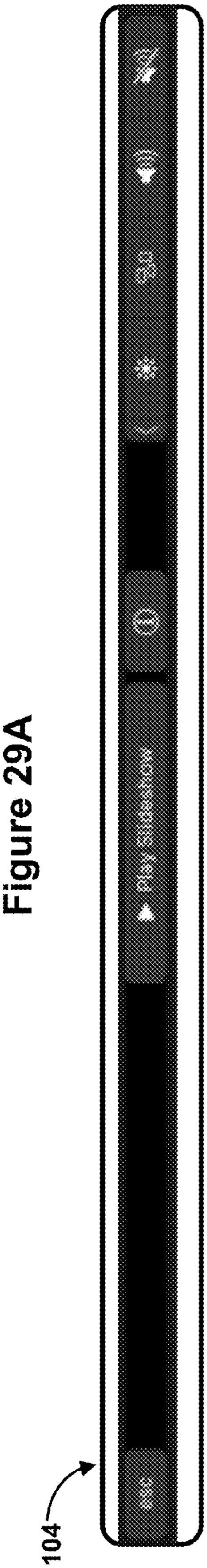
Figure 29C:
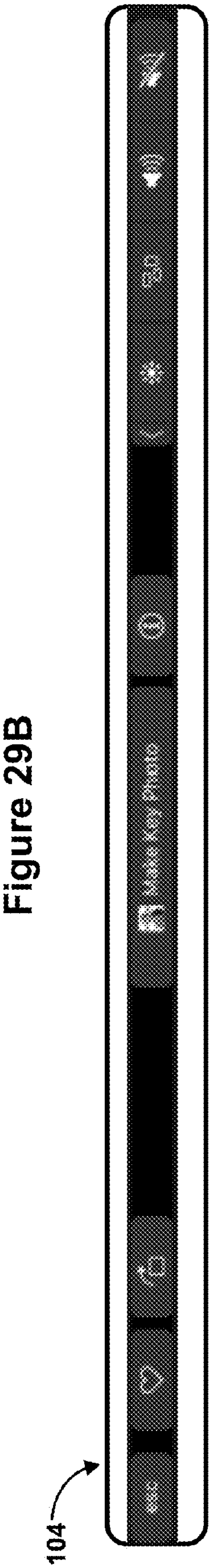
Figure 29D:
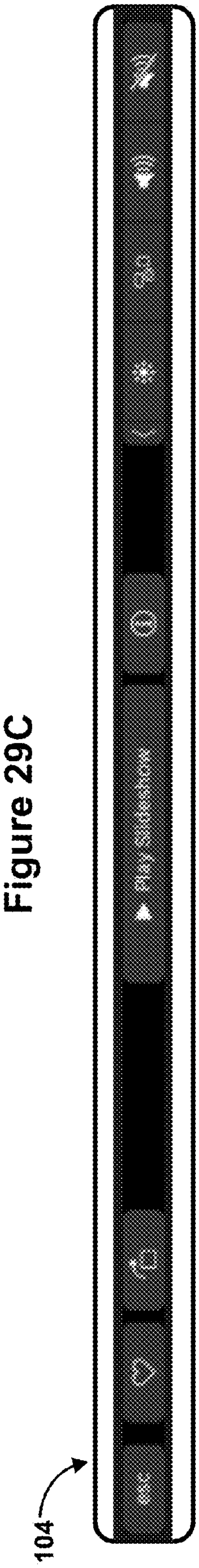
Figure 29E:
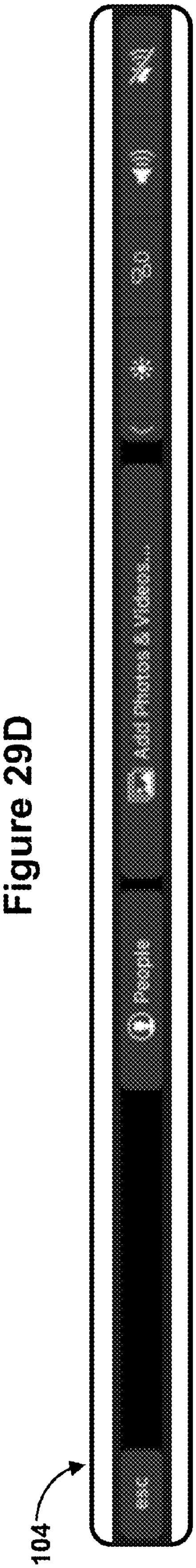
Figure 29F:
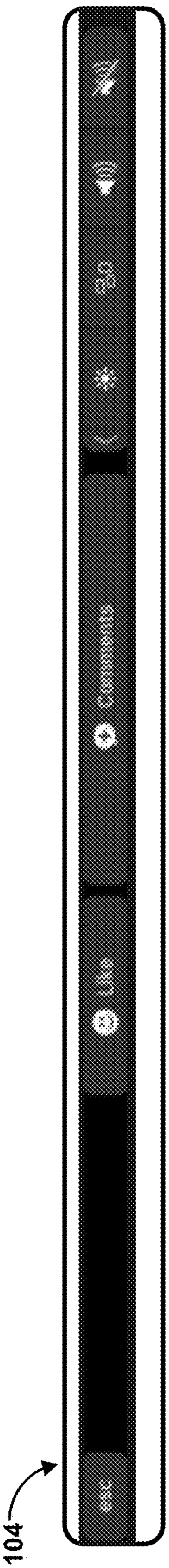
Figure 29G:
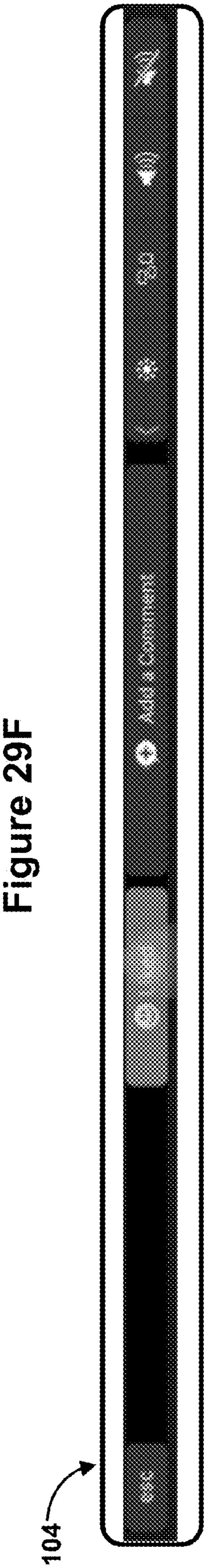
Figure 29H:
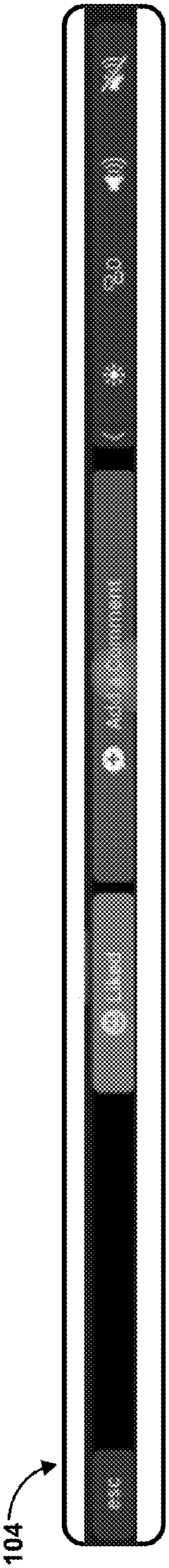
Figure 29I:
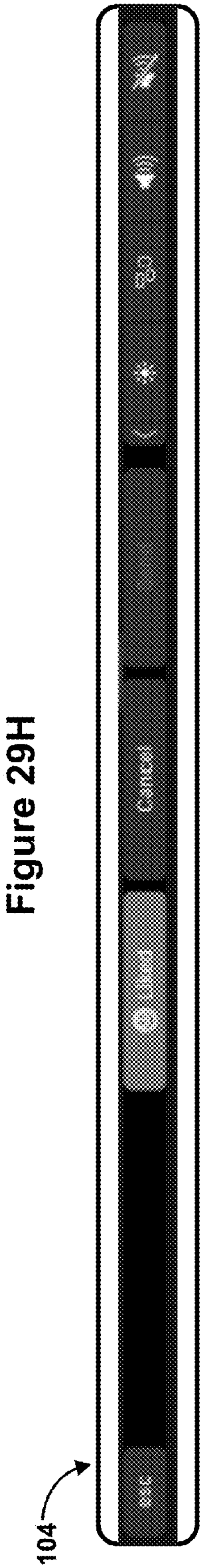
Figure 29J:
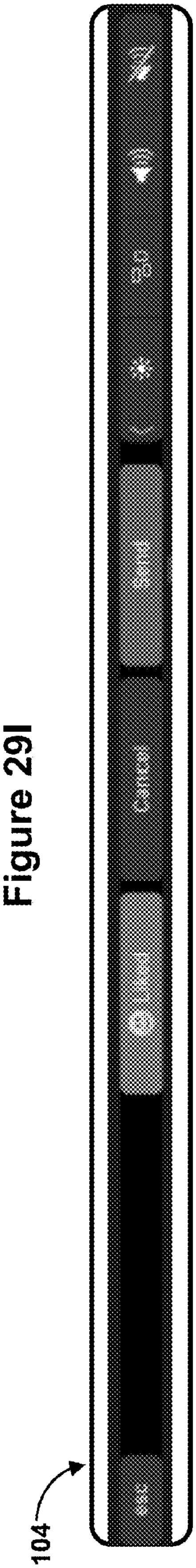

In some embodiments, controls displayed within the touch-sensitive secondary display 104 are provided while navigating through an albums tabs in a photos application (e.g., as shown in FIGS. 29A-29D), while navigating through a shared tab in a photos application (e.g., as shown in FIGS. 29E), and while navigating through an activity tab of a photos application (e.g., as shown in FIG. 29F-29J).

Figure 29K:
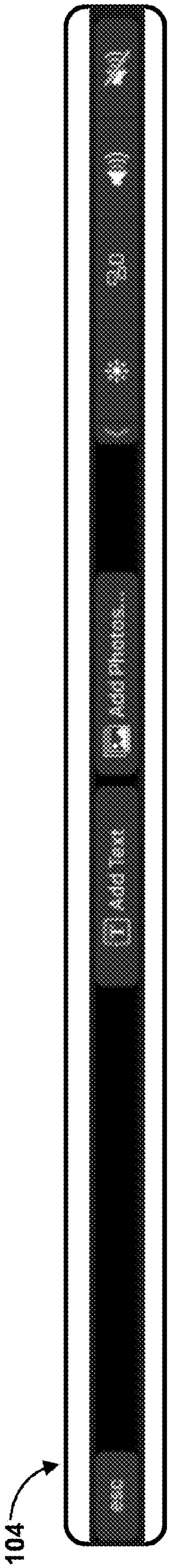
Figure 29L:
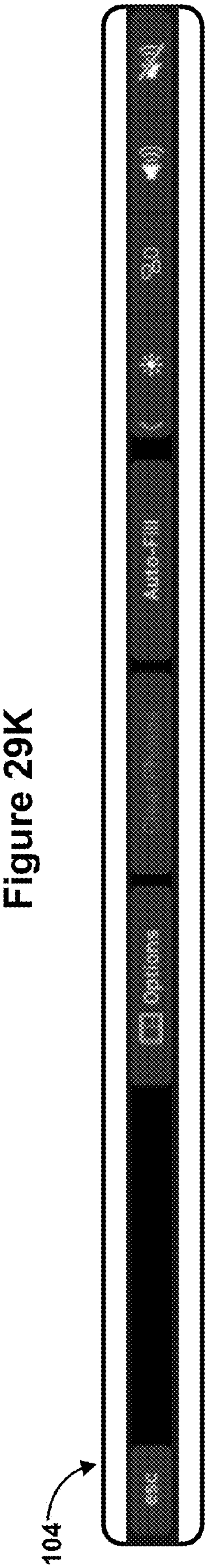
Figure 29M:
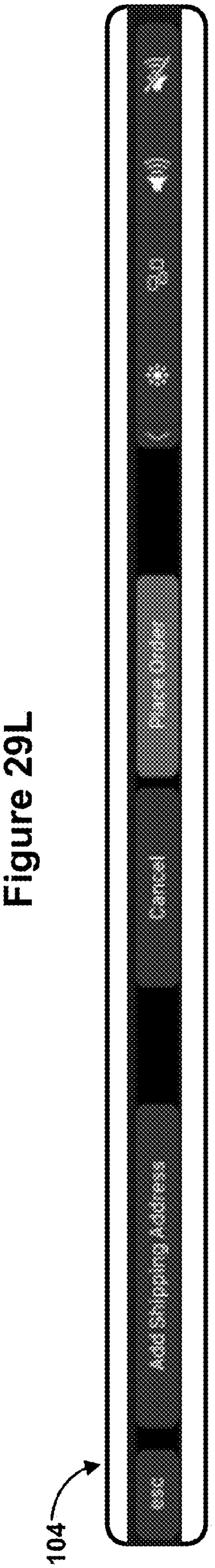
Figure 29N:
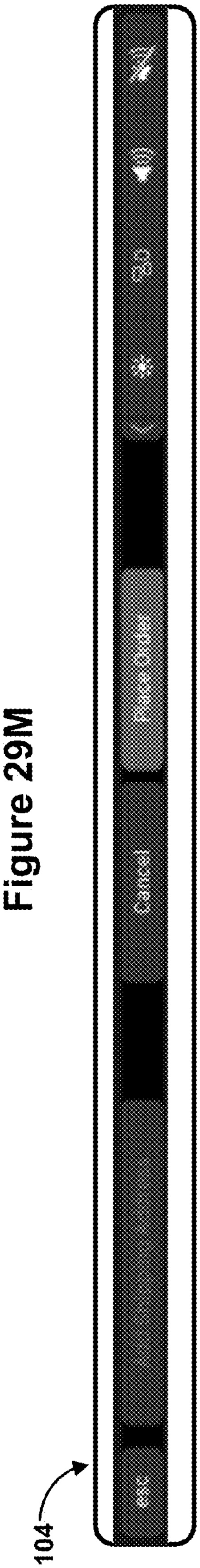
Figure 29O:
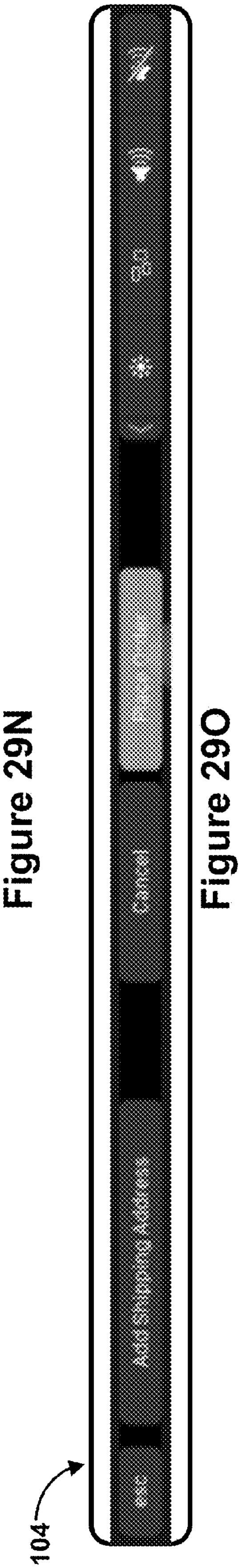

In some embodiments, controls displayed within the touch-sensitive secondary display 104 are provided for slideshows and print products that are accessed through a photos application (examples are shown in FIGS. 29K-290), thus allowing users to quickly and easily add text or photos to a slideshow, as well as add shipping details and configure ordering options for a print order.

Figure 29P:
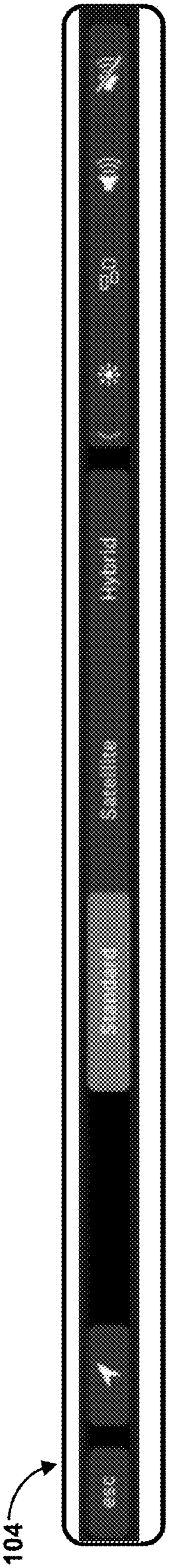
Figure 29Q:
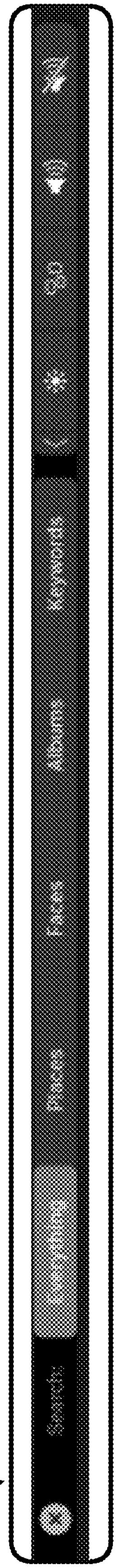
Figure 29R:
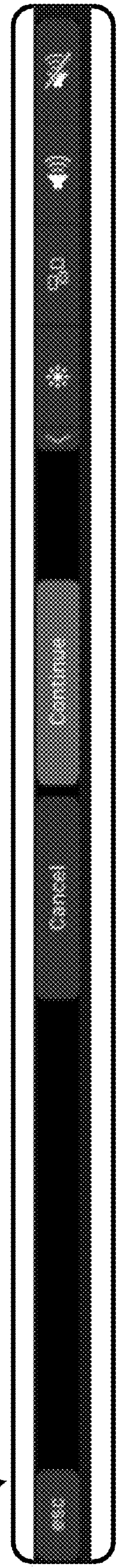
Figure 29S:
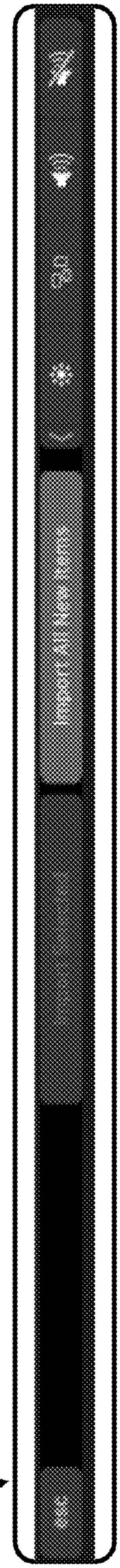
Figure 29T:
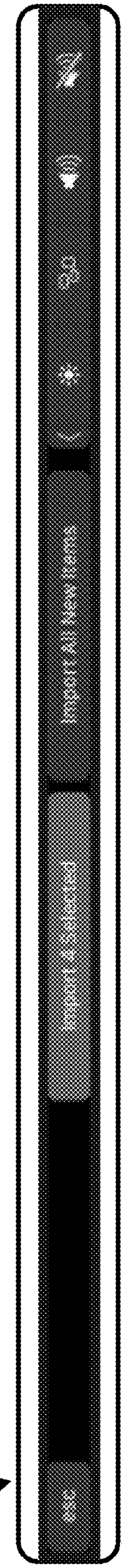

In some embodiments, while searching for photos within a photos application, the touch-sensitive secondary display 104 is populated with controls for selecting map viewing options (e.g., to help narrow down a search for photos taken near a particular location, FIG. 29P), controls for selecting a search parameter (e.g., FIG. 29Q), and/or controls for picking photos to import into the photos application (e.g., FIGS. 29R-29T).

Figure 30A:
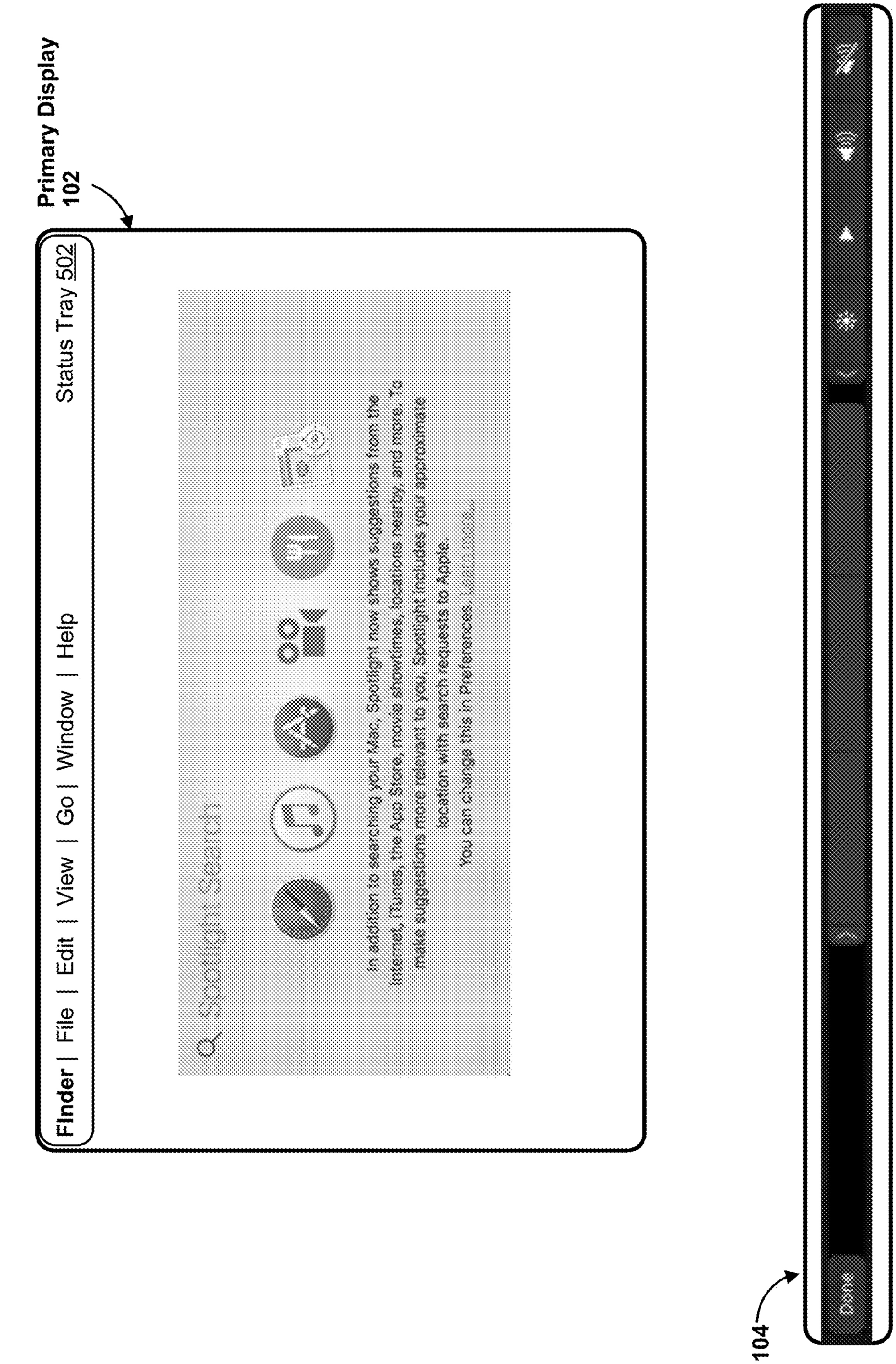
Figure 30B:
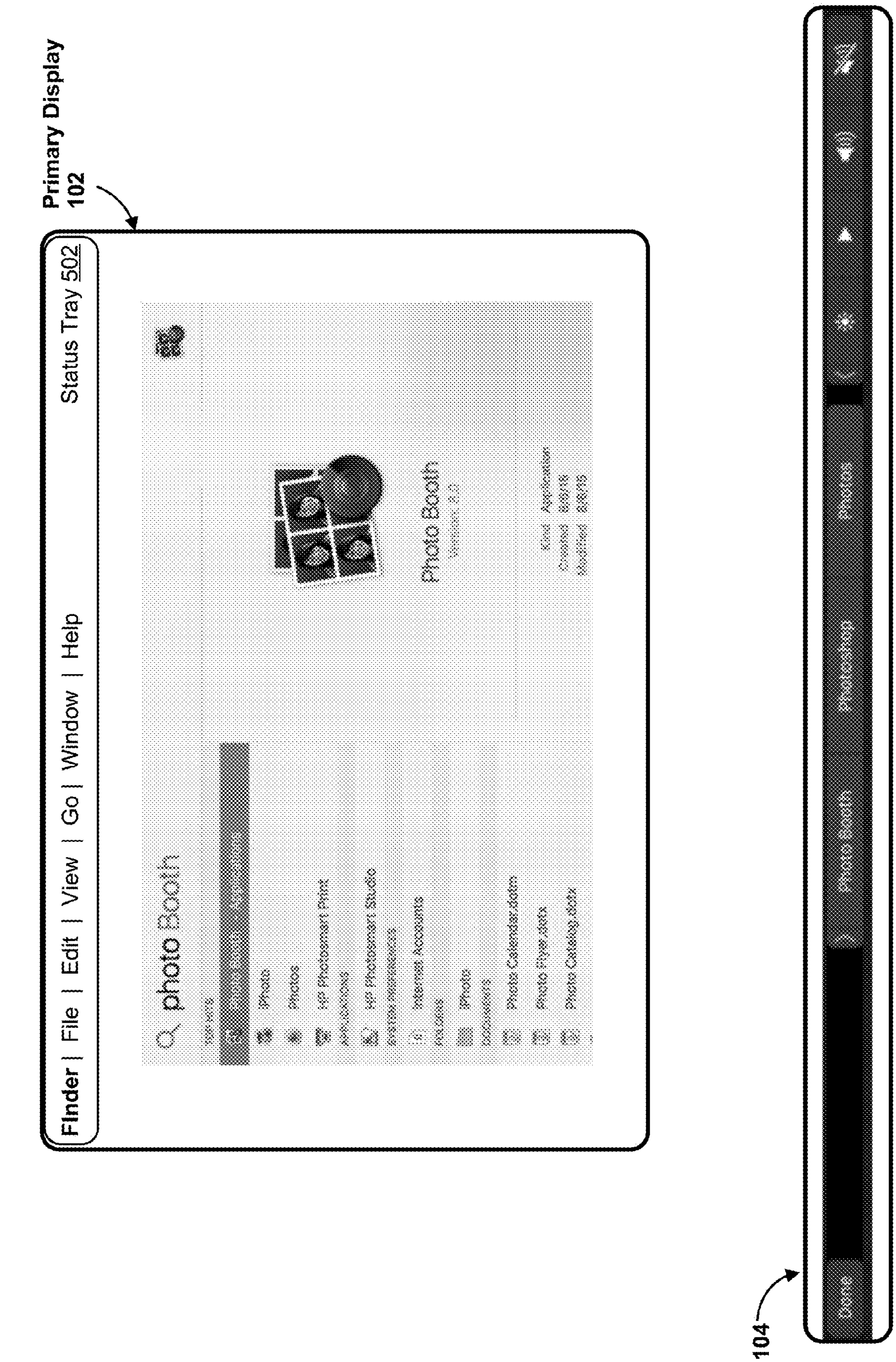
Figure 30C:
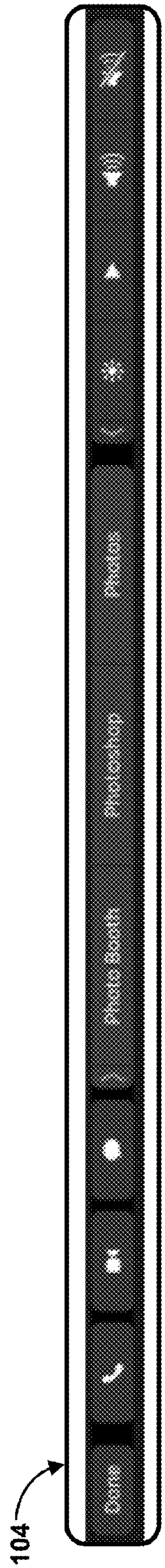
Figure 30D:
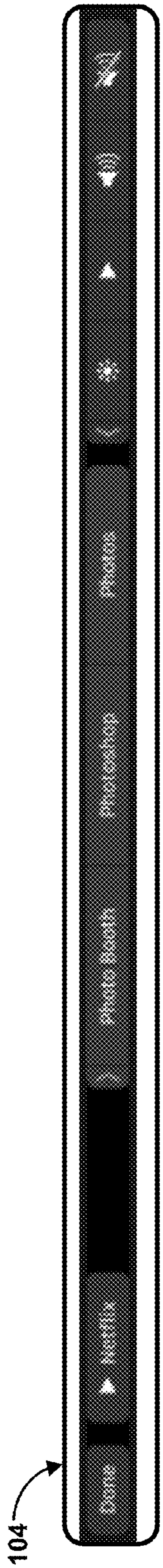
Figure 30E:
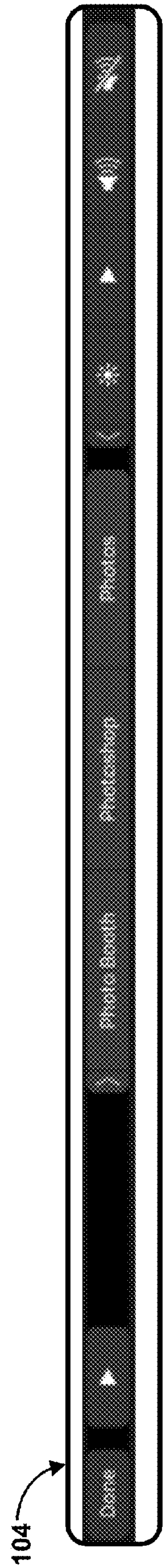
Figure 30F:
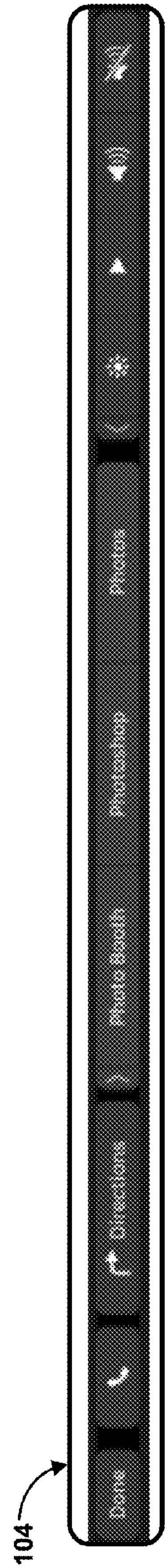

In some embodiments, the touch-sensitive secondary display 104 is populated with affordances to perform system-wide search functions. Some examples are shown in FIGS. 30A-30F. In some embodiments, in response to user input adding text to a search query (e.g., the text “photo” added between FIGS. 30A and 30B), the touch-sensitive secondary display 104 is updated to include text completion options (as shown in FIG. 30B). In some embodiments, the touch-sensitive secondary display 104 is also populated to include application-control affordances in addition to the text completion options. For example, FIG. 30C illustrates application-control affordances for a contacts application, FIGS. 30D and 30E illustrates application-control affordances for a media-playing application, FIG. 30F illustrates application-control affordances for a maps application. In some embodiments, the application-control affordances are displayed in response to a selection of a particular search result on the primary display 102 and include controls that may be used to interact with content corresponding to the particular search result.

In some embodiments, the system-wide search function is activated using a gesture at the touch-sensitive secondary display. For example, in response to a swipe gesture in a substantially downward vertical direction across the touch-sensitive secondary display 104, the primary display is caused to display a user interface for the system-wide search (e.g., the user interface shown in FIG. 30A). In some embodiments, this gesture to activate the system-wide search is available when the primary display is displaying a desktop user interface (e.g., a page of the FINDER).

Figure 31A:
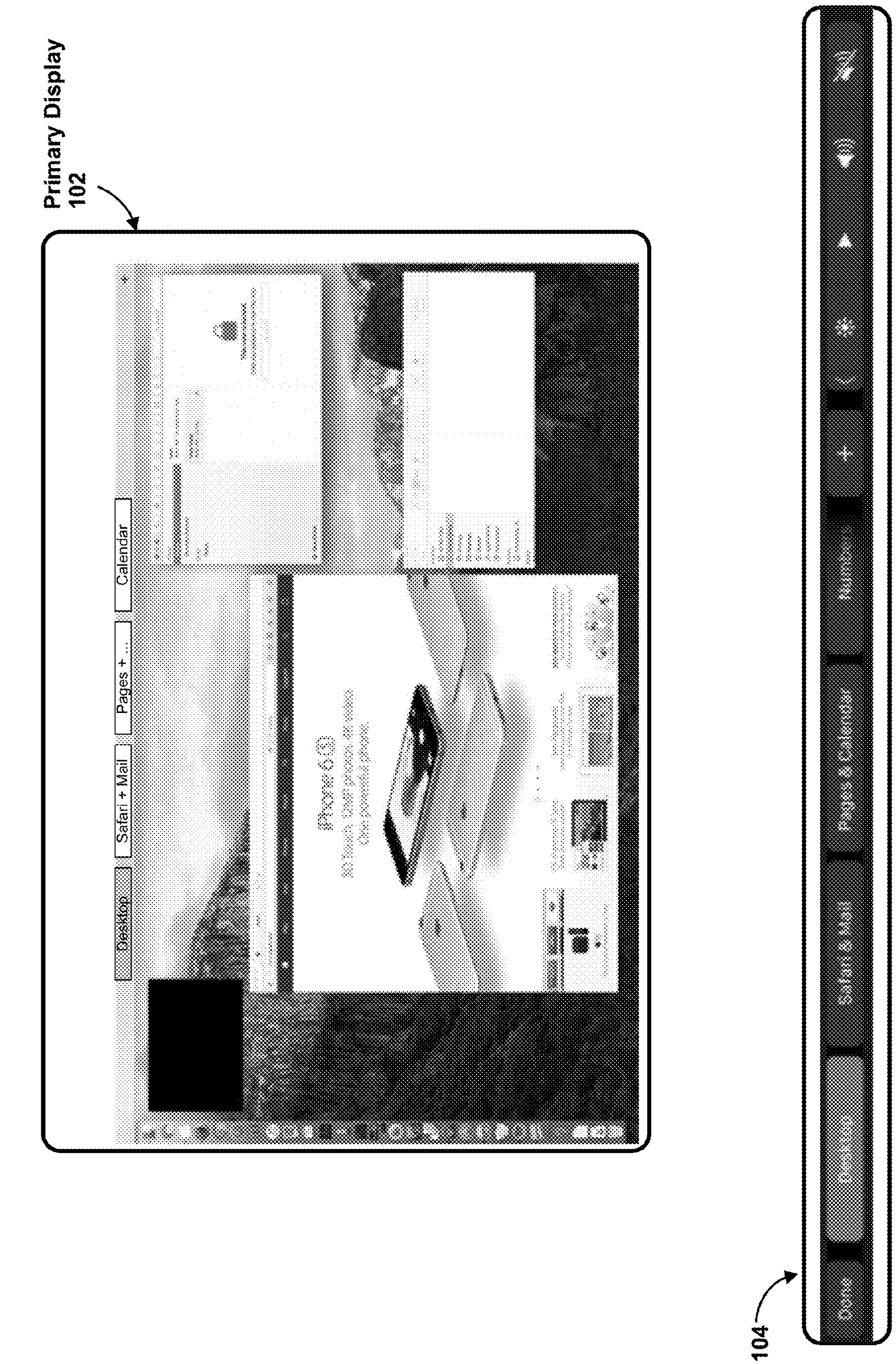
Figure 31B:
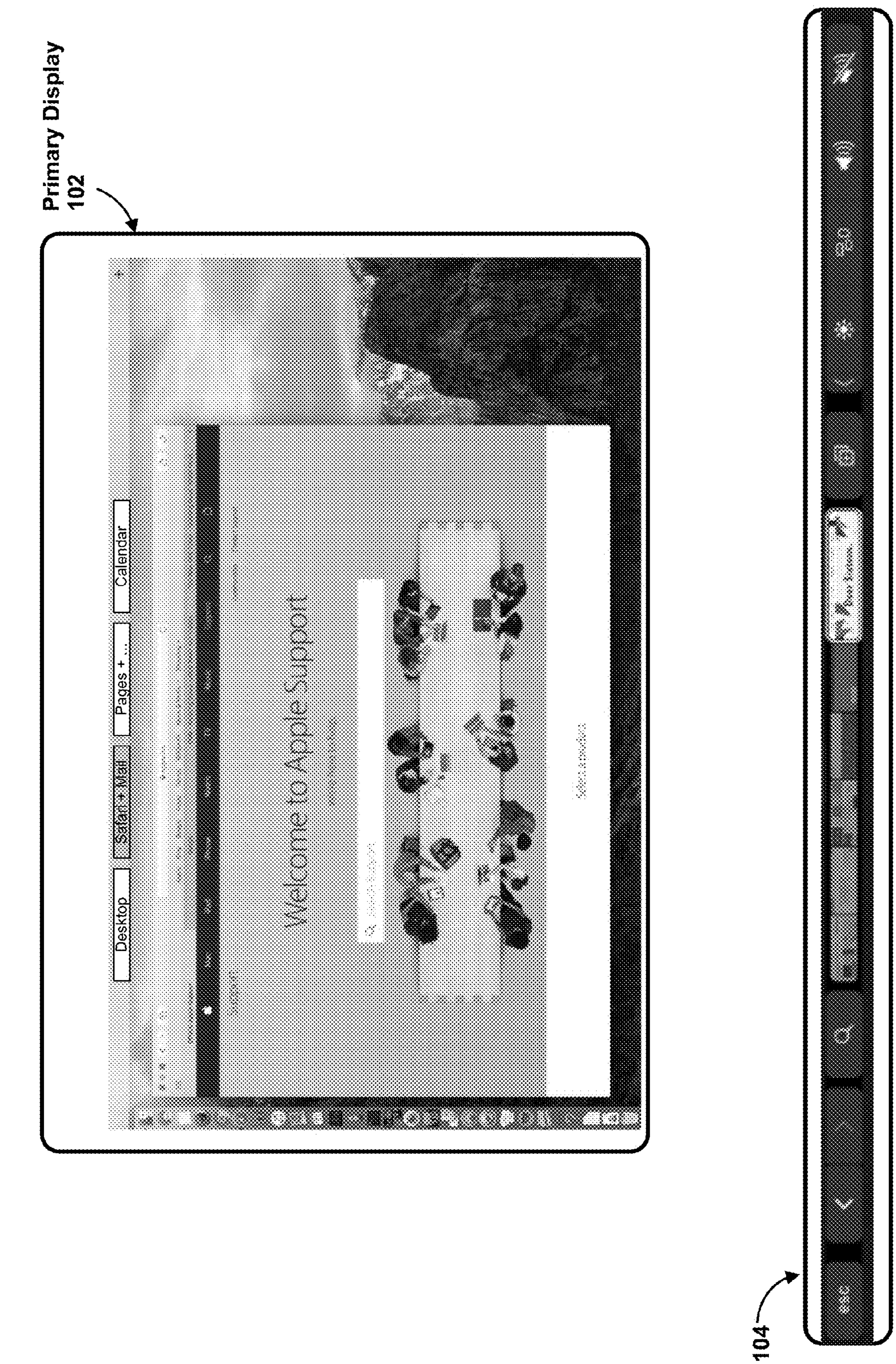

In some embodiments, the touch-sensitive secondary display 104 is populated with affordances to select between various workspaces (e.g., using a MISSION CONTROL feature available through some operating systems). Some examples are shown in FIGS. 31A-31B.

In some embodiments, the touch-sensitive secondary display 104 is populated with affordances to navigate through numerous search results that are displayed on the primary display 102. Some examples are shown in FIGS. 32A-32E (additional details are provided below in reference to method 1200 and FIG. 50).

In some embodiments, the touch-sensitive secondary display 104 is populated with affordances to quickly access functions while using a messaging application on the primary display 102. Examples are shown in FIGS. 33A-33K.

Figure 33A:
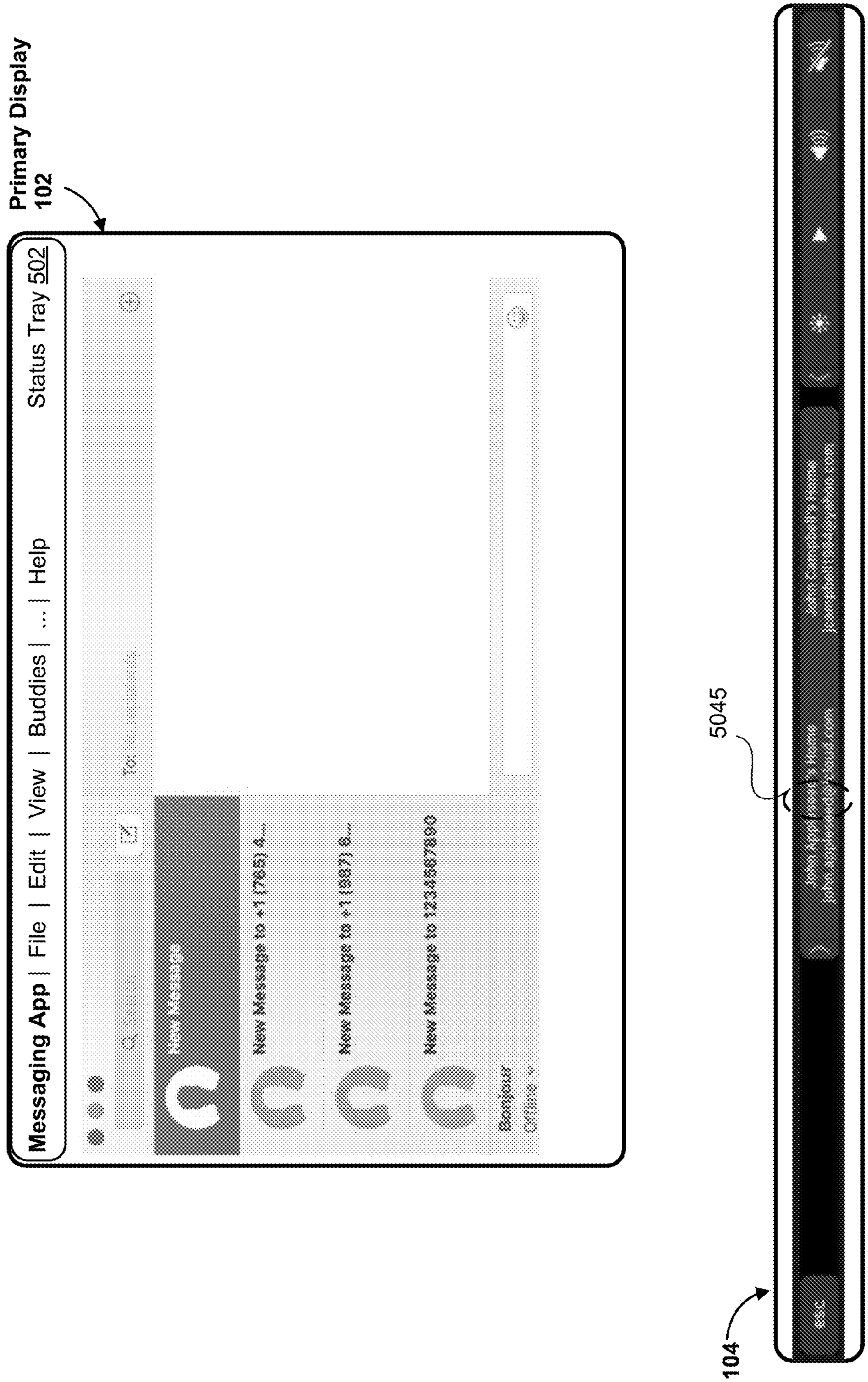

As shown in FIG. 33A, in response to a user creating a new message in a messaging application shown on the primary display 102 (or in response to a user selected the "+" icon shown in the messaging application within a recipients area), the touch-sensitive secondary display 104 is updated to include affordances for adding predicted recipients to the new message. For example, FIG. 33A includes a first affordance for a first predicted recipient (John Appleseed's Home) and a second affordance for a second predicted recipient (John Campbell's Home). In response to input 5045 selecting the first affordance from the touch-sensitive secondary display 104, the new message in the messaging application on the primary display 102 is updated to display an address that corresponds to the first predicted recipient. Proactive/predicted suggestions are discussed in more detail in U.S. application Ser. No. 15/167,713, which is hereby incorporated by reference in its entirety.

Figure 33B:
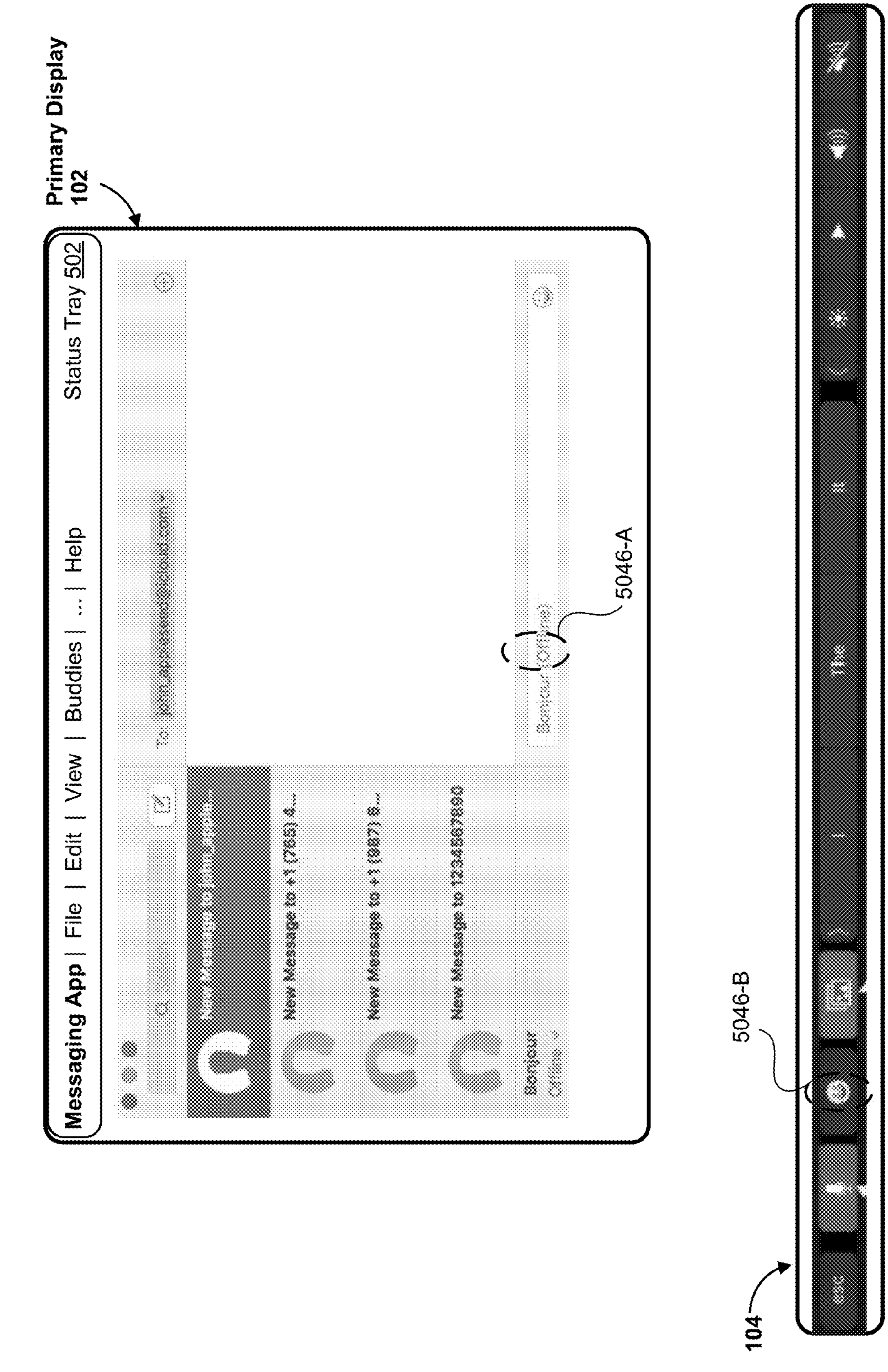

In some embodiments, in response to a selection of a text entry field for the new message (e.g., input 5046-A), the touch-sensitive secondary display 104 begins displaying (shown from left to right in the touch-sensitive secondary display 104 of FIG. 33B) (i) a microphone affordance that, when selected, causes the touch-sensitive secondary display 104 to display options for recording and sending audio via the messaging application (FIGS. 33G-33K); (ii) an emoji affordance that, when selected, causes the touch-sensitive secondary display to display options for selecting emoji to add to the new message (FIGS. 33C-33D, also described in more detail below in reference to method 1500 and FIG. 53); (iii) a picture picker affordance that, when selected, causes the touch-sensitive secondary display to provide controls for selecting one or more photos to add to the new message (FIG. 33F, and example photo-picking controls are also discussed above in reference to FIGS. 27A-27B); and (iv) predicted text entry options.

Figure 33C:
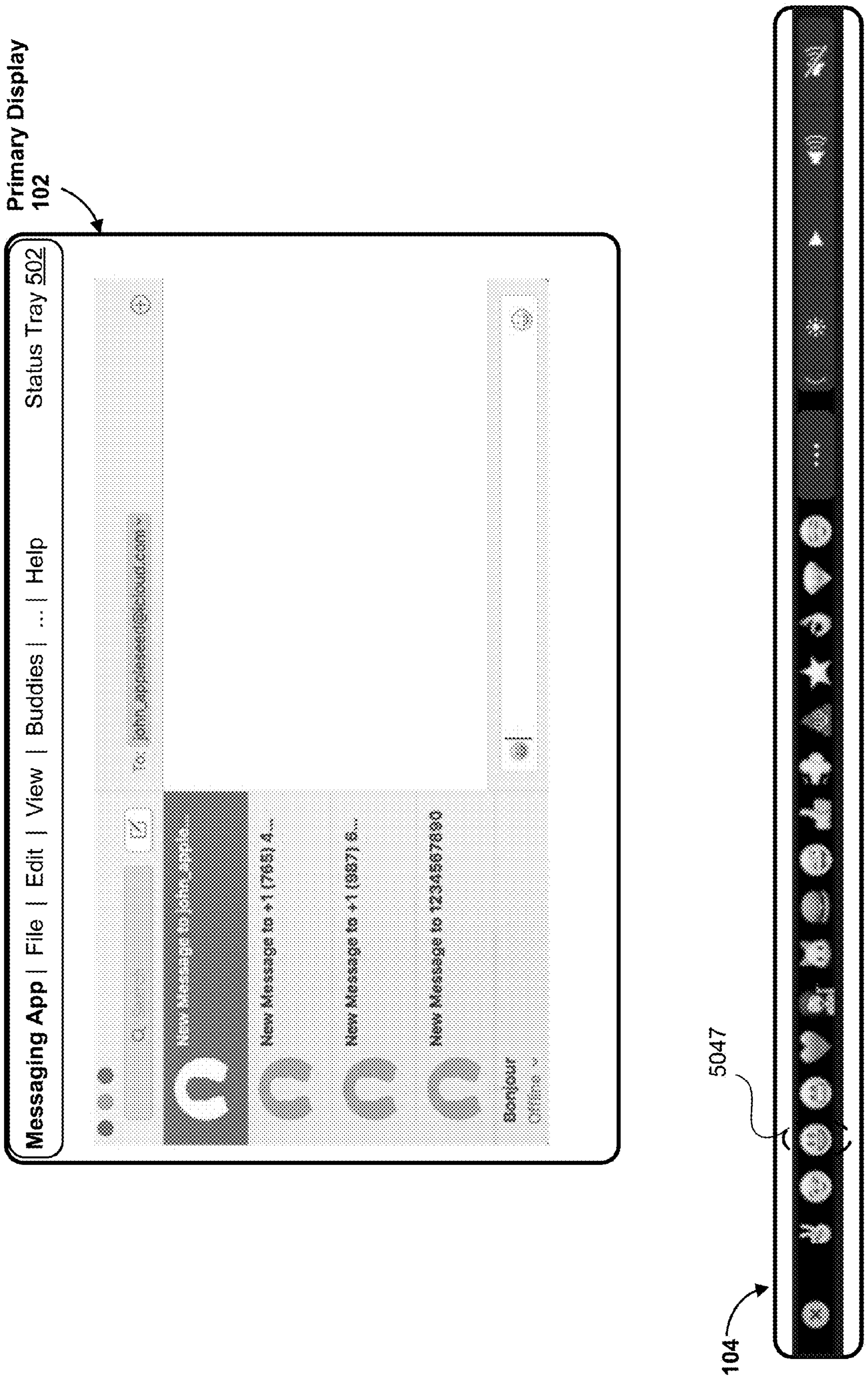

In some embodiments, after selecting the microphone affordance, the touch-sensitive secondary display 104 is updated to include a record affordance that, when selected, causes the computing system to begin recording audio. In some embodiments, while audio is being recorded, the touch-sensitive secondary display 104 is updated to include a representation of the recorded audio (as shown in FIG. 33H). In some embodiments, after audio has finished recording (or a user selects a stop recording button shown in the touch-sensitive secondary display 104, FIG. 33H), a send button is activated (as shown in FIG. 33I).

Figure 33D:
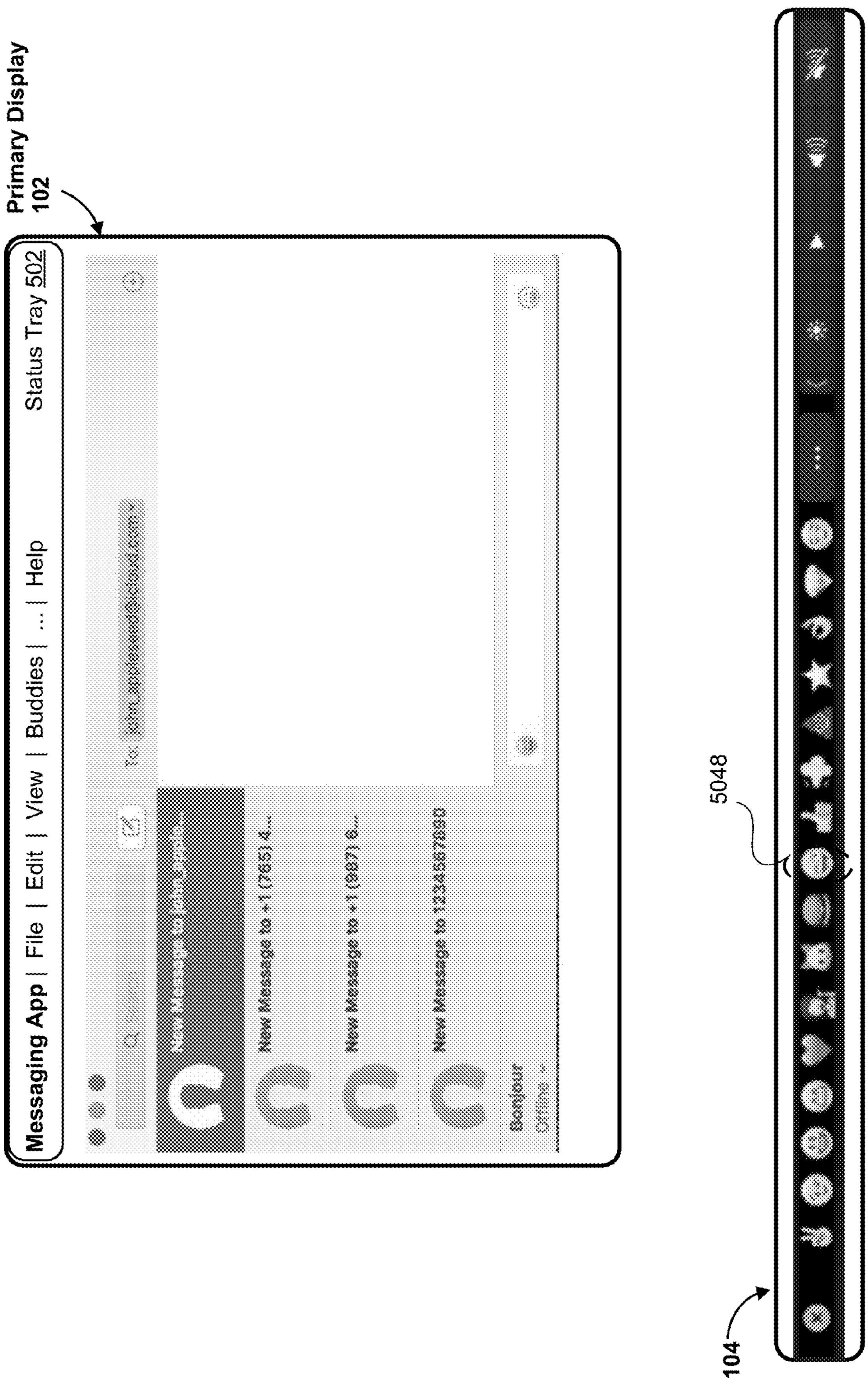
Figure 33E:
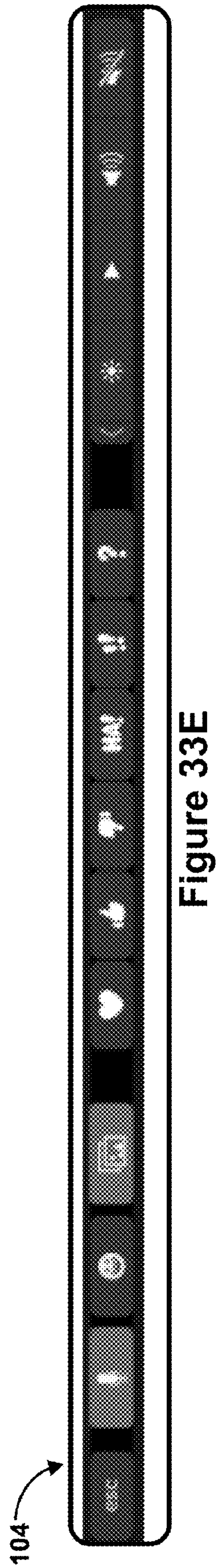
Figure 33F:
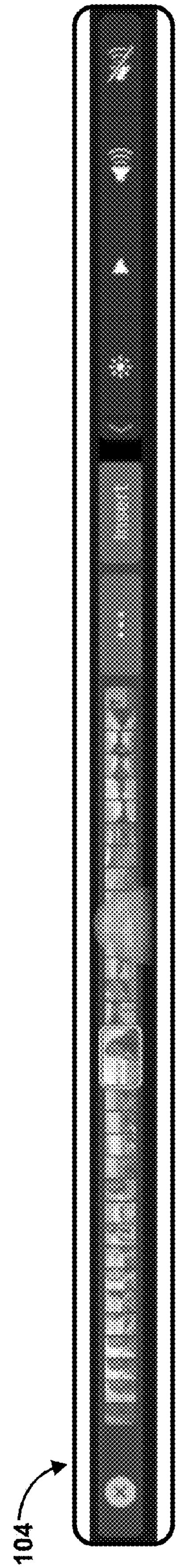
Figure 33G:
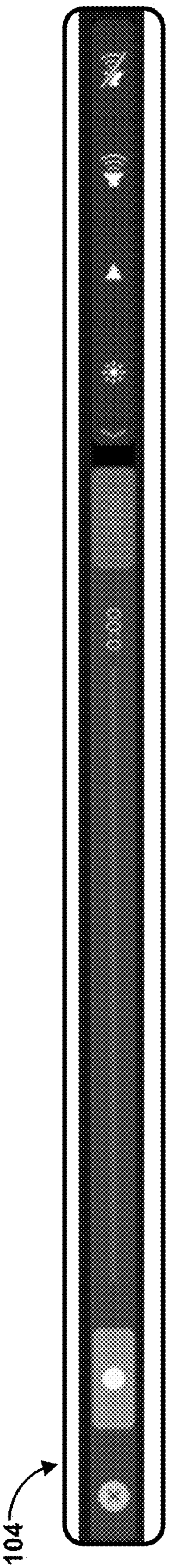
Figure 33H:
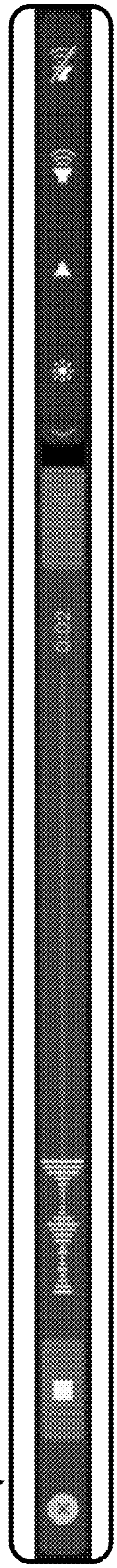
Figure 33I:
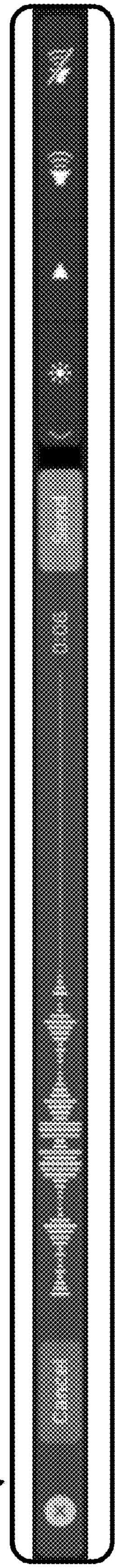
Figure 33J:
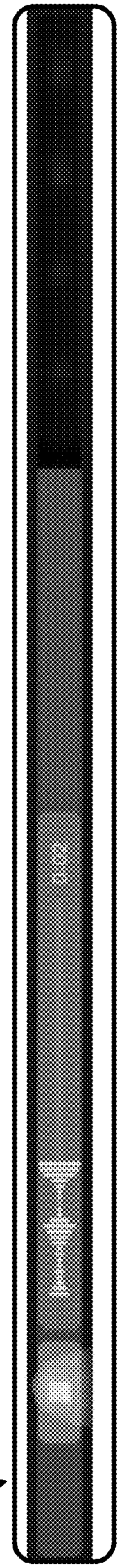
Figure 33K:
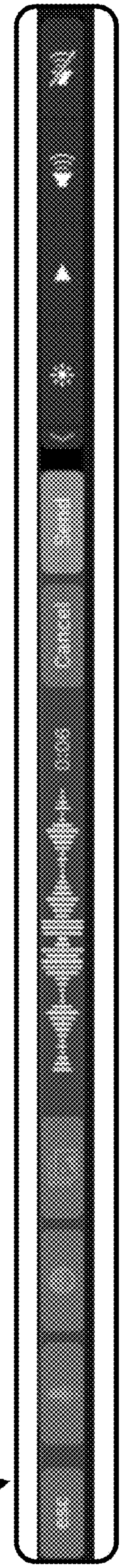

In some embodiments, after contact by an input with the microphone affordance, the input remains in contact with the microphone affordance to begin an audio recording (as shown in FIG. 33J). In some embodiments, to end the audio recording the user removes the input from contacting the touch-sensitive secondary display and, in response, the touch-sensitive secondary display includes a representation of the completed audio recording, a cancel button, and an active send button.

In some embodiments, in response to a selection of a messaging bubble that is included in a particular conversation thread shown within the messaging application (e.g., a messaging bubble that includes content received from some other user) on the primary display 102, the touch-sensitive secondary display 104 is updated to include controls for selecting bubble acknowledgements (e.g., adjacent to the photo picker affordance are example controls for selecting bubble acknowledgements). In some embodiments, if the selected messaging bubble corresponds to a message sent by the user (i.e., not by some other user), then the touch-sensitive secondary display 104 does not include the controls for selecting bubble acknowledgements.

Figure 34A:
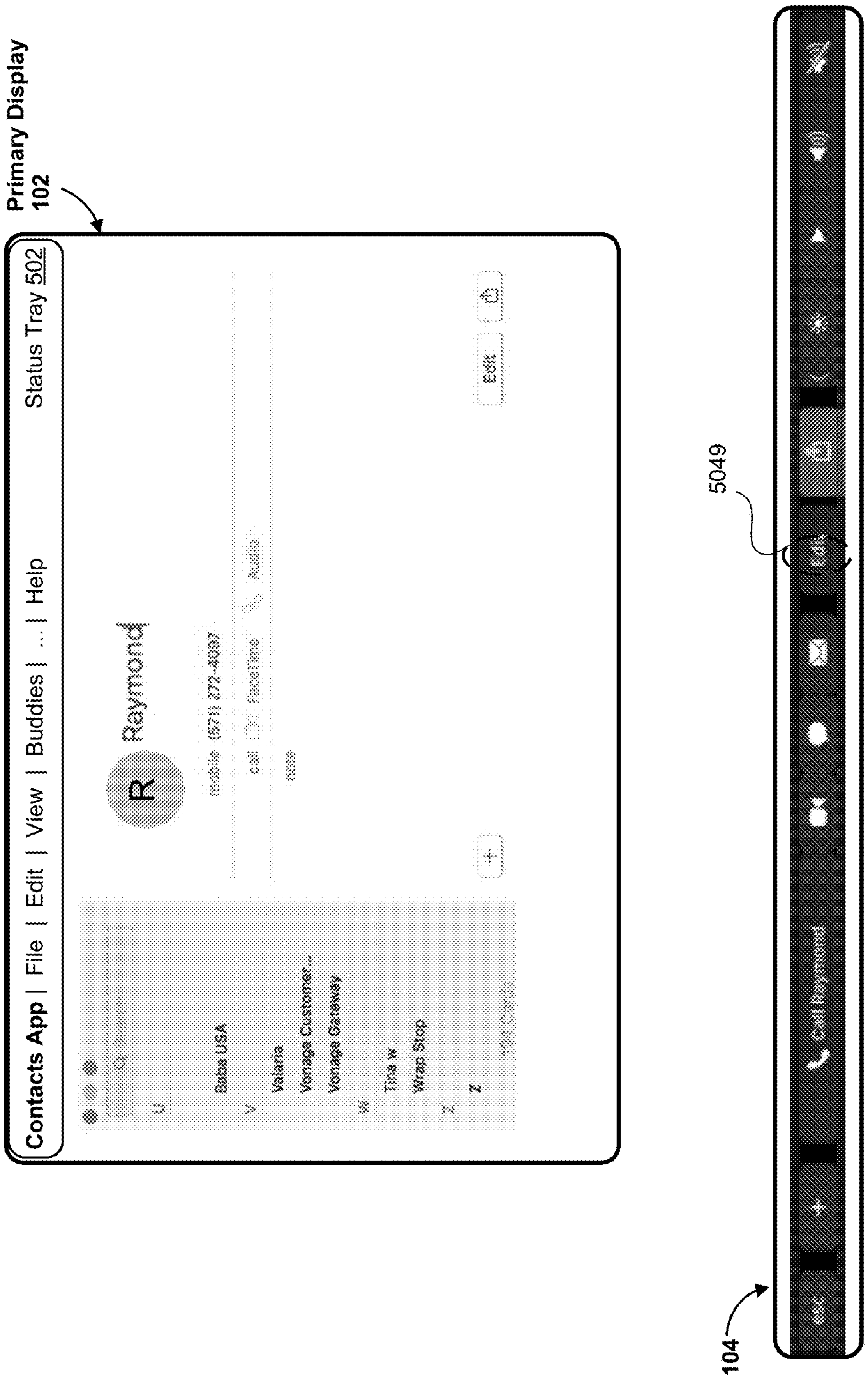
Figure 34B:
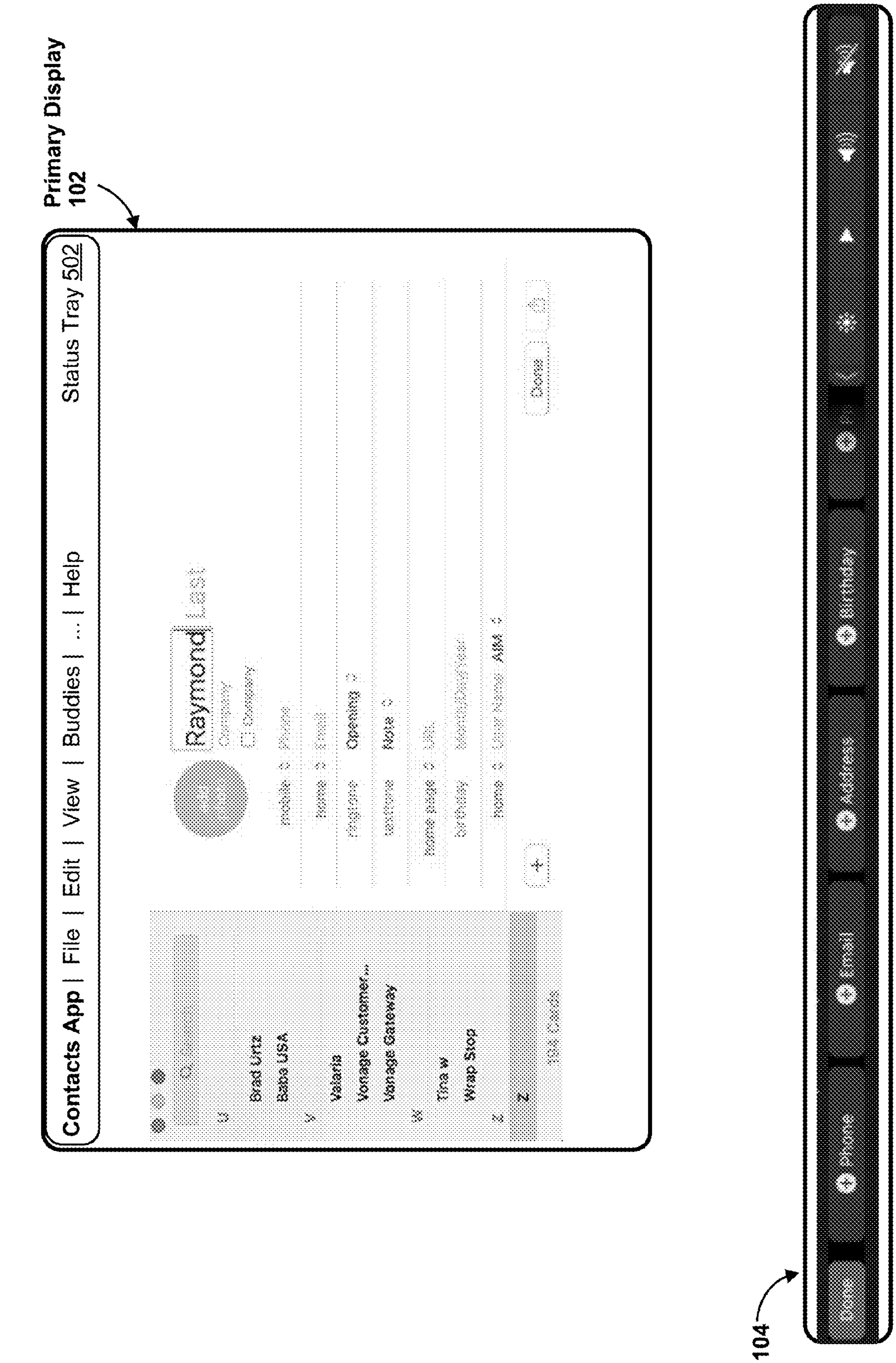
Figure 34C:
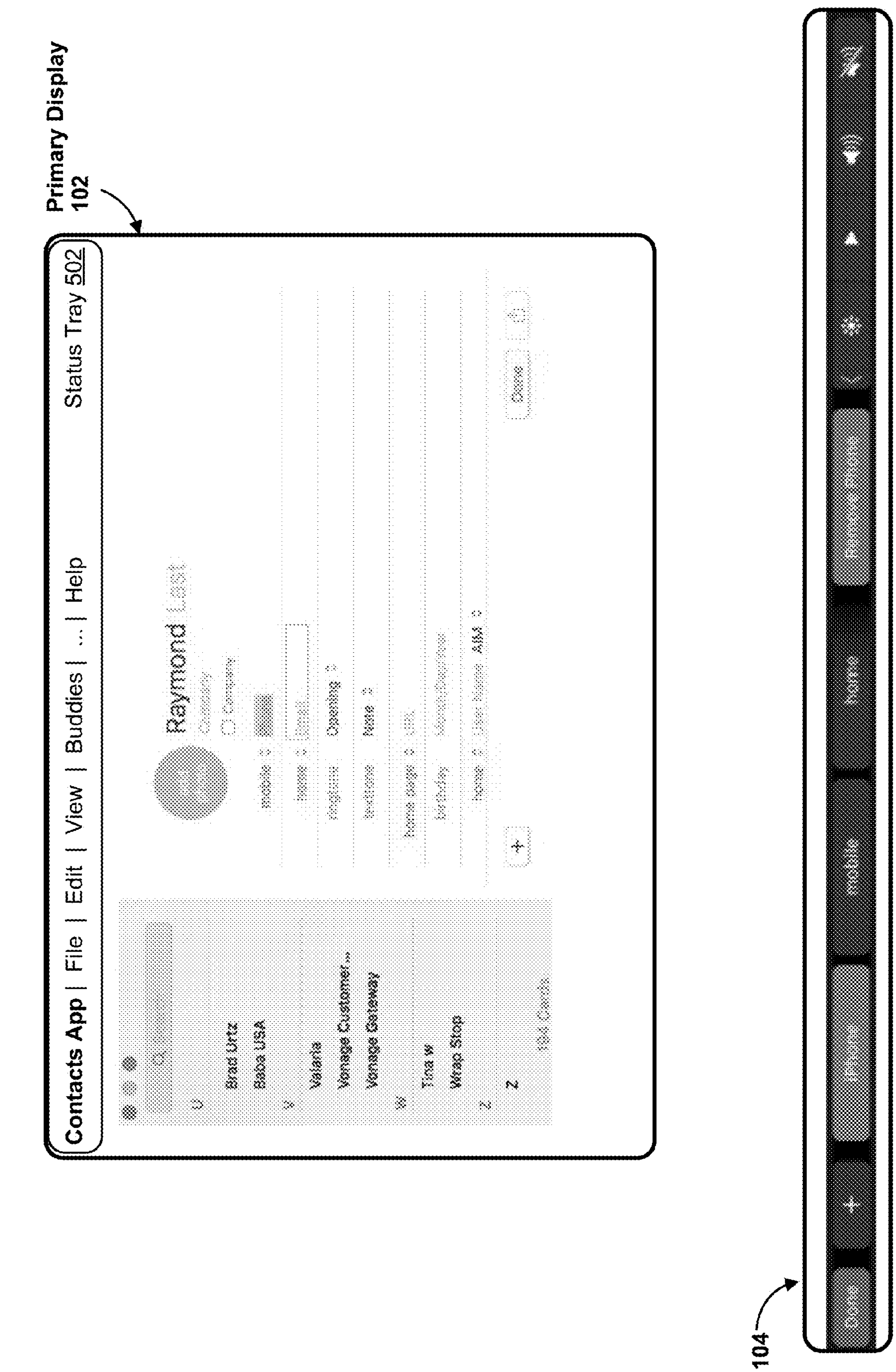

In some embodiments, the touch-sensitive secondary display 104 is populated with affordances for controlling a contacts application, as shown in FIGS. 34A-34C. In some embodiments, in response to opening a contacts application for display on the primary display 102, the touch-sensitive secondary display 104 is updated to include the following affordances for controlling the contacts application (shown from left to right after the "esc" affordance): (i) a "+" affordance that, when selected, causes the contacts application to initiate a process for adding a new contact; (ii) an optional telephone calling affordance that, when selected, initiates a telephone call to a contact that is currently selected in the contacts application on the primary display 102; (iii) an optional video calling affordance that, when selected, initiates a video call to a contact that is currently selected in the contacts application; (iv) an optional instant messaging affordance that, when selected, causes the primary display 102 to begin displaying a messaging application for sending a message to a contact that is currently selected in the contacts application; (v) an optional email affordance that, when selected, causes the primary display 102 to begin displaying an email application for composing an email to a contact that is currently selected in the contacts application; (vi) an edit affordance that, when selected, causes the touch-sensitive secondary display 104 to displaying editing options and causes the primary display 102 to enter a mode that allows for editing a contact that is currently selected in the contacts application; (vii) a share affordance that, when selected, causes the touch-sensitive secondary display 104 to displaying options for sharing a contact that is currently selected in the contacts application.

In some embodiments, the optional telephone calling, video calling, instant messaging, and email are each displayed in accordance with a determination that a contact that is currently selected (i.e., has a focus selector on the primary display 102) is associated with contact details that allow for placing a telephone call (e.g., that a telephone number is stored for the contact), placing a video call (e.g., that an appropriate username or email is stored for the contact), sending an instant message (e.g., that an appropriate username or email is stored for the contact), or sending an email (e.g., that an email address is stored for the contact). In some embodiments, if this determination is not satisfied then a respective optional affordance is either not displayed at all or is displayed in an inactive state (i.e., the respective affordance is displayed in a greyed out, un-selectable state).

FIG. 34A also shows an input 5049 over the edit affordance and, in response to the input 5049, the touch-sensitive secondary display 104 is updated to include edit controls and the primary display 102 enters a mode that allows for editing a contact (as shown in FIG. 34B). In some embodiments, the edit controls that are shown in the touch-sensitive secondary display 104 are selected based on which contact details are being editing on the primary display 102. For example, in accordance with a determination that name, company, or department fields are currently being edited (e.g., have the focus selector on the primary display 102, as shown for the name field in FIG. 34B), then the touch-sensitive secondary display 104 is updated to include controls for adding new contact details (e.g., a new phone number, a new email address, a new physical address, and/or a new birthday, etc.).

As another example, in accordance with a determination that a phone number field is being editing (e.g., has the focus selector on the primary display 102, as shown in FIG. 34C), then the touch-sensitive secondary display 104 is updated to include controls for assigning a label or removing a phone number that is selected on the primary display 102 (as shown in FIG. 34C).

Figure 35A:
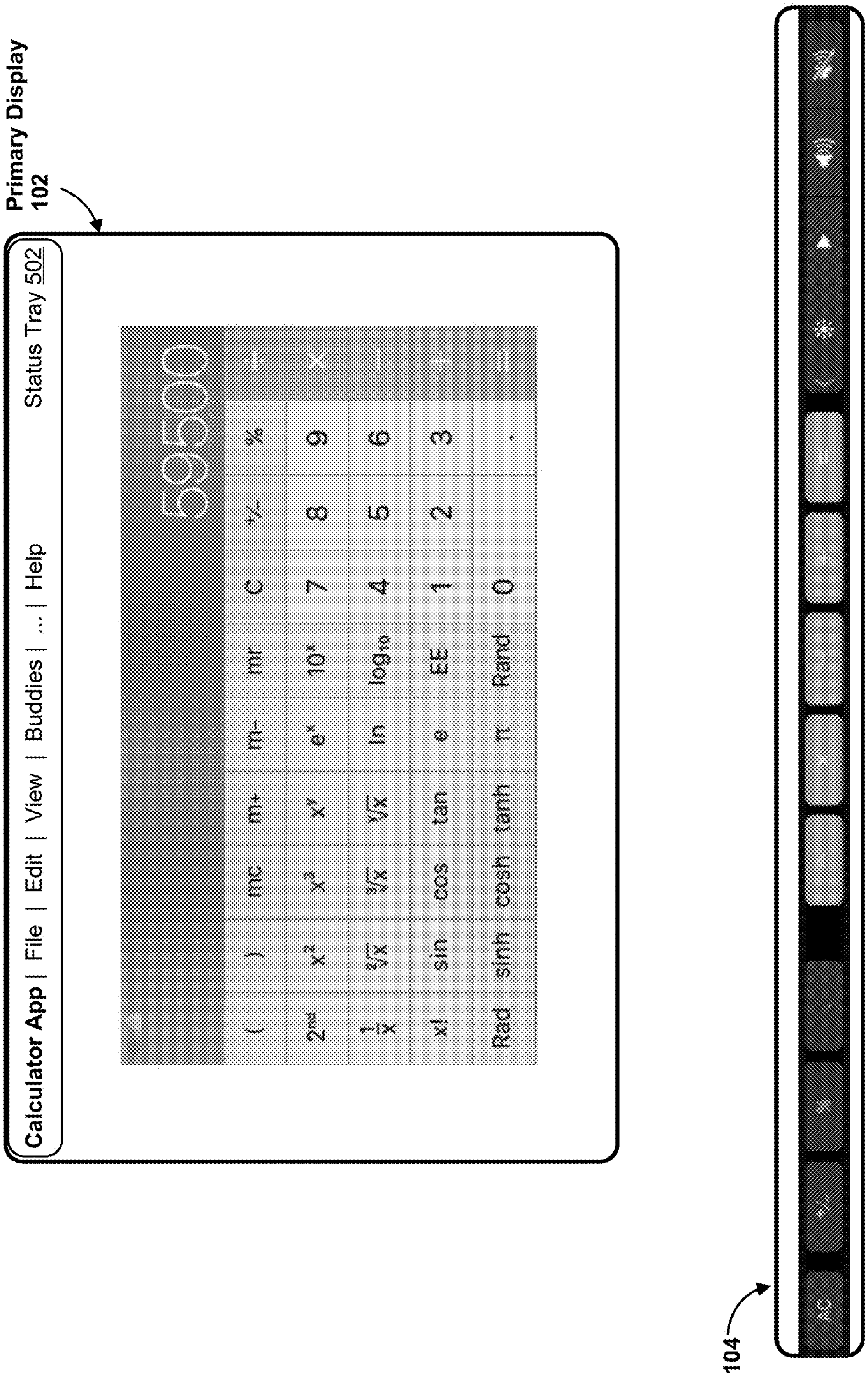
Figure 35B:
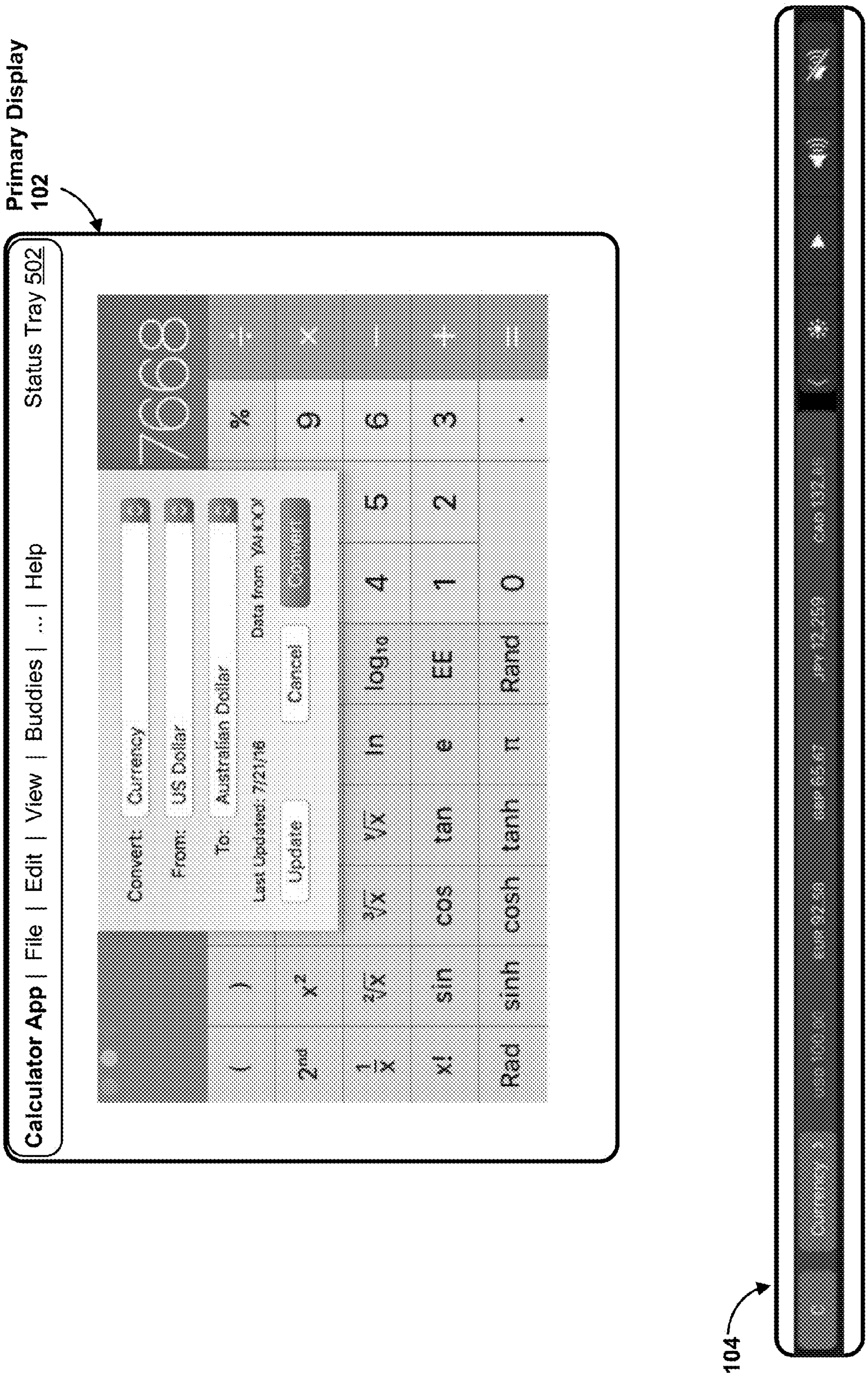

In some embodiments, the touch-sensitive secondary display 104 is populated with affordances for controlling a calculator application, as shown in FIGS. 35A-35B. For example, in response to opening a calculator application on the primary display 102, the touch-sensitive secondary display 104 is populated to include affordances for controlling calculator functions (examples of these affordances are shown in FIG. 35A). In some embodiments, the touch-sensitive secondary display 104 also provides controls for quickly converting between various currencies (e.g., as shown in FIG. 35B).

Figure 36A:
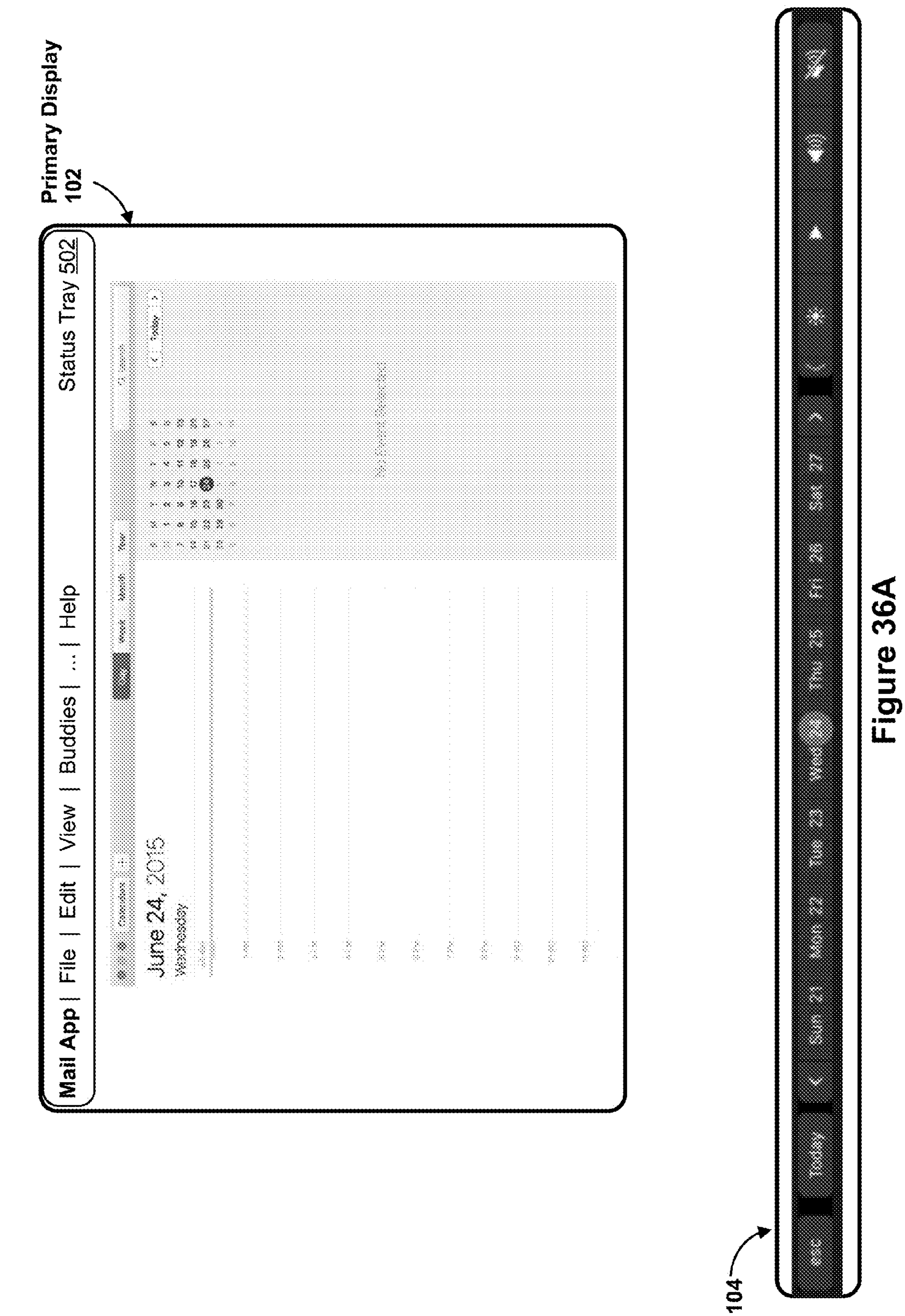
Figure 36B:
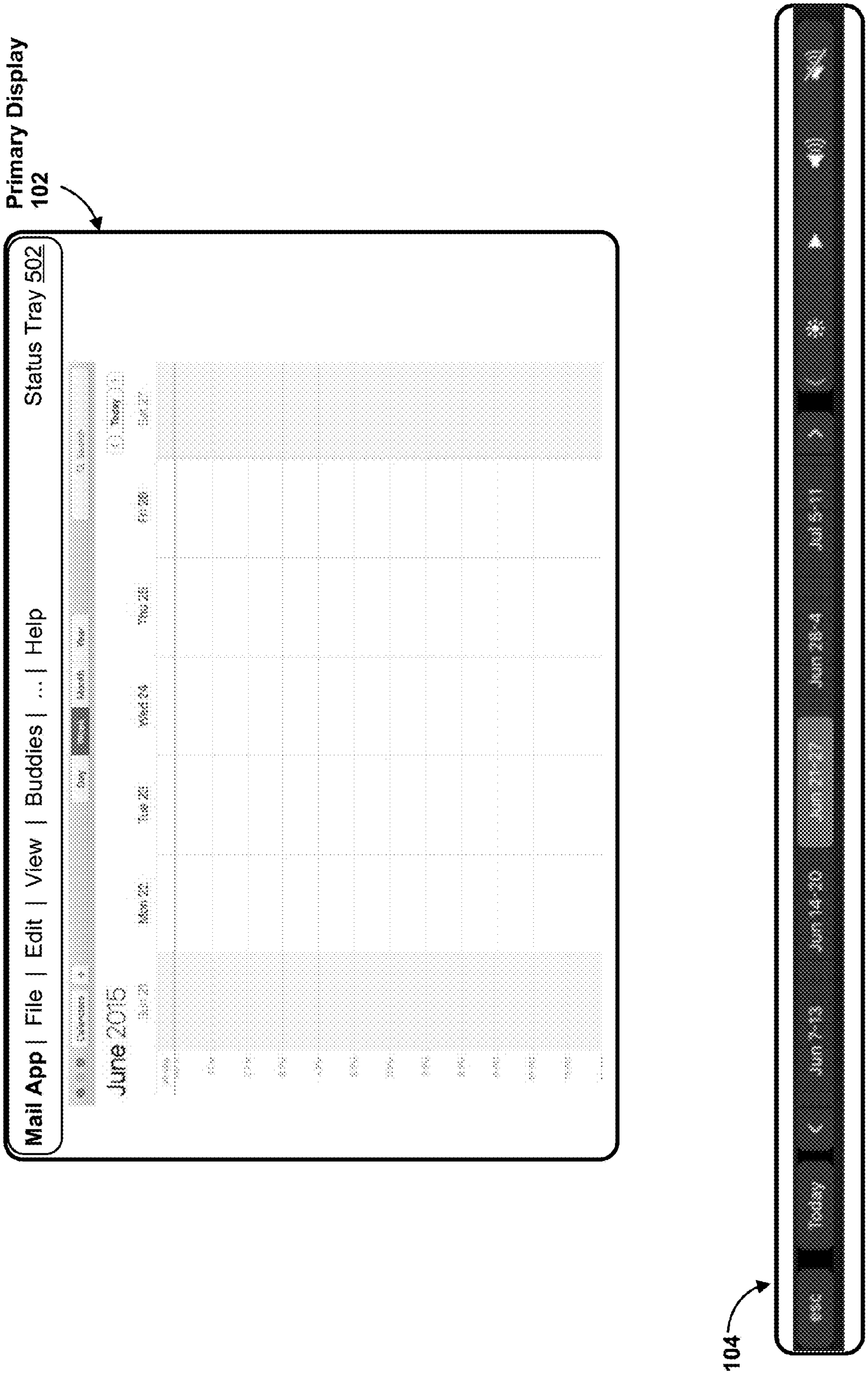
Figure 36C:
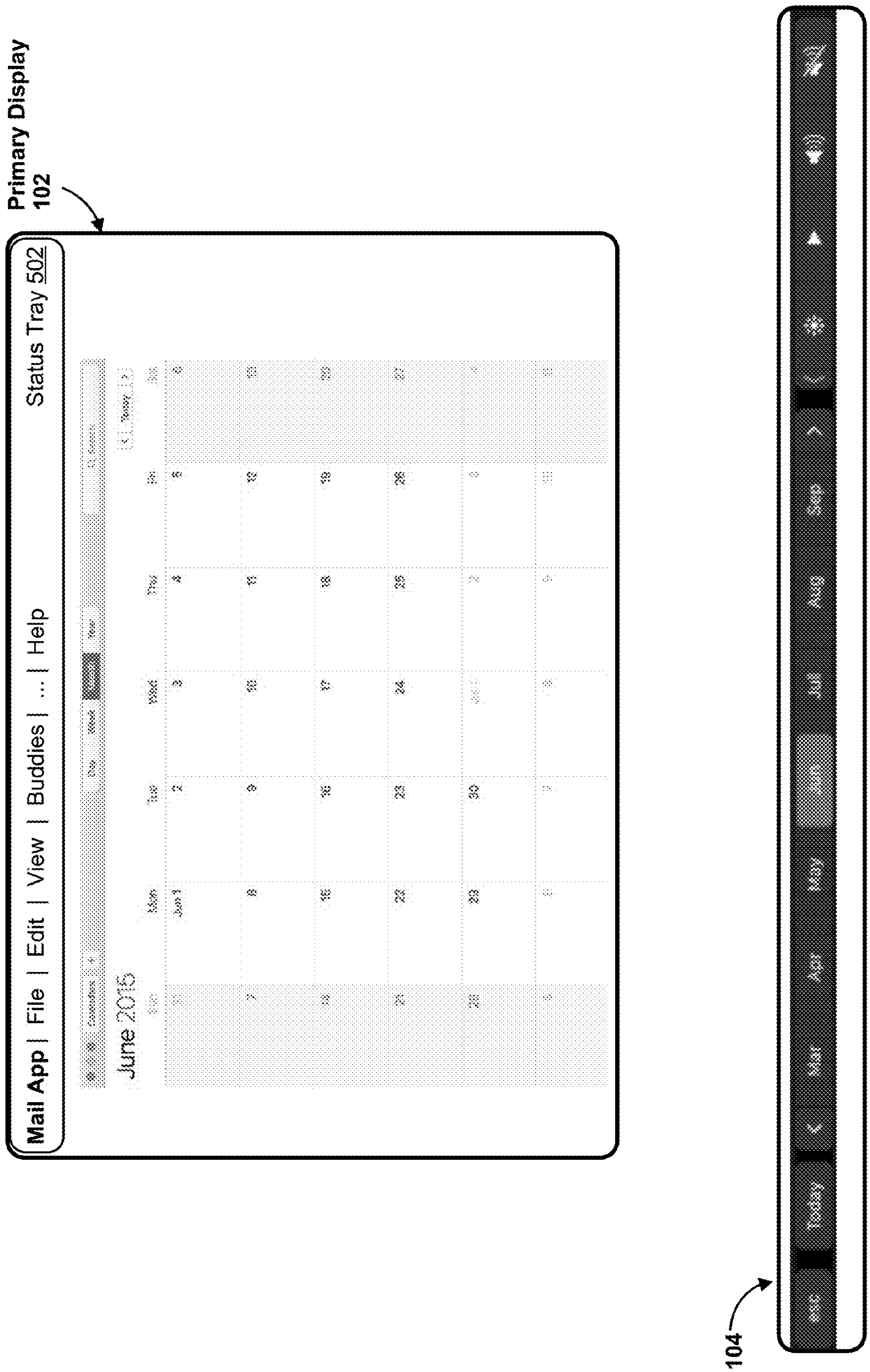
Figure 36D:
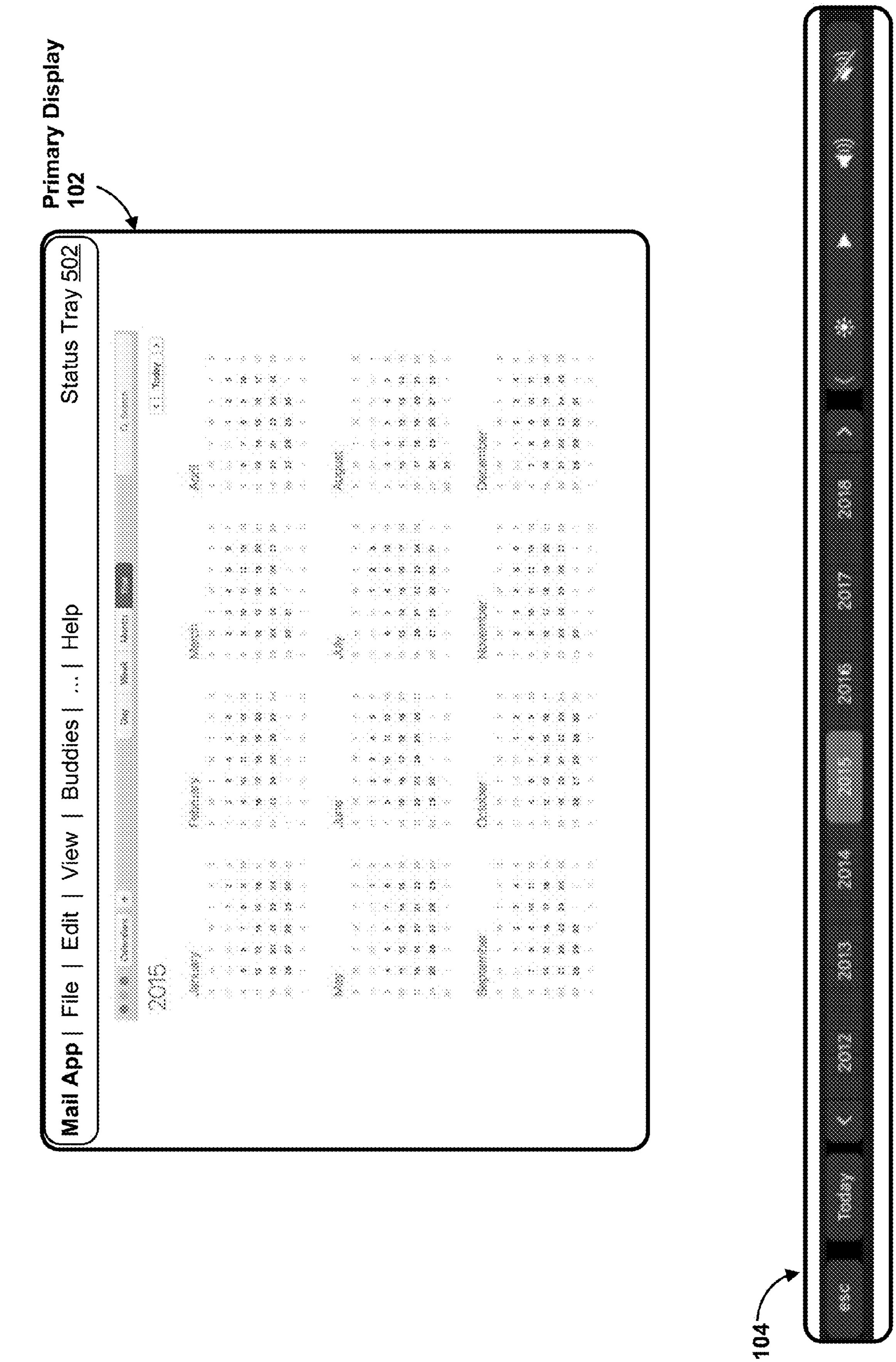
Figure 36E:
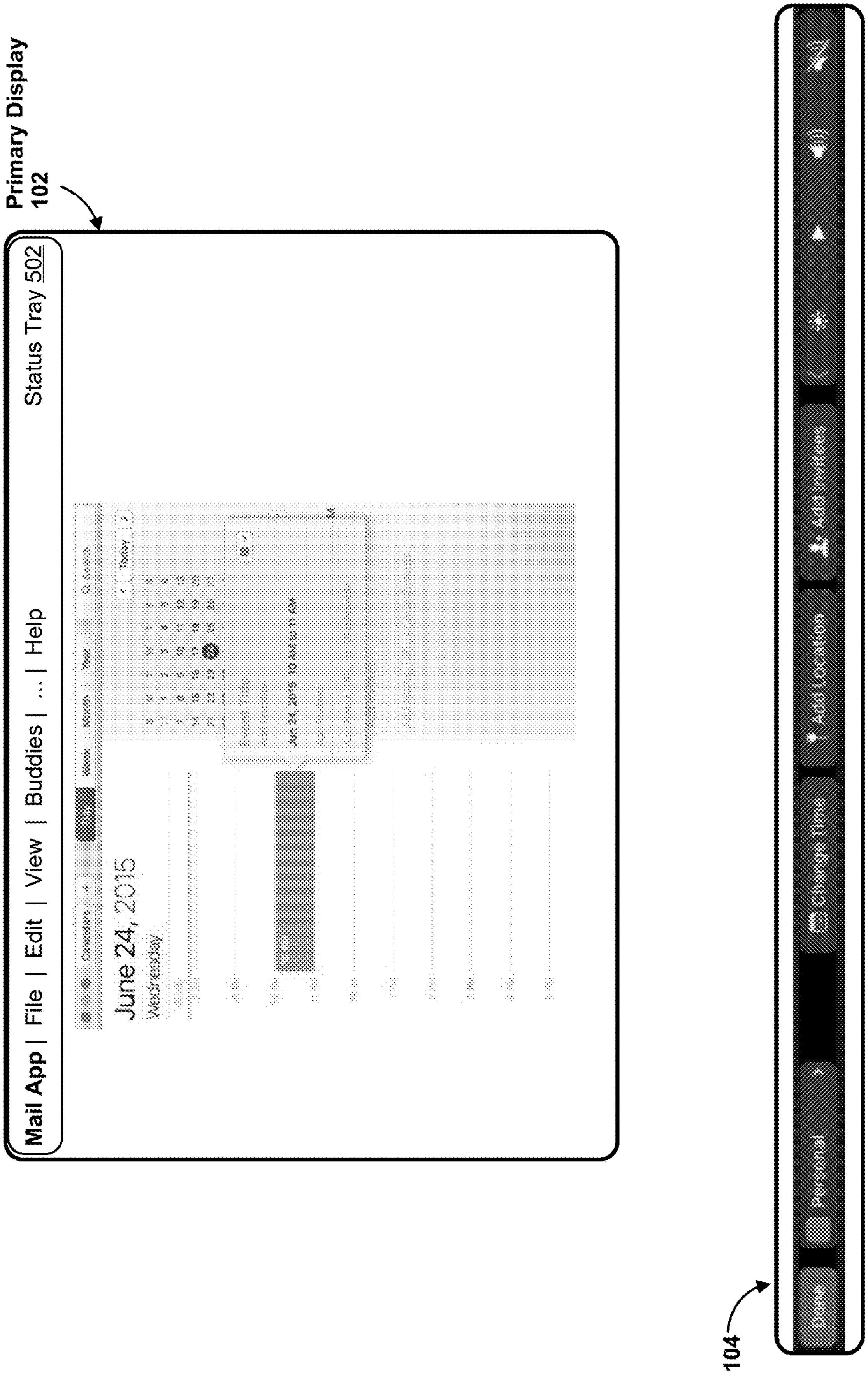
Figure 36F:
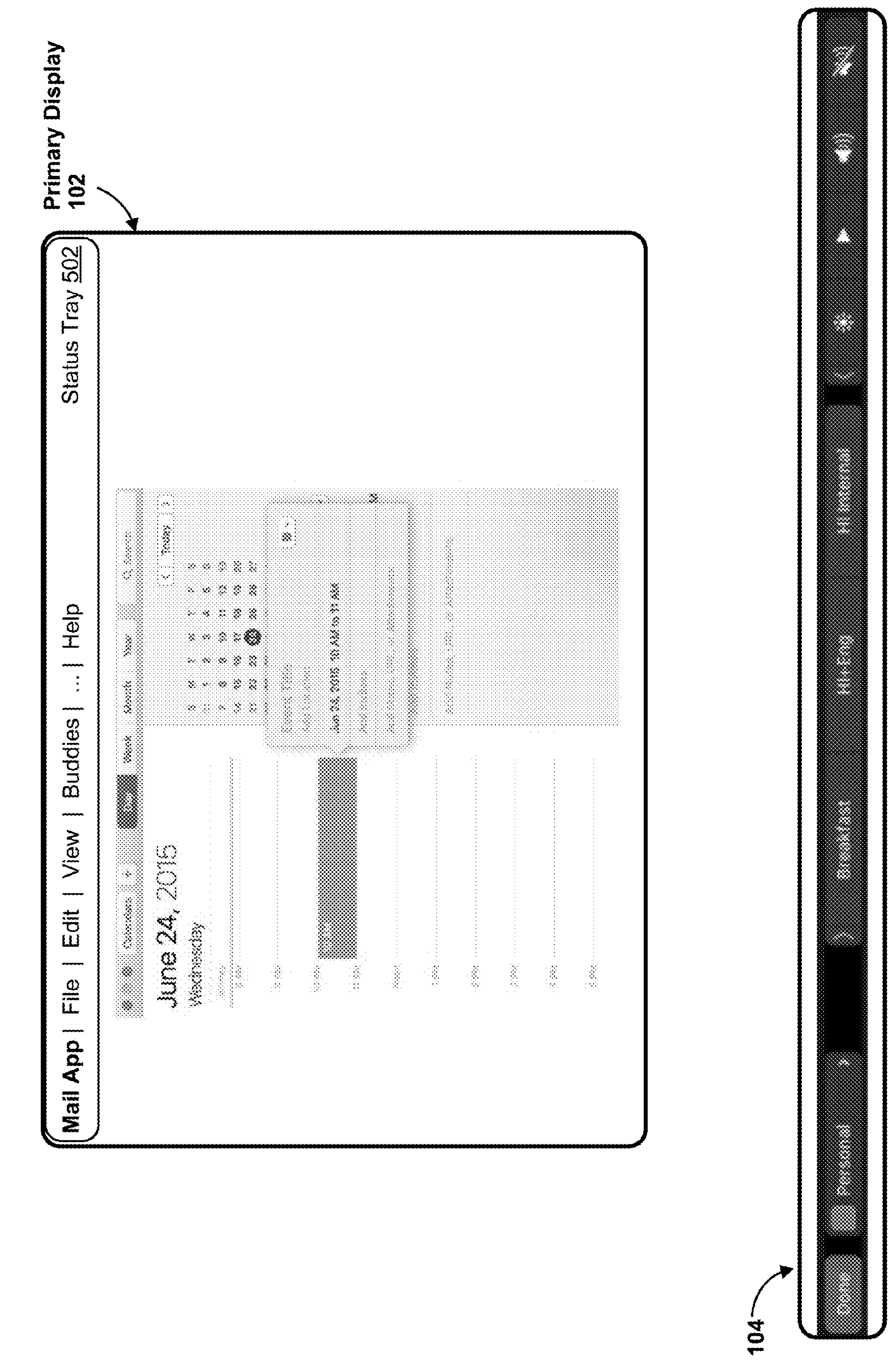
Figure 36G:
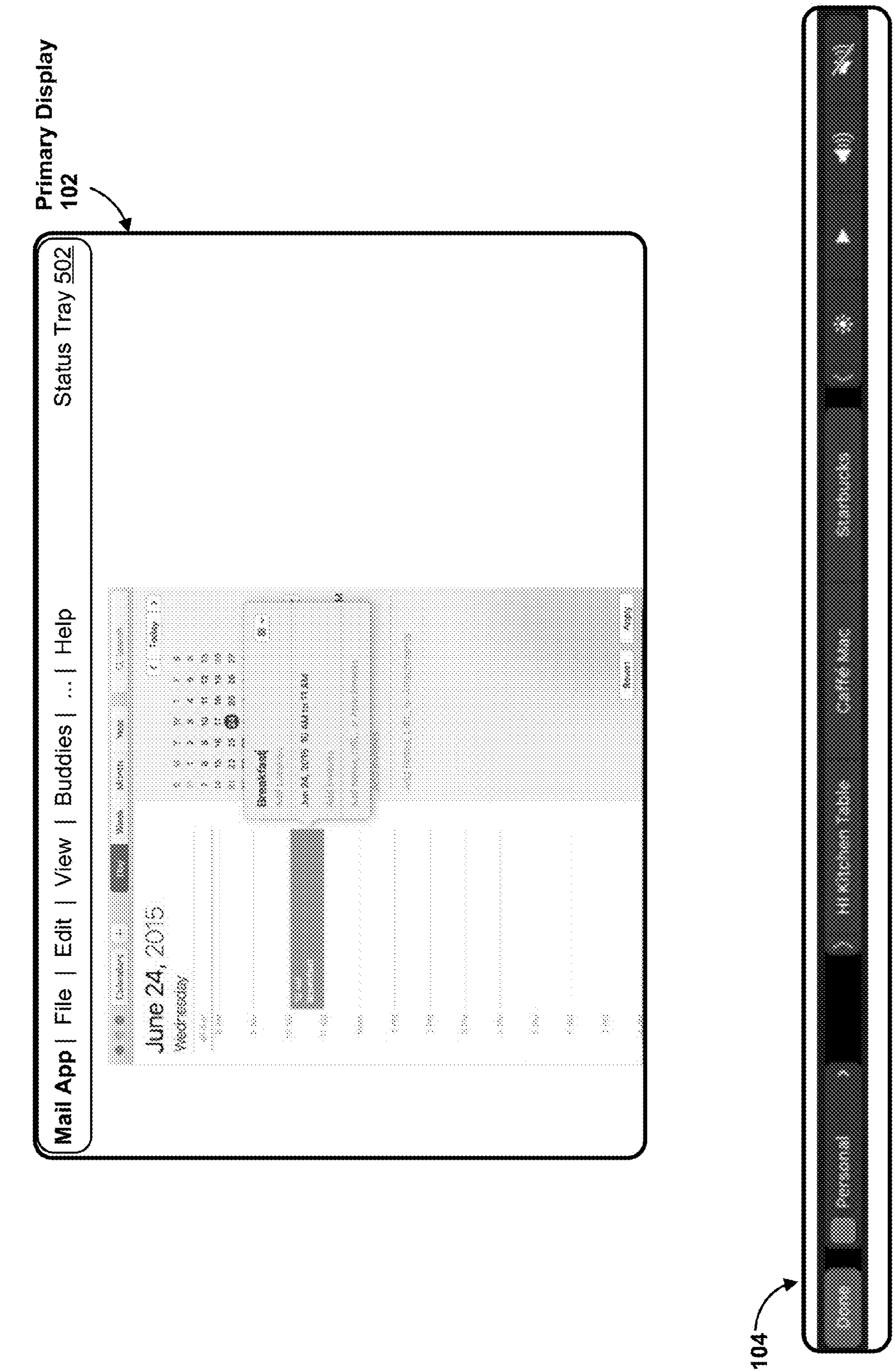
Figure 36H:
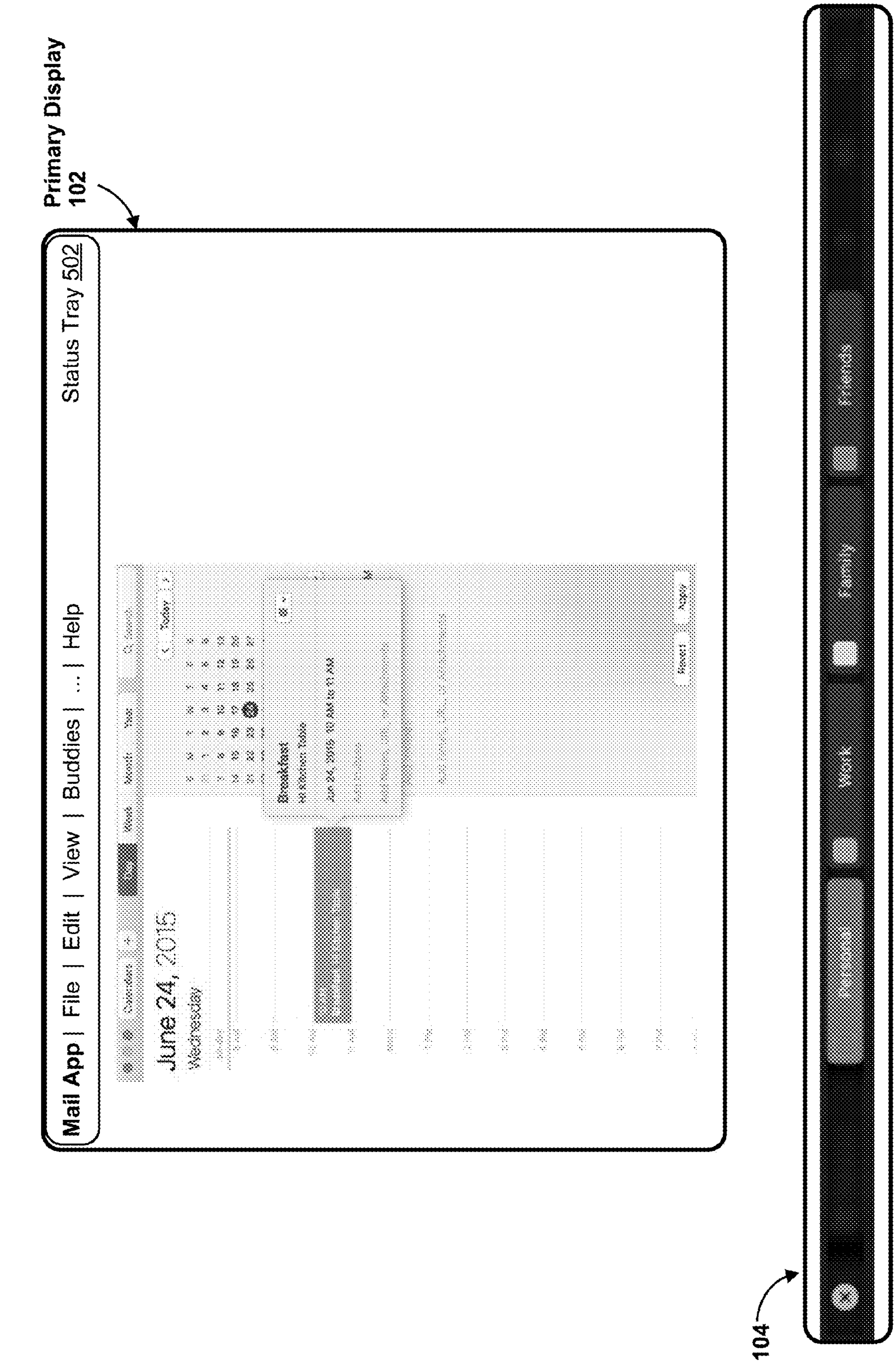
Figure 36I:
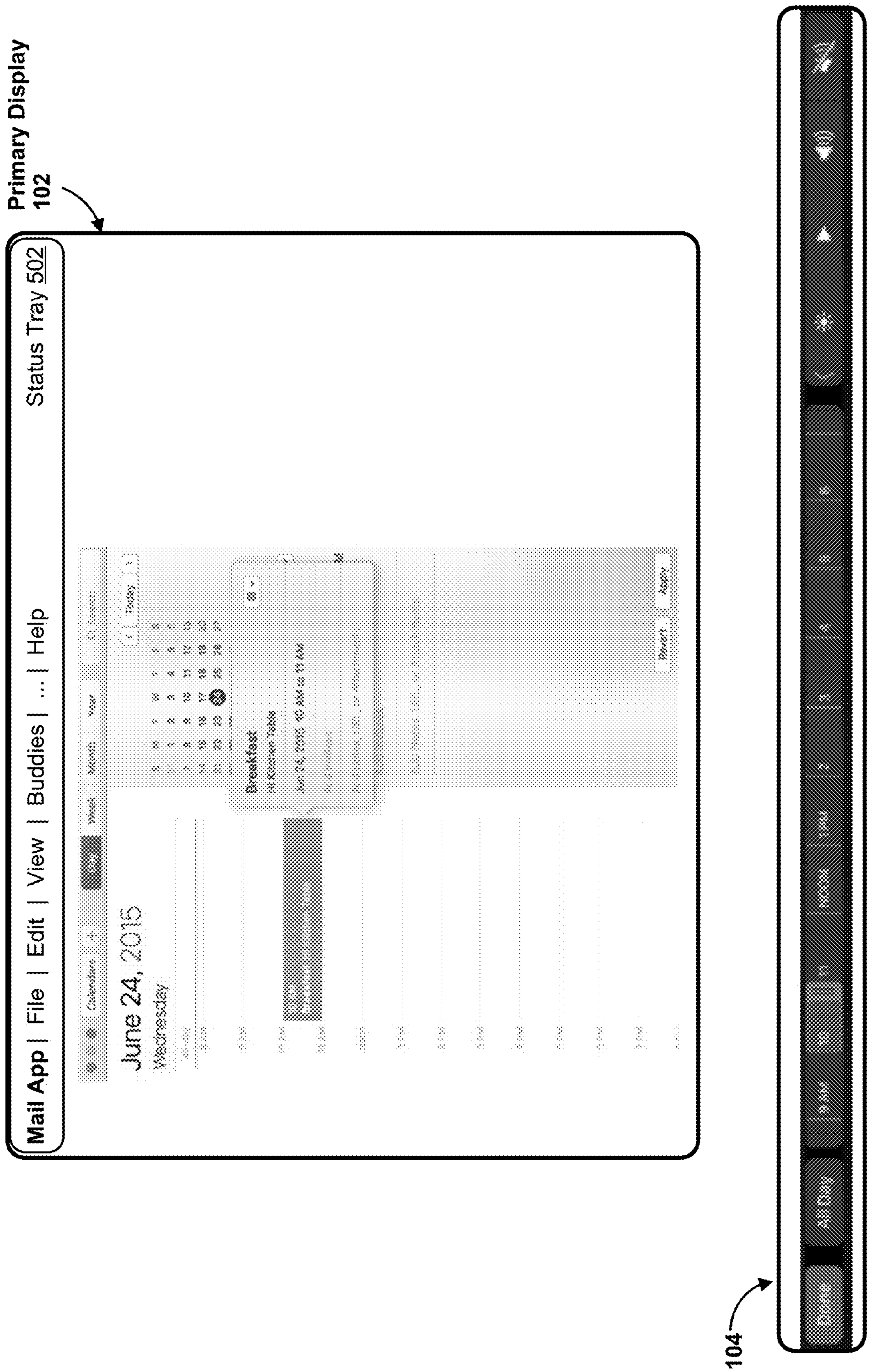
Figure 36J:
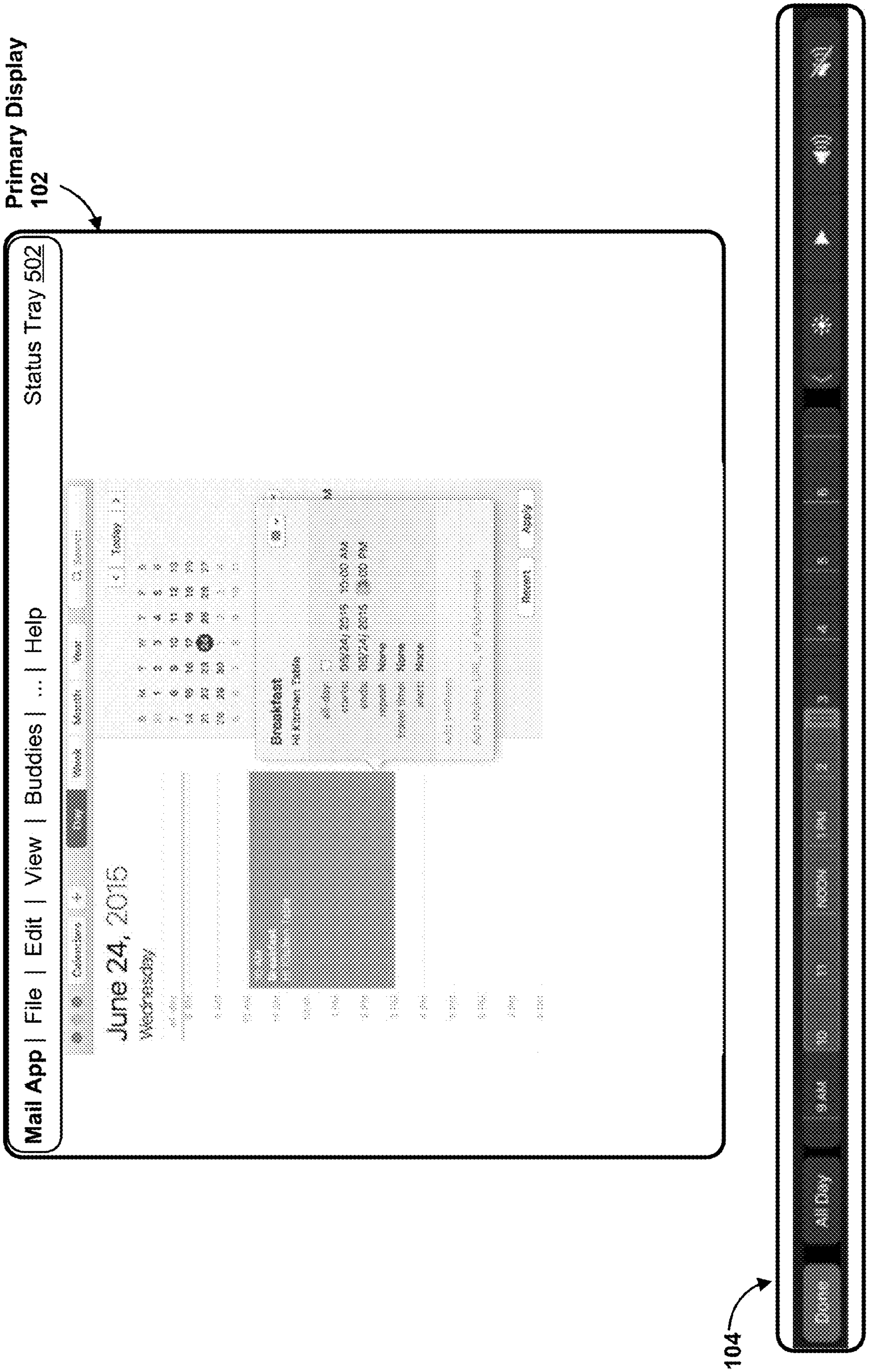
Figure 36K:
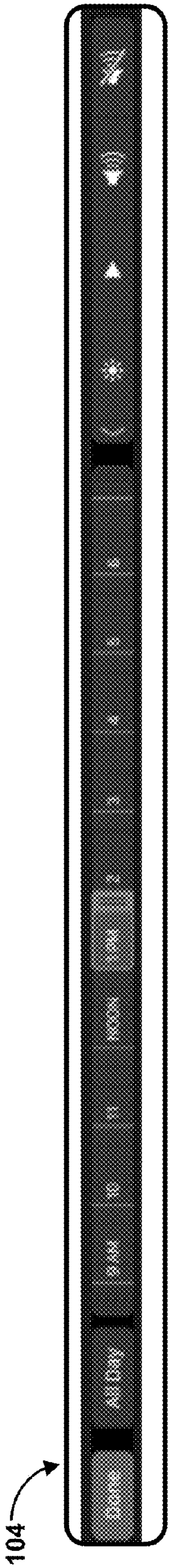
Figure 36L:
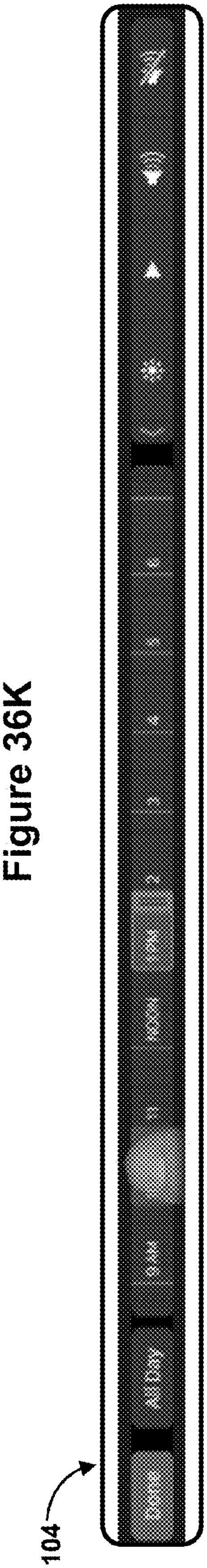
Figure 36M:
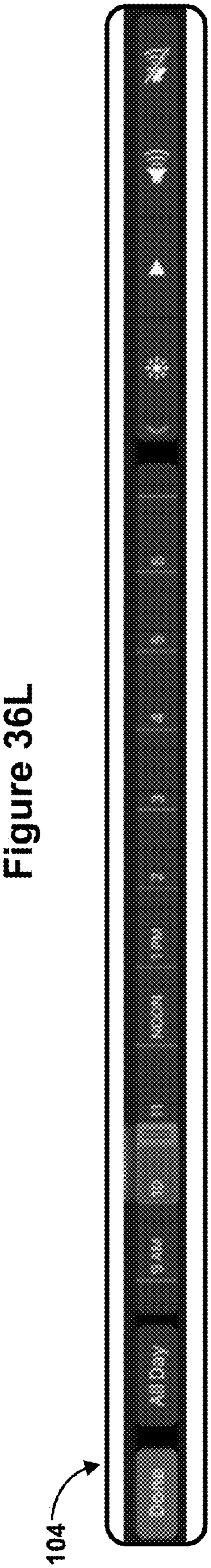
Figure 36N:
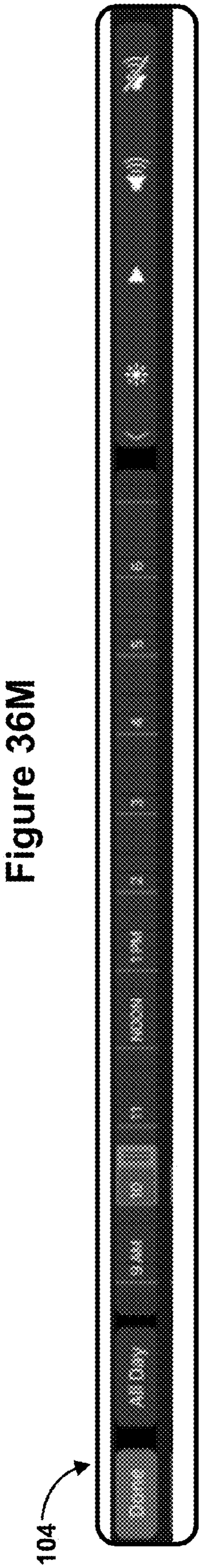
Figure 36O:
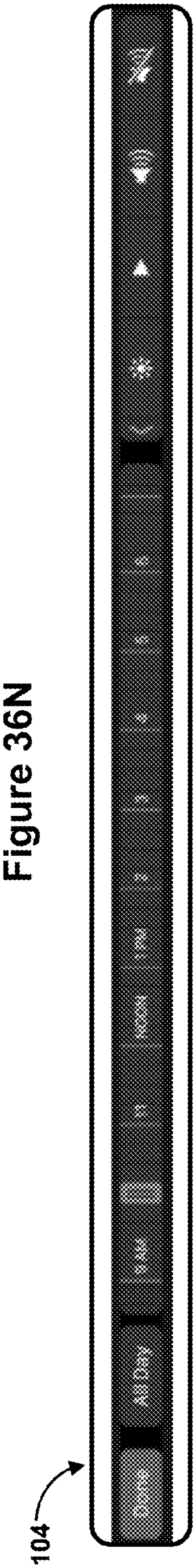
Figures 36P, 36Q, 36R, 36S, 36T:
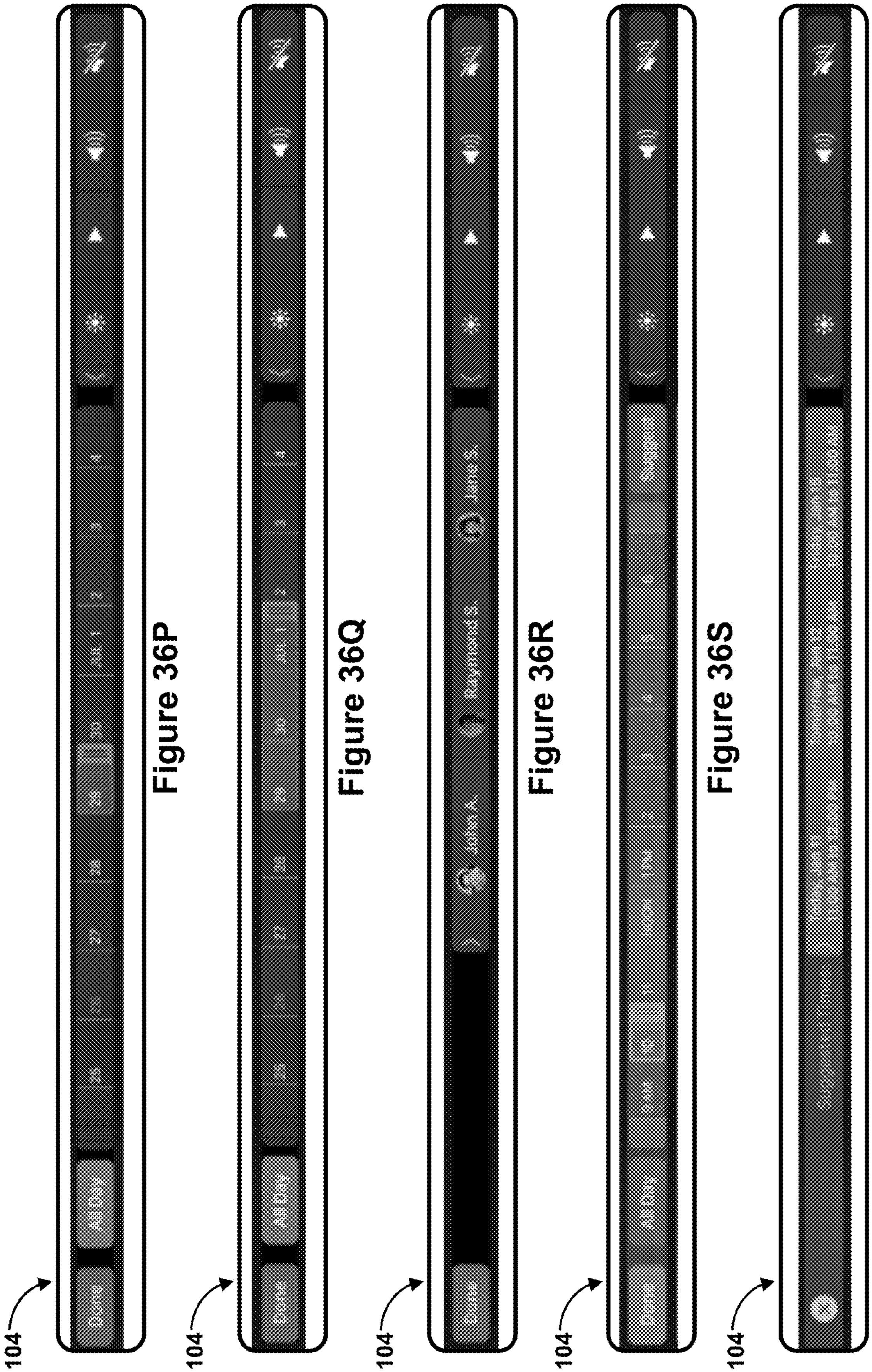
Figure 36U:
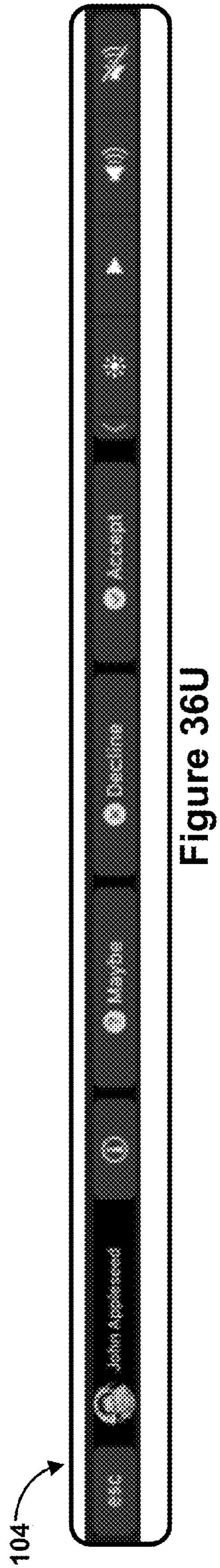
Figure 36V:
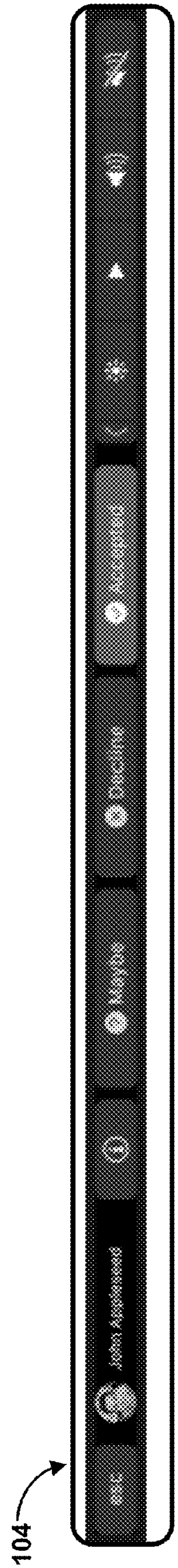
Figure 36W:
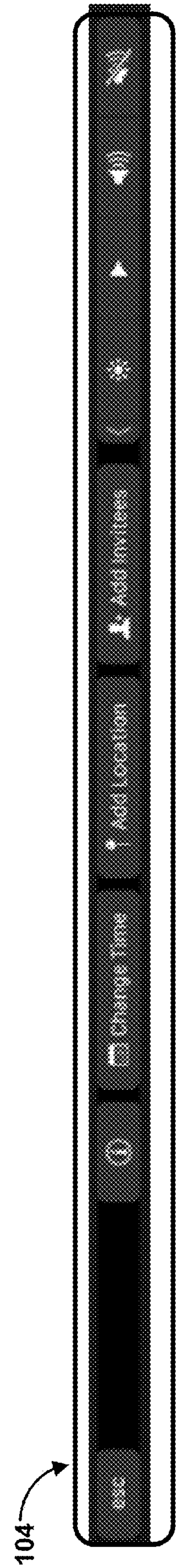

In some embodiments, the touch-sensitive secondary display 104 is populated with affordances for controlling a calendar application and for modifying events that are associated with the calendar application, as shown in FIGS. 36A-36W. In some embodiments, the affordances include affordances that allow for navigating through various calendar views (e.g., FIGS. 36A-36D), as well as affordances that allow for quickly editing event details (e.g., as shown in FIGS. 36E-36T) and affordances that allow for responding to pending event invitations (e.g., as shown in FIG. 36U-36W). Additional details regarding FIGS. 36A-36W are provided below in reference to method 1300 and FIG. 51.

Figure 37A:
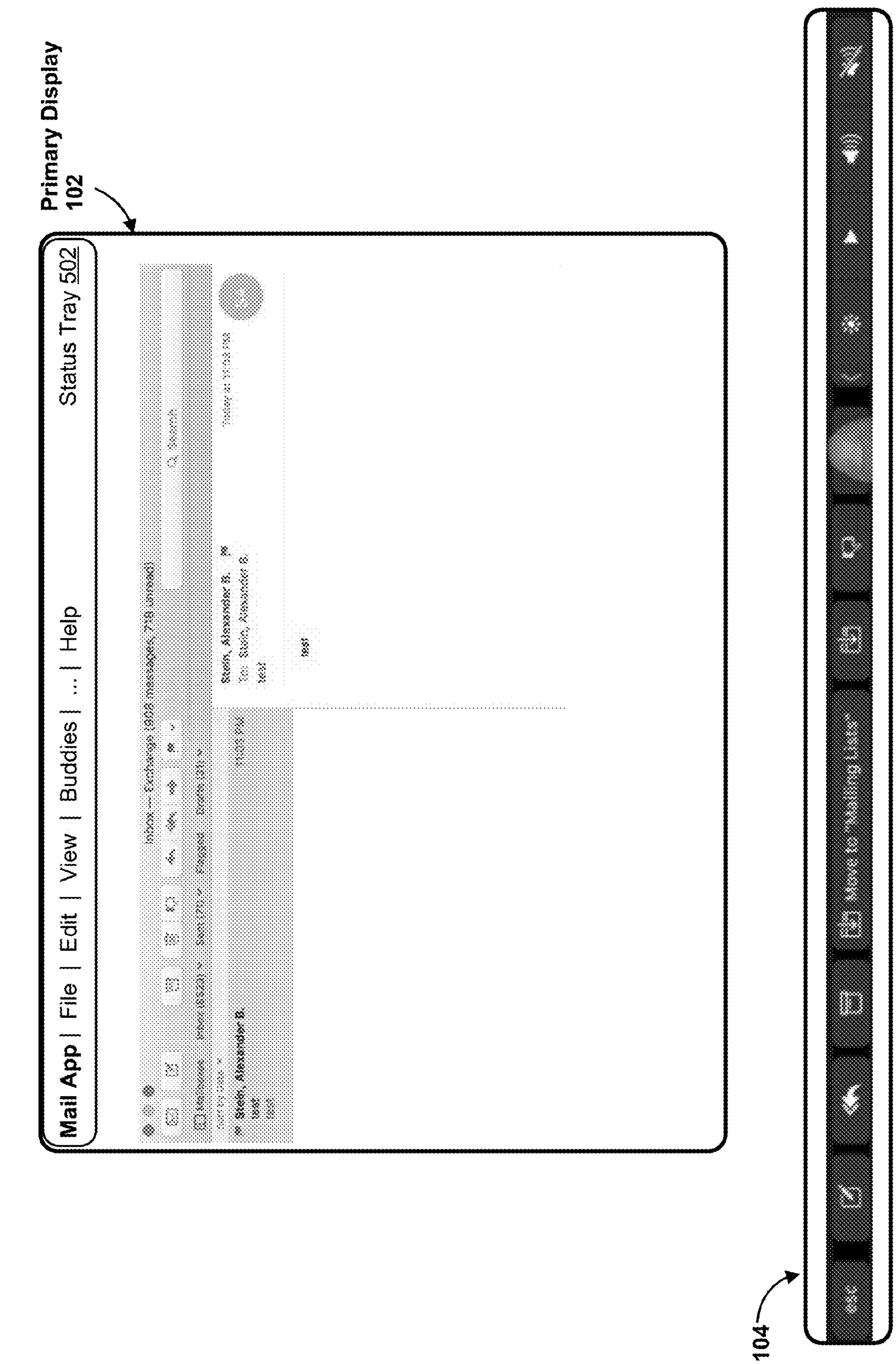
Figure 37B:
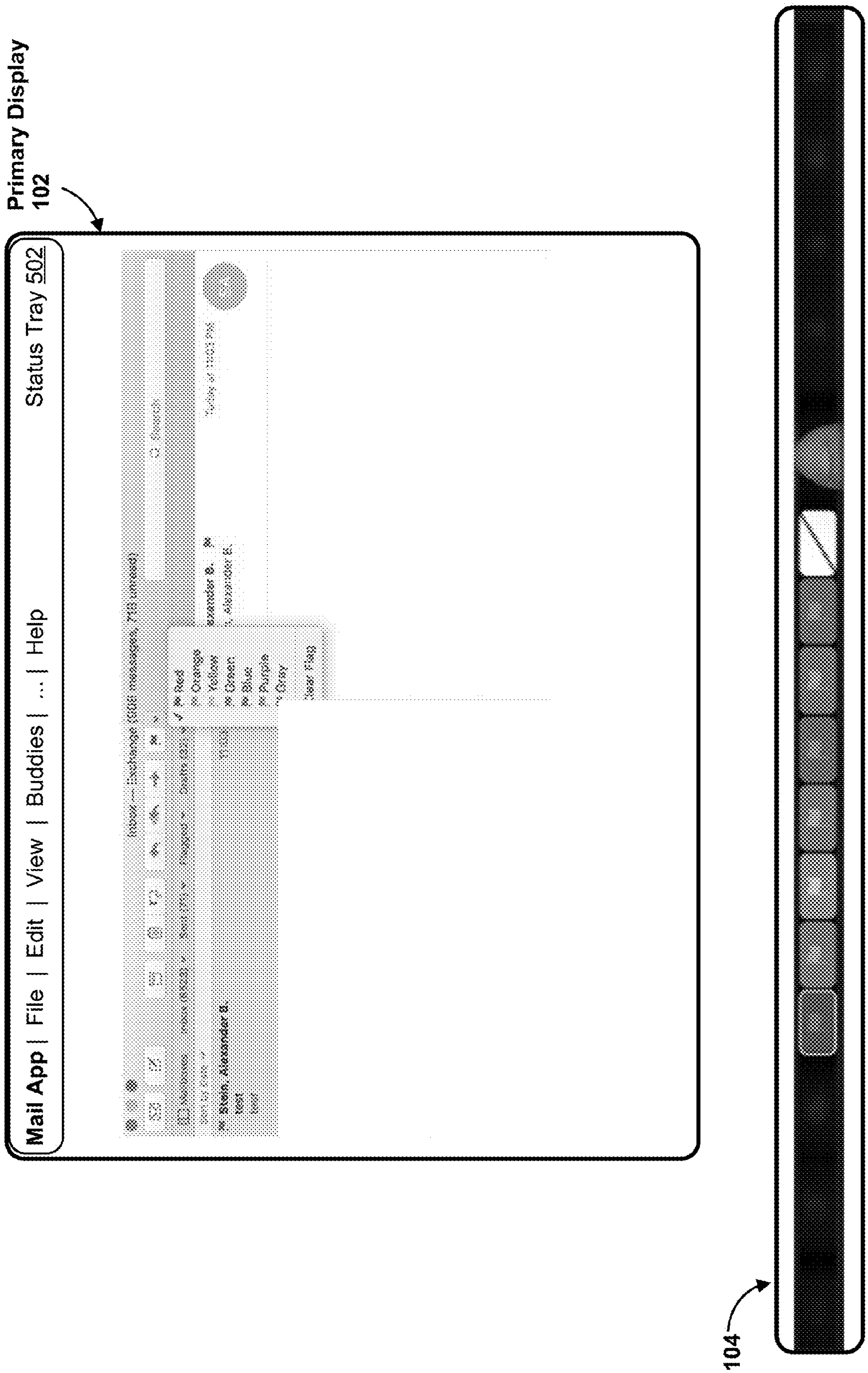
Figure 37C:
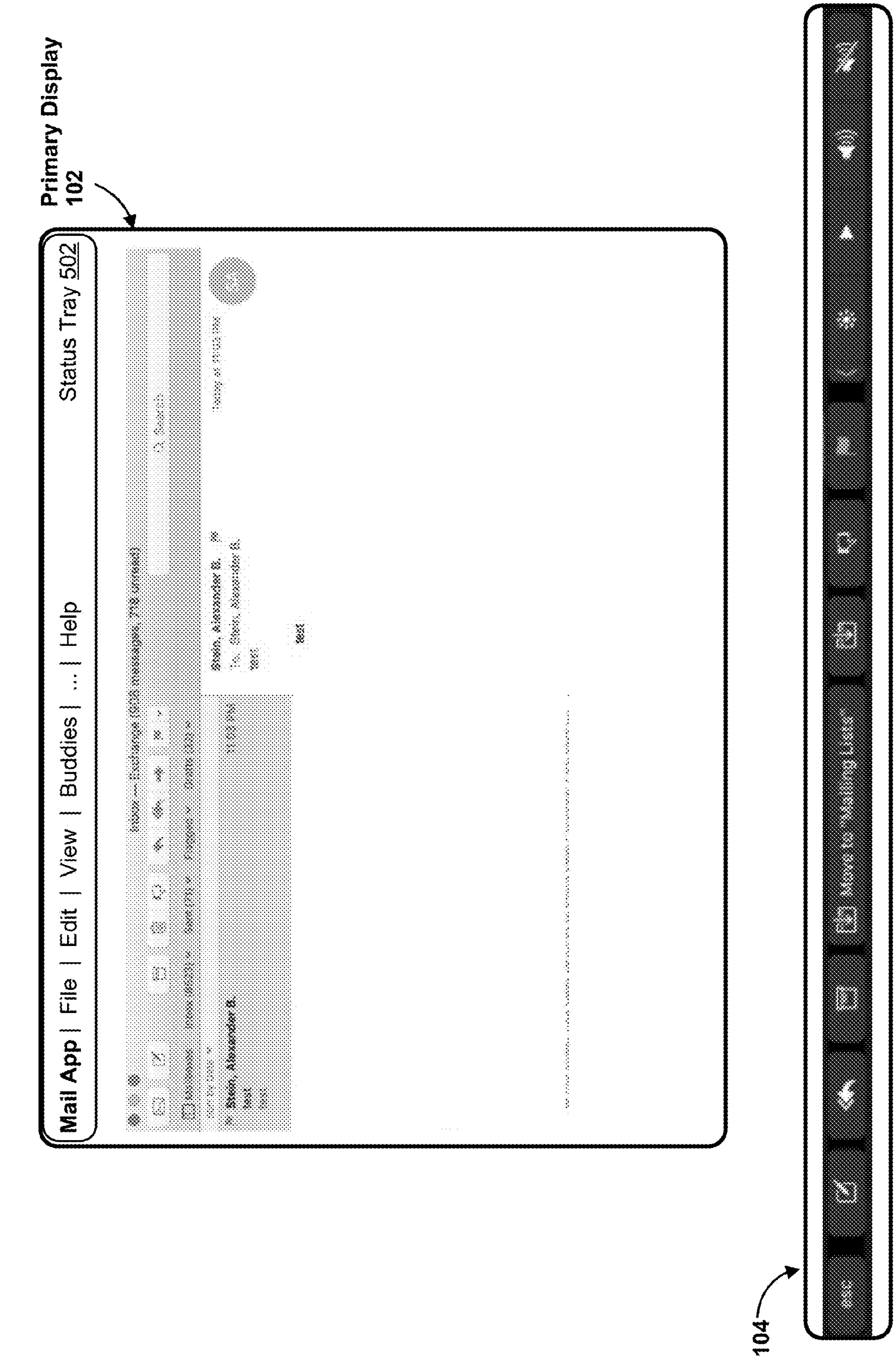

In some embodiments, the touch-sensitive secondary display 104 is populated with affordances for controlling a mail application, as shown in FIGS. 37A-37M. In some embodiments, the touch-sensitive secondary display 104 is used to efficiently change flags applied to an email that has a focus selector on the primary display 102. As shown in FIGS. 30A-37C, a user is able to initiate a press and hold gesture over a flag affordance and, in response, the touch-sensitive secondary display 104 is updated to display flag options for the email that has the focus selector, and the user then slides (in a continuous movement of the press and hold gesture) over a desired flag (e.g., the purple flag). The touch-sensitive secondary display 104 is then updated to show that the desired flag has been selected (FIG. 37C).

Figure 37D:
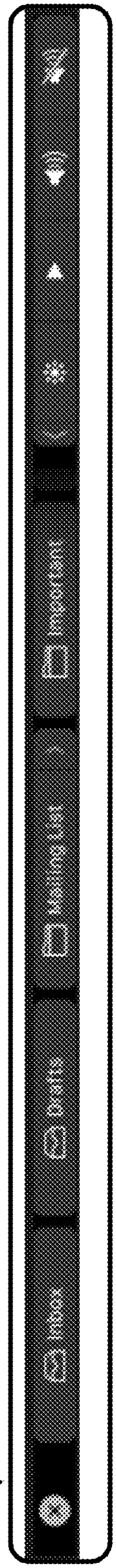
Figure 37E:
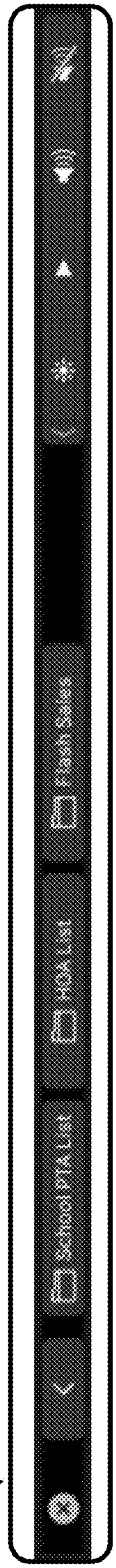
Figure 37F:
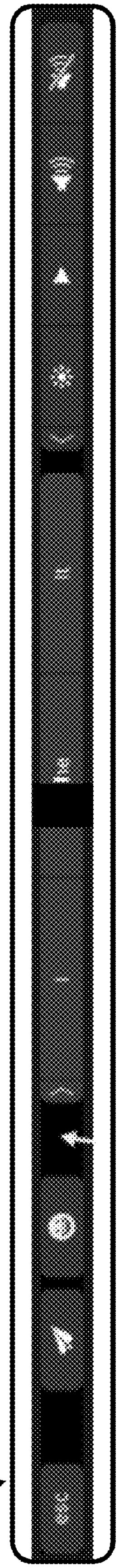

In some embodiments, in response to a selection of a move-to option (on either the primary display 102 or the touch-sensitive secondary display 104), the touch-sensitive secondary display 104 is updated to include controls for moving an email to a different folder or repository (examples are shown in FIGS. 37D-37E).

Figure 37G:
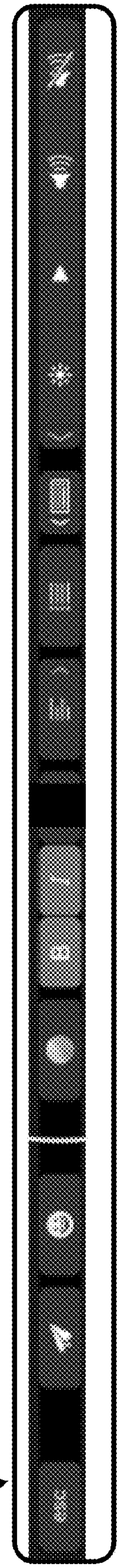
Figure 37H:
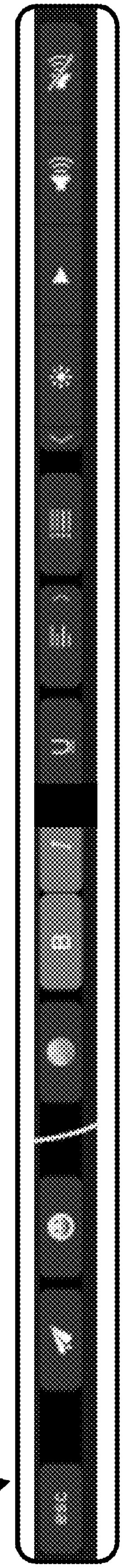
Figure 37I:
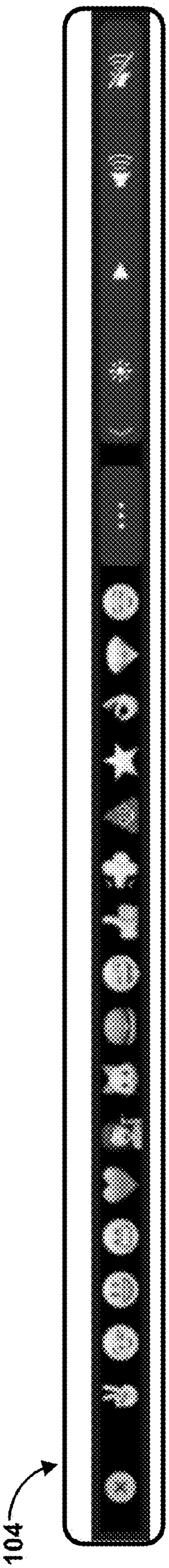
Figure 37J:
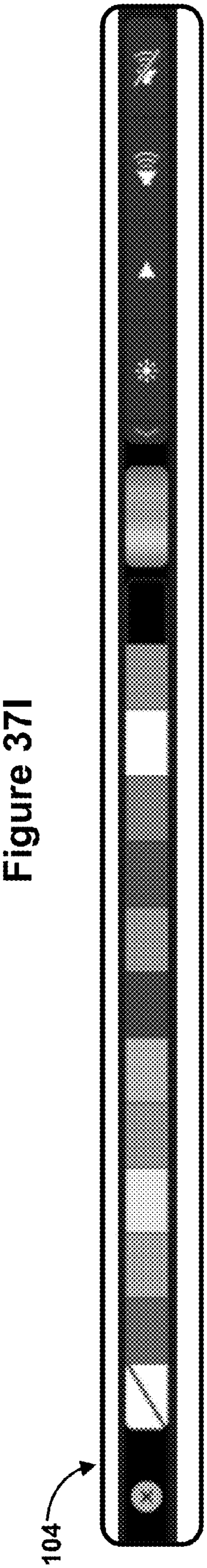
Figure 37K:
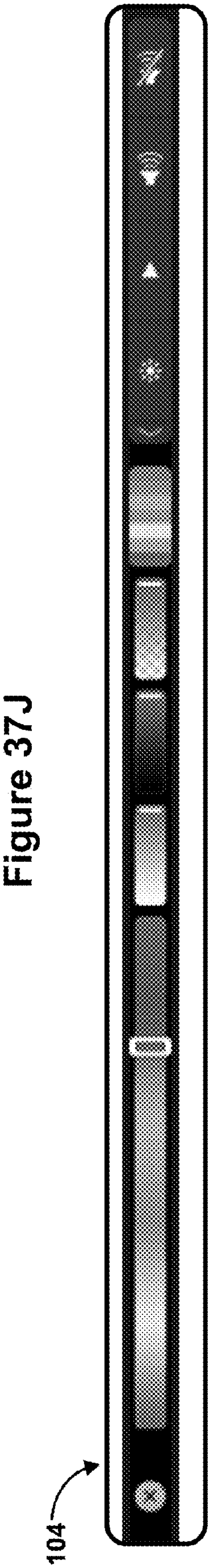

In some embodiments, while a user is editing or composing an email message, the touch-sensitive secondary display 104 is updated to include affordances for text completion ("I," "The," and "it" options shown in FIG. 37F), affordances for editing selected text (FIGS. 37G-37H, and the keyboard affordance shown in FIG. 37G is used to re-display text completion options instead of the affordances for editing text), affordances for selecting emoji (FIG. 371), and/or affordances for selecting colors to apply to text and/or graphical content (e.g., FIGS. 37J-37K).

Figure 37L:
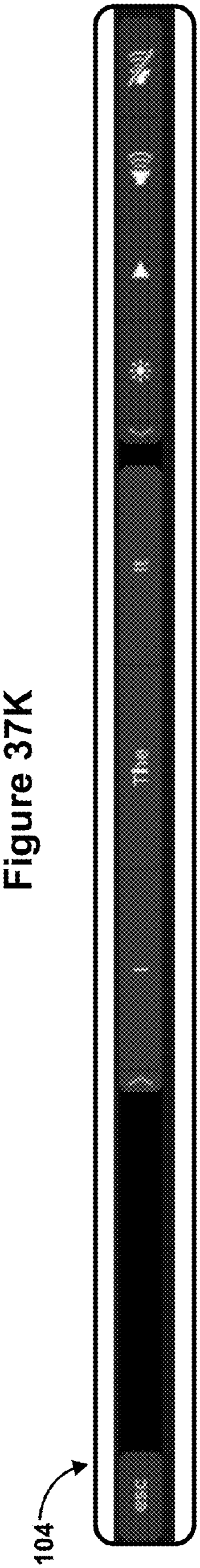
Figure 37M:
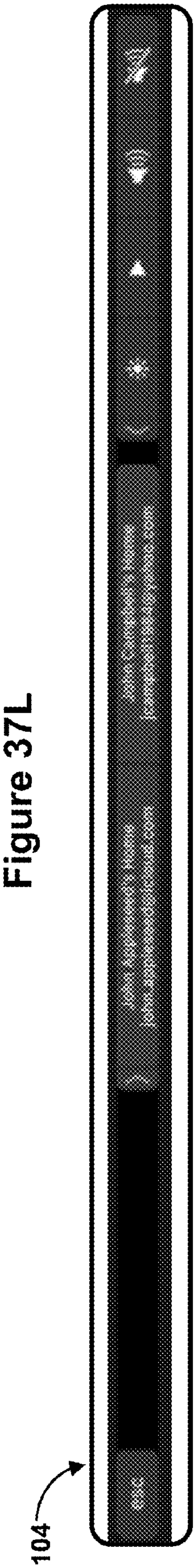

In some embodiments, the affordances for text completion include word predictions (an example is shown in FIG. 37L), spelling corrections, and/or proactive suggestions (an example is shown in FIG. 37M).

Figure 38A:
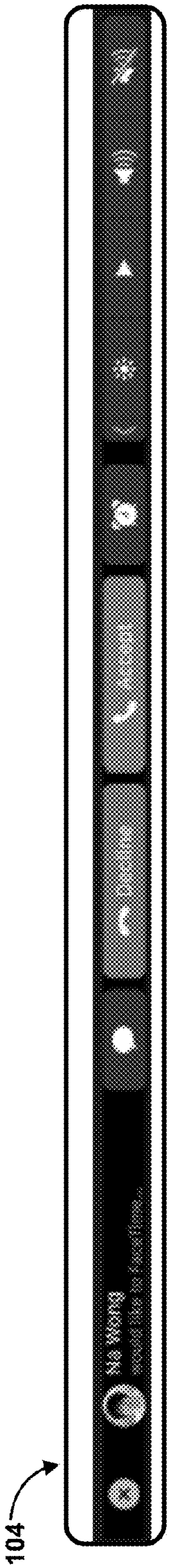
Figure 38B:
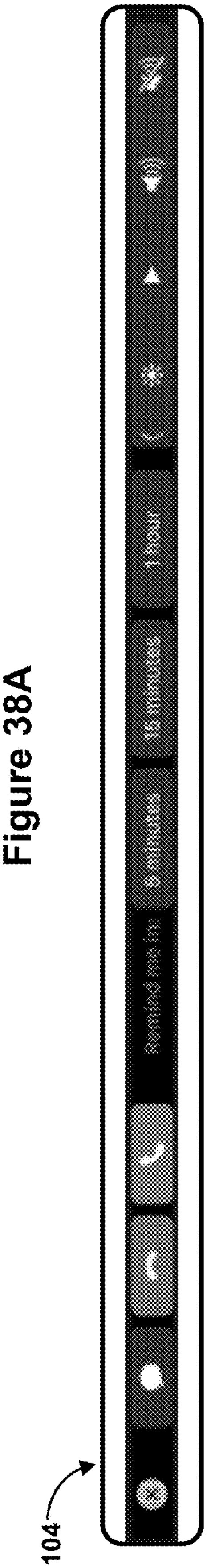
Figure 38C:
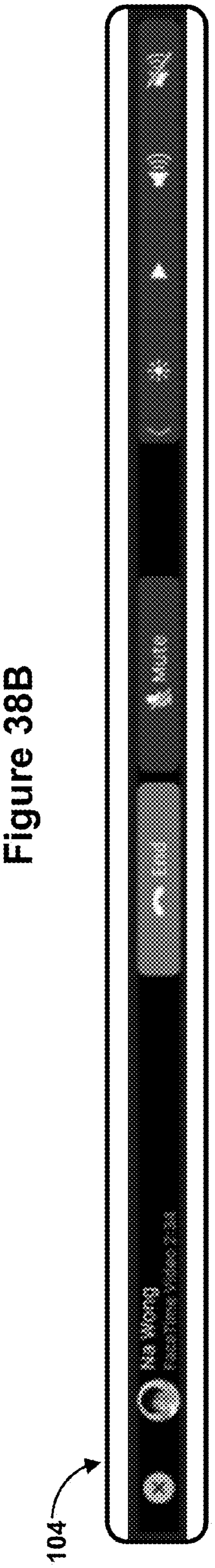
Figure 38D:
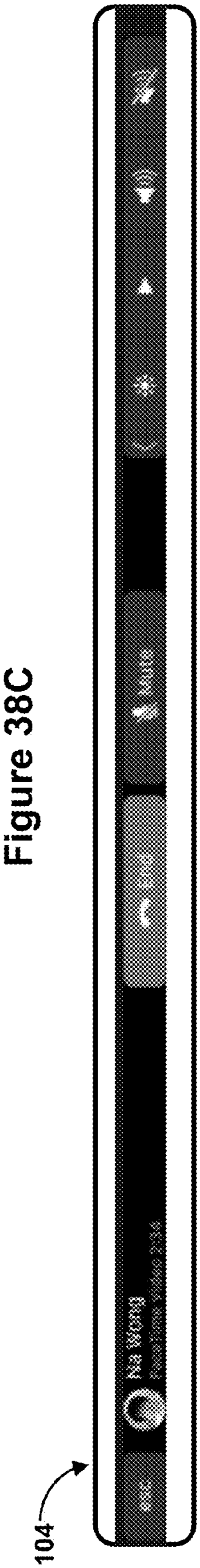
Figure 38E:
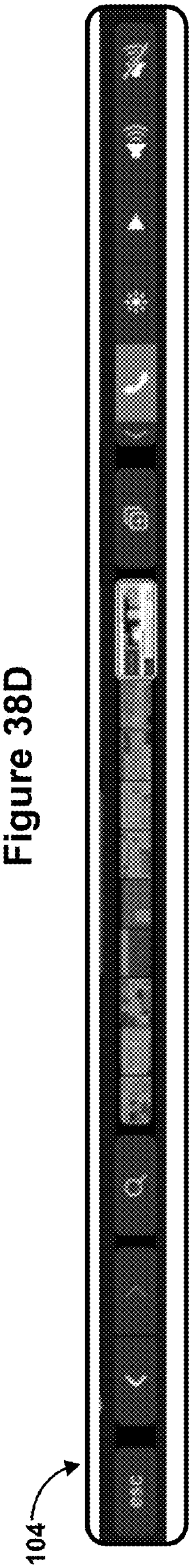

In some embodiments, the touch-sensitive secondary display 104 is populated with affordances for controlling a telephone application, as shown in FIGS. 38A-38J. In some embodiments, while a user is interacting with a first application (e.g., a web browsing application), an incoming call is received (e.g., a video call or an audio call). In response to detecting that the incoming call has been received, the computing system populates the touch-sensitive secondary display 104 with affordances that are associated with the incoming call. For example, as shown in FIG. 38A, the touch-sensitive secondary display 104 is populated with (i) a representation for the incoming caller (e.g., a photo for the incoming caller and an indication that the incoming caller would like to initiate a call); (ii) a messaging affordance that, when selected, allows the user to respond to the incoming call with a text message (e.g., by selecting a predetermined response message from within the touch-sensitive secondary display 104 or by opening up a messaging application on the primary display 102 so that the user may compose a message to send to the incoming caller); (iii) a decline affordance that, when selected, declines the incoming call (in response to detecting that the incoming call has been declined, the computing system causes the touch-sensitive secondary display 104 to revert to displaying affordances for the web browsing application, e.g., as shown in FIG. 38E); (iv) an accept affordance that, when selected, causes the computing device to accept the incoming call; and (v) a reminder affordance that, when selected, causes the touch-sensitive secondary display 104 to display reminder options for the incoming call (example reminder options displayed in response to a selection of the reminder affordance are shown in FIG. 38B).

In some embodiments, in response to detecting acceptance of the incoming call, the computing system causes the touch-sensitive secondary display 104 to display status information for the incoming call as well as an end affordance for ending the incoming call and a mute affordance for muting the incoming call, as shown in FIGS. 38C and 38D). In some embodiments, if the user was previously viewing a different application when the incoming call was received (e.g., the web browsing application discussed above), then the touch-sensitive secondary display 104 displays the status information in an overlay mode (FIG. 38C) in which an "x" affordance is displayed that allows for exiting the overlay mode and returning to controls for the different application (e.g., in response to detecting a selection of the "x" affordance in FIG. 38C, the touch-sensitive secondary display 104 reverts to displaying controls for the different application, such as those shown in FIG. 38E).

In some embodiments, if the user was viewing a telephone application (e.g., a FACETIME application) when the incoming call was received, then the touch-sensitive secondary display 104 displays the status information as shown in FIG. 38D, in which an "esc" affordance is displayed instead of the "x" affordance discussed above. Additional details regarding switching between displaying an "x," "esc," and other affordances in a leftmost region (also referred to as a smart label region for a smart label button) of the touch-sensitive secondary display 104 depending on what is being viewed or interacted with on the primary display 102 are provided below regarding the smart label button.

Figure 38F:
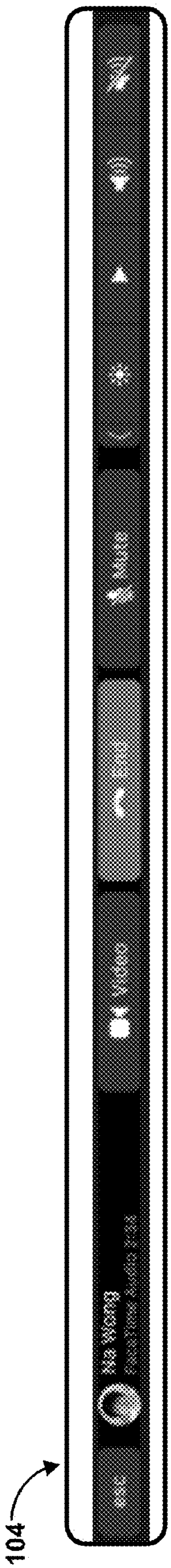

In some embodiments, in accordance with a determination that the incoming call is an audio call, then the touch-sensitive secondary display 104 is populated with a video affordance that, when selected, initiates a request to the incoming caller to begin a video call (an example of the video affordance is shown in FIG. 38F).

Figure 38G:
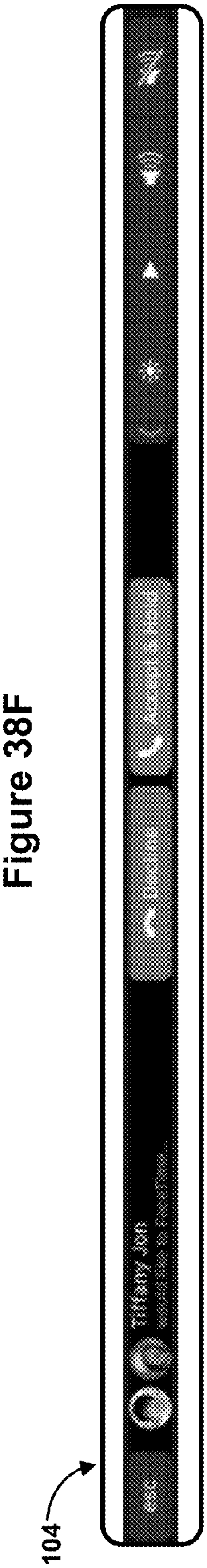
Figure 38H:
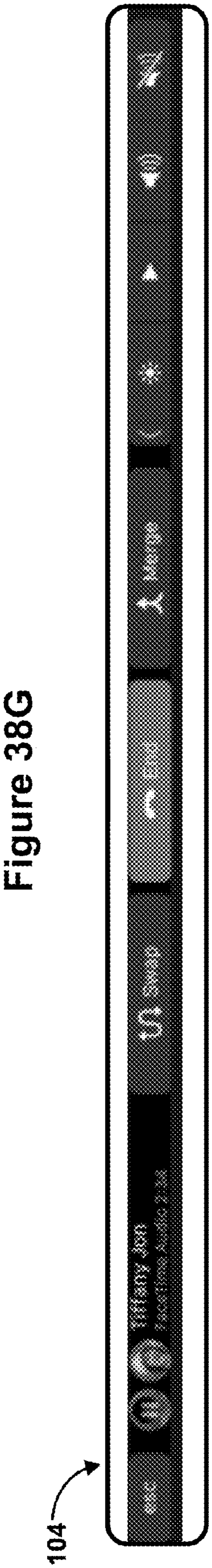
Figure 38I:
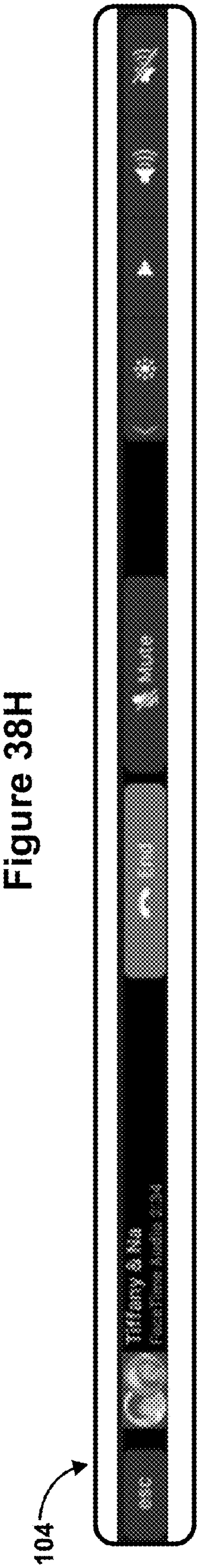

In some embodiments, if a new call is received while the incoming call discussed above is ongoing, then the touch-sensitive secondary display is populated to include information and affordances that correspond to the new call (e.g., as shown in FIG. 38G (affordances displayed when the new call is received)-38H (affordances displayed when the new call is accepted)). In some embodiments, in response to detecting a selection of the merge affordance, two or more ongoing calls are merged and the touch-sensitive secondary display is updated to reflect that the two or more ongoing calls have been merged (e.g., as shown in FIG. 381, representations corresponding to the two or more ongoing calls are shown as overlapping instead of separated).

Figure 38J:
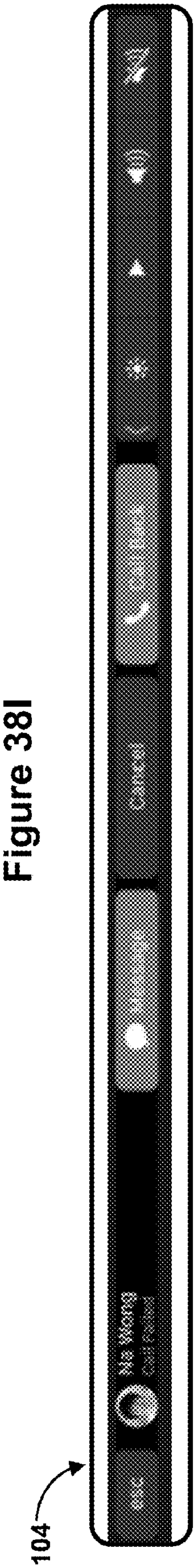

In some embodiments, in accordance with a determination that a call failure has occurred, the touch-sensitive secondary display 104 is populated with affordances for messaging and/or calling back another party from the failed call (e.g., as shown in FIG. 38J).

Figure 39:
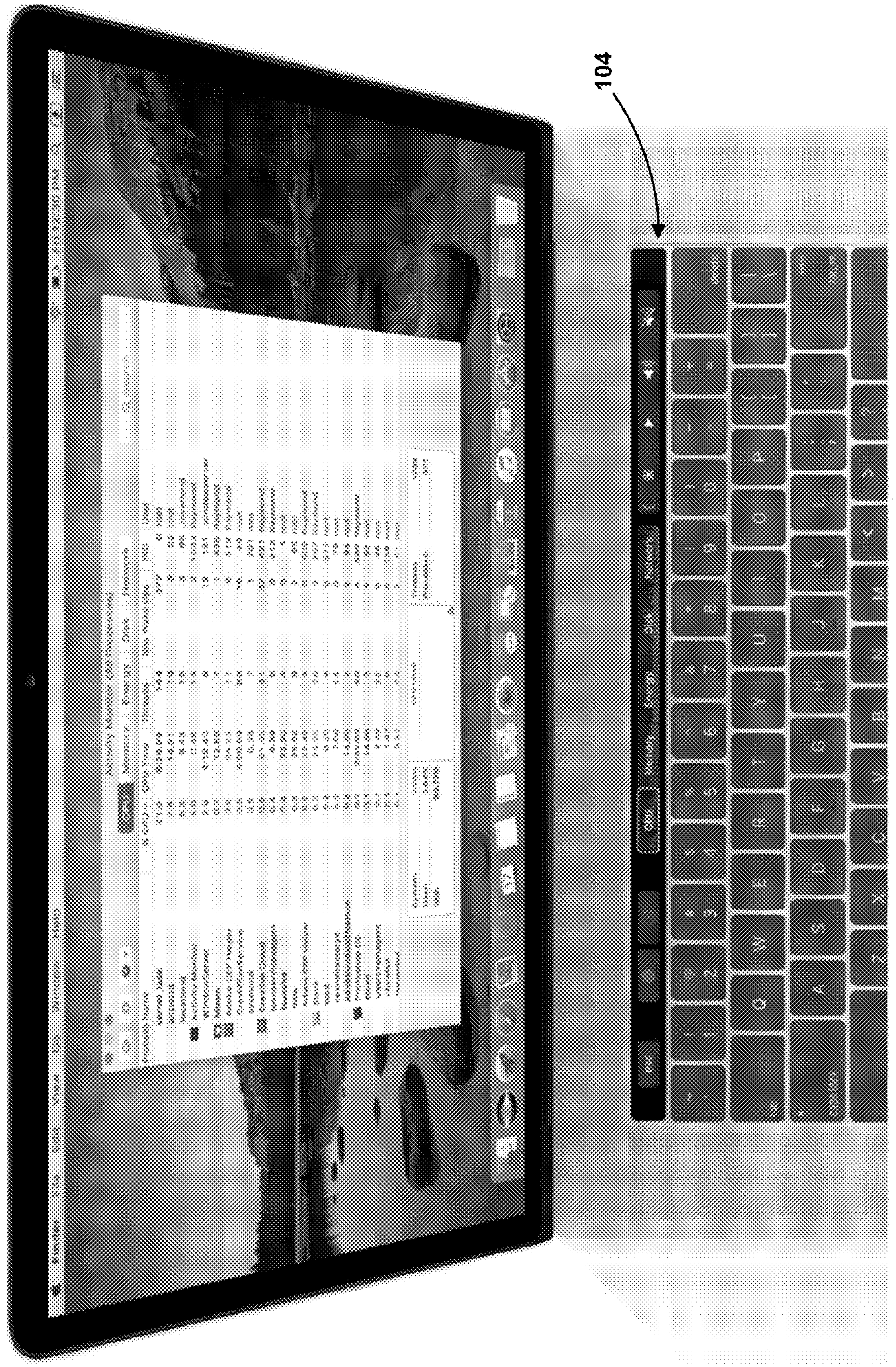

In some embodiments, the touch-sensitive secondary display 104 is populated with affordances for controlling an activity monitoring application, as shown in FIG. 39. For example, these affordances include affordances for switching between each tab of the activity monitoring application and each of these affordances is displayed with a representation of current processor activity associated with a respective corresponding tab (as shown in FIG. 39).

Figure 40:
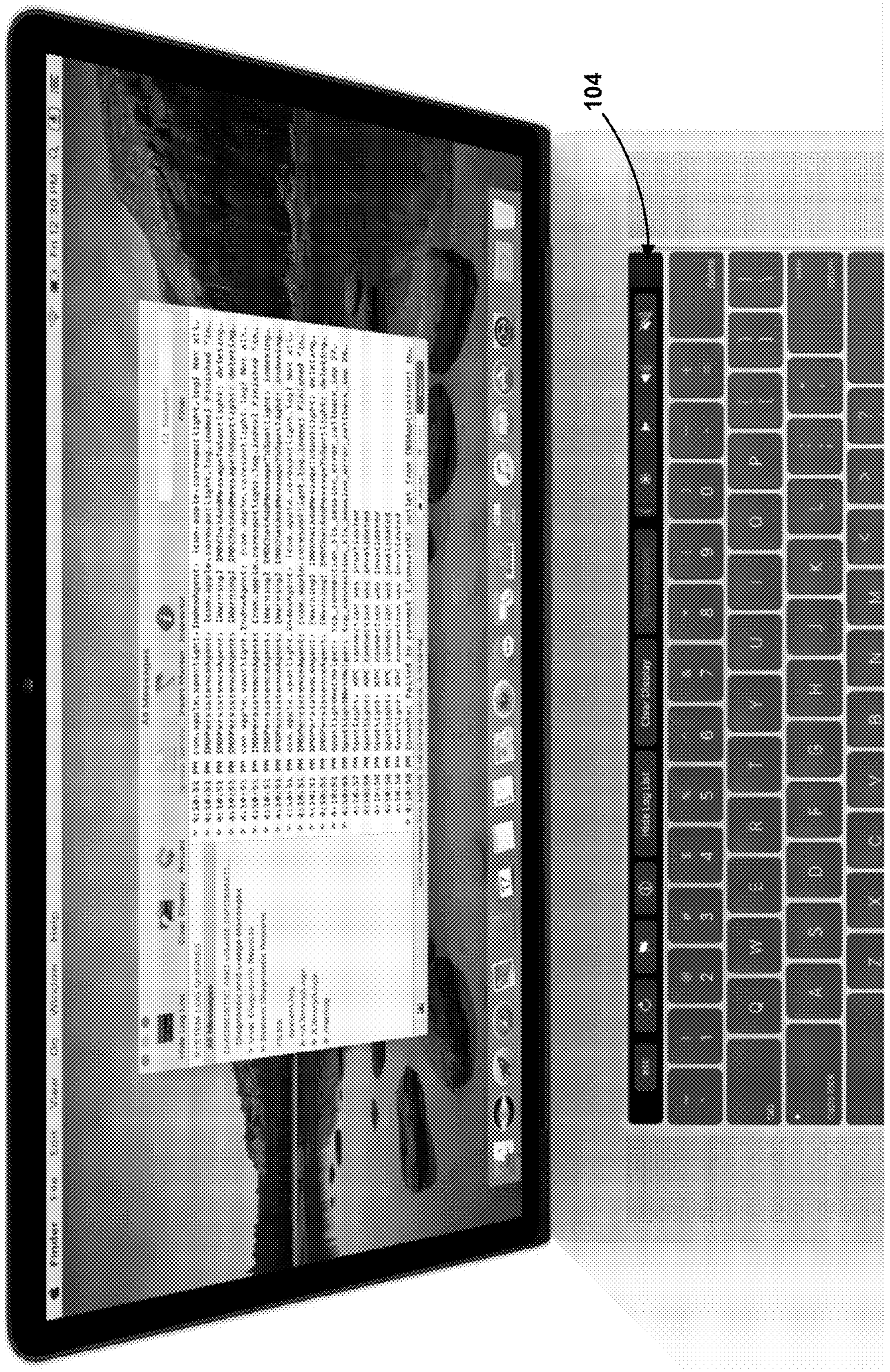

In some embodiments, the touch-sensitive secondary display 104 is populated with affordances for controlling an activity logging application, as shown in FIG. 40.

Figure 41A:
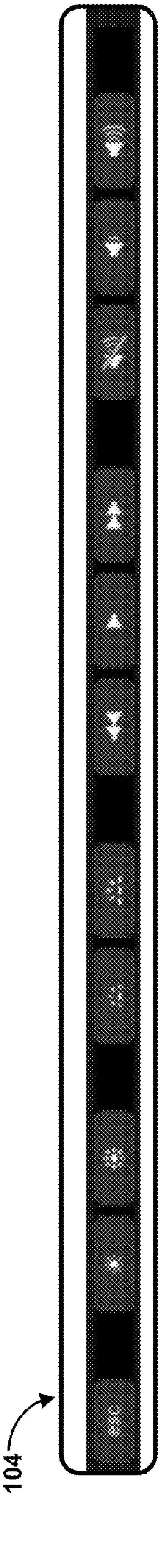
Figure 41B:
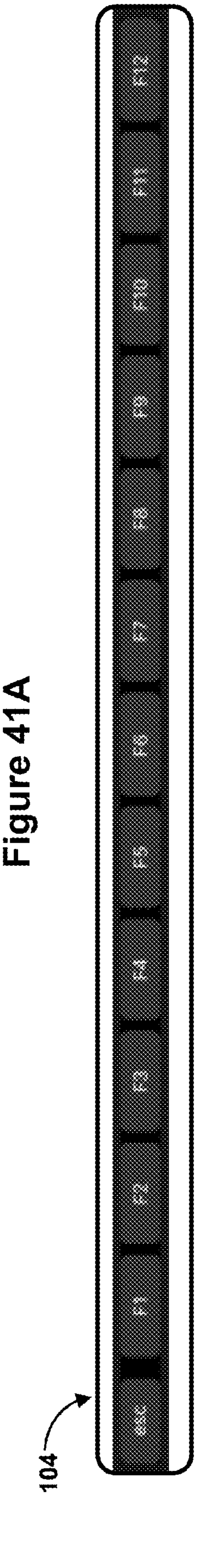
Figure 41C:
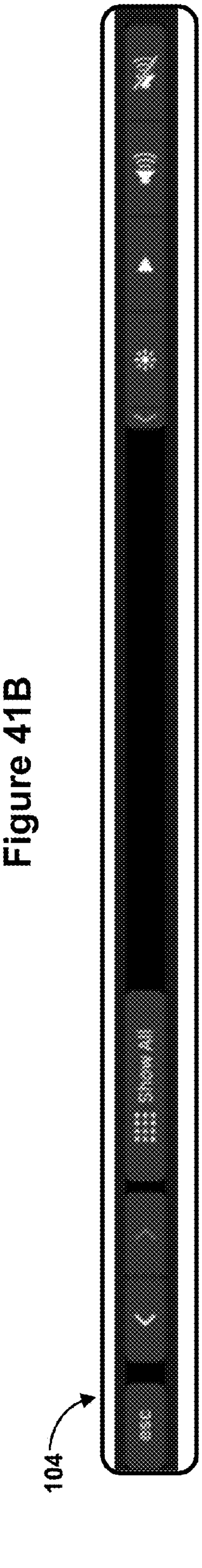
Figure 41D:
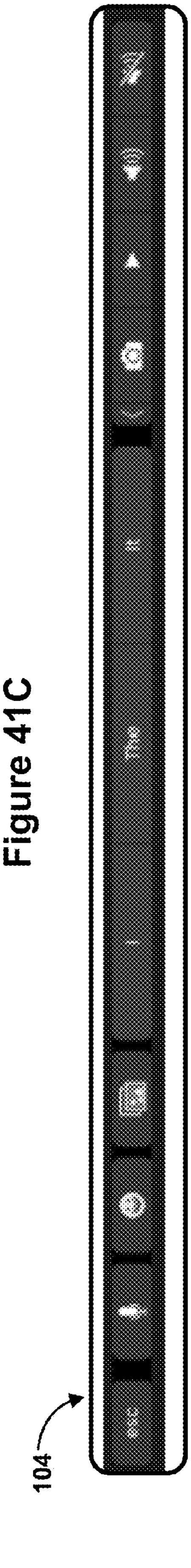
Figure 41E:
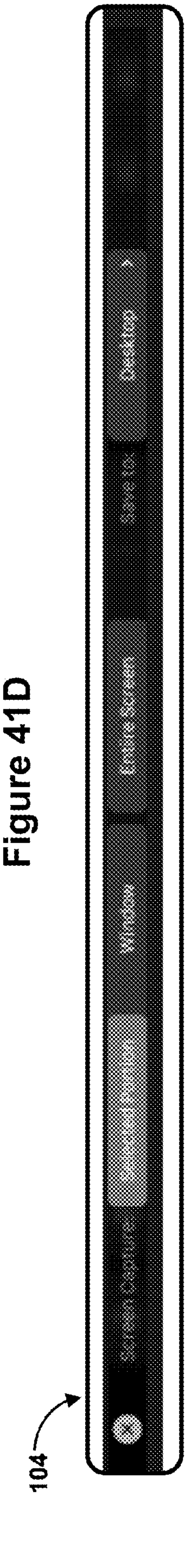

In some embodiments, the touch-sensitive secondary display 104 is populated with affordances for accessing certain functions while in a different boot mode (such as a mode in which the computing system boots up in an operating system that is not compatible with dynamically rendering controls at the touch-sensitive secondary display 104, FIGS. 41A-41B), for viewing system preferences (e.g., "Show All" affordance of FIG. 41C), and for capturing screenshots (e.g., in response to a predefined sequence of keyboard inputs, such as "command+shift+4," (or in response to a user selecting the photo icon shown in the right-hand system tray portion of the touch-sensitive secondary display of FIG. 35B) the touch-sensitive secondary display 104 is populated with controls for capturing a screenshot, FIG. 41E).

Figure 42A:
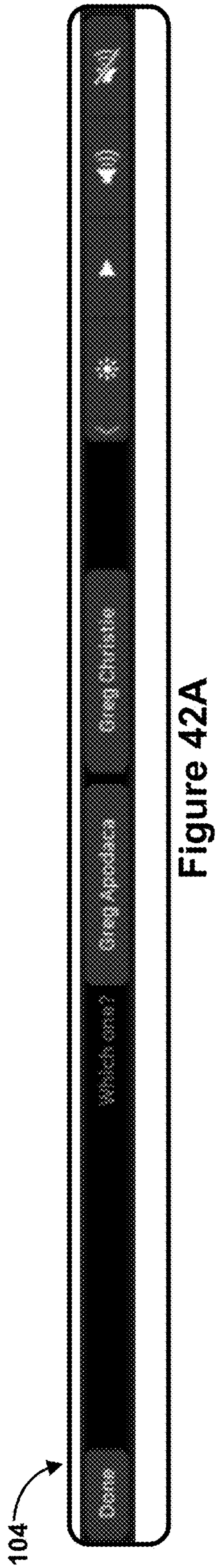
Figure 42B:
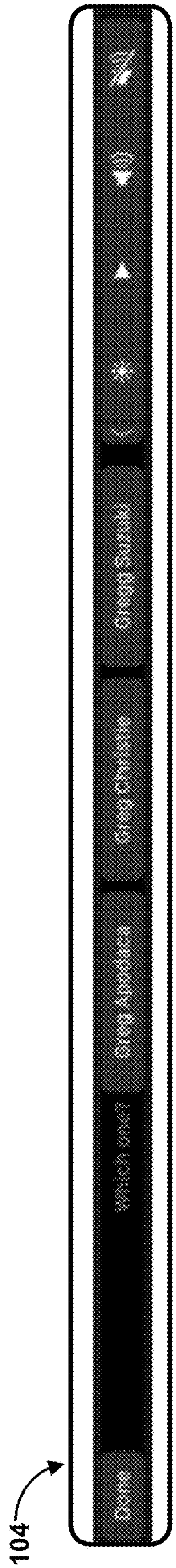
Figure 43A:
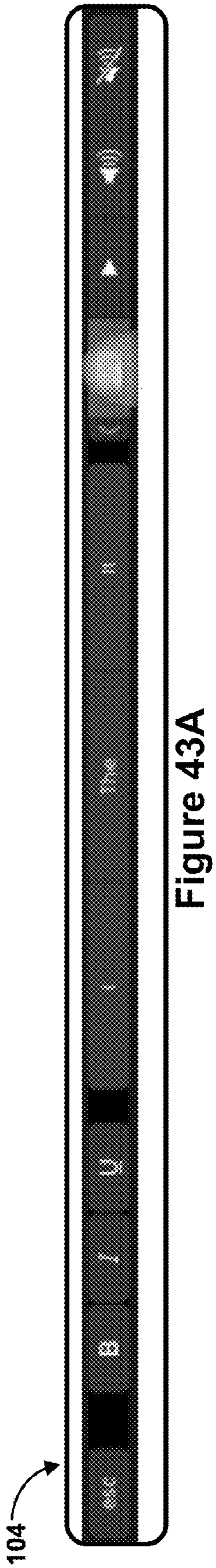
Figure 43B:
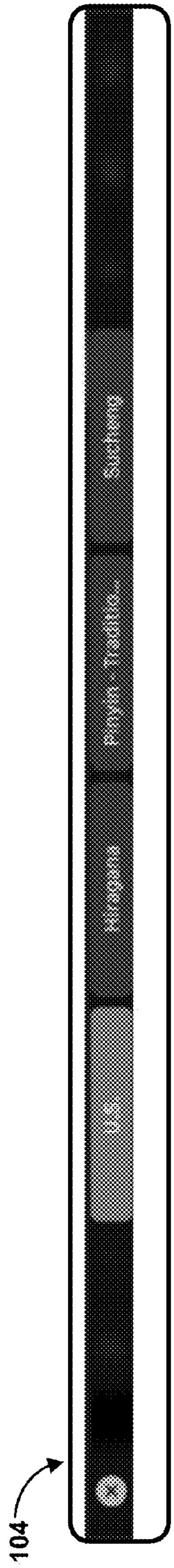
Figure 43C:
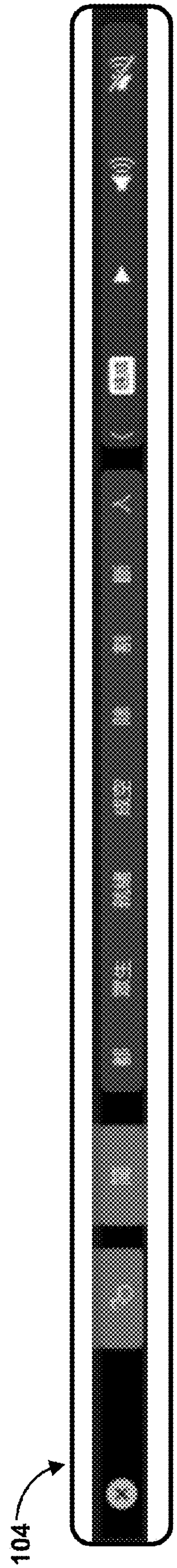
Figure 43D:
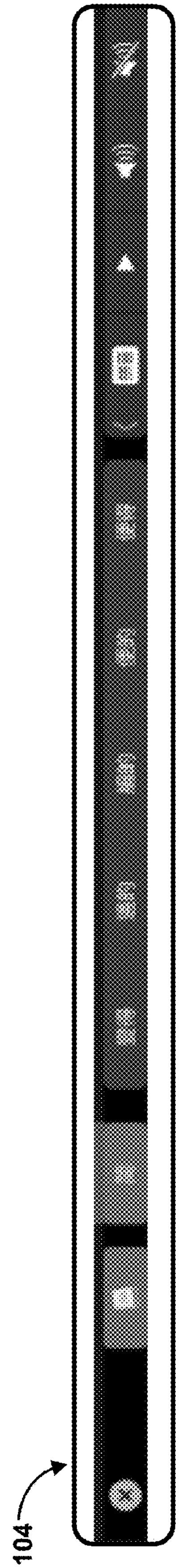
Figure 44A:
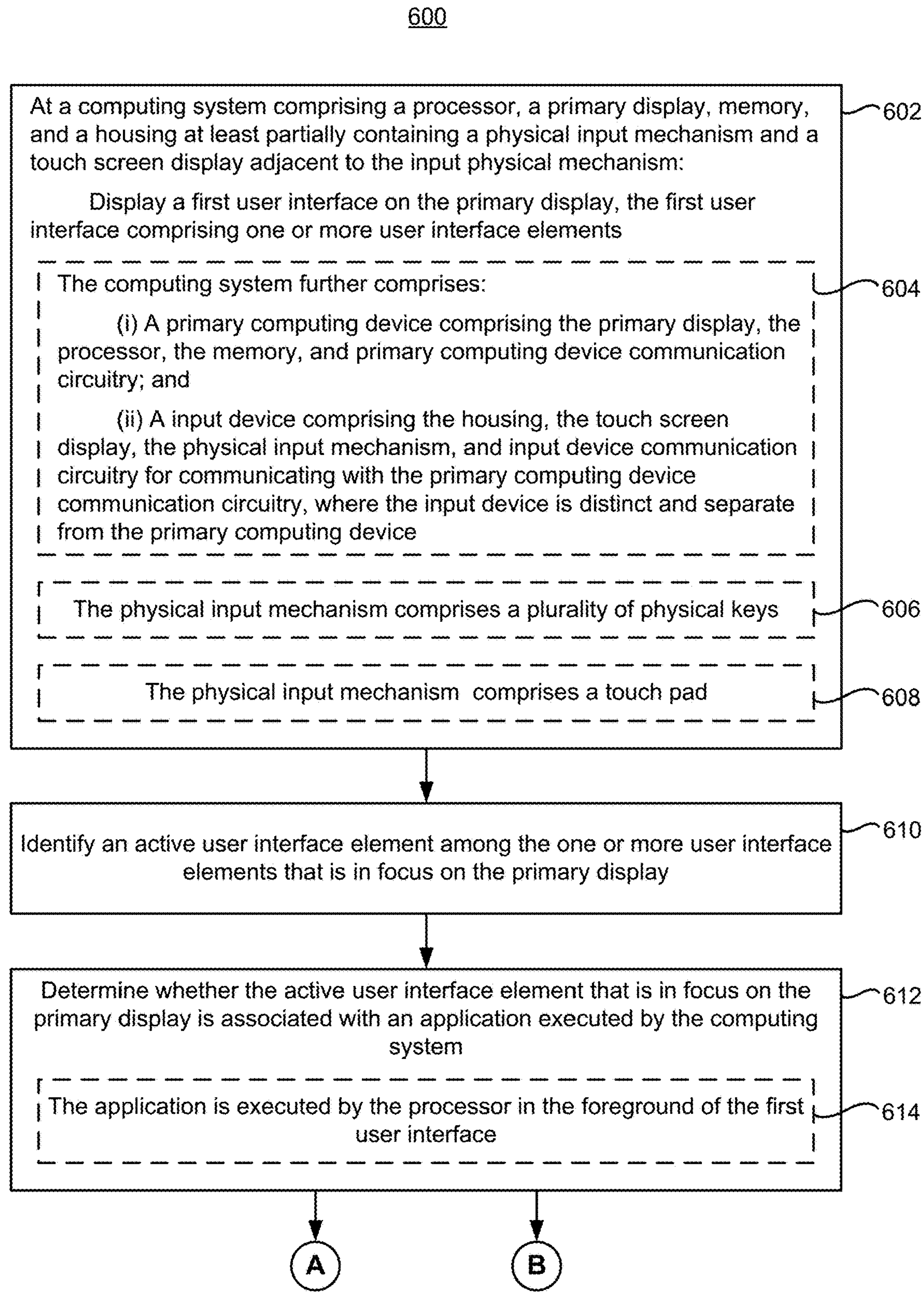
Figure 44B:
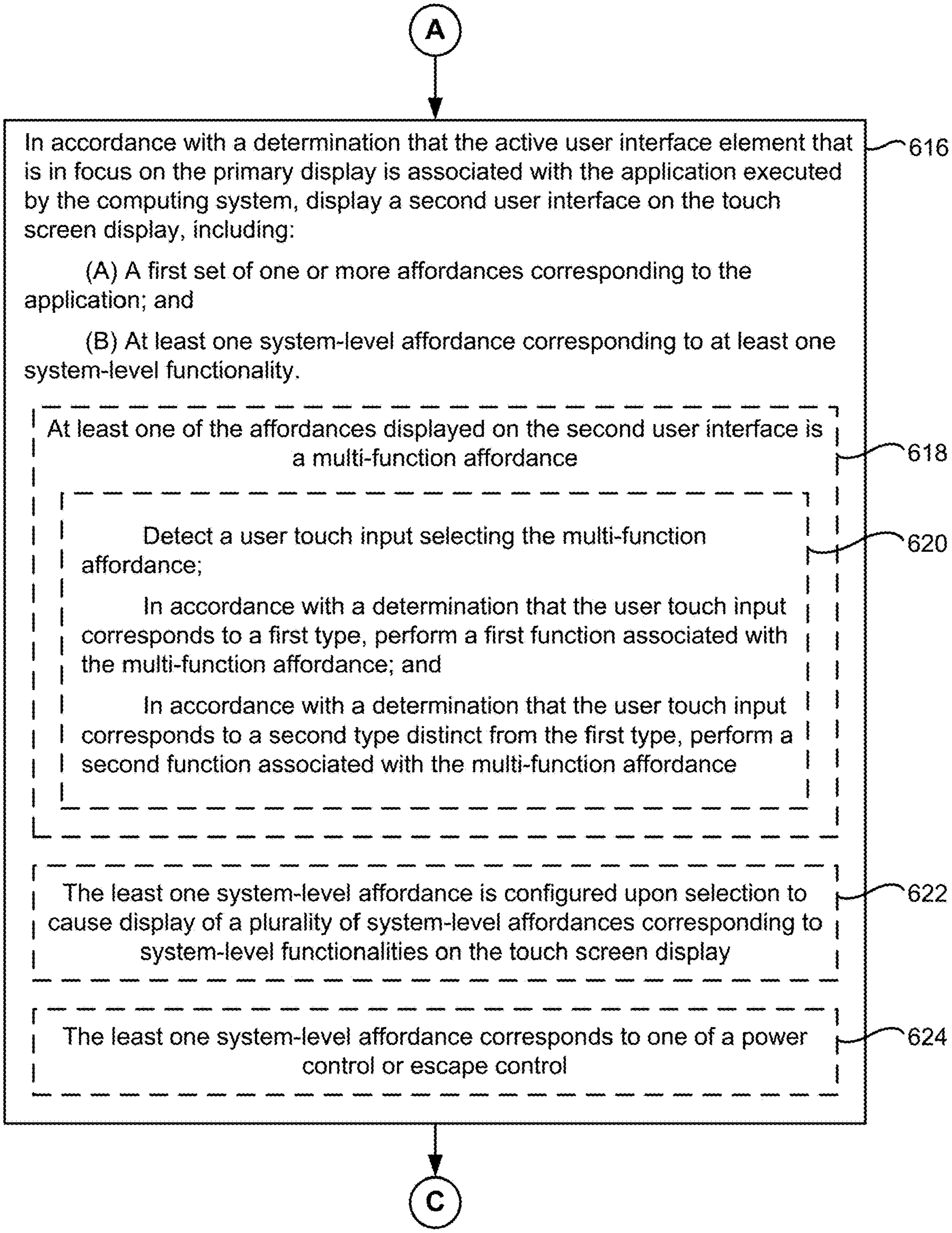
Figure 44C:
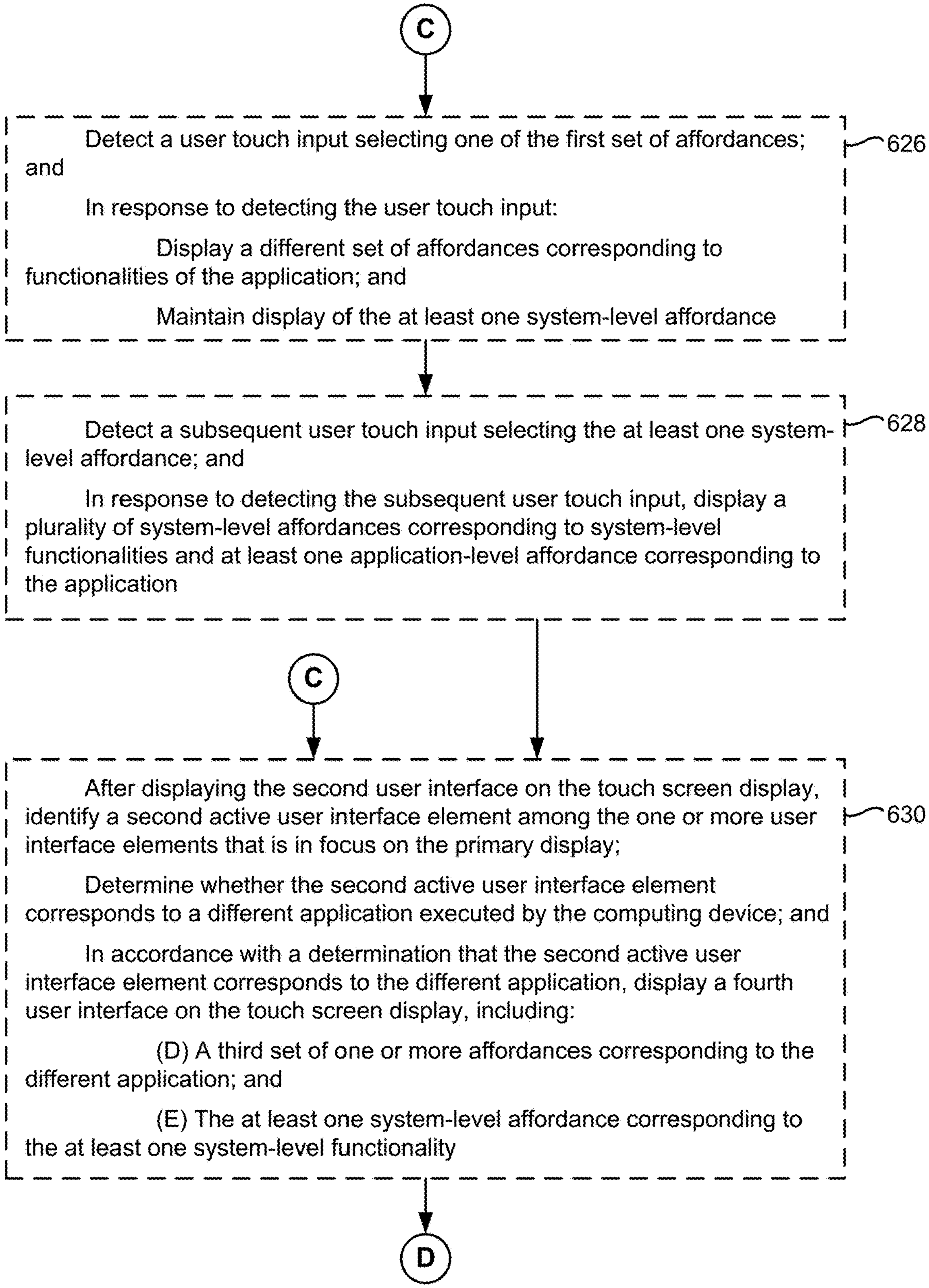

In some embodiments, the touch-sensitive secondary display 104 is populated with affordances for controlling or providing additional information to a virtual assistant application, as shown in FIGS. 42A-42B. In some embodiments, the computing system updates the touch-sensitive secondary display 104 in response to receipt of verbal commands from a user. For example, the computing system provides, to the touch-sensitive secondary display 104, data that enables the touch-sensitive secondary display 104 to present options for disambiguating a particular verbal command (e.g., as shown in FIGS. 42A-42B).

In some embodiments, the touch-sensitive secondary display 104 is populated with affordances for controlling text entry functions and for accessing a set of non-English characters, as shown in FIGS. 43A-43D. In some embodiments, the affordances for accessing a set of non-English characters are available via the touch-sensitive secondary display 104 while a user is interacting with a messaging application, a document editing application, or some other application that allows for text entry and editing.

In some embodiments, the touch-sensitive secondary display 104 includes a smart label button that occupies a leftmost region of the touch-sensitive secondary display 104. In some embodiments, the smart label button changes based on what a user is viewing on the primary display 102 and, in some circumstances, based on what controls are available in the touch-sensitive secondary display 104 at a particular point in time. For example, the smart label button may display "esc" (allowing a user to exit a currently displayed application that is shown on the primary display 102), "x" (allowing a user to exit an overlay display mode and revert to displaying controls for an application that has a focus selector on the primary display 102), "cancel" (allowing a user to cancel/revert changes made using various controls at the touch-sensitive secondary display 104), "done" (allowing a user to indicate that they are done making certain changes via the touch-sensitive secondary display 104), and "exit."

In some embodiments, the touch-sensitive secondary display 104 is associated with multiple display modes. In some embodiments, a three finger (or two finger) gesture is provided at the touch-sensitive secondary display 104 to switch between each of the multiple modes. In some embodiments, the gesture is provided in a substantially horizontal or a substantially vertical direction. In some embodiments, the multiple modes include: (i) a customized mode in which the touch-sensitive secondary display 104 displays affordances that have been customized by the user for use with the customized mode; (ii) a current context mode in which the touch-sensitive secondary display 104 displays affordances that correspond to the primary display and system-level functions; and (iii) a system function mode in which the touch-sensitive secondary display 104 displays system functions only.

In some embodiments, affordances presented in the touch-sensitive secondary display 104 are customizable and users are able to add and/or remove affordances from the touch-sensitive secondary display 104 (in some embodiments, customization is available only when the touch-sensitive secondary display 104 is in the customized mode discussed above). For example, in embodiments in which the touch-sensitive secondary display 104 is displayed above a laptop keyboard and below the laptop's primary display, an affordance (or menus including multiple affordances) presented on the primary display may be dragged down to the touch-sensitive secondary display and then moved horizontally within the touch-sensitive secondary display using one continuous gesture. In some embodiments, as the affordance is moved around within the touch-sensitive secondary display, various sections (e.g., an application-specific and a system-level region) of the touch-sensitive secondary display are emphasized/highlighted.

In some embodiments, a user is able to provide drawing inputs at a trackpad of the computing system and, in response to receiving the drawing inputs, the computing system causes the touch-sensitive secondary display 104 to present candidate shapes for selection by the user.

In some embodiments, a brightness level for the touch-sensitive secondary display 104 is determined based at least in part on a brightness level for the primary display 102 and based at least in part on ambient light conditions around the computing system.

Attention is now directed to FIGS. 70A-70D. In some embodiments, the touch-sensitive secondary display is dynamically updated to include various controls for use with a maps application. Dynamically updating the touch-sensitive secondary display to include these controls helps to improve operability of electronic devices that include touch-sensitive secondary displays by improving the man-machine interface. For example, users are enabled to perform operations using fewer interactions (i.e., users need not waste time searching for desired menu options or affordances, as these are dynamically provided at the touch-sensitive secondary display for easy, one-click selection) and users are able sustain interactions with the electronic device.

Figure 70A:
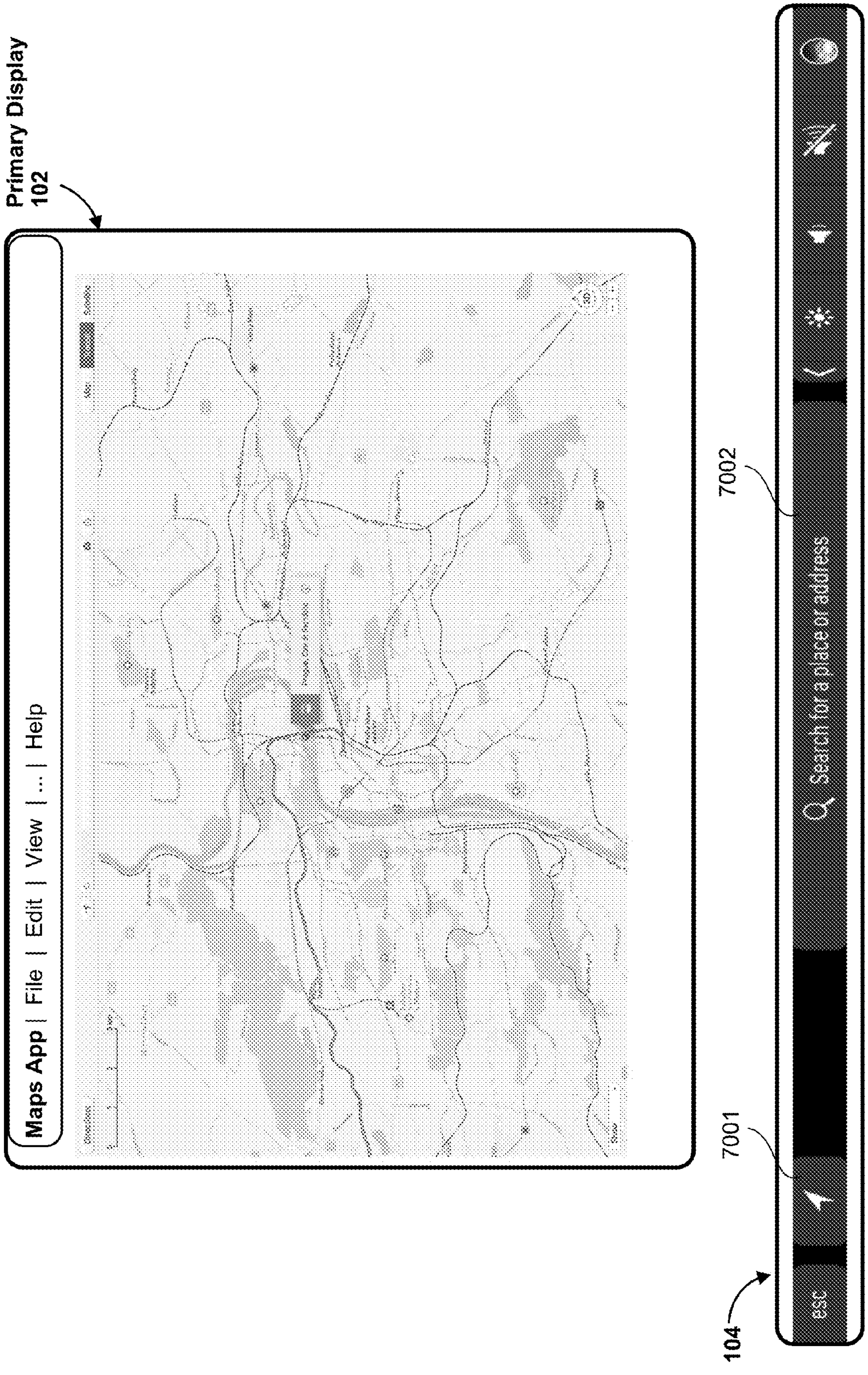
FIGS. 70A-70B are schematics of a primary display and a touch-sensitive secondary display used to illustrate user interfaces for dynamically providing controls at the touch-sensitive secondary display for use with a maps application, in accordance with some embodiments.

As shown in FIG. 70A, a maps application is presented on the primary display 102 and the touch-sensitive secondary display 104 is updated to include affordances that correspond to the maps application. For example, the touch-sensitive secondary display 104 includes an affordance 7001 that, when selected, causes the maps application to display on the primary display an indicator of a user's current location (e.g., a pin that is displayed on the map which reflects the user's current location). In some embodiments, the touch-sensitive secondary display also includes an affordance 7002 that, when selected, causes the maps application to open a search interface. In this way, the user does not need to use a mouse, trackpad, or other device to launch the search interface and is instead able to simply select the affordance 7002 to begin search the maps application for a desired geographical location.

Figure 70B:
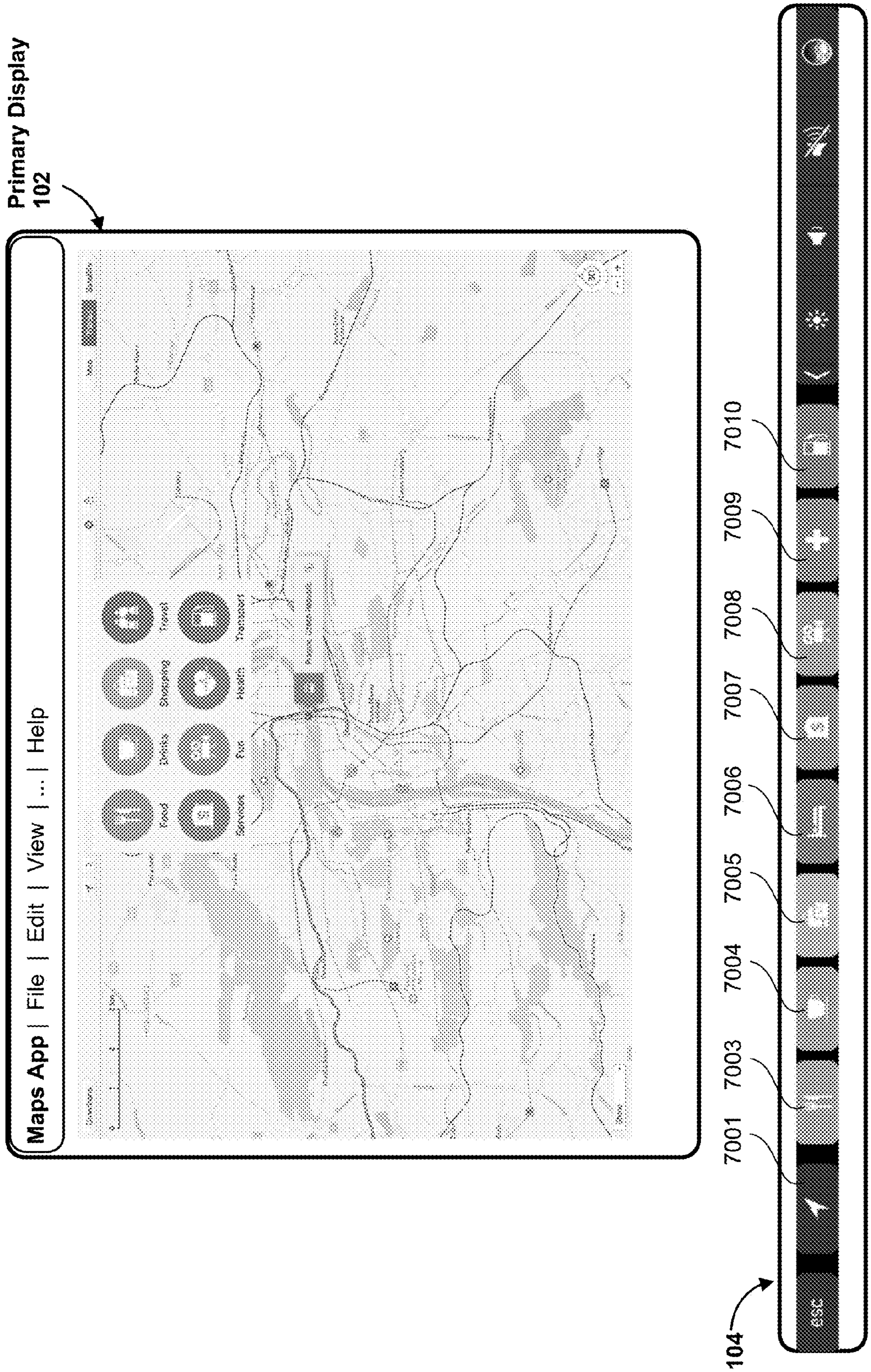

In some embodiments, in response to user input at the affordance 7002, the maps application on the primary display 102 is updated to include affordances for selecting nearby categories of places (e.g., nearby restaurants, coffee shops, shopping destinations, travel points of interest, services, fun locations, health locations, and transportation-related services) (FIG. 70B). As shown in FIG. 70B, in conjunction with updating the maps application to include these affordances for selecting nearby categories of places, the touch-sensitive secondary display 104 is dynamically updated to include affordances that allow for quick selection of the various nearby categories of places. For example, affordance 7003, when selected, causes the maps application to search for nearby restaurants; affordance 7004, when selected, causes the maps application to search for nearby coffee shops; affordance 7005, when selected, causes the maps application to search for nearby shopping destinations; affordance 7006, when selected, causes the maps application to search for nearby hotels; affordance 7007, when selected, causes the maps application to search for nearby financial institutions (such as banks or ATMs); affordance 7008, when selected, causes the maps application to search for nearby movie theatres; affordance 7009, when selected, causes the maps application to search for nearby hospitals; and affordance 7010, when selected, causes the maps application to search for nearby gas stations. In some embodiments (and as shown in FIG. 70B), the touch-sensitive secondary display 104 is able to make more information available on a limited screen as well, e.g., by including additional nearby search options that may not fit at the primary display 102 (without obscuring the maps displayed thereunder).

Figure 70C:
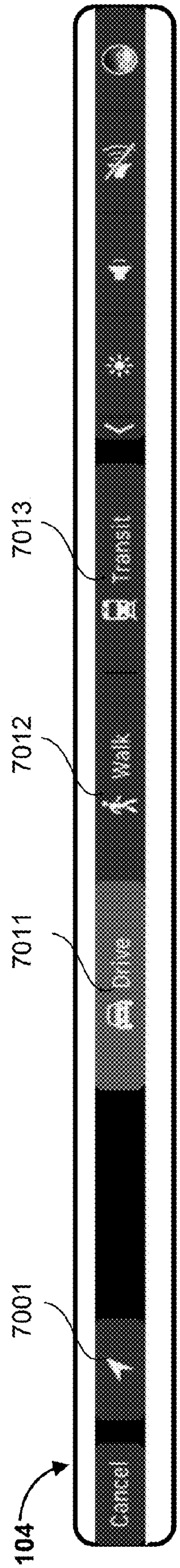
FIGS. 70C-70D are schematics of a touch-sensitive secondary display used to illustrate user interfaces for dynamically providing controls at the touch-sensitive secondary display for use with a maps application, in accordance with some embodiments.

Turning now to FIG. 70C, in some embodiments, after a user either searches for a particular geographic location or after a user selects a particular geographic location after interacting with the nearby points of interest from the categories discussed above, the touch-sensitive secondary display 104 is updated to include affordances that, when selected, cause the maps application to select a mode of transportation that will be used by the maps application to provide routing information. For example, the touch-sensitive secondary display may include affordances 7011, 7012, and 7013 for selecting driving, walking, or transit modes of transportation, respectively.

Figure 70D:
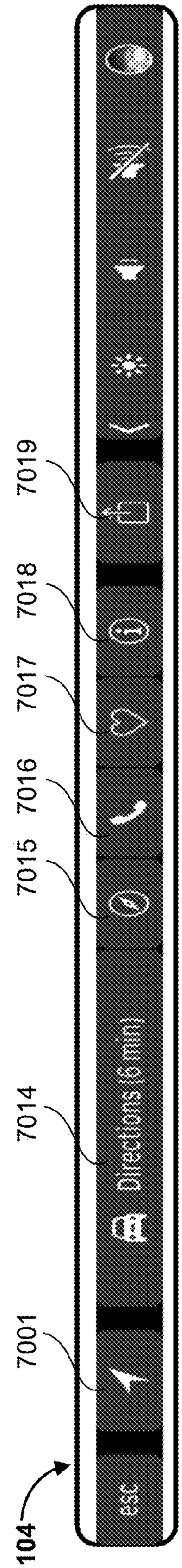

In the example shown in FIG. 70D, the user has selected the driving mode of transportation for a desired geographical location and, in response, the touch-sensitive secondary display 104 is updated to include an affordance that allows for initiating driving directions (e.g., affordance 7014) to that geographical location. In some embodiments, the touch-sensitive secondary display 104 is also updated to include additional affordances (e.g., affordances 7015-7019) that allow the user to search the geographical location in a web browser (e.g., affordance 7015), to contact a phone number associated with the geographical location (e.g., affordance 7016), to flag the geographical location as a first place (e.g., affordance 7017), to find more information about the geographical location (e.g., affordance 7018), and to share the geographical location via a number of various sharing platforms (e.g., affordance 7019). In some embodiments, the number of various sharing platforms may include e-mail, social media (e.g., TWITTER, FACEBOOK, and other like social media sharing platforms), text messaging, etc.

Turning now to FIGS. 71A-75, schematics of displays (primary and touch-sensitive secondary displays) are shown that are used to illustrate dynamically providing controls at the touch-sensitive secondary display for use with a variety of video-editing applications. For example, the variety of video-editing applications may include FINAL CUT PRO, MOTION, COMPRESSOR, and IMOVIE, all from APPLE INC. in Cupertino, CA. Dynamically updating the touch-sensitive secondary display to include controls for use with video-editing applications helps to improve operability of electronic devices that include touch-sensitive secondary displays by improving the man-machine interface. For example, users are enabled to perform operations using fewer interactions (i.e., users need not waste time searching for desired menu options or affordances, as these are dynamically provided at the touch-sensitive secondary display for easy, one-click selection) and users are able to sustain interactions with the electronic device.

Figure 71A:
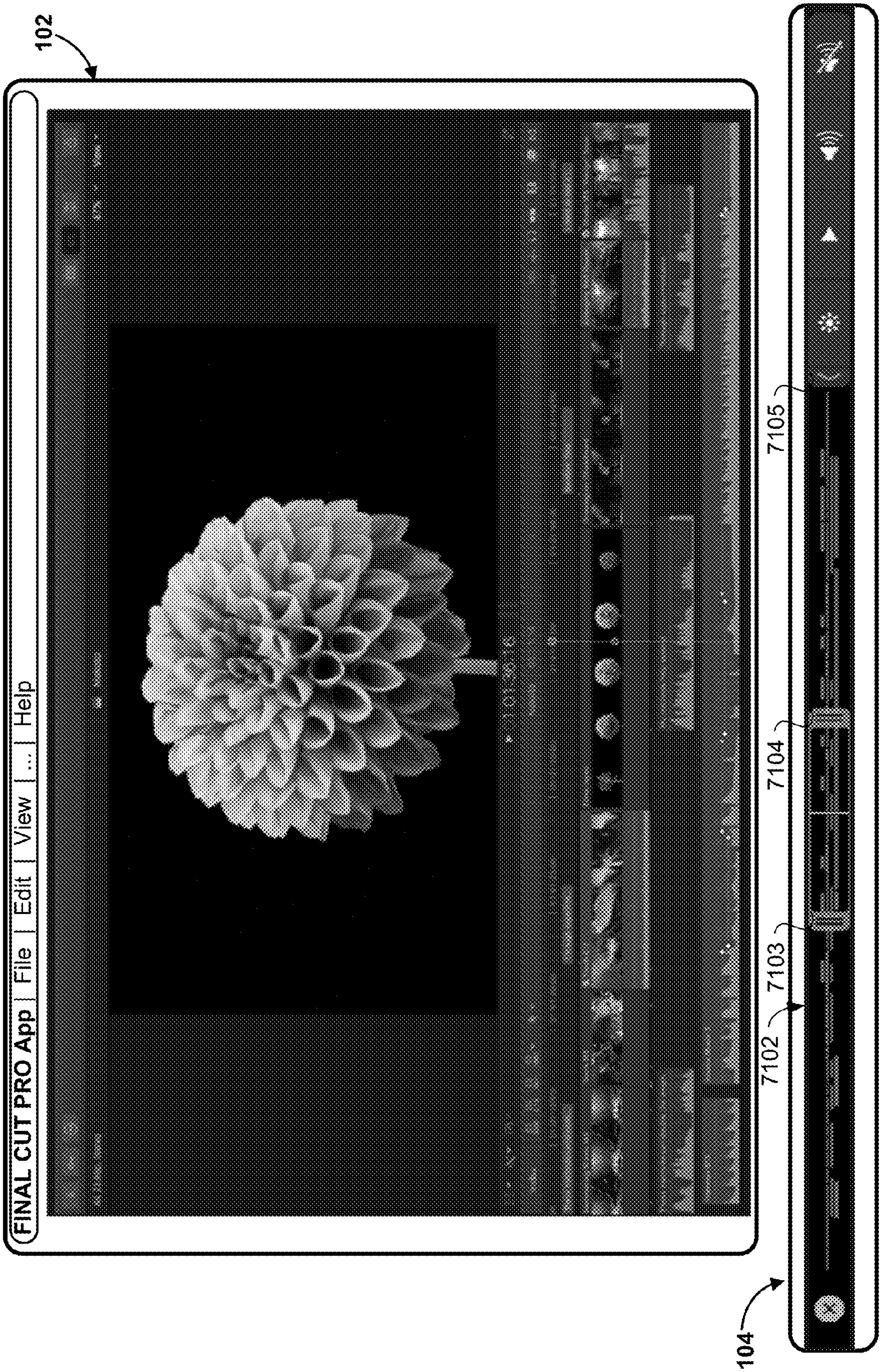
FIGS. 71A-71B are schematics of a primary display and a touch-sensitive secondary display used to illustrate user interfaces for dynamically providing controls at the touch-sensitive secondary display for use with a video-editing application, in accordance with some embodiments.

FIGS. 71A-71M are schematics of a primary display 102 and a touch-sensitive secondary display 104 used to illustrate example user interfaces for a video-editing applications (in the illustrated examples, the video-editing application is FINAL CUT PRO). As shown in FIG. 71A, the primary display 102 is displaying a user interface for a video-editing application, in which the user is interacting with a timeline for a video project, and the touch-sensitive secondary display 104 is displaying user interface controls that allow for manipulating the video timeline. In particular, the touch-sensitive secondary display includes small rectangular representations included on four different rows within user interface control 7102, in which the first row corresponds to a title portion of the video project, the second row corresponds to a video track for the video project, the third row corresponds to an audio track for the video project, and the fourth row corresponds to a music track for the video project. In some embodiments, a user may quickly manipulate the video project by dragging first end 7103 or second end 7104 and, in response, the primary display 102 is updated in accordance with the manipulations (i.e., to show more or less of the information corresponding to each of the rows of information for the video project, as discussed above).

Figure 71B:
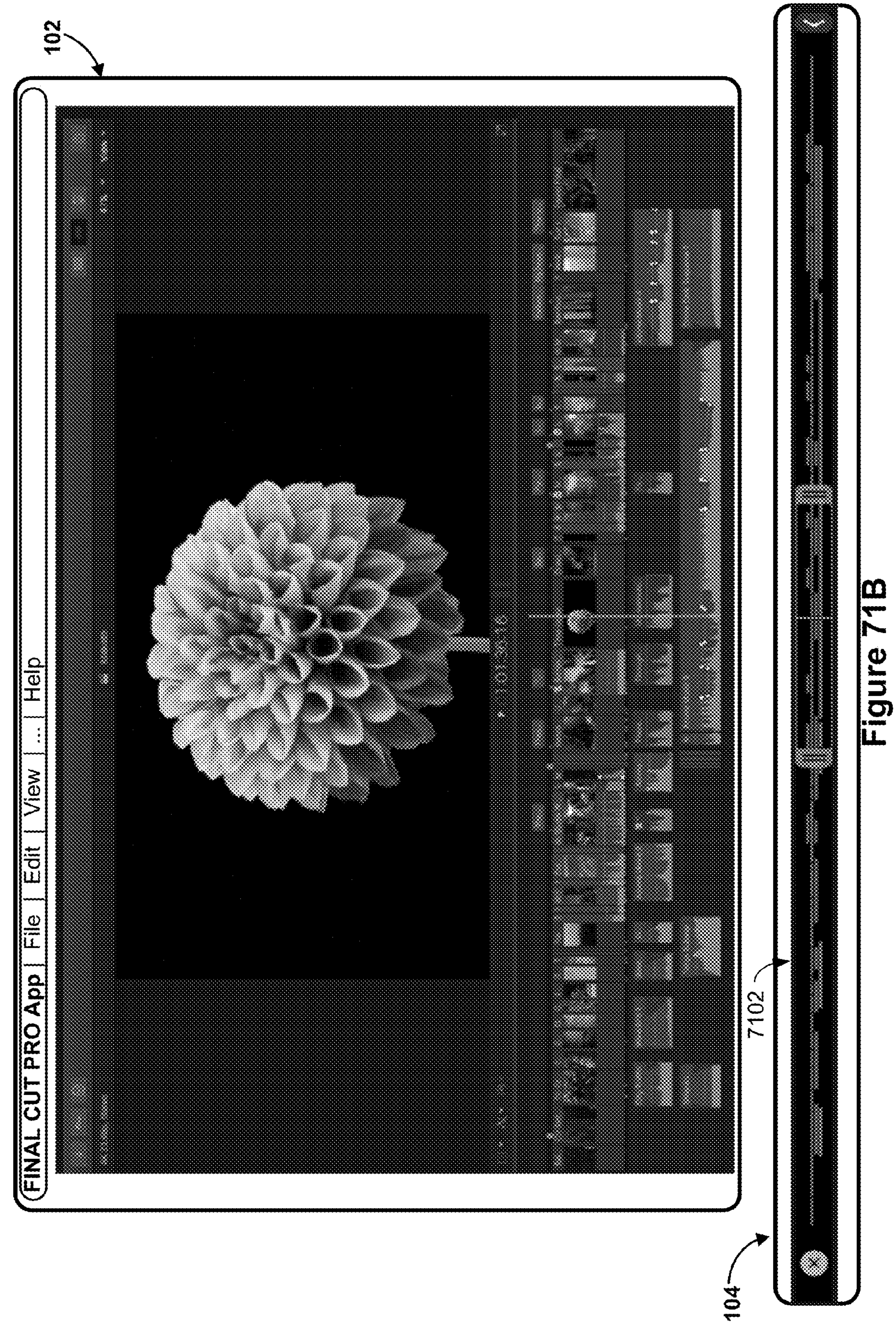

For example, as shown in FIG. 71B, in response to user manipulation of the ends 7103 and 7104 (i.e., dragging each in an opposite direction across the touch-sensitive secondary display 104), the primary display is updated so that more of the timeline is shown (as shown in FIG. 71B). FIG. 71B also illustrates that users are able to select the leftward-point caret affordance 7105 to cause the touch-sensitive secondary display 104 to cease displaying certain system-level affordances (such as brightness, play, volume-manipulation, and mute affordances) and to increase the display size of the timeline representation shown within user interface control 7102 (e.g., as shown in FIG. 71B more of the timeline is now shown within the touch-sensitive secondary display 104 after the affordance 7105 has been selected). In this way, more information is able to be displayed at a display with limited available screen real estate, i.e., the touch-sensitive secondary display 104 is able to show more of the timeline representation by ceasing to display the system-level affordances.

In some embodiments, the touch-sensitive secondary display 104 may also include additional rows within user interface control 7102. Two examples are shown in FIGS. 71C and 71D1, in which additional rows are shown which correspond to additional components of the video project (e.g., such as visual transitions, text that might appear as an overlay on top of a video clip, other audio clips corresponding to sounds that will be overlaid on top of one another, representations of one audio file that has been split apart, and the like) that is being edited on the primary display 102.

Figure 71E:
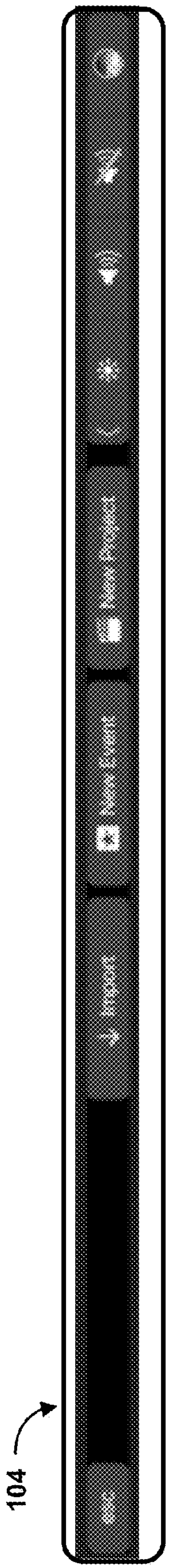
Figure 71E:
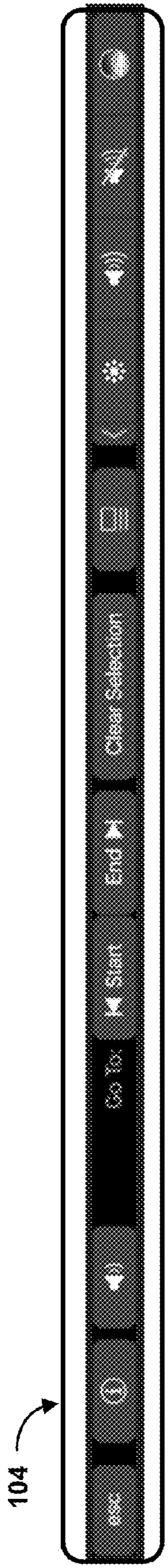
Figure 71F:
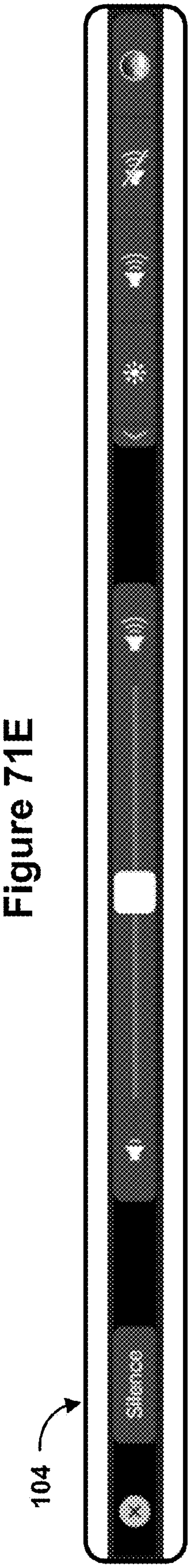
Figure 71G:
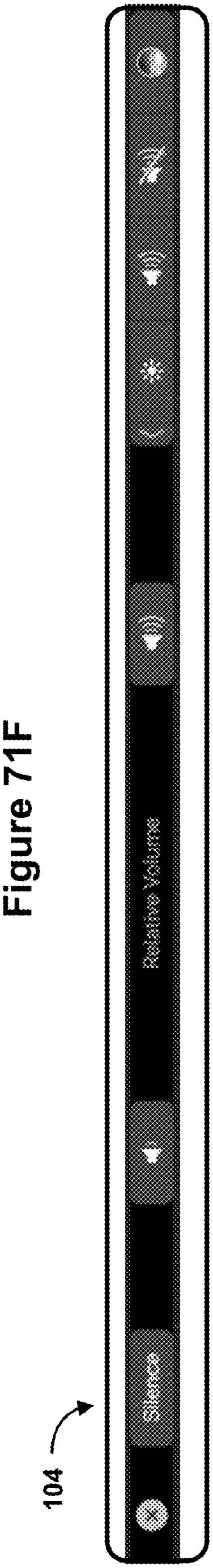
Figure 71H:
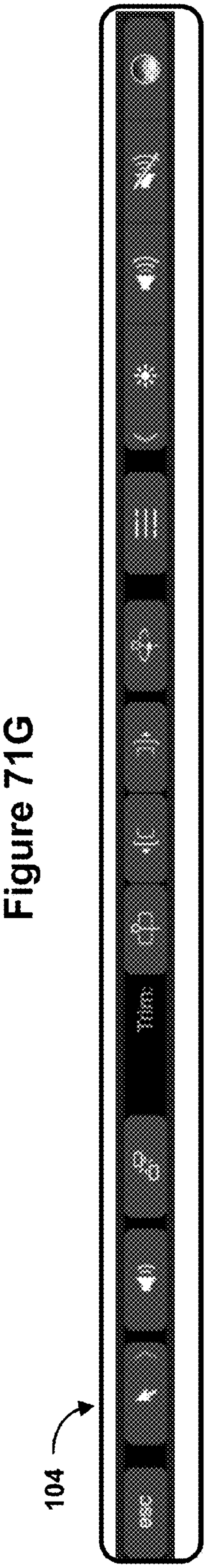
Figure 71I:
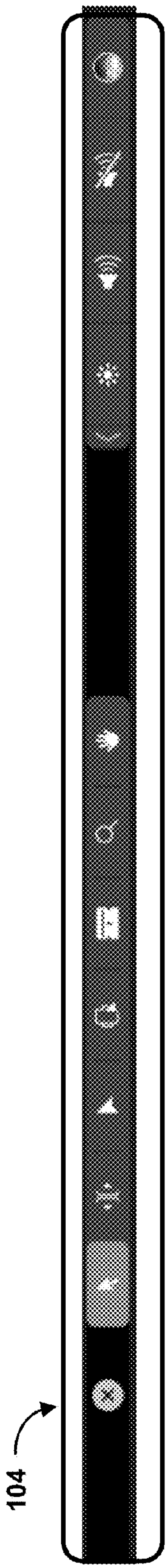
Figure 71J:
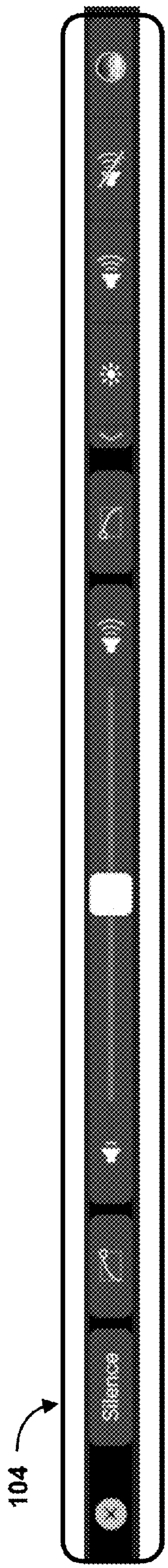
Figure 71K:
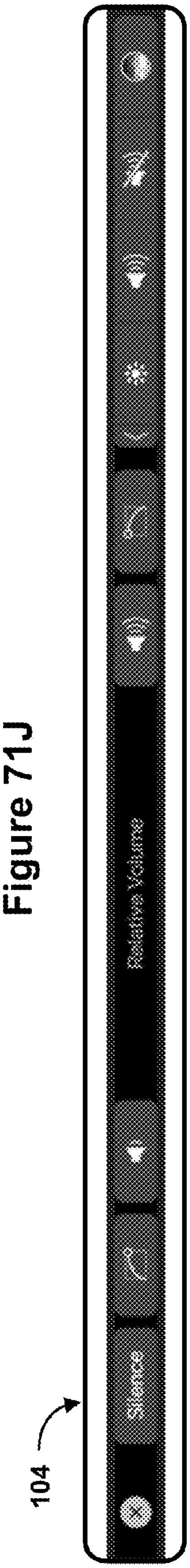
Figure 71L:
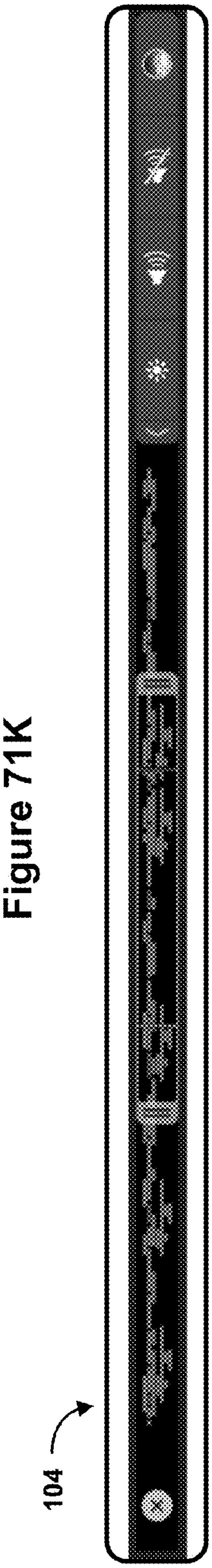
Figure 71M:
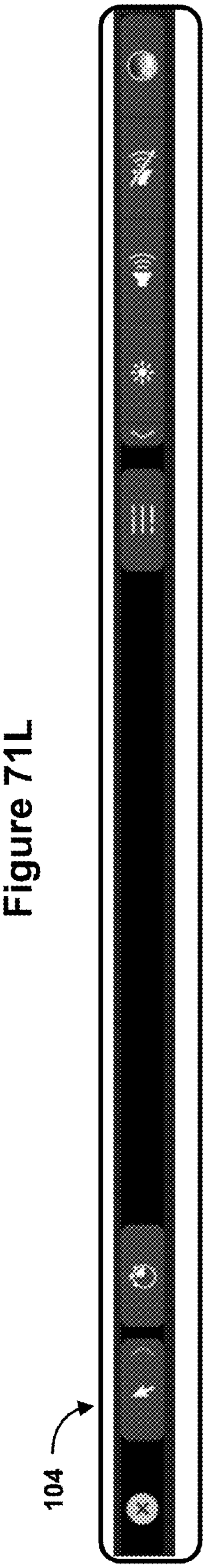

FIGS. 71D2-71M are schematics of the touch-sensitive secondary display 104 used to illustrate additional user interface controls that may be displayed for controlling certain functions available in a video-editing application, such as FINAL CUT PRO. For example, FIG. 71D2 shows example user interface controls that may be displayed for controlling functions associated with creating a new video project, FIG. 71E illustrates user interface controls that may be displayed for controlling functions associated with selecting a particular clip within a video project, FIG. 71F illustrates user interface controls that may be displayed for controlling functions associated with manipulating a volume level for a video project, FIG. 71G illustrates user interface controls that may be displayed for controlling functions associated with selecting volume levels for multiple elements (e.g., multiple audio or music tracks associated with a video project), and FIG. 71H illustrates user interface controls for controlling functions associated with trimming components (e.g., audio, video, or music tracks) of a video project.

Additional examples are also shown in FIGS. 71I-71M. For example, FIG. 71I illustrates example user interface controls that may be displayed for controlling functions associated with various editing tools, FIG. 71J illustrates example user interface controls that may be displayed for controlling functions associated with manipulating volume fade controls, FIG. 71K illustrates example user interface controls that may be displayed for controlling functions associated with selecting multiple components and then manipulating volume fade controls for each of those elements, FIG. 71L illustrates manipulating a timeline for a video project (as discussed above in reference to FIGS. 71A-71B), and FIG. 71M illustrates user interface controls for controlling functions associated with editing transitions within a video project.

Additional details regarding the user interface controls and affordances shown in FIGS. 71A-71M will be appreciated and recognized by a person having ordinary skill in the art, and some of these details are reflected in user manuals such as the "Final Cut Pro X User Guide" available from APPLE INC. (which is publicly available and titled "final_cut_pro x-10.1.1-user_guide.pdf"). U.S. Patent Publication Numbers 2012/0210222, 2012/0210231, 2012/0210228, and 2014/0253560 and U.S. Pat. Nos. 8,849,028 and 7,805,678 also provide details and descriptions regarding the user interface controls and affordances shown in FIGS. 71A-71M, and each of these is hereby incorporated by reference in its entirety.

Figure 72A:
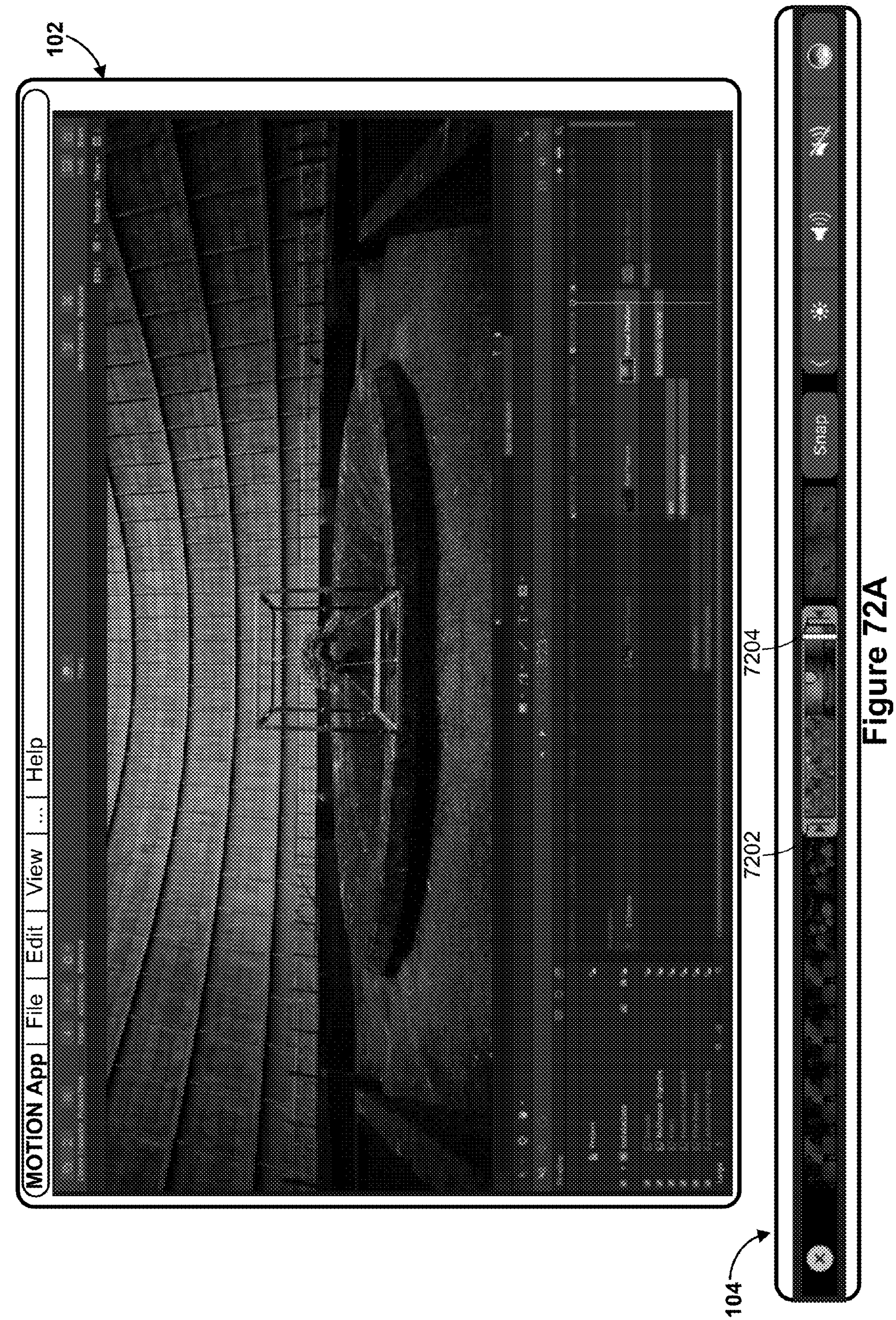
FIG. 72A is a schematic of a primary display and a touch-sensitive secondary display used to illustrate user interfaces for dynamically providing controls for use with a video-editing application, in accordance with some embodiments.

Turning now to FIGS. 72A-72P schematics of displays (both primary and touch-sensitive secondary displays) are shown that are used to illustrate user interfaces associated with a video-editing application (in these examples, the video-editing application is MOTION). As shown in FIG. 72A, a user interface for the video-editing application is displayed on the primary display 102 and the touch-sensitive secondary display 104 includes user interface controls for controlling functions available within the video-editing application (e.g., the user is able to manipulate graphics associated with a video project by providing inputs at the touch-sensitive secondary display 104). For example, the user is able to move first end 7202 or second end 7204 of a user interface control to quickly manipulate a portion of the video project (e.g., to manipulate which images will be shown at a particular point in time).

In some embodiments and as explained above, to help efficiently utilize limited display screen real estate at the touch-sensitive secondary display 104, users are able to select a leftward pointing caret to cause the touch-sensitive secondary display 104 to cease displaying system-level affordances and to instead display more of a particular user interface control, such as the timeline view shown in the touch-sensitive secondary display of FIG. 72A. For example, in response to selection of the caret affordance, more of the timeline view is shown in the touch-sensitive secondary display 104, as shown in FIG. 72K.

Figure 72B:
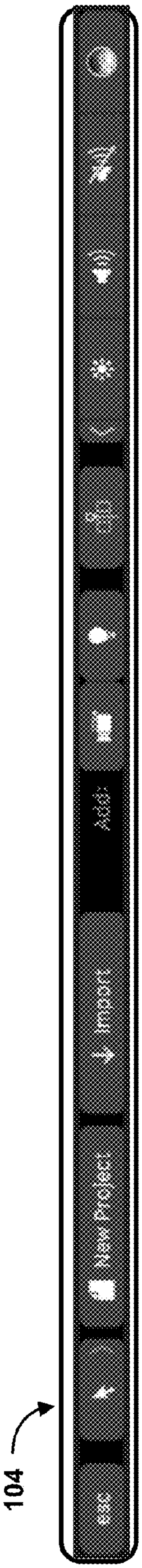
Figure 72D:
Figure 72D:
Figure 72D:
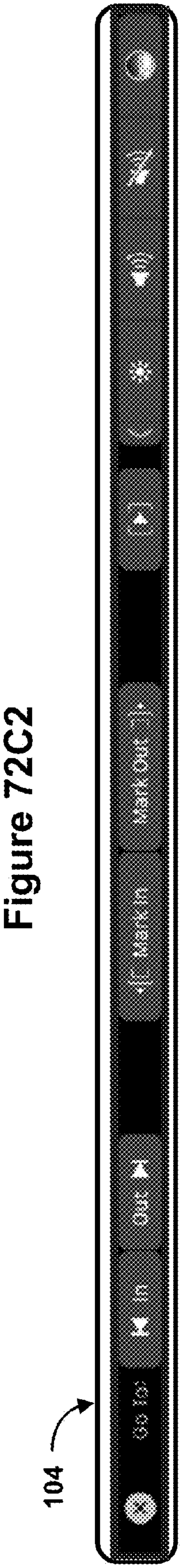
Figure 72E:
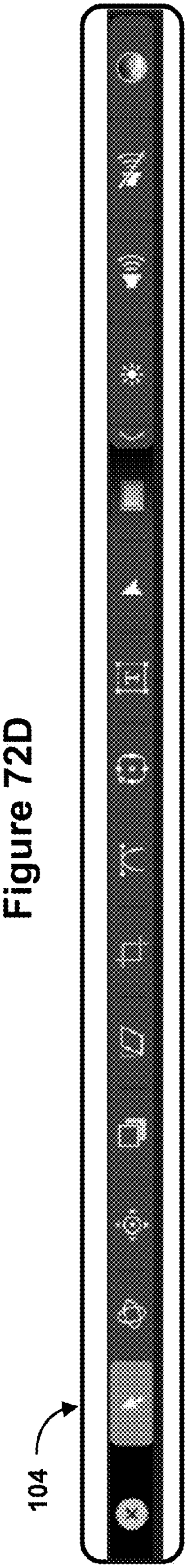
Figure 72F:
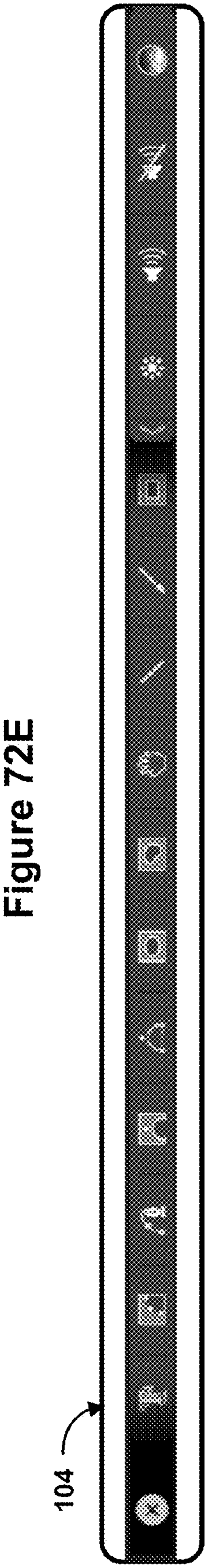
Figure 72G:
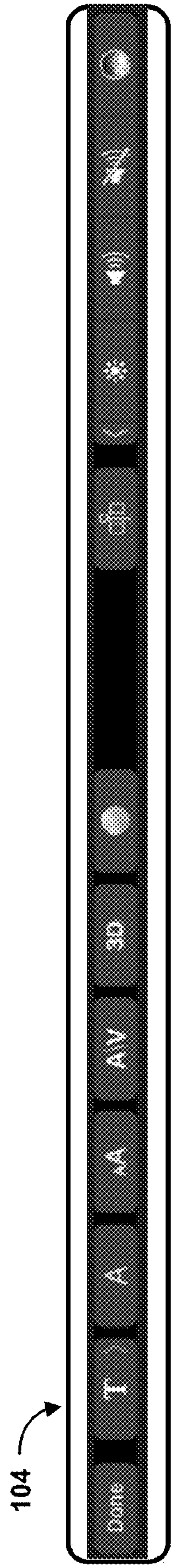
Figure 72H:
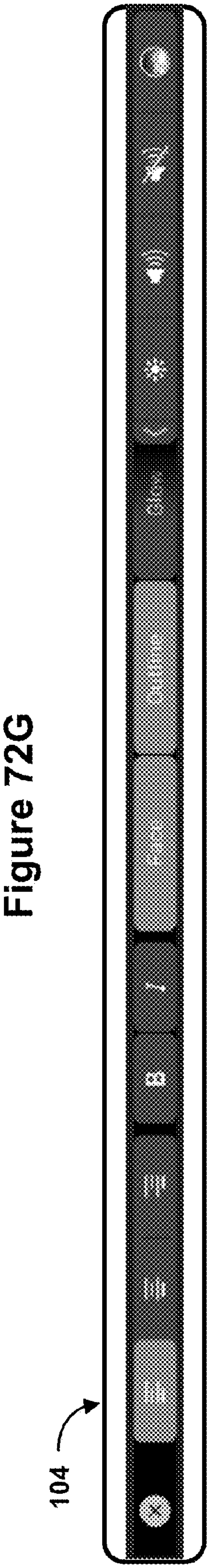
Figure 72I:
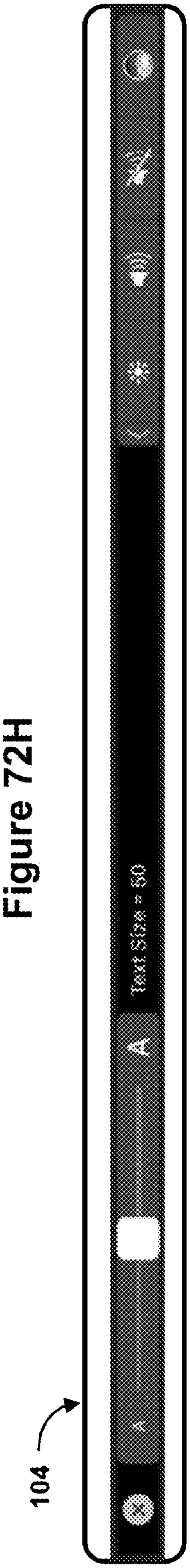
Figure 72J:
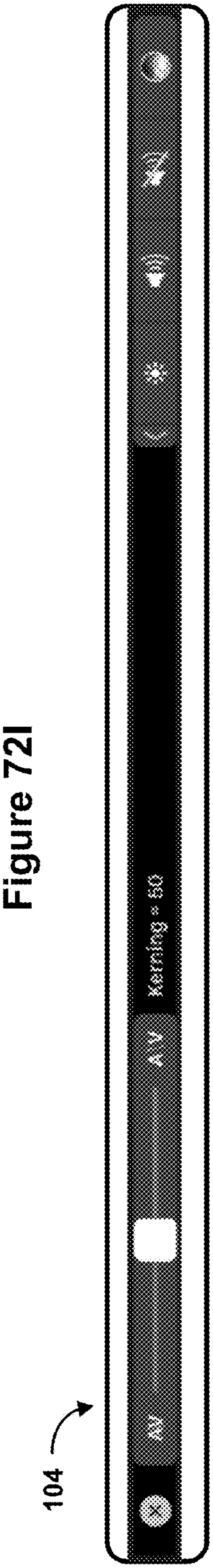
Figure 72K:
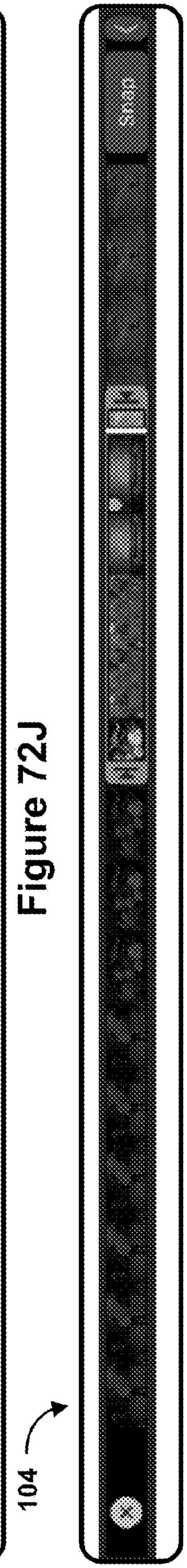
Figure 75:
FIG. 75 is schematic showing example glyphs that may be displayed at a touch-sensitive secondary display for use with various video-editing applications, in accordance with some embodiments.

FIGS. 72B-72K are schematics of the touch-sensitive secondary display 104 used to illustrate additional user interface controls that may be displayed for controlling certain functions available in a video-editing application, such as MOTION. For example, FIG. 72B illustrates user interface controls for controlling functions available within the video-editing application when no object has been selected (e.g., when the video-editing application is initially launched/opened at the primary display 102), FIG. 72C1 illustrates user interface controls for controlling functions available after an object has been selected within the video-editing application on the primary display 102, FIG. 72C21 illustrates user interface controls for controlling functions available after multiple objects have been selected, FIG. 72D illustrates user interface controls for controlling functions available for manipulating various timing options, and FIGS. 72E and 72F illustrate user interface controls for selecting various tool options (in some embodiments, the controls shown are referred to as glyphs and additional glyphs are also shown in FIG. 75).

Example user interface controls for editing text within a video-editing application are provided in FIGS. 72G-72J. FIG. 72G illustrates user interface controls that are available at the touch-sensitive secondary display 104 for editing text (e.g., such as a title associated with a particular video project or an individual frame), FIG. 72H illustrates user interface controls for selecting text appearance options, FIG. 72I illustrates user interface controls for selecting text sizing options, and FIG. 72J illustrates user interface controls for changing text kerning options.

Additional details regarding the user interface controls and affordances shown in FIGS. 72A-72K will be appreciated and recognized by a person having ordinary skill in the art, and some of these details are reflected in user manuals such as the "Motion User Guide" available from APPLE INC. (which is publicly available and titled "motion_5.1.1_ug.pdf"). U.S. Patent Publication Numbers 2013/0239057 and 2009/0226080 and U.S. Pat. No. 9,070,206 also provide details and descriptions regarding the user interface controls and affordances shown in FIGS. 72A-72K, and each of these is hereby incorporated by reference in its entirety.

Figure 73A:
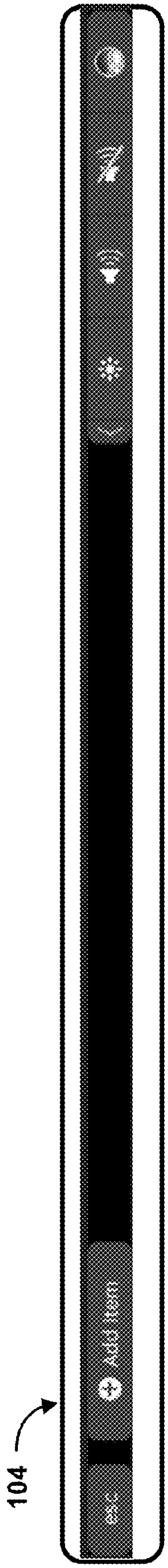
FIGS. 73A-73N are schematics of a touch-sensitive secondary display used to illustrate user interfaces for dynamically providing controls for use with a video-editing application, in accordance with some embodiments.
Figure 73B:
Figure 73C:
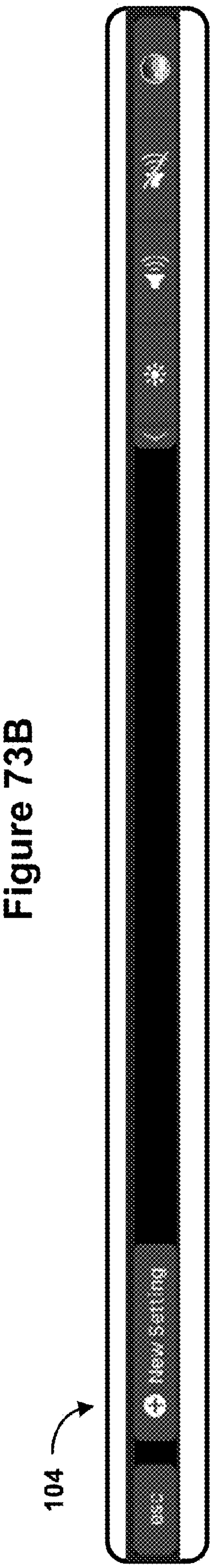
Figure 73D:
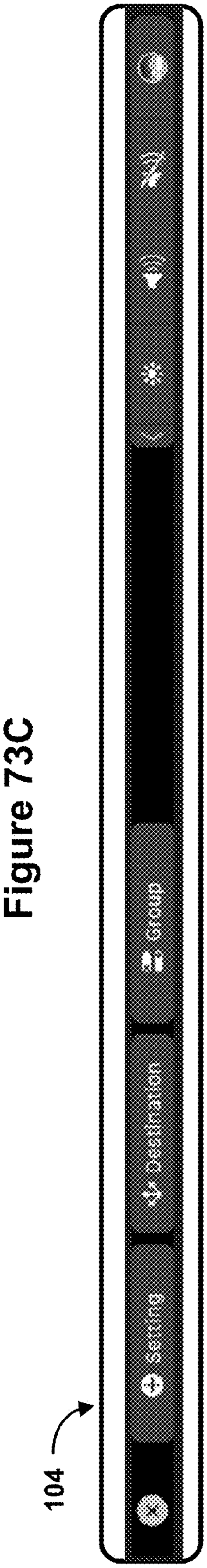
Figure 73E:
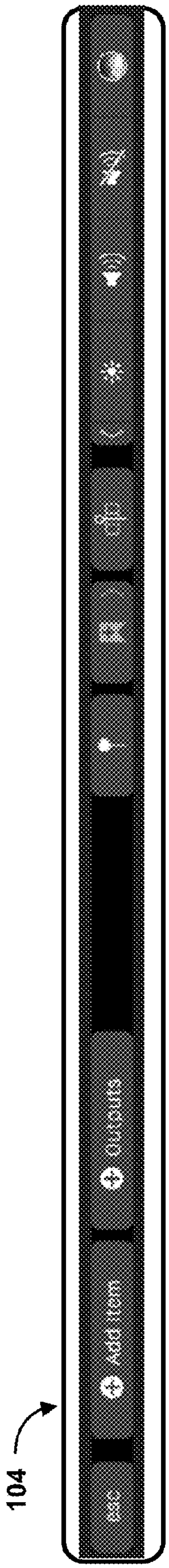
Figure 73F:
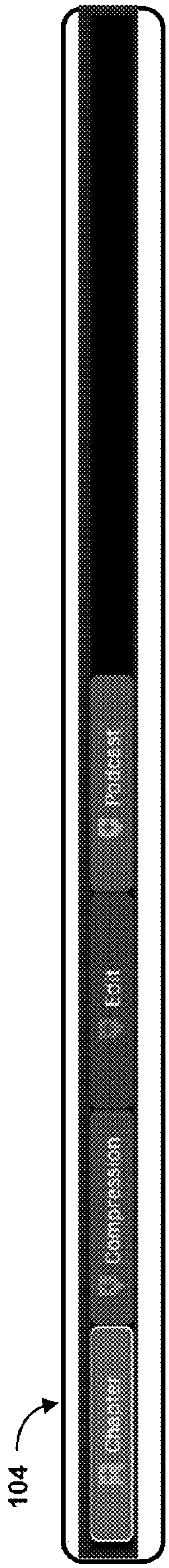
Figure 73G:
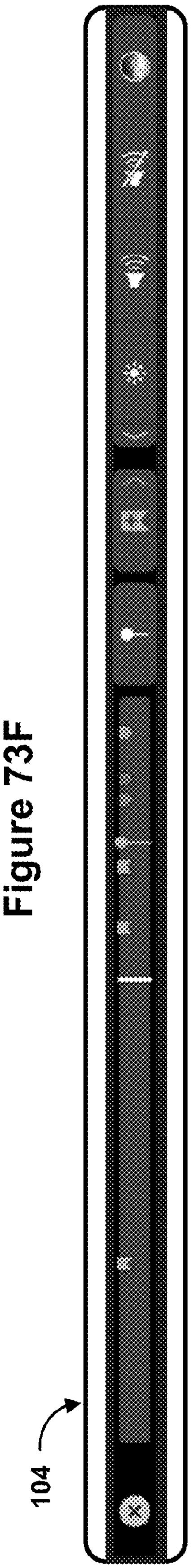
Figure 73H:
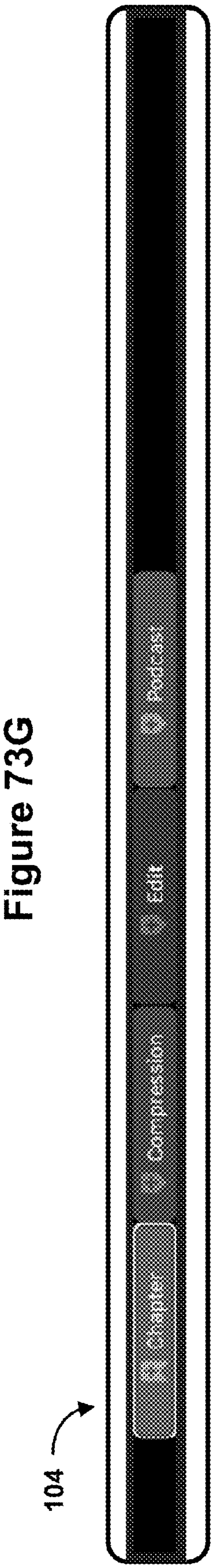
Figure 73I:
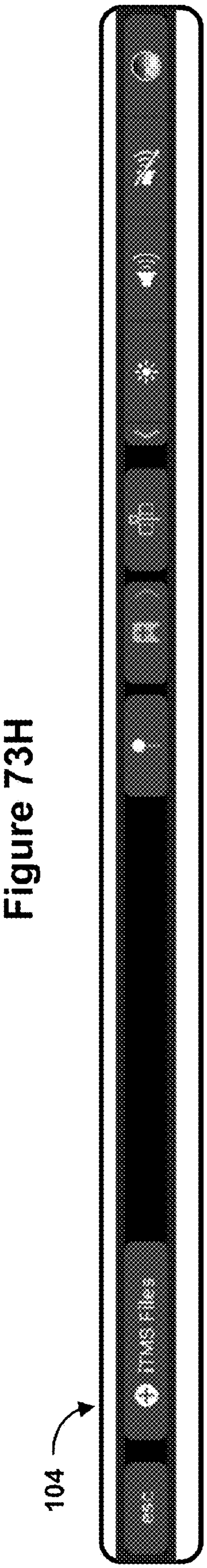
Figure 73J:
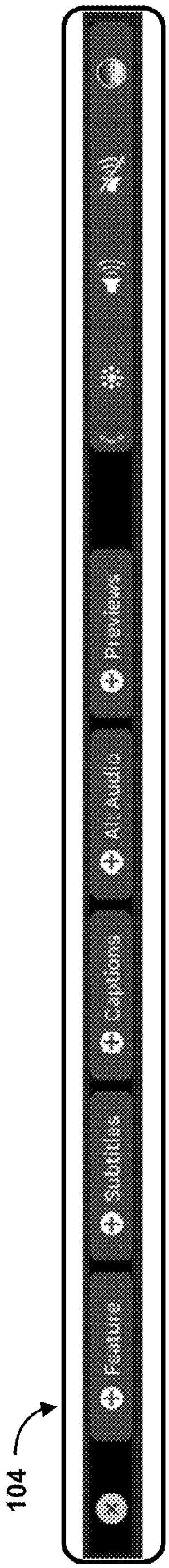
Figure 73K:
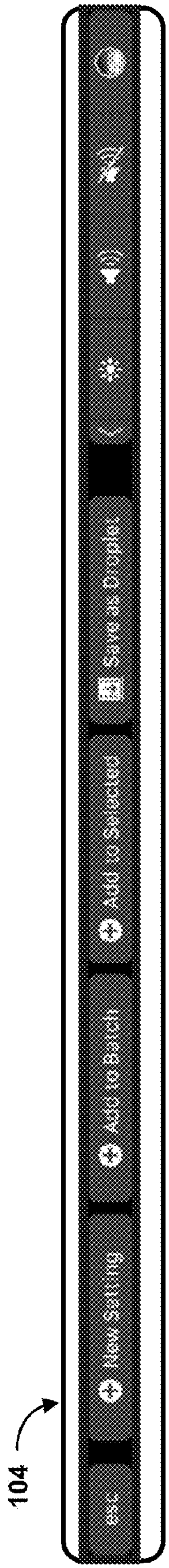
Figure 73L:
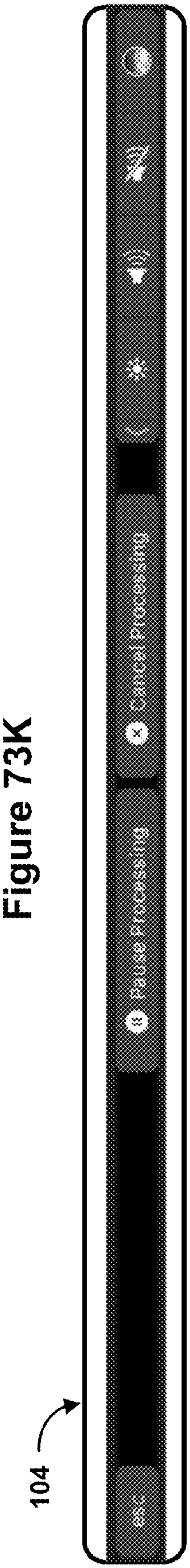
Figure 73M:
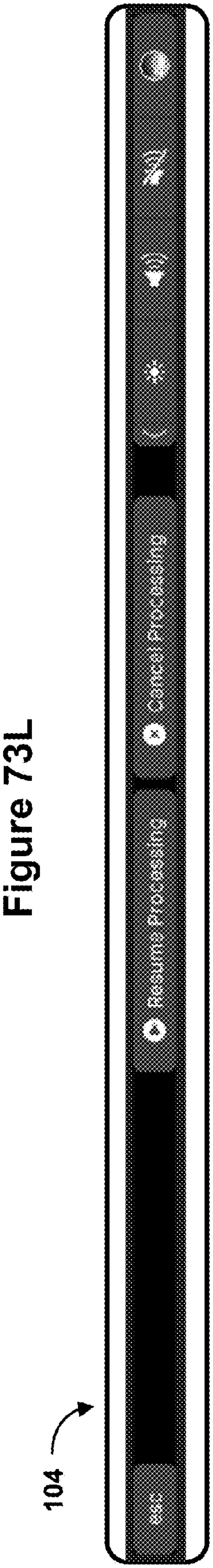
Figure 73N:
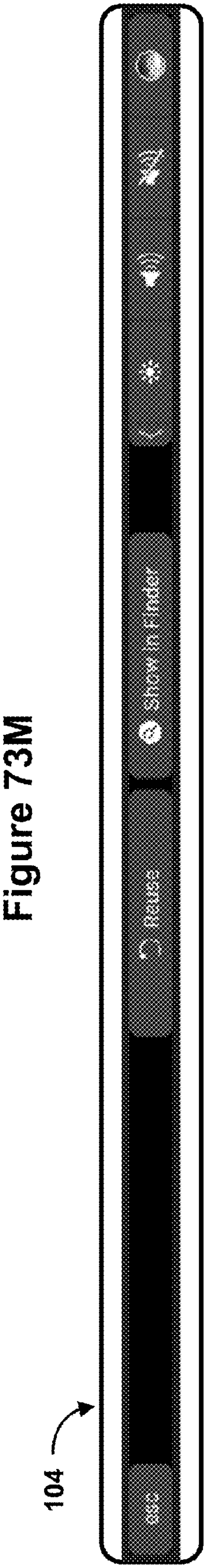
Figure 74A:
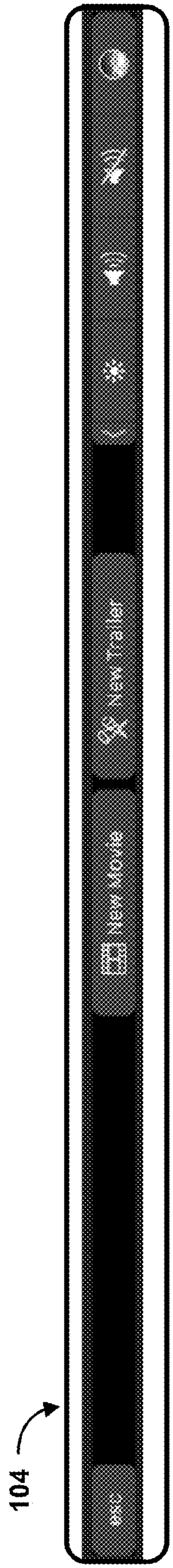
FIGS. 74A-74H are schematics of a touch-sensitive secondary display used to illustrate user interfaces for dynamically providing controls for use with a video-editing application, in accordance with some embodiments.
Figure 74B:
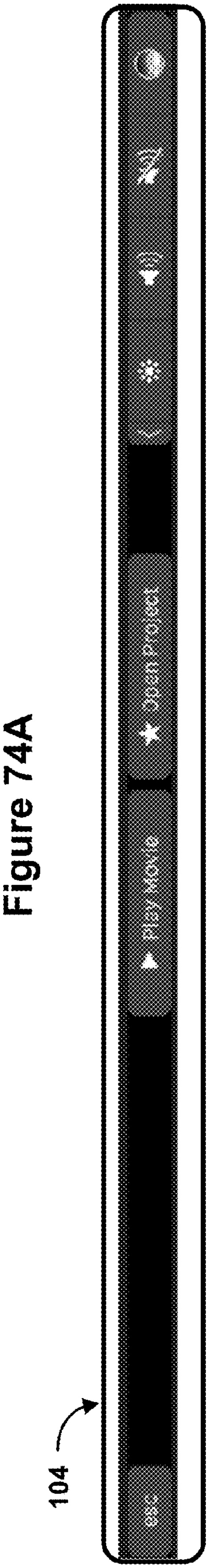
Figure 74C:
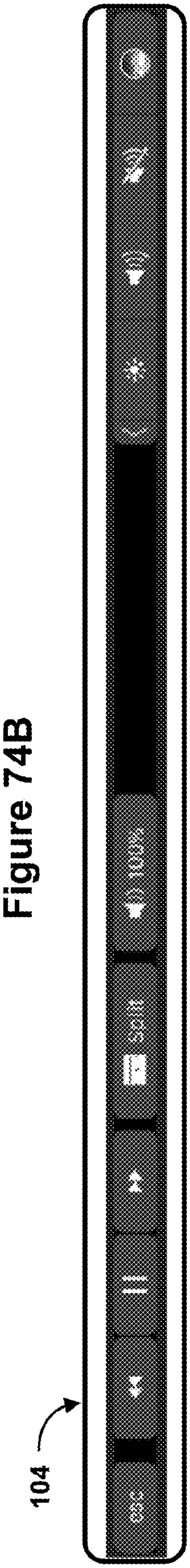
Figure 74D:
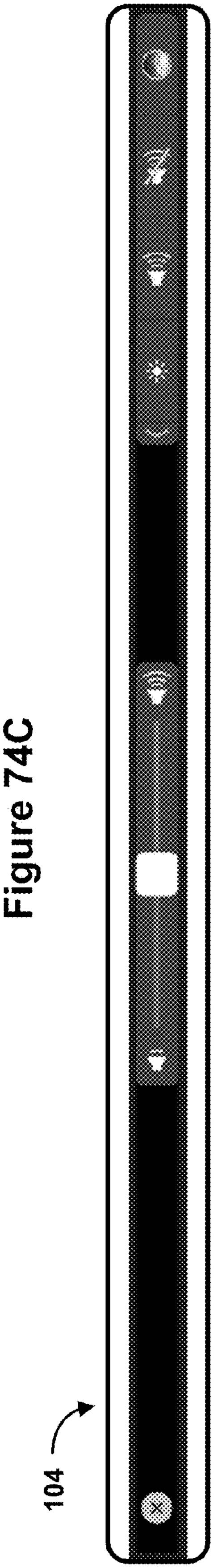
Figure 74E:
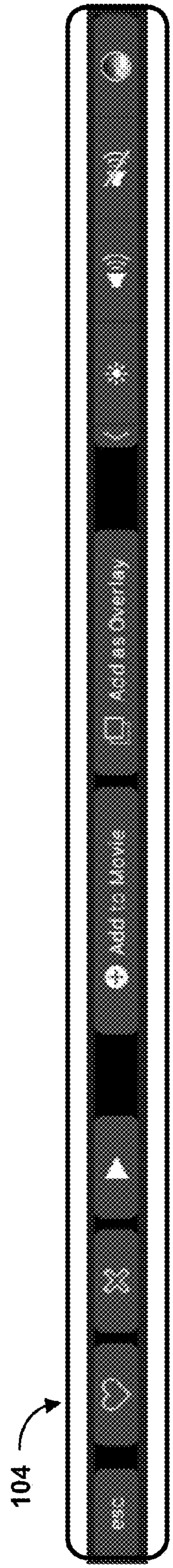
Figure 74F:
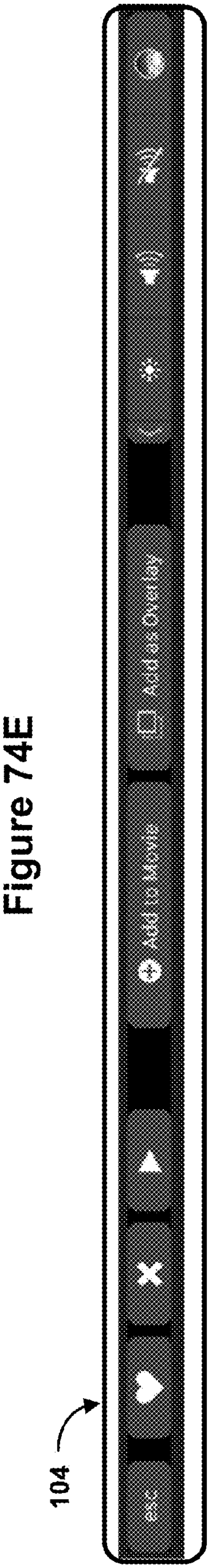
Figure 74G:
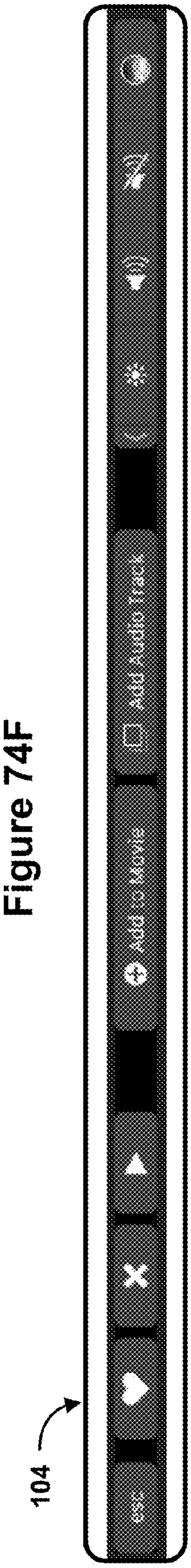
Figure 74H:
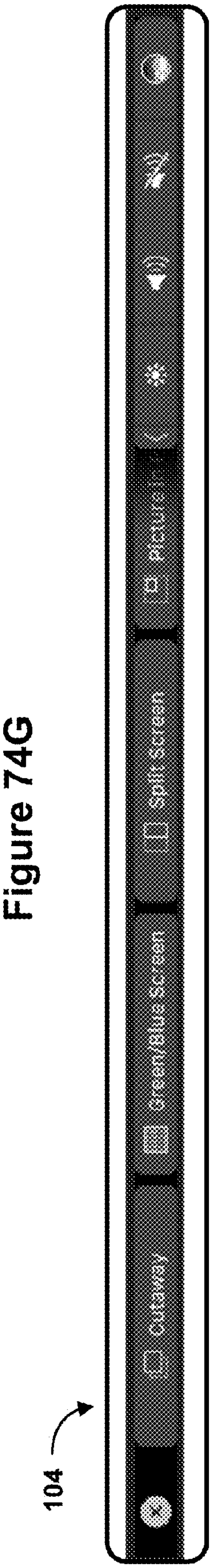

Attention is now directed to FIGS. 73A-73N, providing illustrations of user interface controls provided at a touch-sensitive secondary display for controlling functions available within a video-editing application (in this sequence of figures, the example video-editing application is COMPRESSOR). FIG. 73A illustrates user interface controls provided at the touch-sensitive secondary display 104 for adding a new COMPRESSOR item (i.e., an empty batch), FIG. 73B illustrates user interface controls for adding a new file, an image sequence, or a surround sound option, FIG. 73C illustrates user interface controls for adding new settings, and FIG. 73D illustrates user interface controls for configuring new settings.

Additional examples are also shown in FIGS. 73E-73I. In particular, FIG. 73E illustrates user interface controls for configuring a normal batch, FIG. 73F illustrates user interface controls for controlling markers, FIG. 73G illustrates user interface controls for controlling a viewer mode, FIG. 73H illustrates user interface controls for selecting markers while in the viewer mode, and FIG. 73I illustrates user interface controls for controlling iTMS batch items. FIGS. 73J-73N illustrate additional user interface controls include those for controlling iTMS batch functions, settings, active processing options (i.e., user interface controls available at the touch-sensitive secondary display 104 while processing is ongoing), active paused options (i.e., user interface controls available at the touch-sensitive secondary display 104 while processing is paused), and completed options (i.e., user interface controls available at the touch-sensitive secondary display 104 after processing is completed), respectively.

Additional details regarding the user interface controls and affordances shown in FIGS. 73A-73N will be appreciated and recognized by a person having ordinary skill in the art, and some of these details are reflected in user manuals such as the "Compressor User Guide" available from APPLE INC. (which is publicly available and titled "compressor_4.1.2_user_guide.pdf"). U.S. Patent Publication Number 2014/0344691 also provides details and descriptions regarding the user interface controls and affordances shown in FIGS. 73A-73N, and is hereby incorporated by reference in its entirety.

Attention is now directed to FIGS. 74A-74H, in which user interface controls for controlling various video-editing functions are illustrated (in this sequence of figures, the video-editing application is IMOVIE). FIGS. 74A-74D illustrate user interface controls displayed at the touch-sensitive secondary display 104 for controlling project-creation, project playback, video editing, and volume options, respectively. FIGS. 74E-74H illustrate user interface controls displayed at the touch-sensitive secondary display 104 for controlling a variety of media-browser functions.

Additional details regarding the user interface controls and affordances shown in FIGS. 74A-74H will be appreciated and recognized by a person having ordinary skill in the art, and some of these details are reflected in user manuals such as the "iMovie '08 Getting Started" available from APPLE INC. (which is publicly available and titled "iMovie_08_Getting_Started.pdf"). U.S. Patent Publication Number 2012/0210230 also provides details and descriptions regarding the user interface controls and affordances shown in FIGS. 74A-74H, and is hereby incorporated by reference in its entirety.

Turning now to FIG. 75, a number of application-specific, video-editing glyphs are shown therein, each of which may be displayed at the touch-sensitive secondary display 104. The first two rows correspond to glyphs that are associated with FINAL CUT PRO, the next three rows correspond to glyphs associated with MOTION, the following row shows glyphs associated with COMPRESSOR, and the last row shows glyphs associated with IMOVIE. In some embodiments, these glyphs are provided at the touch-sensitive secondary display to allow users to access desired controls using a single input at the touch-sensitive secondary display 104 (and without having to waste time searching for that control by navigating through numerous hierarchical menus). Additional details regarding these glyphs will be appreciated and recognized by a person having ordinary skill in the art, and some of these details are provided in the user manuals, patent application publications, and issued patents referred to above in reference to FIGS. 71A-74H.

FIGS. 44A-44D are a flowchart of a method of updating a dynamic input and output device (e.g., including dynamic function row 104, FIGS. 1A-1B and 2A-2D), in accordance with some embodiments. The method 600 is performed at a computing system including a processor, memory, a first housing including a primary display, and a second housing at least partially containing a physical keyboard (also referred to herein as a physical input mechanism) and a touch-sensitive secondary display distinct from the primary display. Some operations in method 600 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 (also referred to herein as a first housing 110 that includes the primary display 102) of portable computing system 100 (FIG. 1A). Alternatively, in some embodiments, the primary display is primary display 102 (FIGS. 2A-2D) which is implemented in peripheral display device 204 (also referred to herein as a first housing 204 that includes the primary display 102) (FIGS. 2A-2D). In some embodiments, the second housing is body portion 120 of portable computing system 100 (FIGS. 1A-1B), which at least partially contains the touch-sensitive secondary display (e.g., dynamic function row 104, FIGS. 1A-1B) and the physical keyboard (e.g., the set of physical keys 106, FIGS. 1A-1B). Alternatively, in some embodiments, the second housing is peripheral keyboard 206 (FIGS. 2A-2B) of desktop computing system 200, which at least partially contains the touch-sensitive secondary display (e.g., dynamic function row 104, FIGS. 2A-2B) and the physical keyboard (e.g., the set of physical keys 106, FIGS. 2A-2B). Alternatively, in some embodiments, the second housing is first peripheral input mechanism 212 (FIG. 2C) of desktop computing system 200, which at least partially contains the touch-sensitive secondary display (e.g., dynamic function row 104, FIG. 2C) and the second housing includes an input mechanism (e.g., touchpad 108, FIG. 2C) and does not include the physical keyboard.

The computing system displays (602) a first user interface on the primary display, the first user interface comprising one or more user interface elements. FIG. 5B, for example, shows primary display 102 displaying a first user interface with a status tray 502 indicating that application A is currently in focus, and an application (app) tray 514 with a plurality of executable/selectable application icons, including: a mail application icon 506, a web browser application icon 508, a media player application icon 510, an application A icon 512, and a photo application icon 515. The first user interface displayed on primary display 102, in FIG. 5B, also includes a window 536 for application A (e.g., a fantasy RPG game). In FIG. 5B, for example, window 536 includes a main menu for application A with a plurality of affordances including a start new game affordance, a continue affordance, and an options affordance. FIG. 6A, for example, shows primary display 102 displaying a first user interface with window 554 for the media player application.

In some embodiments, the computing system further comprises (604): (i) a primary computing device comprising the primary display, the processor, the memory, and primary computing device communication circuitry; and (ii) a input device comprising the housing, the touch screen display, the physical input mechanism, and input device communication circuitry for communicating with the primary computing device communication circuitry, where the input device is distinct and separate from the primary computing device. In some embodiments, the computing system is not a laptop, such as portable computing system 100 (FIGS. 1A-1B), but instead the computing system is desktop computing system 200 (FIGS. 2A-2D) with a computing device 202, a peripheral display device 204 (which is optionally integrated with computing device 202), and an input device (e.g., peripheral keyboard 206, FIGS. 2A-2B) with a plurality of physical keys (e.g., the set of physical keys 106, FIGS. 2A-2B) adjacent to a touch screen display (e.g., dynamic function row 104, FIGS. 2A-2B). Alternatively, in some embodiments, the input device (e.g., first peripheral input mechanism 212, FIG. 2C) includes a touchpad or a numpad (e.g., touchpad 108, FIG. 2C) adjacent to a touch screen display (e.g., dynamic function row 104, FIG. 2C). In some embodiments, the input device is in communication with the primary computing device (e.g., computing device 202, FIGS. 2A-2D) via a wired connection (e.g., USB, PS/2, etc.) or a wireless connection (e.g., Bluetooth, Wi-Fi, etc.).

In some embodiments, the physical input mechanism comprises (606) a plurality of physical keys. In FIGS. 1A-1B, body portion 120 of portable computing system 100 at least partially contains the touch screen display (e.g., dynamic function row 104) adjacent to the set of physical keys 106.

In some embodiments, the physical input mechanism comprises (608) a touchpad. In FIGS. 1A-1B, body portion 120 of portable computing system 100 at least partially contains the touch screen display (e.g., dynamic function row 104) and touchpad 108 in addition to the set of physical keys 106.

The computing system identifies (610) an active user interface element among the one or more user interface elements that is in focus on the primary display. In some embodiments, the term "in focus" can refer to the active element of the user interface (e.g., a window associated with an application, a particular toolbar or menu associated with an application, or the operating system) that is currently in the foreground and actively running or is controllable by input received from a user of the computing system such as a key press, mouse click, voice command, gestural motion, or the like.

In some embodiments, the computing system or a component thereof (e.g., focus determining module 351, FIG. 3A) identifies a user interface element of the first user interface displayed on the primary display that is in focus. In some embodiments, the user interface element that is in focus is a window that corresponds to an application, a user interface element that corresponds to the application that is within or outside of the application's window (e.g., a field, sub-window, menu, tool, toolbar, tool set, or the like), or a portion of a desktop/operating system-related interface (e.g., a volume control, a portion of a file explorer interface or a controls/settings panel). In some embodiments, the active user interface element is highlighted on the primary display or displayed in a foreground position on the primary display to indicate that it is in focus. In some embodiments, a display characteristic of the active user interface element is changed or emphasized (e.g., colored text, bold text, thick border, and the like) to indicate that it is in focus. Alternatively and/or additionally, in some embodiments, visual and/or aural cues are provided to indicate active user interface element that is in focus (e.g., a chime is played when the focus changes, a bouncing star is displayed above the active user interface element that is in focus, or a display characteristic of the active user interface element that is in focus is different from the balance of the first user interface displayed on the primary display).

In FIG. 5B, for example, window 536 for application A is in focus on primary display 102. In FIG. 5B, status tray 502 indicates that application A is running in the foreground, and app tray 514 also indicates that application A is running in the foreground based on the shadow behind application A icon 512. In FIG. 6A, for example, the music sub-section of the user's media library shown within window 554 is in focus on primary display 102 as indicated by "Music" displayed in bold and albums A-L at least partially displayed within window 554. In contrast, in FIG. 6B, for example, the podcasts sub-section of the user's media library shown within window 554 is in focus on primary display 102 as shown by "Podcasts" displayed in bold and podcasts A-L at least partially displayed within window 554. In FIG. 7B, for example, the sub-window for composing a new email within window 580 is in focus on primary display 102 as indicated by the thick lines surrounding the sub-window. In FIG. 8C, for example, the "Family" group tab of the user's contact book within menu 5134 is in focus on primary display 102 as indicated by the thick lines surrounding the "Family" group tab of menu 5134. In FIG. 11H, for example, the interface for tab B within window 5224 is in focus on primary display 102 as indicated by the thick lines surrounding tab B and the bold text for tab B. In FIG. 12E, for example, the bookmarks sidebar within window 5224 is in focus on primary display 102 as indicated by the thick lines surrounding the bookmarks sidebar. In FIG. 13C, for example, the menu of edit controls 5296 is in focus on primary display 102.

The computing system determines (612) whether the active user interface element that is in focus on the primary display is associated with an application executed by the computing system. In some embodiments, the active user interface element is associated with either an application or the operating system. In some embodiments, the computing system or a component thereof (e.g., DFR determining module 352, FIG. 3A) determines a set of affordances for display on dynamic function row 104 based on the active user interface element that is in focus on primary display 102 and also whether the active user interface element is associated with a specific application or the operating system.

In some embodiments, the application is executed (614) by the processor in the foreground of the first user interface. For example, the application is one of an email application, a word processing application, a presentation application, a photo editing application, a music application, a game application, a spreadsheet application, or the like. FIGS. 5B-5E, for example, show the first user interface displayed by primary display 102 including window 536 corresponding to application A (e.g., a fantasy RPG game) executed in the foreground by the computing system. FIGS. 6A-6D, for example, show the first user interface displayed by primary display 102 including window 554 corresponding to a media player application executed in the foreground by the computing system. FIGS. 6E-9, for example, show the first user interface displayed by primary display 102 including window 580 corresponding to a mail application executed in the foreground by the computing system. FIGS. 10A-11A, for example, show the first user interface displayed by primary display 102 including window 5166 corresponding to a photos application executed in the foreground by the computing system. FIGS. 11B-12G, for example, show the first user interface displayed by primary display 102 including window 5224 corresponding to a web browser application executed in the foreground by the computing system.

In accordance with a determination that the active user interface element that is in focus on the primary display is associated with the application executed by the computing system, the computing system displays (616) a second user interface on the touch screen display, including: (A) a first set of one or more affordances corresponding to the application; and (B) at least one system-level affordance corresponding to at least one system-level functionality. In some embodiments, the first set of one or more affordances includes user selectable symbols/icons and/or indicators and information that may or may not be selectable. In some embodiments, the first set of one or more affordances correspond to basic controls for the application. In some embodiments, at least one system-level affordance is displayed along with the first set of one or more affordances. In one example, in FIGS. 5A-14E, the at least one system-level affordance includes persistent affordances 516 and 534. In another example, in FIG. 5C, the at least one system-level affordance includes affordance 542, which, when activated (e.g., with a tap contact), causes display of a plurality of system-level affordances (e.g., affordances 518, 520, 522, 524, 526, 528, 530, and 532 shown in FIG. 5A).

FIG. 11C, for example, shows dynamic function row 104 displaying a set of basic controls and indicators (e.g., affordances 5230, 5232, and 5238, and address bar 5234) for the web browser application, which is in focus on primary display 102, along with the at least one system-level affordance 542, in response to detecting selection of affordance 5226 in FIG. 11B. In some embodiments, the first set of one or more affordances corresponds to controls associated with the active user interface element that is in focus. As such, the user of the computing system is able to select controls from the first set of one or more affordances for providing input to, and controlling the functions of, the application without shifting his/her hands away from the set of physical keys to another input device (e.g., a mouse) when such selectable controls are displayed on the primary display. This reduction in mode switching, for example, between keyboard and mouse for the user's hands and between keyboard and display for the user's eyes, provides a more intuitive user experience and a more efficient human-machine interface. FIG. 6E, for example, shows dynamic function row 104 displaying a plurality of affordances corresponding to email A (e.g., affordances 582, 584, 586, 588, 590, 592, 594, 596, and 598), which is in focus on primary display 102, along with the at least one system-level affordance 542, in response to detecting selection of mail application icon 506 with cursor 504 in FIG. 6D.

Displaying application-specific and system-level affordances in a touch-sensitive secondary display in response to changes in focus made on a primary display provides the user with accessible affordances that are directly available via the touch-sensitive secondary display. Providing the user with accessible affordances that are directly accessibly via the touch-sensitive secondary display enhances the operability of the computing system and makes the user-device interface more efficient (e.g., by helping the user to access needed functions directly through the touch-sensitive secondary display with fewer interactions and without having to waste time digging through hierarchical menus to locate the needed functions) which, additionally, reduces power usage and improves battery life of the device by enabling the user to access the needed functions more quickly and efficiently. As well, the display of application-specific affordances on the touch-sensitive secondary display indicates an internal state of the device by providing affordances associated with the application currently in focus on the primary display.

In some embodiments, the user of the computing system is able to modify or customize the affordances included in the first set of one or more affordances. In some embodiments, prior to identifying the active user interface element that is in focus on primary display 102 and displaying the first set of one or more affordances, dynamic function row 104 displays a default interface set by the user of the computing system or set in software. For example, the default interface includes one of: a plurality of function keys (e.g., F1, F2, F3, . . . , F12), a stock ticker, scrolling sports scores, scrolling weather forecasts and information, and/or the like.

In some embodiments, after displaying the first set of one or more affordances for a first predetermined period of time (e.g., 30, 60, 90, etc. seconds), dynamic function row 104 re-displays the default interface set by the user of the computing system or set in software. In some embodiments, after displaying the first set of one or more affordances for a first predetermined period of time (e.g., 30, 60, 90, etc. seconds), dynamic function row 104 turns off until a contact is detected by dynamic function row 104 or a keyboard or touchpad associated with the computing system. In some embodiments, after displaying the first set of one or more affordances for a first predetermined period of time (e.g., 30, 60, 90, etc. seconds), dynamic function row 104 turns off until connected to a power source (e.g., when dynamic function row is implemented in battery powered peripheral keyboard 206, FIGS. 2A-2B). In some embodiments, after displaying the first set of one or more affordances and not detecting user input with regard to the first set of one or more affordances for a second predetermined period of time (e.g., 30, 60, 90, etc. seconds), dynamic function row 104 re-displays the default interface set by the user of the computing system or set in software. In some embodiments, when the operating system is in focus or the active user interface element is not associated with an application running in the foreground, dynamic function row 104 re-displays the default interface set by the user of the computing system or set in software.

In some embodiments, after displaying the first set of one or more affordances for the first predetermined period of time (e.g., 30, 60, 90, etc. seconds) and when the computing system is set in a low-power mode, dynamic function row 104 displays a limited set of affordances including, for example, the time, the battery life remaining, the Wi-Fi signal strength, and/or the like. For example, the limited set of affordances are selected by the user of the computing system or set in software, and the user of computing system is able to set the computing into the low-power mode through a system settings panel.

In some embodiments, at least one of the affordances displayed on the second user interface is (618) a multi-function affordance. In some embodiments, a multi-function affordance is capable of performing two or more functions/operations in response to detecting different inputs performed at a location corresponding to the multi-function affordance. For example, persistent volume control 568, in FIG. 6E, displayed by dynamic function row 104 within the second user interface is a multi-function affordance.

In some embodiments, the computing system detects (620) a user touch input selecting the multi-function affordance. In accordance with a determination that the user touch input corresponds to a first type, the computing system performs a first function associated with the multi-function affordance. In accordance with a determination that the user touch input corresponds to a second type distinct from the first type, the computing system performs a second function associated with the multi-function affordance. For example, a first function/operation (e.g., mute a media item) is performed in response to detecting a first gesture (e.g., a tap contact) at a location corresponding to the multi-function affordance, and a second function/operation (e.g., display a volume slider or playback controls for the media item) is performed in response to detecting a second gesture (e.g., a long press gesture) at a location corresponding to the multi-function affordance. For example, the first gesture type corresponds to a touch input detected for less than a predetermined period of time (e.g., 500 ms, 1 s, etc.) with one or more contacts (e.g., a tap contact), and the second gesture type corresponds to a touch input detected for greater than or equal to the predetermined period of time (e.g., 500 ms, 1 s, etc.) with one or more contacts (e.g., a long press gesture).

FIG. 6E, for example, shows dynamic function row 104 receiving and detecting contact 599 (e.g., a long press contact) at a location corresponding to persistent volume control 568. Continuing with this example, FIG. 6F shows dynamic function row 104 displaying volume slider 5100 for adjusting the playback volume of podcast J, which was initiated in FIG. 6C, in response to detecting the long press gesture at the location corresponding to persistent volume control 568 in FIG. 6E. Alternatively, in some embodiments, dynamic function row 104 displays playback controls (e.g., pause, fast forward, rewind, next track, previous track, and the like) for controlling the playback of podcast J, which was initiated in FIG. 6C, in response to detecting the long press gesture at the location corresponding to persistent volume control 568 in FIG. 6E. FIG. 7B, for example, shows dynamic function row 104 receiving and detecting contact 5124 (e.g., a tap contact) at a location corresponding to persistent volume control 568. Continuing with this example, FIG. 7C shows dynamic function row 104 displaying persistent volume control 568 indicating that podcast J is muted in response to detecting the tap contact at the location corresponding to persistent volume control 568 in FIG. 7B.

In some embodiments, the least one system-level affordance is configured (622) upon selection to cause display of a plurality of system-level affordances corresponding to system-level functionalities on the touch screen display. In some embodiments, the at least one system-level affordance enables access to a plurality of system-level controls/affordances such as volume and brightness controls, and other system-level functionalities. For example, in FIG. 5D, dynamic function row 104 displays a second set of affordances and/or indicators (e.g., control set B) corresponding to application A and at least one system-level affordance (e.g., affordance 542). In FIG. 5C, dynamic function row 104 also detects contact 552 (e.g., a tap contact) at a location corresponding to affordance 542. Continuing with this example, FIG. 5E shows dynamic function row 104 the displaying persistent controls (i.e., affordances 516 and 534), the plurality of system-level affordances (i.e., affordances 518, 520, 522, 524, 526, 528, 530, and 532), and affordance 538 corresponding to application A in response to detecting selection of affordance 542 in FIG. 5D.

In some embodiments, the at least one system-level affordance corresponds to (624) one of a power control or escape control. In some embodiments, the at least one system-level affordance includes persistent controls that are displayed on dynamic function row 104 regardless of the focus of primary display 102 (e.g., escape affordance 516 and power control 534, FIGS. 5A-14E). When activated (e.g., via a tap contact), escape affordance 516, causes performance of a corresponding function (e.g., exiting an application which is currently in focus on primary display 102). When activated (e.g., via a tap contact), power control 534 causes display of a modal alert (e.g., modal alert 5308, FIG. 14E) on dynamic function row 104 for logging out, restarting, or powering-off the computing system.

In some embodiments, the computing system detects (626) a user touch input selecting one of the first set of affordances, and, in response to detecting the user touch input, the computing system: displays a different set of affordances corresponding to functionalities of the application; and maintains display of the at least one system-level affordance. In some embodiments, the first set of one or more affordances corresponding to the application includes a single affordance for accessing a set of tools or functions associated with the application. FIG. 5B, for example, shows dynamic function row 104 displaying affordance 538 corresponding to application A, which is in focus on primary display 102, in addition to the persistent controls (i.e., affordances 516 and 534) and the plurality of system-level affordances (i.e., affordances 518, 520, 522, 524, 526, 528, 530, and 532) in response to detecting selection of application A icon 512 with cursor 504 in FIG. 5A. Continuing with the example, FIG. 5C shows dynamic function row 104 displaying a first set of affordances and/or indicators (e.g., control set A) corresponding to application A in response to detecting selection of affordance 538 in FIG. 5B.

In some embodiments, the computing system detects (628) a subsequent user touch input selecting the at least one system-level affordance, and, in response to detecting the subsequent user touch input, the computing system displays a plurality of system-level affordances corresponding to system-level functionalities and at least one application-level affordance corresponding to the application. FIG. 5D, for example, shows dynamic function row 104 displaying a second set of affordances and/or indicators (e.g., control set B) corresponding to application A, which is in focus on primary display 102, and the at least one system-level affordance (e.g., affordance 542). Continuing with this example, in response to detecting selection of affordance 542 in FIG. 5D, FIG. 5E shows dynamic function row 104 displaying persistent controls (i.e., affordances 516 and 534), the plurality of system-level affordances (i.e., affordances 518, 520, 522, 524, 526, 528, 530, and 532), and affordance 538 corresponding to application A.

In some embodiments, after displaying the second user interface on the touch screen display, the computing system identifies (630) a second active user interface element among the one or more user interface elements that is in focus on the primary display and determines whether the second active user interface element corresponds to a different application executed by the computing device. In accordance with a determination that the second active user interface element corresponds to the different application, the computing system displays a fourth user interface on the touch screen display, including: (D) a third set of one or more affordances corresponding to the different application; and (E) the at least one system-level affordance corresponding to the at least one system-level functionality. FIG. 6A, for example, shows dynamic function row 104 displaying a plurality of album affordances 558 (e.g., album affordances 558-A to 558-G) corresponding to the sub-section of the user's media library that is in focus on primary display 102 and the at least one system-level affordance (e.g., affordance 542). FIG. 6A also shows primary display 102 displaying cursor 504 at a location corresponding to the podcasts sub-section of the user's media library. Continuing with the example, in response to detecting selection of the podcasts sub-section with cursor 504 in FIG. 6A, FIG. 6B shows dynamic function row 104 displaying a first plurality of podcast affordances 560 (e.g., podcast affordances 560-A to 560-G) corresponding to the podcasts sub-section of the user's media library that is now in focus on primary display 102 and the at least one system-level affordance (e.g., affordance 542).

In some embodiments, the computing system provides audible cues indicating the different user interface element that is in focus. In some embodiments, primary display 102 displays a visual cue indicating the different user interface element that is in focus. For example, with respect to FIG. 6B, primary display 102 displays a star indicator (not shown) above the "podcasts" text in the left-hand column within window 554, makes the "podcasts" text bold in the left-hand column within window 554, flashes the "podcasts" text in the left-hand column within window 554 in a different color or the same color, or otherwise indicates that the podcasts sub-section is now in focus on primary display 102. In some embodiments, dynamic function row 104 displays a transition animation whereby the plurality of album affordances 558 (shown in FIG. 6A) are rolled over or slid out of the way to so as to display the first plurality of podcast affordances 560 (shown in FIG. 6B).

In some embodiments, after identifying that the second active user interface element, the computing system determines (632) whether a media (e.g., audio or video) item is being played by the computing system, where the media item is not associated with the different application, and, in accordance with a determination that the media item is being played by the computing system, the computing system displays at least one persistent affordance on the touch screen display for controlling the media item (e.g., volume and/or playback controls). In some embodiments, the at least one affordance is a persistent control that enables the user of the computing system to mute/unmute the media item from the touch screen display even if the focus changes or the media is muted and/or being played in the background. FIG. 6D, for example, shows dynamic function row 104 displaying persistent volume control 568 in response to detecting selection of podcast affordance 560-J in FIG. 6C, which initiates playback of podcast J. FIG. 7A, for example, shows dynamic function row 104 displaying persistent volume control 568 even while email A of the application is in focus on primary display 102.

In some embodiments, the at least one persistent affordance displays (634) feedback that corresponds to the media item (e.g., an equalizer (EQ) bar, a run-time indicator, or the like) FIG. 6D, for example, shows dynamic function row 104 displaying persistent volume control 568 with an equalizer bar corresponding to playback of podcast J. Similarly, FIG. 7C, for example, shows dynamic function row 104 displaying persistent volume control 568 with the equalizer bar even while playback of podcast J is muted. In some embodiments, dynamic function row 104 includes an affordance that is continuously updated based on a media item being played or some other real-time information such as a weather indicator, a microphone capture indicator, or a Wi-Fi signal strength indicator.

In some embodiments, the computing device detects (636) a user input corresponding to an override key, and, in response to detecting the user input, the computing system: ceases to display at least the first set of one or more affordances of the second user interface on the touch screen display; and displays a first set of default function keys. In some embodiments, the user input corresponding to the override key is detected in response to receiving a signal from the input mechanism (e.g., actuation of a specified physical key such as a function key) or from the dynamic function row (e.g., selection of a virtual key such as "escape" affordance 516). For example, the user actuates an "fn" key to dismiss current affordances displayed by dynamic function row 104 and to display the default F1, F2, F3, . . . , F12 row. FIG. 14A, for example, shows dynamic function row 104 displaying interface 5300 with affordances 5301 (e.g., corresponding to F1, F2, F3, . . . , F12) along with the persistent controls (e.g., affordances 516 and 534) in response to receiving a signal from the set of physical keys 106 of portable computing system 100 (FIG. 1A-1B) or from the set of physical keys 106 of peripheral keyboard 206 of desktop computing system 200 (FIGS. 2A-2D) corresponding to a specified physical key (e.g., a function key) for overriding dynamic function row 104.

In some embodiments, in response to detecting the user input corresponding to the override key, dynamic function row 104 displays a default interface set by the user of the computing system or set in software. For example, the default interface includes one of: a plurality of function keys (e.g., F1, F2, F3, . . . , F12), a stock ticker, scrolling sports scores, scrolling weather forecasts, or the like.

In some embodiments, after displaying the first set of default function keys, the computing system detects (638) a gesture in a direction substantially parallel to a major dimension of on the touch screen display, and in response to detecting the swipe gesture, displays a second set of default function keys with at least one distinct function key (e.g., a previously undisplayed function key). For example, with respect to FIG. 14A, the user of the computing system is able to reveal additional function keys (e.g., F13, F14, F15, . . . ) within interface 5300 on dynamic function row 104 by performing a substantially horizontal swipe gesture on dynamic function row 104 (e.g., one of a right-to-left or left-to-right swipe gesture).

In some embodiments, in accordance with a determination that the active user interface element is not associated with the application executed by the computing system, the computing system displays (640) a third user interface on the touch screen display, including: (C) a second set of one or more affordances corresponding to operating system controls of the computing system, where the second set of one or more affordances are distinct from the first set of one or more affordances. In FIG. 5A, for example, the system/operating system is currently in focus on primary display 102. For example, the active user interface element that is in focus on the primary display is associated with the operating system such as volume controls, system controls (e.g., brightness or volume controls), system settings, a start menu, file explorer, system search, or the like. FIG. 5A shows dynamic function row 104 displaying a plurality of system-level affordances (e.g., affordances 518, 520, 522, 524, 526, 528, 530, and 532) along with the persistent affordances (e.g., affordances 516 and 534).

In some embodiments, the second set of one or more affordances is (642) an expanded set of operating system controls that includes (B) the at least one system-level affordance corresponding to the at least one system-level functionality. FIG. 8E, for example, shows dynamic function row 104 displaying a plurality of system-level affordances (e.g., the expanded set of operating system controls, including affordances 518, 520, 522, 524, 526, 528, 530, and 532) along with the persistent affordances (e.g., affordances 516 and 534) in response to detecting selection of affordance 542 in FIG. 8D.

It should be understood that the particular order in which the operations in FIGS. 44A-44D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, and 1000) are also applicable in an analogous manner to method 600 described above with respect to FIGS. 44A-44D.

FIGS. 45A-45C are a flowchart of a method of updating a dynamic input and output device (e.g., including dynamic function row 104, FIGS. 1A-1B and 2A-2D), in accordance with some embodiments. The method 700 is performed at a computing system including a processor, memory, a first housing including a primary display, and a second housing at least partially containing a physical keyboard (also referred to herein as a physical input mechanism) and a touch-sensitive secondary display distinct from the primary display. Some operations in method 700 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 (also referred to herein as a first housing 110 that includes the primary display 102) of portable computing system 100 (FIG. 1A). Alternatively, in some embodiments, the primary display is primary display 102 (FIGS. 2A-2D) which is implemented in peripheral display device 204 (also referred to herein as a first housing 204 that includes the primary display 102) (FIGS. 2A-2D). In some embodiments, the second housing is body portion 120 of portable computing system 100 (FIGS. 1A-1B), which at least partially contains the touch-sensitive secondary display (e.g., dynamic function row 104, FIGS. 1A-1B) and the physical keyboard (e.g., the set of physical keys 106, FIGS. 1A-1B). Alternatively, in some embodiments, the second housing is peripheral keyboard 206 (FIGS. 2A-2B) of desktop computing system 200, which at least partially contains the touch-sensitive secondary display (e.g., dynamic function row 104, FIGS. 2A-2B) and the physical keyboard (e.g., the set of physical keys 106, FIGS. 2A-2B). Alternatively, in some embodiments, the second housing is first peripheral input mechanism 212 (FIG. 2C) of desktop computing system 200, which at least partially contains the touch-sensitive secondary display (e.g., dynamic function row 104, FIG. 2C) and the second housing includes an input mechanism (e.g., touchpad 108, FIG. 2C) and does not include the physical keyboard.

The computing system displays (702) a first user interface for an application executed by the computing system on the primary display. FIG. 8A, for example, shows primary display 102 displaying a first user interface with menu 5134 corresponding to the user's contact book. In FIG. 8A, menu 5134 includes a list of a plurality of contacts corresponding the "All Contacts" group of the user's contact book (e.g., a list of pre-existing or automatically populated contacts), which is in focus on primary display 102 as indicated by the thick lines surrounding the "All Contacts" group in menu 5134. FIG. 13B, for example, shows primary display 102 displaying a first user interface with a menu of file controls 5288 overlaid on window 5166, where the menu of file controls 5288 is in focus on primary display 102.

The computing system displays (704) a second user interface on the touch screen display, the second user interface comprising a first set of one or more affordances corresponding to the application, where the first set of one or more affordances corresponds to a first portion of the application. In some embodiments, the first set of one or more affordances associated with a top menu or a file menu (i.e., the first portion or sub-section) of the application. FIG. 8A, for example, shows dynamic function row 104 displaying a second user interface with a first plurality of contact affordances 5136-A to 5136-F (i.e., the first set of affordances) corresponding to the "All Contacts" group of the user's contact book that is in focus on primary display 102. FIG. 13B, for example, shows dynamic function row 104 displaying a second user interface with a first plurality of affordances 5290 (i.e., the first set of affordances) that correspond to the menu of file controls 5288 that is in focus on primary display 102.

The computing system detects (706) a swipe gesture on the touch screen display. In a first example, FIG. 8A shows dynamic function row 104 detecting a right-to-left swipe gesture with contact 5138 moving from a first location 5140-A to a second location 5140-B. In another example, FIG. 13B shows dynamic function row 104 detecting an upward swipe gesture with contact 5292 moving from a first location 5294-A to a second location 5294-B.

In accordance with a determination that the swipe gesture was performed in a first direction (e.g., horizontal), the computing system displays (708) a second set of one or more affordances corresponding to the application on the touch screen display, where at least one affordance in the second set of one or more affordances is distinct from the first set of one or more affordances, and where the second set of one or more affordances also corresponds to the first portion of the application. In some embodiments, in response to detecting a swipe gesture in the first direction, the dynamic function row displays different a second set of affordances corresponding to the first portion of the application (e.g., a toolset or menu) with at least one different affordance (e.g., a tool or item), as compared to the first set of affordances that also correspond to the first portion of the application. For example, in response to detecting the right-to-left swipe gesture in FIG. 8A, FIG. 8B shows dynamic function row 104 displaying a second plurality of contact affordances 5136-E to 5136-J (i.e., the second set of affordances) corresponding to the "All Contacts" group of the user's contact book.

In some embodiments, the first direction is (710) substantially parallel to a major dimension of the touch screen display. For example, with reference to portable computing system 100 (FIGS. 1A-1B), the first direction is substantially perpendicular (e.g., vertical) relative to the major dimension of dynamic function row 104 and/or the set of physical keys 106.

In some embodiments, the first direction is (712) substantially perpendicular to a major dimension of the touch screen display. For example, with reference to portable computing system 100 (FIGS. 1A-1B), the first direction is substantially parallel (e.g., horizontal) relative to the major dimension of dynamic function row 104 and/or the set of physical keys 106.

In accordance with a determination that the swipe gesture was performed in a second direction substantially perpendicular to the first direction (e.g., vertical), the computing system displays (714) a third set of one or more affordances corresponding to the application on the touch screen display, where the third set of one or more affordances is distinct from the second set of one or more affordances, and where the third set of one or more affordances corresponds to a second portion of the application that is distinct from the first portion of the application. In some embodiments, in response to detecting a swipe gesture in the second direction, the dynamic function row displays different a third set of affordances corresponding to the second portion of the application (e.g., a different toolset or menu), as compared to the first portion of the application associated with the first set of affordances. For example, in response to detecting the upward swipe gesture in FIG. 13B, FIG. 13C shows dynamic function row 104 displaying a second plurality of affordances 5298 (i.e., the third set of affordances) that correspond to the menu of edit controls 5296 that is in focus on primary display 102. In some embodiments, dynamic function row 104 displays an transition animation whereby the first plurality of affordances 5290 (shown in FIG. 13B) are rolled over or slid out of the way to so as to display the second plurality of podcast affordances 598 (shown in FIG. 13C).

As such, in one embodiment, a horizontal swipe detected on the dynamic function row 104 moves or scrubs within a group or category and a vertical swipe changes the category/filter. As a result, the user of the computing system is able to move easily navigate tools and menus without moving his/her hands away from the keyboard to a mouse. This also enables more efficient display of information and allows for a more efficient man-machine interaction.

Allowing a user to quickly navigate through application-specific affordances in a touch-sensitive secondary display in response to swipe gestures provides the user with a convenient way to scroll through and quickly locate a desired function via the touch-sensitive secondary display. Providing the user with a convenient way to scroll through and quickly locate a desired function via the touch-sensitive secondary display enhances the operability of the computing system and makes the user-device interface more efficient (e.g., by helping the user to access needed functions directly through the touch-sensitive secondary display with fewer interactions and without having to waste time digging through hierarchical menus to locate the needed functions) which, additionally, reduces power usage and improves battery life of the device by enabling the user to access the needed functions more quickly and efficiently. Furthermore, by dynamically updating affordances that are displayed in the touch-sensitive secondary display in response to swipe gestures at the secondary display, the secondary display is able to make more information available on a limited screen, and helps to ensure that users are provided with desired options right when those options are needed (thereby reducing power usage and extending battery life, because users do not need to waste power and battery life searching through hierarchical menus to located these desired options).

In some embodiments, the second portion is displayed (716) on the primary display in a compact view within the first user interface prior to detecting the swipe gesture, and the system displays the second portion on the primary display in an expanded view within the first user interface in accordance with the determination that the swipe gesture was performed in the second direction substantially perpendicular to the first direction. For example, in FIG. 13B, the first portion of status tray 502 for the photos application (e.g., the menu of file controls 5288) is displayed by primary display 102 in an expanded mode, and the second portion of status tray 502 for the photos application (e.g., the menu of edit controls 5296) is displayed by primary display 102 in a compact mode. Continuing with this example, in response to detecting the swipe gesture performed in the second direction in FIG. 13B (e.g., the upward swipe gesture with contact 5292), the second portion of status tray 502 for the photos application is displayed by primary display 102 in the expanded mode in FIG. 13C, and the first portion of status tray 502 for the photos application is displayed by primary display 102 in the compact mode.

In another example, in FIG. 8B, the first portion of menu 5134 of the mail application (e.g., the "All Contacts" group of the user's contact book within menu 5134) is displayed by primary display 102 in an expanded mode, and the second portion of menu 5134 of the mail application (e.g., the "Family" group of the user's contact book within menu 5134) is displayed by primary display 102 in a compact mode. Continuing with this example, in response to detecting the swipe gesture performed in the second direction in FIG. 8B (e.g., the upward swipe gesture with contact 5142), the second portion of menu 5134 of the mail application is displayed by primary display 102 in the expanded mode in FIG. 8C, and the first portion of menu 5134 of the mail application is displayed by primary display 102 in the compact mode.

In some embodiments, the first portion is (718) one of a menu, tab, folder, tool set, or toolbar of the application, and the second portion is one of a menu, tab, folder, tool set, or toolbar of the application. In FIGS. 8A-8C, for example, the first portion of menu 5134 of the mail application corresponds to the "All Contacts" group of the user's contact book within menu 5134, and the second portion of menu 5134 of the mail application corresponds to the "Family" group of the user's contact book within menu 5134. In FIGS. 13B-13C, for example, the first portion of status tray 502 for the photos application corresponds to the menu of file controls 5288, and the second portion of status tray 502 for the photos application corresponds to the menu of edit controls 5296.

In some embodiments, after displaying the third set of one or more affordances on the touch screen display, the computing system (720): detects a user input selecting the first portion on the first user interface; and, in response to detecting the user input: ceases to display the third set of one or more affordances on the touch screen display, where the third set of one or more affordances corresponds to the second portion of the application; and displays the second set of one or more affordances, where the second set of one or more affordances corresponds to the first portion of the application. For example, with respect to FIG. 13C, after displaying the second plurality of affordances 5298 (i.e., the third set of affordances) on dynamic function row 104 that correspond to the menu of edit controls 5296 that is in focus on primary display 102, primary display 102 displays cursor 504 at a location corresponding to the file menu within status tray 502 (not shown). Continuing with example, in response to detecting selection of the file menu within status tray 502 with cursor 504, dynamic function row 104 ceases to display the second plurality of affordances 5298 (i.e., the third set of affordances) and, instead, displays the menu of file controls 5288 (i.e., the second set of affordances).

In some embodiments, the second set of one or more affordances and the third set of one or more affordances includes (722) at least one system-level affordance corresponding to at least one system-level functionality. For example, in FIG. 8B, dynamic function row 104 displays the second plurality of contact affordances 5136-E to 5136-J (i.e., the second set of affordances) corresponding to the "All Contacts" group of the user's contact book along with the at least one system-level affordance (e.g., affordance 542). In FIG. 13C, for example, dynamic function row 104 displays a second plurality of affordances 5298 (i.e., the third set of affordances) that correspond to the menu of edit controls 5296 that is in focus on primary display 102 along with the at least one system-level affordance (e.g., affordance 542).

In some embodiments, the first user interface for the application executed by the computing system is displayed (724) on the primary display in a full-screen mode, and the first set of one or more affordances displayed on the touch screen display includes controls corresponding to the full-screen mode. FIG. 10G, for example, shows primary display 102 displaying photo B in full-screen mode within window 5200, and also shows dynamic function row 104 displaying a set of controls 5209 for straightening the orientation of photo B within window 5200. For example, in response to detecting a swipe gesture in the second direction (e.g., vertical relative to the major dimension of dynamic function row 104), dynamic function row 104 displays a set of controls corresponding to crop tool 5210 (e.g., if the swipe gesture is an upward swipe gesture) or a set of controls corresponding to red-eye reduction tool 5206 (e.g., if the swipe gesture is a downward swipe gesture). Continuing with this example, in response to detecting a swipe gesture in the first direction (e.g., horizontal relative to the major dimension of dynamic function row 104), dynamic function row 104 adjusts the orientation of photo B within window 5200.

In another example, with respect to FIG. 10G, in response to detecting a swipe gesture in the second direction (e.g., vertical relative to the major dimension of dynamic function row 104), dynamic function row 104 displays a set of controls associated with information affordance 5178 (e.g., if the swipe gesture is an upward swipe gesture) or a set of controls associated with photo adding affordance 5182 (e.g., if the swipe gesture is a downward swipe gesture). Continuing with this example, in response to detecting a swipe gesture in the first direction (e.g., horizontal relative to the major dimension of dynamic function row 104), dynamic function row 104 displays a set of controls corresponding to crop tool 5210 (e.g., if the swipe gesture is an right-to-left swipe gesture) or a set of controls corresponding to red-eye reduction tool 5206 (e.g., if the swipe gesture is a left-to-right swipe gesture).

It should be understood that the particular order in which the operations in FIGS. 45A-45C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 900, and 1000) are also applicable in an analogous manner to method 700 described above with respect to FIGS. 45A-45C.

FIGS. 46A-46B are a flowchart of a method of maintaining functionality of an application while in full-screen mode, in accordance with some embodiments. The method 800 is performed at a computing system including a processor, memory, a first housing including a primary display, and a second housing at least partially containing a physical keyboard (also referred to herein as a physical input mechanism) and a touch-sensitive secondary display distinct from the primary display. Some operations in method 800 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 (also referred to herein as a first housing 110 that includes the primary display 102) of portable computing system 100 (FIG. 1A). Alternatively, in some embodiments, the primary display is primary display 102 (FIGS. 2A-2D) which is implemented in peripheral display device 204 (also referred to herein as a first housing 204 that includes the primary display 102) (FIGS. 2A-2D). In some embodiments, the second housing is body portion 120 of portable computing system 100 (FIGS. 1A-1B), which at least partially contains the touch-sensitive secondary display (e.g., dynamic function row 104, FIGS. 1A-1B) and the physical keyboard (e.g., the set of physical keys 106, FIGS. 1A-1B). Alternatively, in some embodiments, the second housing is peripheral keyboard 206 (FIGS. 2A-2B) of desktop computing system 200, which at least partially contains the touch-sensitive secondary display (e.g., dynamic function row 104, FIGS. 2A-2B) and the physical keyboard (e.g., the set of physical keys 106, FIGS. 2A-2B). Alternatively, in some embodiments, the second housing is first peripheral input mechanism 212 (FIG. 2C) of desktop computing system 200, which at least partially contains the touch-sensitive secondary display (e.g., dynamic function row 104, FIG. 2C) and the second housing includes an input mechanism (e.g., touchpad 108, FIG. 2C) and does not include the physical keyboard.

The computing system displays (802), on the primary display in a normal mode, a first user interface for the application executed by the computing system, the first user interface comprising at least a first set of one or more affordances associated with an application. FIG. 10B, for example, shows primary display 102 displaying a first user interface with window 5166 for the photo application in a normal display mode. In FIG. 10B, selected photo B within window 5166 is in focus on primary display 102, and window 5166 includes selectable affordances (i.e., the first set of affordances) for performing functions/operations with selected photo B: search, zoom, slideshow, share, and settings.

The computing system detects (804) a user input for displaying at least a portion of the first user interface for the application in a full-screen mode on the primary display. For example, the detected user input corresponds to a selection of a full-screen view affordance or a slideshow affordance displayed on primary display 102 or dynamic function row 104.

In some embodiments, the user input for displaying at least the portion of the first user interface for the application in full-screen mode on the primary display is (806) at least one of a touch input detected on the touch screen display and a control selected within the first user interface on the primary display. In a first example, FIG. 10B shows primary display 102 displaying cursor 504 at a location corresponding to a slideshow affordance. In a second example, FIG. 10D shows dynamic function row 104 receiving and detecting contact 5196 (e.g., a tap contact) at a location corresponding to full-screen affordance 5196.

In response to detecting the user input, the computing system (808): ceases to display the first set of one or more affordances associated with the application in the first user interface on the primary display; displays, on the primary display in the full-screen mode, the portion of the first user interface for the application; and automatically, without human intervention, displays, on the touch screen display, a second set of one or more affordances for controlling the application, where the second set of one or more affordances correspond to the first set of one or more affordances. Continuing with the first example above, FIG. 10C shows primary display 102 displaying a slideshow of photos from the all photos sub-section of the user's photo library in window 5188 in response to detecting selection of slideshow affordance with cursor 504 in FIG. 10B. FIG. 10C also shows dynamic function row 104 displaying thumbnail images 5192-Y, 5192-Z, 5192-A, 5192-B, 5192-C, 5192-D, and 5192-E (i.e., the second set of affordances) in response to detecting selection of slideshow affordance with cursor 504 in FIG. 10B. Thumbnail images 5192-Y, 5192-Z, 5192-A, 5192-B, 5192-C, 5192-D, and 5192-E correspond to the sequence of photos for the slideshow that are associated with the all photos sub-section of the user's photo library. In FIG. 10C, affordance 5192-B corresponding to photo B is prominently displayed by dynamic function row 104 (e.g., with bold text and a thick border) to indicate that photo B is currently in focus on primary display 102.

Continuing with the second example above, FIG. 10E shows primary display 102 displaying photo B in full-screen mode within window 5200 in response to detecting selection of full-screen affordance 5196 in FIG. 10D. FIG. 10F also shows dynamic function row 104 displaying a set of editing tools 5205 (i.e., the second set of affordances) in response to detecting selection of editing affordance 5180 in FIG. 10E.

In another example, when the web browser application or a portion of the user interface that corresponds to the web browser application is in focus on primary display 102 and the computing system detects a user input to enter full-screen mode, primary display 102 displays a currently active tab in full-screen mode, and dynamic function row 104 displays thumbnail images corresponding to tabs open within the web browser application along with the at least one system-level affordance. For example, the user of the computing system is able to display a respective tab on primary display 102 in full-screen mode by selecting a thumbnail corresponding to the respective tab on dynamic function row 104.

In some embodiments, the second set of one or more affordances is (810) the first set of one or more affordances. For example, the second set of affordances includes at least a portion of the first set of affordances associated with the application. In another example, the second set of affordances includes the first set of affordances associated with the application. In another example, the second set of affordances is the same as the first set of affordances associated with the application. For example, the second set of affordances includes controls associated with the application executed by the computing system such as photo editing controls, gaming controls, slideshow controls and previews, currently opened web page tabs for a web browser, etc.

In some embodiments, the second set of one or more affordances includes (812) controls corresponding to the full-screen mode. FIG. 10C, for example, shows dynamic function row 104 displaying thumbnail images 5192-Y, 5192-Z, 5192-A, 5192-B, 5192-C, 5192-D, and 5192-E (i.e., the second set of affordances) corresponding to the sequence of photos for the slideshow that are associated with the all photos sub-section of the user's photo library. For example, the user of the computing system is able to skip ahead to a specific photo or skip back to a specific photo by selecting one of the affordances 5192. Furthermore, for example, the user of the computing system is able to browse ahead by performing a right-to-left swipe gesture on dynamic function row 104 or browse behind in the sequence of photos by performing a left-to-right swipe gesture on dynamic function row 104. Additionally, in FIG. 10C, dynamic function row 104 displays pause affordance 5190, which, when activated (e.g., via a tap contact), causes the slideshow to be paused and also causes primary display 102 to exit the full-screen mode.

In some embodiments, the second set of one or more affordances includes (814) at least one system-level affordance corresponding to at least one system-level functionality. FIG. 10C, for example, shows dynamic function row 104 displaying thumbnail images 5192 and pause affordance 5190 along with the at least one system-level affordance (e.g., affordance 542) and the persistent controls (e.g., affordances 516 and 534).

Providing affordances for controlling an application via a touch-sensitive secondary display, while a portion of the application is displayed in a full-screen mode on a primary display, allows users to continue accessing functions that may no longer be directly displayed on a primary display. Allowing users to continue accessing functions that may no longer be directly displayed on a primary display provides the user with a quick and convenient way to access functions that may have become buried on the primary display and thereby enhances the operability of the computing system and makes the user-device interface more efficient (e.g., by helping the user to access needed functions directly through the touch-sensitive secondary display with fewer interactions and without having to waste time digging through hierarchical menus to locate the needed functions) which, additionally, reduces power usage and improves battery life of the device by enabling the user to access the needed functions more quickly and efficiently. Therefore, by shifting menu options from a primary display and to a touch-sensitive secondary display in order to make sure that content may be presented (without obstruction) in the full-screen mode, users are able to sustain interactions with the device and their workflow is not interrupted when shifting to the full-screen mode. Additionally, fewer interactions are required in order to access menu options while viewing full-screen content, as menu options that may have become buried behind content on the primary display is presented on the touch-sensitive secondary display for easy and quick access (and without having to exit full screen mode and then dig around looking for the menu options), thereby reducing power usage and improving battery life for the device.

In some embodiments, the computing system detects (816) a user touch input selecting one of the second set of affordances displayed on the touch screen display, and, in response to detecting the user touch input, the computing system changes the portion of the first user interface for the application being displayed in the full-screen mode on the primary display according to the selected one of the second set of affordances. In FIG. 10G, for example, the user of the computing system is able to adjust the orientation of photo B within window 5200 displayed by primary display 102 by performing a left-to-right swipe/drag gesture or a right-to-left swipe/drag gesture at a location originating on slider 5210 or within the set of controls 5209.

In some embodiments, after displaying the portion of the first user interface for the application in the full-screen mode on the primary display, the computing system (818): detects a subsequent user input for exiting the full-screen mode; and, in response to detecting the subsequent user input: displays, on the primary display in the normal mode, the first user interface for the application executed by the computing system, the first user interface comprising the first set of one or more affordances associated with the application; and maintains display of at least a subset of the second set of one or more affordances for controlling the application on the touch screen display, where the second set of one or more affordances correspond to the first set of one or more affordances. In one example, FIG. 10C shows dynamic function row 104 receiving and detecting contact 5194 (e.g., a tap contact) at a location corresponding to pause affordance 5190. Continuing with this example, primary display 102 exits the full-screen mode, and FIG. 10D shows primary display 102 displaying photo B in an expanded view within window 5166 in response to detecting selection of pause affordance 5190 in FIG. 10C. In another example, FIG. 10G shows dynamic function row 104 receiving and detecting contact 5216 (e.g., a tap contact) at a location corresponding to escape affordance 516. Continuing with this example, primary display 102 exits the full-screen mode, and FIG. 10H shows primary display 102 displaying photo B in the expanded view within window 5166 in response to detecting selection of escape affordance 516 in FIG. 10G. Continuing with this example, FIG. 10H also shows dynamic function row 104 maintaining display of at least a subset of the second set of affordances displayed FIG. 10G.

It should be understood that the particular order in which the operations in FIGS. 46A-46B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 900, and 1000) are also applicable in an analogous manner to method 800 described above with respect to FIGS. 46A-46B.

FIGS. 47A-47B are a flowchart of a method of displaying notifications on a touch screen display, in accordance with some embodiments. The method 900 is performed at a computing system including a processor, memory, a first housing including a primary display, and a second housing at least partially containing a physical keyboard (also referred to herein as a physical input mechanism) and a touch-sensitive secondary display distinct from the primary display. Some operations in method 900 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 (also referred to herein as a first housing 110 that includes the primary display 102) of portable computing system 100 (FIG. 1A). Alternatively, in some embodiments, the primary display is primary display 102 (FIGS. 2A-2D) which is implemented in peripheral display device 204 (also referred to herein as a first housing 204 that includes the primary display 102) (FIGS. 2A-2D). In some embodiments, the second housing is body portion 120 of portable computing system 100 (FIGS. 1A-1B), which at least partially contains the touch-sensitive secondary display (e.g., dynamic function row 104, FIGS. 1A-1B) and the physical keyboard (e.g., the set of physical keys 106, FIGS. 1A-1B). Alternatively, in some embodiments, the second housing is peripheral keyboard 206 (FIGS. 2A-2B) of desktop computing system 200, which at least partially contains the touch-sensitive secondary display (e.g., dynamic function row 104, FIGS. 2A-2B) and the physical keyboard (e.g., the set of physical keys 106, FIGS. 2A-2B). Alternatively, in some embodiments, the second housing is first peripheral input mechanism 212 (FIG. 2C) of desktop computing system 200, which at least partially contains the touch-sensitive secondary display (e.g., dynamic function row 104, FIG. 2C) and the second housing includes an input mechanism (e.g., touchpad 108, FIG. 2C) and does not include the physical keyboard.

The computing system displays (902), on the primary display, a first user interface for an application executed by the computing system. FIG. 12F, for example, shows primary display 102 displaying a first user interface with an interface for tab B (e.g., corresponding to www.website_B.com/home) along with a bookmarks sidebar within window 5224. In FIG. 12F, the bookmarks sidebar is in focus on primary display 102 as indicated by the thick lines surrounding the bookmarks sidebar.

The computing system displays (904), on the touch screen display, a second user interface, the second user interface comprising a set of one or more affordances corresponding to the application. Continuing with the example above, FIG. 12F shows dynamic function row 104 displaying a second user interface with a set of bookmark affordances 5278 corresponding to all pre-existing bookmarks as a result of the bookmarks sidebar being in focus on primary display 102.

In some embodiments, prior to detecting the notification, the computing system detects (906) a user input selecting a notification setting so as to display notifications on the touch screen display and to not display notifications on the primary display. In some embodiments, the user of the computing system is able to specify within a settings panel whether received notifications are to be displayed on one or more of primary display 102 and dynamic function row 104. In some embodiments, the computing system displays received notifications on dynamic function row 104 but not on primary display 102 by default.

The computing system detects (908) a notification. In some embodiments, the notification is associated with the application (e.g., the web browser application in FIG. 12F). In some embodiments, the notification is associated with the application that is currently being executed in the foreground or with a background application. For example, the notification is one of: a modal alert or real-time notification such as an alert associated with a newly received email, instant message, or SMS; a notification associated with a newly detected occurrence within an application such as a post or response within a social media application; a model alert associated with an application executed by the computing system such as a save/exit dialogue box or other prompt; or the like.

In response to detecting the notification, the computing system concurrently displays (910), in the second user interface, the set of one or more affordances corresponding to the application and at least a portion of the detected notification on the touch screen display, where the detected notification is not displayed on the primary display. For example, in some embodiments, based on the notification setting discussed in operation 906, at least a portion of the detected notification is overlaid on the second user interface displayed on dynamic function row 104. Additionally and/or alternatively, in some embodiments, the notification is overlaid on the first user interface displayed by primary display 102. As such, the user of the computing system is able to view and respond to notifications without shifting his/her hands away from the set of physical keys to another input device (e.g., a mouse) when such selectable controls are displayed on the primary display. This reduction in mode switching, for example, between keyboard and mouse for the user's hands and between keyboard and display for the user's eyes, provides for a more intuitive user experience and a more efficient human-machine interface.

For example, FIG. 8G shows primary display 102 and dynamic function row 104 displaying modal alert 5156 in response to detecting selection of the exit affordance with cursor 504 in FIG. 8F. In FIG. 8G, modal alert 5156 prompts the user to save the draft email prior to closing window 580 and includes a "Save" affordance 5158, a "Don't Save" affordance 5160, and a "Cancel" affordance 5162. In another example, FIG. 9 shows primary display 102 and dynamic function row 104 displaying application selection window 5164 in response to receiving a signal corresponding to a specified physical key combination (e.g., alt+tab) from the set of physical keys 106 of portable computing system 100 (FIG. 1A-1B) or from the set of physical keys 106 of peripheral keyboard 206 of desktop computing system 200 (FIGS. 2A-2D). In FIG. 9, application selection window 5164 enables the user of the computing system to toggle between currently running applications which may be in the background.

In yet another example, FIG. 10H shows dynamic function row 104 displaying notification 5218 overlaid on affordances 5178, 5180, 5182, and 5184 in response to reception of notification 5218 by the computing system. In FIG. 10H, notification 5218 corresponds to an SMS, instant message, or the like sent by Suzie S. to the user of the computing system, where the notification's content inquiries "Movies tonight?" In yet another example, FIG. 11E shows primary display 102 and dynamic function row 104 displaying modal alert 5240 in response to detecting selection of the purchase affordance with cursor 504 in FIG. 11D. In FIG. 11E, modal alert 5240 displayed on dynamic function row 104 prompts the user of the computing system to provide their fingerprint in fingerprint region 5244 of dynamic function row 104 and also includes cancel affordance 5242, which, when activated (e.g., via a tap contact) causes cancelation of the purchase.

In a yet another example, FIG. 12A shows primary display 102 displaying notification 5264 overlaid on window 5264 in response to reception of notification 5264 by the computing system. In FIG. 12A, notification 5264 corresponds to an SMS, instant message, or the like sent by MAS to the user of the computing system, where the notification's content inquiries "Landed yet?" In yet another example, FIG. 12G shows dynamic function row 104 displaying modal alert 5280 overlaid on the set of bookmark affordances 5278 in response to detecting selection of the exit affordance with cursor 504 in FIG. 12F. In FIG. 12G, modal alert 5280 prompts the user of the computing system to confirm that they intend to close all open tabs within the web browser application. In yet another example, FIG. 14B shows dynamic function row 104 displaying modal alert 5308 in response to detecting selection of power control 534 in FIG. 14D. In FIG. 14E, modal alert 5308 prompts the user of the computing system to select a logout/power-off option from one of logout affordance 5310, restart affordance 5312, power-off affordance 5314, and cancel affordance 5316.

Displaying received notifications at a touch-sensitive secondary display allows users to continue their work on a primary display in an uninterrupted fashion, and allows them to interact with the received notifications via the touch-sensitive secondary display. Allowing users to continue their work on the primary display in an uninterrupted fashion and allowing users to interact with the received notifications via the touch-sensitive secondary display provides users with a quick and convenient way to review and interact with received notifications and thereby enhances the operability of the computing system and makes the user-device interface more efficient (e.g., by helping the user to conveniently access received notifications directly through the touch-sensitive secondary display and without having to interrupt their workflow to deal with a received notification). Furthermore, displaying receiving notifications at the touch-sensitive secondary display provides an emphasizing effect for received notifications at the touch-sensitive secondary display, as the received notification is, in some embodiments, displayed as overlaying other affordances in the touch-sensitive secondary display, thus ensuring that the received notification is visible and easily accessible at the touch-sensitive secondary display.

In some embodiments, the portion of the notification displayed on the touch screen display prompts (912) a user of the computing system to select one of a plurality of options for responding to the detected notification. For example, modal alert 5156 displayed by primary display 102 and dynamic function row 104, in FIG. 8G, prompts the user to save the draft email prior to closing window 580 and includes a "Save" affordance 5158, a "Don't Save" affordance 5160, and a "Cancel" affordance 5162. In another example, modal alert 5280 displayed by dynamic function row 104, in FIG. 12G, prompts the user of the computing system to confirm that they intend to close all open tabs within the web browser application. In yet another example, modal alert 5308 displayed by dynamic function row 104, in FIG. 14E, prompts the user of the computing system to select a logout/power-off option from one of logout affordance 5310, restart affordance 5312, power-off affordance 5314, and cancel affordance 5316.

In some embodiments, the portion of the notification displayed on the touch screen display includes (914) one or more suggested responses to the detected notification. FIG. 12C, for example, shows dynamic function row 104 displaying response dialogue box 5268 in response to detecting contact 5266 at the location within notification 5264 in FIG. 12B. In FIG. 12C, response dialogue box 5268 includes a plurality of predictive responses to the content of notification 5264 shown in FIGS. 12A-12B. In FIG. 12C, response dialogue box 5268 includes a first predictive response 5270

("Yes."), a second predictive response 5272 ("No."), and a third predictive response 5274 ("On my way!"). FIG. 12C also illustrates dynamic function row 104 receiving and detecting contact 5276 (e.g., a tap contact) at a location corresponding to the first predictive response 5270. For example, in response to selection of the first predictive response 5270, the computing system causes the first predictive response 5270 ("Yes.") to be sent to MAS via a same communication mode (e.g., SMS, instant message, or the like) as the one by which notification 5264 was sent to the user of the computing system. In another example, in response to selection of the first predictive response 5270, the computing system causes the first predictive response 5270 ("Yes.") to be sent to MAS via a default communication mode (e.g., selected by the user or set in software).

In some embodiments, the notification corresponds (916) to an at least one of an incoming instant message, SMS, email, voice call, or video call. In FIG. 10H, for example, notification 5218 corresponds to an SMS, instant message, or the like sent by Suzie S. to the user of the computing system. In another example, in FIG. 11F, interface 5248 corresponds to an incoming voice call from C. Cheung, and, in FIG. 11G, interface 5256 correspond to an ongoing voice call between C. Cheung and the user of the computing system. In yet another example, notification 5264, in FIGS. 12A-12B, corresponds to an SMS, instant message, or the like sent by MAS to the user of the computing system.

In some embodiments, the notification corresponds (918) to a modal alert issued by an application being executed by the processor of the computing system in response to a user input closing the application or performing an action within the application. In a first example, FIG. 8G shows modal alert 5156 prompting the user of the computing system to save the draft email prior to closing window 580 in response to detecting selection of the exit affordance with cursor 504 in FIG. 8F. In a second example, FIG. 11E shows modal alert 5240 prompting the user of the computing system 100 to provide their fingerprint to validate the purchase in response to detecting selection of the purchase affordance with cursor 504 in FIG. 11D. In a third example, FIG. 12G shows modal alert 5280 prompting the user of the computing system to confirm that they intend to close all open tabs within the web browser application in response to detecting selection of the exit affordance with cursor 504 in FIG. 12F.

In some embodiments, the set of one or more affordances includes (920) at least one a system-level affordance corresponding to at least one system-level functionality, and the notification corresponds to a user input selecting one or more portions of the input mechanism (e.g., alt+tab or another keyboard combination) or the least one of a system-level affordance (e.g., a power control affordance). In one example, FIG. 9 shows dynamic function row 104 displaying application selection window 5164 in response to receiving a signal corresponding to a specified physical key combination (e.g., alt+tab) from the set of physical keys 106 of portable computing system 100 (FIG. 1A-1B) or from the set of physical keys 106 of peripheral keyboard 206 of desktop computing system 200 (FIGS. 2A-2D). In another example, FIG. 14E shows dynamic function row 104 displaying modal alert 5308 in response to detecting selection of power control 534 in FIG. 14D.

In some embodiments, the computing system detects (922) a user touch input on the touch screen display corresponding to the portion of the detected notification. In accordance with a determination that the user touch input corresponds to a first type (e.g., swipe to dismiss), the computing system ceases to display in the second user interface the portion of the detected notification on the touch screen display. In accordance with a determination that the user touch input corresponds to a second type (e.g., tap to perform an action) distinct from the first type, the computing system performs an action associated with the detected notification (e.g., open a dialogue for responding to the newly received email, SMS, or IM; save a document; exit a program; or the like). For example, FIG. 10H shows dynamic function row 104 detecting a left-to-right swipe gesture with contact 5220 from a first location 5222-A within notification 5128 to a second location 5222-B. Continuing with this example, FIG. 11A shows dynamic function row 104 ceasing to display notification 5218 in response to detecting the left-to-right swipe gesture in FIG. 10H. In another example, FIG. 12B shows dynamic function row 104 receiving and detecting contact 5266 (e.g., a tap contact) at a location within notification 5264. Continuing with this example, FIG. 12C shows dynamic function row 104 displaying response dialogue box 5268 in response to detecting contact 5266 at the location within notification 5264 in FIG. 12B.

It should be understood that the particular order in which the operations in FIGS. 47A-47B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, and 1000) are also applicable in an analogous manner to method 900 described above with respect to FIGS. 47A-47B.

FIGS. 48A-48C are a flowchart of a method of moving user interface portions, in accordance with some embodiments. The method 1000 is performed at a computing system including a processor, memory, a first housing including a primary display, and a second housing at least partially containing a physical keyboard (also referred to herein as a physical input mechanism) and a touch-sensitive secondary display distinct from the primary display. Some operations in method 1000 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 (also referred to herein as a first housing 110 that includes the primary display 102) of portable computing system 100 (FIG. 1A). Alternatively, in some embodiments, the primary display is primary display 102 (FIGS. 2A-2D) which is implemented in peripheral display device 204 (also referred to herein as a first housing 204 that includes the primary display 102) (FIGS. 2A-2D). In some embodiments, the second housing is body portion 120 of portable computing system 100 (FIGS. 1A-1B), which at least partially contains the touch-sensitive secondary display (e.g., dynamic function row 104, FIGS. 1A-1B) and the physical keyboard (e.g., the set of physical keys 106, FIGS. 1A-1B). Alternatively, in some embodiments, the second housing is peripheral keyboard 206 (FIGS. 2A-2B) of desktop computing system 200, which at least partially contains the touch-sensitive secondary display (e.g., dynamic function row 104, FIGS. 2A-2B) and the physical keyboard (e.g., the set of physical keys 106, FIGS. 2A-2B). Alternatively, in some embodiments, the second housing is first peripheral input mechanism 212 (FIG. 2C) of desktop computing system 200, which at least partially contains the touch-sensitive secondary display (e.g., dynamic function row 104, FIG. 2C) and the second housing includes an input mechanism (e.g., touchpad 108, FIG. 2C) and does not include the physical keyboard.

The computing system displays (1002), on the primary display, a user interface, the user interface comprising one or more user interface elements. For example, FIG. 12A shows primary display 102 displaying an interface for tab B within window 5224 and notification 5264 overlaid on window 5224. In FIG. 12A, the interface for tab B shows the home web page of website B (e.g., associated with the URL: www.website_B.com/home).

The computing system identifies (1004) an active user interface element of the one or more user interface elements that is in focus on the primary display, where the active user interface element is associated with an application executed by the computing system. In FIG. 12A, for example, the interface for tab B is in focus on primary display 102 as indicated by the thick lines surrounding tab B and the bold text for tab B.

In response to identifying the active user interface element that is in focus on the primary display, the computing system displays (1006), on the touch screen display, a set of one or more affordances corresponding to the application. In FIG. 12A, for example, dynamic function row 104 displays controls (i.e., the set of one or more affordances) for the web browser application, including: the home web page of website B in address bar 5234 (e.g., www.website_B.com/home), affordances 5230 and 5232 for navigating between recently viewed web pages, affordances 5238 for adding the current web page to a favorites or bookmarks list, and affordances 5262-A and 5262-B for accessing tabs A and C, respectively.

The computing system detects (1008) a user input to move a respective portion of the user interface. In some embodiments, the portion of the user interface is a menu, toolbar, tool set, notification, or the like. For example, the computing system detects a gesture that drags a menu to the bottom (or other user defined location) of primary display 102 or an instruction to move the menu to dynamic function row 104 via a right-click action or other corresponding affordance. In one example, FIG. 12A shows primary display 102 displaying the user of the computing system dragging notification 5264 with cursor 504 to a predefined location in the bottom right-hand corner of primary display 102. In another example, FIG. 12E shows primary display 102 displaying the user of the computing system dragging the bookmarks sidebar with cursor 504 to the predefined location in the bottom right-hand corner of primary display 102.

In some embodiments, the respective portion of the user interface is (1010) a menu corresponding to the application executed by the computing system. For example, the respective portion of the user interface is a menu or a toolbar for a word processing application. For example, the respective portion of the respective user interface being drug by cursor 504, in FIG. 12E, is the bookmarks sidebar within window 5224.

In some embodiments, the respective portion of the user interface is (1012) at least one of a notification or a modal alert. For example, the respective portion of the respective user interface being drug by cursor 504, in FIG. 12A, is notification 5264.

Allowing a user to quickly move user interface portions (e.g., menus, notifications, etc.) from a primary display and to a touch-sensitive secondary display provides the user with a convenient and customized way to access the user interface portions. Providing the user with a convenient and customized way to access the user interface portions via the touch-sensitive secondary display enhances the operability of the computing system and makes the user-device interface more efficient (e.g., by helping the user to access user interface portions directly through the touch-sensitive secondary display with fewer interactions and without having to waste time looking for a previously viewed (and possibly buried) user interface portion) which, additionally, reduces power usage and improves battery life of the device by enabling the user to access needed user interface portions more quickly and efficiently. Furthermore, displaying user interface portions at the touch-sensitive secondary display in response to user input provides an emphasizing effect for the user interface portions at the touch-sensitive secondary display, as a respective user interface portions is, in some embodiments, displayed as overlaying other affordances in the touch-sensitive secondary display, thus ensuring that the respective user interface portion is visible and easily accessible at the touch-sensitive secondary display.

In response to detecting the user input, and in accordance with a determination that the user input satisfies predefined action criteria, the computing system (1014): ceases to display the respective portion of the user interface on the primary display; ceases to display at least a subset of the set of one or more affordances on the touch screen display; and displays, on the touch screen display, a representation of the respective portion of the user interface. In one example, FIG. 12B shows primary display ceasing to display notification 5264 and dynamic function row 104 displaying notification 5264 overlaid on affordances 5262-A and 5262-B in response to the user of the computing system dragging notification 5264 with cursor 504 to the predefined location in the bottom right-hand corner of primary display 102 in FIG. 12A. In another example, FIG. 12F shows dynamic function row 104 ceasing to display the controls associated with the web browser application as shown in FIG. 12E and displaying a set of bookmark affordances 5278 corresponding to all pre-existing bookmarks in response to the user of the computing system dragging the bookmarks sidebar with cursor 504 to the predefined location in the bottom right-hand corner of primary display 102 in FIG. 12E.

In some embodiments, the predefined action criteria are satisfied (1016) when the user input is a dragging gesture that drags the respective portion of the user interface to a predefined location of the primary display. In some embodiments, the predefined location is one of a plurality of predefined location set by the user of the computing system or set by default in software. In one example, in FIG. 12B, the user of the computing system drags notification 5264 to a predefined location (e.g., the bottom right-hand corner of primary display 102) with cursor 504. In another example, in FIG. 12E, the user of the computing system drags the bookmarks sidebar to a predefined location (e.g., the bottom right-hand corner of primary display 102) with cursor 504.

In some embodiments, the predefined action criteria are satisfied when the user input is (1018) a predetermined input corresponding to moving the respective portion of the user interface to the touch screen display. For example, primary display 102 displays a window for a word processing application along with a formatting toolbar overlaid on the window for the word processing application. Continuing with this example, in response to selecting a specific display option after right-clicking on the formatting toolbar or selecting the specific display option while the formatting toolbar is in focus on primary display 102, primary display 102 ceases to display the formatting toolbar and dynamic function row displays the formatting toolbar.

In some embodiments, the representation of the respective portion of the user interface is overlaid (1020) on the set of one or more affordances on the touch screen display. For example, FIG. 12B shows dynamic function row 104 displaying notification 5264 overlaid on affordances 5262-A and 5262-B in response to the user of the computing system dragging notification 5264 with cursor 504 to the predefined location in the bottom right-hand corner of primary display 102 in FIG. 12A.

In some embodiments, the set of one or more affordances includes (1022) at least one system-level affordance corresponding to at least one system-level functionality, and, after displaying the representation of the respective portion of the user interface on the touch screen display, the computing system maintains display of the at least one system-level affordance on the touch screen display. In FIG. 12B, for example, dynamic function row 104 displays notification 5264 overlaid on affordances 5262-A and 5262-B along with the at least one system-level affordance (e.g., affordance 542) and the persistent controls (e.g., escape affordance 516 and power control 534). In FIG. 12F, for example, dynamic function row 104 displays the set of bookmark affordances 5278 along with the at least one system-level affordance (e.g., affordance 542) and the persistent controls (e.g., escape affordance 516 and power control 534).

In some embodiments, in response to detecting the user input, and in accordance with a determination that the user input does not satisfy the predefined action criteria, the computing system (1024): maintains display of the respective portion of the user interface on the primary display; and maintains display of the set of one or more affordances on the touch screen display. For example, with respect to FIG. 12A, if the user of the computing system drags notification 5264 to the bottom left-hand corner of primary display 102 with cursor 504, notification 5264 will be displayed in the bottom left-hand corner of primary display 102 and dynamic function row 104 will do display notification 5264 as the bottom left-hand corner is not the predefined location (e.g., the bottom right-hand corner is the predefined location).

It should be understood that the particular order in which the operations in FIGS. 48A-48C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, and 900) are also applicable in an analogous manner to method 1000 described above with respect to FIGS. 48A-48C.

Figure 49:
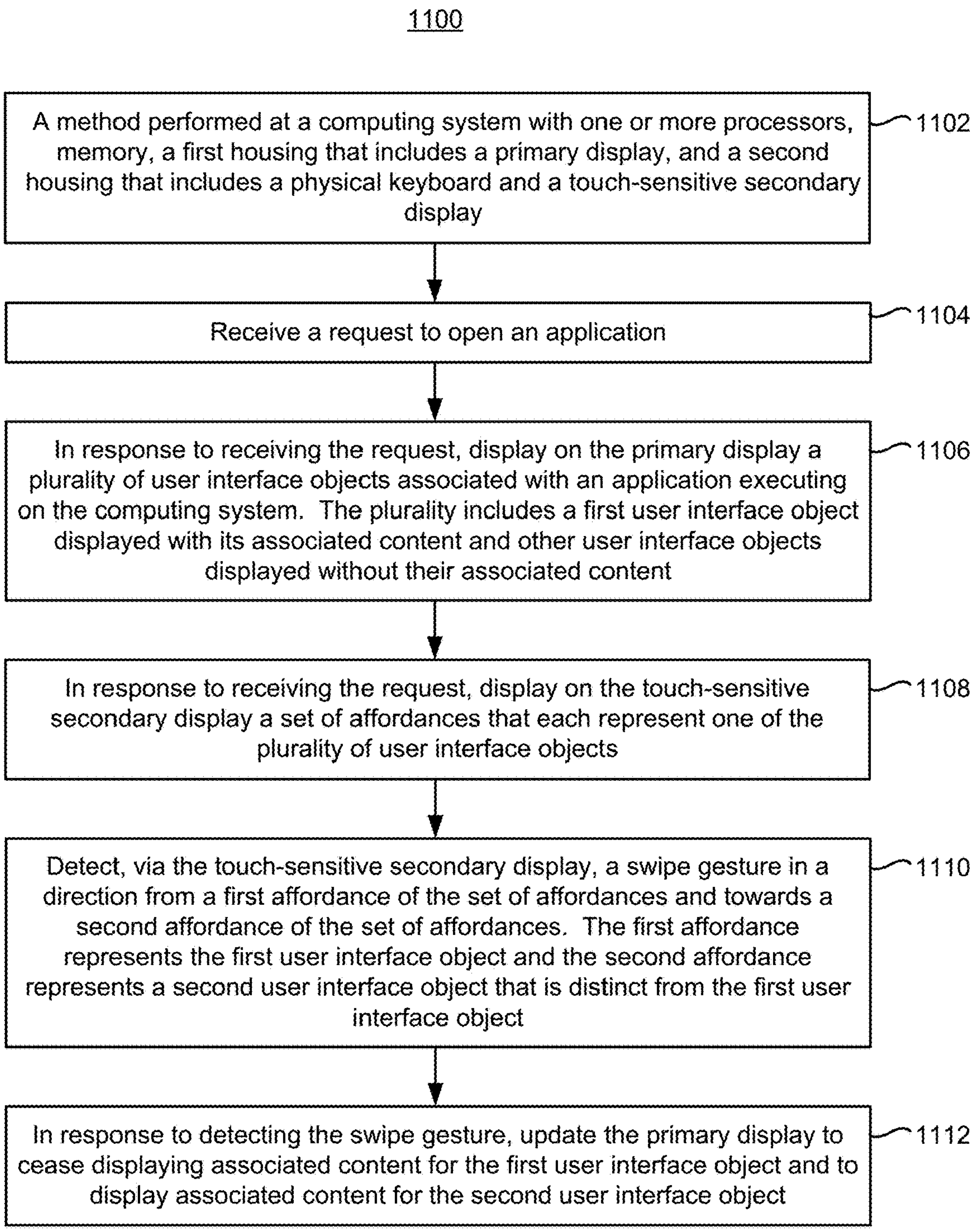
FIG. 49 is a flowchart of a method of browsing through user interface objects on a primary display by providing inputs at a touch-sensitive secondary display, in accordance with some embodiments.

FIG. 49 is a flowchart depicting a method 1100 of browsing through user interface objects on a primary display by providing inputs at a touch-sensitive secondary display, in accordance with some embodiments. The method 1100 is performed (1102) at a computing system including a processor, memory, a first housing including a primary display, and a second housing at least partially containing a physical keyboard (also referred to herein as a physical input mechanism) and a touch-sensitive secondary display distinct from the primary display. Some operations in method 1100 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 (also referred to herein as a first housing 110 that includes the primary display 102) of portable computing system 100 (FIG. 1A). Alternatively, in some embodiments, the primary display is primary display 102 (FIGS. 2A-2D) which is implemented in peripheral display device 204 (also referred to herein as a first housing 204 that includes the primary display 102) (FIGS. 2A-2D). In some embodiments, the second housing is body portion 120 of portable computing system 100 (FIGS. 1A-1B), which at least partially contains the touch-sensitive secondary display (e.g., dynamic function row 104, FIGS. 1A-1B) and the physical keyboard (e.g., the set of physical keys 106, FIGS. 1A-1B). Alternatively, in some embodiments, the second housing is peripheral keyboard 206 (FIGS. 2A-2B) of desktop computing system 200, which at least partially contains the touch-sensitive secondary display (e.g., dynamic function row 104, FIGS. 2A-2B) and the physical keyboard (e.g., the set of physical keys 106, FIGS. 2A-2B). Alternatively, in some embodiments, the second housing is first peripheral input mechanism 212 (FIG. 2C) of desktop computing system 200, which at least partially contains the touch-sensitive secondary display (e.g., dynamic function row 104, FIG. 2C) and the second housing includes an input mechanism (e.g., touchpad 108, FIG. 2C) and does not include the physical keyboard.

As described below, the method 1100 (and associated interfaces) provide(s) an intuitive way to browse through user interface objects on a primary display by providing inputs at a touch-sensitive secondary display. Method 1100 provides users with quick access to user interface controls at the touch-sensitive secondary display so that a user need not move their fingers from positions over keys on the physical input mechanism and can instead simply select controls on the secondary display without having to adjust finger positions to move to a trackpad and then move finger positions back to the physical input mechanism in order to continue working.

As shown in FIG. 49, the method 1100 includes receiving a request to open an application. For example, a user clicks on an icon for a web browser application or requests to open a web browser application that is already executing on the computing system. In some embodiments, the user provides verbal instructions to the computing system to open the application (e.g., a verbal command issued to a virtual assistant, such as SIRI).

In response to receiving the request, the computing system displays (1106), on the primary display, a plurality of user interface objects associated with an application executing on the computing system. For example the plurality of user interface objects correspond to tabs in a web browsing application, individual photos in a photo-browsing application, individual frames of a video in a video-editing application, and the like.

In some embodiments, the plurality of user interface objects includes a first user interface object displayed with its associated content and other user interface objects displayed without their associated content. For example, as shown in FIG. 16C, the plurality of user interface objects correspond to web-browsing tabs in a browser application and the first user interface object corresponds to a tab 5052-A that currently has focus on the primary display 102. As shown in FIG. 16C, the tab 5052-A is displayed with associated web content and the other user interface objects (e.g., tabs 5050-A and 5051-A are displayed without their associated web content).

In response to receiving the request, the computing system also displays (1108), on the touch-sensitive secondary display, a set of affordances that each represent (i.e., correspond to) one of the plurality of user interface objects. For example, a first affordance 5052-B corresponds to the first user interface object 5052-A, FIG. 16C. In some embodiments, the set of affordances are displayed next to at least one system-level affordance corresponding to a system-level functionality (e.g., system-level affordances are discuss in detail above and, as shown in FIG. 16C, system-level affordances for accessing brightness, playback, and volume controls are shown adjacent to the set of affordances in the touch-sensitive secondary display 104).

In some embodiments, the first affordance in the set of affordances that corresponds to the first tab is displayed with a larger display size than other affordances in the set (e.g., the first affordance 5052-B is display with the larger display size relative to other affordances 5050-B and 5051-B). In some embodiments, the other affordances are also displayed with a lower brightness level relative to a brightness level of the first affordance 5052-B.

In some embodiments, before receiving the request to open the application, the touch-sensitive secondary display included a different set of affordances in an application-specific region of the touch-sensitive secondary display (such as affordances for accessing various folders in a Finder application, such as the affordances shown in touch-sensitive secondary display 104 in FIG. 21B).

The computing system, in accordance with method 1100, detects (1110), via the touch-sensitive secondary display, a swipe gesture (e.g., 5011-A, FIG. 16C) in a direction from a first affordance of the set of affordances and towards a second affordance of the set of affordances. In some embodiments, the first affordance represents the first user interface object (e.g., the first affordance 5052-B represents first user interface object 5052-A) and the second affordance represents a second user interface object that is distinct from the first user interface object (e.g., the second affordance 5051-B represents second user interface object 5051-A).

In response to detecting the swipe gesture, the computing system updates the primary display (e.g., during the swipe gesture) to cease displaying associated content for the first user interface object and to display associated content for the second user interface object. For example, as shown in FIG. 16D as the swipe gesture moves towards and makes contact with the second affordance 5051-B (e.g., input 5011-B, FIG. 16D) and, in response, the primary display is updated to include associated content for the second user interface object 5051-A. In some embodiments, the second affordance 5051-B is also updated on the touch-sensitive secondary display 104 to have the larger display size and an increased brightness level.

In some embodiments, a tap over a respective affordance displayed on the touch-sensitive secondary display 104 may also be used to facilitate navigation through the plurality of user interface objects on the primary display (instead of or in addition to the swipe gesture). For example, each of the inputs 5011-A, 5011-B, and 5011-C may correspond to discrete inputs or may correspond to a continuous swipe gesture across the touch-sensitive secondary display 104.

In some embodiments, the computing system detects continuous travel of the swipe gesture across the touch-sensitive secondary display, including the swipe gesture contacting a third affordance that represents a third user interface object (as shown in FIG. 16E, 5011-C contacts the third affordance 5050-B). In response to detecting that the swipe gesture contacts the third affordance, the computing system updates the primary display to display associated content for the third user interface object (as shown in FIG. 16E).

In some embodiments, each affordance in the set of affordance includes a representation of respective associated content for a respective user interface object of the plurality. For example, each of the affordances 5050-B, 5051-B, and 5052-B include a mini-view/shrunken view of content for a corresponding tab shown on the primary display 102 (e.g., as shown in FIG. 16C).

Allowing a user to quickly navigate through user interface objects on a primary display (e.g., browser tabs) by providing inputs at a touch-sensitive secondary display provides the user with a convenient way to quickly navigate through the user interface objects. Providing the user with a convenient way to quickly navigate through the user interface objects via the touch-sensitive secondary display (and reducing the number of inputs needed to navigate through the user interface objects, thus requiring fewer interactions to navigate through the user interface objects) enhances the operability of the computing system and makes the user-device interface more efficient (e.g., by requiring a single input or gesture at a touch-sensitive secondary display to navigate through user interface objects on a primary display) which, additionally, reduces power usage and improves battery life of the device by enabling the user to navigate through user interface objects on the primary display more quickly and efficiently. Moreover, as users provide an input at the touch-sensitive display (e.g., a swipe gesture) to navigate through the user interface objects on the primary display, each contacted affordance at the touch-sensitive display (that corresponds to one of the user interface objects) is visually distinguished from other affordances (e.g., a respective contacted affordance is magnified and a border may be highlighted), thus making information displayed on the touch-sensitive secondary display more discernable to the user.

In some embodiments, the computing system, before detecting the swipe gesture (or before detecting movement of the swipe gesture, detects an initial contact with the touch-sensitive secondary display over the first affordance. In response to detecting the initial contact, the computing system increases a magnification level (or display size) of the first affordance. In some embodiments, in accordance with a determination that a user has provided an input at a respective affordance that corresponds to a respective user interface object other than a user interface object that has focus on the primary display 102, the computing device increases a magnification level of the respective affordance.

In some embodiments, the application is a web browsing application, and the plurality of user interface objects each correspond to web-browsing tabs.

In some embodiments, the computing system detects an input at a URL-input portion of the web browsing application on the primary display. In response to detecting the input, the computing system updates the touch-sensitive secondary display to include representations of favorite URLs. An example is shown in FIG. 16P.

In some embodiments, the application is a photo-browsing application, and the plurality of user interface objects each correspond to individual photos (as shown in FIG. 27B). In some embodiments, the set of affordances includes different representation types based on a type of content for each of the user interface objects. For example, if one of the UI objects corresponds to a live photo, display an appropriate indication (as shown in FIG. 28K).

In some embodiments, the application is a video-editing (or video-playback) application, and the plurality of user interface object each correspond to individual frames in a respective video. An example is shown in FIGS. 19A-19B, in which a user is able to provide an input 5015-A to quickly navigate through individual frames of the respective video.

It should be understood that the particular order in which the operations in FIG. 49 have been described is merely exemplary and is not intended to indicate that the described order is the only order in which the operations could be performed. One of ordinary skill in the art would recognize various ways to reorder the operations described herein.

Figure 50:
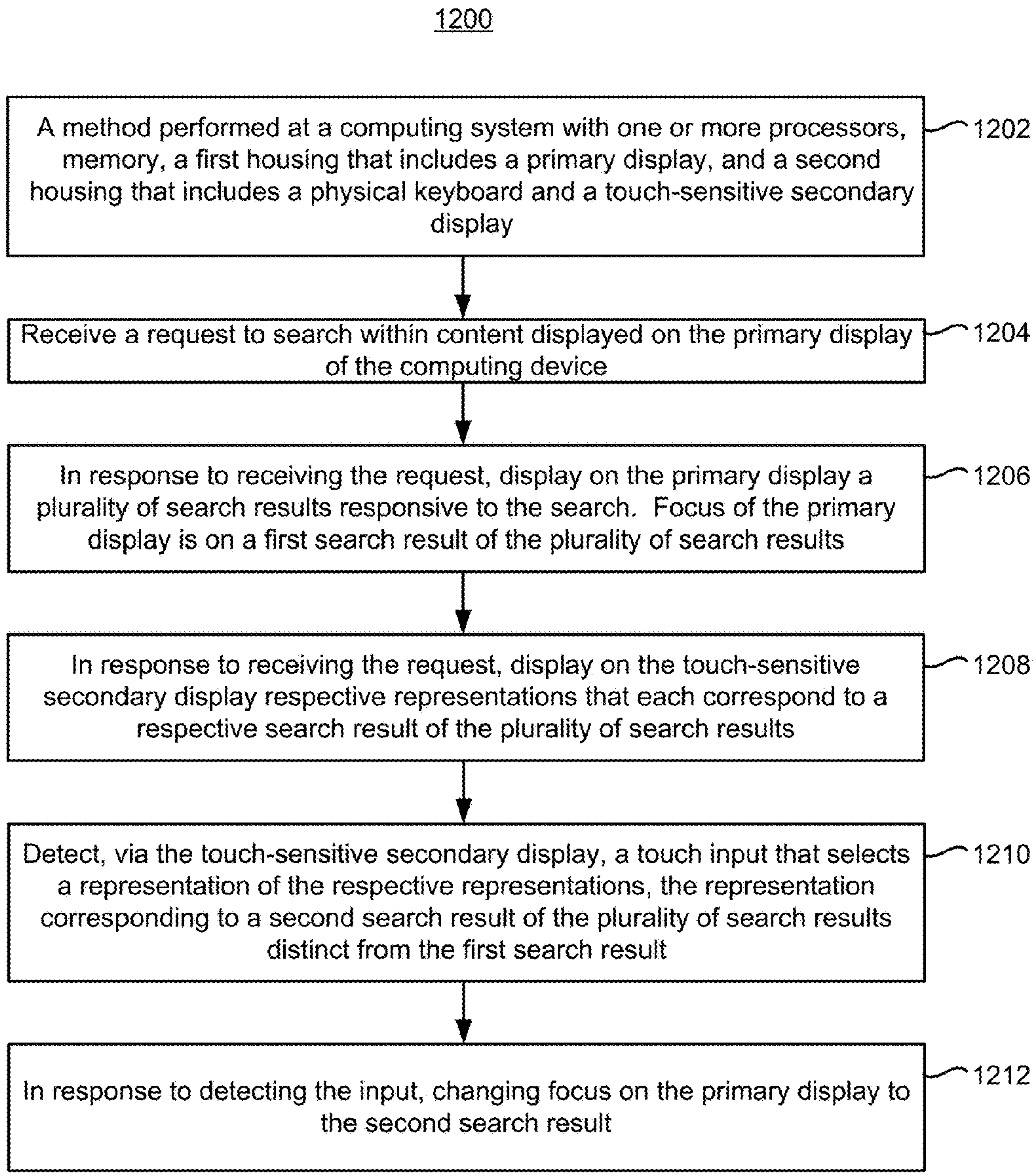
FIG. 50 is a flowchart of a method of browsing through search results on a primary display by providing inputs at a touch-sensitive secondary display, in accordance with some embodiments.

FIG. 50 is a flowchart depicting a method 1200 of browsing through search results on a primary display by providing inputs at a touch-sensitive secondary display, in accordance with some embodiments. The method 1200 is performed (1202) at a computing system including a processor, memory, a first housing including a primary display, and a second housing at least partially containing a physical keyboard (also referred to herein as a physical input mechanism) and a touch-sensitive secondary display distinct from the primary display. Some operations in method 1200 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 (also referred to herein as a first housing 110 that includes the primary display 102) of portable computing system 100 (FIG. 1A). Alternatively, in some embodiments, the primary display is primary display 102 (FIGS. 2A-2D) which is implemented in peripheral display device 204 (also referred to herein as a first housing 204 that includes the primary display 102) (FIGS. 2A-2D). In some embodiments, the second housing is body portion 120 of portable computing system 100 (FIGS. 1A-1B), which at least partially contains the touch-sensitive secondary display (e.g., dynamic function row 104, FIGS. 1A-1B) and the physical keyboard (e.g., the set of physical keys 106, FIGS. 1A-1B). Alternatively, in some embodiments, the second housing is peripheral keyboard 206 (FIGS. 2A-2B) of desktop computing system 200, which at least partially contains the touch-sensitive secondary display (e.g., dynamic function row 104, FIGS. 2A-2B) and the physical keyboard (e.g., the set of physical keys 106, FIGS. 2A-2B). Alternatively, in some embodiments, the second housing is first peripheral input mechanism 212 (FIG. 2C) of desktop computing system 200, which at least partially contains the touch-sensitive secondary display (e.g., dynamic function row 104, FIG. 2C) and the second housing includes an input mechanism (e.g., touchpad 108, FIG. 2C) and does not include the physical keyboard.

As described below, the method 1200 (and associated interfaces) provide(s) an intuitive way to browse through and locate search results on a primary display by providing inputs at a touch-sensitive secondary display. Method 1200 provides users with quick access to user interface controls at the touch-sensitive secondary display for navigating between search results so that a user need not move their fingers from positions over keys on the physical input mechanism and can instead simply select controls on the secondary display without having to adjust finger positions to move to a trackpad and then move finger positions back to the physical input mechanism in order to continue working.

In accordance with the method 1200, the computing system receives (1204) a request to search within content displayed on the primary display of the computing device. For example, the request corresponds to a search for text on a webpage, as shown in FIGS. 32A-32B, the request corresponds to a search for text within a document, as shown in FIGS. 32C-32E.

In response to receiving the request, the computing system displays (1206), on the primary display, a plurality of search results responsive to the search. In some embodiments, the request to search within the content is a request to locate a search string within the content, and the plurality of search results each include at least the search string (e.g., the search string is "the," as shown in FIGS. 32A-32E). In some embodiments, displaying the plurality of search results includes highlighting the search string for each of the plurality of search results (e.g., as shown in FIGS. 32A-32E, the search string "the" is highlighted within the web browser and the notes application users interfaces).

Figure 32A:
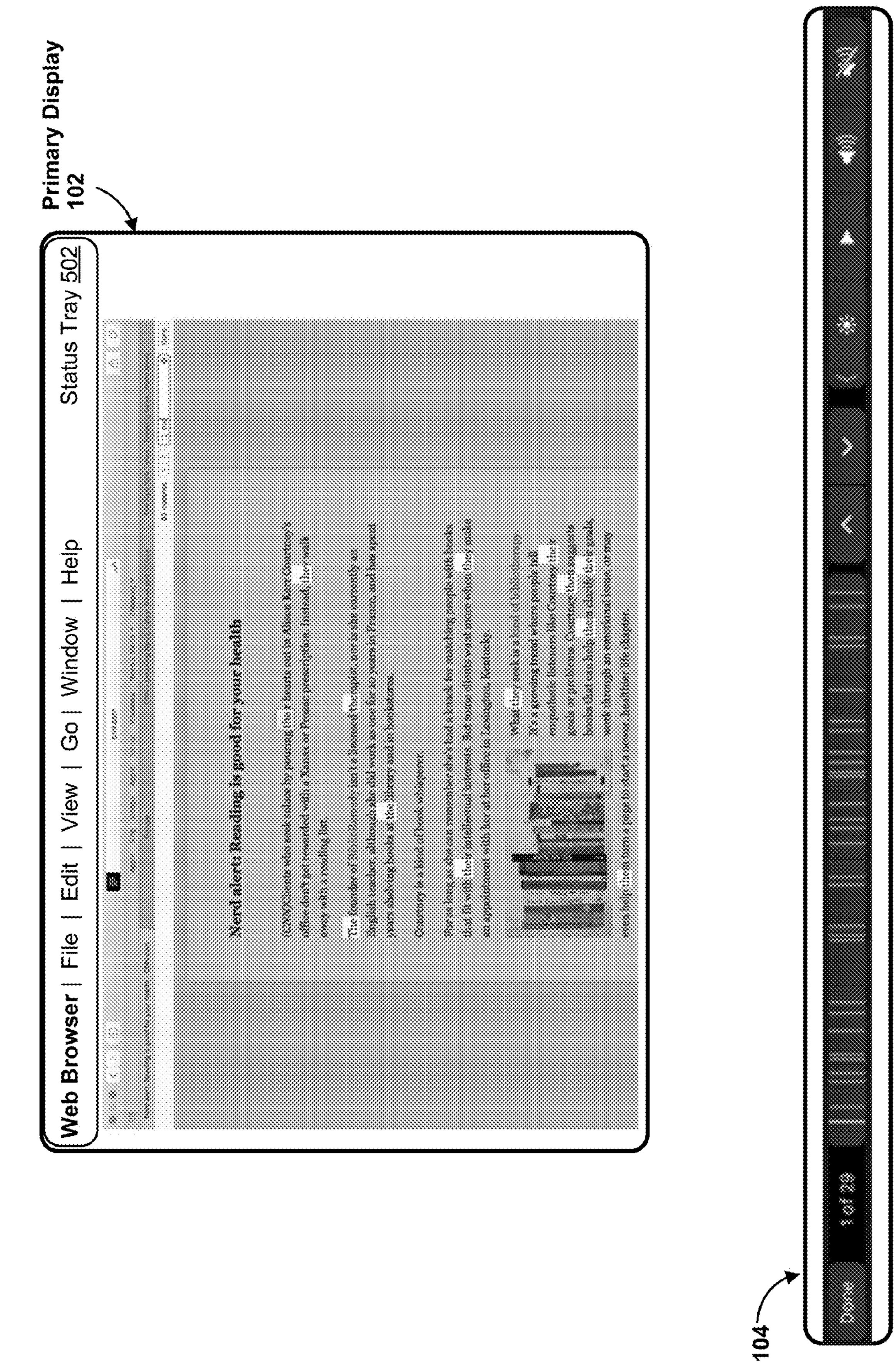
Figure 32B:
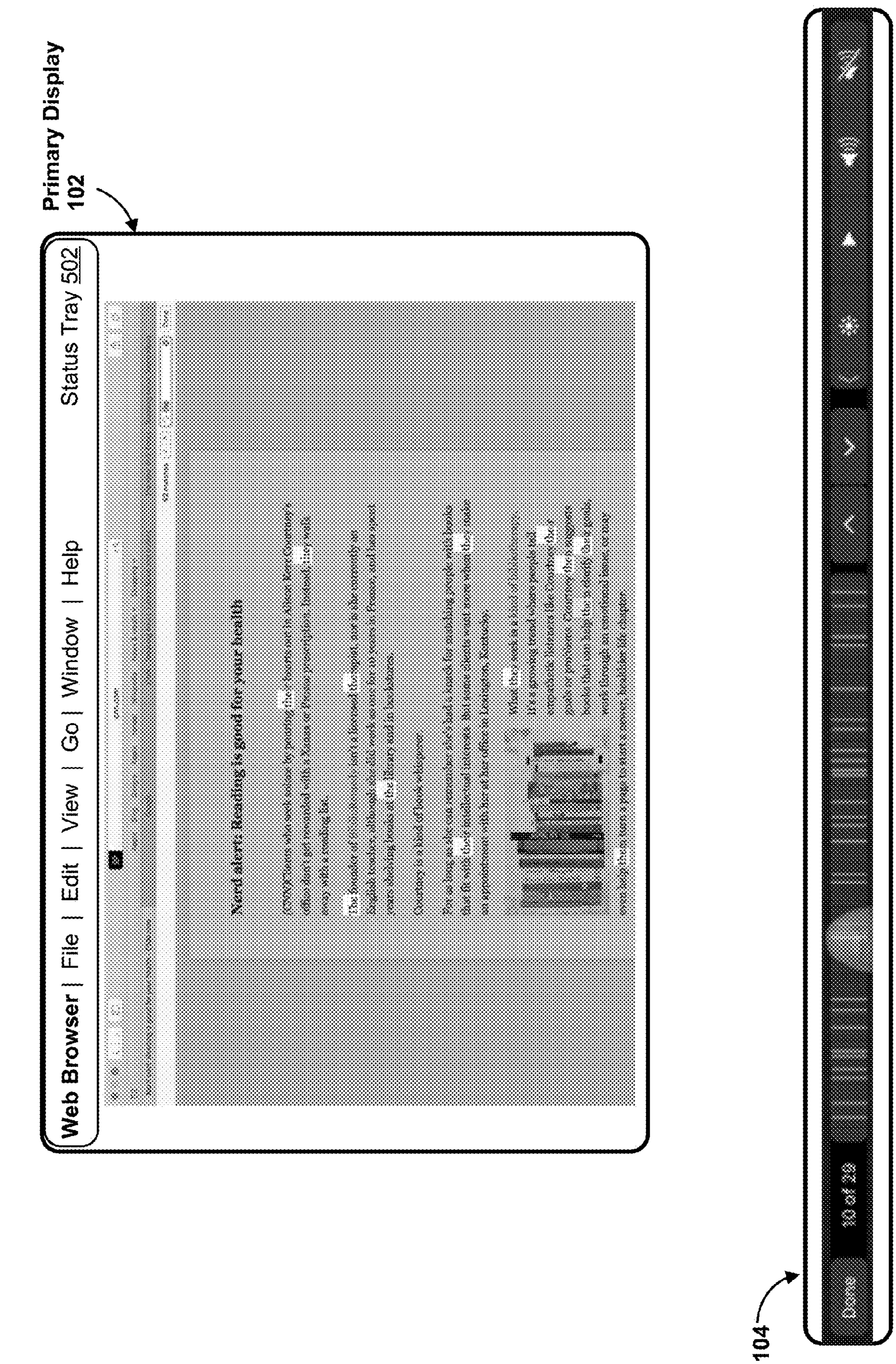
Figure 32C:
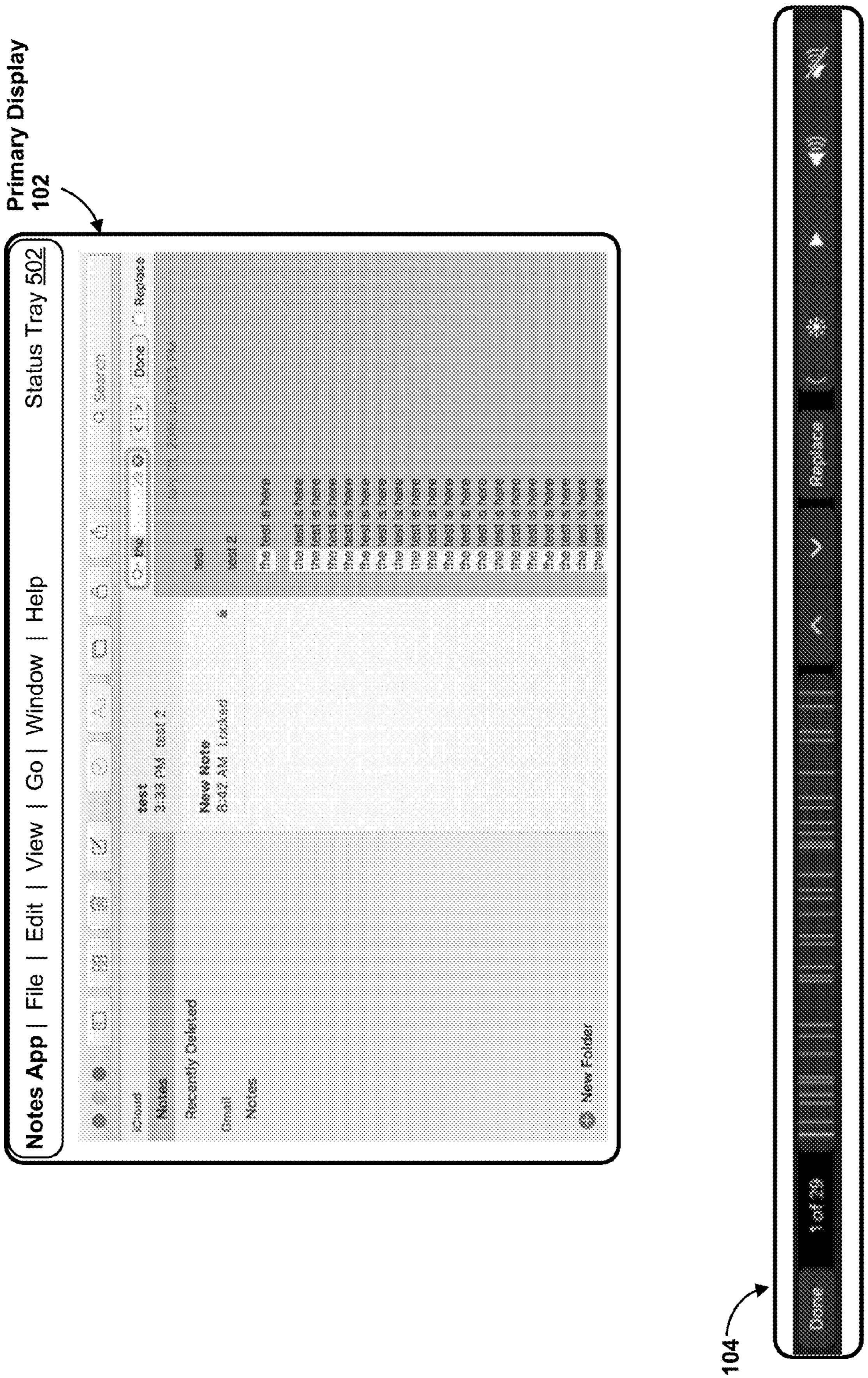
Figure 32D:
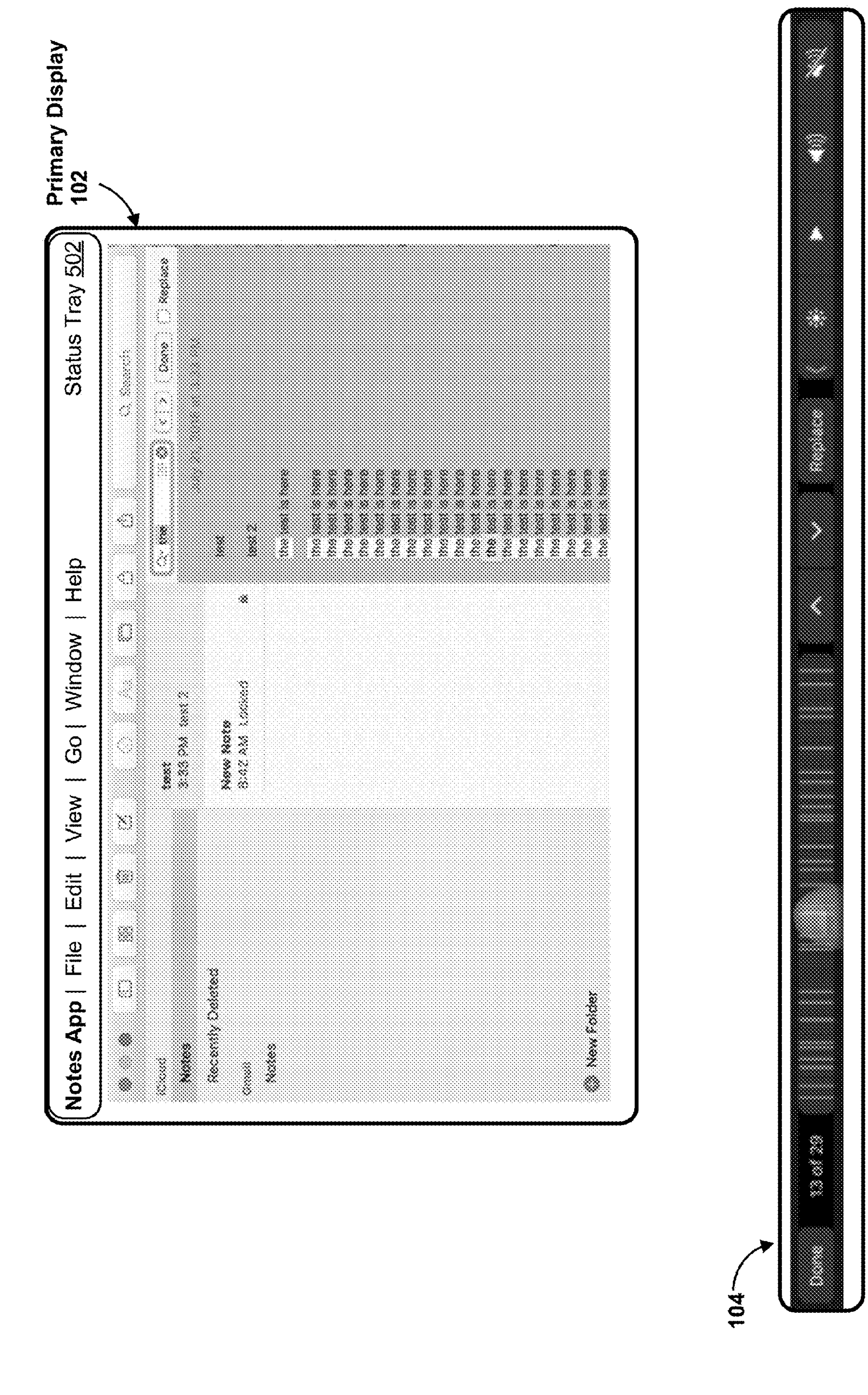
Figure 32E:
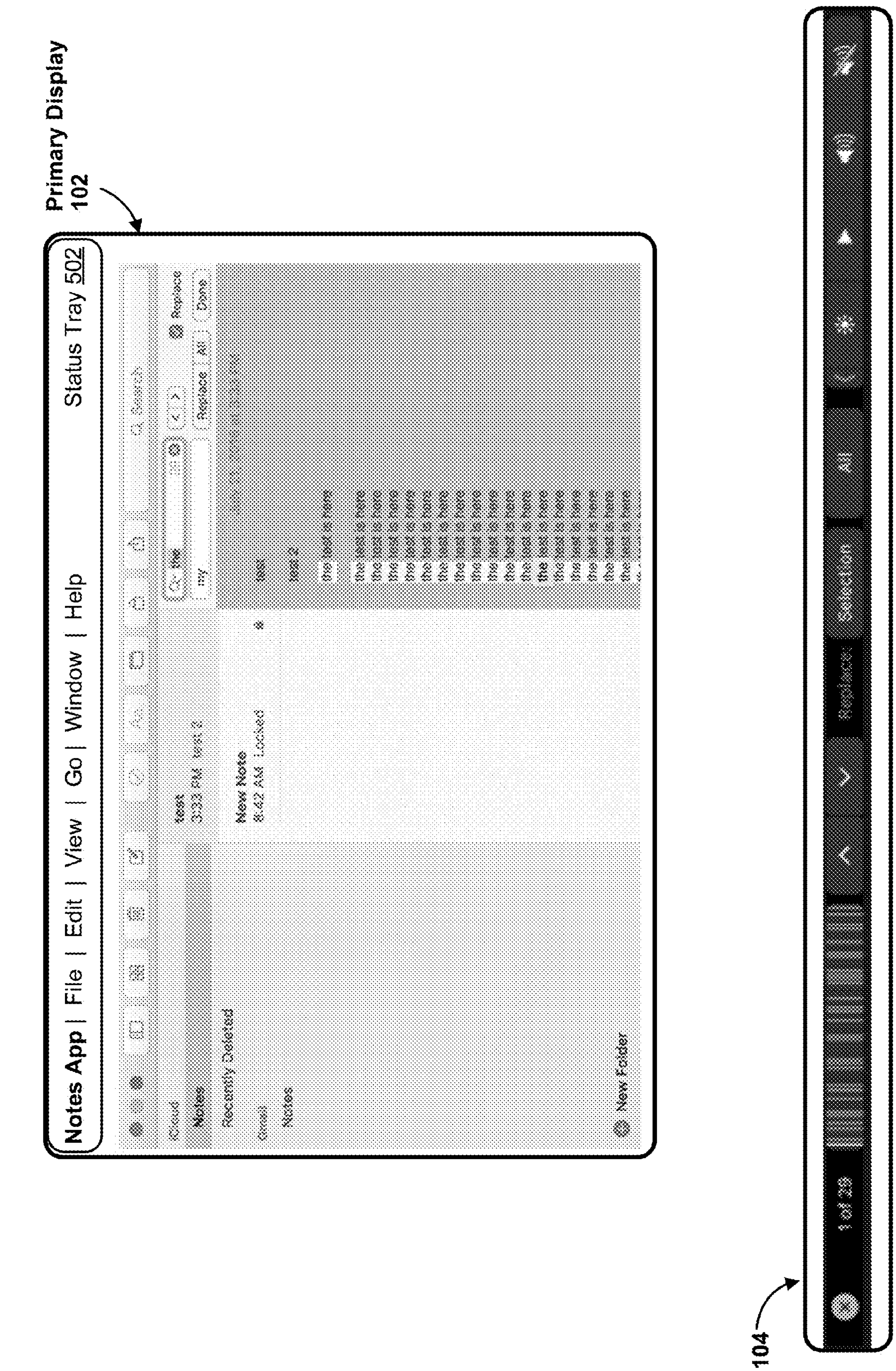

In some embodiments, focus (of the primary display 102) is on a first search result of the plurality of search results (e.g., as shown in FIG. 32A, the first search result is highlighted using a different color than is used to highlight the rest of the search results).

In response to receiving the request, the computing system also displays (1208), on the touch-sensitive secondary display, respective representations that each correspond to a respective search result of the plurality of search results. For example, the representations are tick marks that each correspond to respective search results of the search results (as shown in FIG. 32A). In some embodiments, the tick marks are displayed in a row on the touch-sensitive secondary display in an order that corresponds to an ordering of the search results on the primary display (as shown in FIG. 32A). In some embodiments, the touch-sensitive secondary display 104 also includes text that indicates a current position of a selected search result (e.g., "1 of 29" as shown in FIG. 32A).

In accordance with method 1200, the computing system detects (1210), via the touch-sensitive secondary display, a touch input (e.g., a tap or a swipe) that selects a representation of the respective representations, the representation corresponding to a second search result of the plurality of search results distinct from the first search result. For example, as shown in FIGS. 32B and 32D, the touch input selects a tenth and a thirteenth representation, respectively.

In response to detecting the input, the computing system changes focus (1212) on the primary display to the second search result. For example, as shown in FIG. 32B, in response to the touch input selecting the thirteenth representation shown in the touch-sensitive secondary display, the computing system changes focus on the primary display to the second search result. In this way, a user is able to quickly and easily locate and investigate each search result as they scrub/swipe/gesture within the touch-sensitive secondary display 104.

Allowing a user to quickly navigate through search results on a primary display by providing inputs at a touch-sensitive secondary display provides the user with a convenient way to quickly navigate through the search results. Providing the user with a convenient way to quickly navigate through the search results via the touch-sensitive secondary display (and reducing the number of inputs needed to navigate through the search results, thus requiring fewer interactions from a user to browse through numerous search results quickly) enhances the operability of the computing system and makes the user-device interface more efficient (e.g., by requiring a single input or gesture at a touch-sensitive secondary display to navigate through numerous search results on a primary display) which, additionally, reduces power usage and improves battery life of the device by enabling the user to navigate through search results on the primary display more quickly and efficiently. Moreover, as users provide an input at the touch-sensitive display (e.g., a swipe gesture) to navigate through the search on the primary display, each contacted affordance at the touch-sensitive display (that corresponds to one of the search results) is visually distinguished from other affordances (e.g., a respective contacted affordance is magnified and a border may be highlighted), thus making information displayed on the touch-sensitive secondary display more discernable to the user.

In some embodiments, changing focus includes modifying, on the primary display, a visual characteristic of (e.g., a visual characteristic that is used to render) the second search result (e.g., displaying the second search result with a larger font size or displaying the second search result with a different highlight color).

In some embodiments, the computing system detects a gesture that moves across at least two of the respective representations on the touch-sensitive secondary display. In response to detecting the gesture, the computing system changes focus on the primary display to respective search results that correspond to the at least two of the respective representations as the swipe gestures moves across the at least two of the respective representations (e.g., as the contact moves across each of the respective representations, the primary display is updated to show an appropriate search result, allowing quick and easy navigation through all of the search results with a single swipe gesture).

In some embodiments, the computing system, in accordance with a determination that a speed of the gesture is above a threshold speed, the computing system changes focus on the primary display to respective search results in addition to those that correspond to the at least two of the respective representations. For example, if the gesture travels above the threshold speed, then the computing system causes the primary display 102 to cycle through more search results in addition to those contacted during the gesture. In some embodiments, the gesture is a swipe gesture or a flick gesture.

In some embodiments (and as shown in FIG. 32C-32D), the touch-sensitive secondary display 104 includes a "Replace" affordance that, when selected, causes the computing system to replace either a currently selected search result or replace all of the search results shown on the primary display 102. In some embodiments, in response to a selection of the "Replace" affordance, then the computing system updates the touch-sensitive secondary display 104 to include additional options for selecting whether to replace a current selection or all search results (as shown in FIG. 32E).

Figure 51:
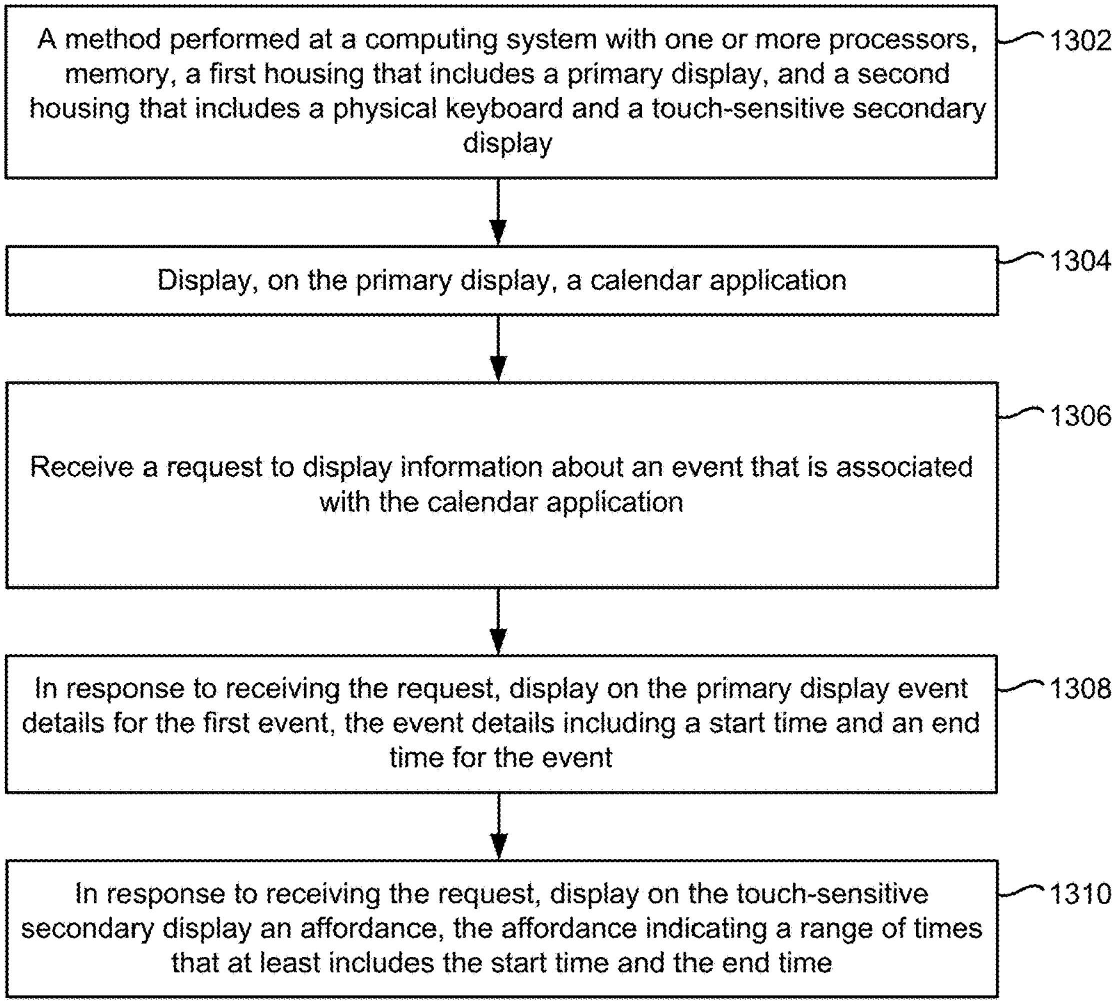
FIG. 51 is a flowchart of a method of modifying details for an event that is displayed on a primary display by providing inputs at a touch-sensitive secondary display, in accordance with some embodiments.

It should be understood that the particular order in which the operations in FIG. 50 have been described is merely exemplary and is not intended to indicate that the described order is the only order in which the operations could be performed. One of ordinary skill in the art would recognize various ways to reorder the operations described FIG. 51 is a flowchart depicting a method 1300 of a method of modifying details for an event that is displayed on a primary display by providing inputs at a touch-sensitive secondary display, in accordance with some embodiments. The method 1300 is performed (1302) at a computing system including a processor, memory, a first housing including a primary display, and a second housing at least partially containing a physical keyboard (also referred to herein as a physical input mechanism) and a touch-sensitive secondary display distinct from the primary display. Some operations in method 1300 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 (also referred to herein as a first housing 110 that includes the primary display 102) of portable computing system 100 (FIG. 1A). Alternatively, in some embodiments, the primary display is primary display 102 (FIGS. 2A-2D) which is implemented in peripheral display device 204 (also referred to herein as a first housing 204 that includes the primary display 102) (FIGS. 2A-2D). In some embodiments, the second housing is body portion 120 of portable computing system 100 (FIGS. 1A-1B), which at least partially contains the touch-sensitive secondary display (e.g., dynamic function row 104, FIGS. 1A-1B) and the physical keyboard (e.g., the set of physical keys 106, FIGS. 1A-1B). Alternatively, in some embodiments, the second housing is peripheral keyboard 206 (FIGS. 2A-2B) of desktop computing system 200, which at least partially contains the touch-sensitive secondary display (e.g., dynamic function row 104, FIGS. 2A-2B) and the physical keyboard (e.g., the set of physical keys 106, FIGS. 2A-2B). Alternatively, in some embodiments, the second housing is first peripheral input mechanism 212 (FIG. 2C) of desktop computing system 200, which at least partially contains the touch-sensitive secondary display (e.g., dynamic function row 104, FIG. 2C) and the second housing includes an input mechanism (e.g., touchpad 108, FIG. 2C) and does not include the physical keyboard.

As described below, the method 1300 (and associated interfaces) provide(s) an intuitive way to modify details for an event that is displayed on a primary display by providing inputs at a touch-sensitive secondary display. Method 1300 provides users with quick access to user interface controls (for modifying event details) at the touch-sensitive secondary display so that a user need not move their fingers from positions over keys on the physical input mechanism and can instead simply select controls on the secondary display without having to adjust finger positions to move to a trackpad (e.g., to waste time navigating through complicated menu hierarchies) and then move finger positions back to the physical input mechanism in order to continue working.

In accordance with method 1300, the computing system displays (1304), on the primary display, a calendar application (e.g., various user interfaces for the calendar application are shown in FIGS. 36A-36J). In some embodiments, the controls available in the touch-sensitive secondary display 104 change based on a current view associated with the calendar application on the primary display (e.g., depending on whether a day, week, month, or year view is being used to view the calendar application, as shown in FIGS. 36A-36D).

The computing system receives (1306) a request to display information about an event that is associated with the calendar application. In response to receiving the request, the computing system displays (1308), on the primary display, event details for the first event, the event details including a start time and an end time for the event. For example, the request corresponds to a selection of an event that is displayed within the calendar application on the primary display (as shown in FIG. 36I, event details for an event labeled "Breakfast" is presented within the calendar application on the primary display 102). As shown in FIG.

36I, the event details indicate that the "Breakfast" event is on Jun. 24, 2015 from 10-11 AM.

In response to receiving the request, the computing system displays (1310), on the touch-sensitive secondary display, an affordance, the affordance indicating a range of time that at least includes the start time and the end time (as shown in FIG. 361, the affordance is shown and the current start and end times for the event are highlighted in blue).

In some embodiments, the computing system detects, via the touch-sensitive secondary display, an input at the affordance that modifies the range of time. In some embodiments, the input that modifies the range of time is a press input that remains in contact with the affordance for more than a threshold amount of time and then moves at least a portion the affordance across the touch-sensitive secondary display (e.g., this press input may also be referred to as a drag gesture that moves the end time for the event to 3 PM, as shown in FIG. 36J).

In response to detecting the input, the computing system: (i) modifies at least one of the start time and the end time for the event in accordance with the input; and (ii) displays, on the primary display, a modified range of time for the event in accordance with the input (e.g., as shown in FIG. 36J the primary display 102 is updated to reflect that the event is now ending at 3 PM).

In some embodiments, the input that modifies the range of time is a swipe gesture that moves across the touch-sensitive secondary display and causes the computing system to select a new start time and a new end time for the event. In some embodiments, the new start and end times correspond to a time slot that is of a same duration covered by the start and end times. For example, the computing device causes the touch-sensitive secondary display 104 to jump to a next available block of time that is the same duration as the prior start and end times, e.g., if existing start/end time are 1-2 PM, then a swipe might cause the new start and end time to be selected as 2-3 PM.

In some embodiments, the computing system saves the event with the modified start and/or end time to the memory of the computing system.

Allowing a user to quickly and easily edit event details at a touch-sensitive secondary display provides the user with a convenient way to quickly edit event details without having to perform extra inputs (e.g., having to jump back and forth between using a keyboard and using a trackpad to modify the event details). Providing the user with a convenient way to quickly edit event details via the touch-sensitive secondary display (and reducing the number of inputs needed to edit the event details, thus requiring fewer interactions to achieve a desired result of editing event details) enhances the operability of the computing system and makes the user-device interface more efficient (e.g., by requiring a single input or gesture at a touch-sensitive secondary display to quickly edit certain event details) which, additionally, reduces power usage and improves battery life of the device by enabling the user to edit event details more quickly and efficiently. Additionally, by updating the primary display in response to inputs at the touch-sensitive secondary display (e.g., to show updated start and end times for an event), a user is able to sustain interactions with the device in an efficient way by providing inputs to modify the event and then immediately seeing those modifications reflected on the primary display, so that the user is then able to decide whether to provide an additional input or not.

Figure 52:
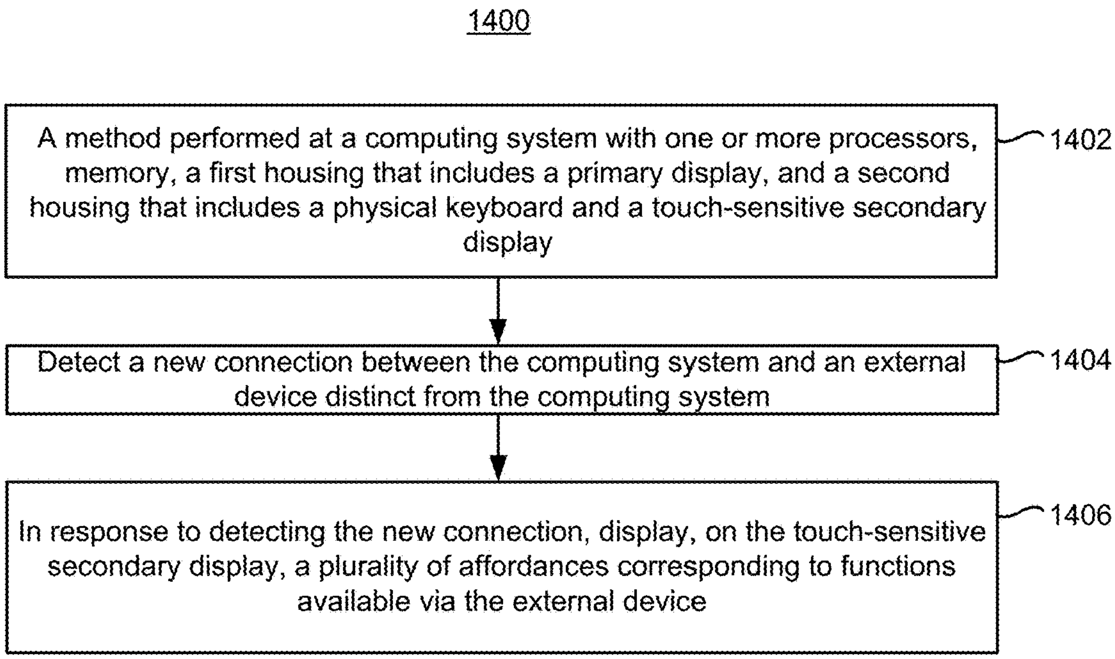
FIG. 52 is a flowchart of a method of presenting at a touch-sensitive secondary display actionable information about external devices that are connected with a computing system that includes the touch-sensitive secondary display, in accordance with some embodiments.

It should be understood that the particular order in which the operations in FIG. 51 have been described is merely exemplary and is not intended to indicate that the described order is the only order in which the operations could be performed. One of ordinary skill in the art would recognize various ways to reorder the operations described FIG. 52 is a flowchart depicting a method 1400 of a method of presenting actionable information at a touch-sensitive secondary display about external devices that are connected with a computing system that includes the touch-sensitive secondary display, in accordance with some embodiments. The method 1400 is performed (1402) at a computing system including a processor, memory, a first housing including a primary display, and a second housing at least partially containing a physical keyboard (also referred to herein as a physical input mechanism) and a touch-sensitive secondary display distinct from the primary display. Some operations in method 1400 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 (also referred to herein as a first housing 110 that includes the primary display 102) of portable computing system 100 (FIG. 1A). Alternatively, in some embodiments, the primary display is primary display 102 (FIGS. 2A-2D) which is implemented in peripheral display device 204 (also referred to herein as a first housing 204 that includes the primary display 102) (FIGS. 2A-2D). In some embodiments, the second housing is body portion 120 of portable computing system 100 (FIGS. 1A-1B), which at least partially contains the touch-sensitive secondary display (e.g., dynamic function row 104, FIGS. 1A-1B) and the physical keyboard (e.g., the set of physical keys 106, FIGS. 1A-1B). Alternatively, in some embodiments, the second housing is peripheral keyboard 206 (FIGS. 2A-2B) of desktop computing system 200, which at least partially contains the touch-sensitive secondary display (e.g., dynamic function row 104, FIGS. 2A-2B) and the physical keyboard (e.g., the set of physical keys 106, FIGS. 2A-2B). Alternatively, in some embodiments, the second housing is first peripheral input mechanism 212 (FIG. 2C) of desktop computing system 200, which at least partially contains the touch-sensitive secondary display (e.g., dynamic function row 104, FIG. 2C) and the second housing includes an input mechanism (e.g., touchpad 108, FIG. 2C) and does not include the physical keyboard.

As described below, the method 1400 (and associated interfaces) provide(s) an intuitive way to present actionable information at a touch-sensitive secondary display about external devices that are connected with a computing system that includes the touch-sensitive secondary display. Method 1400 provides users with quick access to user interface controls (for controlling external devices) at the touch-sensitive secondary display so that a user need not move their fingers from positions over keys on the physical input mechanism and can instead simply select controls on the secondary display without having to adjust finger positions to move to a trackpad (e.g., to waste time navigating through complicated menu hierarchies to located needed functions for controlling external devices) and then move finger positions back to the physical input mechanism in order to continue working.

In accordance with the method 1400, the computing system detects (1404) a new connection between the computing system and an external device distinct from the computing system (e.g., an additional monitor is connected using a physical cable, headphones are connected via Bluetooth or via headphone jack, etc.). In response to detecting the new connection, the computing system displays (1406), on the touch-sensitive secondary display, a plurality of affordances corresponding to functions available via the external device.

In this way, users are able to quickly decide what to do with newly connected external devices by simply selecting an option from the touch-sensitive secondary display. Therefore, users do not need to interrupt their current workflow in order to decide what to do with new external devices (e.g., by having to navigate to a menu and then select an option for the new external device or by having to reposition their hands in order to interact with a trackpad).

In some embodiments, the computing system receives, via the touch-sensitive secondary display, a selection of a first affordance that corresponds to a first function available via the external device. In response to receiving the selection, the computing device initiates performance of the first function (e.g., the computing device begins outputting audio to the headphones or the computing device begins displaying mirroring using the external monitor).

In some embodiments, the external device is an additional display, distinct from the primary display and the touch-sensitive secondary display. In some embodiments, the plurality of affordances include a first affordance that, when selected, causes the computing system to initiate performance of a display mirroring function via the additional display.

Allowing a user to efficiently utilize external devices via a touch-sensitive secondary display provides the user with a convenient way to access functions that may otherwise be buried in menus. Providing the user with a convenient way to access functions for external devices that may otherwise be buried in menus (and, therefore, reducing the number of inputs needed to access the functions, thus requiring fewer interactions in order to use external devices) enhances the operability of the computing system and makes the user-device interface more efficient (e.g., by requiring a single input or gesture at a touch-sensitive secondary display to perform a certain function for an external device) which, additionally, reduces power usage and improves battery life of the device by enabling the user to interact with external devices more quickly and efficiently. In this way, the touch-sensitive secondary display also conveys information about an internal state of the device (by reflecting a connecting status between the device and the external device, and allowing users to easily interact with the external device).

Figure 53:
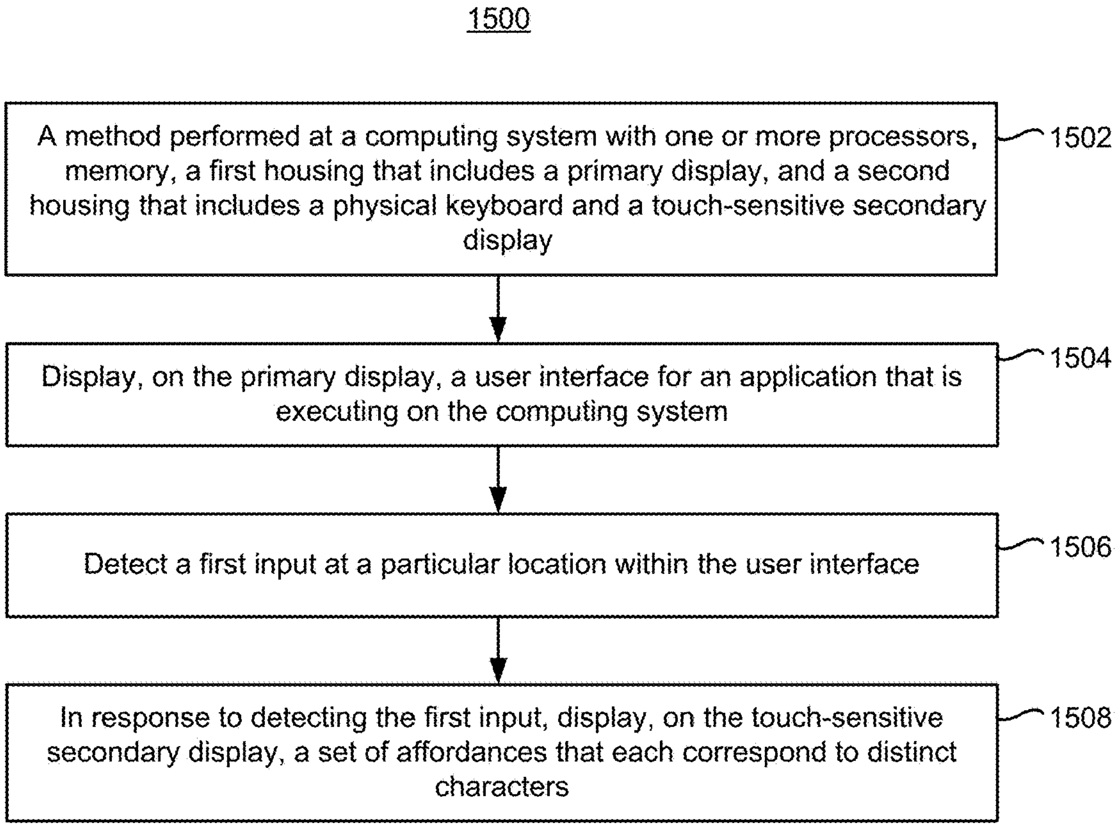
FIG. 53 is a flowchart of a method of previewing characters that are displayed within an application on a primary display by providing inputs at a touch-sensitive secondary display, in accordance with some embodiments.

It should be understood that the particular order in which the operations in FIG. 52 have been described is merely exemplary and is not intended to indicate that the described order is the only order in which the operations could be performed. One of ordinary skill in the art would recognize various ways to reorder the operations described FIG. 53 is a flowchart depicting a method 1500 of previewing characters that are displayed within an application on a primary display by providing inputs at a touch-sensitive secondary display, in accordance with some embodiments. The method 1500 is performed (1502) at a computing system including a processor, memory, a first housing including a primary display, and a second housing at least partially containing a physical keyboard (also referred to herein as a physical input mechanism) and a touch-sensitive secondary display distinct from the primary display. Some operations in method 1500 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 (also referred to herein as a first housing 110 that includes the primary display 102) of portable computing system 100 (FIG. 1A). Alternatively, in some embodiments, the primary display is primary display 102 (FIGS. 2A-2D) which is implemented in peripheral display device 204 (also referred to herein as a first housing 204 that includes the primary display 102) (FIGS. 2A-2D). In some embodiments, the second housing is body portion 120 of portable computing system 100 (FIGS. 1A-1B), which at least partially contains the touch-sensitive secondary display (e.g., dynamic function row 104, FIGS. 1A-1B) and the physical keyboard (e.g., the set of physical keys 106, FIGS. 1A-1B). Alternatively, in some embodiments, the second housing is peripheral keyboard 206 (FIGS. 2A-2B) of desktop computing system 200, which at least partially contains the touch-sensitive secondary display (e.g., dynamic function row 104, FIGS. 2A-2B) and the physical keyboard (e.g., the set of physical keys 106, FIGS. 2A-2B). Alternatively, in some embodiments, the second housing is first peripheral input mechanism 212 (FIG. 2C) of desktop computing system 200, which at least partially contains the touch-sensitive secondary display (e.g., dynamic function row 104, FIG. 2C) and the second housing includes an input mechanism (e.g., touchpad 108, FIG. 2C) and does not include the physical keyboard.

As described below, the method 1500 (and associated interfaces) provide(s) an intuitive way to preview characters that are displayed within an application on a primary display by providing inputs at a touch-sensitive secondary display. Method 1500 provides users with quick access to user interface controls (for easily previewing characters) at the touch-sensitive secondary display so that a user need not move their fingers from positions over keys on the physical input mechanism and can instead simply select controls on the secondary display without having to adjust finger positions to move to a trackpad (e.g., to waste time navigating through complicated menu hierarchies to locate desired characters) and then move finger positions back to the physical input mechanism in order to continue working.

In accordance with the method 1500, the computing system displays (1504), on the primary display, a user interface for an application that is executing on the computing system (e.g., the user interface is for a messaging application, such as that shown in FIG. 33A). The computing system detects (1506) a first input at a particular location within the user interface (e.g., input 5046-A, FIG. 32E). For example, the first input corresponds to a request to compose or edit a document, a request to begin composing or editing a text message, etc. In some embodiments, the first input causes the computing system to update a location for a displayed cursor so that it moves to the particular location at which the input was detected.

In response to detecting the first input, the computing system displays (1506), on the touch-sensitive secondary display, a set of affordances that each correspond to distinct characters (e.g., the set of affordances each correspond to individual emojis, as shown in FIG. 33A).

In some embodiments, the first input may also be provided at the touch-sensitive secondary display in order to activate display of the set of affordances in the touch-sensitive secondary display (e.g., the first input corresponds to input 5046-B, FIG. 33B).

In some embodiments, displaying the user interface for the application includes updating the touch-sensitive secondary display to include the set of affordances. For example, if the application opens and allows users to begin composing or editing a document, then no additional input is needed to cause the touch-sensitive second display to include the set of affordances.

In some embodiments, the computing system determines affordances to include in the set of affordances based at least in part on textual content included in the user interface (e.g., emojis displayed in the set of affordances change based on what has already been typed, previous emoji selected when particular words have already been typed, etc.). In some embodiments, the determining is conducted in response to detecting that a user has modified textual content included in the user interface (e.g., as user types or removes text, suggested emojis displayed in the touch-sensitive secondary display may change).

In some embodiments, the computing system detects, via the touch-sensitive secondary display, a second input (e.g., input 5047, FIG. 33C) over a first affordance that corresponds to a first character of the distinct characters (e.g., the first affordance corresponds to a first emoji character). In response to detecting the second input, the computing system displays on the primary display a preview of the first character at the particular location while the input remains in contact with the first affordance. For example, as shown in FIG. 33C, a preview of the first emoji character contacted by input 5047 is presented on the primary display 102 within the user interface for the messaging application.

In some embodiments, the computing system also detects, via the touch-sensitive secondary display, movement of the second input from the first affordance and to a second affordance that corresponds to a second character of the distinct characters (e.g., the input 5047 travels to a position on the touch-sensitive secondary display that corresponds to input 5048, FIG. 33D). In response to detecting the movement of the second input from the first affordance and to the second affordance, the computing system replaces the preview of the first character with a preview of the second character (as shown in FIG. 33D). In some embodiments, as the second input continues to move across the touch-sensitive secondary display, the computing system displays previews for respective characters of the distinct characters as corresponding affordances in the set of affordances are contacted by the second input (e.g., the preview is updated on the primary display 102 to show each of the emojis located on the touch-sensitive secondary display between the input 5047 and the input 5048).

In some embodiments, the preview of the second character remains displayed on the primary display while the second input remains in contact with the second affordance.

In some embodiments, the computing system detects liftoff of the second input while it is contact with second affordance. In response to detecting liftoff, the computing system updates the user interface to include a permanent display of (i.e., not a preview of) the second user interface element.

In some embodiments, the computing system detects an additional input (e.g., pressing down harder during the second input at the second affordance) while second input is in contact with second affordance. In response to detecting the additional input, the computing system updates the user interface to include the permanent display of (i.e., not a preview of) the second user interface element.

Allowing a user to quickly and easily preview how characters will look within an application on a primary display by providing an intuitive input at a touch-sensitive secondary display provides the user with a convenient way to quickly preview how characters will look within the application. Providing the user with a convenient way to quickly preview how characters will look within an application enhances the operability of the computing system and makes the user-device interface more efficient (e.g., by requiring a single input or gesture at a touch-sensitive secondary display to quickly preview how characters will look, thus fewer interactions are required to preview how these characters will look on the primary display) which, additionally, reduces power usage and improves battery life of the device by enabling the user to preview characters more quickly and efficiently. In this way, users are provided with efficient and sustained interactions with their devices, as the users are permitted to continue previewing characters and then continue providing inputs until a desired character is located.

In some embodiments, the functionality described above for emoji previews via swipe gestures in the touch-sensitive secondary display is also utilized to perform other modifications to text displayed within a user interface for an application. For example, the touch-sensitive secondary display may display a color picker (e.g., the row of color options shown in FIG. 15B and described below in more detail below in reference to method 1600) and as a user swipes over various color options within the color picker, selected text is dynamically modified on the primary display to provide the user with a preview of how that text will look for each of the various color options that are contacted in conjunction with the swipe gesture.

Figure 54:
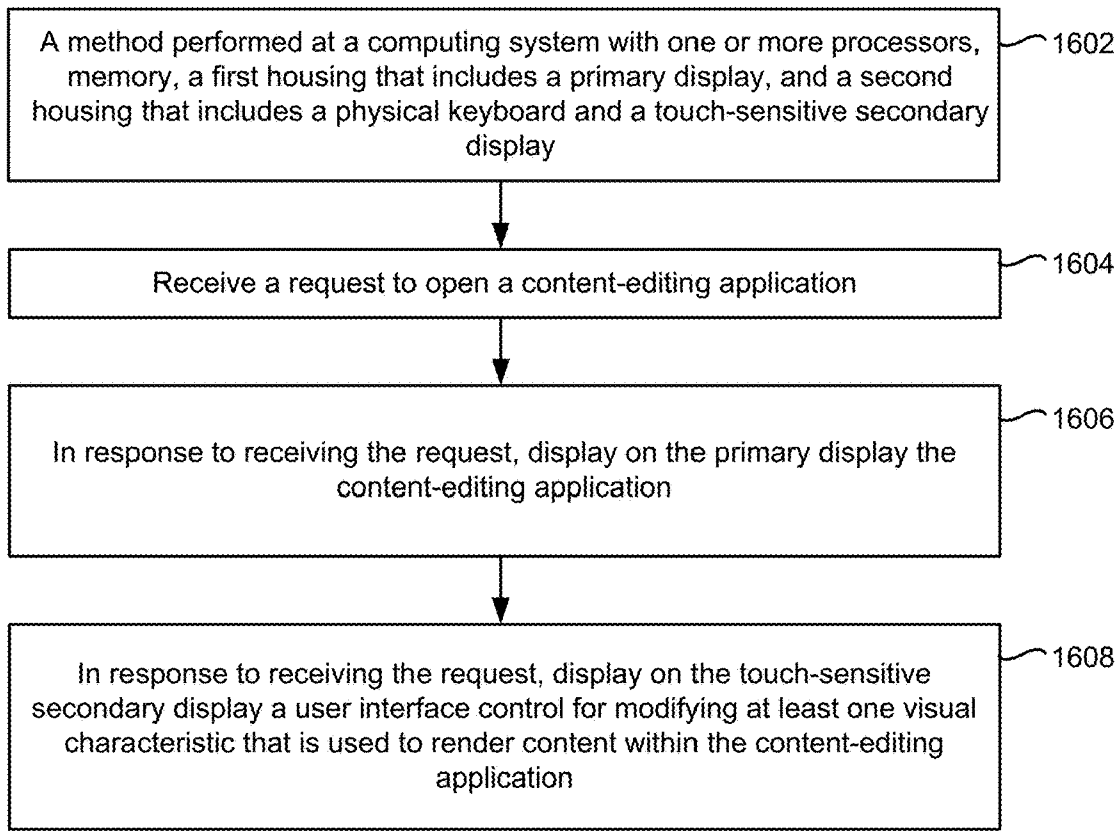
FIG. 54 is a flowchart of a method of modifying visual characteristics that are used to render content within a content-editing application on a primary display by providing inputs at a touch-sensitive secondary display, in accordance with some embodiments.

It should be understood that the particular order in which the operations in FIG. 53 have been described is merely exemplary and is not intended to indicate that the described order is the only order in which the operations could be performed. One of ordinary skill in the art would recognize various ways to reorder the operations described FIG. 54 is a flowchart depicting a method 1600 of modifying visual characteristics that are used to render content within a content-editing application on a primary display by providing inputs at a touch-sensitive secondary display, in accordance with some embodiments. The method 1600 is performed (1602) at a computing system including a processor, memory, a first housing including a primary display, and a second housing at least partially containing a physical keyboard (also referred to herein as a physical input mechanism) and a touch-sensitive secondary display distinct from the primary display. Some operations in method 1600 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 (also referred to herein as a first housing 110 that includes the primary display 102) of portable computing system 100 (FIG. 1A). Alternatively, in some embodiments, the primary display is primary display 102 (FIGS. 2A-2D) which is implemented in peripheral display device 204 (also referred to herein as a first housing 204 that includes the primary display 102) (FIGS. 2A-2D). In some embodiments, the second housing is body portion 120 of portable computing system 100 (FIGS. 1A-1B), which at least partially contains the touch-sensitive secondary display (e.g., dynamic function row 104, FIGS. 1A-1B) and the physical keyboard (e.g., the set of physical keys 106, FIGS. 1A-1B). Alternatively, in some embodiments, the second housing is peripheral keyboard 206 (FIGS. 2A-2B) of desktop computing system 200, which at least partially contains the touch-sensitive secondary display (e.g., dynamic function row 104, FIGS. 2A-2B) and the physical keyboard (e.g., the set of physical keys 106, FIGS. 2A-2B). Alternatively, in some embodiments, the second housing is first peripheral input mechanism 212 (FIG. 2C) of desktop computing system 200, which at least partially contains the touch-sensitive secondary display (e.g., dynamic function row 104, FIG. 2C) and the second housing includes an input mechanism (e.g., touchpad 108, FIG. 2C) and does not include the physical keyboard.

As described below, the method 1600 (and associated interfaces) provide(s) an intuitive way to modify visual characteristics that are used to render content within a content-editing application on a primary display by providing inputs at a touch-sensitive secondary display. Method 1600 provides users with quick access to user interface controls (for easily modifying visual characteristics used to render content on a primary display) at the touch-sensitive secondary display so that a user need not move their fingers from positions over keys on the physical input mechanism and can instead simply select controls on the secondary display without having to adjust finger positions to move to a trackpad (e.g., to waste time navigating through complicated menu hierarchies to locate desired functions that allow for modifying visual characteristics) and then move finger positions back to the physical input mechanism in order to continue working.

In accordance with method 1600, the computing system receives (1604) a request to open a content-editing application (e.g., an application for composing and editing documents, drawings, photos, etc., such as the drawing application shown on FIG. 15B). In response to receiving the request, the computing system displays (1606), on the primary display, the content-editing application (e.g., as shown in FIG. 15B).

In response to receiving the request, the computing system also displays (1608), on the touch-sensitive secondary display, a user interface control for modifying at least one visual characteristic that is used to render content within the content-editing application (e.g., a color picker that includes a sliding scale of color values used to select colors for content displayed within the content-editing application, such as the color picker 5505 shown in FIG. 15B). In some embodiments, the color picker 5505 is shown in a basic display mode (FIG. 15B) and, in other circumstances (or in response to a user input at affordance 5506), the color picker is shown in an advanced display mode (as shown in FIGS. 15E-15H). In some embodiments, the user interface control (in the basic and the advanced display modes) includes respective controls that each correspond to a respective value for the at least one visual characteristic along a sliding scale of values (e.g., each block of color shown in the color picker 5505 of FIG. 15B corresponds to a color value).

In some embodiments, the computing system detects, via the touch-sensitive secondary display 104, an input at the user interface control that selects a first value for the at least one visual characteristic (e.g., the input 5010-C selects a shade of pink). After detecting the input, the computing system renders content in the content-editing application using the first value for the at least one visual characteristic (e.g., all new content added to the content-editing application is rendered using the first value and/or currently selected content is rendered using the first value). For example, as shown in FIG. 15D the example stick figure's head is rendered using the first value.

In some embodiments, before rendering the content, the computing system receives a selection of the content (e.g., an input that selects the stick figure's head, such as input receiving via cursor 504, FIG. 15A). In some embodiments, rendering the content includes presenting a preview of the content using the first value for the at least one visual characteristic (e.g., the modifications to the stick figure's head are a preview).

In some embodiments, the sliding scale of values represents distinct shades of color. In some embodiments, the first value corresponds to a first shade of a first color and the method 1600 further includes: in accordance with a determination that the input satisfies predetermined criteria (remains in contact for more than threshold amount of time or satisfies an intensity-based threshold), modifying the user interface control on the touch-sensitive secondary display to include options for selecting other shades of the first color, distinct from the first shade of the first color. An example is shown on FIGS. 15B-15D in which input 5010 remains in contact with the touch-sensitive secondary display 104 for more than the threshold amount of time and, in response, the touch-sensitive secondary display present options for selecting other shades of the first color (e.g., other shades of pink). In some embodiments, the user need only slide the input across the other shades of the first color in order to quickly preview how those other colors will look on the primary display 102.

In some embodiments, the preview is presented while the input remains in contact with the touch-sensitive secondary display. In some embodiments, the computing system, in response to detecting liftoff of the input, ceases to display the preview and instead displays the selected content with the first value for the at least one visual characteristic (e.g., the stick figure's head is rendered in a persistent fashion, not just as a preview that lasts while the input remains in contact with the touch-sensitive secondary display 104).

In some embodiments, the computing system, in response to detecting liftoff of the input, displays the portion of the editable content with the modified value for the at least one visual characteristic.

Therefore, users are provided with an intuitive way to modify visual characteristics that are used to render content within a content-editing application on a primary display by providing inputs at a touch-sensitive secondary display. Providing users with an intuitive way to modify visual characteristics in this way enhances the operability of the computing system and makes the user-device interface more efficient (e.g., by requiring a single input or gesture at a touch-sensitive secondary display to quickly preview how certain visual characteristics will look when used to render content on the primary display) which, additionally, reduces power usage and improves battery life of the device by enabling the user to preview changes to visual characteristics in a quicker and more efficient way. In this way, users are provided with efficient and sustained interactions with their devices, as the users are permitted to continue previewing how modifications to a visual characteristic will look on the primary display and then continue providing inputs until a desired modification for the visual characteristic is located.

Figure 66:
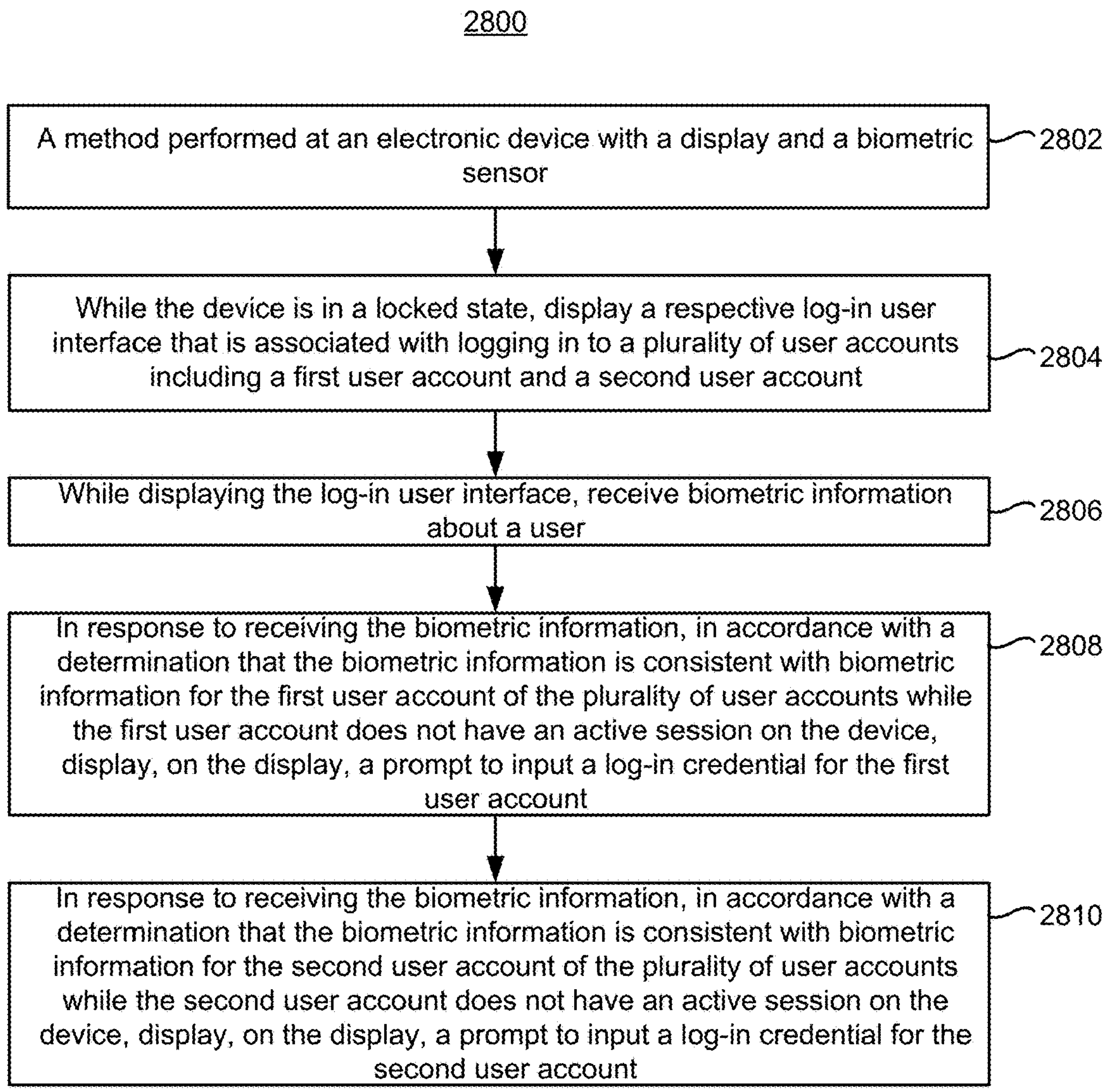
FIG. 66 is a flowchart of a method of using a biometric sensor to enable efficient logins, in accordance with some embodiments.

It should be understood that the particular order in which the operations in FIG. 54 have been described is merely exemplary and is not intended to indicate that the described order is the only order in which the operations could be performed. One of ordinary skill in the art would recognize various ways to reorder the operations described FIG. 66 is a flowchart depicting a method 2800 of using a biometric sensor to enable efficient logins, in accordance with some embodiments. The method 2800 is performed (2802) at a computing system including a processor, memory, a first housing including a primary display, and a second housing at least partially containing a physical keyboard (also referred to herein as a physical input mechanism) and a touch-sensitive secondary display distinct from the primary display. Some operations in method 2800 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 (also referred to herein as a first housing 110 that includes the primary display 102) of portable computing system 100 (FIG. 1A). Alternatively, in some embodiments, the primary display is primary display 102 (FIGS. 2A-2D) which is implemented in peripheral display device 204 (also referred to herein as a first housing 204 that includes the primary display 102) (FIGS. 2A-2D). In some embodiments, the second housing is body portion 120 of portable computing system 100 (FIGS. 1A-1B), which at least partially contains the touch-sensitive secondary display (e.g., dynamic function row 104, FIGS. 1A-1B) and the physical keyboard (e.g., the set of physical keys 106, FIGS. 1A-1B). Alternatively, in some embodiments, the second housing is peripheral keyboard 206 (FIGS. 2A-2B) of desktop computing system 200, which at least partially contains the touch-sensitive secondary display (e.g., dynamic function row 104, FIGS. 2A-2B) and the physical keyboard (e.g., the set of physical keys 106, FIGS. 2A-2B). Alternatively, in some embodiments, the second housing is first peripheral input mechanism 212 (FIG. 2C) of desktop computing system 200, which at least partially contains the touch-sensitive secondary display (e.g., dynamic function row 104, FIG. 2C) and the second housing includes an input mechanism (e.g., touchpad 108, FIG. 2C) and does not include the physical keyboard.

As described below, the method 2800 (and associated interfaces) provide(s) an intuitive way to use a biometric sensor to enable efficient logins (logins that require fewer inputs, in some instances only a single input is needed to complete a login). Method 2800 provides users with the ability to login to their devices quickly so that a user need not always type their password or have to navigate to a user-specific login page (instead the user simply provides biometric information and, based on that biometric information, the device identifies the user and allows for fast logins).

In accordance with method 2800, the electronic device, while the device is in a locked state (e.g., the locked state is a state in which one or more features of the device are disabled and access to sensitive information or the ability to change or delete information is prohibited), displays (2804) a respective log-in user interface that is associated with logging in to a plurality of user accounts including a first user account and a second user account. An example log-in user interface is shown on the primary display 102 of FIG. 26C.

In some embodiments, the log-in user interface includes instructions to provide biometric information (e.g., as shown in FIG. 26C, the log-in user interface includes the instructions "Touch ID to login or switch users"). In some embodiments, the device includes a secondary display that is adjacent to the biometric sensor (e.g., the touch-sensitive secondary display 104 described herein); and the method 2800 includes, while displaying the log-in user interface on the display of the device, displaying instructions at the secondary display to provide biometric information via the biometric sensor (e.g., the secondary display 104 includes the text "Touch ID to Login.") In some embodiments, the biometric sensor is a fingerprint sensor. In some embodiments, the biometric sensor is a facial detection sensor. In some embodiments, the biometric sensor is a retina scanner.

While displaying the log-in user interface, the electronic device receives (2806) biometric information about a user. For example, a user provides a fingerprint at a predefined area of the electronic device (e.g., at a biometric sensor that is integrated with the electronic device, such as a biometric sensor located above a physical keyboard and adjacent to a secondary display). In some embodiments, the biometric sensor is integrated with the secondary display.

In response to receiving the biometric information, the electronic device determines whether the biometric information is consistent with biometric information for the first user account or the second user account of the plurality of user accounts while the first and second user accounts to not have active sessions on the device (e.g., the device has just booted up or the users have not yet logged in to the device). For example, as shown in FIG. 26C, users "Johnny Appleseed" and "Sally" have not yet logged in, and user "Josh Olson" has logged in (as indicated by the orange-highlighted checkmark near the name Josh Olson on the displayed log-in user interface).

In accordance with a determination that the biometric information is consistent with biometric information for the first user account of the plurality of user accounts while the first user account does not have an active session on the device, the device displays (2808), on the display, a prompt to input a log-in credential for the first user account. For example, the prompt includes the text "Touch ID disabled for initial login, please enter your password" (as shown in FIG. 26A after receiving biometric information from the user "Johnny Appleseed").

In accordance with a determination that the biometric information is consistent with biometric information for the second user account of the plurality of user accounts while the second user account does not have an active session on the device, the device displays (2810), on the display, a prompt to input a log-in credential for the second user account. For example, the prompt is similar to the prompt shown in FIG. 26A, but is displayed for the second user account (e.g., for the user "Sally" instead of for "Johnny Appleseed" in response to receiving biometric information from the user "Sally").

In this way, users are provided with an intuitive way to access a user-specific login page by providing a single input at a biometric sensor. Providing users with an intuitive way to access a user-specific login page in this way enhances the operability of the computing system and makes the user-device interface more efficient (e.g., by requiring a single input or gesture at the biometric sensor to quickly access an appropriate, user-specific login page, thus fewer interactions are required to reach a user-specific login page) which, additionally, reduces power usage and improves battery life of the device by enabling the user to access the login page via single input.

In some embodiments, the electronic device, in response to receiving the biometric information: in accordance with a determination that the biometric information is consistent with biometric information for the first user account of the plurality of user accounts while the first user account has an active session on the device, the device unlocks with respect to the first user account (e.g., without requiring additional user input, such as without requiring the first user account to enter a password). For example, the first user account corresponds to the user "Josh Olson" shown in FIG. 26C as having an active session on the device.

In some embodiments, in response to receiving the biometric information: in accordance with a determination that the biometric information is consistent with biometric information for the second user account of the plurality of user accounts while the second user account has an active session on the device, the device unlocks with respect to the second user account (e.g., without requiring additional user input). For example, one of the other users, such as "Sally" has already logged in and has an active session on the device, and thus the device unlocks immediately instead of requiring additional input.

In some embodiments, in response to receiving the biometric information: in accordance with a determination that the biometric information is not consistent with biometric information for the any user account of the device, maintaining the device in the locked state. For example, if some other user who does not have a user account on the device attempts to provide biometric information (such as a fingerprint), the device stays in the locked state (e.g., the device continues to display the log-in user interface and may display a message indicating the provided biometric information is not recognized).

In some embodiments, the log-in user interface includes a plurality of selectable affordances that correspond to the plurality of user accounts (as shown in FIG. 26C, selectable affordances are shown for each of the users).

In some embodiments, the device, while displaying the prompt to input a log-in credential for the first user account (e.g., the prompt shown in FIG. 26A), receives entry of a log-in credential (e.g., a password is entered at the "Enter Password" input box); and, in response to receiving entry of the log-in credential, the device determines whether the log-in credential is consistent with a log-in credential for the first user account.

In accordance with a determination that the log-in credential is consistent with a log-in credential for the first user account, the device is unlocked with respect to the first user account. In accordance with a determination that the log-in credential is not consistent with a log-in credential for the first user account, the device remains in the locked state.

In some embodiments, while displaying the prompt to input a log-in credential for the second user account, the device receives entry of a log-in credential (e.g., a password entered by the second user at the "Enter Password" input box of FIG. 26A). In response to receiving entry of the log-in credential, the device determines whether the log-in credential is consistent with a log-in credential for the second user account.

In accordance with a determination that the log-in credential is consistent with a log-in credential for the second user account, the device is unlocked with respect to the second user account; and in accordance with a determination that the log-in credential is not consistent with a log-in credential for the second user account, the device remains in the locked state.

It should be understood that the particular order in which the operations in FIG. 66 have been described is merely exemplary and is not intended to indicate that the described order is the only order in which the operations could be performed. One of ordinary skill in the art would recognize various ways to reorder the operations described.

Figure 67:
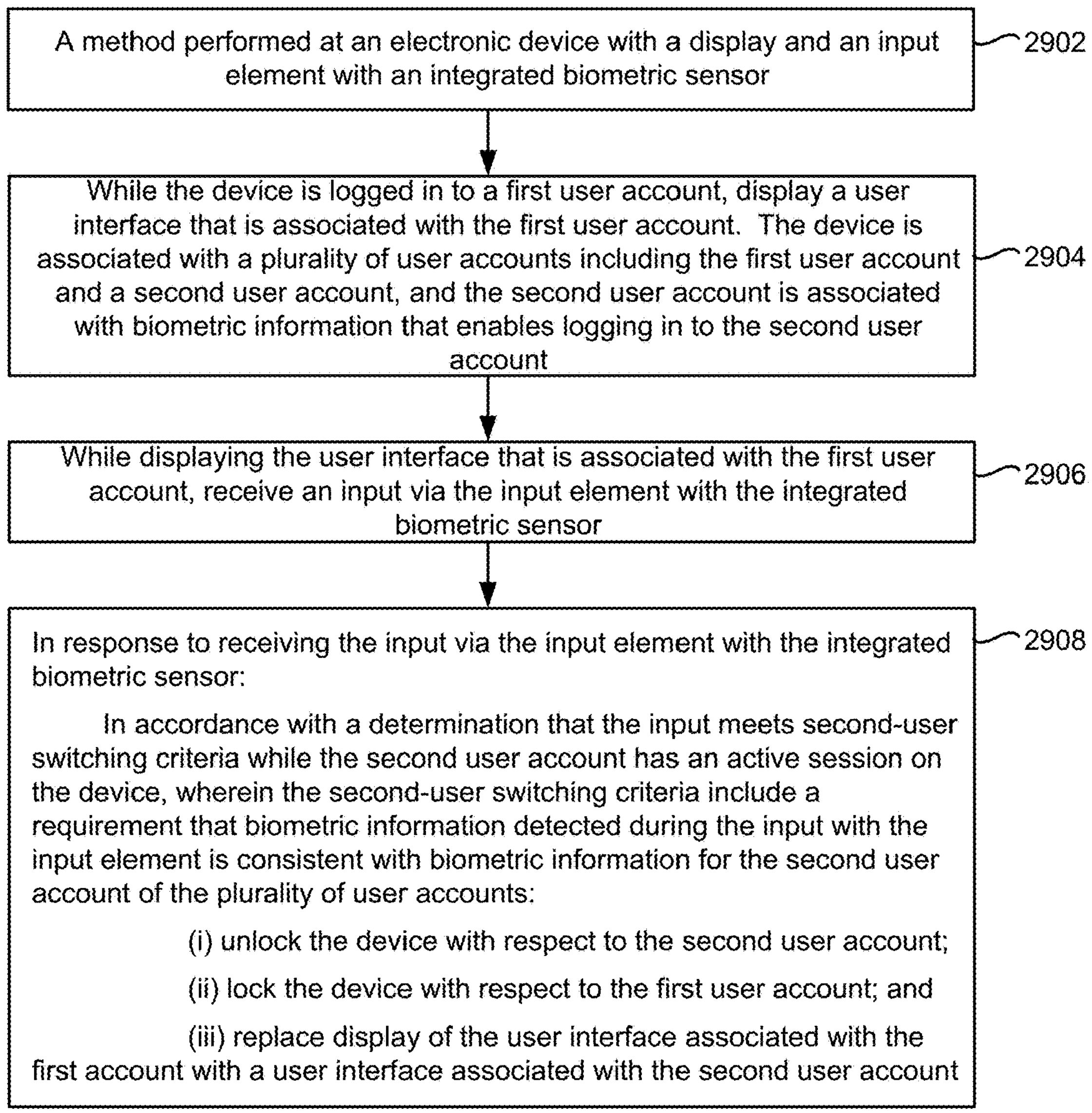
FIG. 67 is a flowchart of a method of using a biometric sensor to enable efficient fast switching between logged in user accounts, in accordance with some embodiments.

FIG. 67 is a flowchart depicting a method 2900 of using a biometric sensor to enable efficient fast switching between logged in user accounts, in accordance with some embodiments. The method 2900 is performed (2902) at a computing system including a processor, memory, a first housing including a primary display, and a second housing at least partially containing a physical keyboard (also referred to herein as a physical input mechanism) and a touch-sensitive secondary display distinct from the primary display. Some operations in method 2900 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 (also referred to herein as a first housing 110 that includes the primary display 102) of portable computing system 100 (FIG. 1A). Alternatively, in some embodiments, the primary display is primary display 102 (FIGS. 2A-2D) which is implemented in peripheral display device 204 (also referred to herein as a first housing 204 that includes the primary display 102) (FIGS. 2A-2D). In some embodiments, the second housing is body portion 120 of portable computing system 100 (FIGS. 1A-1B), which at least partially contains the touch-sensitive secondary display (e.g., dynamic function row 104, FIGS. 1A-1B) and the physical keyboard (e.g., the set of physical keys 106, FIGS. 1A-1B). Alternatively, in some embodiments, the second housing is peripheral keyboard 206 (FIGS. 2A-2B) of desktop computing system 200, which at least partially contains the touch-sensitive secondary display (e.g., dynamic function row 104, FIGS. 2A-2B) and the physical keyboard (e.g., the set of physical keys 106, FIGS. 2A-2B). Alternatively, in some embodiments, the second housing is first peripheral input mechanism 212 (FIG. 2C) of desktop computing system 200, which at least partially contains the touch-sensitive secondary display (e.g., dynamic function row 104, FIG. 2C) and the second housing includes an input mechanism (e.g., touchpad 108, FIG. 2C) and does not include the physical keyboard.

As described below, the method 2900 (and associated interfaces) provide(s) an intuitive way to use a biometric sensor to enable efficient fast switching between logged in user accounts. Method 2900 provides users with controls and guidance that allows the users to switch into their user accounts by simply providing biometric information (and without having to provide a password or navigate to a user interface for switching users).

In accordance with method 2900, the electronic device, while the device is logged in to a first user account, displays (2904) a user interface that is associated with the first user account (e.g., a home screen or desktop for the first user account). The device is associated with a plurality of user accounts including the first user account and a second user account, and the second user account is associated with biometric information that enables logging in to the second user account.

While displaying the user interface that is associated with the first user account, the device receives (2906) an input via the input element with the integrated biometric sensor. For example, a second user provides the input at the integrated biometric sensor while the first user account is currently logged in.

In response to receiving the input via the input element with the integrated biometric sensor, the device determines whether the input meets second-user switching criteria while the second user account has an active session on the device.

In some embodiments, the second-user switching criteria include a requirement that biometric information detected during the input with the input element is consistent with biometric information for the second user account of the plurality of user accounts.

In accordance with a determination that the input meets the second-user switching criteria while the second user account has an active session on the device, the device (2908): (i) unlocks the device with respect to the second user account; (ii) locks the device with respect to the first user account (e.g., logs off the first user account); and (ii) replaces display of the user interface associated with the first account with a user interface associated with the second user account. In this way, the second user is able to gain access to active session on the device by simply providing a single biometric input.

Therefore, users are provided with an intuitive way to access an active, user-specific session on an electronic device by providing a single input at a biometric sensor. Providing users with an intuitive way to access an active, user-specific session in this way enhances the operability of the electronic device and makes the user-device interface more efficient (e.g., by requiring a single input or gesture at the biometric sensor to gain immediate access to the active session, therefore requiring fewer interactions to switch user accounts and login to the device) which, additionally, reduces power usage and improves battery life of the device by enabling the user to access the active session via single input.

In some embodiments, in response to receiving the biometric information: in accordance with a determination that the input meets second-user switching criteria while the second user account does not have an active session on the device, the second-user switching criteria including a requirement that biometric information detected during the input with the input element is consistent with biometric information for the second user account of the plurality of user accounts, the device displays, on the display, a prompt to input a log-in credential for the second user account (e.g., an example prompt is shown on FIG. 26A, with the text of "Touch ID disabled for initial login, please enter your password).

In some embodiments, in response to receiving the biometric information: in accordance with a determination that the input meets third-user switching criteria while a third user account has an active session on the device, the third-user switching criteria including a requirement that biometric information detected during the input with the input element is consistent with biometric information for the third user account of the plurality of user accounts, the device: (i) unlocks the device with respect to the third user account; (ii) locks the device with respect to the first user account; and (iii) replaces display of the user interface associated with the first account with a user interface associated with the third user account. In this way, the third user is able to gain access to active session on the device by simply providing a single biometric input.

In some embodiments, in response to receiving the biometric information: in accordance with a determination that the input meets third-user switching criteria while the third user account does not have an active session on the device, the third-user switching criteria including a requirement that biometric information detected during the input with the input element is consistent with biometric information for the third user account of the plurality of user accounts, displaying, on the display, a prompt to input a log-in credential for the third user account (e.g., an example prompt is shown on FIG. 26A, with the text of "Touch ID disabled for initial login, please enter your password).

In some embodiments, the first user is able to quickly and easily log back in to the device using by providing a biometric input. For example, after replacing display of the user interface associated with the first account with a user interface associated with the second user account (or the third user account) and while displaying the user interface that is associated with the second user account (or the third user account), the device receives a second input via the input element with the integrated biometric sensor. In response to receiving the second input via the input element with the integrated biometric sensor: in accordance with a determination that the second input meets first-user switching criteria while the first user account has an active session on the device, the first-user switching criteria including a requirement that biometric information detected during the input with the input element is consistent with biometric information for the first user account of the plurality of user accounts, the device: (i) unlocks the device with respect to the first user account; (ii) locks the device with respect to the second user account; and (iii) replaces display of the user interface associated with the second account with a user interface associated with the first user account. In this way, the first user is able to provide a single biometric input in order to immediately resume use of the electronic device (and without have to enter a password or provide any other inputs to resume user of the device).

In some embodiments, the input element is a button (e.g., a button that is included on the touch-sensitive secondary display 104 or that is located adjacent to the secondary display 104) and detecting the input via the input element with the integrated biometric sensor includes detecting a press input via the button. For example, the input is a push input of a mechanical button, or a press input with an intensity/pressure above a predefined intensity/pressure threshold. In some embodiments, if biometric information is detected without detecting the press input, the device forgoes switching users, even if the received biometric information is consistent with a user account that is not the currently logged in user account.

In some embodiments, the second-user switching criteria include a criterion that the press input lasts for less than a first threshold amount of time.

In some embodiments, in response to receiving the press input via the input element with the integrated biometric sensor in accordance with a determination that the press input with the button lasts longer than the first threshold amount of time, the device enters into a low power mode (e.g., the lower power mode corresponds to a suspended state in which the display is turned off).

In some embodiments, in response to receiving the input via the input element with the integrated biometric sensor: in accordance with a determination that the press input with the button lasts longer than the first threshold amount of time and less than a second threshold amount of time, the device enters into a low power mode. (e.g., the low power mode corresponds to a sleep/suspended state in which the display is turned off and the low power mode is entered upon an end of the press input). In accordance with a determination that the press input with the button lasts longer than the second threshold amount of time, the device displays a menu of options for changing a state of the device (e.g., the menu options include shut down, restart, sleep/suspend options that, when selected cause the device to shut down, restart, or sleep/suspend the device, respectively).

In some embodiments, in response to receiving the input via the input element with the integrated biometric sensor: in accordance with a determination that the press input with the button lasts longer than a third threshold amount of time that is greater than the second threshold amount of time, the device is restarted.

In some embodiments, when the user who is not currently signed in provides biometric information (e.g., places their finger on a biometric sensor of the device, such as a touch ID button that may be integrated with the touch-sensitive secondary display 104), the user is identified by the device based on stored biometric information, if any is available, for that user (e.g., stored fingerprint information previously received via the biometric or Touch ID sensor). In some embodiments, the user is identified before the user presses the button). In accordance with a determination that the biometric information provided by the user is valid (e.g., that it matches stored biometric information for that user), then the touch-sensitive secondary display 104 is updated to include a prompt instructing the user to "click to switch to [User Name]→". In some embodiments, the arrow in this prompt points the user towards a location of the device where the biometric sensor is located.

In some embodiments, the prompt includes text that is specific to the user (e.g., the [User Name] text is replaced with a user name for the user). For example, the prompt may include the text "click to switch to Sally→" if Sally's fingerprint is detected, and "click to switch to Johnny→" if Johnny's fingerprint is detected.

In some embodiments, if the biometric information provided by the user is associated with a currently signed in account or if the biometric information is not recognized (i.e., is not associated with a user account of the device), then no prompt is displayed on the touch-sensitive secondary display 104.

Figure 68:
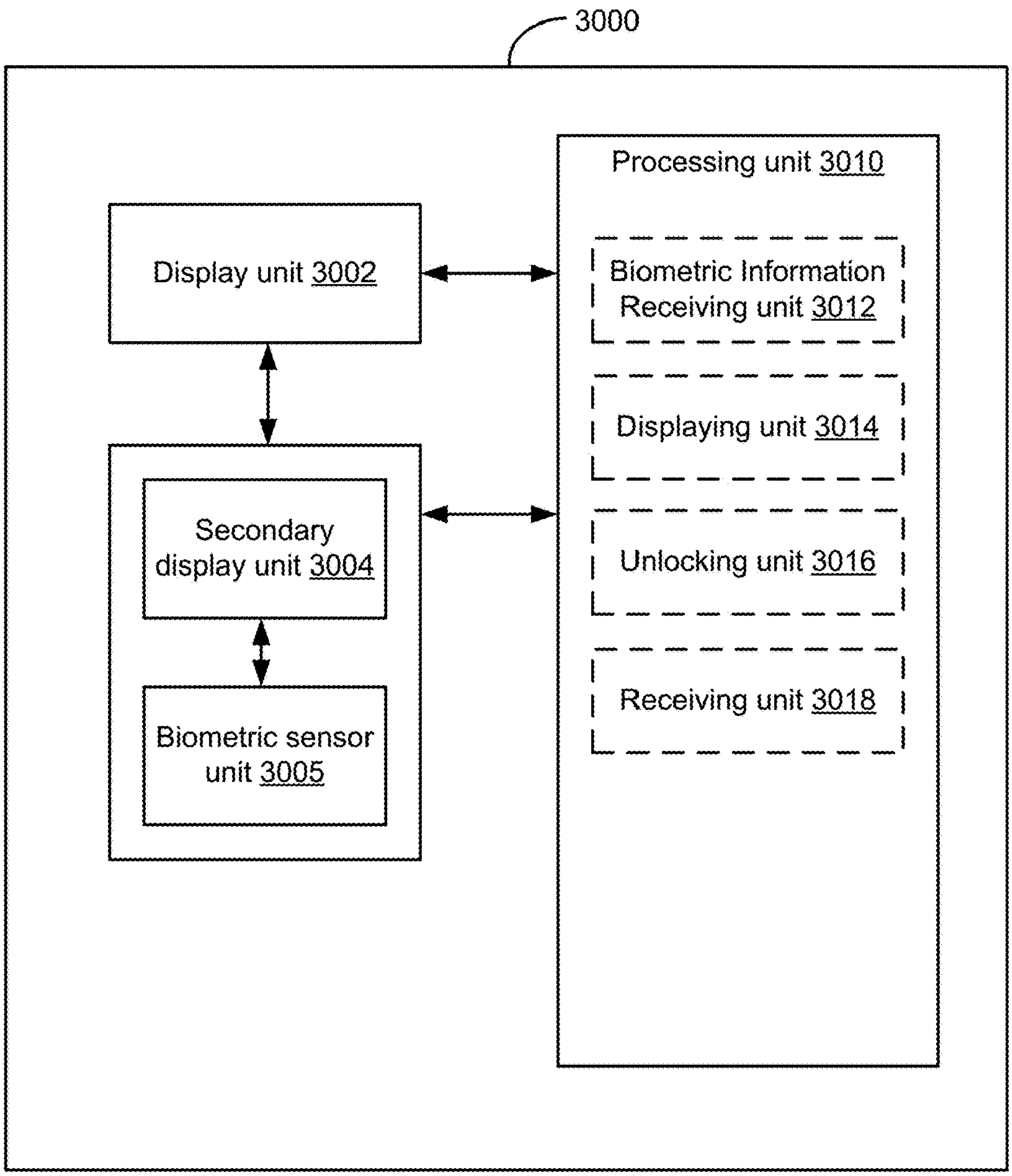
FIGS. 68-69 illustrate functional block diagrams of an electronic device, in accordance with some embodiments.

It should be understood that the particular order in which the operations in FIG. 68 have been described is merely exemplary and is not intended to indicate that the described order is the only order in which the operations could be performed. One of ordinary skill in the art would recognize various ways to reorder the operations described.

Figure 55:
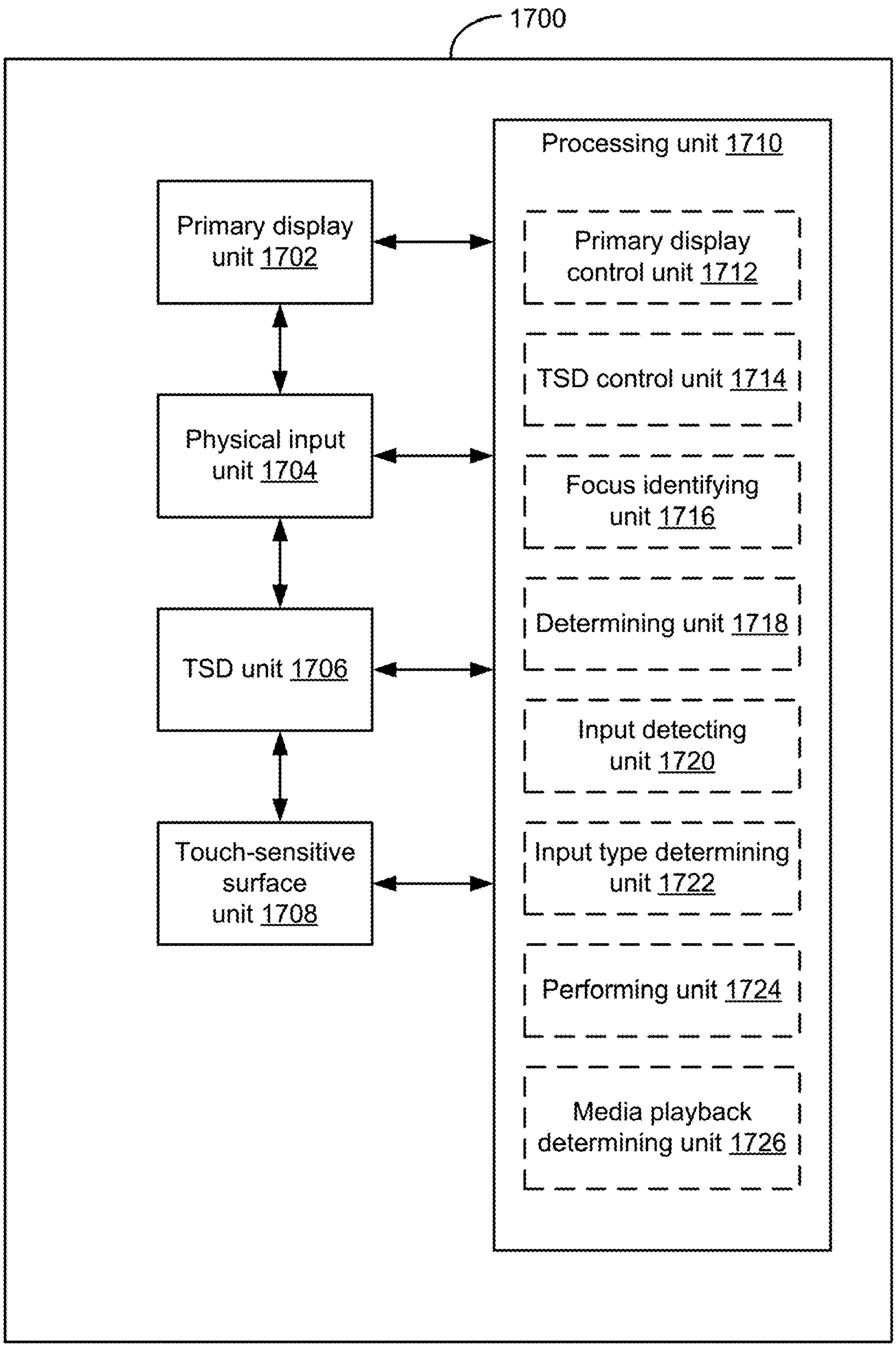
FIGS. 55-65 illustrate functional block diagrams of an electronic device, in accordance with some embodiments.

In accordance with some embodiments, FIG. 55 shows a functional block diagram of an electronic device 1700 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 55 are, optionally, combined or separated into sub-blocks to implement the principles of the various described embodiments. Therefore, the description herein optionally supports any possible combination or separation or further definition of the functional blocks described herein. For ease of discussion, the electronic device 1700 is implemented as portable computing system 100 (FIGS. 1A-1B) whose components correspond to electronic device 300 (FIG. 3). One of skill in the art will appreciate how the electronic device 1700 may also be implemented within desktop computing system 200 (FIGS. 2A-2D).

As shown in FIG. 55, the electronic device 1700 includes a primary display unit 1702 configured to display information (e.g., primary display 102, FIGS. 1A and 2A-2D), a physical input unit 1704 configured to receive user inputs, a touch screen display (TSD) unit 1706 configured to display information (sometimes also herein called "a touch screen display" or a "touch screen") (e.g., dynamic function row 104, FIGS. 1A-1B and 2A-2D), a touch-sensitive surface unit 1708 configured to receive contacts on the touch screen display unit 1706 with one or more sensors, and a processing unit 1710 coupled to the primary display unit 1702, the physical input unit 1704, the touch screen display unit 1706, and the touch-sensitive surface unit 1708. In some embodiments, the processing unit 1710 includes: a primary display control unit 1712, a touch screen display (TSD) control unit 1714, a focus identifying unit 1716, a determining unit 1718, an input detecting unit 1720, an input type determining unit 1722, a performing unit 1724, and a media playback determining unit 1726.

The processing unit 1710 is configured to: cause display of (e.g., with the primary display control unit 1712) a first user interface on the primary display unit 1702, the first user interface comprising one or more user interface elements; identify (e.g., with the focus identifying unit 1716) an active user interface element among the one or more user interface elements that is in focus on the primary display unit 1702; and determine (e.g., with the determining unit 1718) whether the active user interface element that is in focus on the primary display unit 1702 is associated with an application executed by the processing unit 1710. In accordance with a determination that the active user interface element that is in focus on the primary display unit 1702 is associated with the application, processing unit 1710 is configured to cause display of (e.g., with the touch screen display control unit 1714) a second user interface on the touch screen display unit 1706, including: (A) a first set of one or more affordances corresponding to the application; and (B) at least one system-level affordance corresponding to at least one system-level functionality.

In some embodiments, the electronic device further includes: (i) a primary computing unit comprising the primary display unit 1702, the processing unit 1710, and a first communication circuitry unit; and (ii) an integrated input unit comprising the touch screen display unit 1706, the touch-sensitive surface unit 1708, the physical input unit 1704, and a second communication circuitry unit for communicating with the first communication circuitry unit, where the integrated input device is distinct and separate from the primary computing unit.

In some embodiments, the physical input unit 1704 comprises a plurality of physical keys.

In some embodiments, the physical input unit 1704 comprises a touchpad.

In some embodiments, the processing unit 1710 is configured to execute the application in the foreground of the first user interface.

In some embodiments, the least one system-level affordance is configured upon selection to cause display of a plurality of system-level affordances corresponding to system-level functionalities on the touch screen display unit 1706.

In some embodiments, the least one system-level affordance corresponds to one of a power control or escape control.

In some embodiments, at least one of the affordances displayed on the touch screen display unit 1706 within the second user interface is a multi-function affordance.

In some embodiments, the processing unit 1710 is configured to: detect (e.g., with the input detecting unit 1720) a user touch input selecting the multi-function affordance on the touch-sensitive surface unit 1708; in accordance with a determination (e.g., with the input type determining unit 1722) that the user touch input corresponds to a first type, perform (e.g., with the performing unit 1724) a first function associated with the multi-function affordance; and, in accordance with a determination (e.g., with the input type determining unit 1722) that the user touch input corresponds to a second type distinct from the first type, perform (e.g., with the performing unit 1724) a second function associated with the multi-function affordance.

In some embodiments, in accordance with a determination that the active user interface element is not associated with the application, the processing unit 1710 is configured to cause display of (e.g., with the touch screen display control unit 1714) a third user interface on the touch screen display unit 1706, including: (C) a second set of one or more affordances corresponding to operating system controls of the electronic device 1700, where the second set of one or more affordances are distinct from the first set of one or more affordances.

In some embodiments, the second set of one or more affordances is an expanded set of operating system controls that includes (B) the at least one system-level affordance corresponding to the at least one system-level functionality.

In some embodiments, the processing unit 1710 is configured to: detect (e.g., with the input detecting unit 1720) a user touch input selecting one of the first set of affordances on the touch-sensitive surface unit 1708; and, in response to detecting the user touch input: cause display of (e.g., with the touch screen display control unit 1714) a different set of affordances corresponding to functionalities of the application on the touch screen display unit 1706; and maintain display of (e.g., with the touch screen display control unit 1714) the at least one system-level affordance on the touch screen display unit 1706.

In some embodiments, the processing unit 1710 is configured to: detect (e.g., with the input detecting unit 1720) a subsequent user touch input selecting the at least one system-level affordance on the touch-sensitive surface unit 1708; and, in response to detecting the subsequent user touch input, cause display of (e.g., with the touch screen display control unit 1714) a plurality of system-level affordances corresponding to system-level functionalities and at least one application-level affordance corresponding to the application on the touch screen display unit 1706.

In some embodiments, the processing unit 1710 is configured to: identify (e.g., with the focus identifying unit 1716) a second active user interface element that is in focus on the primary display unit 1702 after displaying the second user interface on the touch screen display unit 1706; and determine (e.g., with the determining unit 1718) whether the second active user interface element corresponds to a different application executed by the processing unit 1710. In accordance with a determination that the second active user interface element corresponds to the different application, the processing unit 1710 is configured to cause display of (e.g., with the touch screen display control unit 1714) a fourth user interface on the touch screen display unit 1706, including: (D) a third set of one or more affordances corresponding to the different application; and (E) the at least one system-level affordance corresponding to the at least one system-level functionality.

In some embodiments, the processing unit 1710 is configured to: determine (e.g., with the media playback determining unit 1726) whether a media item is being played by the electronic device 1700 after identifying (e.g., with the focus identifying unit 1716) that the second active user interface element, where the media item is not associated with the different application; and, in accordance with a determination (e.g., with the media playback determining unit 1726) that media item is being played by the electronic device 1700, cause display of (e.g., with the touch screen display control unit 1714) at least one persistent affordance on the fourth user interface for controlling the media item on the touch screen display unit 1706.

In some embodiments, the at least one persistent affordance displays feedback that corresponds to the media item.

In some embodiments, the processing unit 1710 is configured to: detect (e.g., with the input detecting unit 1720) a user input corresponding to an override key; and, in response to detecting the user input: cease to display (e.g., with the touch screen display control unit 1714) at least the first set of one or more affordances of the second user interface on the touch screen display unit 1706; and cause display of (e.g., with the touch screen display control unit 1714) a first set of default function keys on the touch screen display unit 1706.

In some embodiments, the processing unit 1710 is configured to: detect (e.g., with the input detecting unit 1720) a gesture on the touch-sensitive surface unit 1708 in a direction that is substantially parallel to a major axis of the touch screen display unit 1706 after displaying the first set of default function keys on the touch screen display unit 1706; and, in response to detecting the substantially horizontal swipe gesture, cause display of (e.g., with the touch screen display control unit 1714) a second set of default function keys with at least one distinct function key on the touch screen display unit 1706.

The operations in the information processing methods described above are, optionally implemented by running one or more functional modules in information processing apparatus such as general purpose processors (e.g., as described above with respect to FIGS. 3A and 4) or application specific chips.

The operations described above with reference to FIGS. 44A-44D are, optionally, implemented by components depicted in FIGS. 3A-3B or FIG. 55. For example, detection operations 626 and 628 are, optionally, implemented by event sorter 370, event recognizer 380, and event handler 190. Event monitor 371 in event sorter 370 detects a contact on display system 312 when implemented as a touch-sensitive display, and event dispatcher module 374 delivers the event information to application 340-1. A respective event recognizer 380 of application 340-1 compares the event information to respective event definitions 386, and determines whether a first contact at a first location on the touch-sensitive display corresponds to a predefined event or sub-event. When a respective predefined event or sub-event is detected, event recognizer 380 activates an event handler 390 associated with the detection of the event or sub-event. Event handler 390 optionally uses or calls data updater 376 or object updater 377 to update the application internal state 392. In some embodiments, event handler 390 accesses a respective GUI updater 378 to update what is displayed by the application. Similarly, it would be clear to a person having ordinary skill in the art how other processes can be implemented based on the components depicted in FIGS. 3A-3B.

Figure 56:
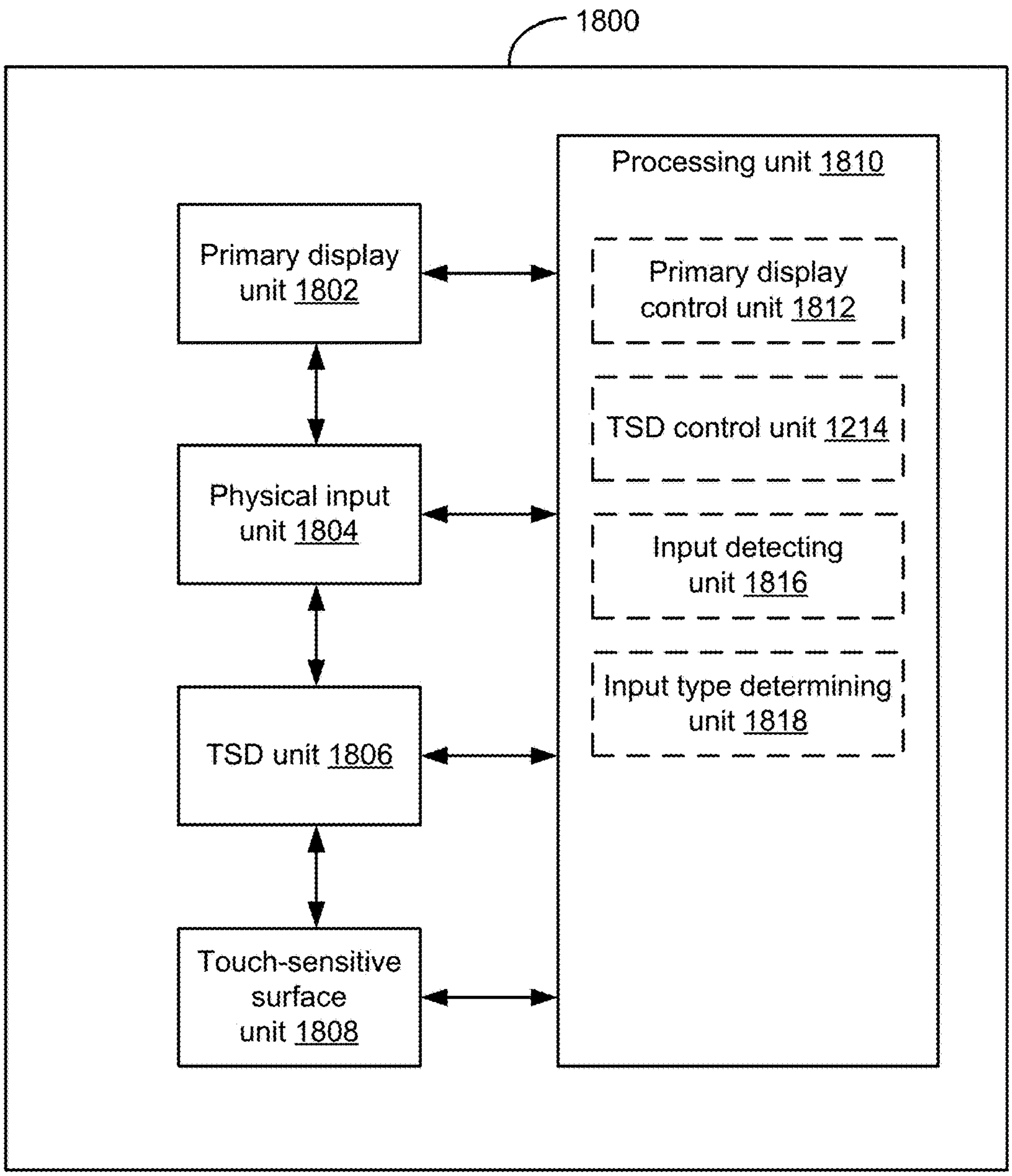

In accordance with some embodiments, FIG. 56 shows a functional block diagram of an electronic device 1800 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 56 are, optionally, combined or separated into sub-blocks to implement the principles of the various described embodiments. Therefore, the description herein optionally supports any possible combination or separation or further definition of the functional blocks described herein. For ease of discussion, the electronic device 1800 is implemented as portable computing system 100 (FIGS. 1A-1B) whose components correspond to electronic device 300 (FIG. 3). One of skill in the art will appreciate how the electronic device 1800 may also be implemented within desktop computing system 200 (FIGS. 2A-2D).

As shown in FIG. 56, the electronic device 1800 includes a primary display unit 1802 configured to display information (e.g., primary display 102, FIGS. 1A and 2A-2D), a physical input unit 1804 configured to receive user inputs, a touch screen display (TSD) unit 1806 configured to display information (sometimes also herein called "a touch screen display" or a "touch screen") (e.g., dynamic function row 104, FIGS. 1A-1B and 2A-2D), a touch-sensitive surface unit 1808 configured to receive contacts on the touch screen display unit 1806 with one or more sensors, and a processing unit 1810 coupled to the primary display unit 1802, the physical input unit 1804, the touch screen display unit 1806, and the touch-sensitive surface unit 1808. In some embodiments, the processing unit 1810 includes: a primary display control unit 1812, a touch screen display (TSD) control unit 1814, an input detecting unit 1816, and an input type determining unit 1818.

The processing unit 1810 is configured to: cause display of (e.g., with the primary display control unit 1812) a first user interface for an application executed by the processing unit 1810 on the primary display unit 1802; cause display of (e.g., with the touch screen display control unit 1814) a second user interface on the touch screen display unit 1806, the second user interface comprising a first set of one or more affordances corresponding to the application, where the first set of one or more affordances corresponds to a first portion of the application; and detect (e.g., with the input detecting unit 1816) a swipe gesture on the touch-sensitive surface unit 1808. In accordance with a determination (e.g., with the input type determining unit 1818) that the swipe gesture was performed in a first direction (e.g., horizontal), the processing unit 1810 is configured to cause display of (e.g., with the touch screen display control unit 1814) a second set of one or more affordances corresponding to the application on the touch screen display unit 1806, where at least one affordance in the second set of one or more affordances is distinct from the first set of one or more affordances, and where the second set of one or more affordances also corresponds to the first portion of the application. In accordance with a determination (e.g., with the input type determining unit 1818) that the swipe gesture was performed in a second direction substantially perpendicular to the first direction (e.g., vertical), the processing unit 1810 is configured to cause display of (e.g., with the touch screen display control unit 1814) a third set of one or more affordances corresponding to the application on the touch screen display unit 1806, where the third set of one or more affordances is distinct from the second set of one or more affordances, and where the third set of one or more affordances corresponds to a second portion of the application that is distinct from the first portion of the application.

In some embodiments, the second portion is displayed on the primary display unit 1802 in a compact view within the first user interface prior to detecting the swipe gesture, and the processing unit 1810 is configured to cause display of (e.g., with the primary display control unit 1812) the second portion on the primary display unit 1802 in an expanded view within the first user interface in accordance with the determination that the swipe gesture was performed in the second direction substantially perpendicular to the first direction.

In some embodiments, the first user interface for the application is displayed on the primary display unit 1802 in a full-screen mode, and the first set of one or more affordances displayed on the touch screen display unit 1806 includes controls corresponding to the full-screen mode.

In some embodiments, the second set of one or more affordances and the third set of one or more affordances includes at least one system-level affordance corresponding to at least one system-level functionality.

In some embodiments, after displaying the third set of one or more affordances on the touch screen display unit 1806, the processing unit 1810 is configured to: detect (e.g., with the input detecting unit 1816) a user input selecting the first portion on the first user interface; and, in response to detecting the user input: cease to display (e.g., with the touch screen display control unit 1814) the third set of one or more affordances on the touch screen display unit 1806, where the third set of one or more affordances corresponds to the second portion of the application; and cause display of (e.g., with the touch screen display control unit 1814) the second set of one or more affordances on the touch screen display unit 1806, where the second set of one or more affordances corresponds to the first portion of the application.

In some embodiments, the first direction is substantially parallel to a major dimension of the touch screen display unit 1806.

In some embodiments, the first direction is substantially perpendicular to a major dimension of the touch screen display unit 1806.

In some embodiments, the first portion is one of a menu, tab, folder, tool set, or toolbar of the application, and the second portion is one of a menu, tab, folder, tool set, or toolbar of the application.

The operations described above with reference to FIGS. 45A-45C are, optionally, implemented by components depicted in FIGS. 3A-3B or FIG. 56. For example, detection operation 710 is, optionally, implemented by event sorter 370, event recognizer 380, and event handler 190. Event monitor 371 in event sorter 370 detects a contact on display system 312 when implemented as a touch-sensitive display, and event dispatcher module 374 delivers the event information to application 340-1. A respective event recognizer 380 of application 340-1 compares the event information to respective event definitions 386, and determines whether a first contact at a first location on the touch-sensitive display corresponds to a predefined event or sub-event. When a respective predefined event or sub-event is detected, event recognizer 380 activates an event handler 390 associated with the detection of the event or sub-event. Event handler 390 optionally uses or calls data updater 376 or object updater 377 to update the application internal state 392. In some embodiments, event handler 390 accesses a respective GUI updater 378 to update what is displayed by the application. Similarly, it would be clear to a person having ordinary skill in the art how other processes can be implemented based on the components depicted in FIGS. 3A-3B.

Figure 57:
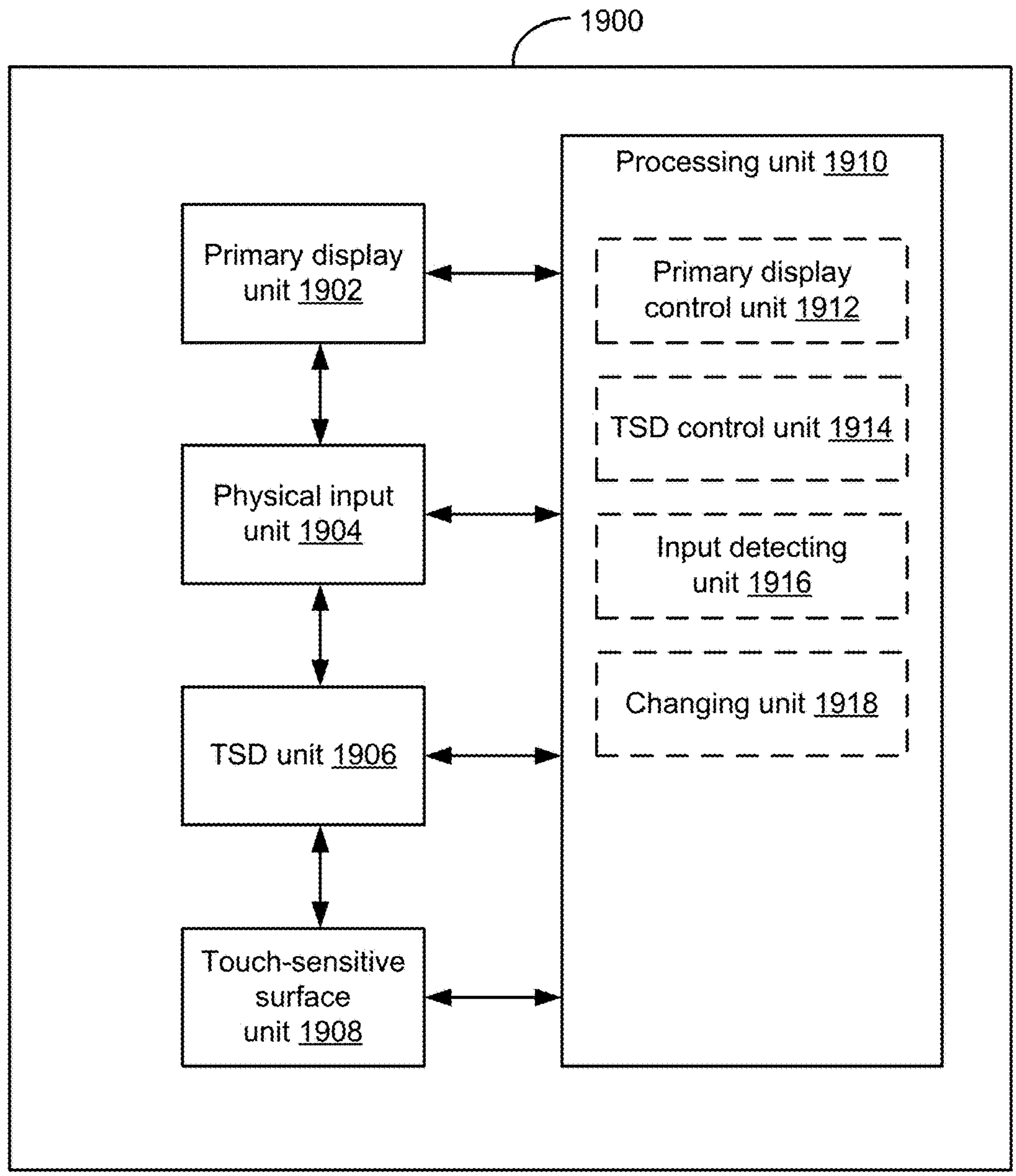

In accordance with some embodiments, FIG. 57 shows a functional block diagram of an electronic device 1900 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 57 are, optionally, combined or separated into sub-blocks to implement the principles of the various described embodiments. Therefore, the description herein optionally supports any possible combination or separation or further definition of the functional blocks described herein. For ease of discussion, the electronic device 1900 is implemented as portable computing system 100 (FIGS. 1A-1B) whose components correspond to electronic device 300 (FIG. 3). One of skill in the art will appreciate how the electronic device 1900 may also be implemented within desktop computing system 200 (FIGS. 2A-2D).

As shown in FIG. 57, the electronic device 1900 includes a primary display unit 1902 configured to display information (e.g., primary display 102, FIGS. 1A and 2A-2D), a physical input unit 1904 configured to receive user inputs, a touch screen display (TSD) unit 1906 configured to display information (sometimes also herein called "a touch screen display" or a "touch screen") (e.g., dynamic function row 104, FIGS. 1A-1B and 2A-2D), a touch-sensitive surface unit 1908 configured to receive contacts on the touch screen display unit 1906 with one or more sensors, and a processing unit 1910 coupled to the primary display unit 1902, the physical input unit 1904, the touch screen display unit 1906, and the touch-sensitive surface unit 1908. In some embodiments, the processing unit 1910 includes: a primary display control unit 1912, a touch screen display (TSD) control unit 1914, an input detecting unit 1916, and a changing unit 1918.

The processing unit 1910 is configured to: cause display of (e.g., with the primary display control unit 1912) a first user interface for the application executed by the processing unit 1910 on the primary display unit 1902 in a normal mode, the first user interface comprising a first set of one or more affordances associated with the application; and detect (e.g., with the input detecting unit 1916) a user input for displaying at least a portion of the first user interface for the application in a full-screen mode on the primary display unit 1902. In response to detecting the user input, the processing unit 1910 is configured to: cease to display (e.g., with the primary display control unit 1912) the first set of one or more affordances associated with the application in the first user interface on the primary display unit 1902; cause display of (e.g., with the primary display control unit 1912) the portion of the first user interface for the application on the primary display unit 1902 in the full-screen mode; and automatically, without human intervention, cause display of (e.g., with the touch screen display control unit 1914) a second set of one or more affordances for controlling the application on the touch screen display unit 1906, where the second set of one or more affordances correspond to the first set of one or more affordances.

In some embodiments, the second set of one or more affordances is the first set of one or more affordances.

In some embodiments, the second set of one or more affordances include controls corresponding to the full-screen mode.

In some embodiments, the processing unit 1910 is configured to detect (e.g., with the input detecting unit 1916) a user touch input selecting one of the second set of affordances on the touch-sensitive surface unit 1908, and, in response to detecting the user touch input, the processing unit 1910 is configured to change (e.g., with the changing unit 1918) the portion of the first user interface for the application being displayed in the full-screen mode on the primary display unit 1902 according to the selected one of the second set of affordances.

In some embodiments, after displaying the portion of the first user interface for the application in the full-screen mode on the primary display unit 1902, the processing unit 1910 is configured to: detect (e.g., with the input detecting unit 1916) a subsequent user input for exiting the full-screen mode; and, in response to detecting the subsequent user input: cause display of (e.g., with the primary display control unit 1912) the first user interface for the application executed by the processing unit 1910 on the primary display unit 1902 in the normal mode, the first user interface comprising the first set of one or more affordances associated with the application; and maintain display of (e.g., with the touch screen display control unit 1914) at least a subset of the second set of one or more affordances for controlling the application on the touch screen display unit 1906, where the second set of one or more affordances correspond to the first set of one or more affordances.

In some embodiments, the user input for displaying at least the portion of the first user interface for the application in full-screen mode on the primary display unit 1902 is at least one of a touch input detected on the touch-sensitive surface unit 1908 and a control selected within the first user interface on the primary display unit 1902.

In some embodiments, the second set of one or more affordances includes at least one system-level affordance corresponding to at least one system-level functionality.

The operations described above with reference to FIGS. 46A-46B are, optionally, implemented by components depicted in FIGS. 3A-3B or FIG. 57. For example, detection operations 804 and 816 are, optionally, implemented by event sorter 370, event recognizer 380, and event handler 190. Event monitor 371 in event sorter 370 detects a contact on display system 312 when implemented as a touch-sensitive display, and event dispatcher module 374 delivers the event information to application 340-1. A respective event recognizer 380 of application 340-1 compares the event information to respective event definitions 386, and determines whether a first contact at a first location on the touch-sensitive display corresponds to a predefined event or sub-event. When a respective predefined event or sub-event is detected, event recognizer 380 activates an event handler 390 associated with the detection of the event or sub-event. Event handler 390 optionally uses or calls data updater 376 or object updater 377 to update the application internal state 392. In some embodiments, event handler 390 accesses a respective GUI updater 378 to update what is displayed by the application. Similarly, it would be clear to a person having ordinary skill in the art how other processes can be implemented based on the components depicted in FIGS. 3A-3B.

Figure 58:
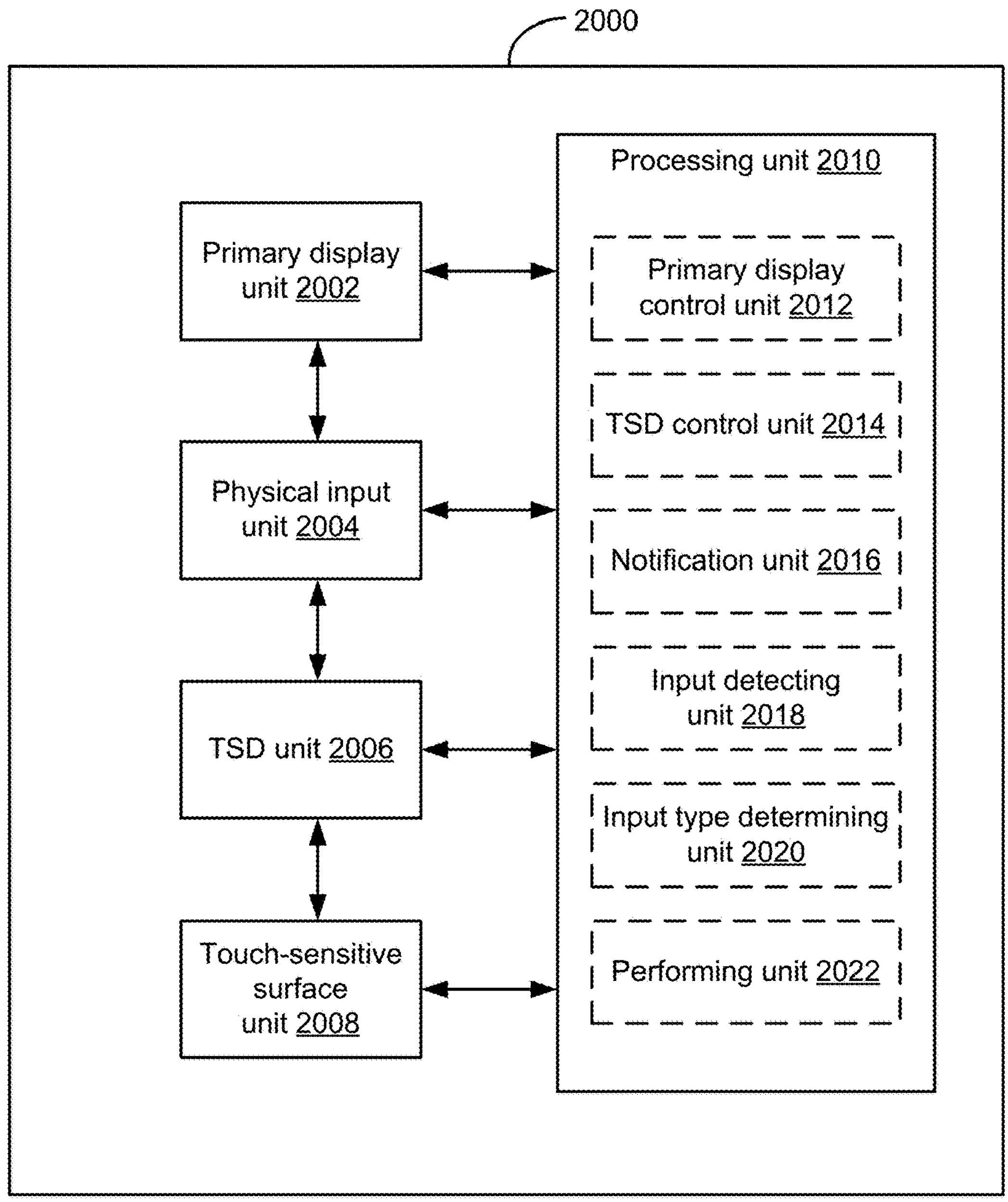

In accordance with some embodiments, FIG. 58 shows a functional block diagram of an electronic device 2000 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 58 are, optionally, combined or separated into sub-blocks to implement the principles of the various described embodiments. Therefore, the description herein optionally supports any possible combination or separation or further definition of the functional blocks described herein. For ease of discussion, the electronic device 2000 is implemented as portable computing system 100 (FIGS. 1A-1B) whose components correspond to electronic device 300 (FIG. 3). One of skill in the art will appreciate how the electronic device 2000 may also be implemented within desktop computing system 200 (FIGS. 2A-2D).

As shown in FIG. 58, the electronic device 2000 includes a primary display unit 2002 configured to display information (e.g., primary display 102, FIGS. 1A and 2A-2D), a physical input unit 2004 configured to receive user inputs, a touch screen display (TSD) unit 2006 configured to display information (sometimes also herein called "a touch screen display" or a "touch screen") (e.g., dynamic function row 104, FIGS. 1A-1B and 2A-2D), a touch-sensitive surface unit 2008 configured to receive contacts on the touch screen display unit 2006 with one or more sensors, and a processing unit 2010 coupled to the primary display unit 2002, the physical input unit 2004, the touch screen display unit 2006, and the touch-sensitive surface unit 2008. In some embodiments, the processing unit 2010 includes: a primary display control unit 2012, a touch screen display (TSD) control unit 2014, a notification unit 2016, an input detecting unit 2018, an input type determining unit 2020, and a performing unit 2022.

The processing unit 2010 is configured to: cause display of (e.g., with the primary display control unit 2012) a first user interface, on the primary display unit 2002, for an application executed by the processing unit 2010; cause display of (e.g., with the touch screen display control unit 2014) a second user interface, on the touch screen display unit 2006, the second user interface comprising a set of one or more affordances corresponding to the application; detect a notification (e.g., with the notification unit 2016); and, in response to detecting the notification, cause concurrent display of (e.g., with the touch screen display control unit 2014), in the second user interface on the touch screen display unit 2006, the set of one or more affordances corresponding to the application and at least a portion of the detected notification, where the detected notification is not displayed on the primary display unit 2002.

In some embodiments, prior to detecting the notification, the processing unit 2010 is configured to detect (e.g., with the input detecting unit 2018) a user input selecting a notification setting so as to display notifications on the touch screen display unit 2006 and to not display notifications on the primary display unit 2002.

In some embodiments, the processing unit 2010 is configured to detect (e.g., with the input detecting unit 2018) a user touch input on the touch-sensitive surface unit 2008 corresponding to the portion of the detected notification. In accordance with a determination (e.g., with the input type determining unit 2020) that the user touch input corresponds to a first type (e.g., a swipe gesture), the processing unit 2010 is configured to cease to display (e.g., with the touch screen display control unit 2014) in the second user interface the portion of the detected notification on the touch screen display unit 2006. In accordance with a determination (e.g., with the input type determining unit 2020) that the user touch input corresponds to a second type (e.g., a tap contact) distinct from the first type, the processing unit 2010 is configured to perform (e.g., with the performing unit 2022) an action associated with the detected notification.

In some embodiments, the portion of the notification displayed on the touch screen display unit 2006 prompts a user of the electronic device 2000 to select one of a plurality of options for responding to the detected notification.

In some embodiments, the portion of the notification displayed on the touch screen display unit 2006 includes one or more suggested responses to the detected notification.

In some embodiments, the notification corresponds to an at least one of an incoming instant message, SMS, email, voice call, or video call.

In some embodiments, the notification corresponds to a modal alert issued by an application being executed by the processing unit 2010 in response to a user input closing the application or performing an action within the application.

In some embodiments, the set of one or more affordances includes at least one a system-level affordance corresponding to at least one system-level functionality, and the notification corresponds to a user input selecting one or more portions of the input mechanism or the least one of a system-level affordance.

The operations described above with reference to FIGS. 47A-47B are, optionally, implemented by components depicted in FIGS. 3A-3B or FIG. 58. For example, detection operation 922 is, optionally, implemented by event sorter 370, event recognizer 380, and event handler 190. Event monitor 371 in event sorter 370 detects a contact on display system 312 when implemented as a touch-sensitive display, and event dispatcher module 374 delivers the event information to application 340-1. A respective event recognizer 380 of application 340-1 compares the event information to respective event definitions 386, and determines whether a first contact at a first location on the touch-sensitive display corresponds to a predefined event or sub-event. When a respective predefined event or sub-event is detected, event recognizer 380 activates an event handler 390 associated with the detection of the event or sub-event. Event handler 390 optionally uses or calls data updater 376 or object updater 377 to update the application internal state 392. In some embodiments, event handler 390 accesses a respective GUI updater 378 to update what is displayed by the application. Similarly, it would be clear to a person having ordinary skill in the art how other processes can be implemented based on the components depicted in FIGS. 3A-3B.

Figure 59:
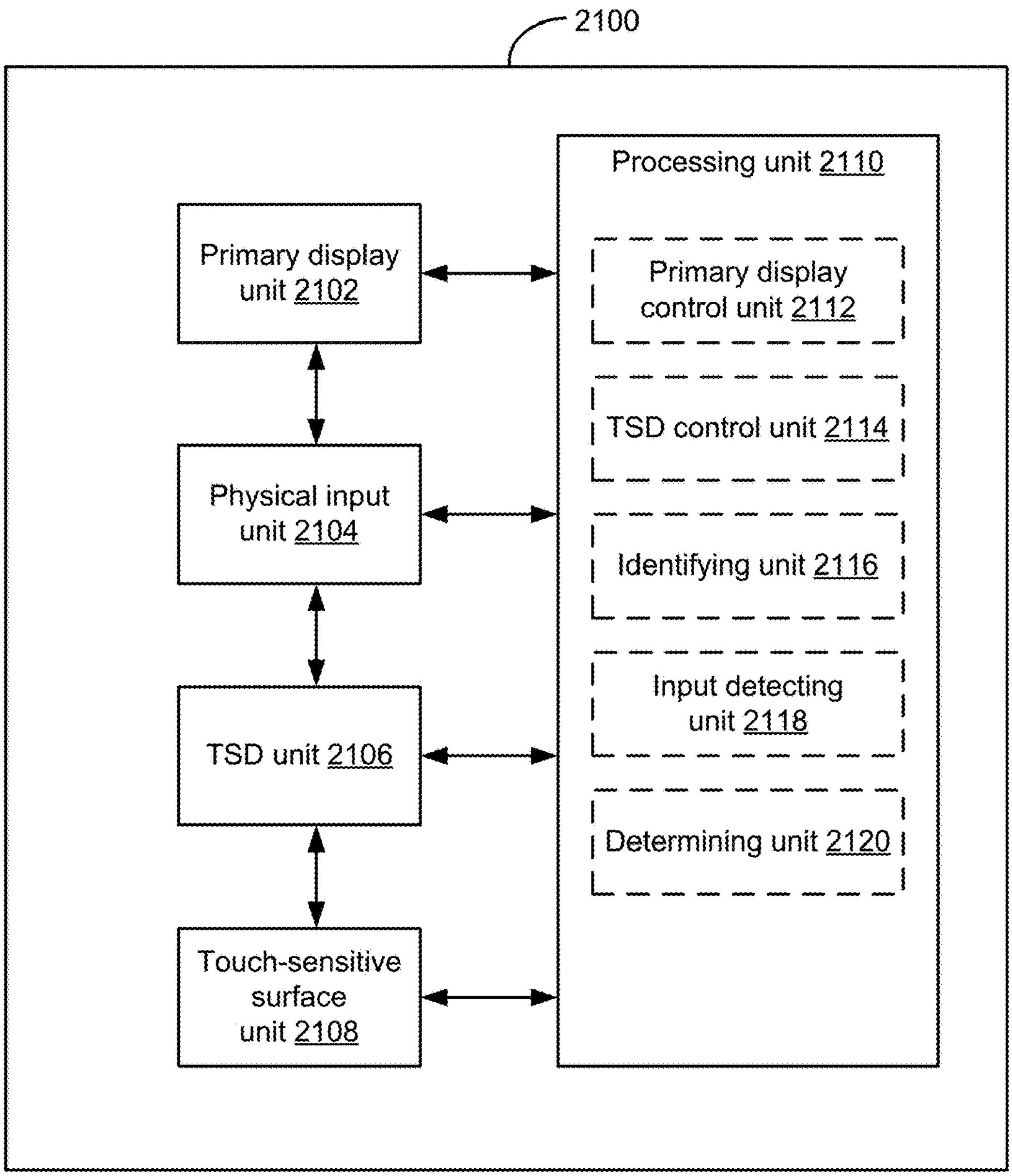

In accordance with some embodiments, FIG. 59 shows a functional block diagram of an electronic device 2100 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 59 are, optionally, combined or separated into sub-blocks to implement the principles of the various described embodiments. Therefore, the description herein optionally supports any possible combination or separation or further definition of the functional blocks described herein. For ease of discussion, the electronic device 2100 is implemented as portable computing system 100 (FIGS. 1A-1B) whose components correspond to electronic device 300 (FIG. 3). One of skill in the art will appreciate how the electronic device 2100 may also be implemented within desktop computing system 200 (FIGS. 2A-2D).

As shown in FIG. 59, the electronic device 2100 includes a primary display unit 2102 configured to display information (e.g., primary display 102, FIGS. 1A and 2A-2D), a physical input unit 2104 configured to receive user inputs, a touch screen display (TSD) unit 2106 configured to display information (sometimes also herein called "a touch screen display" or a "touch screen") (e.g., dynamic function row 104, FIGS. 1A-1B and 2A-2D), a touch-sensitive surface unit 2108 configured to receive contacts on the touch screen display unit 2106 with one or more sensors, and a processing unit 2110 coupled to the primary display unit 2102, the physical input unit 2104, the touch screen display unit 2106, and the touch-sensitive surface unit 2108. In some embodiments, the processing unit 2110 includes: a primary display control unit 2112, a touch screen display (TSD) control unit 2114, an identifying unit 2116, an input detecting unit 2118, and a determining unit 2120.

The processing unit 2110 is configured to: cause display of (e.g., with the primary display control unit 2112) a user interface, on the primary display unit 2102, the user interface comprising one or more user interface elements; identify (e.g., with the identifying unit 2116) an active user interface element of the one or more user interface elements that is in focus on the primary display unit 2102, where the active user interface element is associated with an application executed by the processing unit 2110; and, in response to identifying the active user interface element that is in focus on the primary display unit 2102, cause display of (e.g., with the touch screen display control unit 2114) a set of one or more affordances corresponding to the application on the touch screen display unit 2106. The processing unit 2110 is configured to: detect (e.g., with the input detecting unit 2118) a user input to move a respective portion of the user interface; and, in response to detecting the user input, and in accordance with a determination (e.g., with the determining unit 2120) that the user input satisfies predefined action criteria: cease to display (e.g., with the primary display control unit 2112) the respective portion of the user interface on the primary display unit 2102; cease to display (e.g., with the touch screen display control unit 2114) at least a subset of the set of one or more affordances on the touch screen display unit 2106; and cause display of (e.g., with the touch screen display control unit 2114) a representation of the respective portion of the user interface on the touch screen display unit 2106.

In some embodiments, the respective portion of the user interface is a menu corresponding to the application executed by the processing unit 2110.

In some embodiments, the respective portion of the user interface is at least one of a notification or a modal alert.

In some embodiments, the predefined action criteria are satisfied when the user input is a dragging gesture that drags the respective portion of the user interface to a predefined location of the primary display unit 2102.

In some embodiments, the predefined action criteria are satisfied when the user input is predetermined input corresponding to moving the respective portion of the user interface to the touch screen display unit 2106.

In some embodiments, in response to detecting the user input, and in accordance with a determination (e.g., with the determining unit 2120) that the user input does not satisfy the predefined action criteria, the processing unit 2110 is configured to: maintain display of (e.g., with the primary display control unit 2112) the respective portion of the user interface on the primary display unit 2102; and maintain display of (e.g., with the touch screen display control unit 2114) the set of one or more affordances on the touch screen display unit 2106.

In some embodiments, the set of one or more affordances includes at least one system-level affordance corresponding to at least one system-level functionality, and the processing unit 2110 is configured to maintain display of (e.g., with the touch screen display control unit 2114) the at least one system-level affordance on the touch screen display unit 2106 after displaying the representation of the respective portion of the user interface on the touch screen display unit 2106.

In some embodiments, the representation of the respective portion of the user interface is overlaid on the set of one or more affordances on the touch screen display unit 2106.

The operations described above with reference to FIGS. 48A-48C are, optionally, implemented by components depicted in FIGS. 3A-3B or FIG. 59. For example, detection operation 1008 is, optionally, implemented by event sorter 370, event recognizer 380, and event handler 190. Event monitor 371 in event sorter 370 detects a contact on display system 312 when implemented as a touch-sensitive display, and event dispatcher module 374 delivers the event information to application 340-1. A respective event recognizer 380 of application 340-1 compares the event information to respective event definitions 386, and determines whether a first contact at a first location on the touch-sensitive display corresponds to a predefined event or sub-event. When a respective predefined event or sub-event is detected, event recognizer 380 activates an event handler 390 associated with the detection of the event or sub-event. Event handler 390 optionally uses or calls data updater 376 or object updater 377 to update the application internal state 392. In some embodiments, event handler 390 accesses a respective GUI updater 378 to update what is displayed by the application. Similarly, it would be clear to a person having ordinary skill in the art how other processes can be implemented based on the components depicted in FIGS. 3A-3B.

Figure 60:
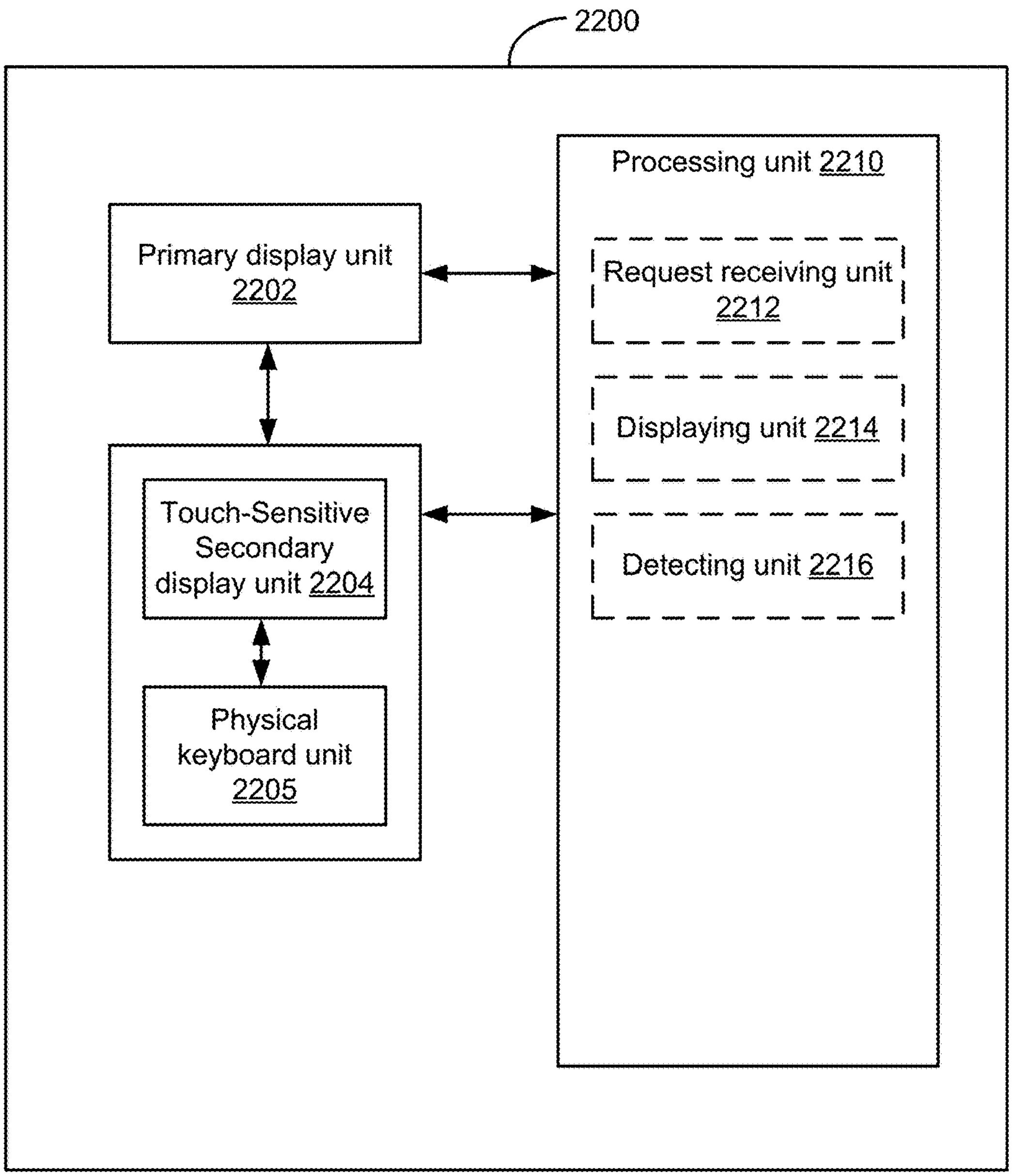

In accordance with some embodiments, FIG. 60 shows a functional block diagram of a computing system 2200 (also referred to as an electronic device 2200) configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 60 are, optionally, combined or separated into sub-blocks to implement the principles of the various described embodiments. Therefore, the description herein optionally supports any possible combination or separation or further definition of the functional blocks described herein. For ease of discussion, the computing system 2200 is implemented as a portable computing system 100 (FIG. 1A). In some embodiments, the computing system 2200 is implemented in accordance with any of the devices/systems shown in FIGS. 1A-2D.

As shown in FIG. 60, the computing system 2200, includes a primary display unit 2202 configured to display information (e.g., touch-sensitive display system 112, also referred to as a primary touch screen, primary touch-sensitive display, and primary touch screen display, FIG. 1A), a touch-sensitive secondary display unit 2204 configured to receive contacts, gestures, and other user inputs on the touch-sensitive display, a physical keyboard unit 2205 configured to receive keyboard inputs, and a processing unit 2210 coupled with the display unit 2202, the physical keyboard unit 2205, and the touch-sensitive secondary display unit 2204. In some embodiments, the primary display unit 2202 is part of a first housing and the physical keyboard unit 2205 and touch-sensitive secondary display unit 2204 are part of a second housing distinct from the first housing. In some embodiments, the processing unit includes a request receiving unit (e.g., request receiving unit 2212), a displaying unit 2214 (e.g., displaying unit 2214), and a detecting unit (e.g., detecting unit 2216).

The processing unit is configured to: receive a request (e.g., with the request receiving unit 2212) to open an application; in response to receiving the request: (i) display, on the primary display (e.g., with the displaying unit 2214 in conjunction with the primary display unit 2202), a plurality of user interface objects associated with an application executing on the computing system, the plurality including a first user interface object displayed with its associated content and other user interface objects displayed without their associated content; and (ii) display, on the touch-sensitive secondary display (e.g., with the displaying unit 2214 in conjunction with the touch-sensitive secondary display unit 2204), a set of affordances that each represent one of the plurality of user interface objects; detect (e.g., with the detecting unit 2216), via the touch-sensitive display, a swipe gesture in a direction from a first affordance of the set of affordances and towards a second affordance of the set of affordances, wherein the first affordance represents the first user interface object and the second affordance represents a second user interface object that is distinct from the first user interface object; and in response to detecting the swipe gesture, update (e.g., with the displaying unit 2214) the primary display to cease displaying associated content for the first user interface object and to display associated content for the second user interface object.

In some embodiments of the computing system 2200, the processing unit is further configured to: detect continuous travel of the swipe gesture (e.g., with the detecting unit 2216) across the touch-sensitive secondary display, including the swipe gesture contacting a third affordance that represents a third user interface object; and, in response to detecting that the swipe gesture contacts the third affordance, update the primary display to display associated content for the third user interface object.

In some embodiments of the computing system 2200, each affordance in the set of affordance includes a representation of respective associated content for a respective user interface object of the plurality.

In some embodiments of the computing system 2200, the processing unit is further configured to: before detecting the swipe gesture, detect an initial contact with the touch-sensitive secondary display over the first affordance (e.g., with the detecting unit 2216); and, in response to detecting the initial contact, increase a magnification level of the first affordance (e.g., with the displaying unit 2214 in conjunction with the touch-sensitive secondary display 2204).

In some embodiments of the computing system 2200, the application is a web browsing application, and the plurality of user interface objects each correspond to web-browsing tabs.

In some embodiments of the computing system 2200, the processing unit is further configured to: detect an input at a URL-input portion of the web browsing application on the primary display (e.g., with the detecting unit 2216); and in response to detecting the input, update the touch-sensitive secondary display to include representations of favorite URLs (e.g., with the displaying unit 2214 in conjunction with the touch-sensitive secondary display unit 2204).

In some embodiments of the computing system 2200, the application is a photo-browsing application, and the plurality of user interface objects each correspond to individual photos.

In some embodiments of the computing system 2200, the application is a video-editing application, and the plurality of user interface object each correspond to individual frames in a respective video.

Figure 61:
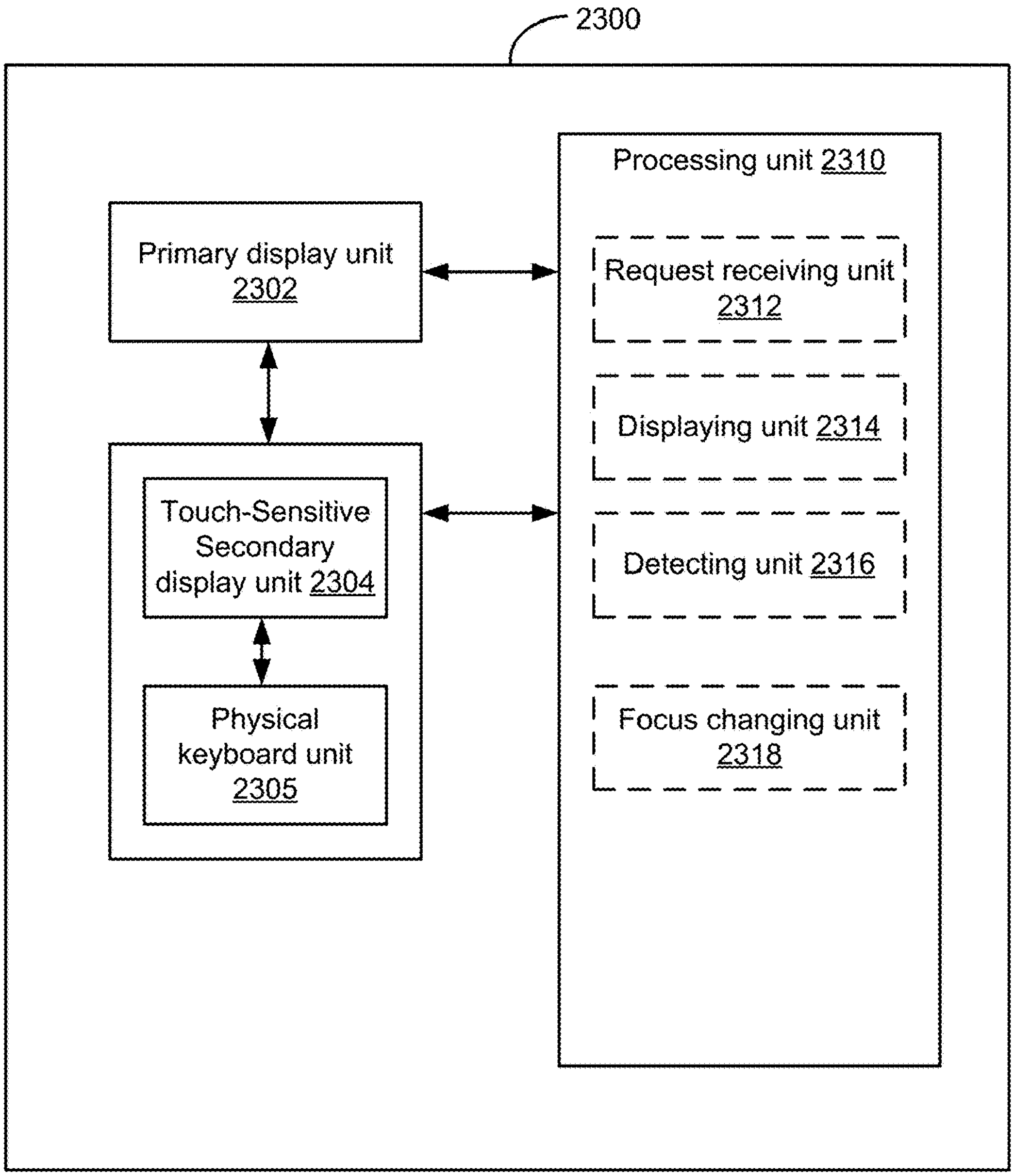

In accordance with some embodiments, FIG. 61 shows a functional block diagram of a computing system 2300 (also referred to as an electronic device 2300) configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 61 are, optionally, combined or separated into sub-blocks to implement the principles of the various described embodiments. Therefore, the description herein optionally supports any possible combination or separation or further definition of the functional blocks described herein. For ease of discussion, the computing system 2300 is implemented as a portable computing system 100 (FIG. 1A). In some embodiments, the computing system 2300 is implemented in accordance with any of the devices/systems shown in FIGS. 1A-2D.

As shown in FIG. 61, the computing system 2300, includes a primary display unit 2302 configured to display information (e.g., touch-sensitive display system 112, also referred to as a primary touch screen, primary touch-sensitive display, and primary touch screen display, FIG. 1A), a touch-sensitive secondary display unit 2304 configured to receive contacts, gestures, and other user inputs on the touch-sensitive display, a physical keyboard unit 2305 configured to receive keyboard inputs, and a processing unit 2310 coupled with the display unit 2302, the physical keyboard unit 2305, and the touch-sensitive secondary display unit 2304. In some embodiments, the primary display unit 2302 is part of a first housing and the physical keyboard unit 2305 and touch-sensitive secondary display unit 2304 are part of a second housing distinct from the first housing. In some embodiments, the processing unit includes a request receiving unit (e.g., request receiving unit 2312), a displaying unit 2314 (e.g., displaying unit 2314), a detecting unit (e.g., detecting unit 2316), and a focus changing unit (e.g., focus changing unit 2318).

The processing unit is configured to: receive a request to search within content displayed on the primary display of the computing device (e.g., with the request receiving unit 2312); in response to receiving the request: (i) display, on the primary display (e.g., with the displaying unit 2314 in conjunction with the primary display unit 2302), a plurality of search results responsive to the search, wherein focus is on a first search result of the plurality of search results; (ii) display, on the touch-sensitive secondary display (e.g., with the displaying unit 2314 in conjunction with the touch-sensitive secondary display 2304), respective representations that each correspond to a respective search result of the plurality of search results; detect, via the touch-sensitive secondary display, a touch input that selects a representation of the respective representations (e.g., with the detecting unit 2316), the representation corresponding to a second search result of the plurality of search results distinct from the first search result; and in response to detecting the input, change focus on the primary display to the second search result (e.g., with the displaying unit 2316 in conjunction with the primary display unit 2302).

In some embodiments of the computing device 2300, changing focus includes modifying, on the primary display, a visual characteristic of the particular search result.

In some embodiments of the computing device 2300, the processing unit is further configured to: detect a gesture that moves across at least two of the respective representations on the touch-sensitive secondary display (e.g., with the detecting unit 2316); and, in response to detecting the gesture, change focus on the primary display to respective search results that correspond to the at least two of the respective representations as the swipe gestures moves across the at least two of the respective representations (e.g., with the displaying unit 2316 in conjunction with the primary display unit 2302).

In some embodiments of the computing device 2300, the processing unit is further configured to: in accordance with a determination that a speed of the gesture is above a threshold speed, change focus on the primary display to respective search results in addition to those that correspond to the at least two of the respective representations (e.g., with the displaying unit 2316 in conjunction with the primary display unit 2302).

In some embodiments of the computing device 2300, the gesture is a swipe gesture.

In some embodiments of the computing device 2300, the gesture is a flick gesture.

In some embodiments of the computing device 2300, the representations are tick marks that each correspond to respective search results of the search results.

In some embodiments of the computing device 2300, the tick marks are displayed in a row on the touch-sensitive secondary display in an order that corresponds to an ordering of the search results on the primary display.

In some embodiments of the computing device 2300, the request to search within the content is a request to locate a search string within the content, and the plurality of search results each include at least the search string.

In some embodiments of the computing device 2300, displaying the plurality of search results includes highlighting the search string for each of the plurality of search results.

Figure 62:
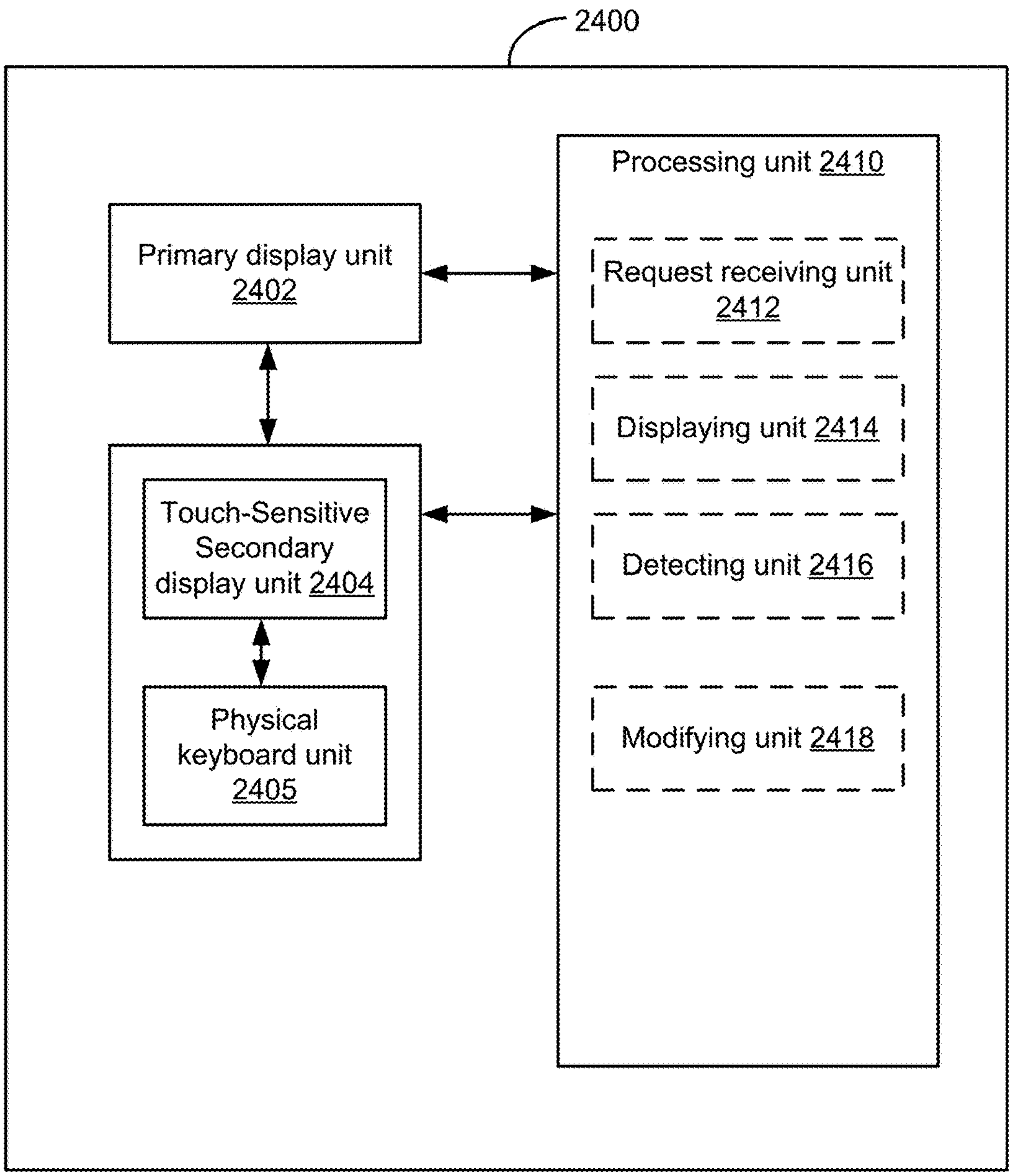

In accordance with some embodiments, FIG. 62 shows a functional block diagram of a computing system 2400 (also referred to as an electronic device 2400) configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 62 are, optionally, combined or separated into sub-blocks to implement the principles of the various described embodiments. Therefore, the description herein optionally supports any possible combination or separation or further definition of the functional blocks described herein. For ease of discussion, the computing system 2400 is implemented as a portable computing system 100 (FIG. 1A). In some embodiments, the computing system 2400 is implemented in accordance with any of the devices/systems shown in FIGS. 1A-2D.

As shown in FIG. 62, the computing system 2400, includes a primary display unit 2402 configured to display information (e.g., touch-sensitive display system 112, also referred to as a primary touch screen, primary touch-sensitive display, and primary touch screen display, FIG. 1A), a touch-sensitive secondary display unit 2404 configured to receive contacts, gestures, and other user inputs on the touch-sensitive display, a physical keyboard unit 2405 configured to receive keyboard inputs, and a processing unit 2410 coupled with the display unit 2402, the physical keyboard unit 2405, and the touch-sensitive secondary display unit 2404. In some embodiments, the primary display unit 2402 is part of a first housing and the physical keyboard unit 2405 and touch-sensitive secondary display unit 2404 are part of a second housing distinct from the first housing. In some embodiments, the processing unit includes a request receiving unit (e.g., request receiving unit 2412), a displaying unit 2414 (e.g., displaying unit 2414), a detecting unit (e.g., detecting unit 2416), and a modifying unit (e.g., modifying unit 2418).

The processing unit is configured to: display, on the primary display, a calendar application (e.g., with the displaying unit 2414 in conjunction with the primary display unit 2402); receive a request to display information about an event that is associated with the calendar application (e.g., with the request receiving unit 2412); and in response to receiving the request: (i) display, on the primary display, event details for the first event, the event details including a start time and an end time for the event (e.g., with the displaying unit 2414 in conjunction with the primary display unit 2402); and (ii) display, on the touch-sensitive secondary display, an affordance, the affordance indicating a range of time that at least includes the start time and the end time (e.g., with the displaying unit 2414 in conjunction with the touch-sensitive secondary display unit 2404).

In some embodiments of the computing system 2400, the processing unit is further configured to: detect, via the touch-sensitive secondary display, an input at the user interface control that modifies the range of time (e.g., with the detecting unit 2416); and in response to detecting the input: (i) modify at least one of the start time and the end time for the event in accordance with the input (e.g., with the modifying unit 2418); and (ii) display, on the primary display, a modified range of time for the event in accordance with the input (e.g., with the displaying unit 2414 in conjunction with the primary display unit 2402).

In some embodiments of the computing device 2400, the processing unit is further configured to: save the event with the modified start and/or end time to the memory of the computing system.

In some embodiments of the computing device 2400, the input that modifies the range of time is a press input that remains in contact with the affordance for more than a threshold amount of time and then moves at least a portion the affordance on the touch-sensitive secondary display.

In some embodiments of the computing device 2400, the input that modifies the range of time is a swipe gesture that moves across the touch-sensitive secondary display and causes the computing system to select a new start time and a new end time for the event, wherein the new start and end times correspond to a time slot that is of a same duration covered by the start and end times.

Figure 63:
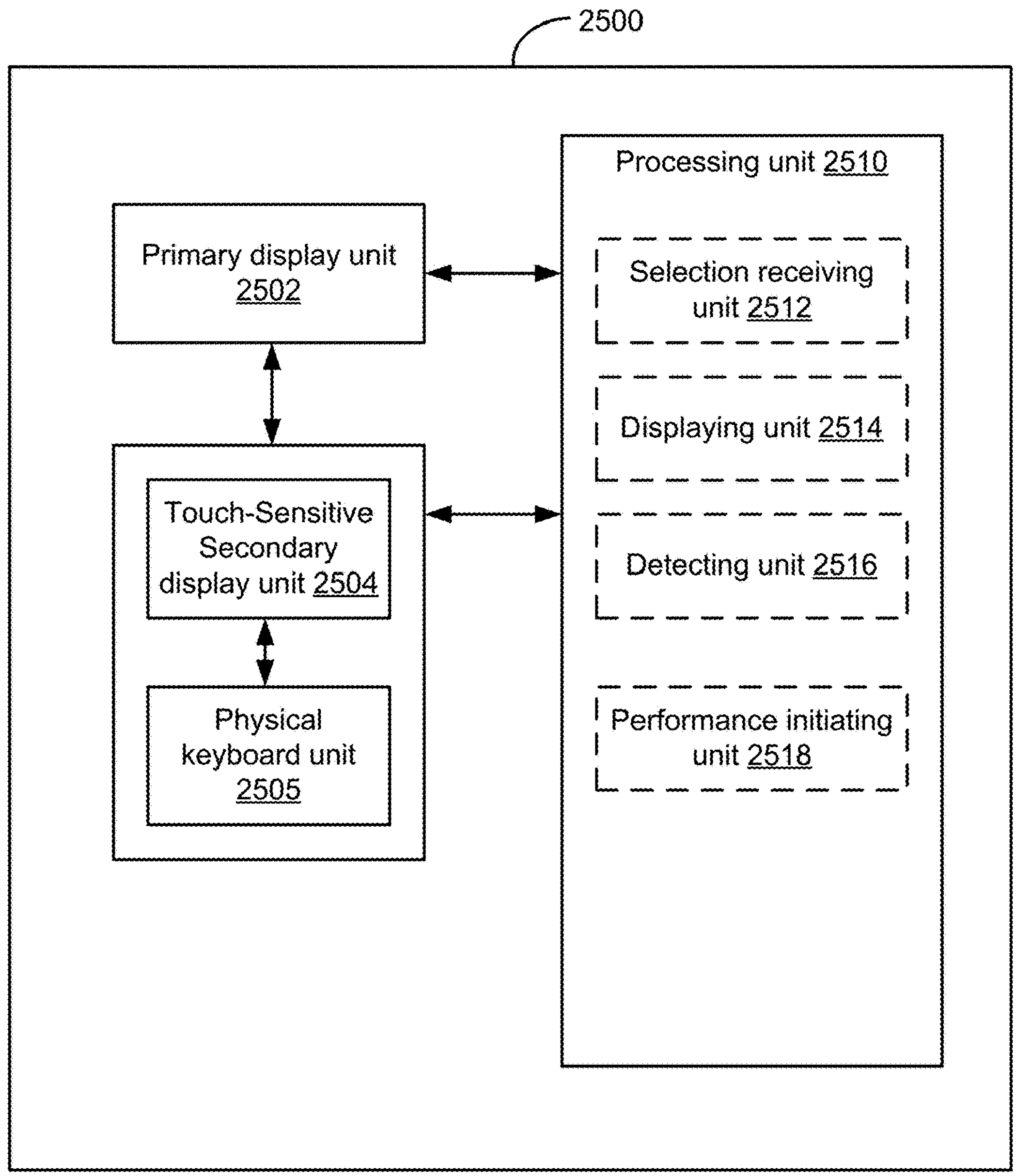

In accordance with some embodiments, FIG. 63 shows a functional block diagram of a computing system 2500 (also referred to as an electronic device 2500) configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 63 are, optionally, combined or separated into sub-blocks to implement the principles of the various described embodiments. Therefore, the description herein optionally supports any possible combination or separation or further definition of the functional blocks described herein. For ease of discussion, the computing system 2500 is implemented as a portable computing system 100 (FIG. 1A). In some embodiments, the computing system 2500 is implemented in accordance with any of the devices/systems shown in FIGS. 1A-2D.

As shown in FIG. 63, the computing system 2500, includes a primary display unit 2502 configured to display information (e.g., touch-sensitive display system 112, also referred to as a primary touch screen, primary touch-sensitive display, and primary touch screen display, FIG. 1A), a touch-sensitive secondary display unit 2504 configured to receive contacts, gestures, and other user inputs on the touch-sensitive display, a physical keyboard unit 2505 configured to receive keyboard inputs, and a processing unit 2510 coupled with the display unit 2502, the physical keyboard unit 2505, and the touch-sensitive secondary display unit 2504. In some embodiments, the primary display unit 2502 is part of a first housing and the physical keyboard unit 2505 and touch-sensitive secondary display unit 2504 are part of a second housing distinct from the first housing. In some embodiments, the processing unit includes a selection receiving unit (e.g., selection receiving unit 2512), a displaying unit 2514 (e.g., displaying unit 2514), a detecting unit (e.g., detecting unit 2516), and a performance initiating unit (e.g., performance initiating unit 2518).

The processing unit is configured to: detect a new connection between the computing system and an external device distinct from the computing system (e.g., with the detecting unit 2516); and in response to detecting the new connection, display, on the touch-sensitive secondary display, a plurality of affordances corresponding to functions available via the external device (e.g., with the displaying unit 2514 in conjunction with the touch-sensitive secondary display unit 2504).

In some embodiments of the computing system 2500, the processing unit is further configured to: receive, via the touch-sensitive secondary display, a selection of a first affordance that corresponds to a first function available via the external device (e.g., via the selection receiving unit 2512); and in response to receiving the selection, initiate performance of the first function (e.g., with the performance initiating unit 2518).

In some embodiments of the computing system 2500, the external device is an additional display, distinct from the primary display and the touch-sensitive secondary display.

In some embodiments of the computing system 2500, the plurality of affordances include a first affordance that, when selected, causes the computing system to initiate performance of a display mirroring function via the additional display.

Figure 64:
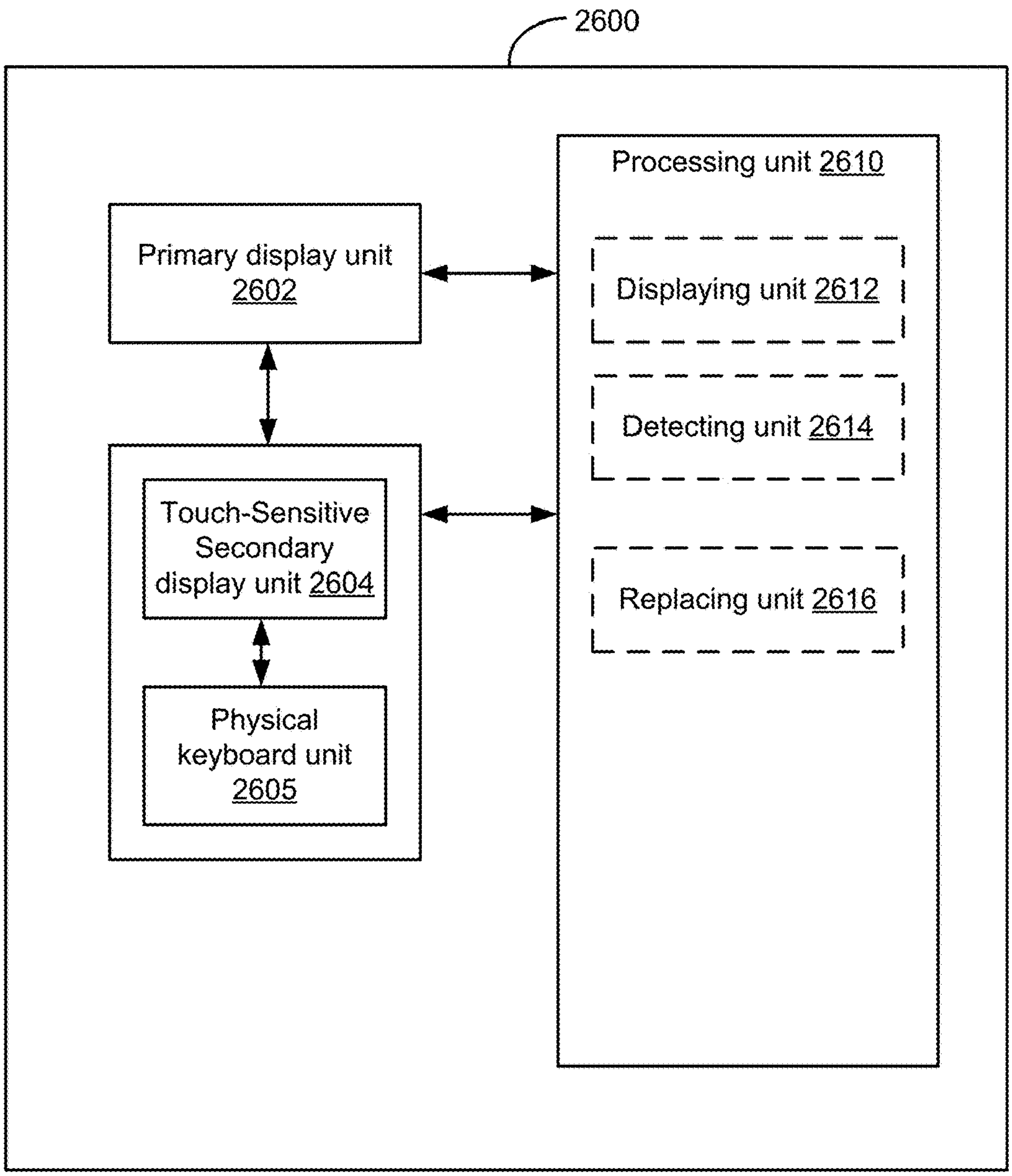

In accordance with some embodiments, FIG. 64 shows a functional block diagram of a computing system 2600 (also referred to as an electronic device 2600) configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 64 are, optionally, combined or separated into sub-blocks to implement the principles of the various described embodiments. Therefore, the description herein optionally supports any possible combination or separation or further definition of the functional blocks described herein. For ease of discussion, the computing system 2600 is implemented as a portable computing system 100 (FIG. 1A). In some embodiments, the computing system 2600 is implemented in accordance with any of the devices/systems shown in FIGS. 1A-2D.

As shown in FIG. 64, the computing system 2600, includes a primary display unit 2602 configured to display information (e.g., touch-sensitive display system 112, also referred to as a primary touch screen, primary touch-sensitive display, and primary touch screen display, FIG. 1A), a touch-sensitive secondary display unit 2604 configured to receive contacts, gestures, and other user inputs on the touch-sensitive display, a physical keyboard unit 2605 configured to receive keyboard inputs, and a processing unit 2610 coupled with the display unit 2602, the physical keyboard unit 2605, and the touch-sensitive secondary display unit 2604. In some embodiments, the primary display unit 2602 is part of a first housing and the physical keyboard unit 2605 and touch-sensitive secondary display unit 2604 are part of a second housing distinct from the first housing. In some embodiments, the processing unit includes a displaying unit (e.g., displaying unit 2612), a detecting unit 2614 (e.g., detecting unit 2614), and a replacing unit (e.g., replacing unit 2616).

The processing unit is configured to: display, on the primary display, a user interface for an application that is executing on the computing system (e.g., with the displaying unit 2612 in conjunction with the primary display unit 2602); detect a first input at a particular location within the user interface (e.g., with the detecting unit 2614); and in response to detecting the first input, display, on the touch-sensitive secondary display, a set of affordances that each correspond to distinct characters (e.g., with the displaying unit 2612 in conjunction with the touch-sensitive secondary display unit 2604).

In some embodiments of the computing system 2600, the processing unit is further configured to: detect, via the touch-sensitive secondary display, a second input over a first affordance that corresponds to a first character of the distinct characters (e.g., with the detecting unit 2614); and in response to detecting the second input, display on the primary display a preview of the first character at the particular location while the input remains in contact with the first affordance (e.g., with the displaying unit 2612 in conjunction with the primary display unit 2602).

In some embodiments of the computing system 2600, the processing unit is further configured to: detect, via the touch-sensitive secondary display, movement of the second input from the first affordance and to a second affordance that corresponds to a second character of the distinct characters (e.g., with the detecting unit 2614); and in response to detecting the movement of the second input from the first affordance and to the second affordance, replace the preview of the first character with a preview of the second character (e.g., with the replacing unit 2616).

In some embodiments of the computing system 2600, the processing unit is further configured to: determine affordances to include in the set of affordances based at least in part on textual content included in the user interface.

In some embodiments of the computing system 2600, the determining is conducted in response to detecting that a user has modified textual content included in the user interface.

In some embodiments of the computing system 2600, the processing unit is further configured to: detect liftoff of the second input while it is contact with second affordance and, in response to detecting liftoff, update the user interface to include the second user interface element.

In some embodiments of the computing system 2600, the processing unit is further configured to: detect an additional input while second input is in contact with second affordance and, in response to detecting the additional input, update the user interface to include the second user interface element.

In some embodiments of the computing system 2600, the processing unit is further configured to: as the second input continues to move across the touch-sensitive secondary display, display previews for respective characters of the distinct characters as corresponding affordances in the set of affordances are contacted by the second input.

In some embodiments of the computing system 2600, the preview of second character remains displayed on the primary display while the input remains in contact with the second affordance.

Figure 65:
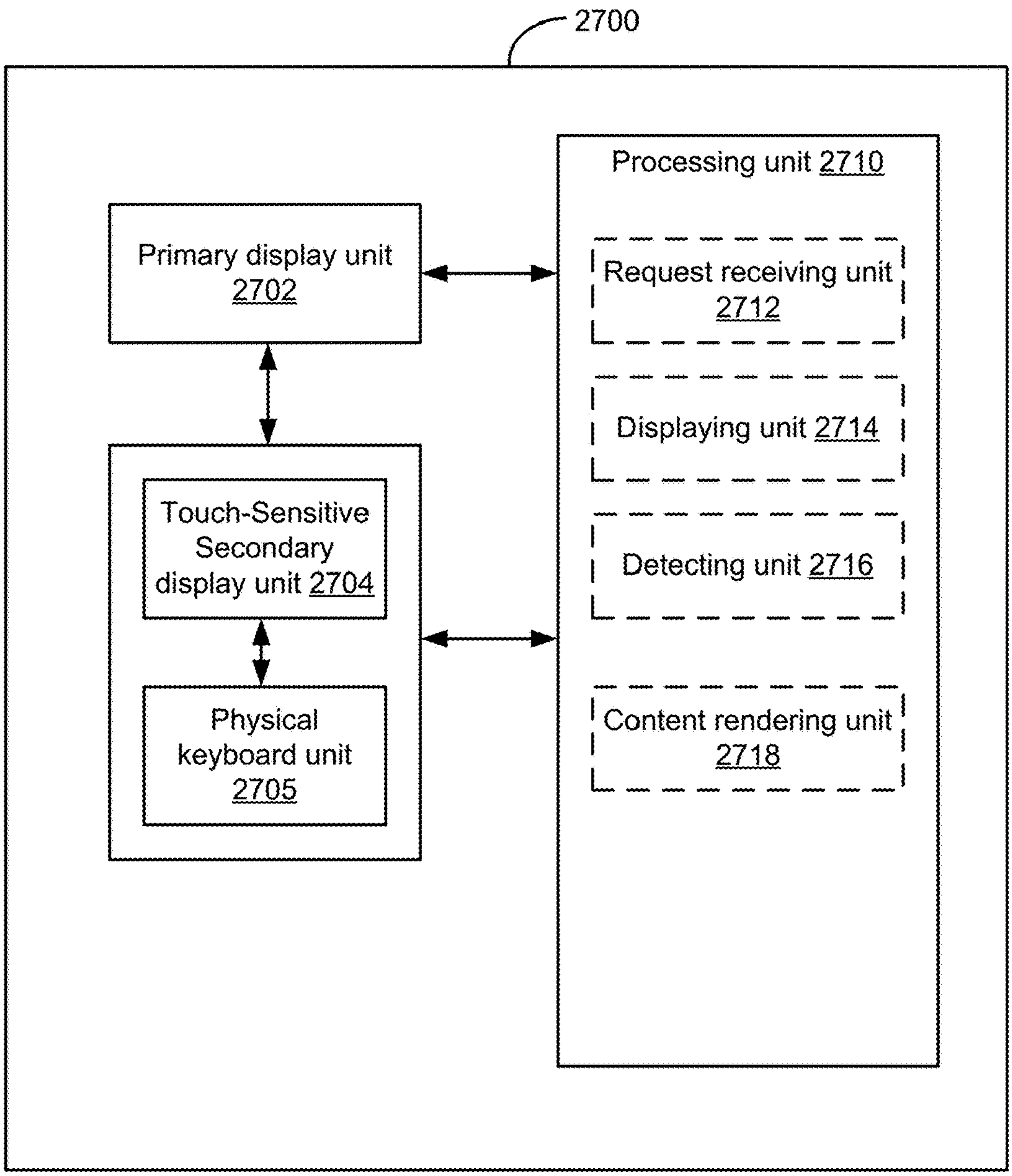

In accordance with some embodiments, FIG. 65 shows a functional block diagram of a computing system 2700 (also referred to as an electronic device 2700) configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 65 are, optionally, combined or separated into sub-blocks to implement the principles of the various described embodiments. Therefore, the description herein optionally supports any possible combination or separation or further definition of the functional blocks described herein. For ease of discussion, the computing system 2700 is implemented as a portable computing system 100 (FIG. 1A). In some embodiments, the computing system 2700 is implemented in accordance with any of the devices/systems shown in FIGS. 1A-2D.

As shown in FIG. 65, the computing system 2700, includes a primary display unit 2702 configured to display information (e.g., touch-sensitive display system 112, also referred to as a primary touch screen, primary touch-sensitive display, and primary touch screen display, FIG. 1A), a touch-sensitive secondary display unit 2704 configured to receive contacts, gestures, and other user inputs on the touch-sensitive display, a physical keyboard unit 2705 configured to receive keyboard inputs, and a processing unit 2710 coupled with the display unit 2702, the physical keyboard unit 2705, and the touch-sensitive secondary display unit 2704. In some embodiments, the primary display unit 2702 is part of a first housing and the physical keyboard unit 2705 and touch-sensitive secondary display unit 2704 are part of a second housing distinct from the first housing. In some embodiments, the processing unit includes a request receiving unit (e.g., request receiving unit 2712), a displaying unit 2714 (e.g., displaying unit 2714), a detecting unit (e.g., detecting unit 2716), and a content rendering unit (e.g., content rendering unit 2718).

The processing unit is configured to: receive a request to open a content-editing application (e.g., with the request receiving unit 2712); in response to receiving the request: (i) display, on the primary display, the content-editing application (e.g., with the displaying unit 2714 in conjunction with the primary display unit 2702); and (ii) display, on the touch-sensitive secondary display, a user interface control for modifying at least one visual characteristic that is used to render content within the content-editing application (e.g., with the displaying unit 2714 in conjunction with the touch-sensitive secondary display unit 2704).

In some embodiments of the computing system 2700, the processing unit is further configured to: detect, via the touch-sensitive secondary display, an input at the user interface control that selects a first value for the at least one visual characteristic (e.g., with the detecting unit 2716); and after detecting the input, render content in the content-editing application using the first value for the at least one visual characteristic (e.g., with the content rendering unit 2718).

In some embodiments of the computing system 2700, the user interface control includes respective controls that each correspond to a respective value for the at least one visual characteristic along a sliding scale of values.

In some embodiments of the computing system 2700, the sliding scale of values represents distinct shades of color.

In some embodiments of the computing system 2700, the first value corresponds to a first shade of a first color and the processing unit is further configured to: in accordance with a determination that the input satisfies predetermined criteria, modify the user interface control on the touch-sensitive secondary display to include options for selecting other shades of the first color, distinct from the first shade of the first color.

In some embodiments of the computing system 2700, the processing unit is further configured to: before rendering the content, receive a selection of the content, wherein rendering the content includes presenting a preview of the content using the first value for the at least one visual characteristic.

In some embodiments of the computing system 2700, the preview is presented while the input remains in contact with the touch-sensitive secondary display.

In some embodiments of the computing system 2700, the processing unit is further configured to, in response to detecting liftoff of the input, cease to display the preview.

In some embodiments of the computing system 2700, the processing unit is further configured to, in response to detecting liftoff of the input, display the portion of the editable content with the modified value for the at least one visual characteristic.

In accordance with some embodiments, FIG. 68 shows a functional block diagram of a computing system 3000 (also referred to as an electronic device 3000) configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 68 are, optionally, combined or separated into sub-blocks to implement the principles of the various described embodiments. Therefore, the description herein optionally supports any possible combination or separation or further definition of the functional blocks described herein. For ease of discussion, the computing system 3000 is implemented as a portable computing system 100 (FIG. 1A). In some embodiments, the computing system 3000 is implemented in accordance with any of the devices/systems shown in FIGS. 1A-2D.

As shown in FIG. 68, the computing system 3000, includes a display unit 3002 configured to display information (e.g., touch-sensitive display system 112, also referred to as a primary touch screen, primary touch-sensitive display, and primary touch screen display, FIG. 1A), a secondary display unit 3004 configured to receive contacts, gestures, and other user inputs on the touch-sensitive display, a biometric sensor unit 3005 configured to biometric inputs from a user, and a processing unit 3010 coupled with the display unit 3002, the secondary display unit 3004, and the biometric unit 3005. In some embodiments, the display unit 3002 is part of a first housing and the biometric sensor unit 3005 and secondary display unit 3004 are part of a second housing distinct from the first housing. In some embodiments, the processing unit includes a biometric information receiving unit (e.g., biometric information receiving unit 3012), a displaying unit 3014 (e.g., displaying unit 3014), an unlocking unit (e.g., unlocking unit 3016), and a receiving unit (e.g., receiving unit 3018).

The processing unit is configured to: while the device is in a locked state, display a respective log-in user interface that is associated with logging in to a plurality of user accounts including a first user account and a second user account (e.g., with the displaying unit 3014); while displaying the log-in user interface, receive biometric information about a user (e.g., with the biometric information receiving unit 3012); in response to receiving the biometric information: (i) in accordance with a determination that the biometric information is consistent with biometric information for the first user account of the plurality of user accounts while the first user account does not have an active session on the device, display, on the display, a prompt to input a log-in credential for the first user account (e.g., with the displaying unit 3014); and (ii) in accordance with a determination that the biometric information is consistent with biometric information for the second user account of the plurality of user accounts while the second user account does not have an active session on the device, display, on the display, a prompt to input a log-in credential for the second user account (e.g., with the displaying unit 3014).

In some embodiments of the electronic device 3000, the processing unit is further configured to, in response to receiving the biometric information: in accordance with a determination that the biometric information is consistent with biometric information for the first user account of the plurality of user accounts while the first user account has an active session on the device, unlock the device with respect to the first user account (e.g., with the unlocking unit 3016).

In some embodiments of the electronic device 3000, the processing unit is further configured to, in response to receiving the biometric information: in accordance with a determination that the biometric information is consistent with biometric information for the second user account of the plurality of user accounts while the second user account has an active session on the device, unlock the device with respect to the second user account (e.g., with the unlocking unit 3016).

In some embodiments of the electronic device 3000, the processing unit is further configured to, in response to receiving the biometric information: in accordance with a determination that the biometric information is not consistent with biometric information for the any user account of the device, maintain the device in the locked state.

In some embodiments of the electronic device 3000, the log-in user interface includes a plurality of selectable affordances that correspond to the plurality of user accounts.

In some embodiments of the electronic device 3000, the processing unit is further configured to: while displaying the prompt to input a log-in credential for the first user account, receive entry of a log-in credential (e.g., with the receiving unit 3018); and in response to receiving entry of the log-in credential: in accordance with a determination that the log-in credential is consistent with a log-in credential for the first user account, unlock the device with respect to the first user account (e.g., with the unlocking unit 3016); and in accordance with a determination that the log-in credential is not consistent with a log-in credential for the first user account, maintain the device in the locked state.

In some embodiments of the electronic device 3000, the processing unit is further configured to: while displaying the prompt to input a log-in credential for the second user account, receive entry of a log-in credential (e.g., with the receiving unit 3018); and in response to receiving entry of the log-in credential: in accordance with a determination that the log-in credential is consistent with a log-in credential for the second user account, unlock the device with respect to the second user account (e.g., with the unlocking unit 3016); and in accordance with a determination that the log-in credential is not consistent with a log-in credential for the second user account, maintain the device in the locked state.

In some embodiments of the electronic device 3000, the log-in user interface includes instructions to provide biometric information.

In some embodiments of the electronic device 3000, the electronic device includes a secondary display that is adjacent to the biometric sensor; and the processing unit is further configured to, while displaying the log-in user interface on the display of the device, display instructions at the secondary display to provide biometric information via the biometric sensor.

In some embodiments of the electronic device 3000, the biometric sensor is a fingerprint sensor.

In some embodiments of the electronic device 3000, the biometric sensor is a facial detection sensor.

In some embodiments of the electronic device 3000, the biometric sensor is a retina scanner.

Figure 69:
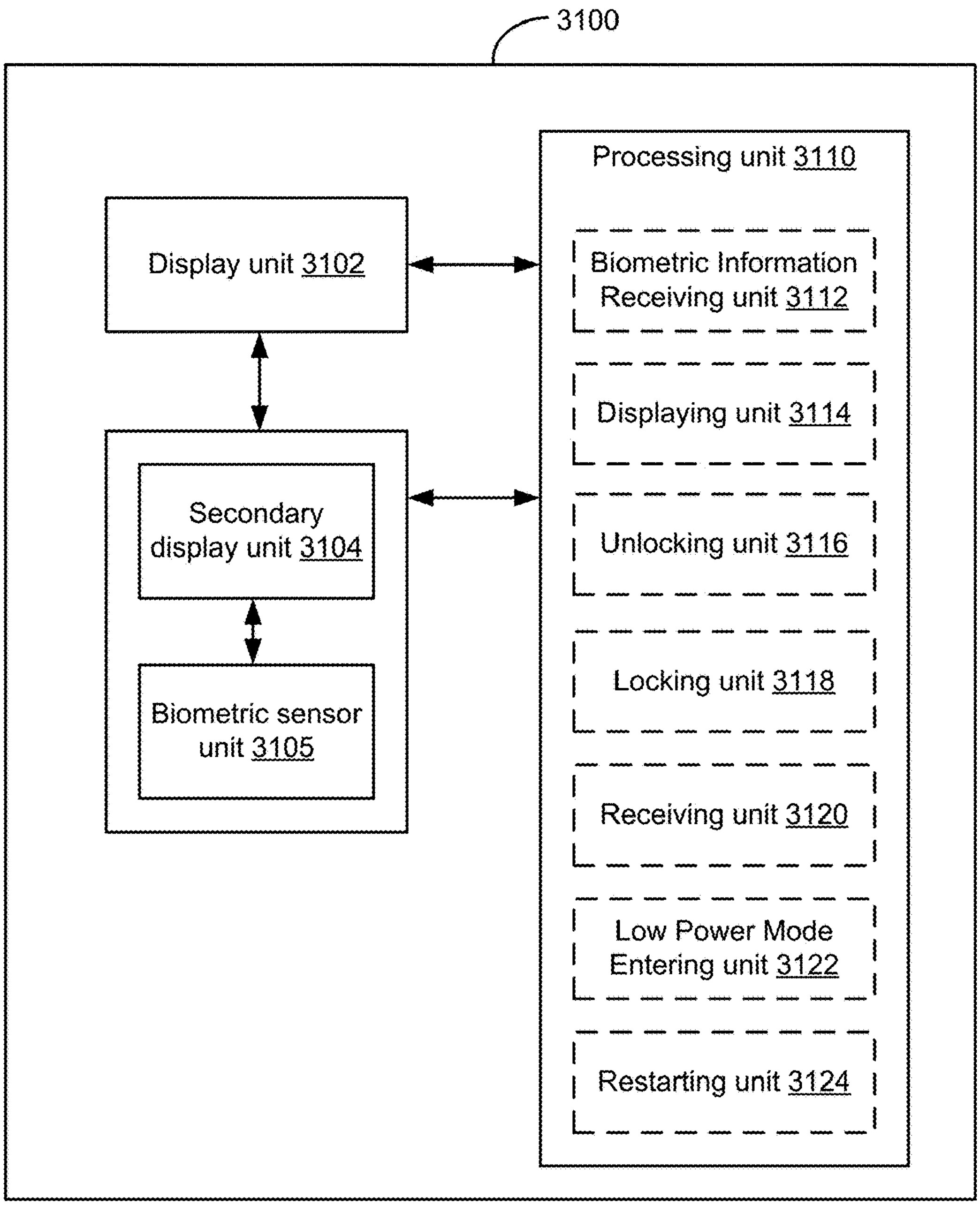

In accordance with some embodiments, FIG. 69 shows a functional block diagram of a computing system 3100 (also referred to as an electronic device 3100) configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 69 are, optionally, combined or separated into sub-blocks to implement the principles of the various described embodiments. Therefore, the description herein optionally supports any possible combination or separation or further definition of the functional blocks described herein. For ease of discussion, the computing system 3100 is implemented as a portable computing system 100 (FIG. 1A). In some embodiments, the computing system 3100 is implemented in accordance with any of the devices/systems shown in FIGS. 1A-2D.

As shown in FIG. 69, the computing system 3100, includes a display unit 3102 configured to display information (e.g., touch-sensitive display system 112, also referred to as a primary touch screen, primary touch-sensitive display, and primary touch screen display, FIG. 1A), a secondary display unit 3104 configured to receive contacts, gestures, and other user inputs on the touch-sensitive display, a biometric sensor unit 3105 configured to biometric inputs from a user, and a processing unit 3110 coupled with the display unit 3102, the secondary display unit 3104, and the biometric unit 3105. In some embodiments, the display unit 3102 is part of a first housing and the biometric sensor unit 3105 and secondary display unit 3104 are part of a second housing distinct from the first housing. In some embodiments, the processing unit includes a biometric information receiving unit (e.g., biometric information receiving unit 3112), a displaying unit 3114 (e.g., displaying unit 3114), an unlocking unit (e.g., unlocking unit 3116), a locking unit (e.g., locking unit 3118), a receiving unit (e.g., receiving unit 3120), a low power mode entering unit (e.g., low power mode entering unit 3122), and a restarting unit (e.g., restarting unit 3124).

The processing unit is configured to: while the device is logged in to a first user account, display a user interface that is associated with the first user account (e.g., with the displaying unit 3114). The device is associated with a plurality of user accounts including the first user account and a second user account, and the second user account is associated with biometric information that enables logging in to the second user account. While displaying the user interface that is associated with the first user account, the processing unit is configured to receive an input via the input element with the integrated biometric sensor (e.g., with the biometric information receiving unit 3112). In response to receiving the input via the input element with the integrated biometric sensor, the processing unit is configured to: in accordance with a determination that the input meets second-user switching criteria while the second user account has an active session on the device, wherein the second-user switching criteria include a requirement that biometric information detected during the input with the input element is consistent with biometric information for the second user account of the plurality of user accounts: (i) unlock the device with respect to the second user account (e.g., with the unlocking unit 3116); (ii) lock the device with respect to the first user account (e.g., with the locking unit 3118); and (iii) replace display of the user interface associated with the first account with a user interface associated with the second user account (e.g., with the displaying unit 3114).

In some embodiments of the electronic device 3100, the processing unit is further configured to, in response to receiving the biometric information: in accordance with a determination that the input meets second-user switching criteria while the second user account does not have an active session on the device, wherein the second-user switching criteria include a requirement that biometric information detected during the input with the input element is consistent with biometric information for the second user account of the plurality of user accounts, display (e.g., with the displaying unit 3114), on the display, a prompt to input a log-in credential for the second user account.

In some embodiments of the electronic device 3100, the processing unit is further configured to, in response to receiving the biometric information: in accordance with a determination that the input meets third-user switching criteria while a third user account has an active session on the device, wherein the third-user switching criteria include a requirement that biometric information detected during the input with the input element is consistent with biometric information for the third user account of the plurality of user accounts: (i) unlock the device with respect to the third user account (e.g., with the unlocking unit 3116); (ii) lock the device with respect to the first user account (e.g., with the locking unit 3118); and (iii) replace display of the user interface associated with the first account with a user interface associated with the third user account (e.g., with the displaying unit 3114).

In some embodiments of the electronic device 3100, the processing unit is further configured to, in response to receiving the biometric information: in accordance with a determination that the input meets third-user switching criteria while the third user account does not have an active session on the device, wherein the third-user switching criteria include a requirement that biometric information detected during the input with the input element is consistent with biometric information for the third user account of the plurality of user accounts, display (e.g., with the displaying unit 3114), on the display, a prompt to input a log-in credential for the third user account.

In some embodiments of the electronic device 3100, the input element is a button, and the input via the input element with the integrated biometric sensor includes detecting a press input via the button.

In some embodiments of the electronic device 3100, the second-user switching criteria include a criterion that the press input lasts for less than a first threshold amount of time; and the processing unit is further configured to, in response to receiving the press input via the input element with the integrated biometric sensor in accordance with a determination that the press input with the button lasts longer than the first threshold amount of time, put the device into a low power mode (e.g., with the low power mode entering unit 3122).

In some embodiments of the electronic device 3100, the second-user switching criteria include a criterion that the button press for less than a first threshold amount of time; and the processing unit is further configured to, in response to receiving the input via the input element with the integrated biometric sensor: in accordance with a determination that the press input with the button lasts longer than the first threshold amount of time and less than a second threshold amount of time, put the device into a low power mode (e.g., with the low power mode entering unit 3122); and in accordance with a determination that the press input with the button lasts longer than the second threshold amount of time, display a menu of options for changing a state of the device (e.g., with the displaying unit 3114).

In some embodiments of the electronic device 3100, the processing unit is further configured to, in response to receiving the input via the input element with the integrated biometric sensor: in accordance with a determination that the press input with the button lasts longer than a third threshold amount of time that is greater than the second threshold amount of time, restart the device (e.g., with the restarting unit 3124).

In some embodiments of the electronic device 3100, the processing unit is further configured to, after replacing display of the user interface associated with the first account with a user interface associated with the second user account: while displaying the user interface that is associated with the second user account, receive a second input via the input element with the integrated biometric sensor (e.g., with the biometric information receiving unit 3112); in response to receiving the second input via the input element with the integrated biometric sensor: in accordance with a determination that the second input meets first-user switching criteria while the first user account has an active session on the device, wherein the first-user switching criteria include a requirement that biometric information detected during the input with the input element is consistent with biometric information for the first user account of the plurality of user accounts: (i) unlock the device with respect to the first user account (e.g., with the unlocking unit 3116); (ii) lock the device with respect to the second user account (e.g., with the locking unit 3118); and (iii) replace display of the user interface associated with the second account with a user interface associated with the first user account (e.g., with the displaying unit 3114).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at computing system comprising one or more processors, memory, an electronic device with a display, a touch-sensitive secondary display device distinct from the display, and the touch-sensitive secondary display device is in communication with the electronic device, the method comprising:

sending instructions from the electronic device to the touch-sensitive secondary display device to cause the touch-sensitive secondary display device to concurrently display:

a first set of one or more system level user interface elements; and a second set of one or more additional user interface elements associated with an application executing on the electronic device;

detecting an input at the touch-sensitive secondary display device;

in response to detecting the input at the touch-sensitive secondary display device:

in accordance with a determination that the input is directed to a respective system level user interface element of the first set of one or more system level user interface elements, performing a system level operation associated with the respective system level user interface element while continuing to concurrently display the first set of one or more system level user interface elements and the second set of one or more additional user interface elements; and in accordance with a determination that the input is directed to a user interface element of the second set of one or more additional user interface elements:

displaying, on the touch-sensitive secondary display device, a third set of user interface elements associated with the application, wherein:

a first user interface element in the third set of one or more user interface elements corresponds to a first value for a parameter associated with the user interface element of the second set of one or more additional user interface elements;

a second user interface element in the third set of one or more user interface elements corresponds to a second value for a parameter associated with the user interface element of the second set of one or more additional user interface elements, the second value being different from the first value; and the third set of the one or more user interface elements is distinct from the second set of one or more additional user interface elements; and in response to detecting a selection of a respective user interface element of the third set of one or more user interface elements, performing an application operation associated with the respective user interface element.

2. The method of claim 1, wherein:

the application executing on the electronic device is a content-editing application; and the second set of one or more additional user interface elements are for modifying at least one visual characteristic of content within the content-editing application.

3. The method of claim 2, wherein the second set of one or more additional user interface elements include a sliding scale of values for modifying the at least one visual characteristic of the content within the content-editing application.

4. The method of claim 2, wherein the second set of one or more additional user interface elements include different colors.

5. The method of claim 4, further comprising:

upon selection of one of the different colors, displaying options for selecting other shades of the one of the different colors.

6. The method of claim 2, further comprising:

displaying, at the touch-sensitive secondary display device, a preview of content having the at least one visual characteristic modified using the second set of one or more additional user interface elements.

7. The method of claim 6, further comprising displaying the preview while the input remains in contact with the touch-sensitive secondary display device.

8. The method of claim 7, further comprising ceasing to display the preview in response to detecting lift-off of the input.

9. The method of claim 1, wherein the first set of one or more system level user interface elements are displayed adjacent to the second set of one or more additional user interface elements.

10. The method of claim 1, wherein the first set of one or more system level user interface elements are for controlling a system operation associated with the electronic device.

11. The method of claim 1, wherein:

the application executing on the electronic device is a calendar application; and the second set of one or more additional user interface elements are for modifying at least one of an event start time and an event end time within the calendar application.

12. The method of claim 1, wherein:

the application executing on the electronic device is a calendar application; and the second set of one or more additional user interface elements are for modifying at least a location of an event within the calendar application.

13. The method of claim 1, wherein:

the application executing on the electronic device is a calendar application; and the second set of one or more additional user interface elements are for modifying at least invitee list of an event within the calendar application.

14. A non-transitory computer-readable storage medium storing instructions that, when executed by one or more processors of a computing system that includes an electronic device with a display, a touch-sensitive secondary display device distinct from the display, and the touch-sensitive secondary display device is in communication with the electronic device, cause the computing system to:

send instructions from the electronic device to the touch-sensitive secondary display device to cause the touch-sensitive secondary display device to concurrently display:

a first set of one or more system level user interface elements; and a second set of one or more additional user interface elements associated with an application executing on the electronic device;

detect an input at the touch-sensitive secondary display device; and in response to detecting the input at the touch-sensitive secondary display device:

in accordance with a determination that the input is directed to a respective system level user interface element of the first set of one or more system level user interface elements, perform a system level operation associated with the respective system level user interface element while continuing to concurrently display the first set of one or more system level user interface elements and the second set of one or more additional user interface elements; and in accordance with a determination that the input is directed to a user interface element of the second set of one or more additional user interface elements:

display, on the touch-sensitive secondary display device, a third set of user interface elements associated with the application, wherein:

a first user interface element in the third set of one or more user interface elements corresponds to a first value for a parameter associated with the user interface element of the second set of one or more additional user interface elements;

a second user interface element in the third set of one or more user interface elements corresponds to a second value for a parameter associated with the user interface element of the second set of one or more additional user interface elements, the second value being different from the first value; and the third set of the one or more user interface elements is distinct from the second set of one or more additional user interface elements; and in response to detecting a selection of a respective user interface element of the third set of one or more user interface elements, perform an application operation associated with the respective user interface element.

15. A computing system, comprising:

one or more processors, an electronic device with a display, a touch-sensitive secondary display device distinct from the display, wherein the touch-sensitive secondary display device is in communication with the electronic device; and memory storing one or more programs that are configured for execution by the one or more processors, the one or more programs including instructions for:

sending instructions from the electronic device to the touch-sensitive secondary display device to cause the touch-sensitive secondary display device to concurrently display:

a first set of one or more system level user interface elements; and a second set of one or more additional user interface elements associated with an application executing on the electronic device;

detecting an input at the touch-sensitive secondary display device;

in response to detecting the input at the touch-sensitive secondary display device:

in accordance with a determination that the input is directed to a respective system level user interface element of the first set of one or more system level user interface elements, performing a system level operation associated with the respective system level user interface element while continuing to concurrently display the first set of one or more system level user interface elements and the second set of one or more additional user interface elements; and in accordance with a determination that the input is directed to a user interface element of the second set of one or more additional user interface elements:

displaying, on the touch-sensitive secondary display device, a third set of user interface elements associated with the application, wherein:

a first user interface element in the third set of one or more user interface elements corresponds to a first value for a parameter associated with the user interface element of the second set of one or more additional user interface elements;

a second user interface element in the third set of one or more user interface elements corresponds to a second value for a parameter associated with the user interface element of the second set of one or more additional user interface elements, the second value being different from the first value; and the third set of the one or more user interface elements is distinct from the second set of one or more additional user interface elements; and in response to detecting a selection of a respective user interface element of the third set of one or more user interface elements, performing an application operation associated with the respective user interface element.

16. The non-transitory computer-readable storage medium of claim 14, wherein:

the application executing on the electronic device is a content-editing application; and the second set of one or more additional user interface elements are for modifying at least one visual characteristic of content within the content-editing application.

17. The non-transitory computer-readable storage medium of claim 16, wherein the second set of one or more additional user interface elements include a sliding scale of values for modifying the at least one visual characteristic of the content within the content-editing application.

18. The non-transitory computer-readable storage medium of claim 16, wherein the second set of one or more additional user interface elements include different colors.

19. The non-transitory computer-readable storage medium of claim 16, wherein the instructions, when executed by the one or more processors of the computing system, cause the computing system to:

display, at the touch-sensitive secondary display device, a preview of content having the at least one visual characteristic modified using the second set of one or more additional user interface elements.

20. The non-transitory computer-readable storage medium of claim 14, wherein the first set of one or more system level user interface elements are displayed adjacent to the second set of one or more additional user interface elements.

21. The non-transitory computer-readable storage medium of claim 14, wherein the first set of one or more system level user interface elements are for controlling a system operation associated with the electronic device.

22. The non-transitory computer-readable storage medium of claim 14, wherein:

the application executing on the electronic device is a calendar application; and the second set of one or more additional user interface elements are for modifying at least one of an event start time and an event end time within the calendar application.

23. The non-transitory computer-readable storage medium of claim 14, wherein:

the application executing on the electronic device is a calendar application; and the second set of one or more additional user interface elements are for modifying at least a location of an event within the calendar application.

24. The non-transitory computer-readable storage medium of claim 14, wherein:

the application executing on the electronic device is a calendar application; and the second set of one or more additional user interface elements are for modifying at least invitee list of an event within the calendar application.

25. The computing system of claim 15, wherein:

the application executing on the electronic device is a content-editing application; and the second set of one or more additional user interface elements are for modifying at least one visual characteristic of content within the content-editing application.

26. The computing system of claim 25, wherein the second set of one or more additional user interface elements include a sliding scale of values for modifying the at least one visual characteristic of the content within the content-editing application.

27. The computing system of claim 25, wherein the second set of one or more additional user interface elements include different colors.

28. The computing system of claim 25, the one or more programs including instructions for:

displaying, at the touch-sensitive secondary display device, a preview of content having the at least one visual characteristic modified using the second set of one or more additional user interface elements.

29. The computing system of claim 15, wherein the first set of one or more system level user interface elements are displayed adjacent to the second set of one or more additional user interface elements.

30. The computing system of claim 15, wherein the first set of one or more system level user interface elements are for controlling a system operation associated with the electronic device.

31. The computing system of claim 15, wherein:

the application executing on the electronic device is a calendar application; and the second set of one or more additional user interface elements are for modifying at least one of an event start time and an event end time within the calendar application.

32. The computing system of claim 15, wherein:

the application executing on the electronic device is a calendar application; and the second set of one or more additional user interface elements are for modifying at least a location of an event within the calendar application.

33. The computing system of claim 15, wherein:

the application executing on the electronic device is a calendar application; and the second set of one or more additional user interface elements are for modifying at least invitee list of an event within the calendar application.

* * * * *